US007984684B2

(12) United States Patent
Hinderks

(10) Patent No.: US 7,984,684 B2
(45) Date of Patent: Jul. 26, 2011

(54) MARINE HULLS AND DRIVES

(76) Inventor: Mitja Victor Hinderks, Los Angeles, CA (US)

( * ) Notice: Subject to any disclaimer, the term of this patent is extended or adjusted under 35 U.S.C. 154(b) by 0 days.

(21) Appl. No.: 11/545,053

(22) Filed: Oct. 6, 2006

(65) Prior Publication Data

US 2008/0141921 A1 Jun. 19, 2008

(51) Int. Cl.
*B63B 1/24* (2006.01)

(52) U.S. Cl. ....................... 114/274; 114/282; 440/88 C

(58) Field of Classification Search .................. 114/274, 114/282; 440/88 C
See application file for complete search history.

(56) References Cited

U.S. PATENT DOCUMENTS

| | | | | |
|---|---|---|---|---|
| 1,780,998 | A | 11/1930 | Curioni | |
| 2,491,541 | A | 12/1949 | Woodin | |
| 2,906,228 | A | 9/1959 | Wendel | |
| 3,044,432 | A | 7/1962 | Wennagel et al. | |
| 3,195,530 | A | 7/1965 | Heidner | |
| 3,211,119 | A | 10/1965 | Kiekhaefer | |
| 3,310,022 | A | 3/1967 | Kollman | |
| 3,342,155 | A | 9/1967 | Hook | |
| 3,354,857 | A | 11/1967 | Hobday | |
| 3,456,609 | A * | 7/1969 | Nott | 114/281 |
| 3,456,611 | A * | 7/1969 | Johnson | 114/275 |
| 3,463,115 | A | 8/1969 | French | |
| 3,623,444 | A | 11/1971 | Lang | |
| 3,672,608 | A | 6/1972 | Gioia et al. | |
| 4,159,691 | A | 7/1979 | Paxton | |
| 4,188,906 | A | 2/1980 | Tachmindji et al. | |
| 4,953,492 | A * | 9/1990 | Duffty | 114/282 |
| 4,981,099 | A * | 1/1991 | Holder | 114/274 |
| 4,987,741 | A * | 1/1991 | Moser | 60/599 |
| 5,238,432 | A * | 8/1993 | Renner | 440/56 |
| 5,799,629 | A * | 9/1998 | Lowi, Jr. | 123/56.8 |
| 6,857,918 | B1 * | 2/2005 | Lebreux et al. | 440/6 |
| 6,948,441 | B2 | 9/2005 | Levine | |
| 2007/0144423 | A1 * | 6/2007 | Roberts | 114/90 |

FOREIGN PATENT DOCUMENTS

| | | |
|---|---|---|
| GB | 715 880 | 9/1954 |

* cited by examiner

*Primary Examiner* — Stephen Avila

(57) ABSTRACT

The disclosure relates to marine craft which are capable of operating in the hydrofoil mode, many with extensible and retractable hydrofoil posts. Specific embodiments of large commercial hydrofoil craft are described, including those with structure which is the water during hydrofoil travel mode and which can be retracted to partly fit within recesses in the hull during other operating modes. Other craft, including those with hybrid electric drive, are disclosed having uncooled reciprocating internal combustion engines. A number of arrangements for pistons and cylinders of unconventional configuration are described. These included are toroidal combustion or working chambers, some with fluid flow through the core of the toroid, pistons reciprocating between pairs of working chambers, tensile links between piston and crankshaft, energy absorbing piston-crank links, crankshafts supported on gas bearings. In some embodiments pistons mare rotate while reciprocating. High temperature exhaust emissions systems are described, including those containing filamentary material, as are procedures for reducing emissions during cold start by means of valves at reaction volume exit. Compound engines having the new engines as a reciprocating stage are described.

107 Claims, 107 Drawing Sheets

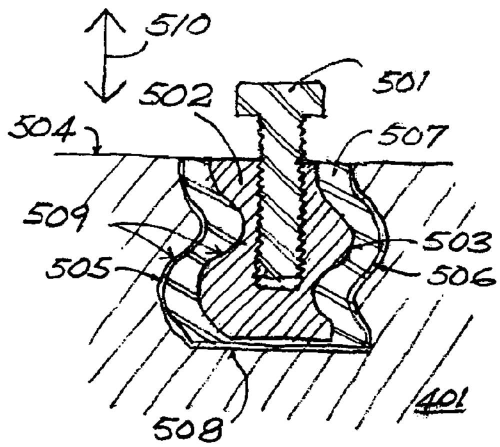
Fig. 8
Fig. 7
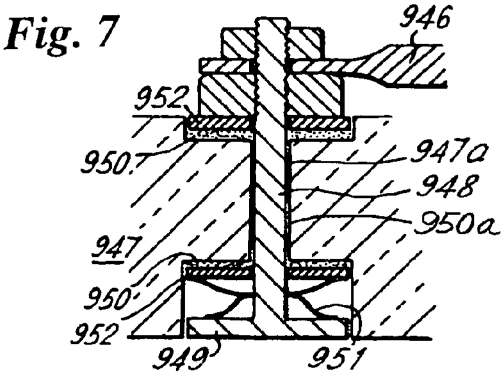
Fig. 9
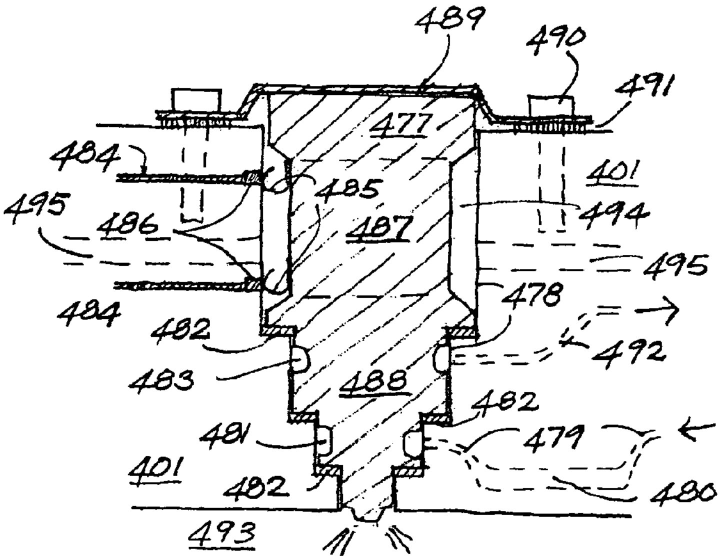
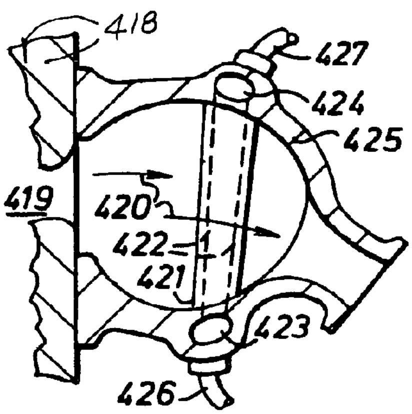
Fig. 10
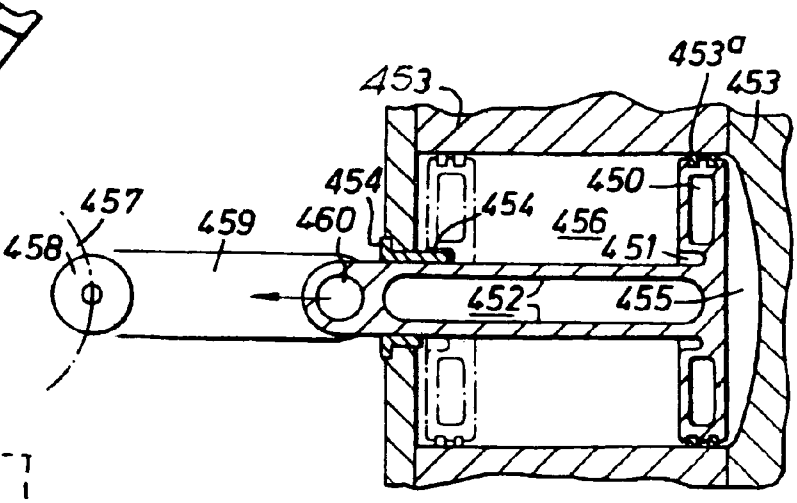
Fig. 12
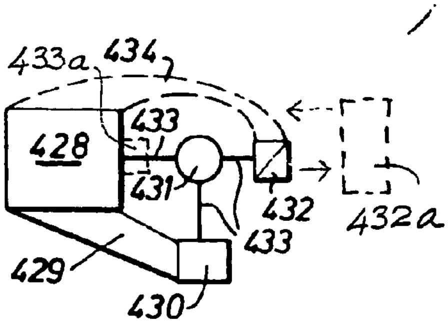
Fig. 11

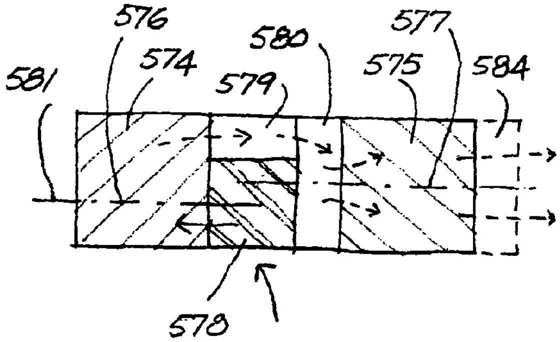
Fig. 17
Fig. 18
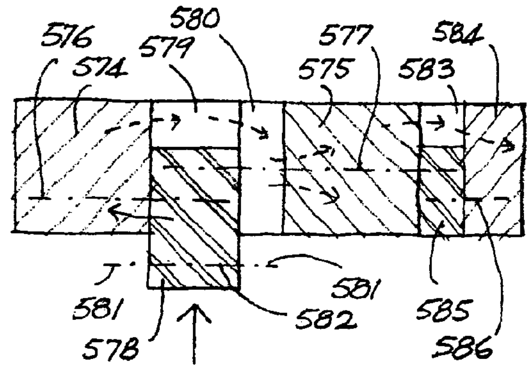
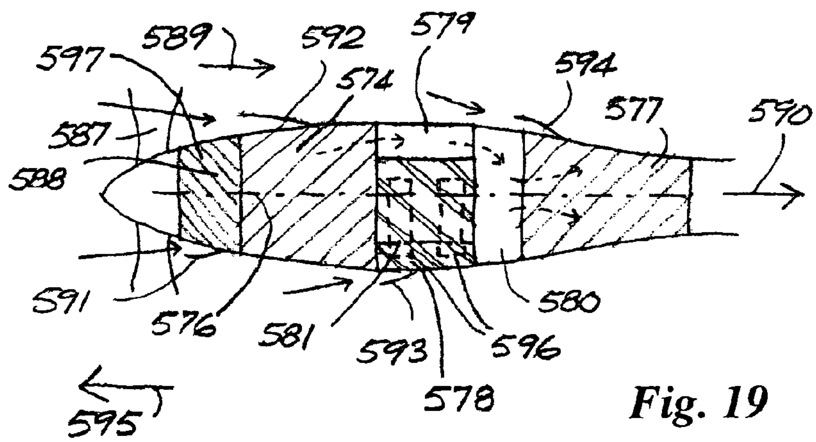
Fig. 19
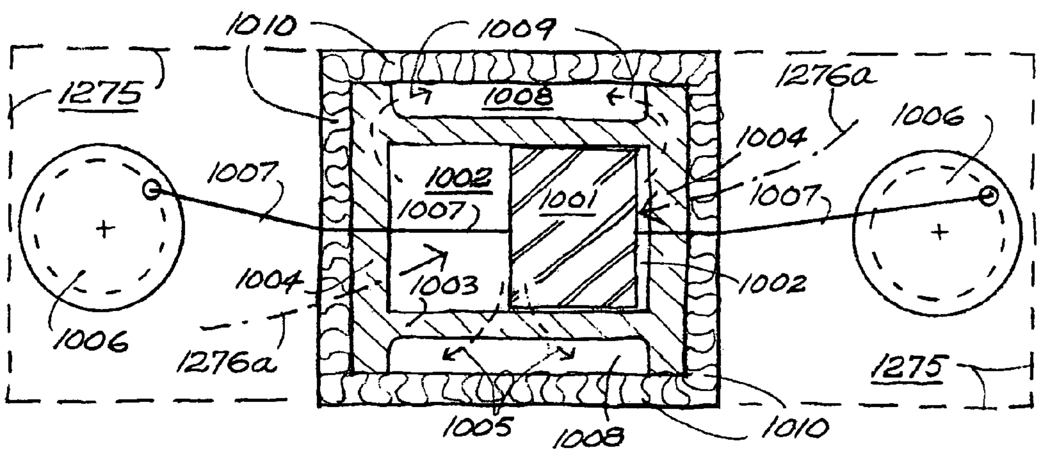
Fig. 20

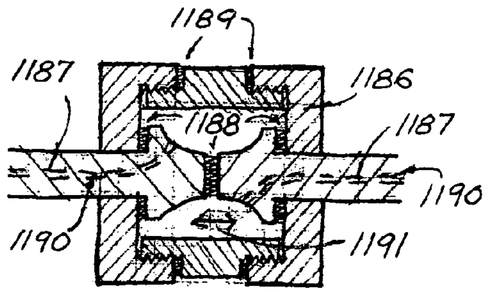
Fig. 66
Fig. 67
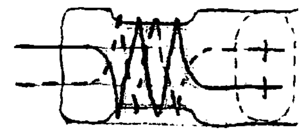
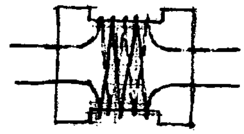
Fig. 68
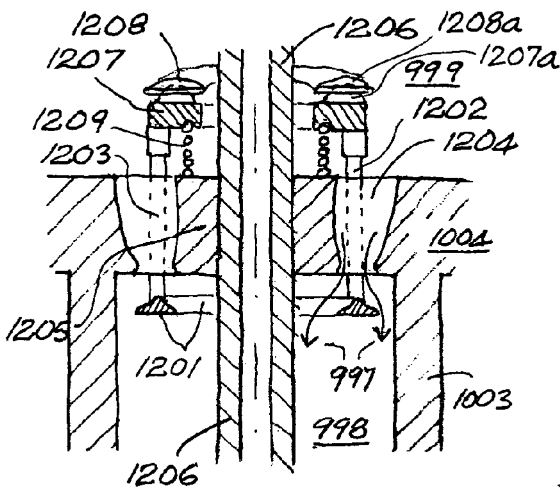
Fig. 70
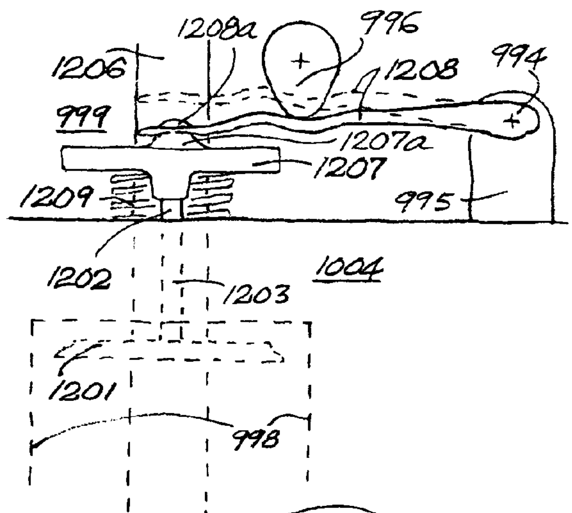
Fig. 71
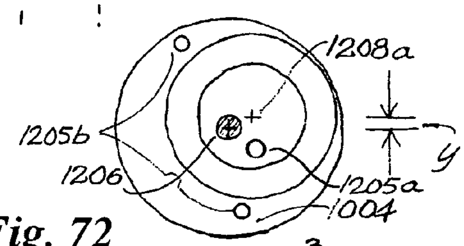
Fig. 72
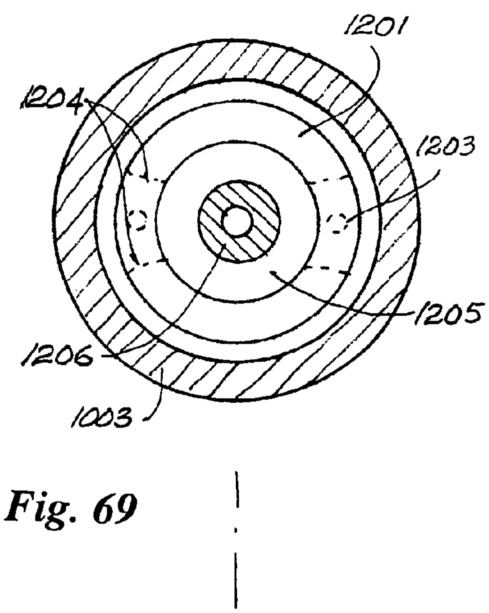
Fig. 69
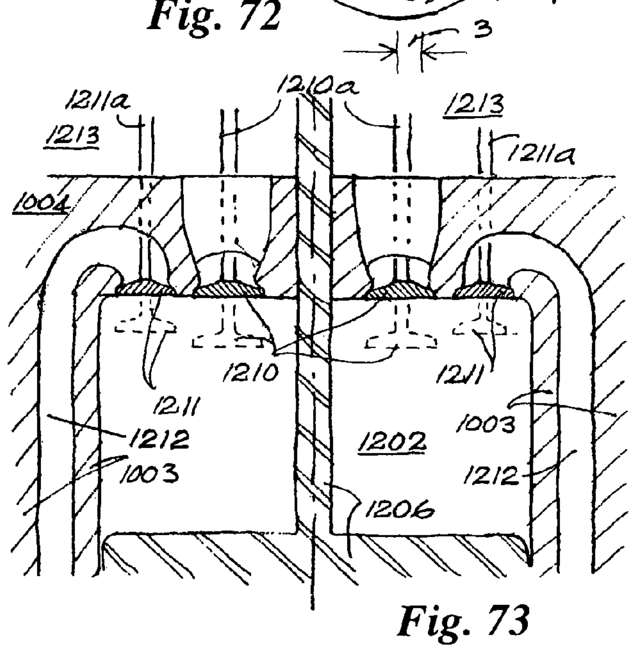
Fig. 73

Fig. 169
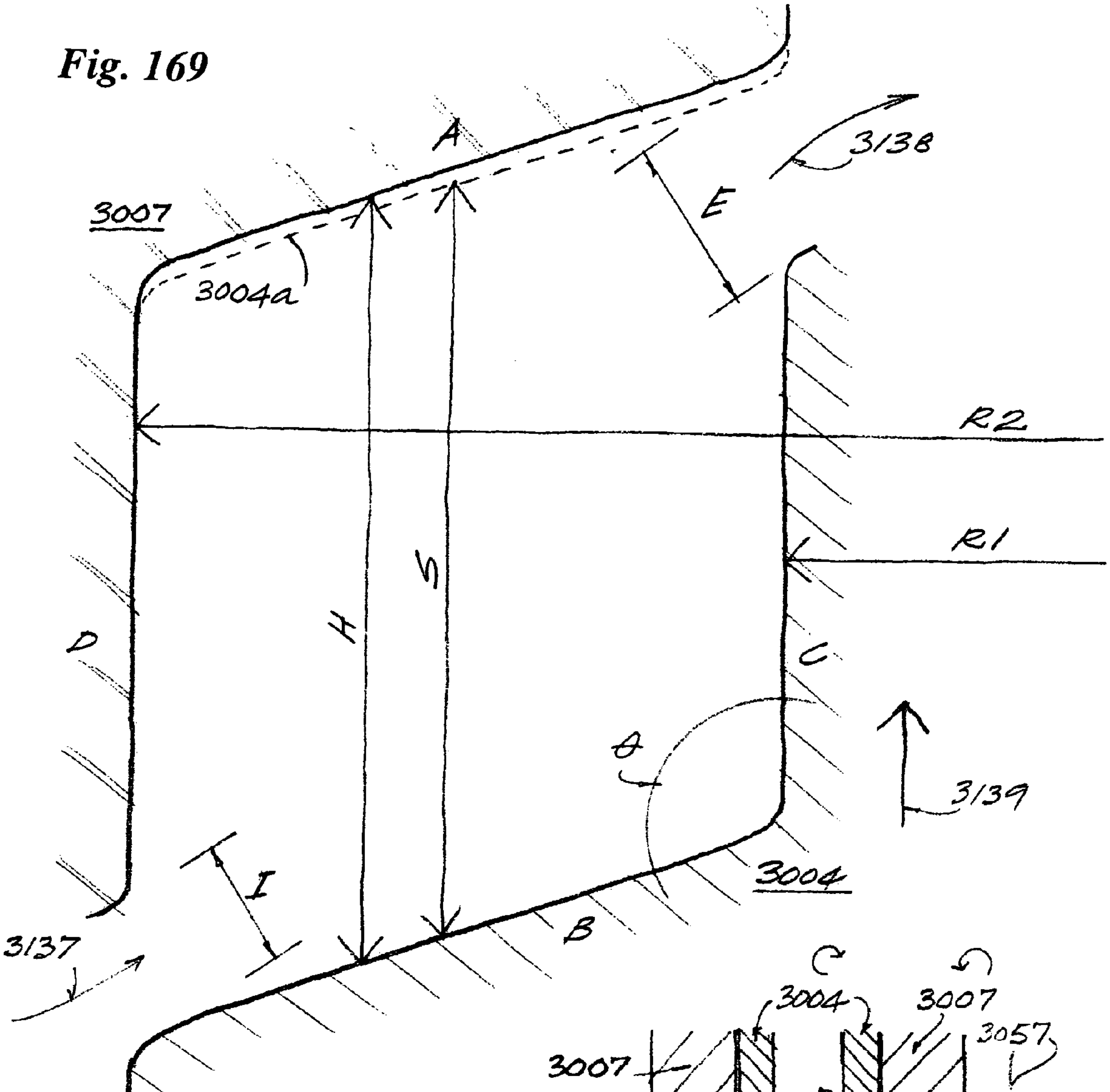
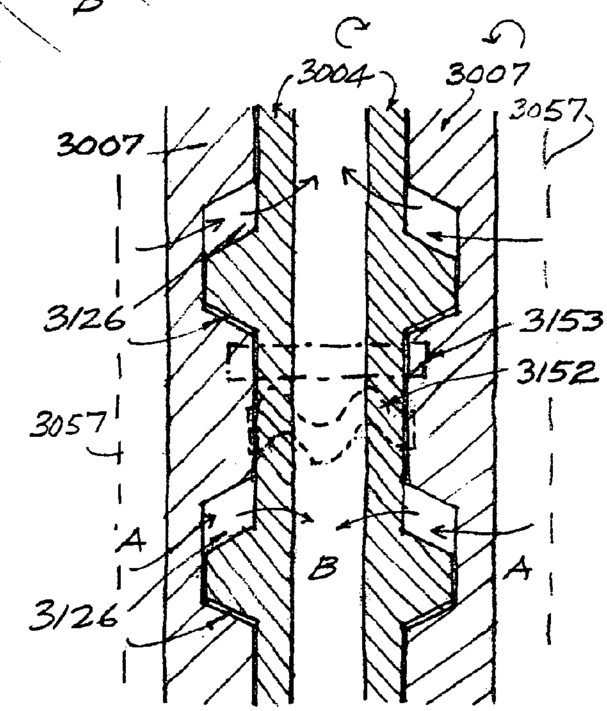
Fig. 168

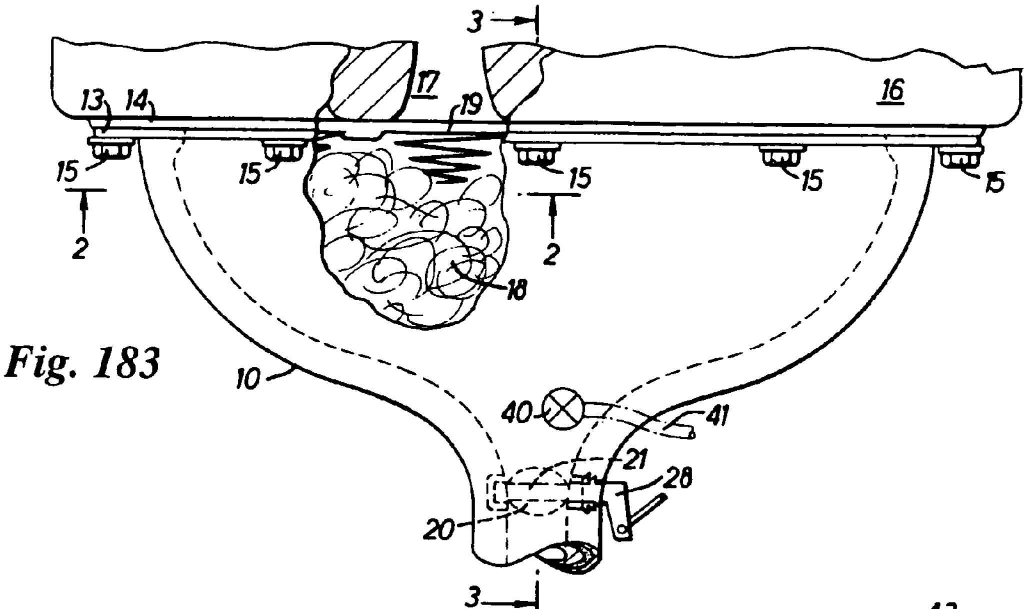
Fig. 183
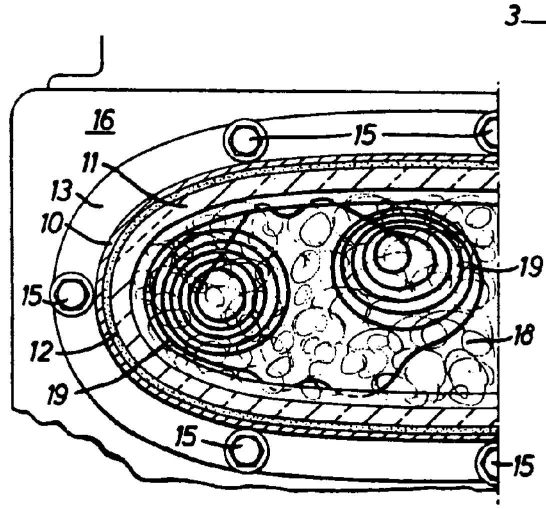
Fig. 184
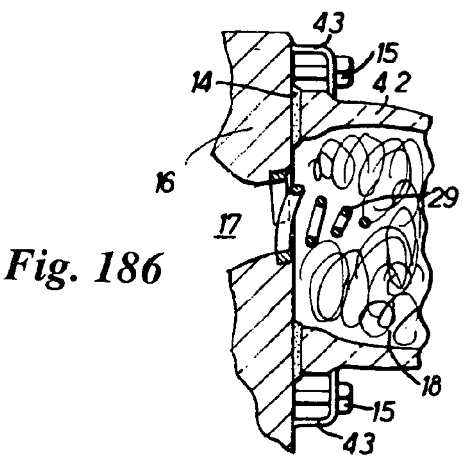
Fig. 186
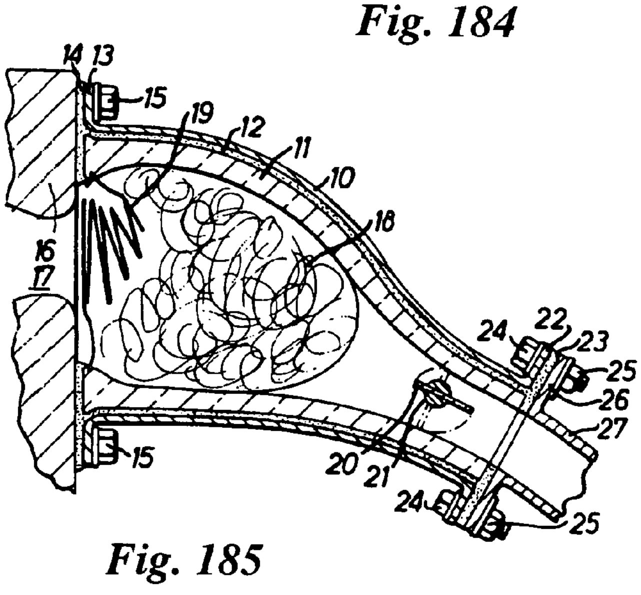
Fig. 185
Fig. 187
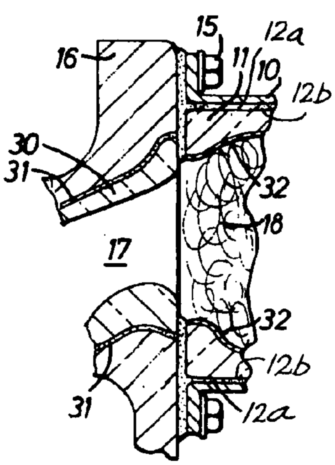

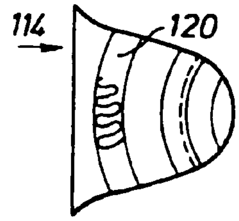
Fig. 225
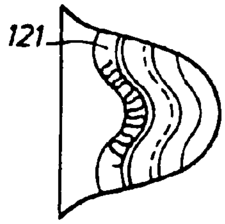
Fig. 226
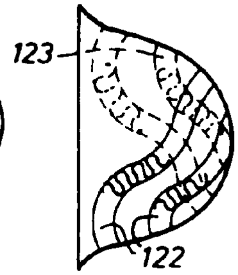
Fig. 227
Fig. 228
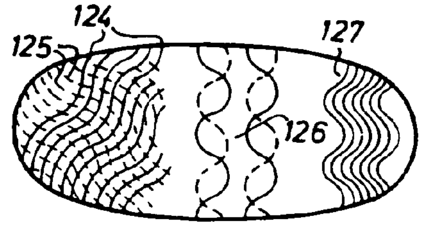
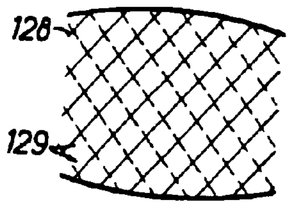
Fig. 229
Fig. 230
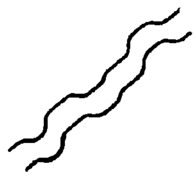
Fig. 231
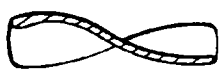
Fig. 234
Fig. 232
Fig. 233
Fig. 235
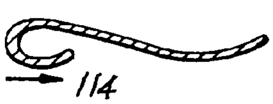
Fig. 236
Fig. 237
Fig. 238
Fig. 239
Fig. 240
Fig. 241
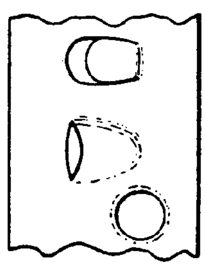
Fig. 242
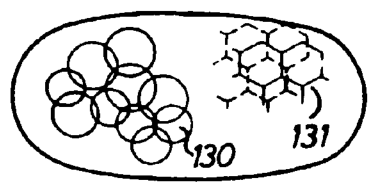
Fig. 243
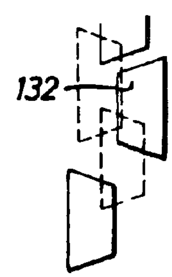
Fig. 244
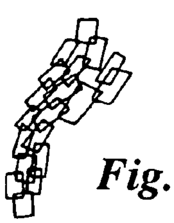
Fig. 245
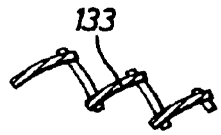
Fig. 246
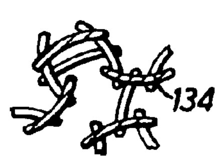
Fig. 247

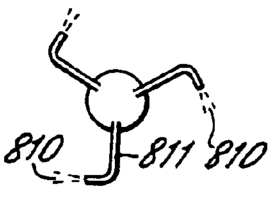
Fig. 299
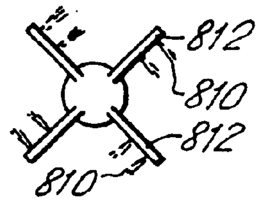
Fig. 300
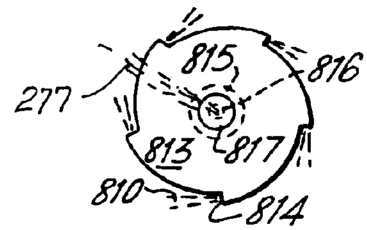
Fig. 301
Fig. 303
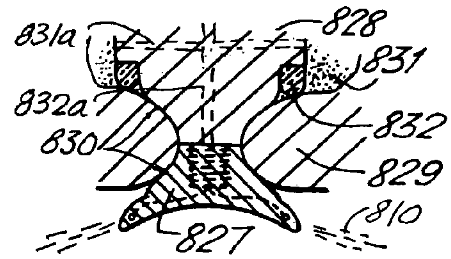
Fig. 304
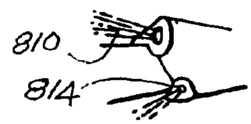
Fig. 302
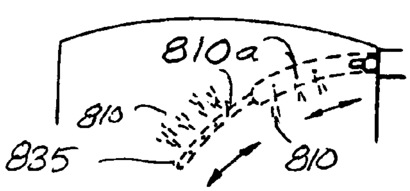
Fig. 305
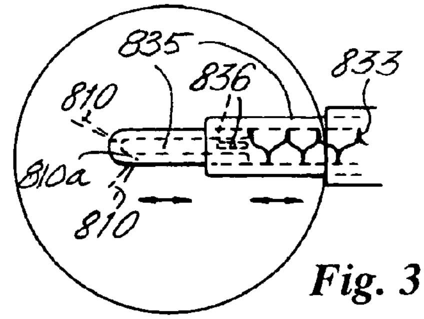
Fig. 306
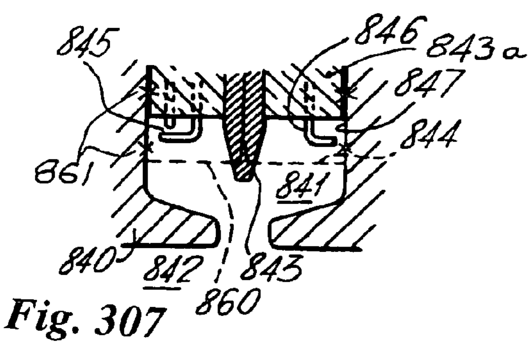
Fig. 307
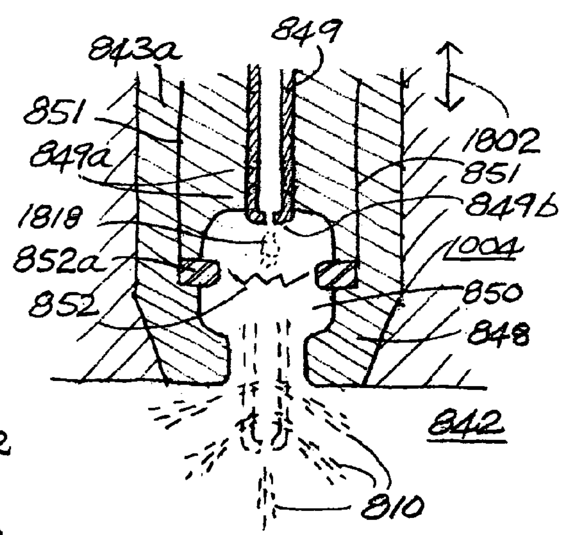
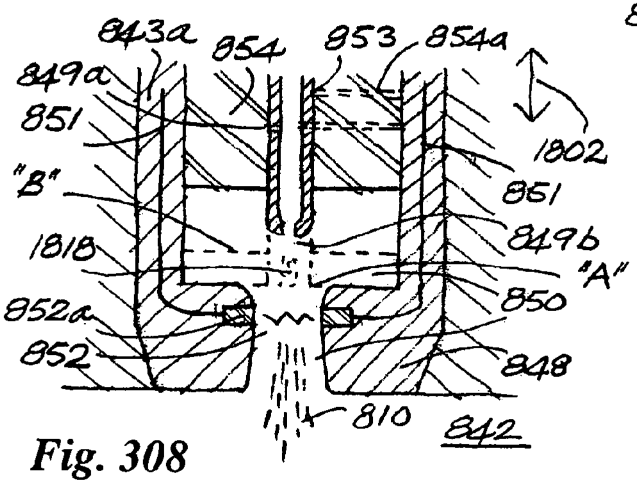
Fig. 308
Fig. 309

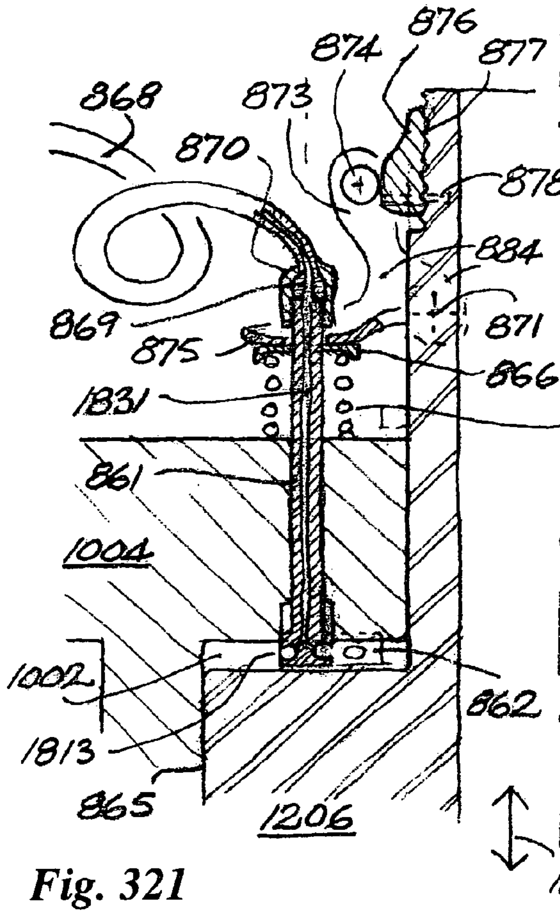
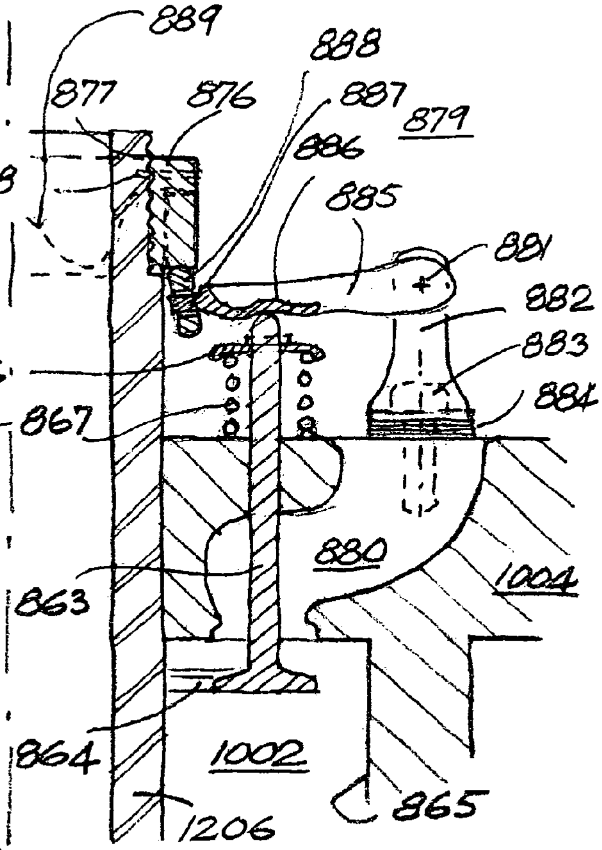
Fig. 321
1802
Fig. 322
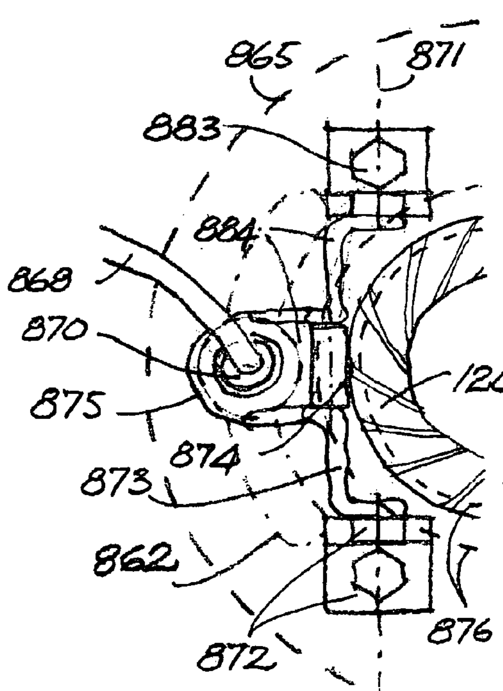
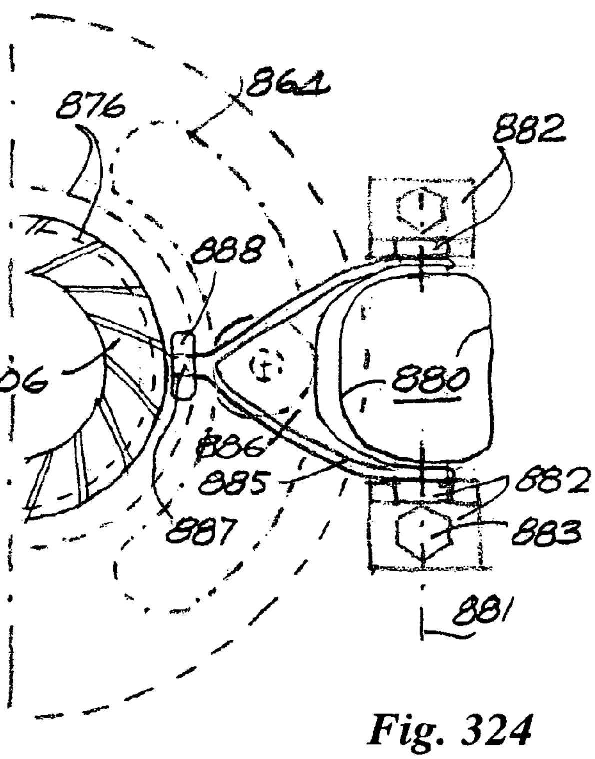
Fig. 323
Fig. 324

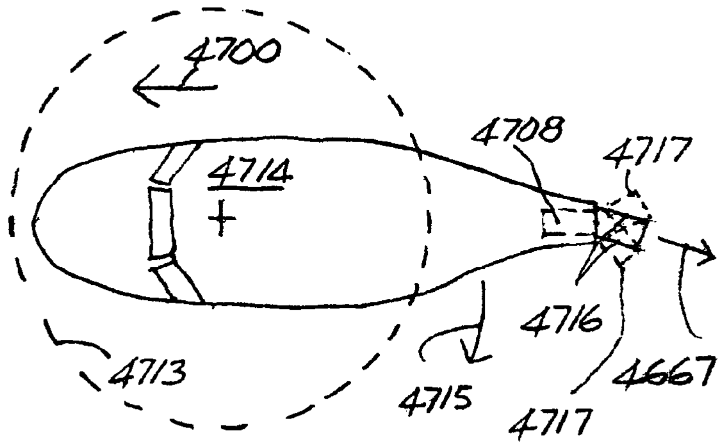
Fig. 334
Fig. 335
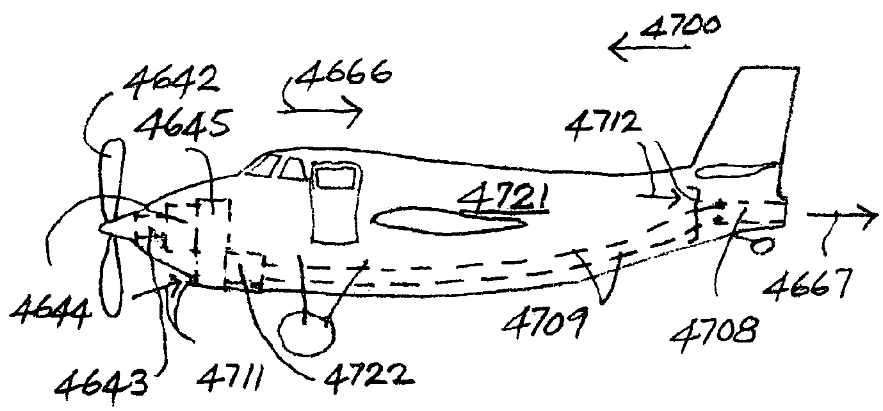
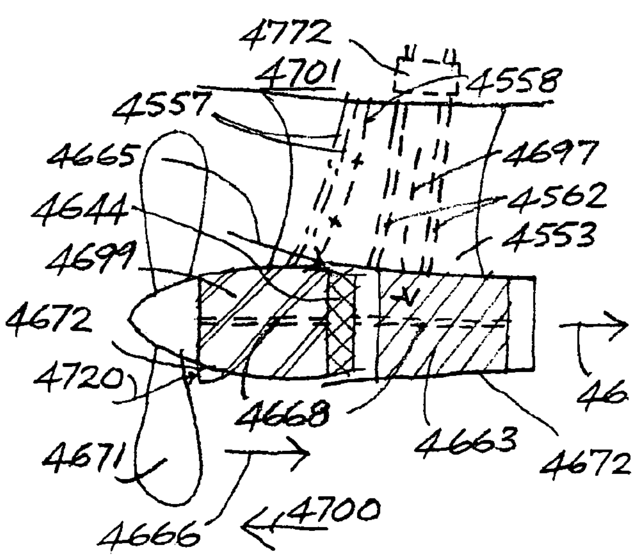
Fig. 336

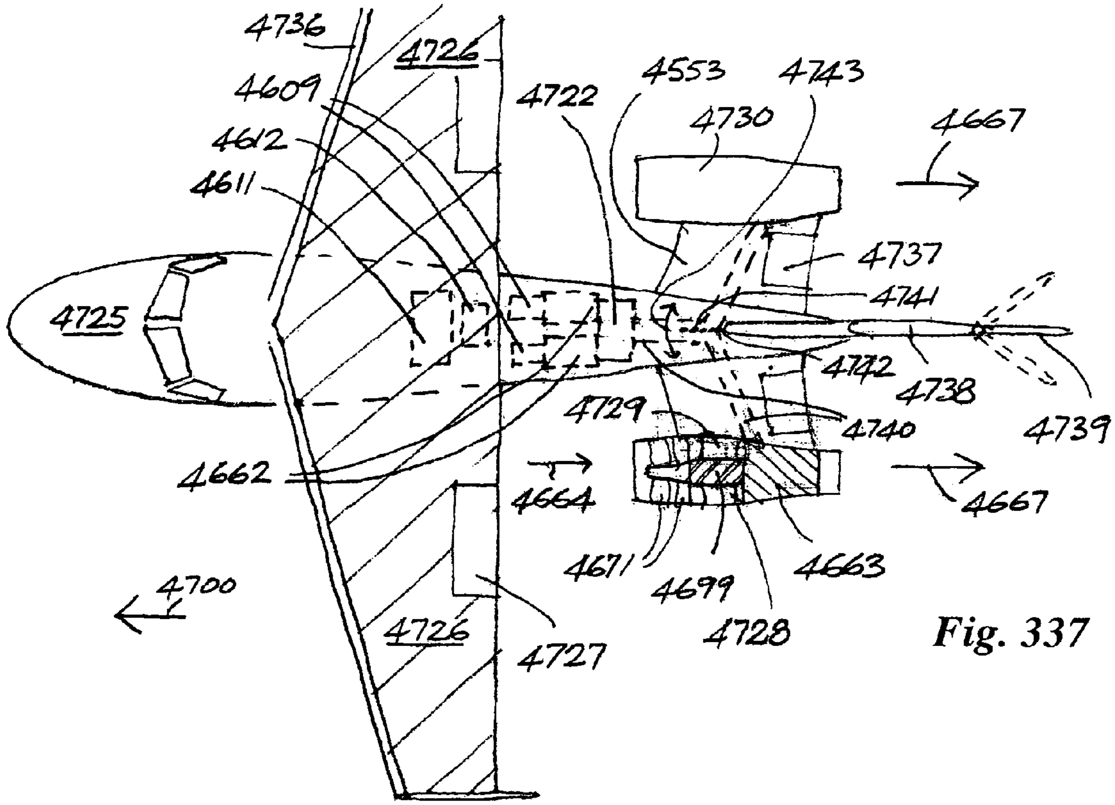
Fig. 337
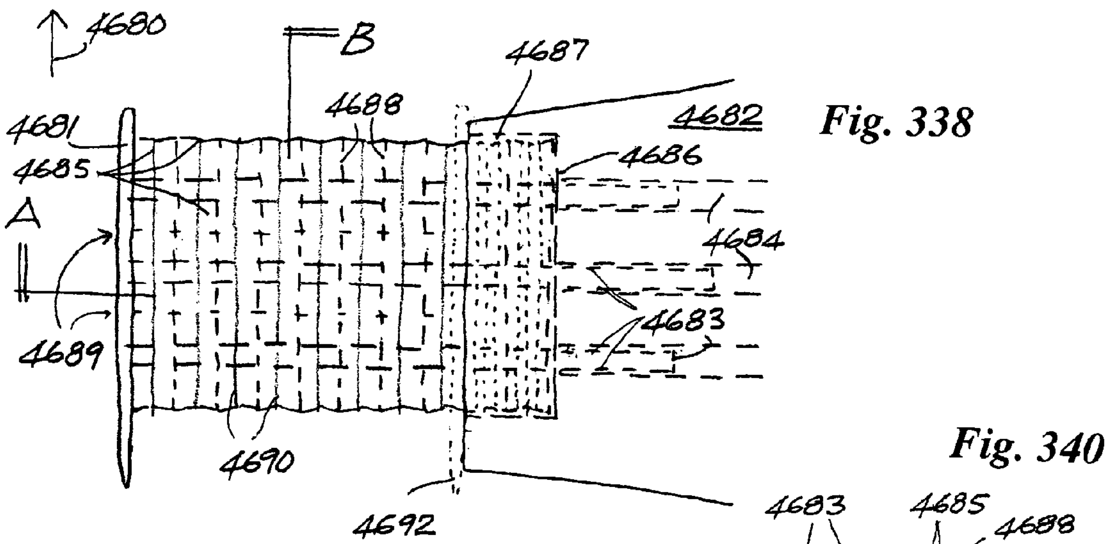
Fig. 338
Fig. 340
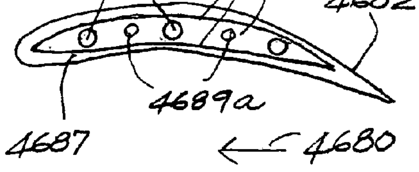
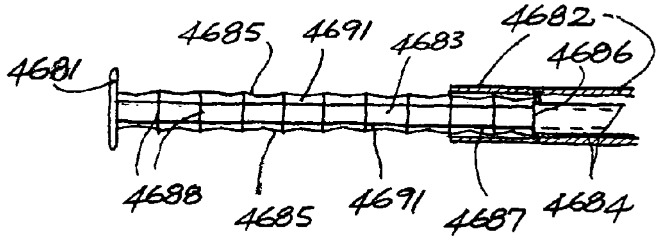
Fig. 339

365

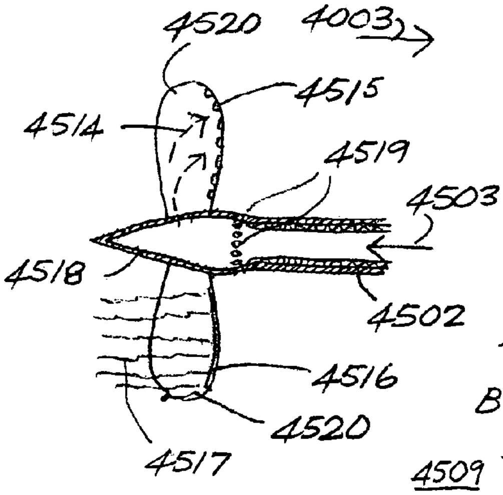
Fig. 403
Fig. 404
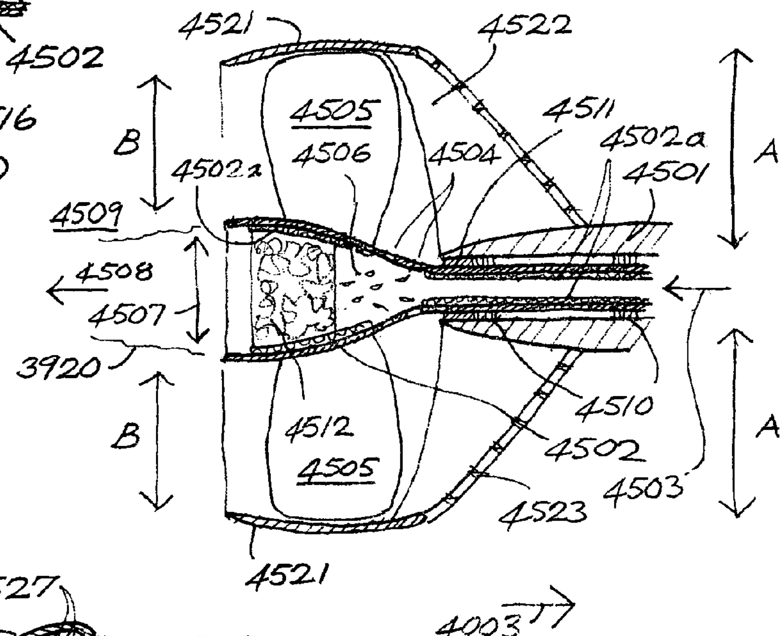
Fig. 405
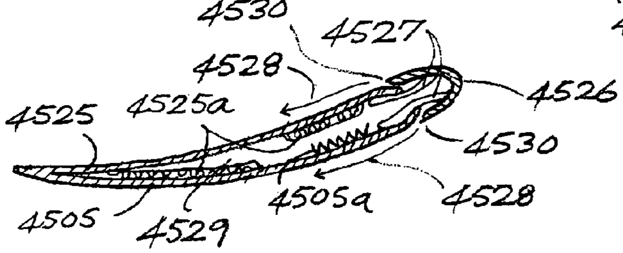
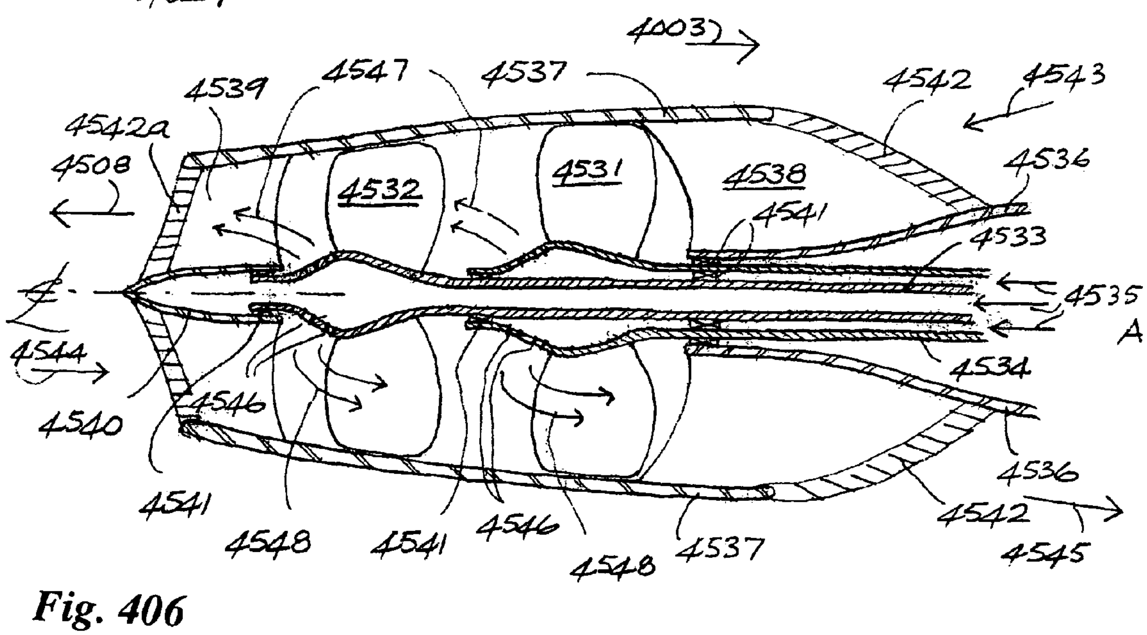
Fig. 406

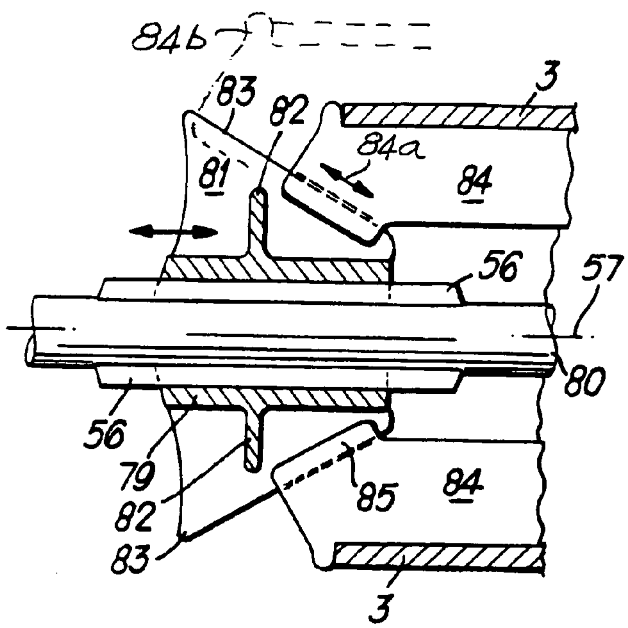
Fig. 442
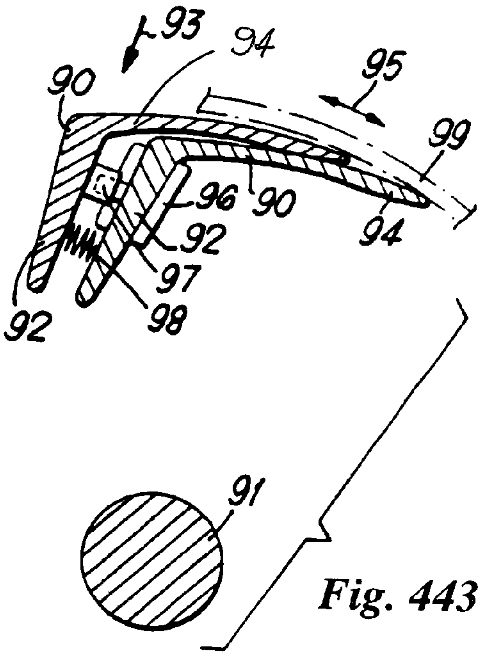
Fig. 443
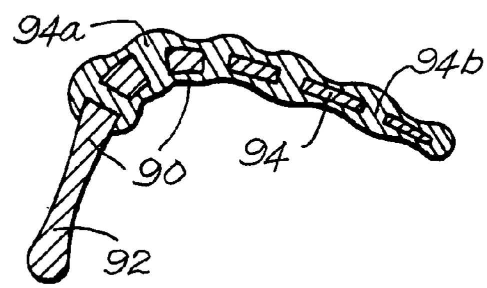
Fig. 447
Fig. 444
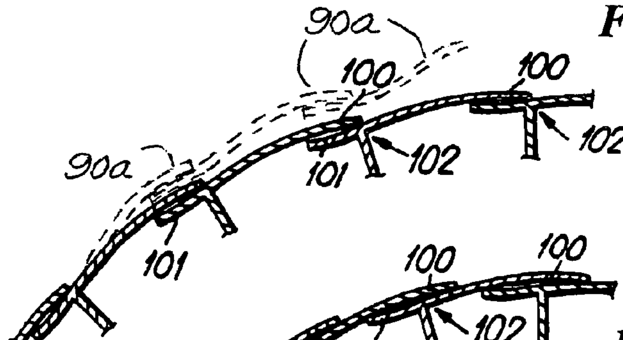
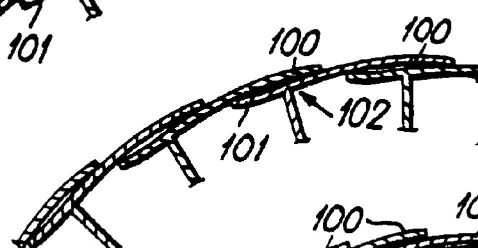
Fig. 445
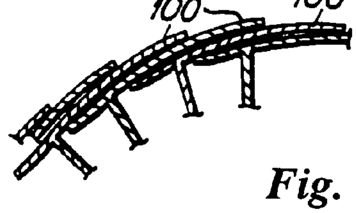
Fig. 446
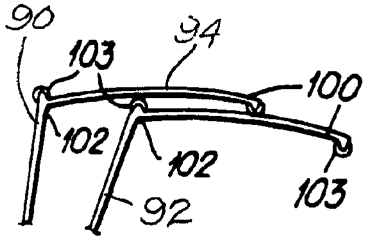
Fig. 448

MARINE HULLS AND DRIVES

TECHNICAL FIELD

The disclosure relates to improved pumps and combustion engines; the thermal management of the fluids being worked by such hardware and thermal management of the hardware itself; combustion engine exhaust emissions control devices; components and ancillary equipment for pumps, engines and emissions control devices; vehicle, aircraft, marine craft and continuously variable transmissions.

BACKGROUND ART

Today's piston-and-cylinder engine hardware was first commercialized in the mid-18th century, using then available technology. Early internal combustion (IC) engine designers like Gottfried Daimler and Rudolf Diesel adapted the steam expansion chamber to a combined combustion and expansion chamber, leaving hardware essentially unchanged. One could say that a transformed twenty-first century embodiment of the reciprocating internal combustion (IC) engine is overdue. This disclosure focuses on improved thermal management in reciprocating devices, including pumps and IC engines. In the latter case, the improvements lead to a range of more advanced engines, ranging from modified versions of today's products, to new embodiments of reciprocating devices. In a conventional reciprocating (IC) engine, the rapid burning of the combustion charge in the confined space of the combustion volume produces expansion and heat. The expansion drives the piston and consequently engine while the heat product of the cycle is almost wholly unused—in fact considered undesirable since efforts are made to dissipate it as effectively as possible, by means of conduction through cylinder walls and head to general radiation and to the cooling system. Other heat is collected by the lubrication system to be often dissipated by oil radiators, sump cooling fins, etc. The benefits of reducing cooling to engines are substantial. Cutting down on cooling saves energy otherwise irrevocably dissipated by cooling and general radiation. It also increases the average combustion temperature, providing an additional efficiency increase, since combustion efficiency is related to the difference between firing temperature and incoming charge air, which is constant.

It is know that efficiency increases with the increase of the temperature differential of the combustion cycle. The hotter combustion, the greater the efficiency, all other factors being equal. Engine systems are designed to withstand engine performance under peak load which, in most cases occurs for a small percentage of total operating time. At all other times the engine is running colder and therefore less efficient. Today, almost all engines during most of their operating life time run at temperatures substantially below the peak temperatures they are designed for, and so at lower efficiency because of the lower temperature. To improve fuel economy and reduce CO2 emissions, a most important first step would be to maintain engine temperature at all times to be at the maximum temperature the engine can withstand, so that at all operating modes it is operating at optimum efficiency. A second step would be to eliminate the cooling system altogether and as far as possible, place the engine in a thermally insulated housing, to establish average combustion temperatures higher than previously possible. Great financial and other advantages accrue by eliminating the cost, mass, bulk, and unreliability of the cooling system. Its failure is the most frequent cause of engine breakdown. In less-cooled or un-cooled engines, the exhaust is much hotter—ie containing more energy—and more work can be derived from it, through some form of compounding, and further gains in efficiency. Turbine, steam or Stirling engines may be used to extract work from the hot exhaust gas; as can systems for converting gas heat directly into electrical energy. In an un-cooled engine, the first step described above is automatically realized, because there is little variation in temperature during different operating modes; the engine is always running close to its maximum designed temperature. Herein, un-cooled engines are described first, followed by cooled engines at all times operating at or close to maximum design temperature. Many have considered it desirable to build engines with reduced or no cooling and therefore running at higher temperatures. Efficiency would improve, since it is dependent on the difference in temperature between ambient air (which is constant) and that at combustion. The resulting hotter exhaust gases will generally be easier to cleanse. If the cooling system can be reduced or eliminated, so can some or all of its cost, mass, bulk and unreliability. Un-cooled engines can be thermally, acoustically and vibrationally insulated to virtually any degree, making them more environmentally and socially acceptable. Of the calorific value of the fuel, a greater amount will be spent on pushing a piston, but nearly all the remainder will now be in the hot exhaust gas, where it is recoverable. With the new un-cooled engines, temperature equilibria would be so high that the main piston and cylinder components would likely have to be of special high-temperature metal alloys or of ceramic material.

To the knowledge of the applicant, commercial long-life un-cooled engines are not in production today. Manufacturers and researchers tried to build un-cooled engines in the 1980's and 1990's. Publications indicate the work nearly all involved substituting or adding ceramic materials for metals in a few key combustion chamber components. For example, ceramic caps were placed on metal pistons; ceramic liners placed in metal engine blocks; a zirconia poppet valve was substituted for an identically shaped metal valve. The work was not very successful for a number of reasons, including problems with differential thermal expansion of ceramic and metal components abutting each other. Engine designs were essentially unchanged. Today's metal IC engines reflect three constraints; the materials characteristics of metals; the need for cooling and therefore the engine block, etc; and commercial practice determining the most viable ways of manufacturing and assembling metal components. The applicant felt that any viable commercial embodiment of the un-cooled ceramic engine would look very different from today's units, because all the old constraints were no longer relevant, and new constraints would apply. This disclosure includes the result of his attempt to adapt and modify the traditional design of the piston and cylinder engine, so that new embodiments could be viably built un-cooled and out of ceramic material. Many of the embodiments could also be built in high-temperature metal alloys.

The elimination of cooling will raise temperature equilibria in all part of the engine, including in the fluids being processed, leading to higher exhaust gas temperatures. In addition to having more energy to convert into further work, as noted earlier, this will have the beneficial effect of hastening the speed of the chemical reactions in exhaust gas, making exhaust emissions control systems more effective or requiring them to be less elaborate. Because exhaust emissions control is so important today, new arrangements for cleansing high temperature exhaust gases were devised, and are disclosed herein. The un-cooled engine preferably uses internal combustion cycles although, where appropriate, many principles of the invention may also be applied to, for example, engines operating on the Rankine or Stirling cycles. The engines constructed to operate continuously at maximum design temperature with reduced cooling, and those designed for life-long operation entirely un-cooled, are suitable for all applications where internal combustion engine are presently used. These include for vehicles and craft of all kinds and sizes; pumps; electrical generators; small service tools such as hand-saws, lawn mowers and trimmers, etc.

The new engines present an opportunity to create more efficient aircraft and marine craft. Compound engines including a reciprocating IC engine stage of the inventions are especially suited to hybrid electric dive systems, for aircraft and marine craft. The reciprocating engines are much lighter than current units of equivalent power and so are ideal for driving a propulsion device such as a propeller or impeller to create thrust, with the turbine stage creating additional thrust. Almost all marine craft today are hull-in-the-water vessels. It is known that hydrofoil craft are more efficient, but today's heavy marine engines do not work well in a hull suspended above water, and the hydrofoil posts present draft-related problems in larger craft. The engines of the invention are so light, silent and vibration-free that they are easily adapted to hydrofoil craft, and the hull shapes and post configurations of the invention resolve tradition problems relating to draft. Continuously variable transmissions (CVT's) are known to provide better fuel economy than traditional stepped transmissions, but today's CVT's are limited to low power applications. The transmissions of the invention are CVT's have no effective power limitation and so are very suited to larger vehicles, aircraft and marine craft.

SUMMARY OF THE INVENTION

The inventions comprise commercial long-life reciprocating internal combustion (IC) engines having high power densities, and having absolutely no cooling whatever. They are preferably mounted in an insulated casing. Main objectives are to substantially improve efficiency and to reduce CO2 emissions. In most embodiments, the number of moving parts per cylinder, and the number of cylinders required for a desired output, are greatly reduced. Additional objectives are to improve power-to-weight and power-to-bulk ratios many fold, and to make reciprocating IC engines more silent and vibration-free. In many embodiments, all the principle components are of ceramic material. The inventions further comprise using high-temperature and optionally high-pressure exhaust from such un-cooled engines to power another engine, such as a turbine, steam or Stirling engine. New configurations of pistons, cylinders and cylinder heads are disclosed, which form the basis for improved pumps and compressors. The inventions further comprise adapting today's designs to embody engines at all times operating at a temperature which is substantially the highest they are designed for. The inventions further comprise vehicles of all kinds, aircraft and marine craft adapted to use the engines of the invention. The inventions further comprise hydrofoil marine craft. The inventions further comprise continuously variable transmissions. The many discrete inventive steps are summarized in the claims.

Clarifications

Where diagrams or embodiments are described, these are always by way of example and/or illustration of the principles of the invention. All the Figures herein show selected embodiments of the invention, and are presented as means of enabling the proper understanding of the inventions, which may be embodied in any appropriate and convenient manner, including those not recited or illustrated here. For example, any type of piston or valve may be used in an un-cooled engine and the engine portions may be assembled in any manner. It is strongly emphasized that the various features and embodiments of the invention may be used in any appropriate combination or arrangement. Further, it is considered that any of the separate features of this complete disclosure comprise independent inventions.

Throughout this disclose the expression "engine block" or "block" can denote what is known as either an engine block and/or a cylinder head block in conventional motor usage. By "un-cooled" is meant engines or pumps having no mechanism for transfer of heat from combustion or working volume to ambient air. Such mechanisms typically comprise a water jacket, pump, radiator and fan, or comprise a fan directing air over metal cooling fins or surfaces. Un-cooled engines may have some form of charge cooling, wherein the temperature of the charge is reduced before it enters the combustion or working chamber. The features of the un-cooled engine have been described mainly in relation to internal combustion engines, although they are suited to and may be applied to any type of combustion engine, including for example Stirling and steam engines, and, where appropriate, to any type of compressor or pump. The features relating to heat exchangers may be embodied in any type of engine, including conventionally cooled engines. The word "engine" is used in its widest possible meaning and, where appropriate, is meant to include pump and/or compressor. The disclosure principally relates to pistons reciprocating in cylinders to define fluid working chambers. Generally, the piston has been described as powered by the expansion of fluid to drive some device or mechanism. Wherever appropriate, the piston may equally be driven by some device or mechanism to compress or pump a fluid. The chambers are often referred to as combustion chambers. Wherever the construction disclosed may be applicable to pumps and/or compressors, then the chambers described as for combustion may also be for compression and/or pumping chambers. In the embodiments described by way of example, components have variously been described as bolted together, bonded together, fused together. The different elements and components of the invention may be attached to one another or fastened together by any convenient means, including those referred to in the description of embodiments. Generally in this disclosure, like numbered parts have similar characteristics and/or functions. All the diagrams are for purposes of illustrating the features of the invention and are schematic. The components are shown at no particular scale relative to one another.

In the following text and recital of claims, "filamentary material", where disposed in a housing or container of some kind, is defined as portions of interconnected or abutting or closely spaced material which allow the passage of fluid therethrough and induce turbulence and mixing by changing the directions of travel of portions of fluid relative to each other. By interconnected or abutting or closely spaced is meant not only integral or continuous, but also intermittent, intermeshing or inter-fitting, while not necessarily touching. The above definition is applied both to material within a housing or container as a whole, and also to portions of that material in any fluid processing volume, or portions of such volume. By "ceramic" is meant baked, fired or pressed non-metallic material that is generally mineral, ie ceramic in the widest sense, encompassing materials such as glass, glass ceramic, shrunken or recrystallized glass or ceramic, etc., and refers to the base or matrix material, irrespective of whether other materials are present as additives or reinforcement. The term "wicks" is used here to denote any matter permitting the passage of fluid by any means, including porous and permeable materials, as well as materials which passively transmit fluid by capillary action or other means, such as true wicks. By "elastomeric", "compressible", "elastic", "variable volume", "flexible", "bending" and all other expressions indicating dimensional change is meant a measurable change that is designed for, not a relatively small dimensional change caused by temperature variation or the imposition of loads on solid or structural bodies. By "electric motor/generator" is meant an electrical device which can be either a motor or a generator, or a device which can function as both at different times. By "ring valve" is meant a movable ring-shaped element normally approximately flush with a surrounding or core surface. When the valve is actuated, it projects from any plane of the surrounding core surface, causing fluid or other material to flow past both the outer and the inner circumferences of the ring. By "stoichiometric", where used in reference to air/fuel mixtures in combustion engines, is meant that quantity of fuel whose carbon will combine with all the oxygen in the charge under ideal conditions, leaving neither carbon nor oxygen in the exhaust. Where reference is made to an item being "mounted about" a second item, this is intended to mean that the fist item can be physically associated with the second item in any way, including mounted in, mounted on, attached to, and connected to the second item, including by some intermediary means, such a strut. The word "vehicle" in meant to include every kind of surface vehicle, including motor cycles, three-wheelers, passenger cars, trucks of every size, buses, mining and industrial vehicles of every kind, railed vehicles, tracked vehicles such as tanks, and un-manned vehicles of any kind. In the following text, abbreviations are used, including: rpm and rps for "revolutions per minute" and "revolutions per second" respectively, BDC/TDC for "bottom dead center/top dead center", IC for "internal combustion".

BRIEF DESCRIPTION OF THE DRAWINGS

Figure 1:
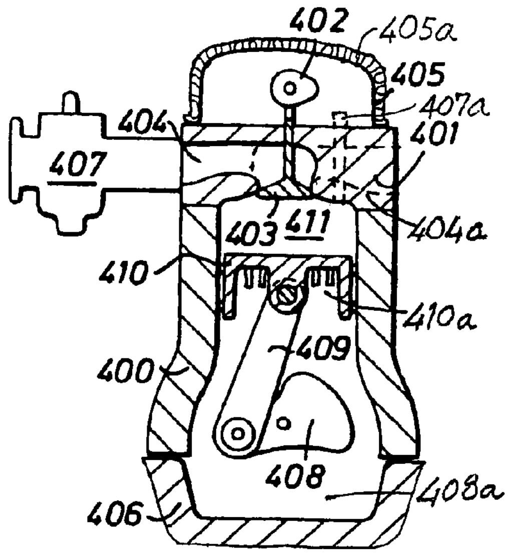
Figure 2:
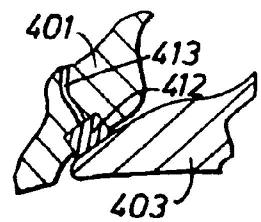
Figure 3:
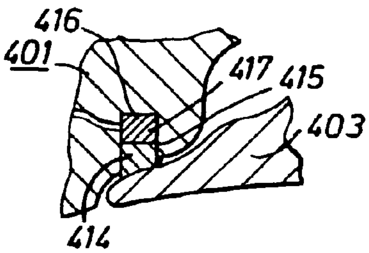
Figure 13:
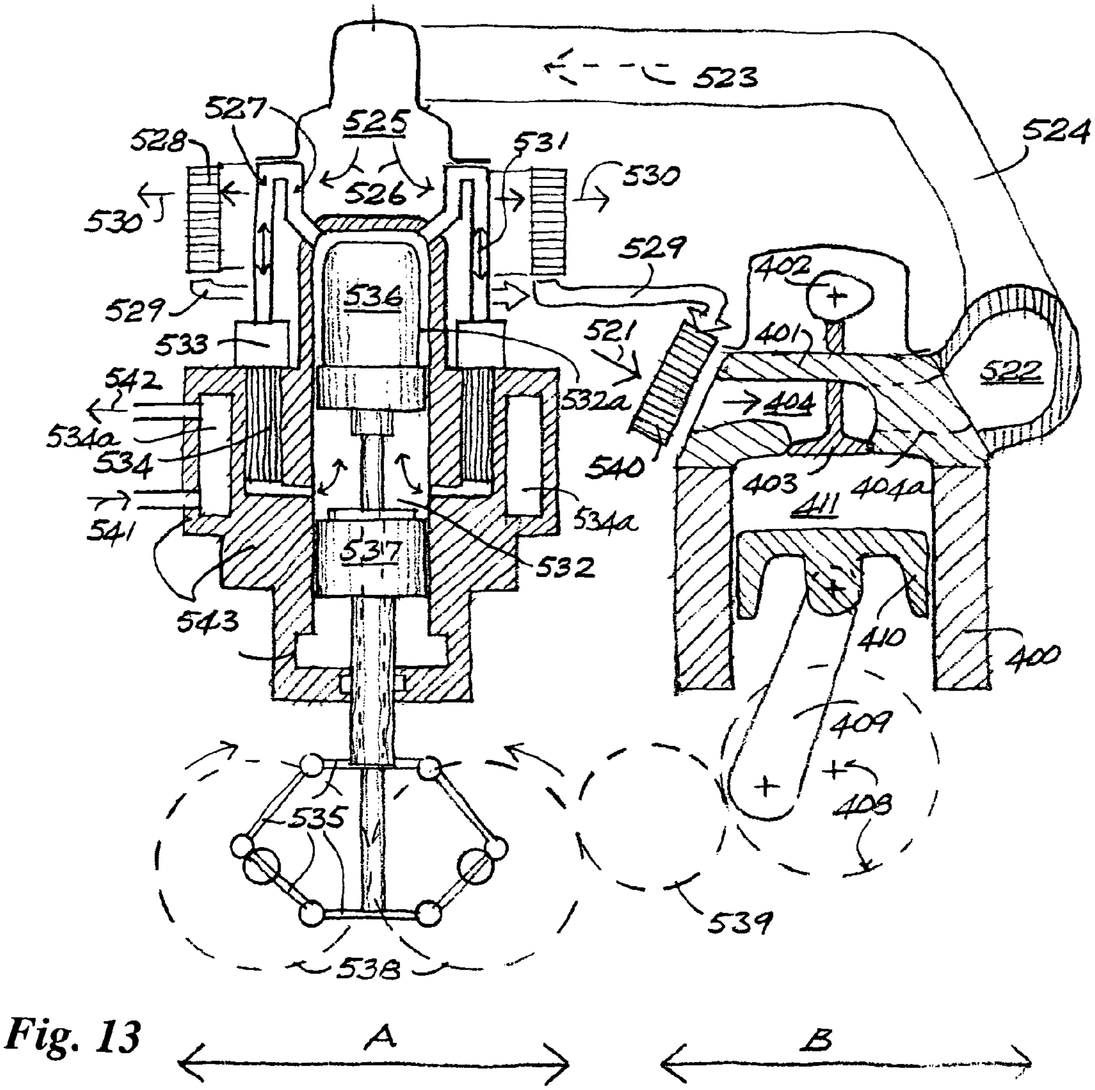
Figure 14:
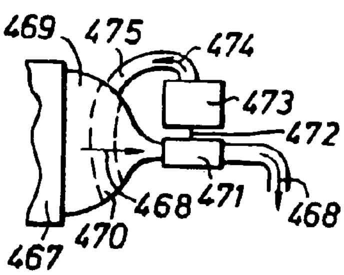
Figure 15:
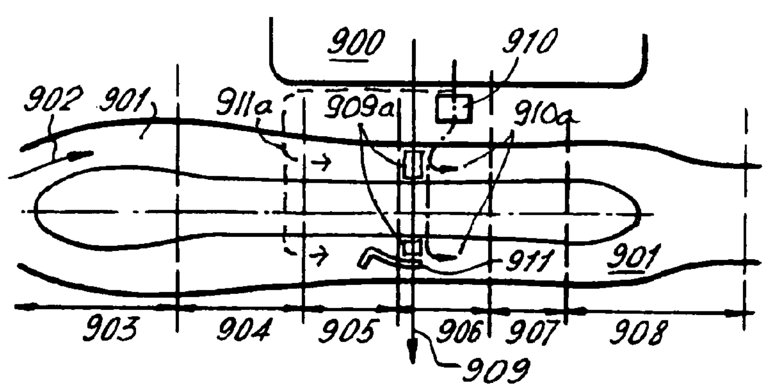
Figure 16:
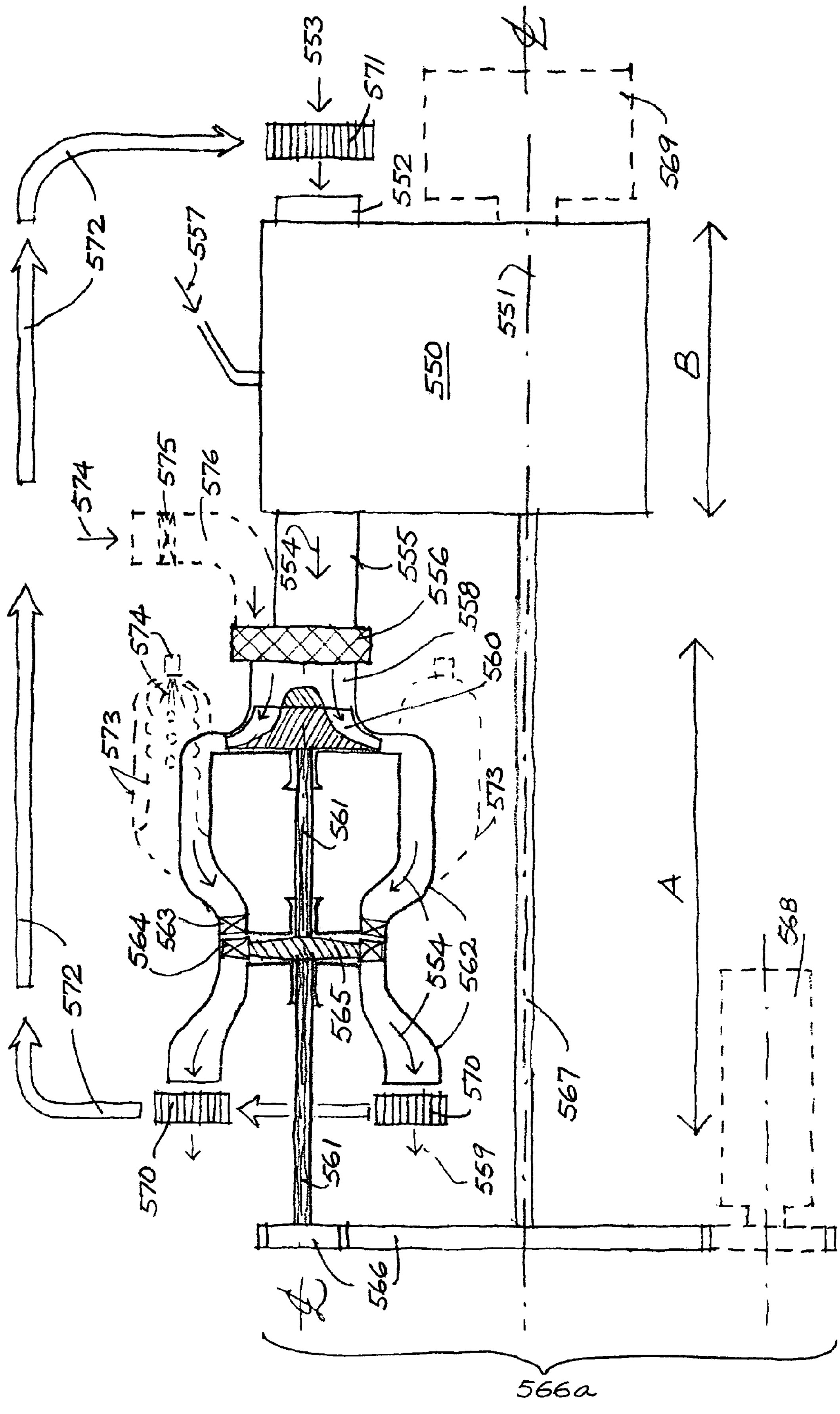
Figure 21:
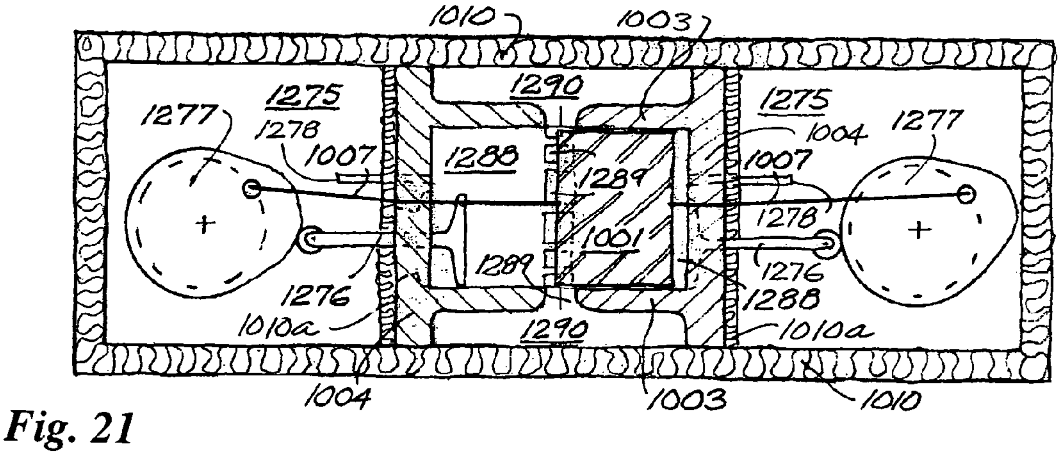
Figure 22:
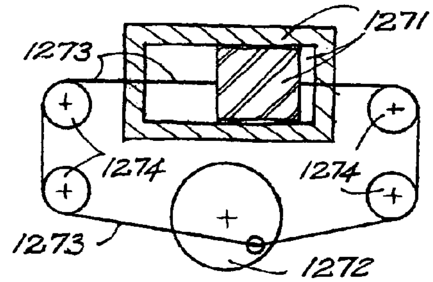
Figure 23:
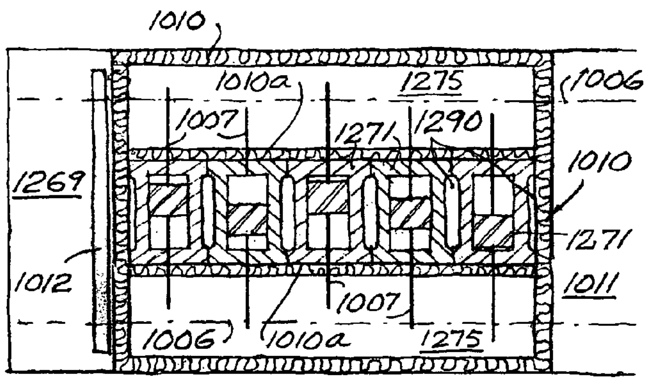
Figure 24:
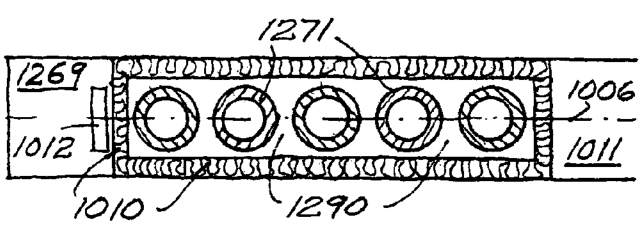
Figure 31:
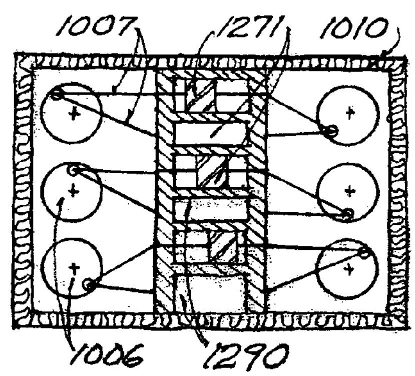
Figure 32:
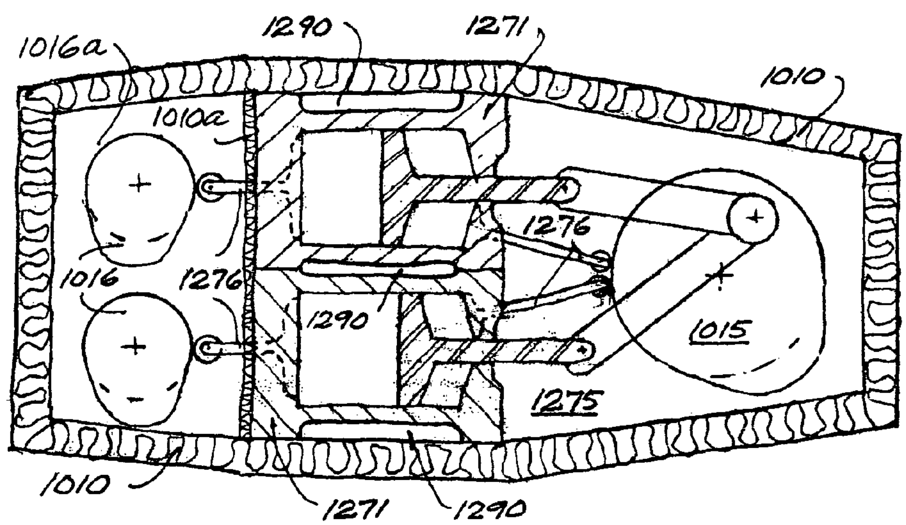
Figure 35:
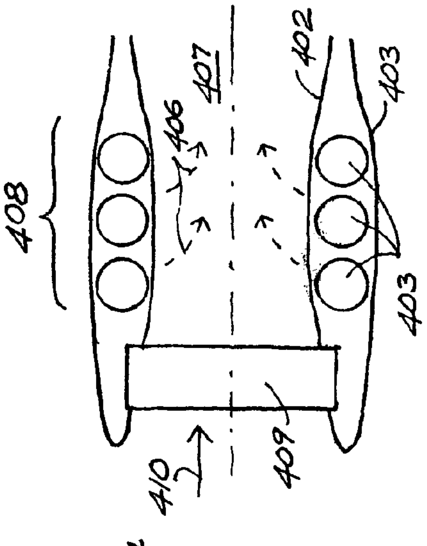
Figure 34:
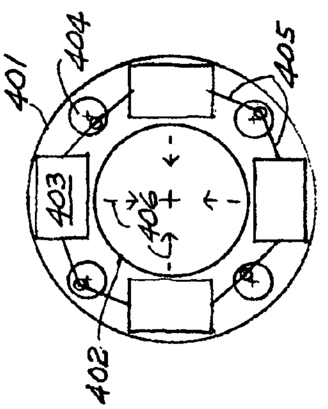
Figure 33B:
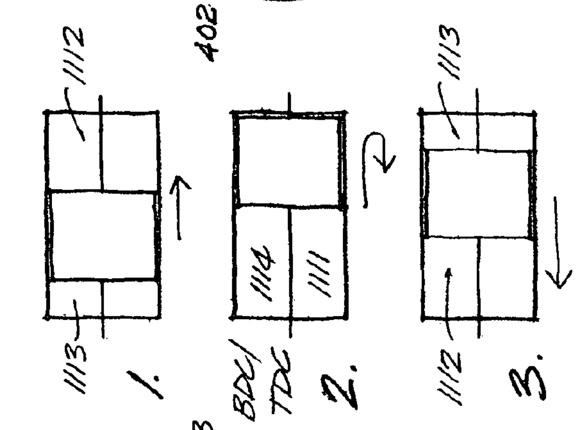
Figure 33A:
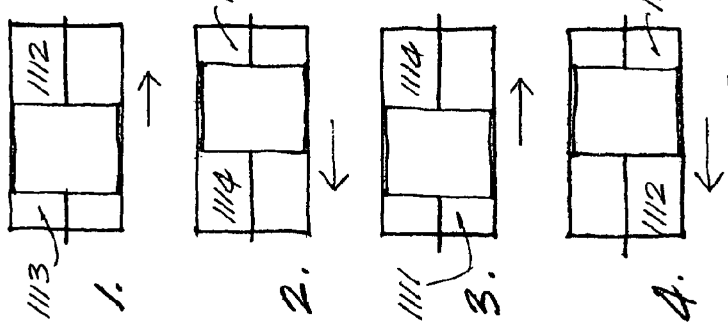
Figure 36:
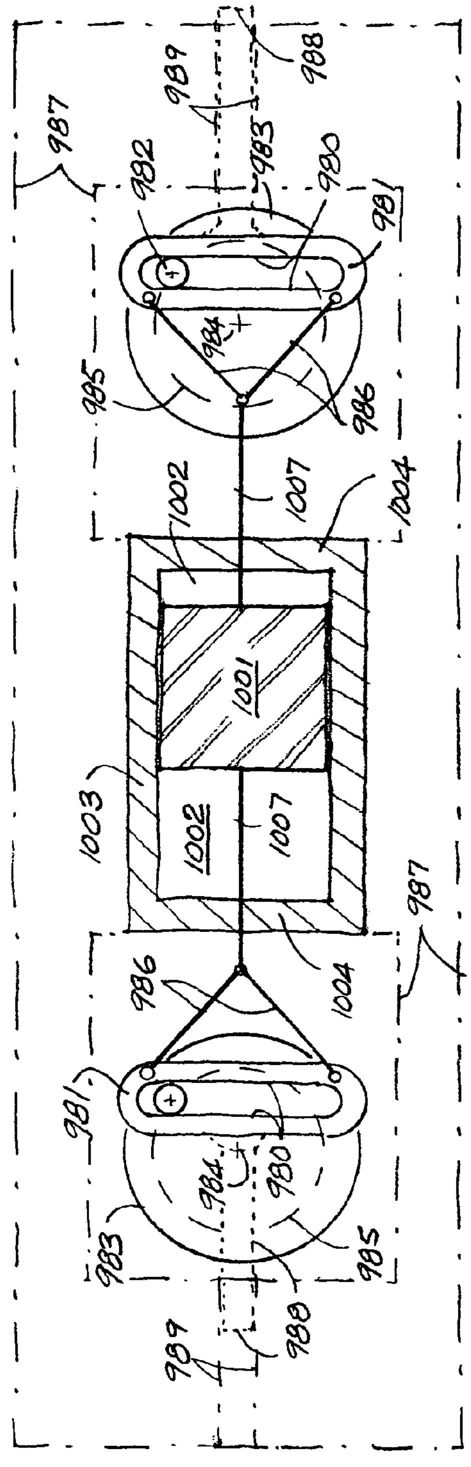
Figure 37:
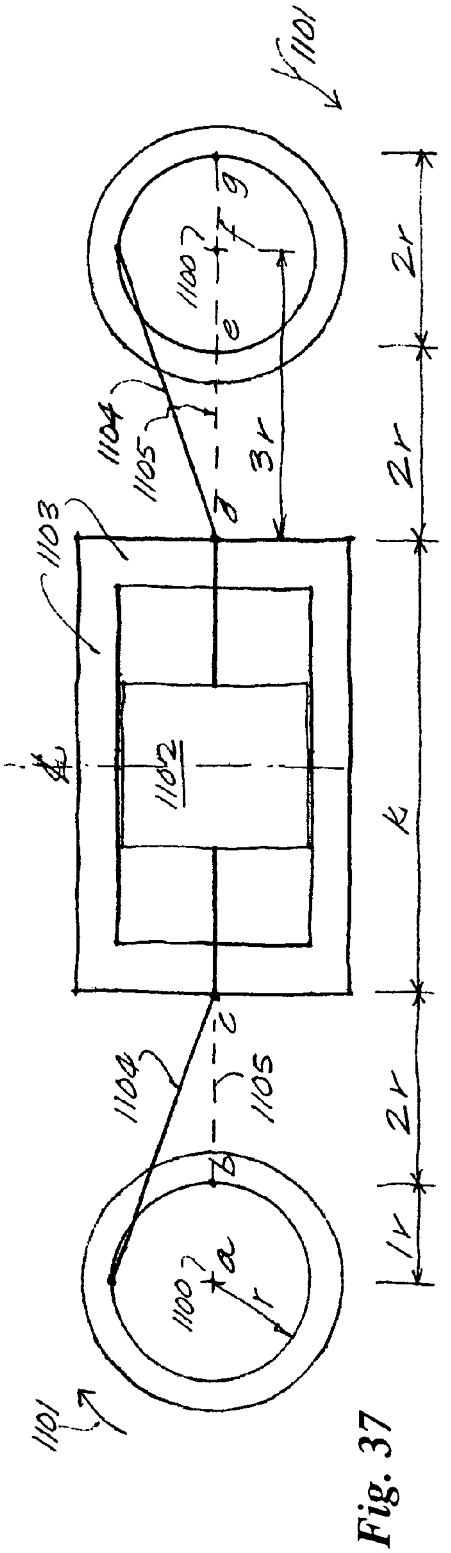
Figure 38:
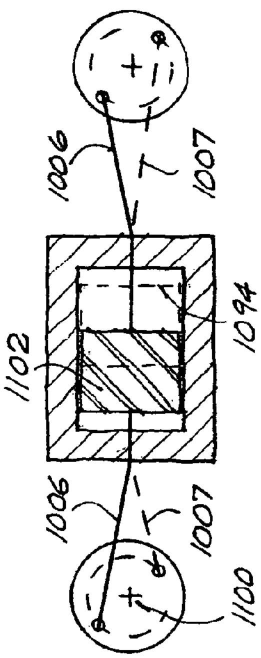
Figure 39:
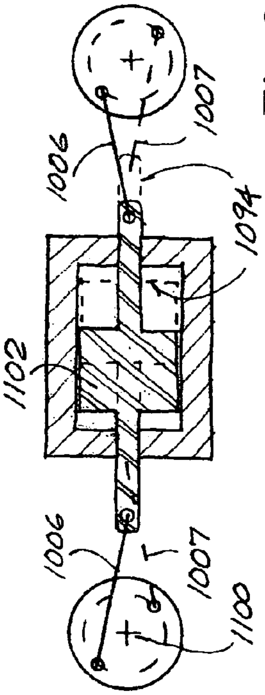
Figure 40:
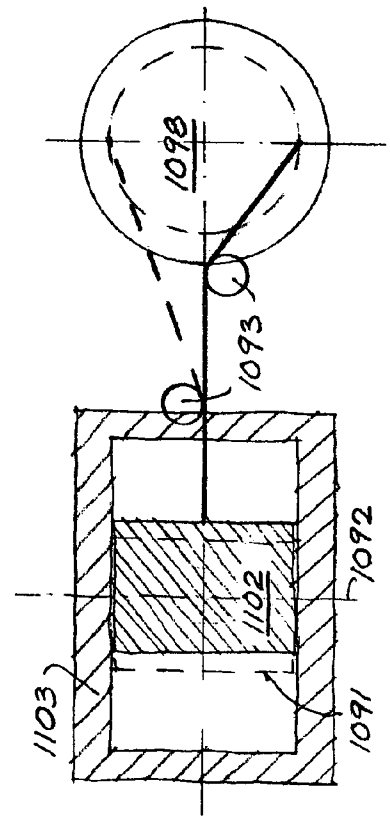

| | |
|---|---|
| FIGS. 1 to 3 | show schematically a configuration and details of an un-cooled engine. |
| FIGS. 4 to 9 | show arrangements to enable construction of un cooled engines. |
| FIG. 10 | shows the deployment of heat exchange means within an exhaust gas reactor. |
| FIG. 11 | illustrates the interconnection of two or more engines. |
| FIG. 12 | illustrates schematically a piston and two working chambers operating in optionally different modes. |
| FIG. 13 | illustrates a composite engine including a Stirling cycle. |
| FIG. 14 | illustrates schematically a heat exchanger associated with a reactor and a turbine engine assembly. |
| FIG. 15 | shows schematically heat exchangers associated with a turbine assembly. |
| FIG. 16 | illustrates a composite engine including a turbine cycle. |
| FIGS. 17 to 19 | show schematic layouts of compound engines and ancillary devices. |
| FIGS. 20 to 22 | show schematic layouts of engines wherein the link between piston and crankshaft is principally loaded in tension. |
| FIGS. 23 to 32 | show schematic layouts of multi-cylinder tensile crank link engines. |
| FIGS. 33A and 33B | illustrate two- and four-stroke operation. |
| FIGS. 34 and 35 | show schematically multiple crankshaft tensile crank link "ring" engines. |
| FIG. 36 | shows a piston assembly linked to two scotch yokes. |
| FIGS. 37 to 39 | illustrate variation of lengths of crank links principally loaded in tension. |
| FIG. 40 | shows asymmetrical pivots for a tensile crank link. |

-continued

Figure 41:
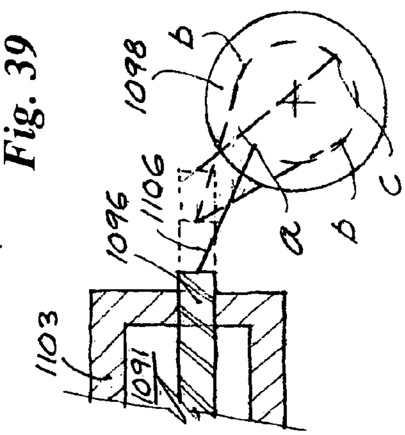
Figure 42:
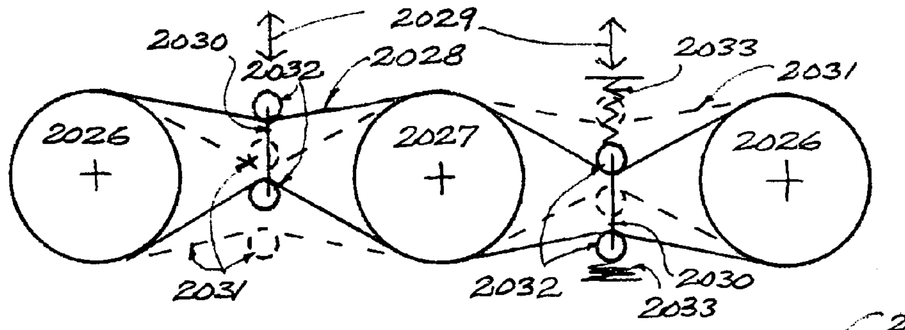
Figure 43:
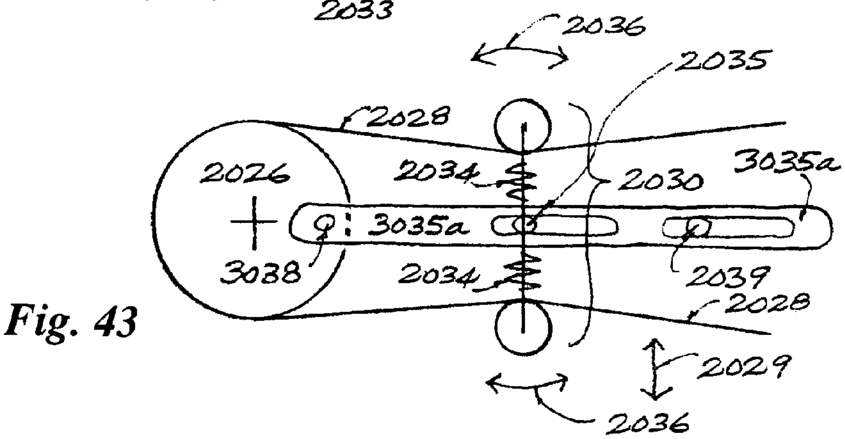
Figure 44:
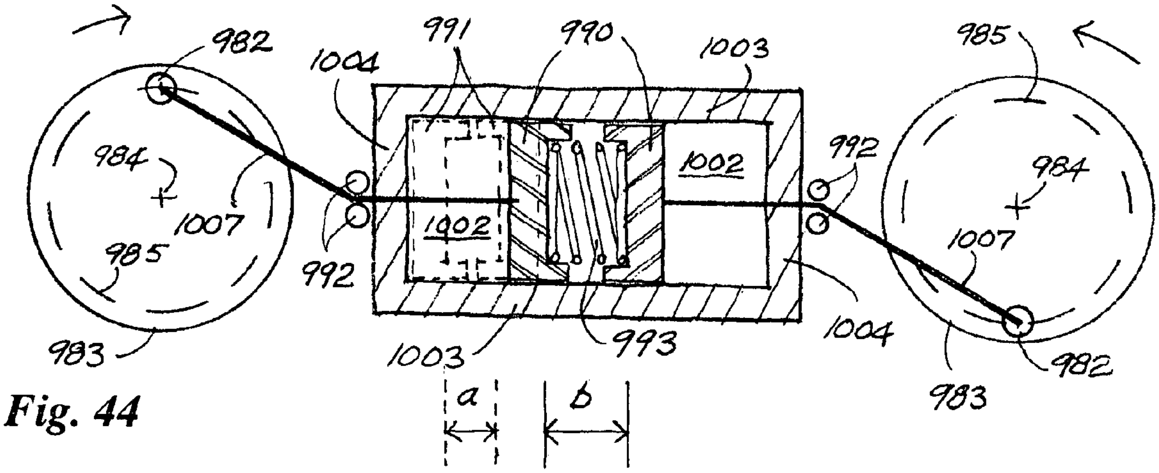
Figure 45:
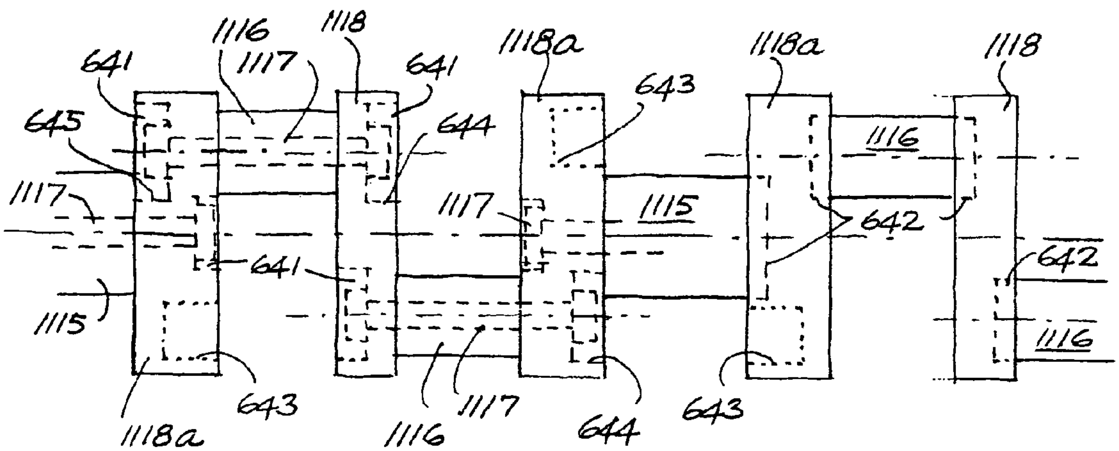
Figure 49:
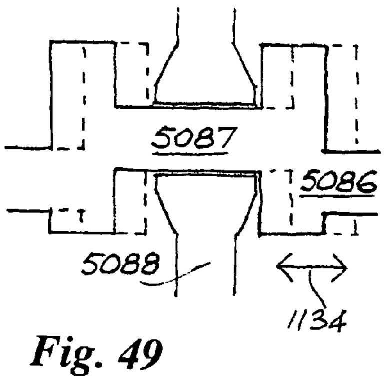
Figure 50:
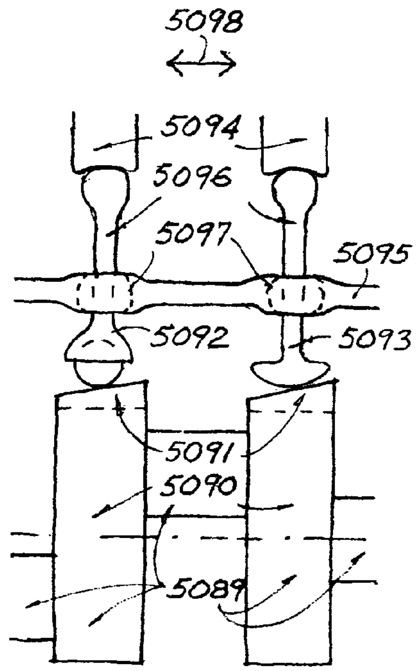
Figure 51:
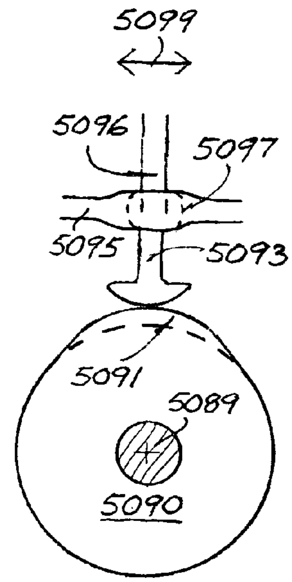
Figure 52:
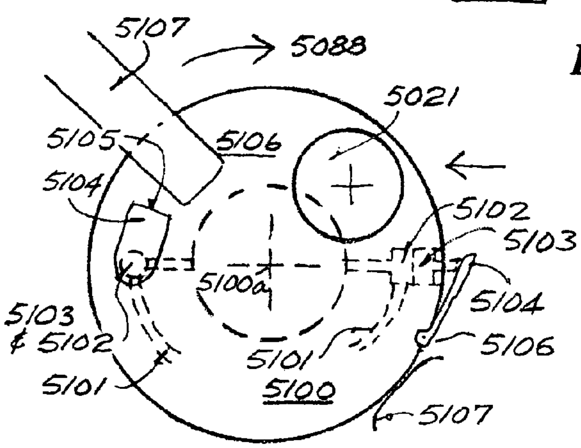
Figure 53:
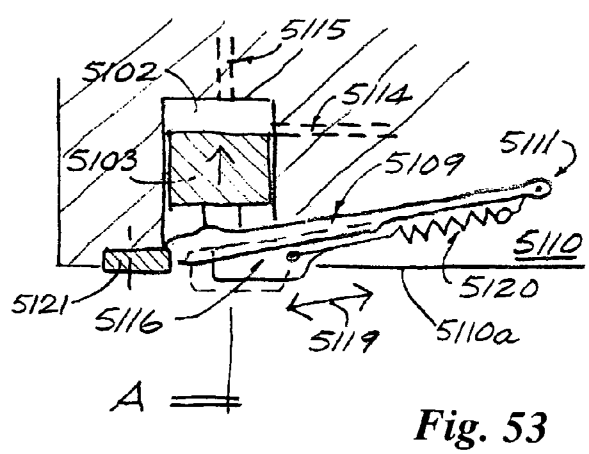
Figure 54:
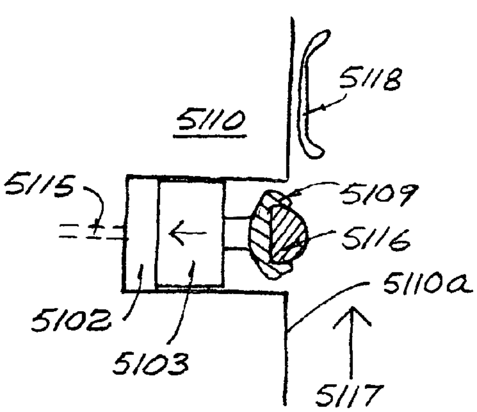
Figure 74:
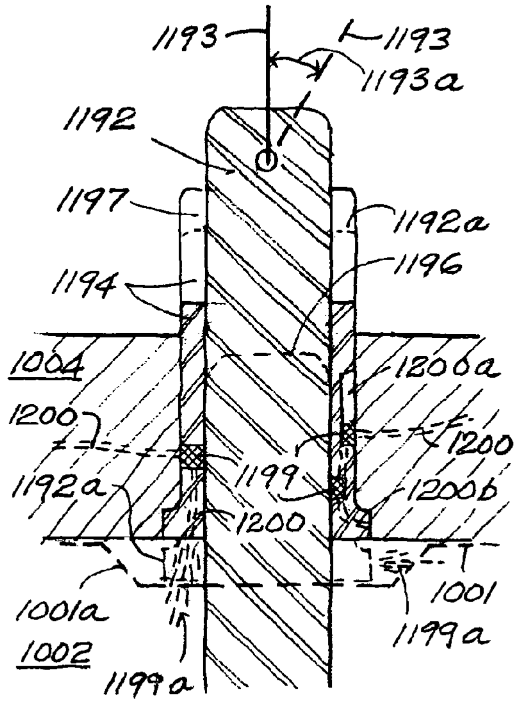
Figure 75:
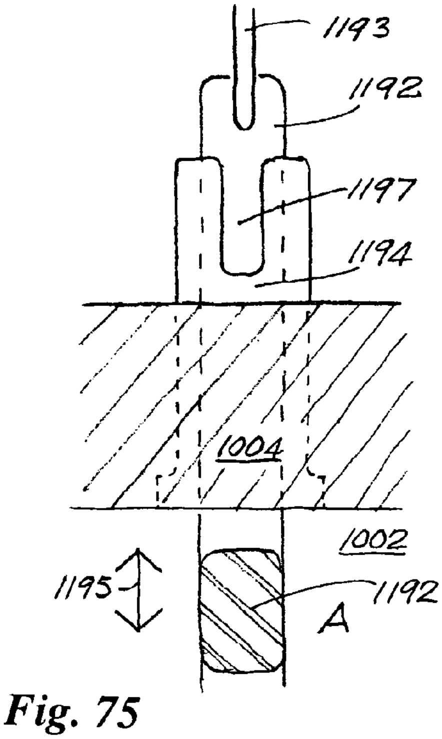
Figure 86:
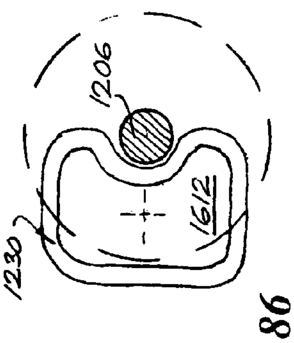
Figure 89:
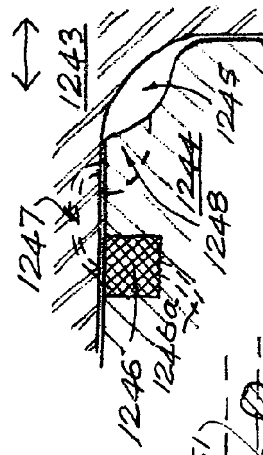
Figure 88:
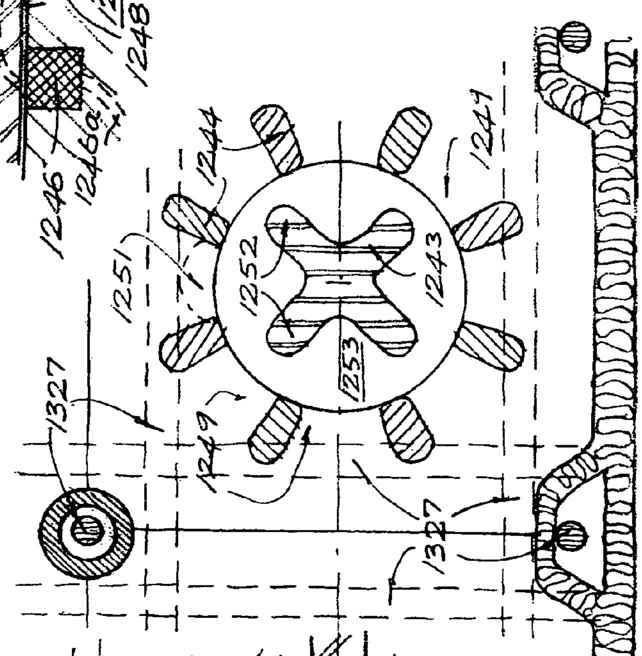
Figure 87:
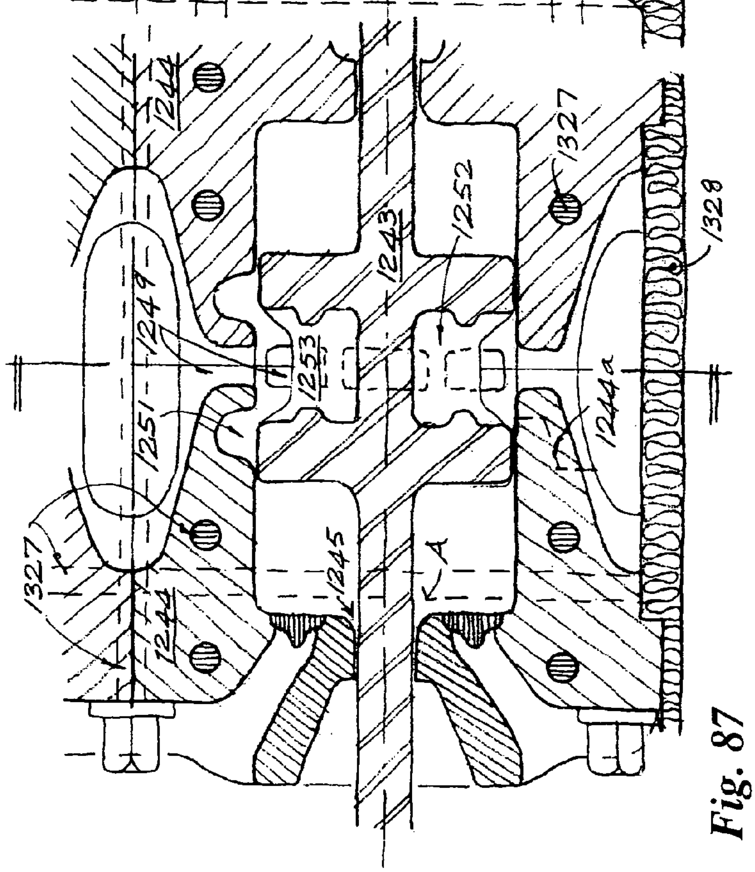
Figure 92:
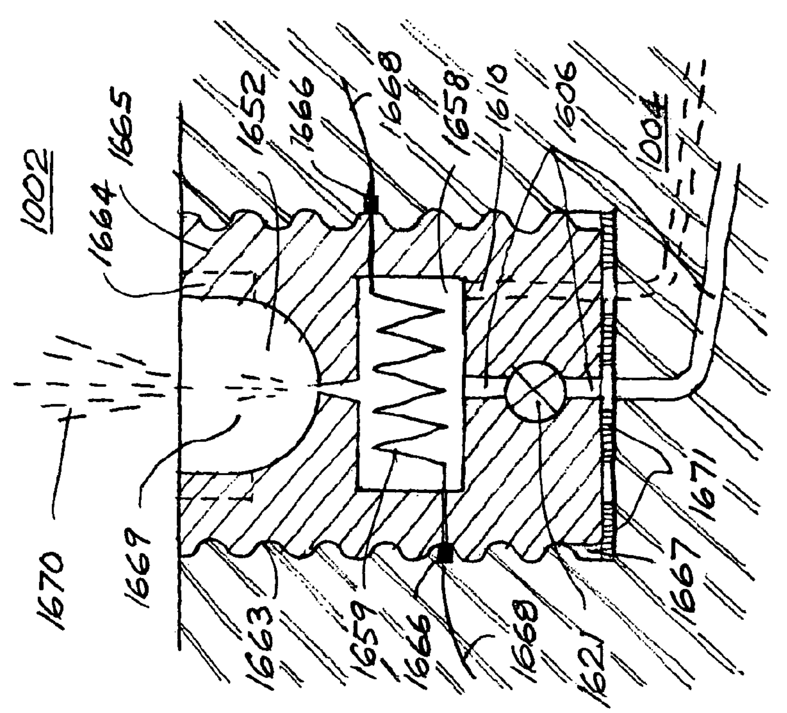
Figure 90:
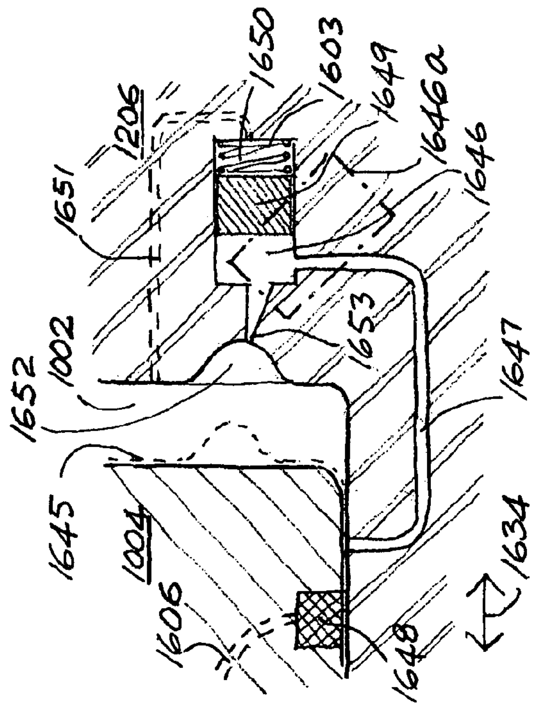
Figure 91:
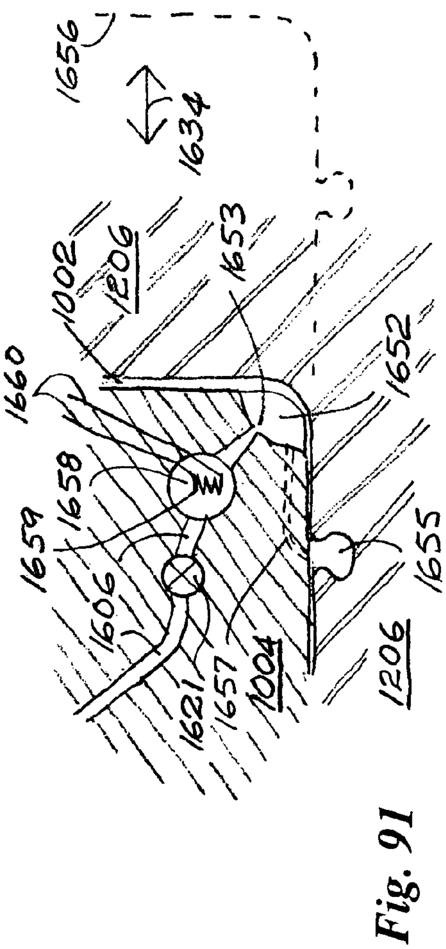
Figure 93:
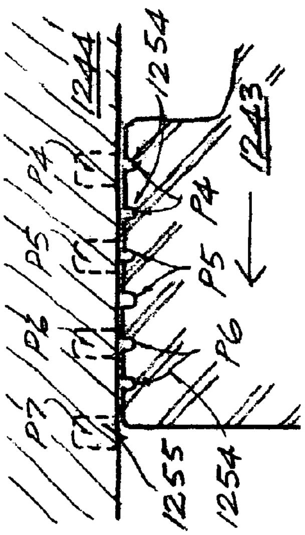
Figure 94:
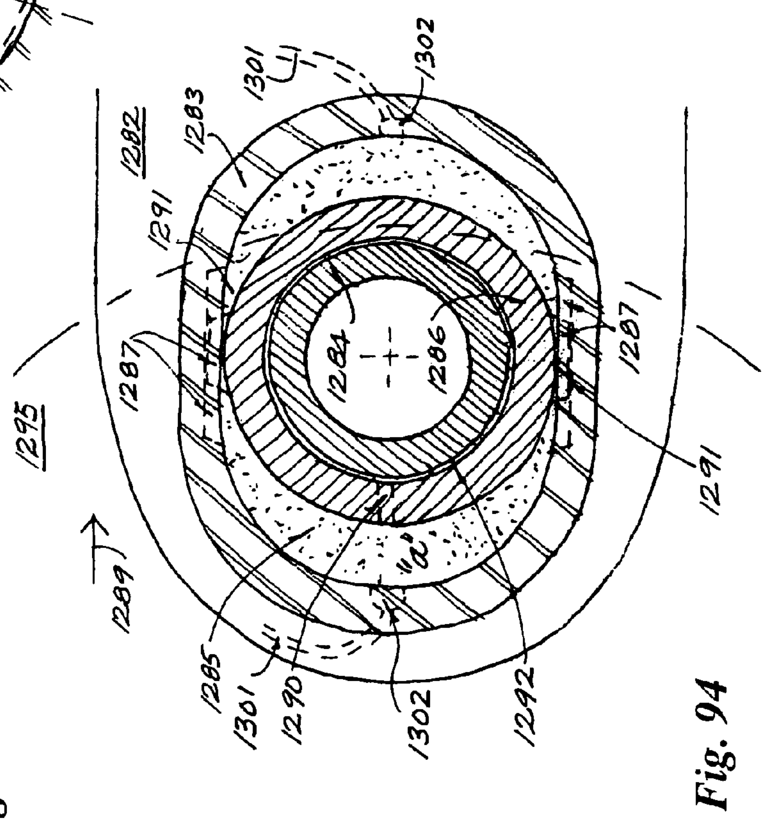
Figure 95:
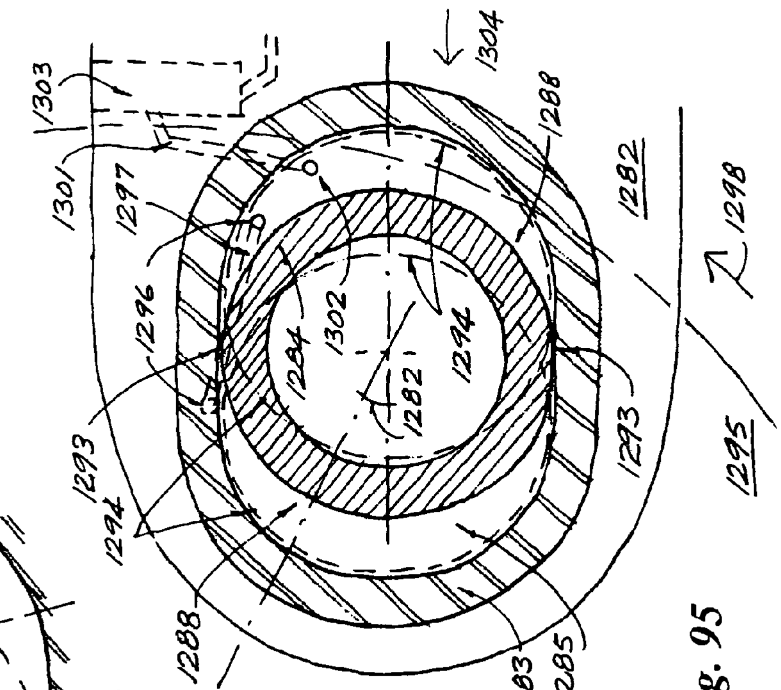
Figure 96:
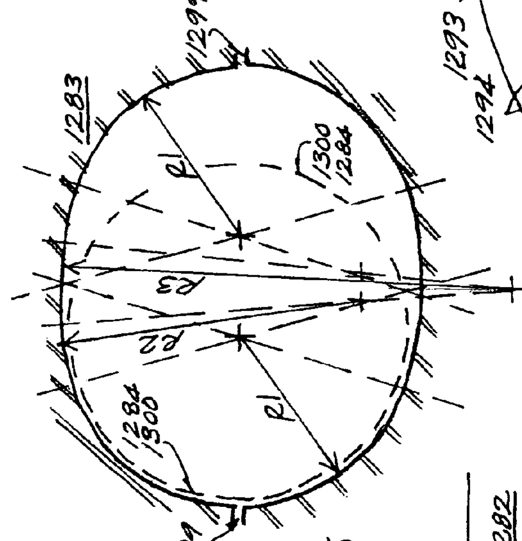
Figure 97:
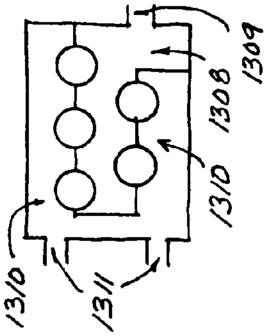
Figure 98:
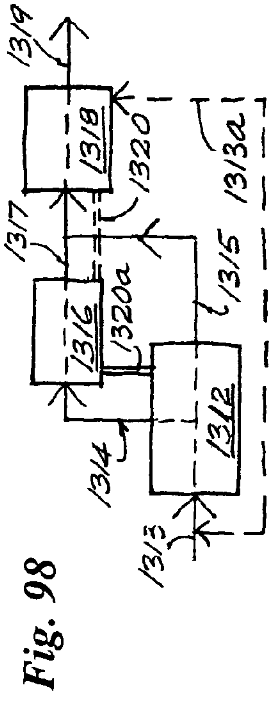
Figure 143:
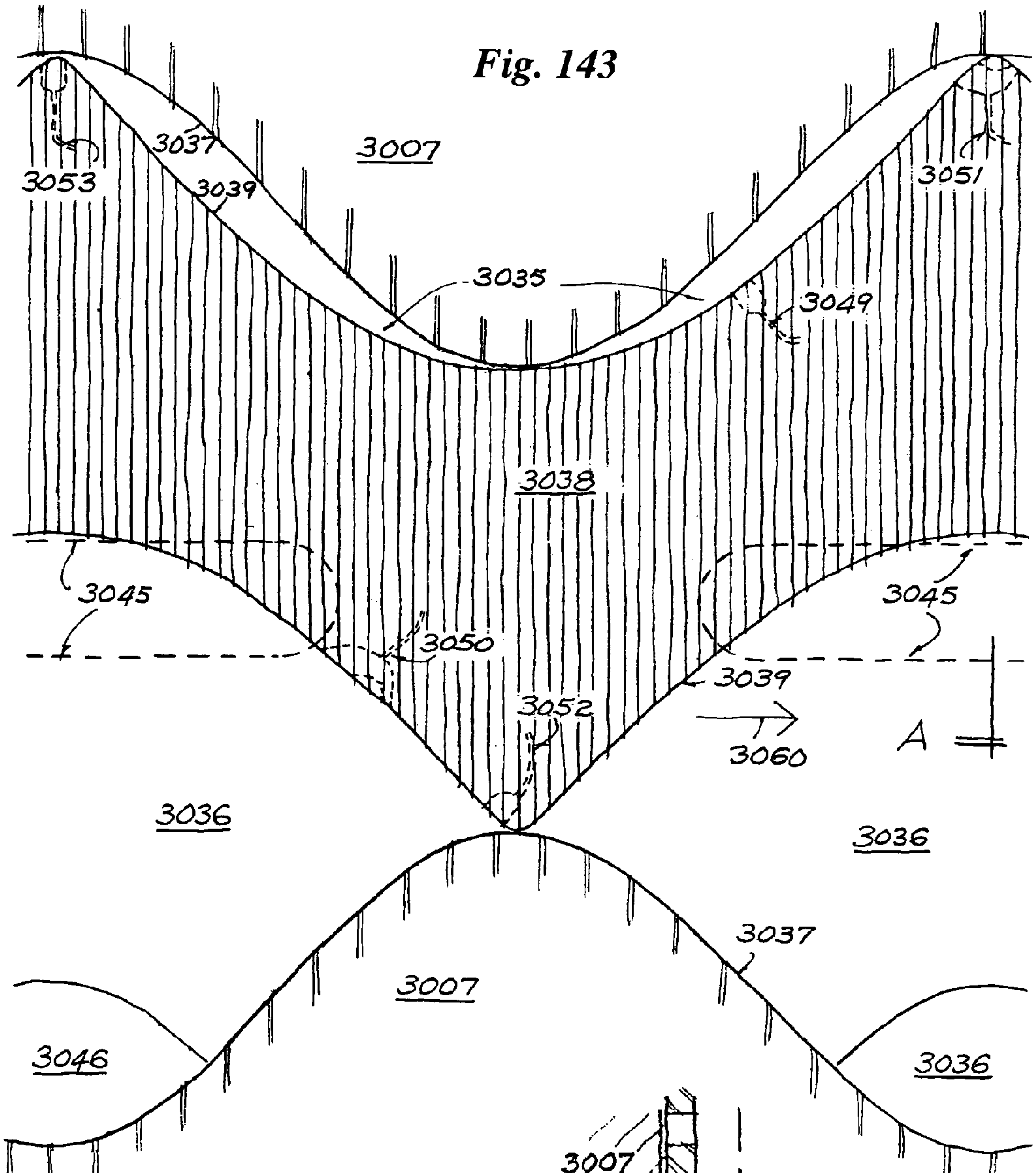
Figure 144:
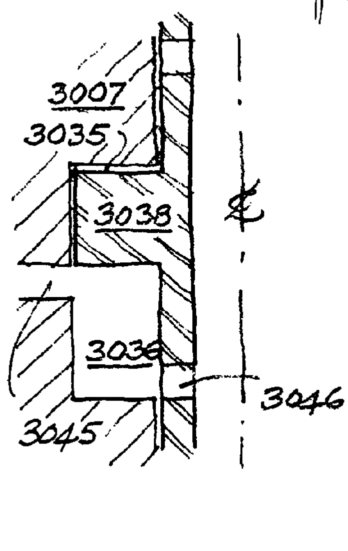
Figure 145:
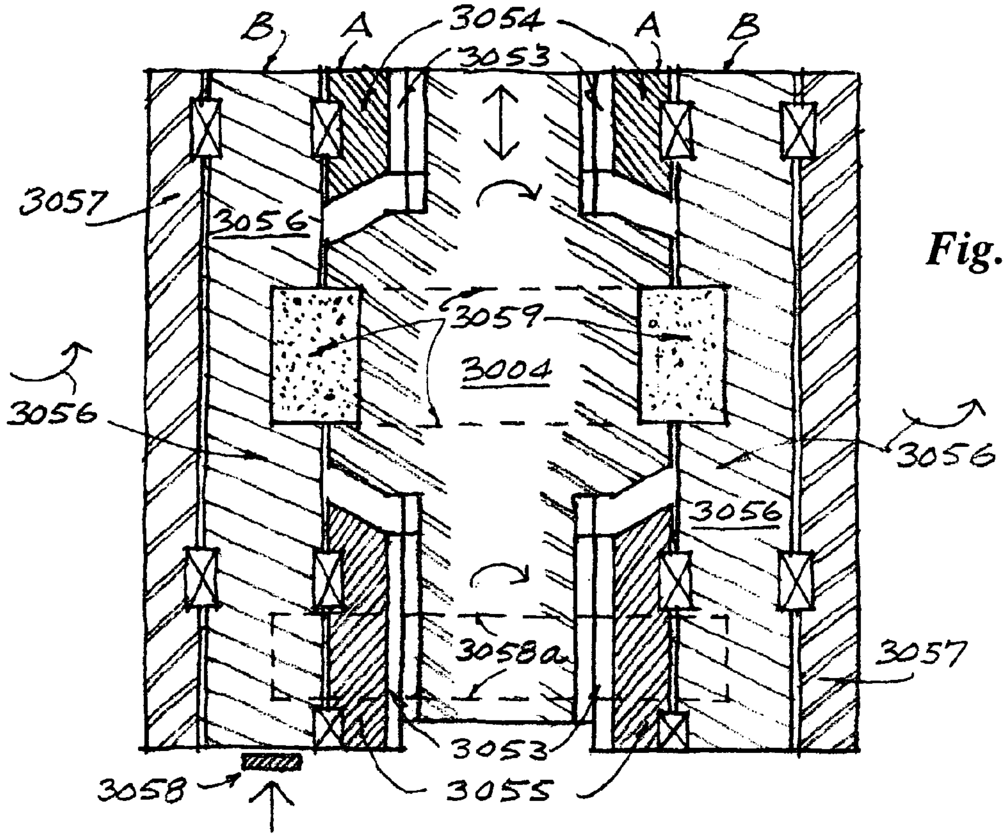
Figure 146:
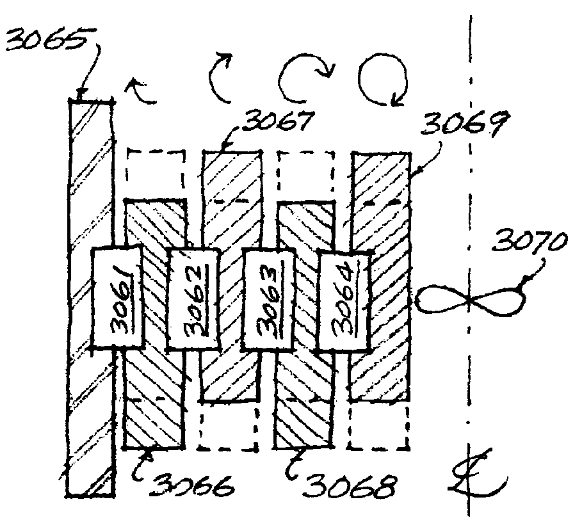
Figure 147:
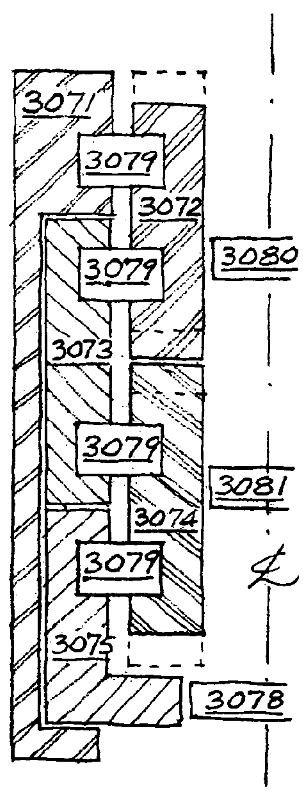
Figure 148:
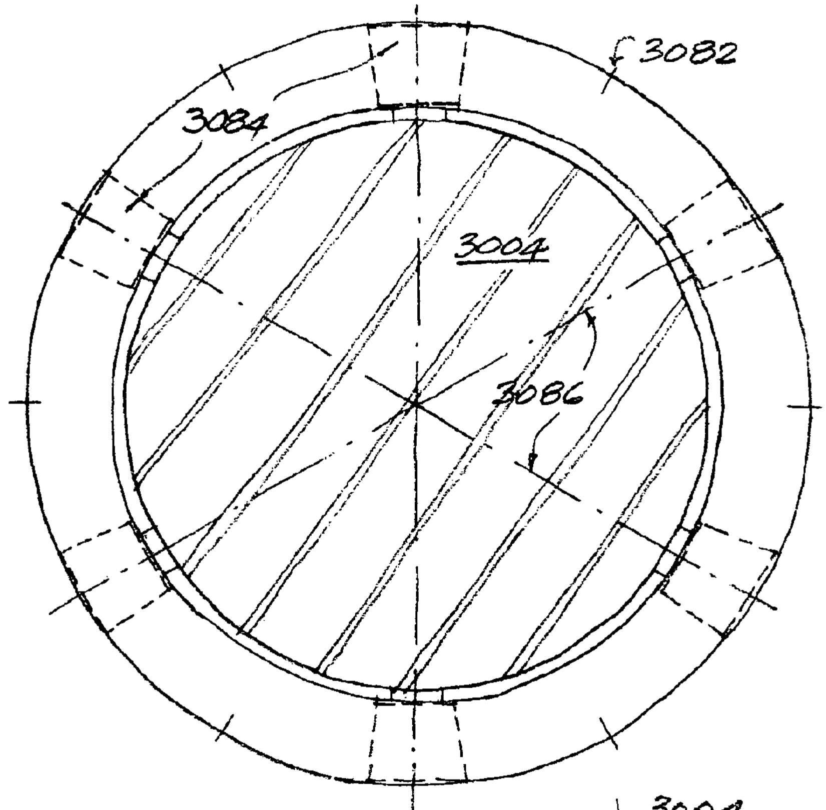
Figure 149:
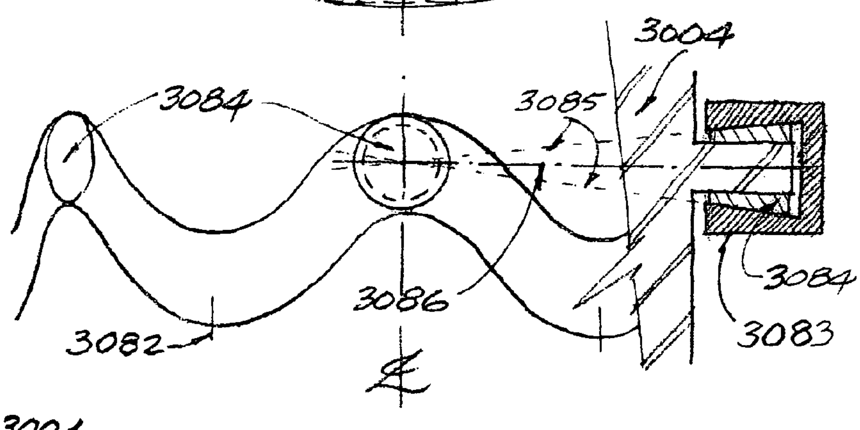
Figure 150:
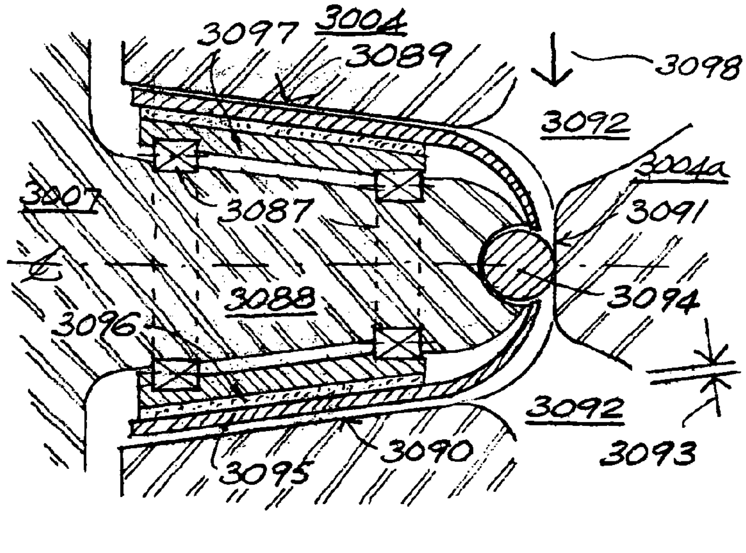
Figure 152:
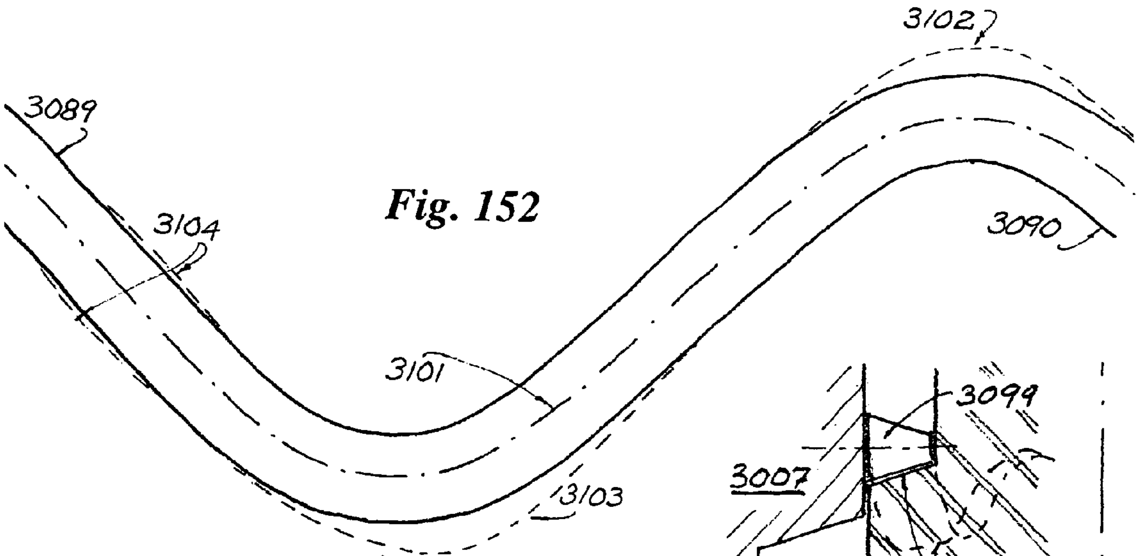
Figure 151:
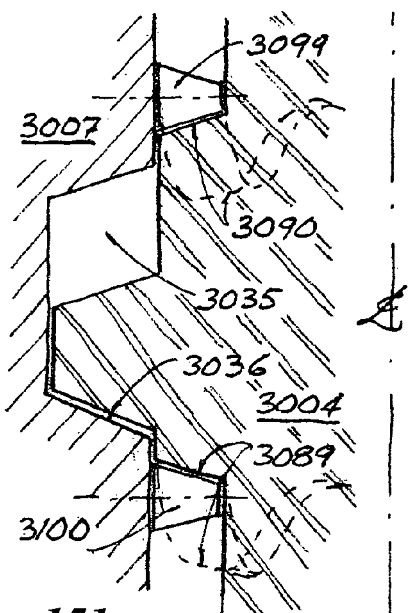
Figure 153:
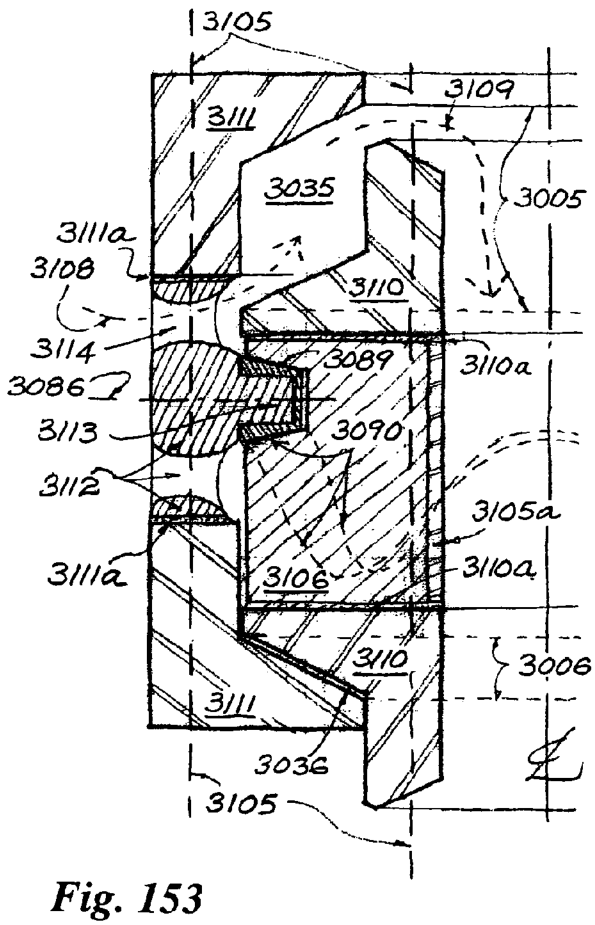
Figure 154:
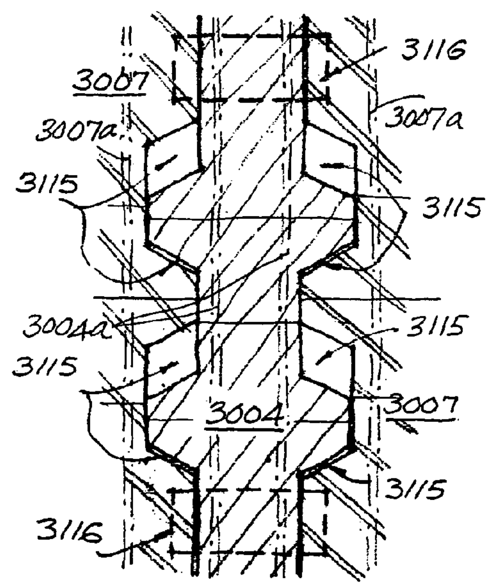
Figure 155:
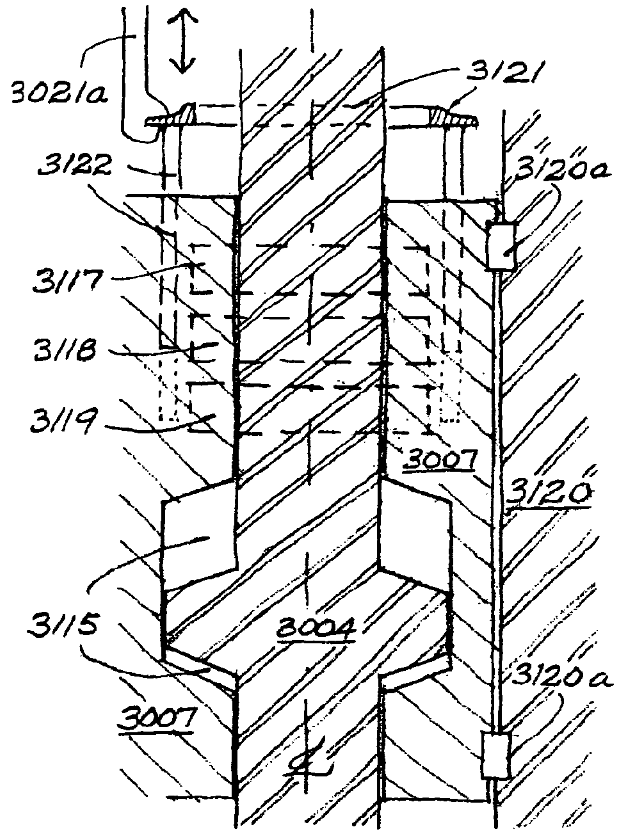
Figure 156:
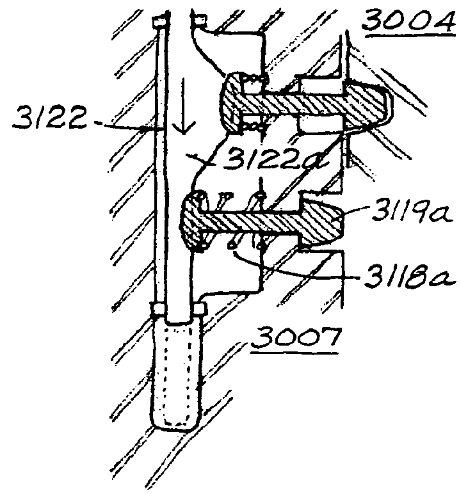
Figure 157:
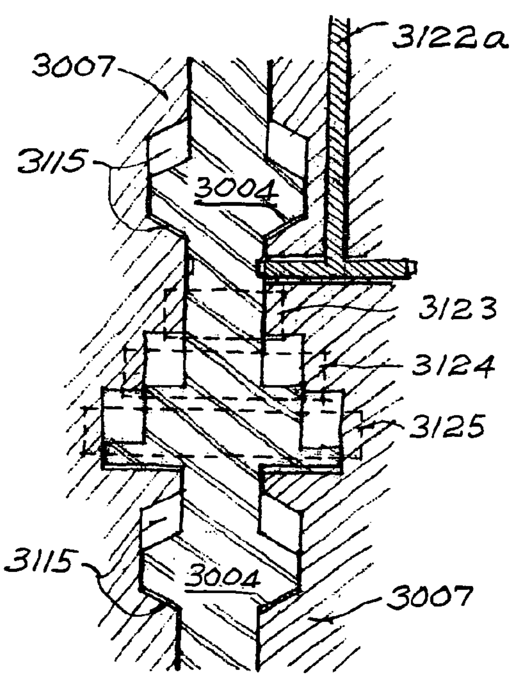
Figure 158:
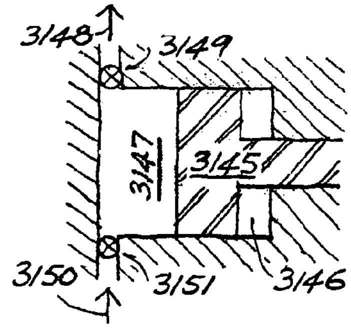
Figure 159:
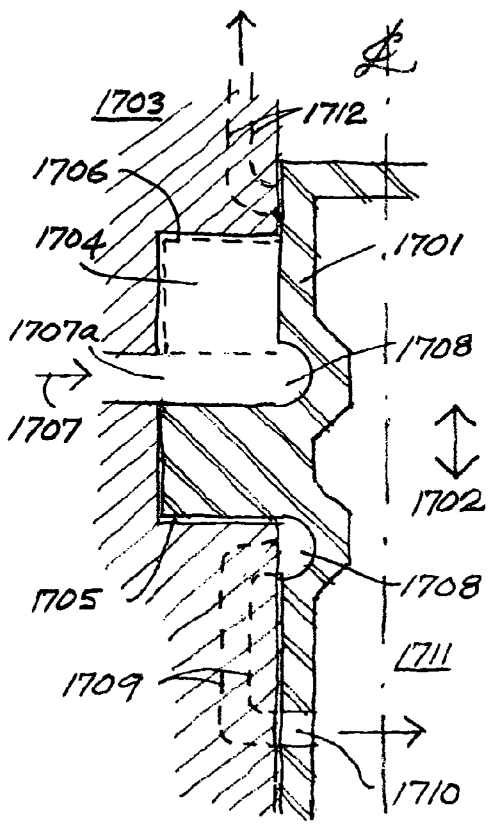
Figure 160:
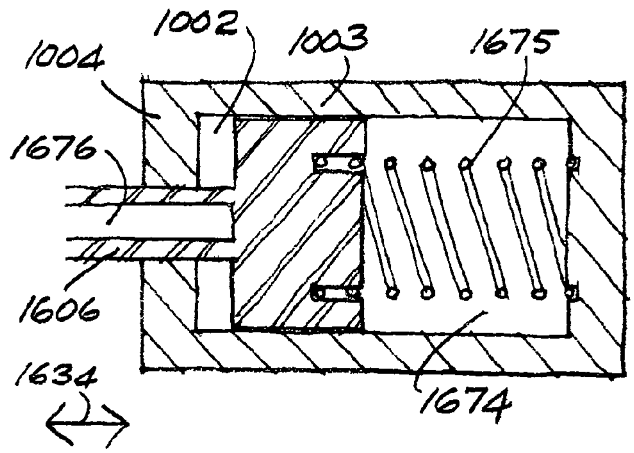
Figure 161:
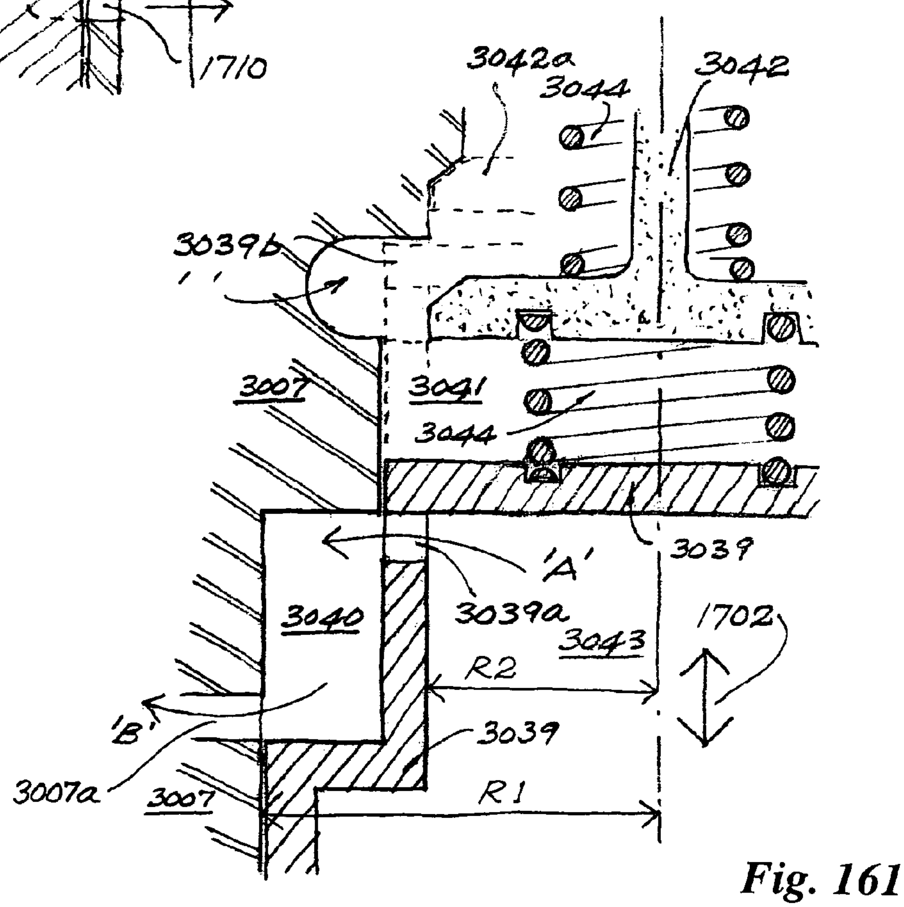
Figure 162:
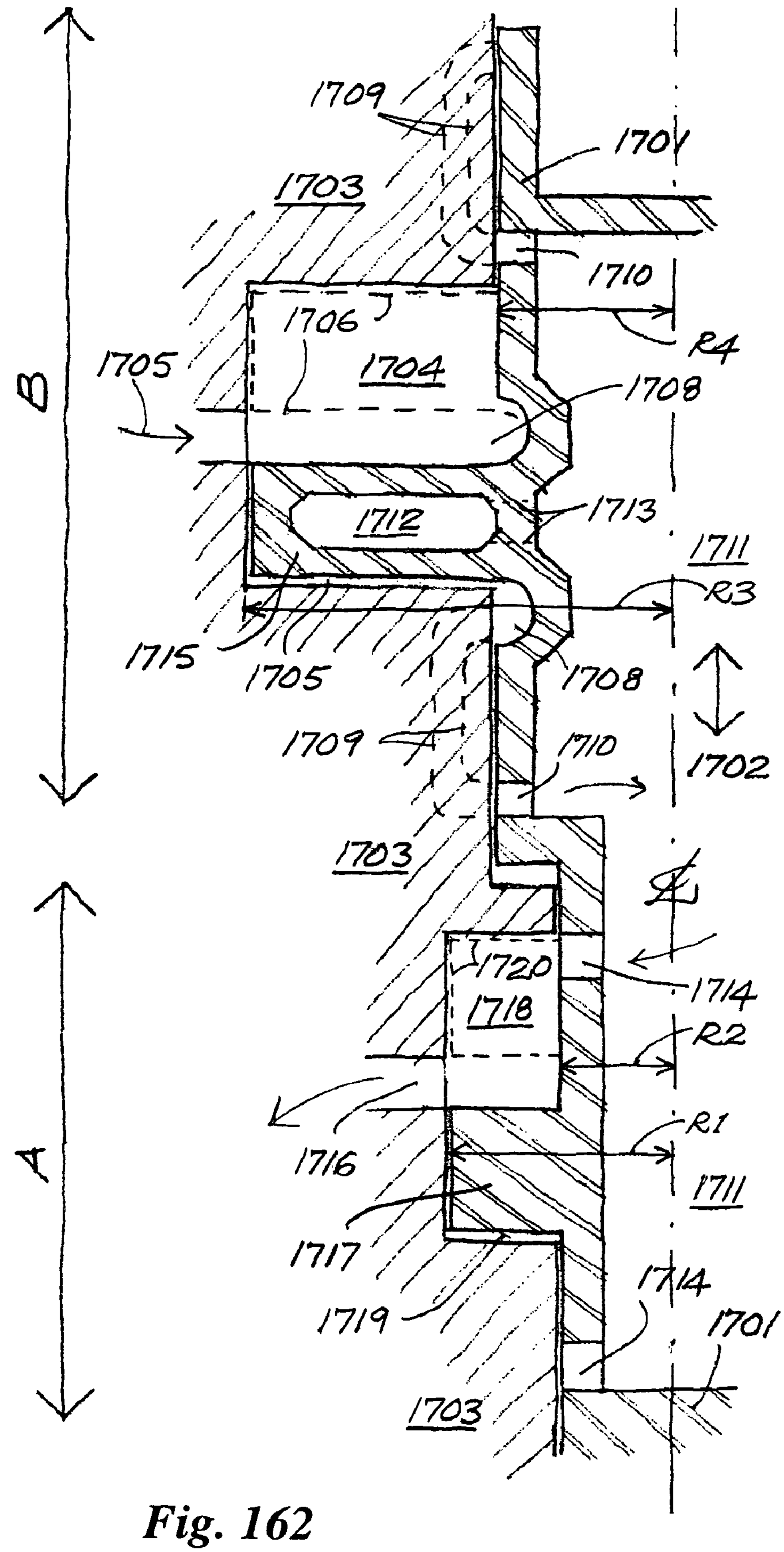
Figure 165:
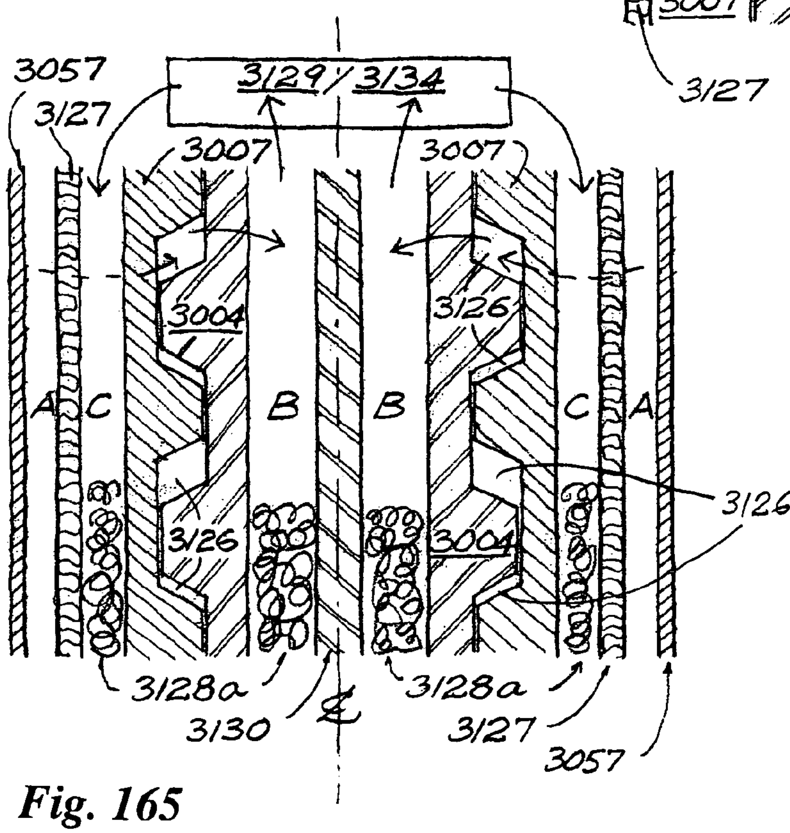
Figure 166:
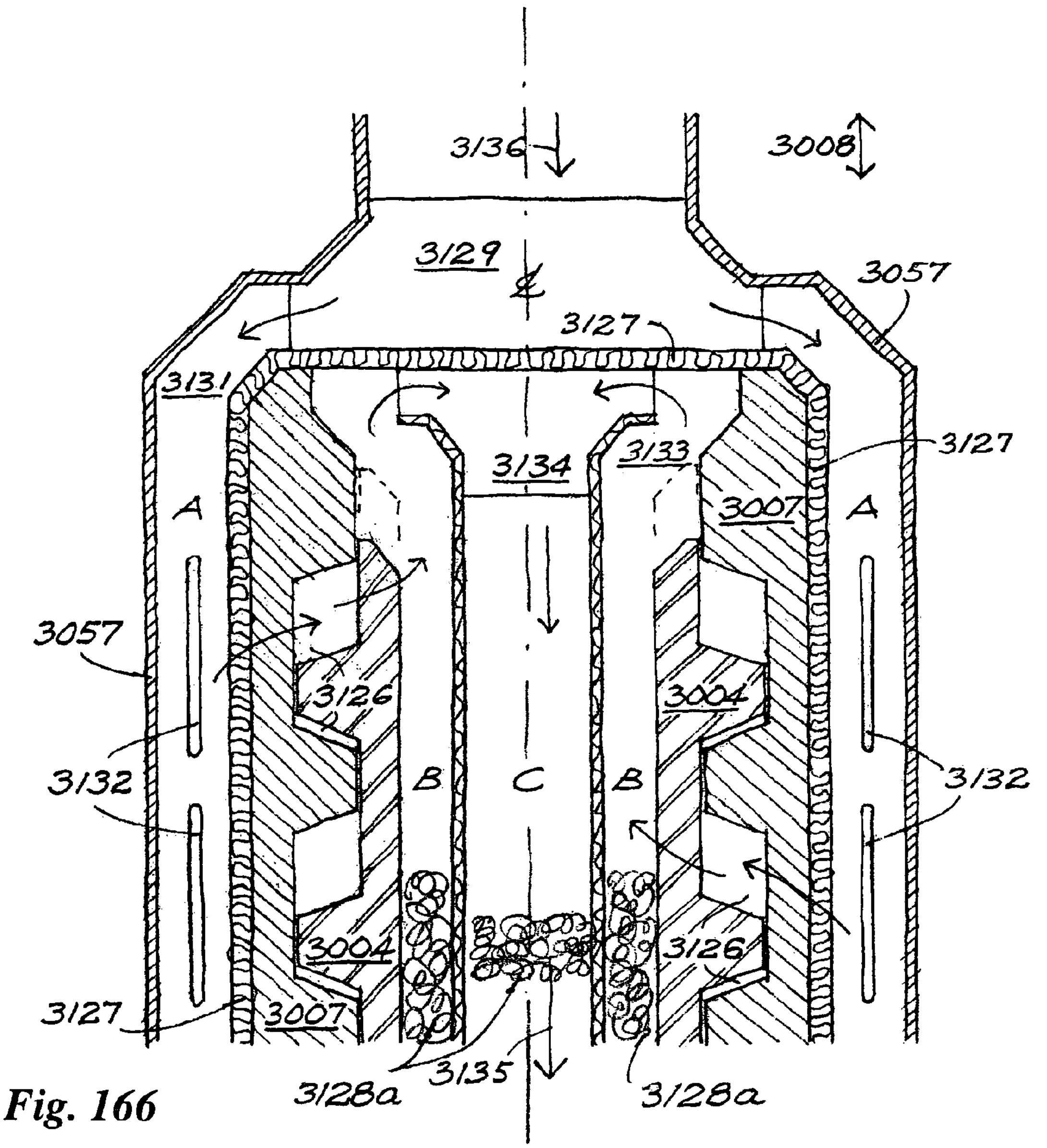
Figure 167:
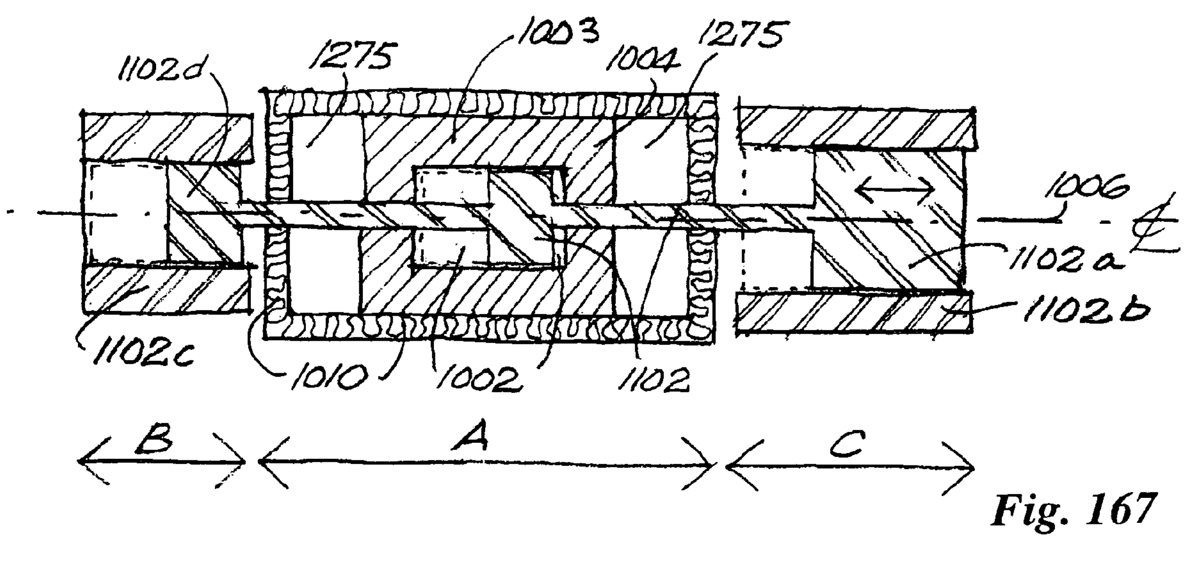
Figure 180:
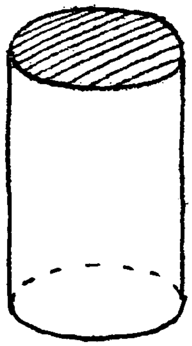
Figure 181:
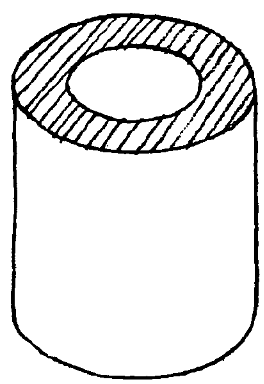
Figure 182:
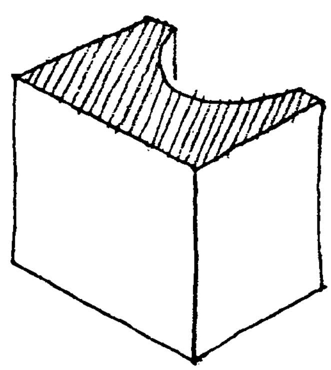
Figure 192:
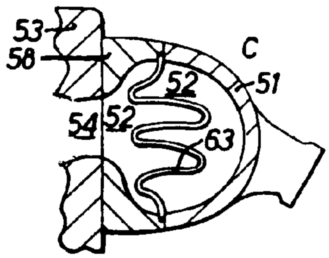
Figure 193:
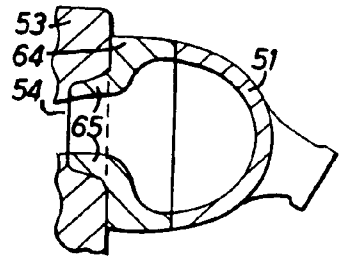
Figure 194:
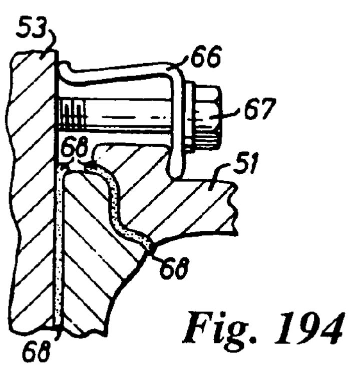
Figure 195:
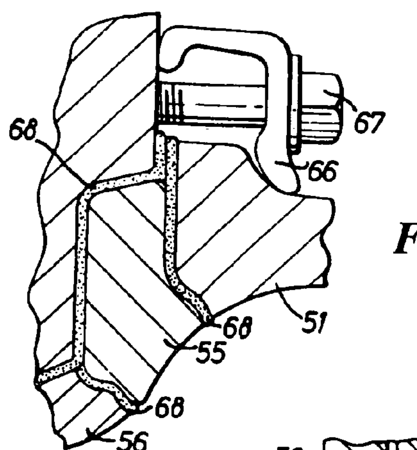
Figure 197:
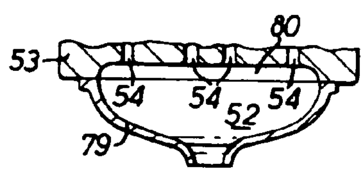
Figure 196:
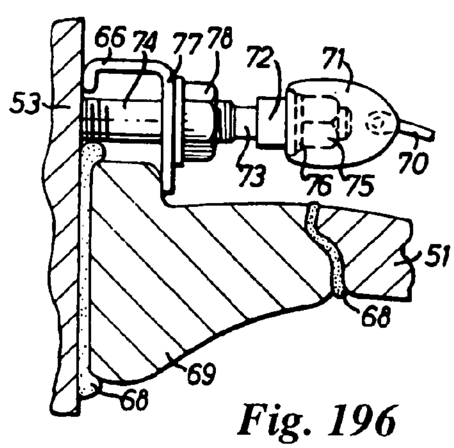
Figure 198:
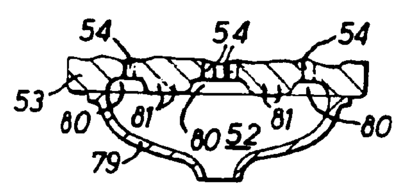

| | |
|---|---|
| FIG. 41 | illustrates an offset crankshaft axis. |
| FIGS. 42 and 43 | show ways of compensating for differential movement of twin crankshafts. |
| FIG. 44 | shows a split piston linked to two crankshafts. |
| FIGS. 45 to 48 | show details of crankshaft construction. |
| FIGS. 49 to 51 | show schematically a variable lift combined crank and cam-shaft. |
| FIGS. 52 to 54 | show methods of varying bearing fluid pressure. |
| FIGS. 55 to 58 | show details of a tensile crank link embodiment. |
| FIGS. 59 to 68 | show details of alternative attachments of tensile links to piston/rod assemblies. |
| FIGS. 69 to 73 | show arrangements for "ring" valves. |
| FIGS. 74 and 75 | show a sleeved interface between tensile link and cylinder head. |
| FIGS. 76 to 86 | show methods of delivering fluid to working chambers. |
| FIGS. 87 to 89 | show an embodiment of a piston and cylinder assembly. |
| FIGS. 90 to 92 | show further methods of delivering fluid to working chambers. |
| FIG. 93 | shows a method of reducing piston blow-by. |
| FIGS. 94 to 96 | show bearing construction details. |
| FIGS. 97 and 98 | show schematically engines having twin separate exhaust systems. |
| FIGS. 99 to 102 | show details of an embodiment of a twin exhaust system engine. |
| FIGS. 103 to 105D | illustrate the basic features of toroidal working chambers. |
| FIGS. 106 to 111 | show layouts of toroidal working chambers and reciprocating components. |
| FIGS. 112 to 122 | show schematic layouts of piston/rod assemblies linked to scotch yokes. |
| FIGS. 123 to 127 | illustrate the principles of imparting rotational motion to a reciprocating component. |
| FIGS. 128 to 137 | show devices for converting combined reciprocating and rotating motion to rotating motion. |
| FIGS. 138 to 144 | illustrate the principles of sinusoidal toroidal working chambers. |
| FIGS. 145 to 147 | show schematic layouts of engines wherein a piston/rod assembly reciprocates and rotates within a cylinder assembly which rotates in a housing, capable of providing a differential-type drive. |
| FIGS. 148 to 153 | show details of engines having sinusoidal toroidal engines. |
| FIG. 154 | shows schematically multiple pairs of toroidal combustion chambers. |
| FIGS. 155 to 157 | show methods for varying ratio of reciprocal motion rotational motion. |
| FIG. 158 | shows schematically an engine with one toroidal and one conventional working chamber. |
| FIG. 159 | shows an embodiment of a gas compressor. |
| FIG. 160 | shows schematically a piston partly powered by an energy absorbing device. |
| FIGS. 161 and 162 | show arrangements whereby a first working chamber is used to compress gas for a second working chamber. |
| FIGS. 163 to 166 | show alternative gas flow arrangements. |
| FIGS. 167 and 168 | shows schematically alternative arrangements for linking an engine to an electric generator/motor. |
| FIG. 169 | shows a combustion chamber profile. |
| FIGS. 170 to 179 | show construction details of modular and other engines. |
| FIGS. 180 to 182 | show forms of gas treatment volumes. |
| FIG. 183 | is a diagrammatic plan view of an exhaust gas reactor assembly. |
| FIG. 184 | is a cross-sectional view taken on the line 2-2 of FIG. 149. |
| FIG. 185 | is a cross section view taken on the line 3-3 of FIG. 149 |
| FIG. 186 | is a cross section view, similar to FIG. 151, but showing a modified construction. |
| FIG. 187 | is a cross sectional view, also similar to FIG. 151, but showing a further modified construction. |
| FIGS. 188 to 193 | show diagrammatically in vertical cross-section various arrangements of inter-members. |
| FIGS. 194 to 196 | show in cross-section various fastening details. |
| FIGS. 197 and 198 | show diagrammatically in sectional plan view two examples wherein reaction volumes project into space normally occupied by the engine. |

-continued

Figure 199:
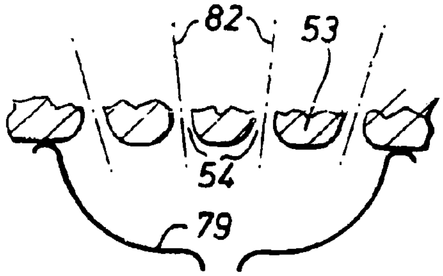
Figure 200:
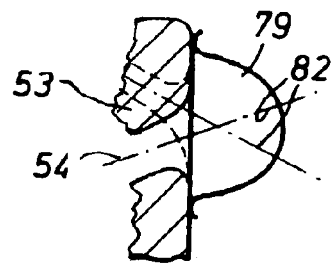
Figure 203:
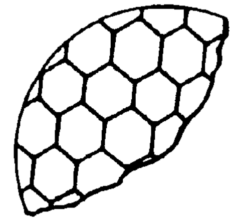
Figure 211:
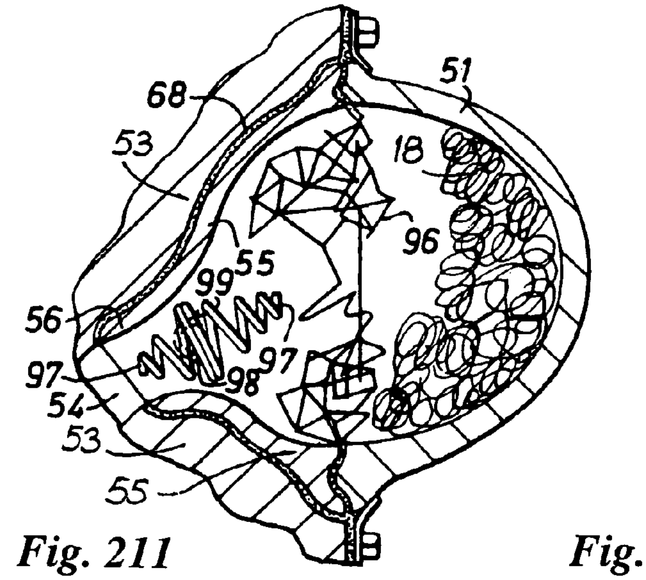
Figure 212:
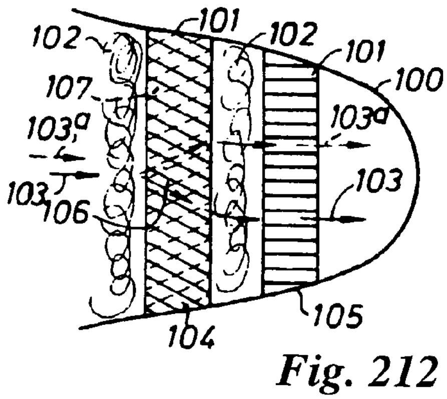
Figure 213:
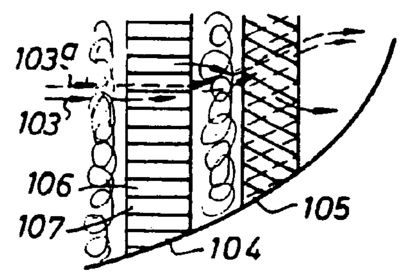
Figure 214:
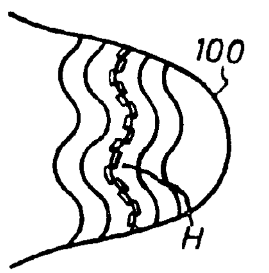
Figure 215:
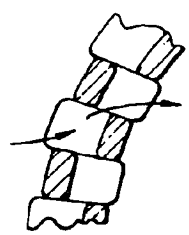
Figure 216:
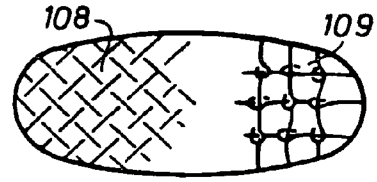
Figure 217:
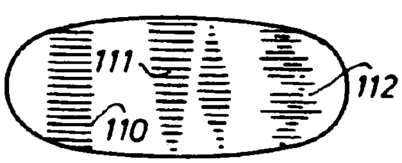
Figure 218:
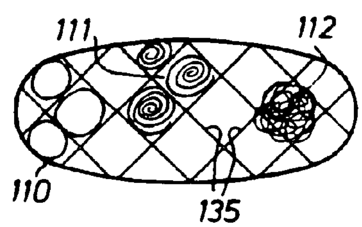
Figure 219:
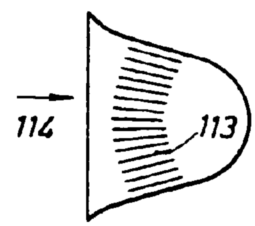
Figure 220:
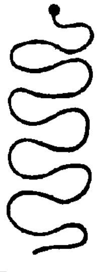
Figure 221:
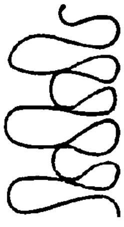
Figure 222:
Figure 223:
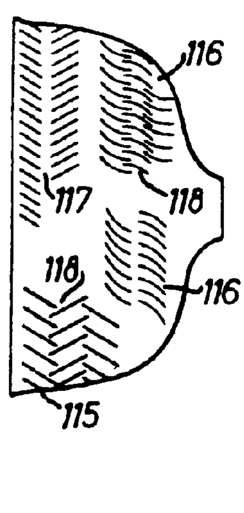
Figure 262:
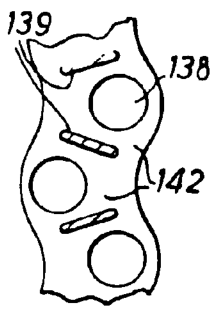
Figure 263:
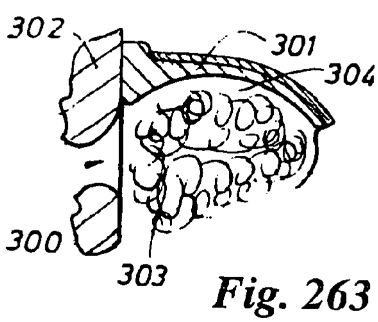
Figure 268:
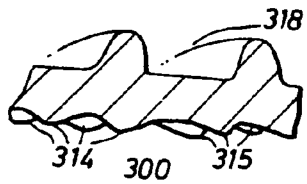
Figure 269:
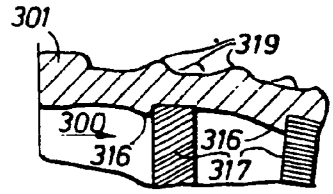
Figure 271:
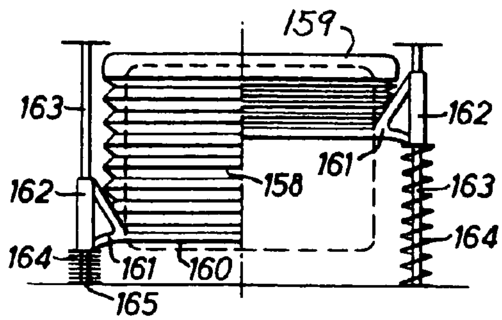
Figure 270:
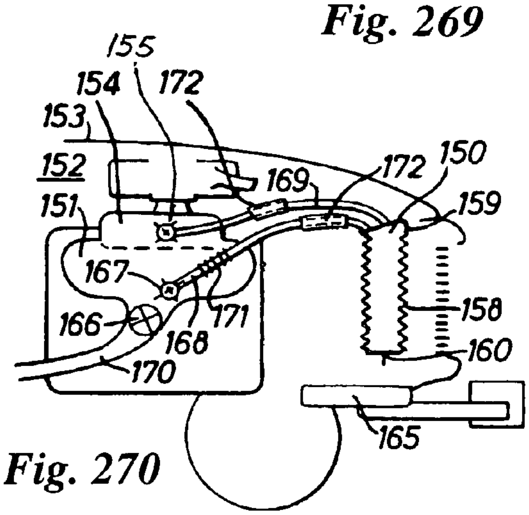
Figure 272:
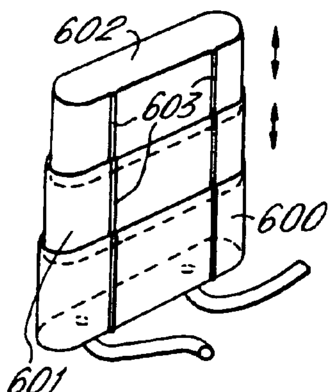
Figure 273:
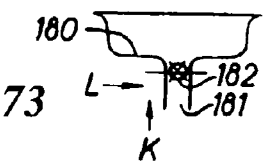
Figure 274:
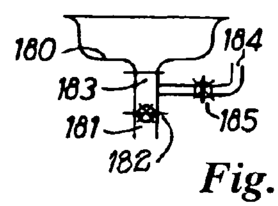
Figure 276:
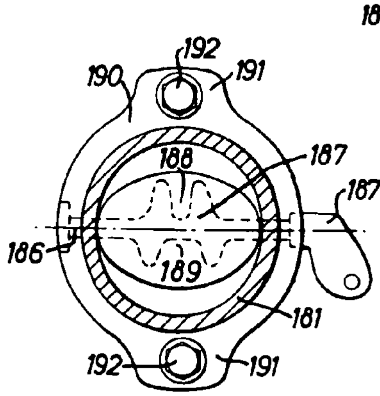
Figure 277:
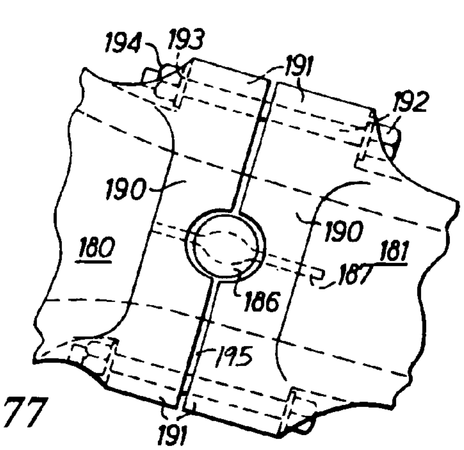
Figure 278:
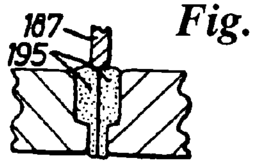
Figure 279:
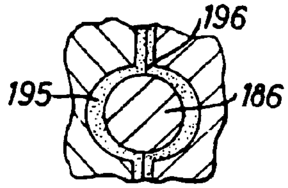
Figure 280:
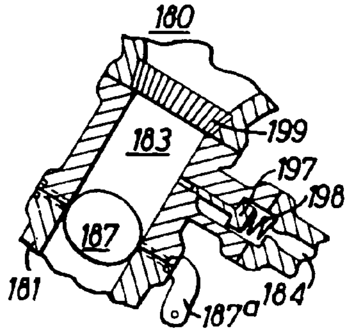
Figure 281:
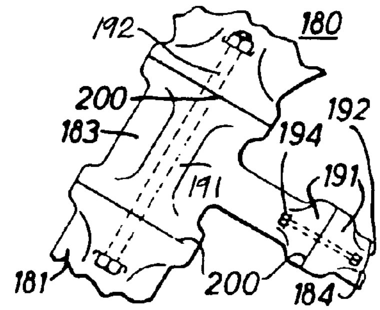
Figure 282:
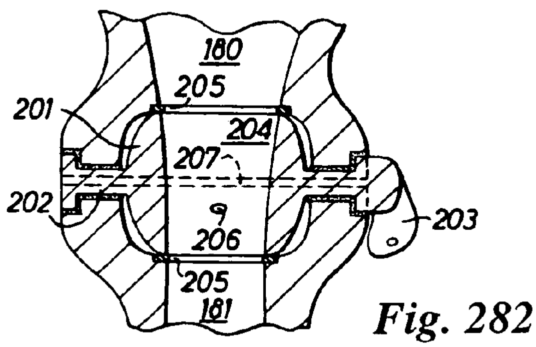
Figure 283:
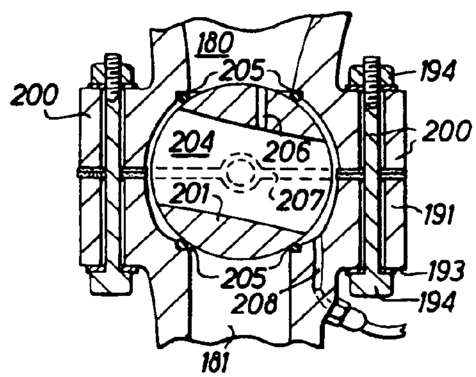
Figure 284:
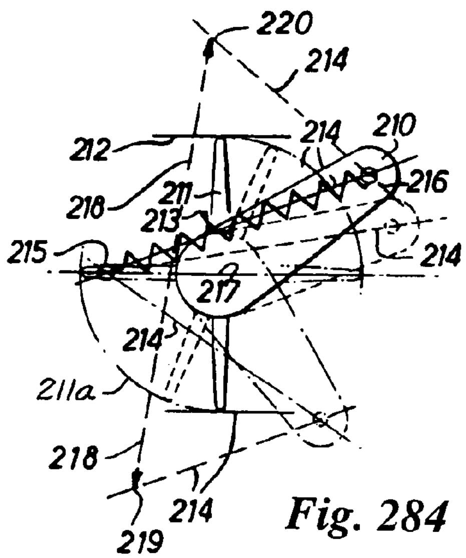
Figure 285:
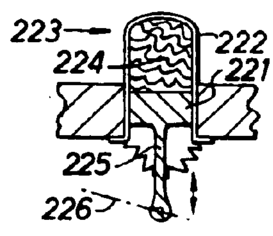
Figure 286:
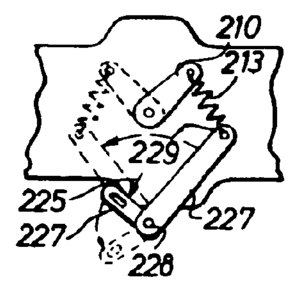
Figure 287:
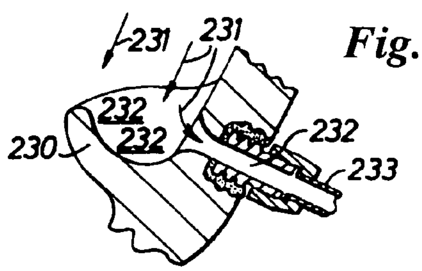
Figure 288:
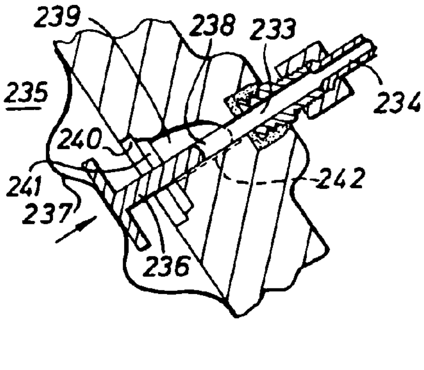
Figure 289:
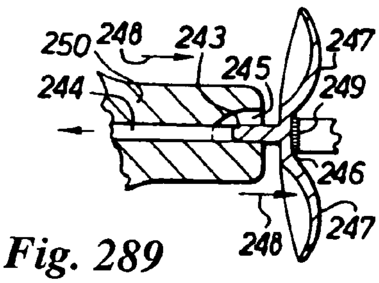
Figure 293:
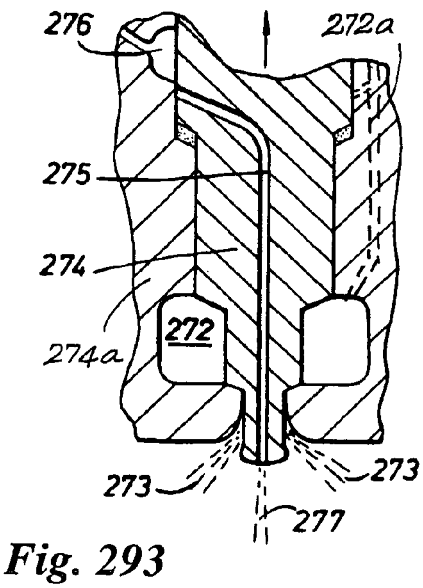
Figure 294:
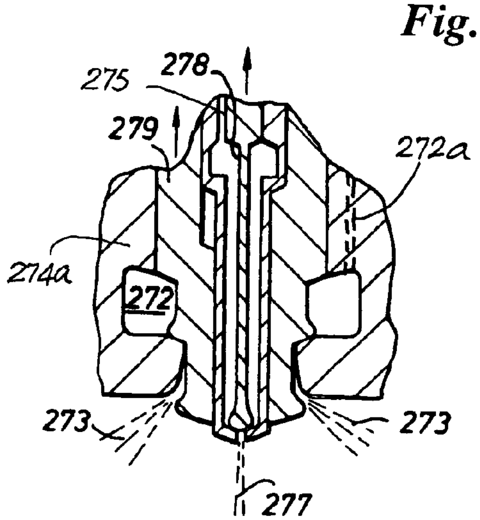
Figure 295:
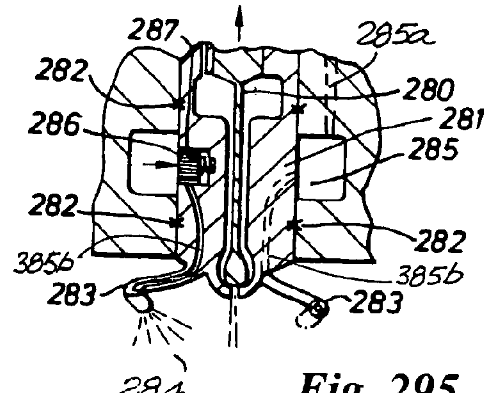
Figure 296:
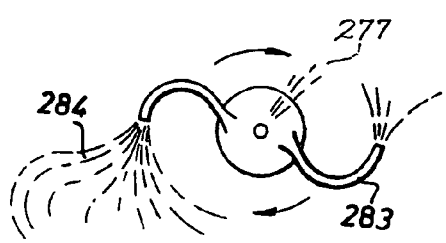
Figure 297:
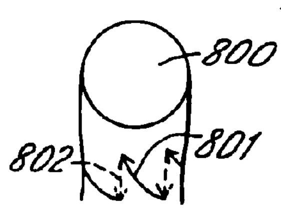
Figure 298:
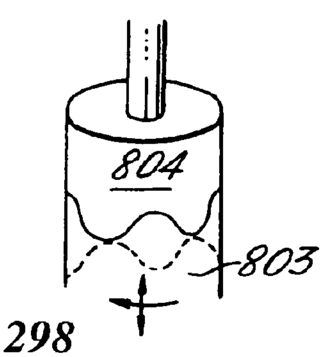
Figure 310:
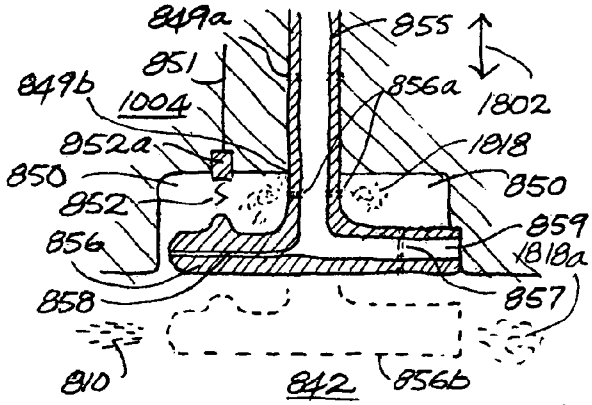
Figure 311:
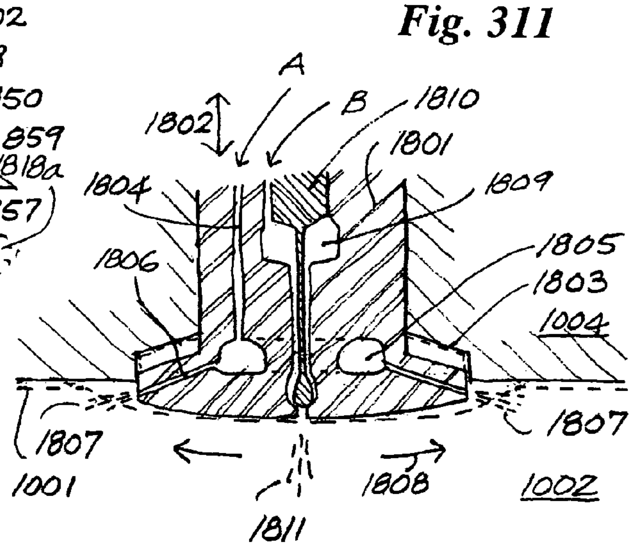
Figure 312:
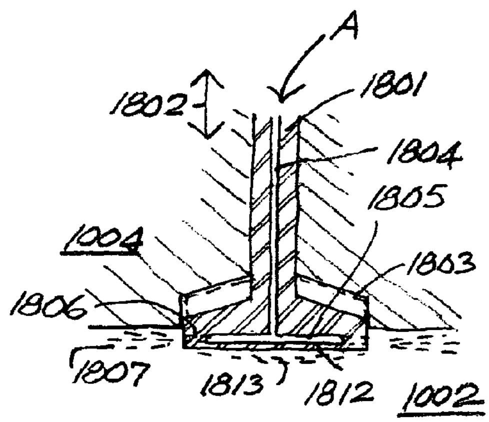
Figure 325:
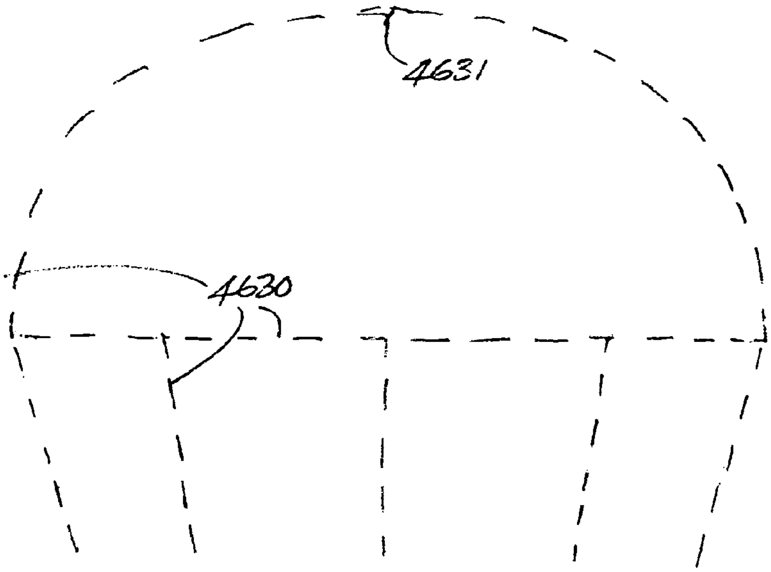
Figure 325:
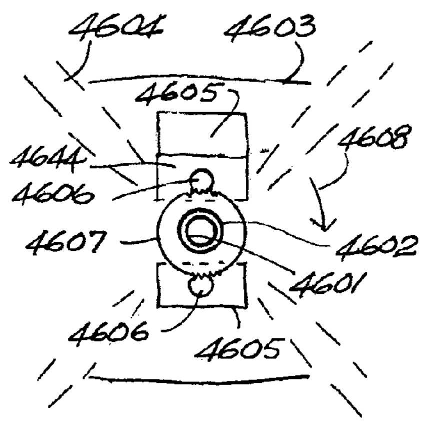
Figure 326:
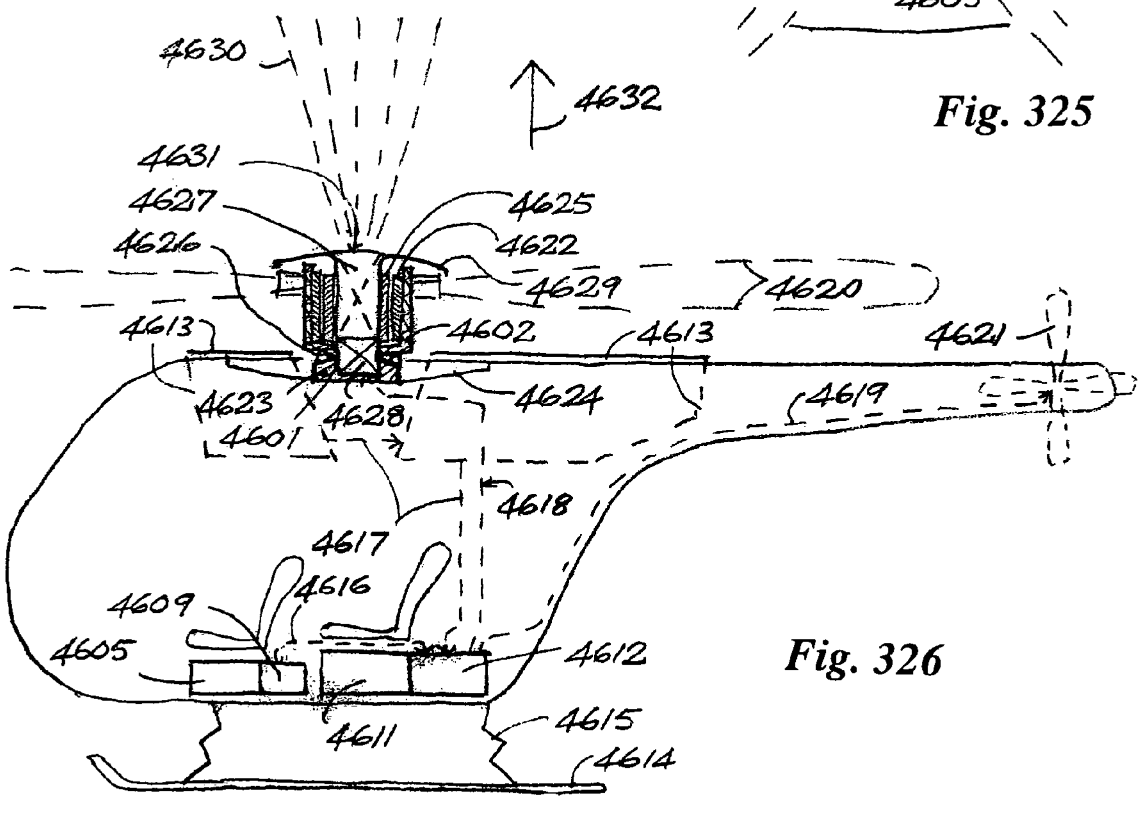
Figure 329:
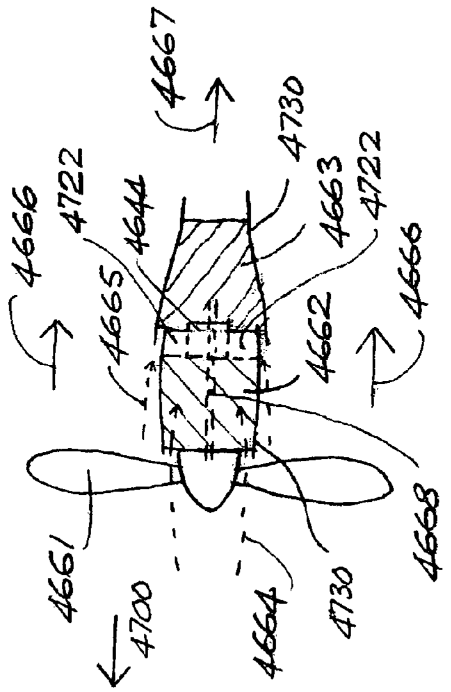
Figure 327:
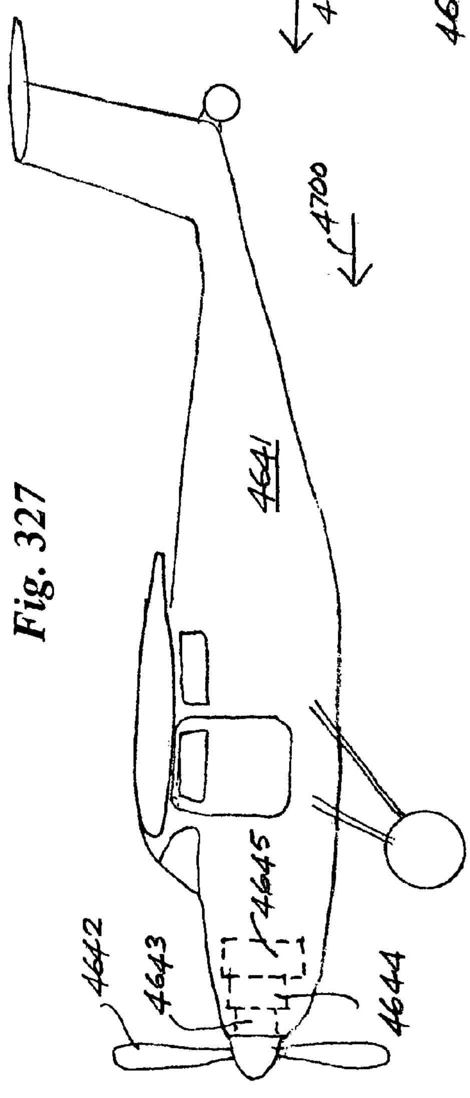
Figure 328:
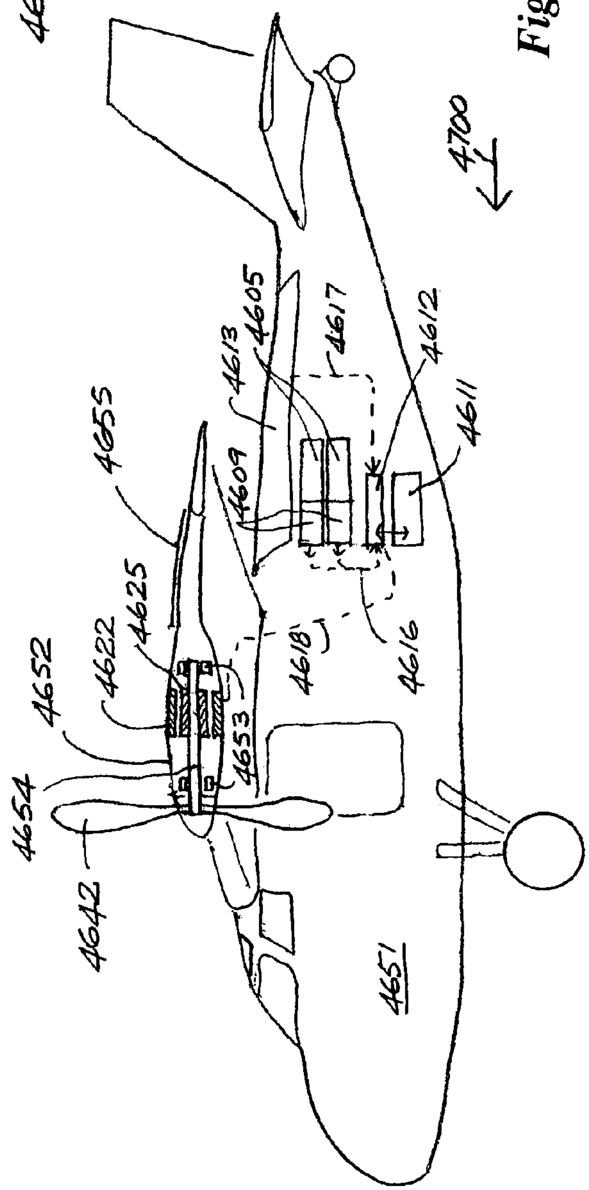
Figure 330:
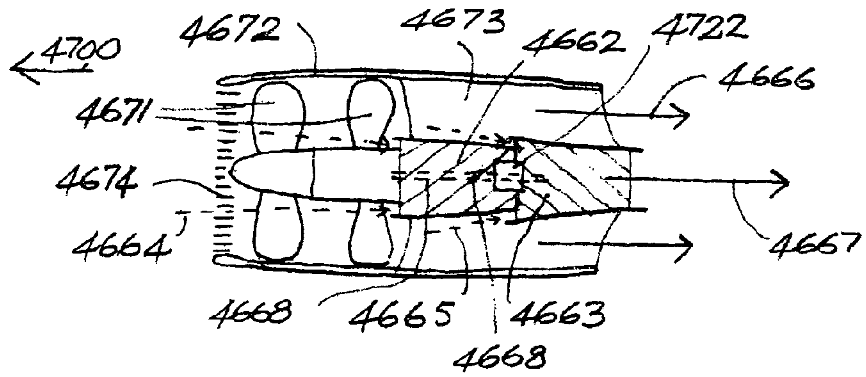
Figure 331:
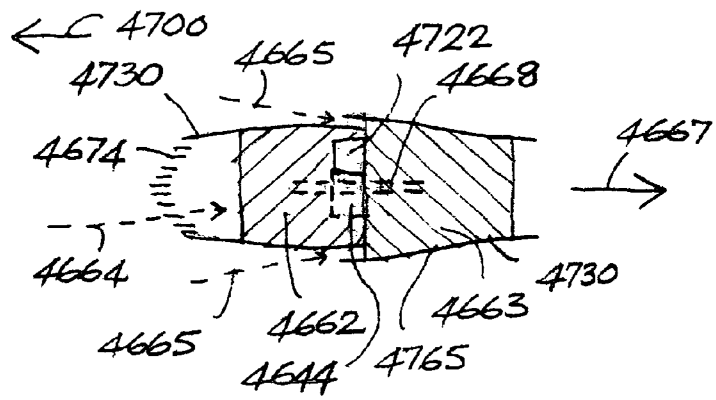
Figure 332:
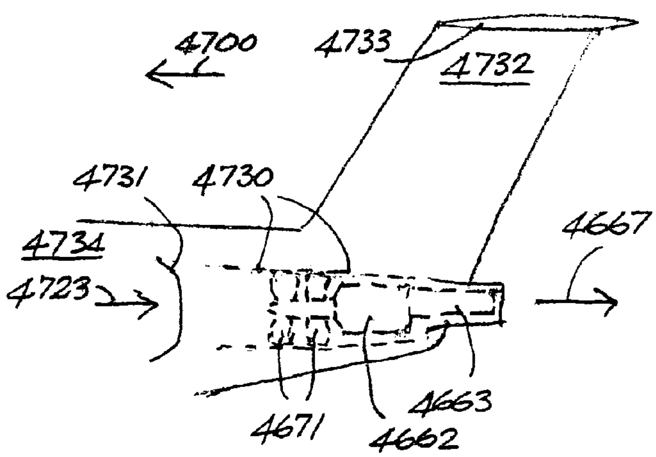
Figure 333:
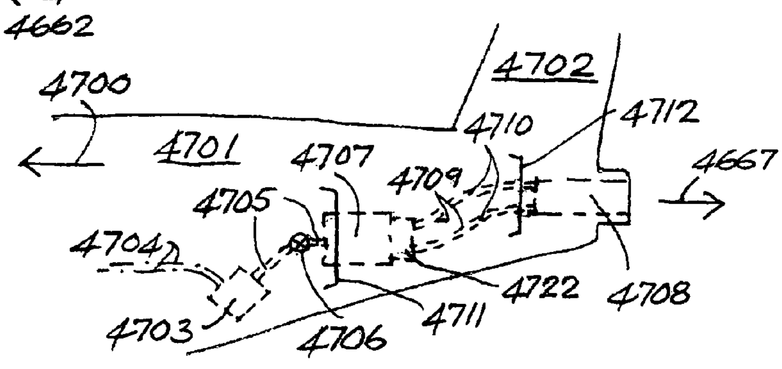

| | |
|---|---|
| FIGS. 199 and 200 | show arrangements of variable axes of exhaust port openings. |
| FIGS. 201 to 206 | describe means of directing exhaust gas flow. |
| FIGS. 207 to 210 | describe means of imparting swirl and/or turbulence to exhaust gases. |
| FIG. 211 | illustrates a selected embodiment. |
| FIGS. 212 and 213 | describe honeycomb and wool filamentary construction. |
| FIGS. 214 and 215 | describe expanded metal or metal mesh construction. |
| FIG. 216 | describes woven and knitted wire. |
| FIGS. 217 to 219 | describe wire spiral construction. |
| FIGS. 220 to 228 | describe embodiments of looped wire filamentary material construction. |
| FIGS. 229 to 233 | describe embodiments of wire strand and associated features. |
| FIGS. 234 to 242 | describe embodiments of sheet filamentary material construction. |
| FIGS. 243 to 247 | describe sheet used in three dimensional forms. |
| FIGS. 248 to 255 | describe embodiments of pellet-like filamentary material. |
| FIGS. 256 to 262 | describe details for fixing filamentary material to reactor housings. |
| FIG. 263 | illustrates principles of reduced resistance to gas flow adjacent a reactor housing surface. |
| FIGS. 264 to 269 | describe reactor wall construction embodying depressions or projections. |
| FIGS. 270 and 271 | show an embodiment of exhaust gas reservoir. |
| FIG. 272 | illustrates an embodiment of a fluid reservoir of variable volume. |
| FIGS. 273 and 274 | show diagrammatically valve, gas routing and component arrangements. |
| FIGS. 275 to 279 | show an embodiment of butterfly valve in the situation of FIG. 231. |
| FIGS. 280 and 281 | show an embodiment of butterfly valve in the situation of FIG. 232. |
| FIGS. 282 and 283 | show an embodiment of ball valve in the situation of FIG. 232. |
| FIGS. 284 to 286 | describe examples of valve actuating means. |
| FIGS. 287 to 292 | describe means of controlling exhaust gas recirculation (EGR) and air supply. |
| FIGS. 293 to 295 | show embodiments of composite injectors supplying multiple substances. |
| FIGS. 296 to 304 | show schematically injectors capable of rotary motion during injection. |
| FIGS. 305 and 306 | show schematically injectors capable of reciprocal motion during injection. |
| FIGS. 307 to 309 | show embodiments of movable injectors which include pre-combustion zones and/or combustion ignition devices. |
| FIGS. 310 to 312 | show embodiments of movable injectors of disc-like configuration. |
| FIGS. 313 to 320 | show embodiments of movable fluid delivery devices. |
| FIGS. 321 to 324 | show reciprocating piston/rod assemblies actuating valves and fluid delivery devices. |
| FIG. 325 | shows a helicopter rotor driven by the engine of the invention. |
| FIG. 326 | shows schematically a helicopter powered by a hybrid propulsion system. |
| FIG. 327 | shows schematically a fixed wing aircraft powered by the engine of the invention. |
| FIG. 328 | shows schematically a fixed wing aircraft powered by a hybrid propulsion system. |
| FIGS. 329 to 331 | show embodiments of compound engines for aircraft. |
| FIG. 332 | shows a compound engine mounted in an aircraft. |
| FIGS. 333 and 334 | show modified power arrangements for hybrid aircraft. |
| FIG. 335 | shows an aircraft powered by a compound reciprocating/turbine engine. |
| FIG. 336 | shows a nacelle or housing containing a power module comprising a propulsion device driven by an electric motor, with an aft-mounted turbine stage. |
| FIG. 337 | shows an arrangements for a hybrid electric drive in an aircraft using compound IC engines. |
| FIGS. 338 to 340 | show an example of an extendable and retractable wing extension. |
| FIGS. 341 to 344 | show arrangements for mounting engines on marine craft rudderposts |

-continued

Figure 345:
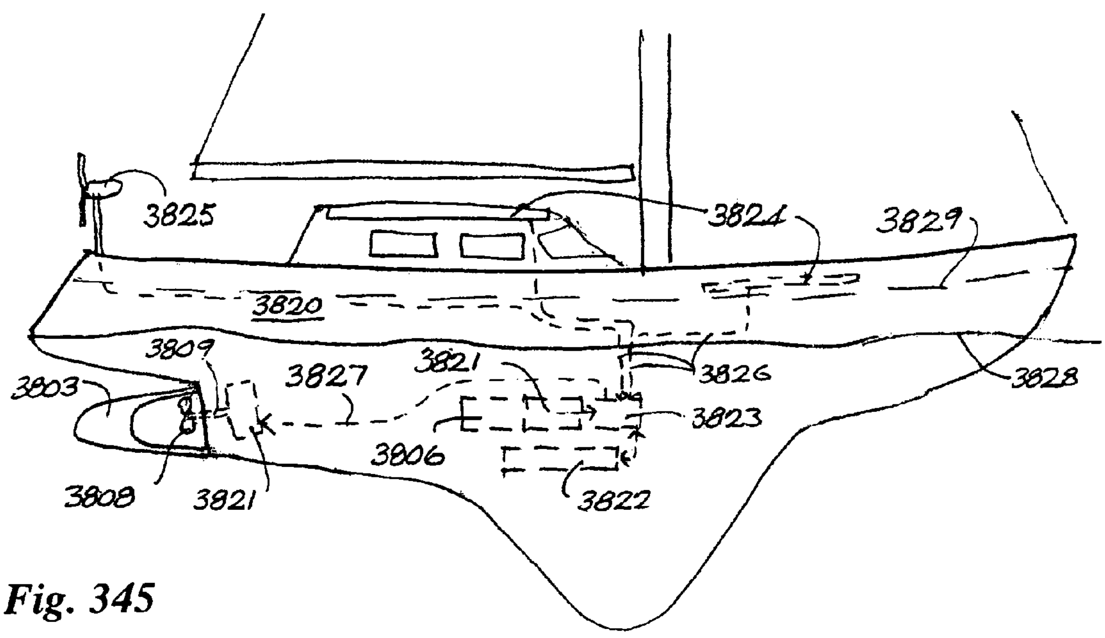
Figure 385:
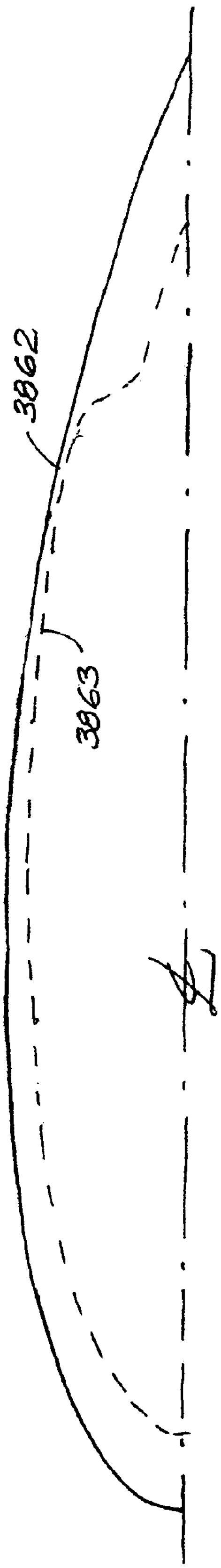
Figure 386:
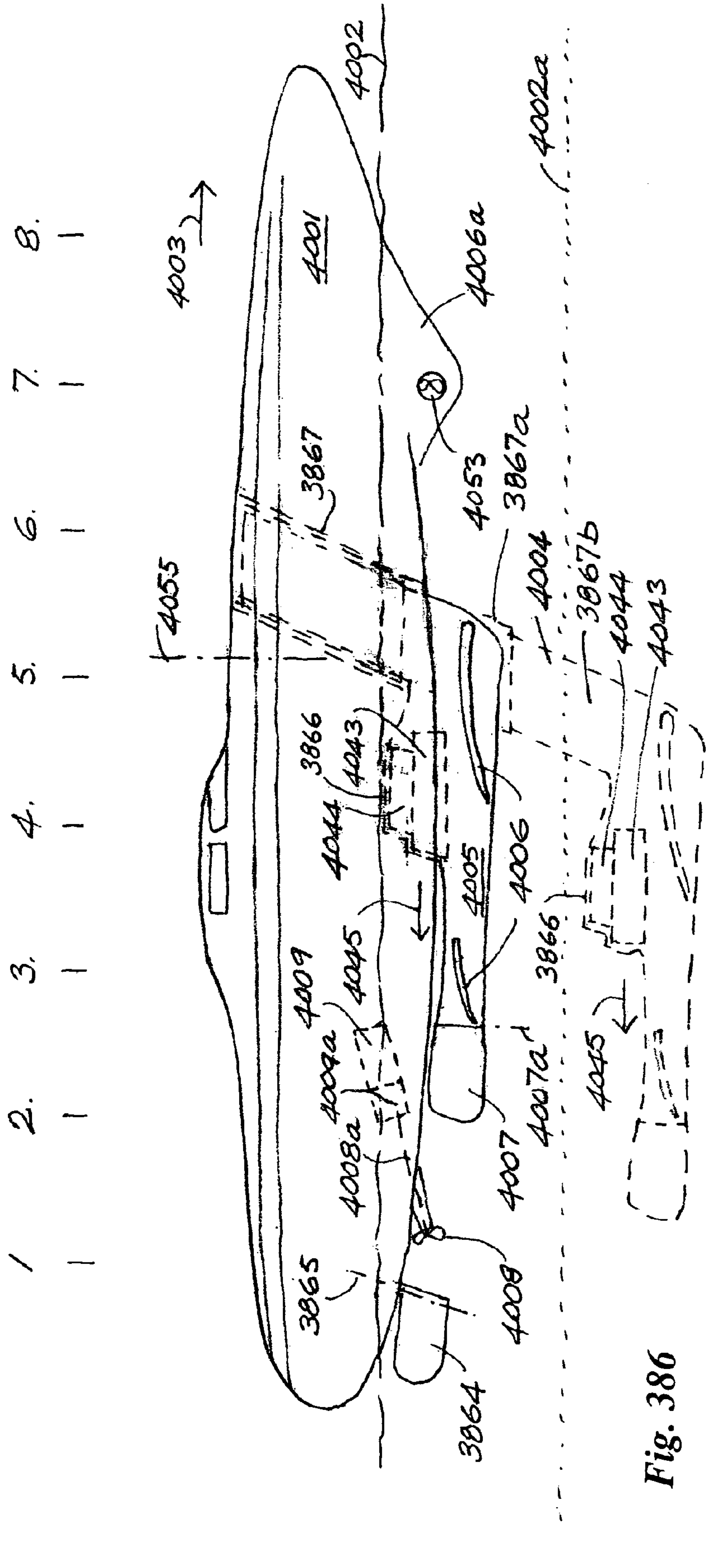
Figure 387:
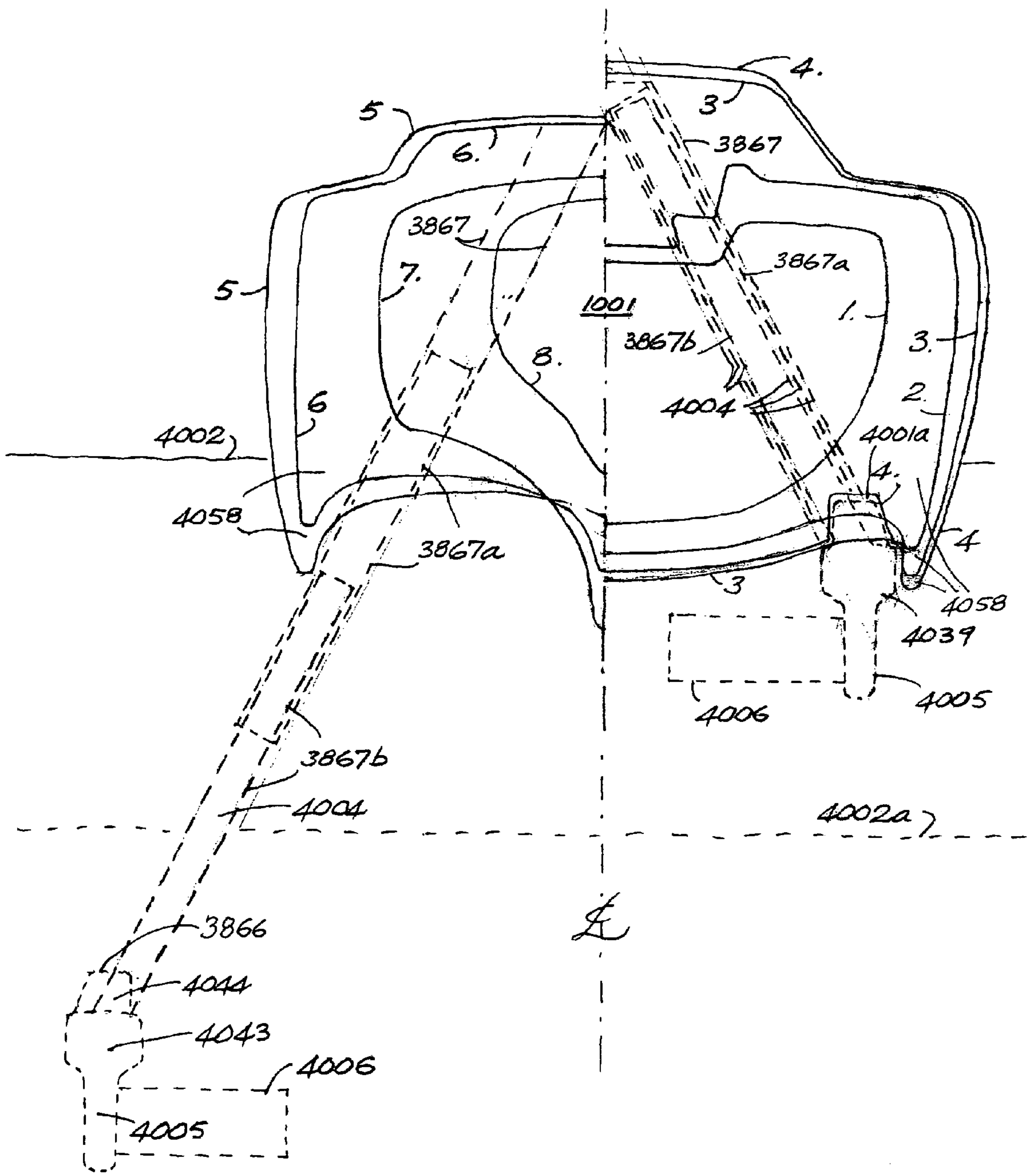
Figure 394:
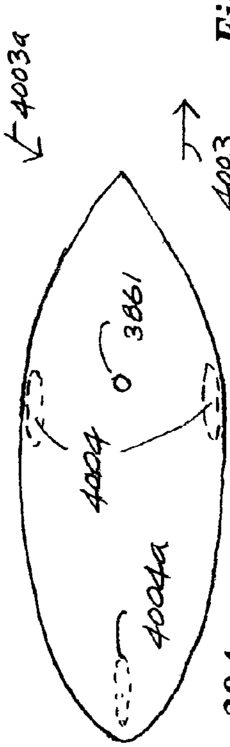
Figure 395:
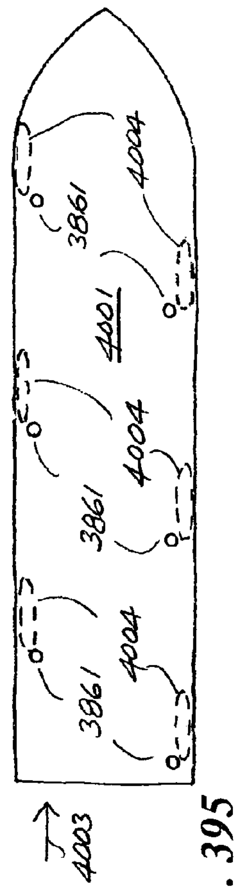
Figure 396:
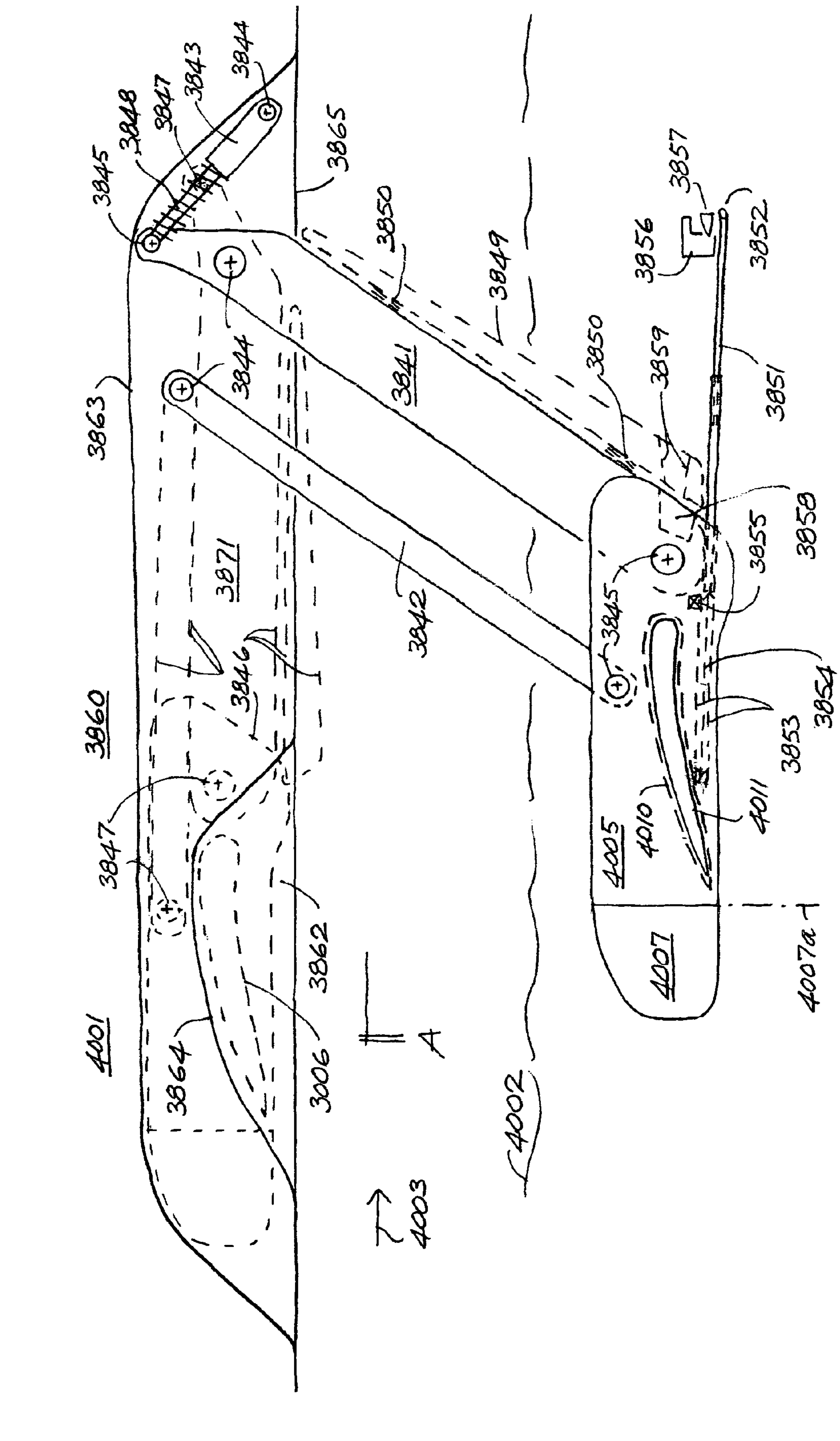
Figure 397:
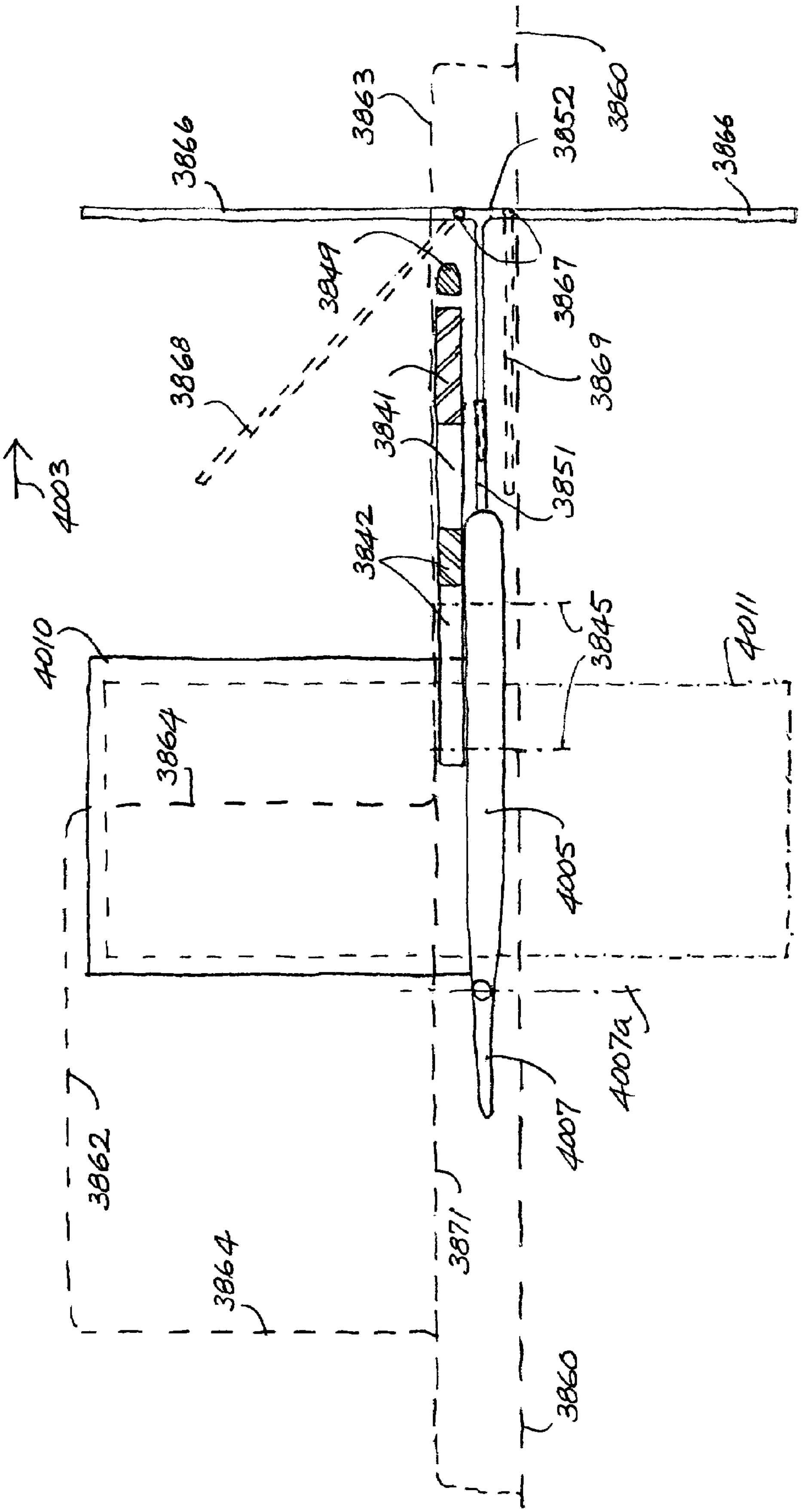
Figure 398:
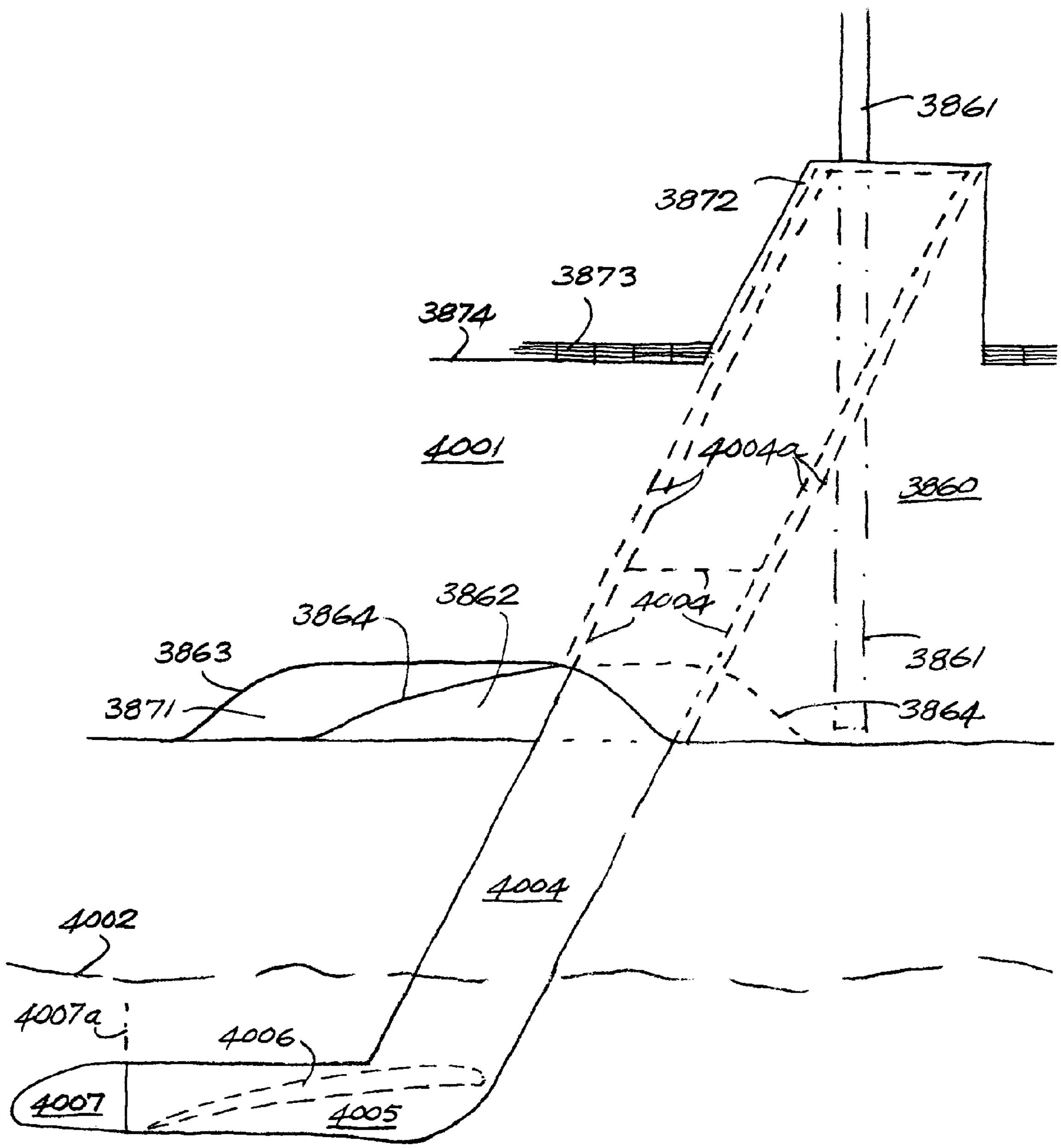
Figure 399:
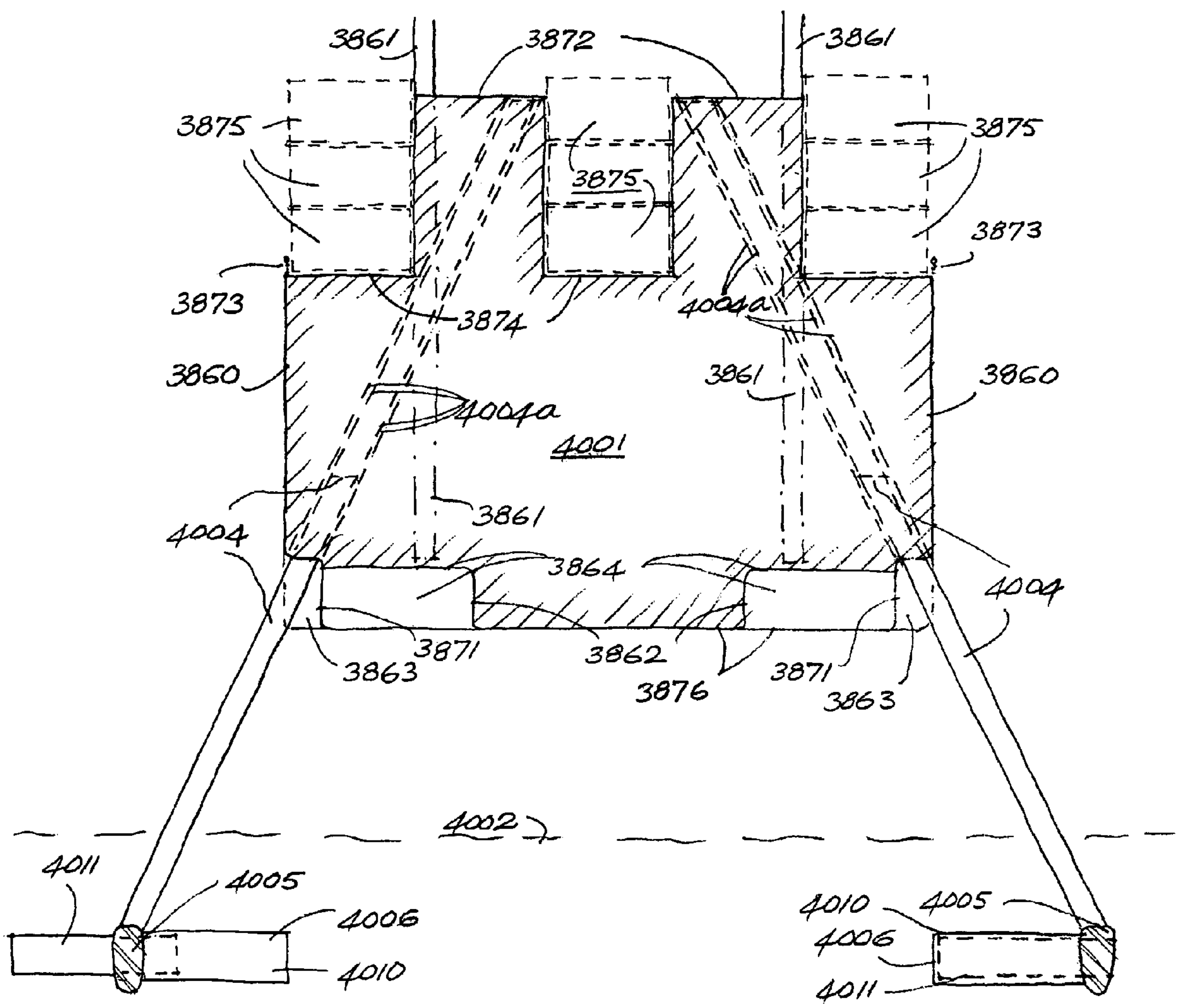
Figure 407:
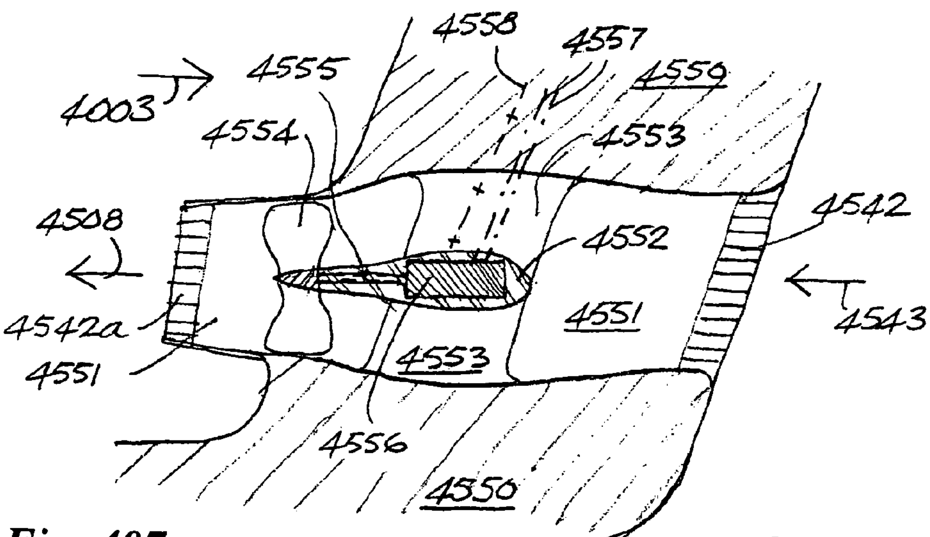
Figure 408:
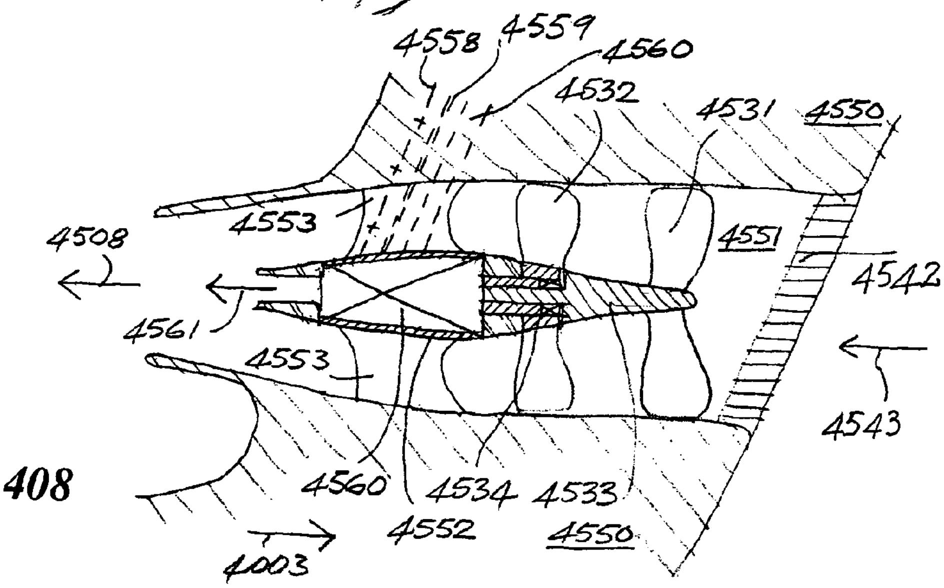
Figure 409:
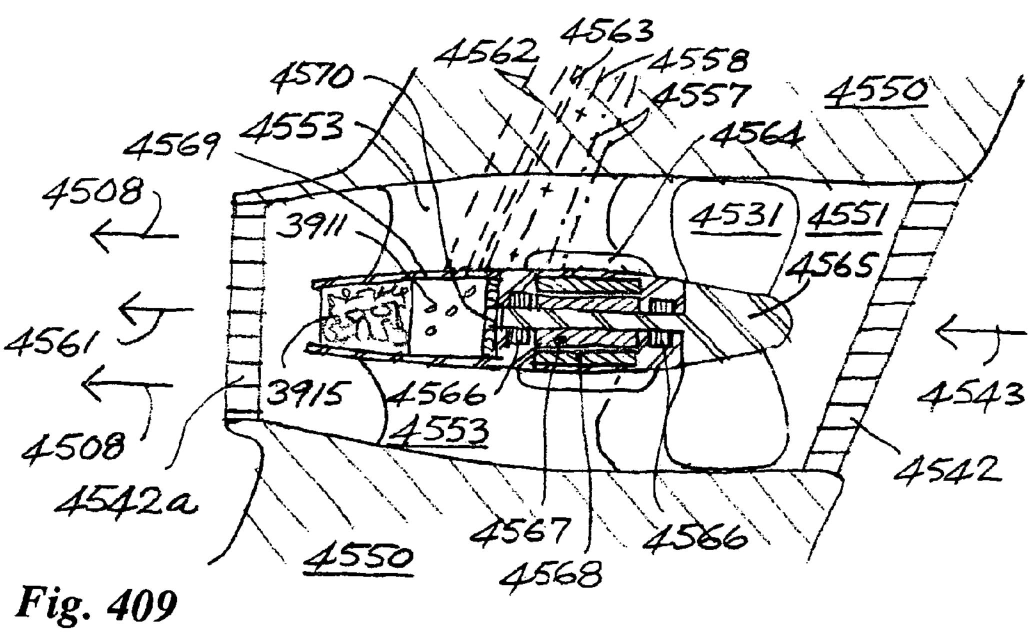
Figure 410:
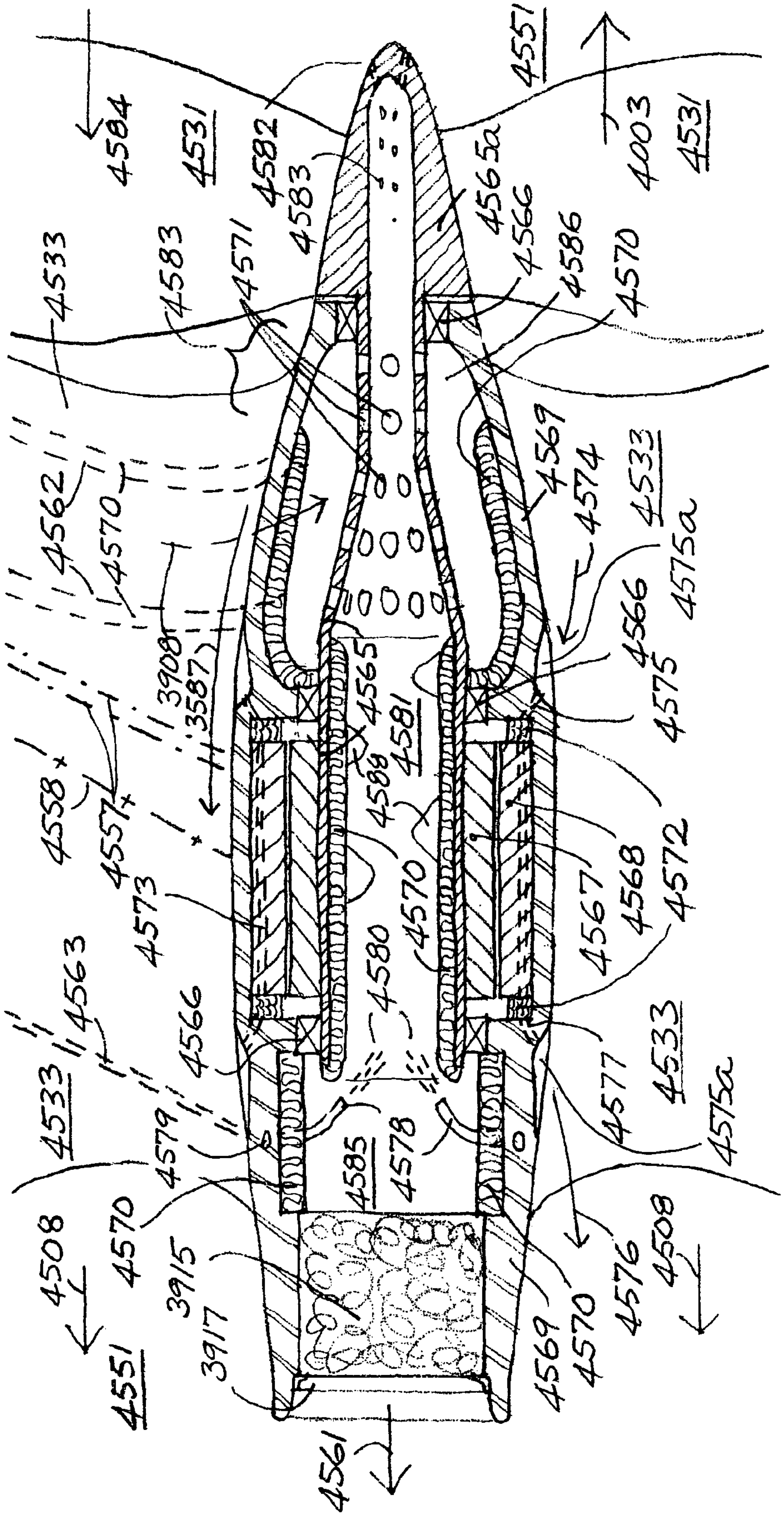
Figure 412:
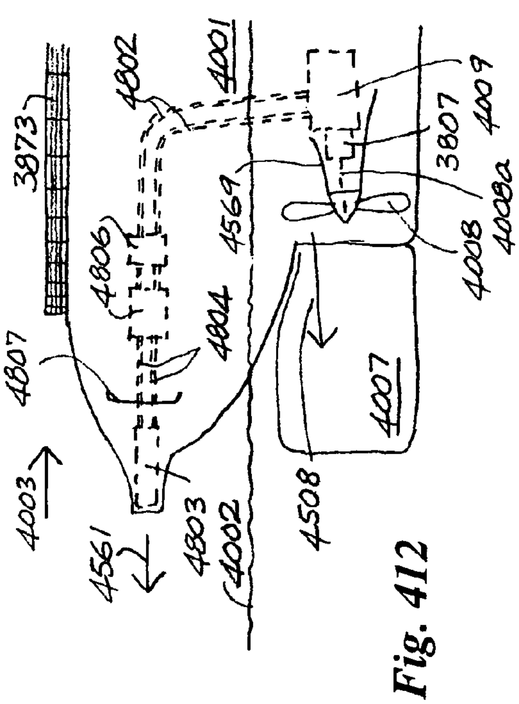
Figure 411:
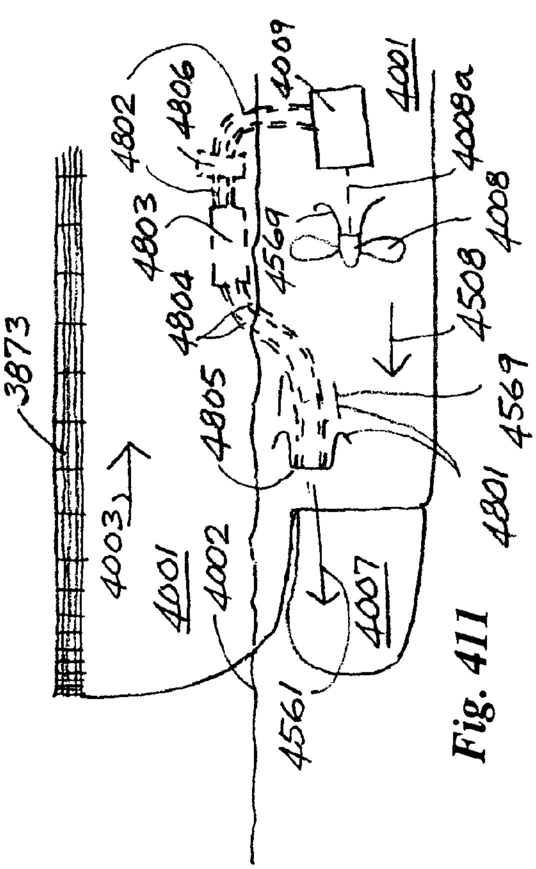
Figure 414:
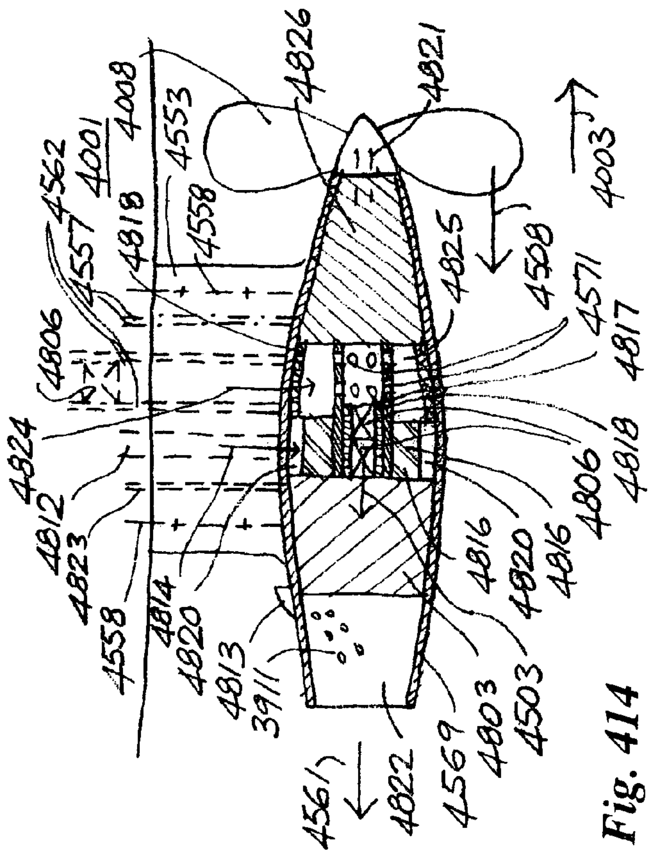
Figure 413:
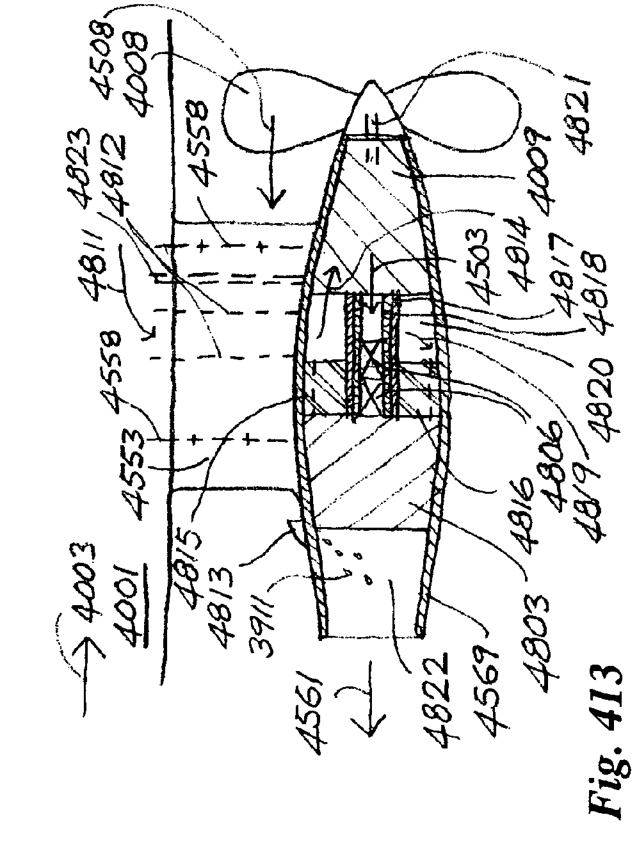
Figure 418:
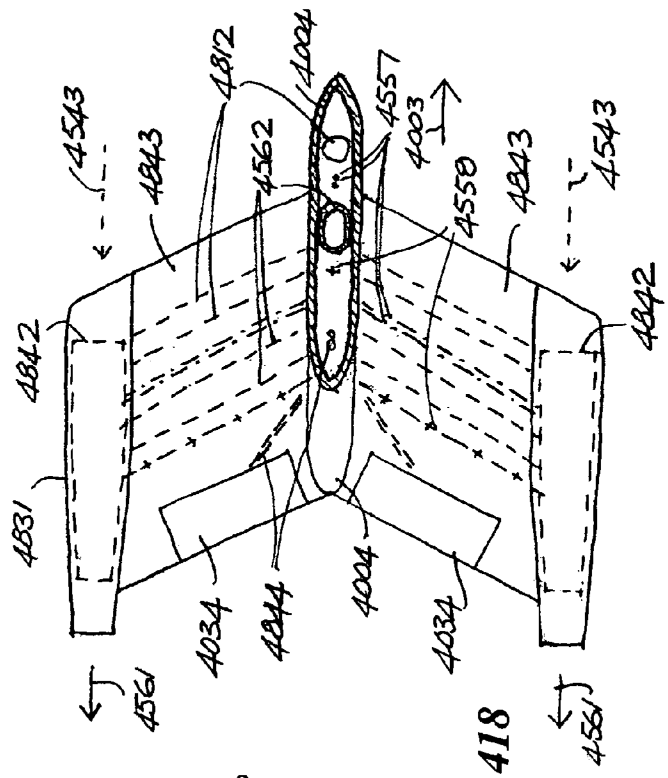
Figure 415:
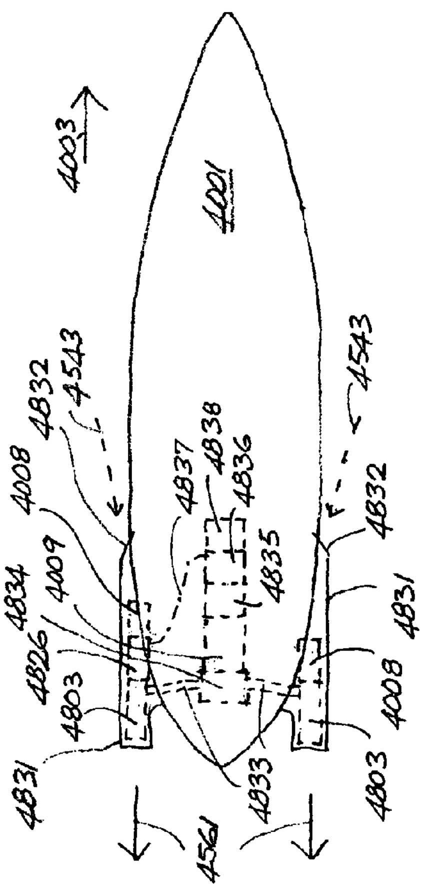
Figure 417:
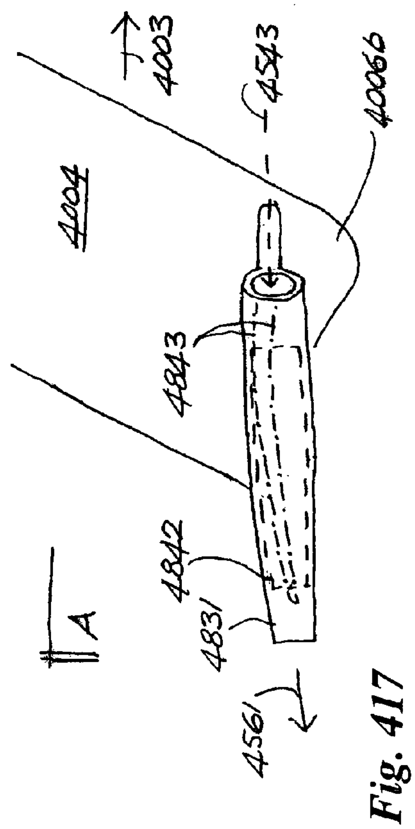
Figure 416:
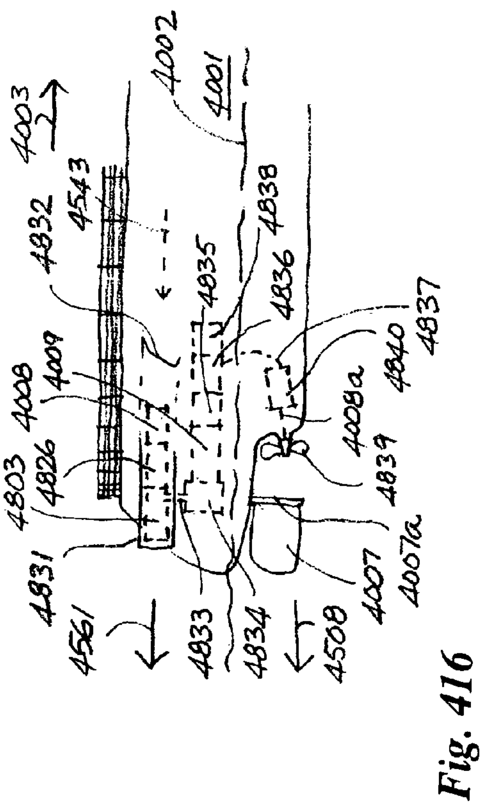
Figure 422:
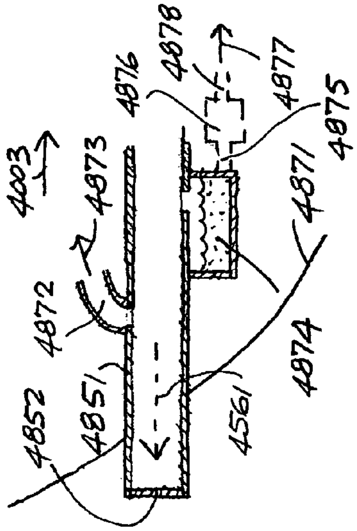
Figure 423:
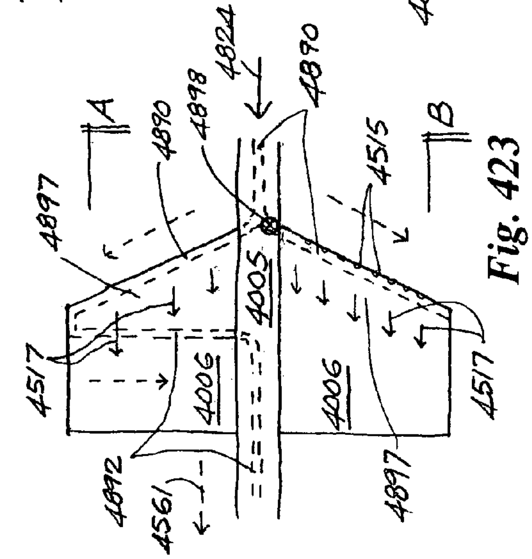
Figure 424:
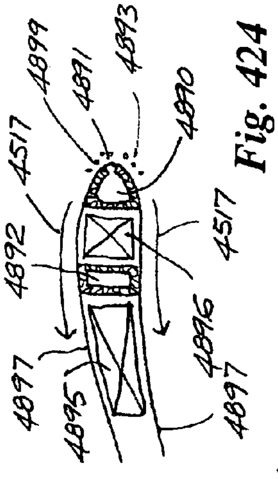
Figure 425:
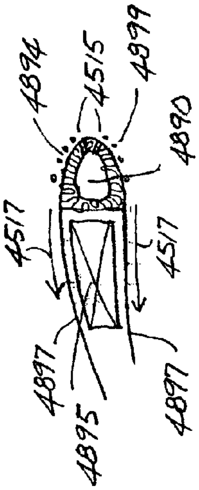
Figure 426:
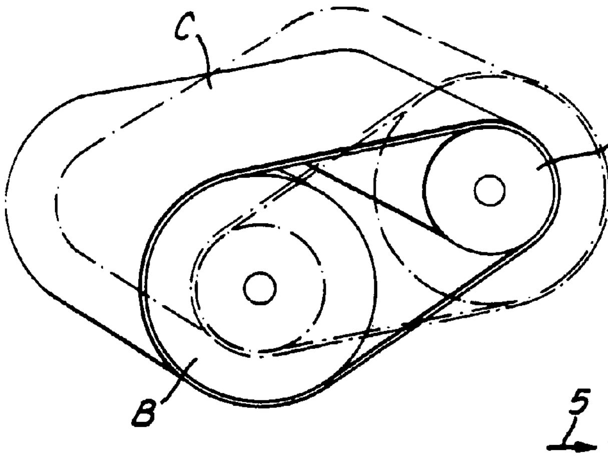
Figure 434:
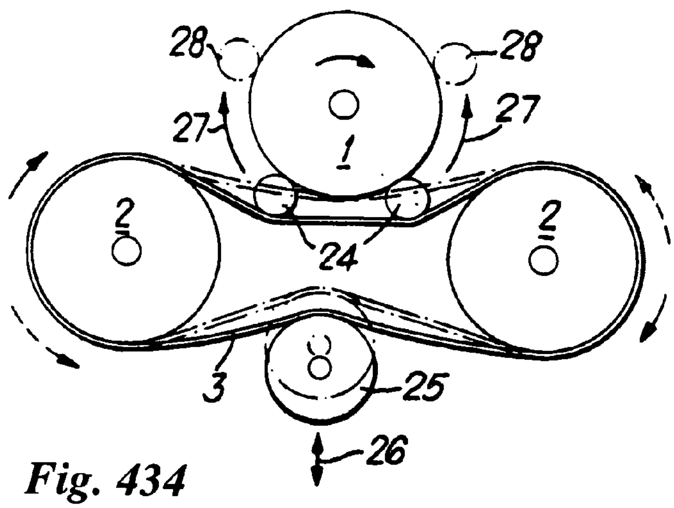
Figure 435:
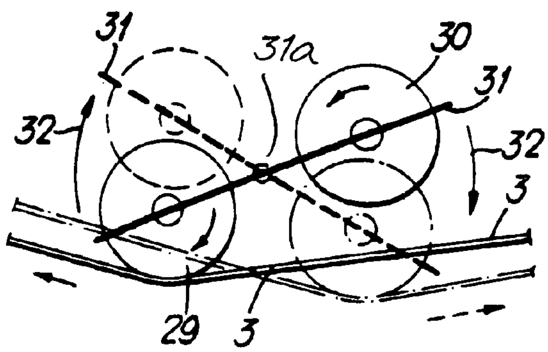
Figure 436:
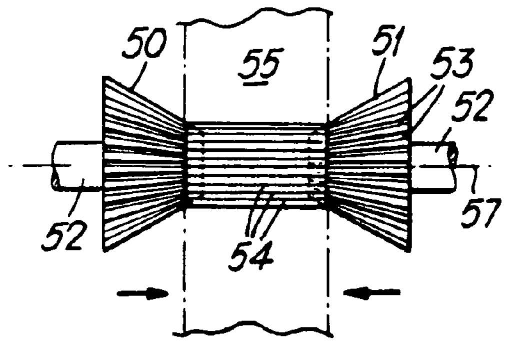
Figure 437:
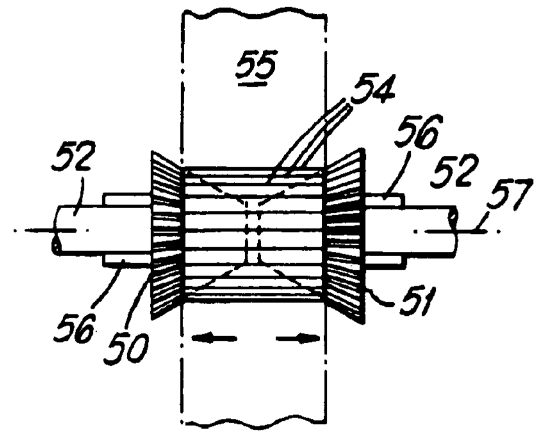
Figure 438:
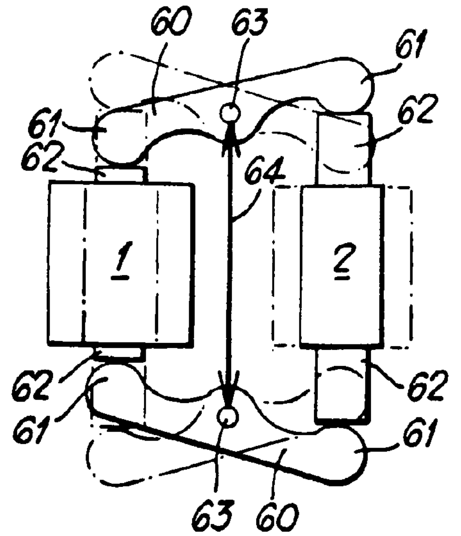
Figure 439:
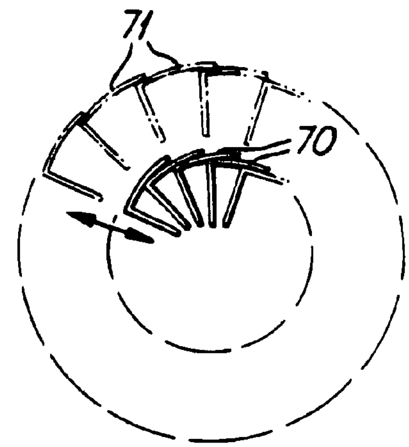
Figure 454:
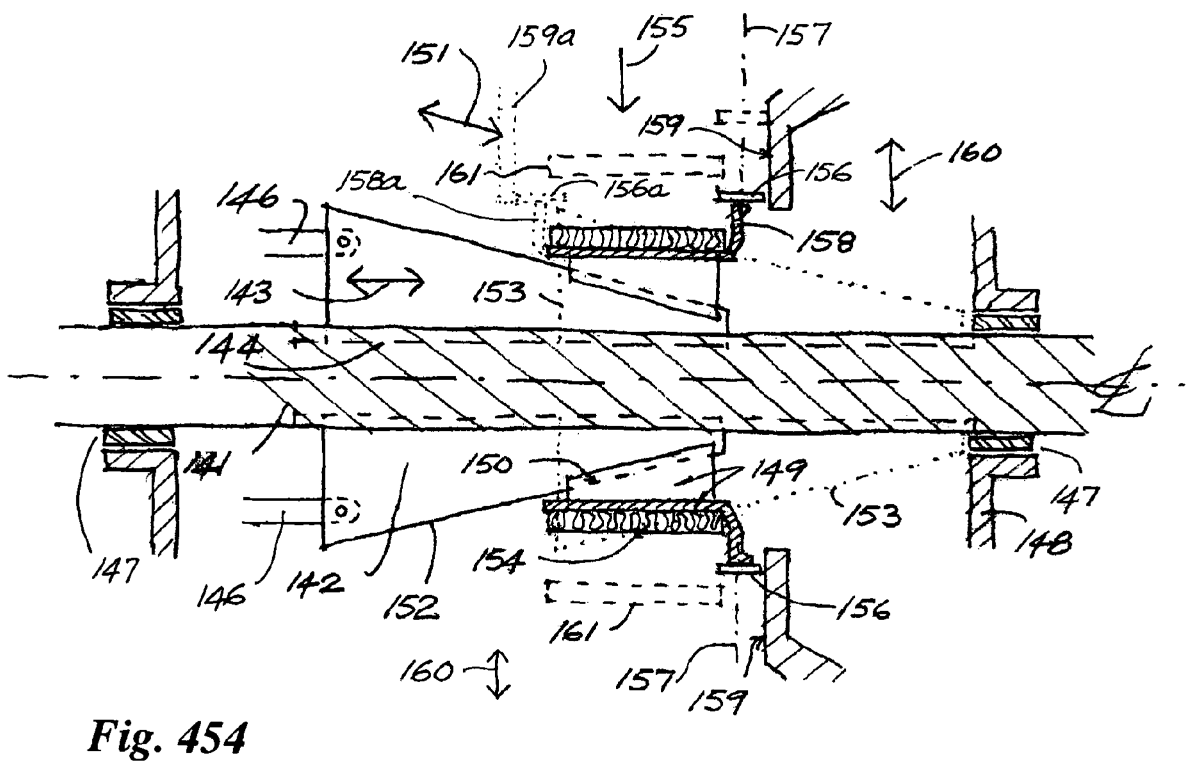
Figure 455:
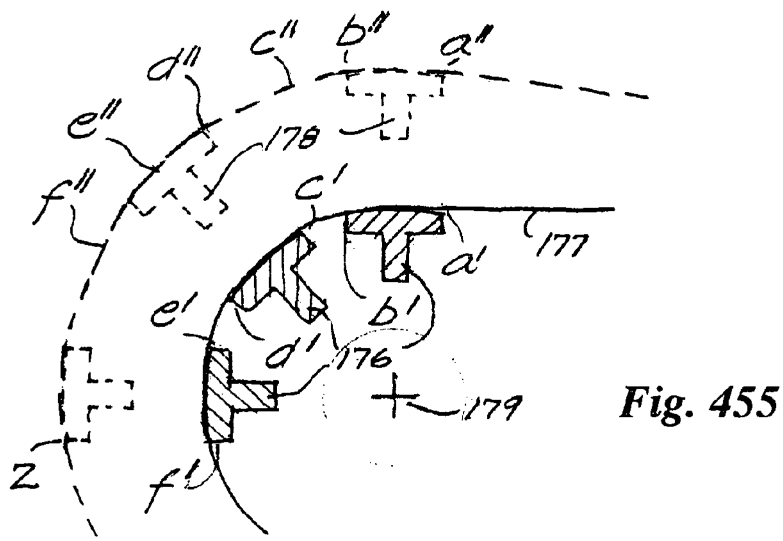
Figure 457:
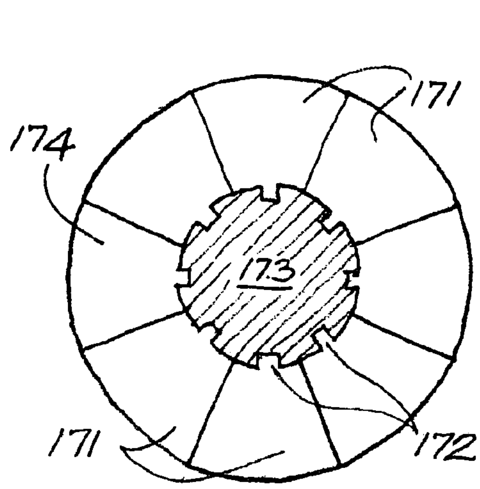
Figure 456:
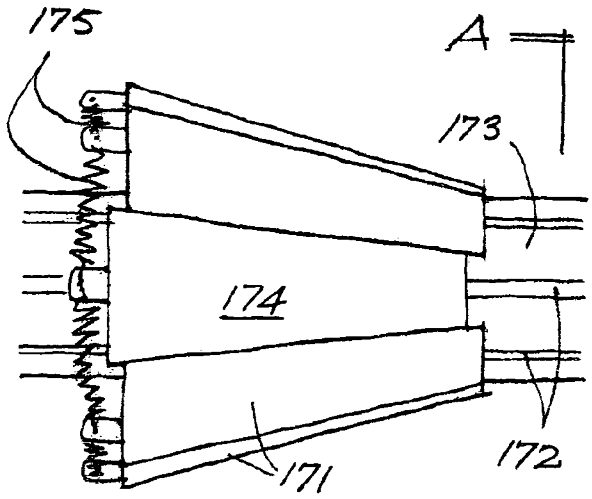
Figure 458:
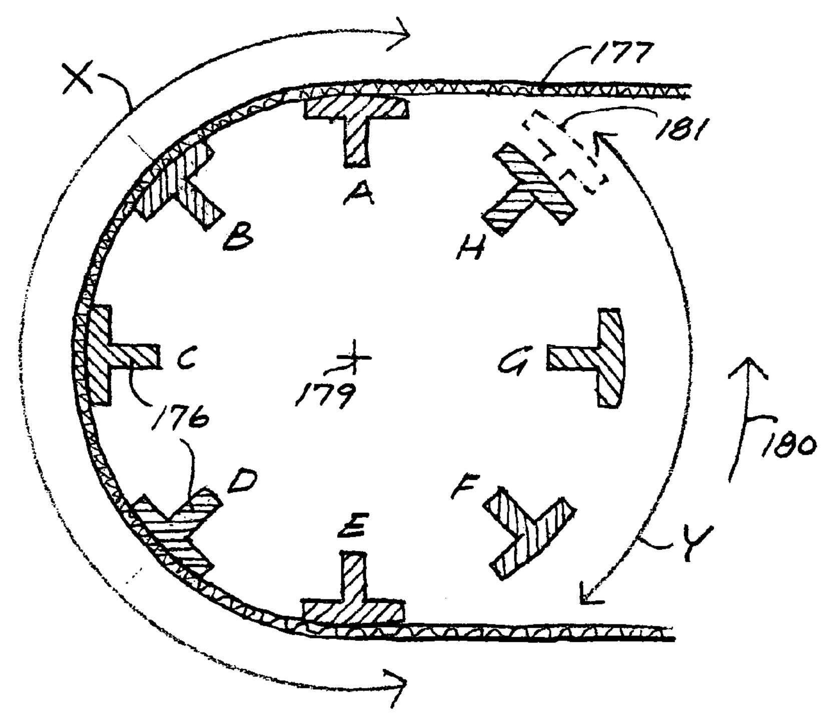
Figure 459:
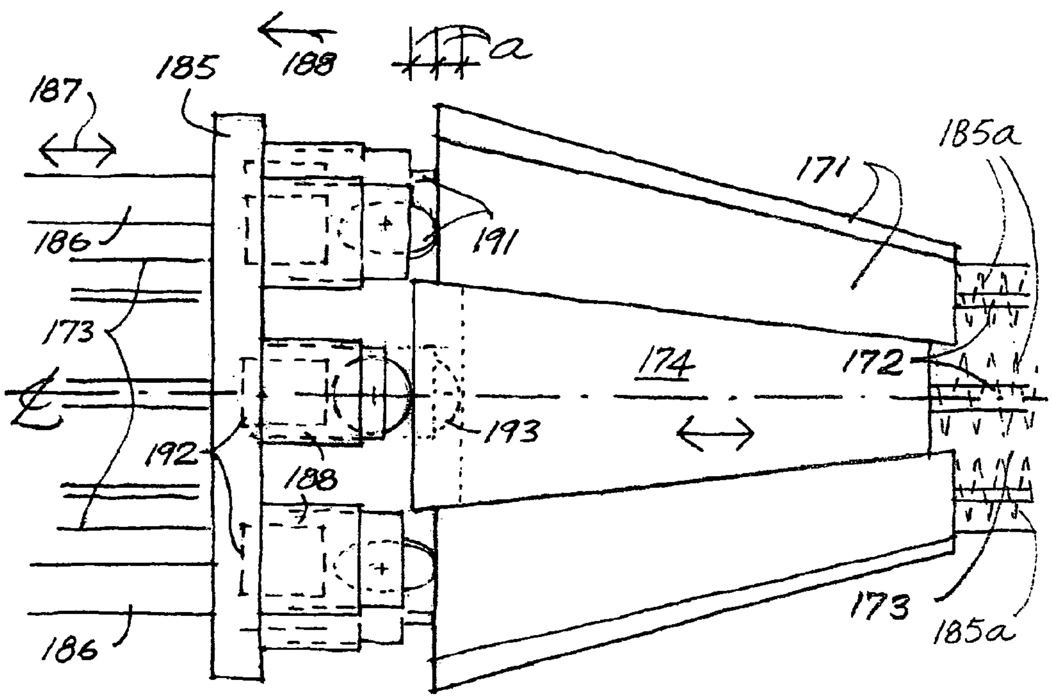
Figure 460:
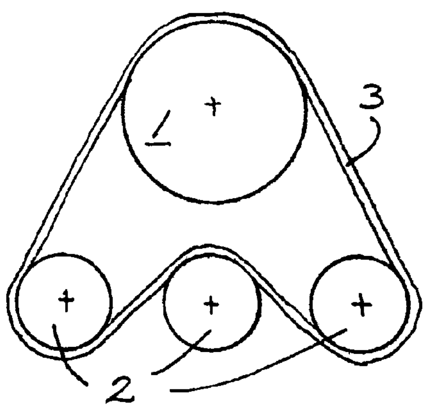
Figure 461:
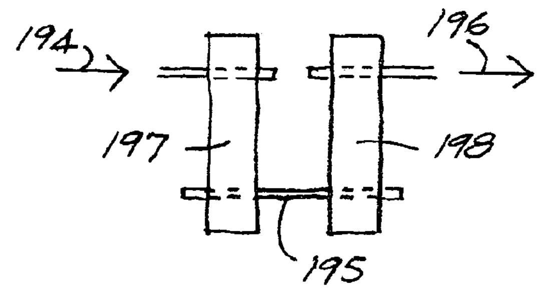
Figure 462:
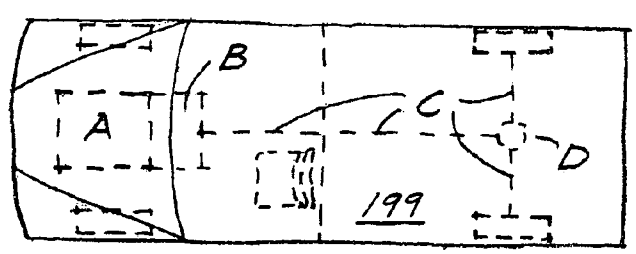
Figure 470:
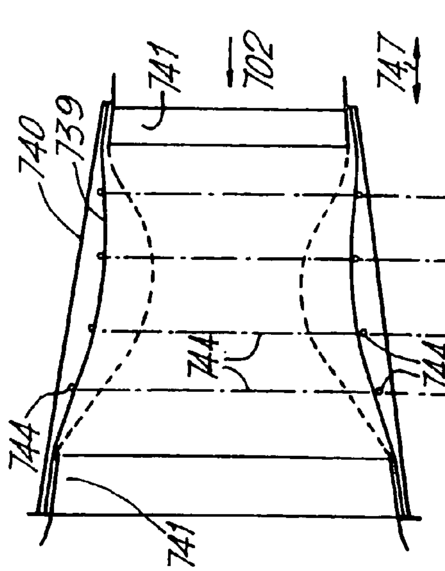
Figure 471:
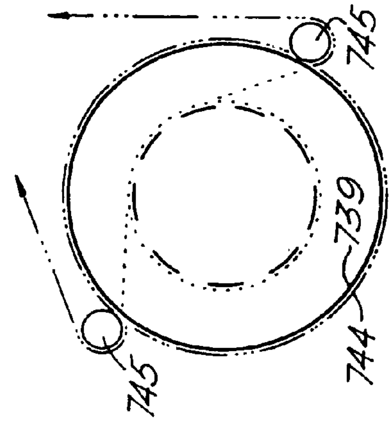
Figure 472:
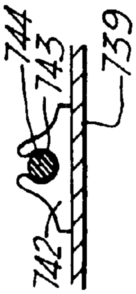
Figure 469:
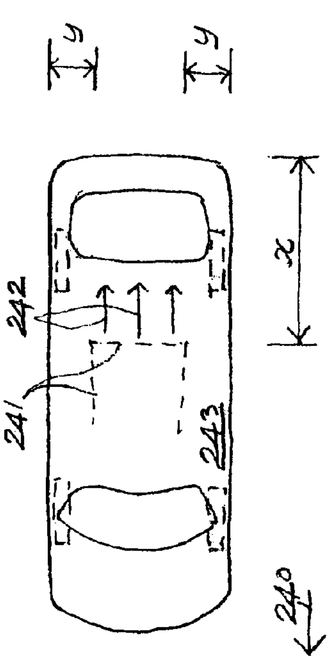
Figure 480:
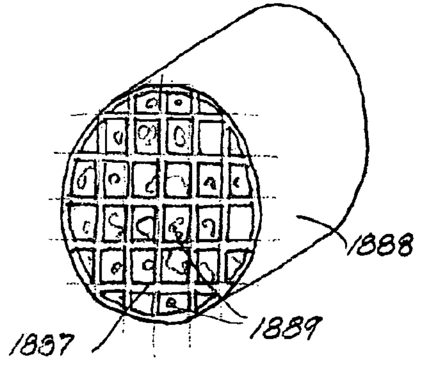
Figure 481:
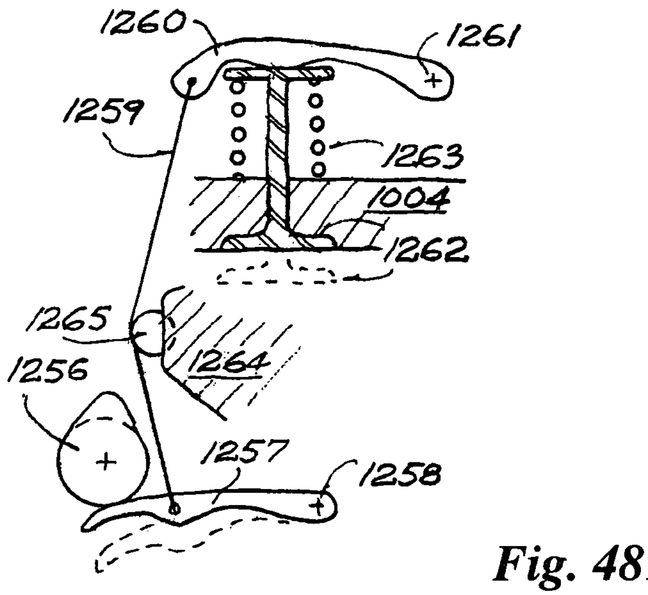
Figure 482:
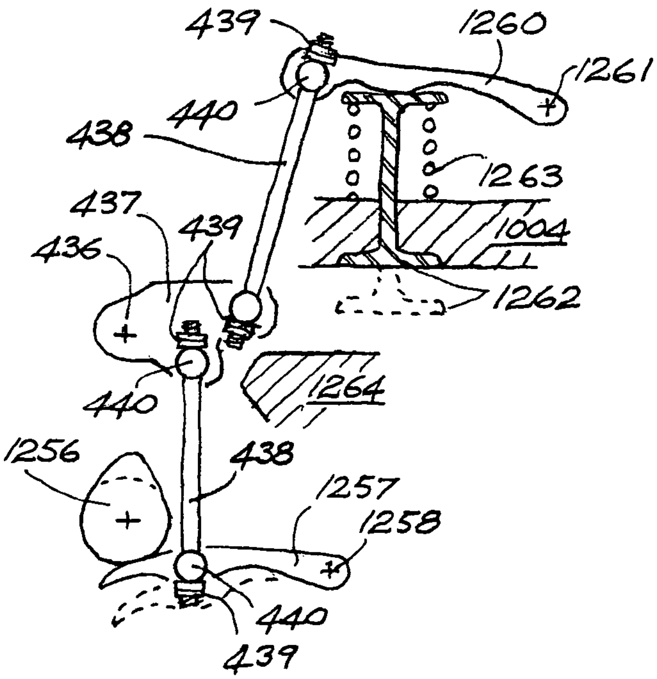
Figure 483:
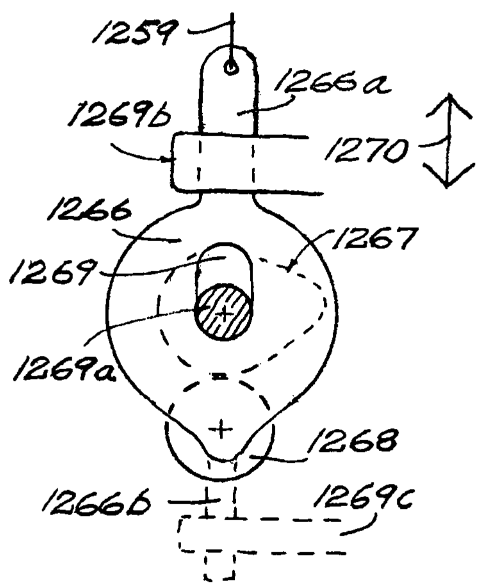

| | |
|---|---|
| FIG. 345 | shows schematically a marine craft powered by a hybrid propulsion system. |
| FIGS. 346 to 350 | show configurations of hydrofoil marine craft. |
| FIGS. 351 to 357 | show configurations of keel elements for hydrofoil marine craft. |
| FIGS. 358A to 364C | show configurations of hydrofoils for keel elements for marine craft |
| FIGS. 365 to 371 | show embodiments of extendable/retractable and/or rotatable hydrofoils. |
| FIGS. 372 to 384 | show configurations of integral hydrofoil posts and keel elements. |
| FIGS. 385 to 387 | show a marine craft having two telescopic hydrofoil posts. |
| FIGS. 388 to 395 | show layouts of hydrofoil posts and masts for a variety of marine craft. |
| FIGS. 396 and 397 | show an embodiment of a large rotatable hydrofoil post. |
| FIGS. 398 and 399 | show embodiment of large telescopic hydrofoil posts. |
| FIGS. 400 to 406 | show arrangement for passage of exhaust gases and other fluids through underwater marine propulsion systems. |
| FIGS. 407 to 409 | show embodiments of water-jets with co-axial motors or IC engines. |
| FIG. 410 | shows a nacelle containing an electric motor driving a propulsion device, with exhaust from an IC engine discharged behind the motor. |
| FIGS. 411 and 412 | show arrangement for mounting compound reciprocating/turbine IC engines in marine craft hulls. |
| FIG. 413 | shows a marine craft with a compound reciprocating/turbine IC engine mounted below the waterline. |
| FIG. 414 | shows a nacelle or housing containing a power module comprising a propulsion device driven by an electric motor, with an aft-mounted turbine stage. |
| FIGS. 415 and 416 | show a hull with alternative hybrid electric power arrangements. |
| FIGS. 417 and 418 | show power units on hydrofoils mounted to the lower part of a hydrofoil post. |
| FIGS. 419 to 422 | show closure devices for underwater fluid outlets. |
| FIGS. 423 to 425 | show example of laminar gas flow across below-water surfaces. |
| FIG. 426 | illustrates a basic embodiment of a continuously variable transmission (CVT) layout. |
| FIGS. 427 to 435 | illustrate various embodiments of a CVT system. |
| FIGS. 436 and 437 | show an embodiment of a variable diameter roller. |
| FIG. 438 | shows a relationship between two rollers. |
| FIGS. 439 to 449 | show details of a first roller embodiment. |
| FIGS. 450 to 453 | show details of a second roller embodiment. |
| FIG. 454 | shows details of an embodiment having a single cone per roller. |
| FIG. 455 | illustrates principles of movement of a belt over a variable-diameter roller. |
| FIGS. 456 and 457 | show cones having multiple portions. |
| FIG. 458 | illustrates further principles of movement of a belt over a variable-diameter roller. |
| FIG. 459 | shows a method of independent actuation of multiple cone portions. |
| FIG. 460 | shows schematically an arrangement for a CVT with electronically actuated variable diameter rollers. |
| FIG. 461 | shows how the basic CVT layout can be compounded. |
| FIG. 462 | shows schematically a CVT mounted in a vehicle. |
| FIGS. 463 to 468 | show a removable and replaceable engine package for a vehicle. |
| FIG. 469 | shows schematically an exhaust gas outlet on a small vehicle. |
| FIGS. 470 to 472 | show an embodiment of a variable diameter fluid inlet throat. |
| FIGS. 473 to 476 | show drive components for a hybrid drive tank which include removable and replaceable packages. |
| FIG. 477 to 480 | shows schematically layouts and systems for the removal of pollutants from exhaust gas using any suitable liquid, including water. |
| FIGS. 481 to 483 | show valve actuation devices which are principally loaded in tension. |
| FIGS. 484 to 491 | show improvements to current manifolds. |

-continued

Figure 492:
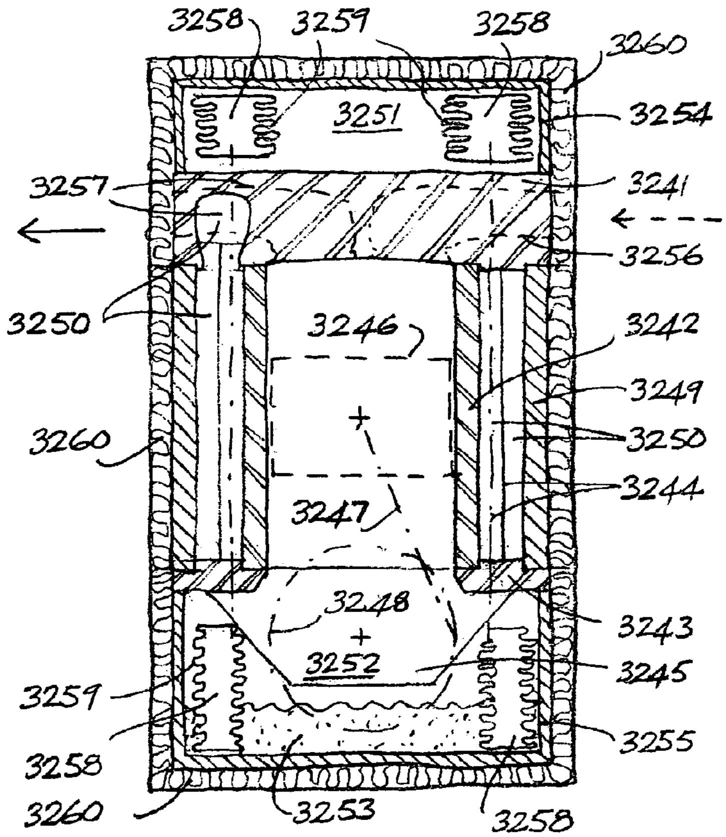
Figure 493:
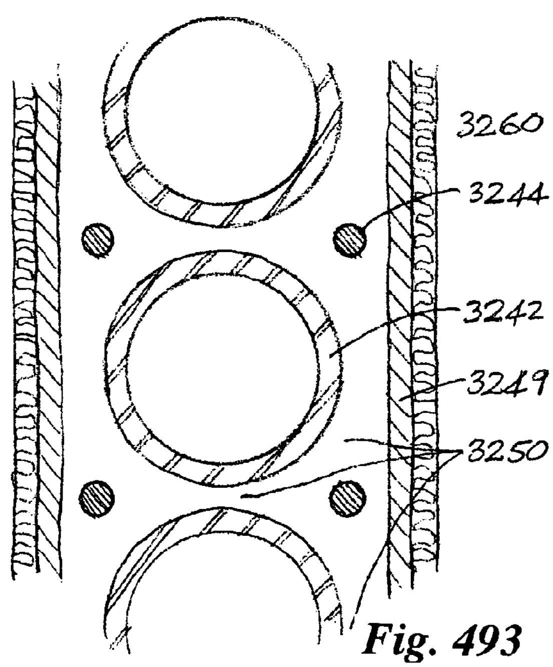
Figure 494:
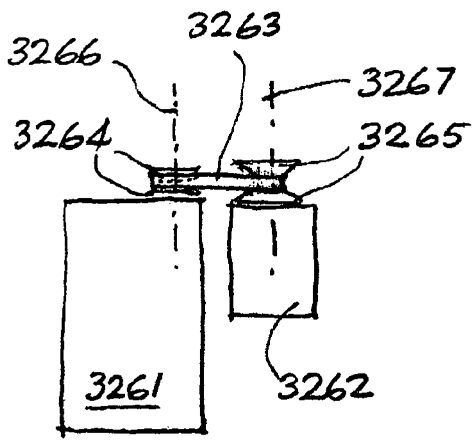
Figure 495:
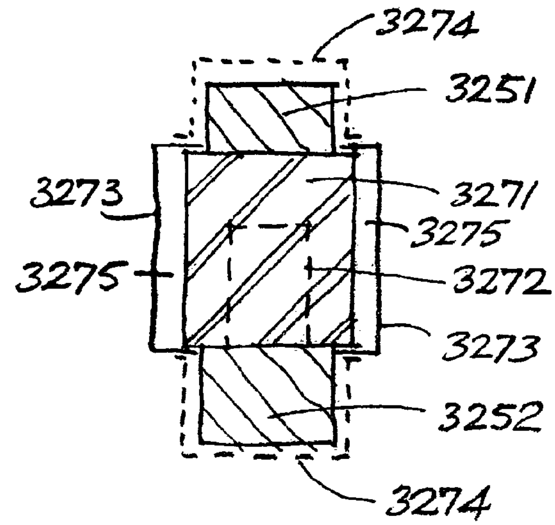
Figure 496:
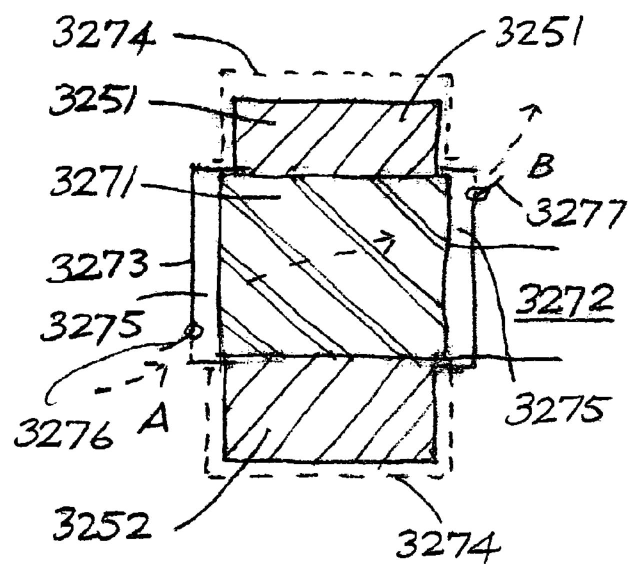

| | |
|---|---|
| FIGS. 492 and 493 | show examples of improved fluid cooling and charge air warming. |
| FIG. 494 | shows a variable ratio drive between an engine and a generator. |
| FIGS. 495 and 496 | show a schematic arrangement for an engine enclosure. |

DESCRIPTION OF THE INVENTIONS

An important objective of the invention is to provide at engines having greater power-to-weight ratios, power-to-bulk ratios, and substantially greater efficiencies than equivalent contemporary units. This is achieved by four principal means: (1) the rearrangement of the components associated with a single piston/cylinder into a more compact and simple configuration, (2) the reduction in most applications of the number of piston/cylinder assemblies required, (3) the substantial reduction of reciprocating masses, and therefore the reduction of size and mass of key structural components, (4) the virtual elimination of heat loss from the system, thereby increasing temperatures during combustion and therefore efficiency.

In order to raise the ambient temperatures in the combustion volume to increase thermodynamic efficiency, and in order to eliminate the dissipation of heat energy (part of the fuel energy) via general radiation and the cooling system, it is proposed to entirely eliminate conventional cooling in an engine designed for continuous operation and long life, that is to eliminate heat dispersed from combustion chamber walls by means of liquid pumped through engine block jackets to a heat exchanger, or by means of cooling fins and usual associated air blower. It is intended to construct engines to operate continuously in an un-cooled state, optionally housed in thermally insulating enclosures. Such engines will be suited to all applications, including for surface vehicles, marine craft, aircraft, rail drive, electricity generation and pumping. The features of the reciprocating internal combustion (IC) un-cooled engine here disclosed may, where appropriate, also be applied to engines operating on the Rankine or Stirling cycles, or to other internal combustion or steam turbine engines. As noted in the introduction, it is an important objective of the inventions to have engines run under the widest range of operating modes at close to the maximum temperatures they are designed to operated at, in order to increase efficiency and fuel economy and reduce CO2 emissions. This is something relatively easy to do with un-cooled, thermally insulated engines.

The un-cooled engine of the invention has no liquid coolant and associated equipment, nor will it need metal cooling fins. It has components constructed of any material suited to the environment found in the engine location in which the component is used. In selected embodiments, heat loss is substantially reduced by constructing engine/cylinder/piston components at least partly of materials having heat insulation properties. Combustion chamber components can be made of high-temperature metal alloys and/or of ceramic materials, many of which retain their structural performance at high temperatures. Ceramics are generally harder and more abrasion resistant than metals, and may be stronger, especially if reinforced. It is feasible, according to today's technology, that virtually all the components of an IC engine may be made of ceramic material, including such items as main bearings, connecting rods, etc. The un-cooled engine may be contained within a housing or casing made of insulating material, further limiting heat loss through radiation. The elimination of cooling will cause the temperature equilibria in the various components, and in fluids adjacent to the components, to rise significantly, to new higher temperature equilibria. The heat energy now not dissipated by the cooling system or by general radiation of engine components is converted to additional work on the piston, partly because more energy is now available for conversion, and partly because efficiency has increased due to the greater temperature difference between the incoming charge (that of ambient air and effectively constant) and the much higher combustion temperature. The exhaust gas is hotter and therefore contains more energy, making the addition of exhaust gas energy recovery systems more viable. Such systems include turbo-chargers, the addition of a second engine cycle such as steam cycle to create a compound engine, or the direct recovery of energy using thermoelectric or chemical technologies.

In a selected embodiment, the moving parts are of metal of a construction and type conforming to current practice, including the exhaust valve. Suitable metals include high-temperature alloys and stainless steels. Alternatively, some or all of the moving components can be of ceramic material, constructed and assembled in ways broadly similar to today's engine construction. FIG. 1 shows by way of example a schematic cross-section of an un-cooled engine, having a ceramic engine block 400, a ceramic cylinder head 401, at least one camshaft 402, at least one valve 403, intake port 404, exhaust port shown schematically in dashed outline at 404*a*, cam cover 405 optionally including thermal insulting material 405*a*, thermal insulation to cam cover 405, sump cover 406, fluid delivery device 407 or alternatively 407*a*, crankshaft 408, connecting rod 409, piston 410 and combustion chamber 411. The engine block, head and sump cover are shown as made of integral ceramic, in a selected embodiment of ceramic having significant thermal insulating properties. Alternatively, one or more of these structures can be of composite construction, for example with a ceramic interior portion mounted in a metal exterior casing, the materials being separated by a compressible inter-layer, such as ceramic mat. In selected embodiments, the composite construction includes a layer of thermal insulating material. A similar composite construction is shown for the exhaust reactors of FIGS. 183 through 187. All the moving parts can be of metal or, alternatively, some or all of them may be of ceramic material. Generally in this disclosure, "engine block' or "block" refers to the structure surrounding the piston and combustion chamber, including what is today referred to as a cylinder block. In the case of a metal cylinder block or head, the valves may be of metal and any of the ports may have a ceramic lining, as will be disclosed subsequently. Additionally or alternatively, the valves may be of ceramic material. Generally, ceramics are not as ductile and resistant to certain types of mechanical shock as metals. To reduce impact loads of valves returning onto their seat, an elastomeric component may be introduced, to partly serve as a shock absorber at valve closure. For example, a seating detail at the port is shown in FIG. 2, for cases where the elastomeric material requires some periodic lubrication. Here valve 403 seats against compressible seal 412, optionally lubricated from passage 413, in cylinder head block 401. FIG. 3 shows an alternative detail, where valve 403 seats against ring 414 slidably mounted in groove 415 containing, between ring and groove floor 416, a compressible cushion 417, optionally lubricated from passage 413, the cushion forcing the ring slightly outward when valve is lifted. If necessary the compressible material may be bonded to groove floor and/or ring member, to better prevent the latter leaving the groove. The compressible member may be constructed out of any suitable material, including ceramic fiber or mat. Components 412 and 417 can be designed to permit weepage of lubricant to the valve seat between valve 403 and components 412 and 414. Any suitable lubricant can be housed in a reservoir, which can be located anywhere in the engine system and connected to passages 413. Where supply of fluid for lubrication is not required, passages 413 can be eliminated. Additionally or alternatively, any of components 412, 414 and 416 can be coated or impregnated with substances having tribological or lubricating effect. The piston can be of metal, including of a heat resistant alloy such as nickel-chrome, or it may be of ceramic material, of some other non-metallic material. It may have ceramic piston rings, especially if reciprocating in a ceramic block or cylinder liner. Optional finning 410*a* at the bottom of the piston of FIG. 1 can transfer some heat to the crank volume 408*a*. Lubrication between piston and cylinder would be by any suitable substance, including those mentioned elsewhere herein. If lubrication were such as to easily pick up particles of say ceramic, which would damage softer metal bearing surfaces, then metal piston rings may be used to ensure that wear produces powder of the softer material, metal. A metal piston ring may be used between a ceramic piston and ceramic cylinder to ensure that the metal would wear and the resultant particles would not score the ceramic surfaces. Gaskets between ceramic components may be of ceramic, such as alumina or asbestos fiber or mat.

Figure 4:
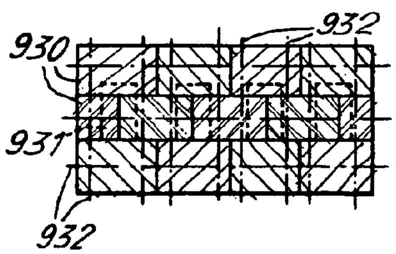

An un-cooled engine would be considerably lighter than conventional units, especially if components were of light, high alumina content ceramics. In these and the other embodiments herein, the elimination of the cooling system including fluids would lead to large cost, weight and bulk reductions, and so would further contribute to fuel savings, where un-cooled engines are used in vehicles. As will be shown later, selected embodiments have configurations that allow engines to be run much faster than current units, further improving power-to-weight and power-to-bulk ratios. The construction of engine blocks at least partly of insulating material and optionally encasing the engine in a housing of thermal and/or acoustic insulation would greatly reduce noise and vibration, thereby providing additional societal benefit. The insulated engine casings or blocks would greatly reduce heat build-up "under-the-hood" in automotive applications. An un-cooled engine may be constructed in any manner. If components such as ceramic are used, they will probably be relatively more difficult and expensive to produce in large pieces than in smaller ones. For this reason, the engine is preferably made up of smaller units which are assembled during construction of the engine. Diagrammatic elevation FIG. 4 shows, by way of example, an engine composed of multiple pieces 930, built up round combustion chambers shown dashed 931 and held together by means of bolts 932 loaded in tension. Suitable gaskets can be placed between the components, including those of ceramic fiber or mat. Regarding some of the stresses which may occur in the cylinder and head elements under high combustion chamber pressures, it is apparent that the tensile stress requirements of the components can be reduced if they are at least partly pre-stressed in compression when the engine is assembled. Such pre-stressing and loading in compression of assembled components is described elsewhere. The forces of expansion will first have to counterbalance those loads before stressing materials to their design tensile limits. For example, the entire piston/rod assembly can be pre-stressed in compression by a central link, as will be more fully disclosed subsequently. If air passages and movement about the pre-tensioning element are provided, then metal bolts could be contained within high-temperature ceramic piston/rod assemblies. Calculations have shown that there are presently a range of commercially available ceramic materials having sufficient strength to be used to build the components of the invention, allowing for typical engineering safety margins.

Figure 5:
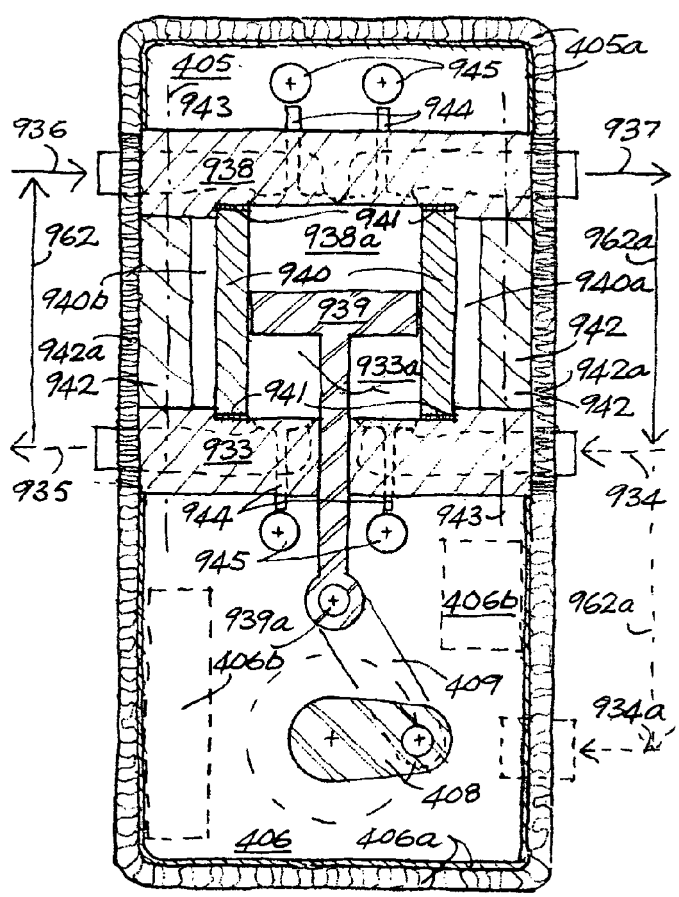
Figure 6:
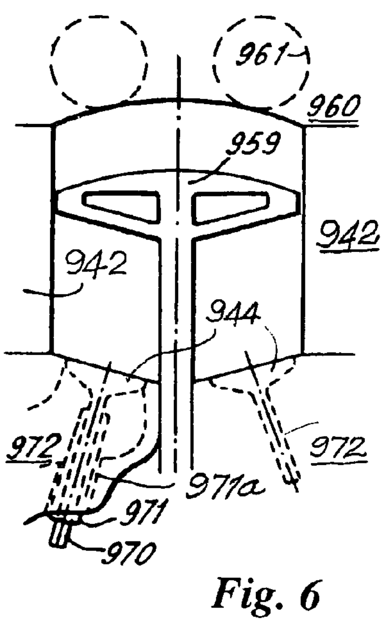

In a selected embodiments, there are two co-axial chambers worked by one piston. The two chambers both equally function as pumps, compressors or as the combustion chambers of reciprocating IC engines. Alternatively, they have different functions, including one as compressor and the other as combustion chamber, or one as combustion chamber and the other as steam expansion chamber. By way of example, FIG. 5 shows schematically an embodiment of engine having double head construction, to define a lower combustion chamber 933*a* and an upper steam expansion chamber 938*a*, with lower head 933 admitting inlet charge at port 934 and expelling exhaust at port 935 for internal combustion, with both gas flows shown dashed. The upper head 938 has inlet port 936 and outlet port 937 for steam cycle, with fluid flows shown solid. In assembly, the engine is built up about "T" shaped piston 939 and a cylindrical wall 940 common to both chambers, having seals or gaskets at 941, by means of spacer or alignment blocks 942 and tension bolts 943. Poppet valves 944 and cam assemblies 945, shown schematically in a valve gear enclosure 405 with a cam cover optionally having thermal insulation together 405*a*, are provided as needed to regulate fluid flows to the upper and lower working chambers. A crankcase, optionally with thermal insulation, together 406*a*, encloses a crankcase 406 housing a crankshaft 408 and connecting rod 409 linked to piston 939 at pivot center 939*a*, and optional thermal insulation 942*a* is applied to spacer blocks 942. Alternatively, the piston drives a crank via a mechanism including a scotch yoke, as is disclosed subsequently herein. A heat transfer system indicated schematically by arrow 962, for example in the form of steam heater or water boiler, is placed between ports 937 and 934, takes exhaust gas heat energy to create steam. Optionally, the cooler steam, after passing through the upper working chamber at 937, is passed through a regenerator system indicated schematically by arrow 962*a* to transfer some heat to all or part of the incoming combustion chamber charge at 934. Optionally, as shown on the right side, the spacer blocks may be separated from the cylinder by a volume 940*a* of trapped gas, to provide additional ithermal insulation. Optionally, as shown on the left side, the spacer blocks may be separated from the cylinder by a volume 940*b* for the treatment of exhaust gas, as disclosed elsewhere herein. In other embodiments, charge air is supplied via the crankcase as indicated at 934*a*, and/or ancillary equipment, such as an oil pump and/or a fuel delivery system, are housed in the crankcase, as indicated at 406*b*. In an alternative embodiment, the two cylinder head construction is used in engines with both sides of piston operative in the internal combustion mode. In another embodiment, FIG. 6 shows a combustion chamber/piston assembly similar to that of FIG. 5, but having a hollow mushroom-shaped piston head 959 having different domed profiles, reciprocating between ceramic heads 960 and 972 separated by a spacer block having a cylindrical hole 942. The upper head 960 has ball valves 961 similar to those described subsequently, the lower head 972 having conventional metal poppet valves 944. On the left is shown how the valve stem 970 reciprocates in a metal guide 971. Optionally between guide and head is a thin sleeve 971*a* of compressible and stretchable material, such as fibrous ceramic mat. The guide with sleeve is fitted to the block when the latter is a very much higher temperature than the guide and sleeve. When temperatures equalize to ambient a tight fit will ensue, as when the engine is cold. When it is warm, the typical greater co-efficient of expansion of the metal compared with the ceramic will ensure that the guide s an even tighter fit in the head.

FIG. 7 shows, by way of example, a means of fixing a mechanical assembly 946 of any material to a block or engine portion 947 of insulating material such as ceramic. A metal bolt 948 having load distributor head 949 is passed through a hole 947*a* in the component 947 and optionally spaced from it by a compressible interlayer 950*a*, of say fibrous ceramic. If the bolt has greater coefficient of expansion than component 947, then a strong spring 951 and washer 952 may be provided to keep contact between assembly 946 and block 947 at constant pressure with differential expansion of bolt and block. The washers may be spaced from the component by a second washer 950 of compressible material. FIG. 8 shows, by way of example, a method of fixing a metal bolt 501 with conventional threading to a ceramic head or other component 401, wherein a metal insert 502 having conventional female threading and very course exterior male threading of approximately sinusoidal cross section 503 is recessed in a depression 508 in the head or component 401, optionally flush with its surface 504. The depression has very course interior female threading 505 approximately corresponding to the threading 503. In a selected embodiment there is a space between the threading with is occupied by either a compressible material 506 and/or a substance 507 poured into the depression 508 to anchor the insert 502. The compressible material might be an aerated ceramic powder or ceramic fiber or mat. The substance 507 may be an adhesive applied in liquid form and left to harden or it might be a molten substance, such as metal, which will solidify on cooling. In the case of a metal, it should preferably be slightly softer or more compressible that either insert 502 or component 401. Alternatively, the space in the depression between insert and component may be filled by a powder or slurry mixture of ceramic and metal, and the assembly re-fired or heated to a temperature just below the melting temperature of the insert, allowing the mixture to harden. The metal in the mixture will tend to cause it to be somewhat softer and more ductile than the surrounding ceramic, and more able to absorb loads causes by differential expansion during heating. If the assembly is subject to cyclic heating/cooling and the coefficient of thermal expansion of the insert is greater than that of component 401, then either substance 502 or material 506 will compress slightly when the assembly is hot. It is preferred that the course "threading" of insert 502 and depression 508 has a cross section consisting of progressively rounded shoulders 509 without sharp edges or changes of direction shoulders, and that these shoulders carry any perpendicular loads 510 associated with bolt 501. If the gap between insert and depression is relatively large, as shown here, "threading" may not be required, and may be replaced by a series of circumferential projections and depressions in the depression an on the insert. As can be seen, here insert 502 can be located within depression 508 without turning, as would be necessary with a smaller gap and threading. By the above and other techniques, including those disclosed subsequently, an engine can be constructed partly of metal, partly of ceramic and partly of thermal insulting material.

Ceramic engine block/cylinder/cylinder head construction leads to the introduction of several beneficial features. Passages and chambers to transmit substances such as fuel, air, steam, water, etc., may be incorporated within the block(s), perhaps to embody the principles outlined elsewhere herein, in a manner to ensure the transmission of substances at the desired temperature and/or pressure, according to distance of passage from combustion volume. For example, fuel delivery galleries can be located in a cylinder head or similar component, of ceramic or any other material, near the combustion chamber surfaces at a warm part of the component, so that the fuel may to a degree be heated before delivery into the combustion chamber. Alternatively or additionally, electrical circuits can be incorporated in the body of the block, since ceramic can be an electrical insulator. Such circuits may connect to electrodes or points, say of carbon, in the cylinder head, to produce a spark without the need for conventional plug, where such spark is desired. Circuits may be connected to an electrically driven fuel injector or other device, eliminating the need for today's exterior wiring. High voltages may be employed to give larger sparks, say arcing through substantial dimensions of the combustion volume, without fear of these large sparks shorting against a metal block. Such circuits could be incorporated by the pouring or stuffing of molten fluid metal or other conductive material into passages already formed in the manufactured ceramic block or head, or filling such passages with conductive material in powder form and re-firing or re-heating the ceramic with the conductive material assembly. FIG. 9 shows by way of example an electrically operated fuel injector 477 shown hatched having a solenoid portion 487 and a fuel delivery portion 488 mounted in a depression 478 in ceramic cylinder head or similar component 401, partly defining combustion chamber 493. The injector is attached by any convenient fastening means. By way of example, here it is a holed strap 489, bolts 490 and compressible washers 491. The injector may be of any convenient type that is currently being manufactured, including one where a solenoid opens and closes a valve to supply high-pressure fuel at moment of injection, or it could of the type wherein the solenoid activates a plunger in an internal fuel chamber or reservoir at moment of delivery, with fuel supplied to the reservoir at low pressure. Fuel supply galleries 479 communicate with a fuel heat-acquiring chamber 480, both shown dashed, and communicate with a fuel entry port or optionally annular gallery 481 in the injector, which is seated on a compressible seals 482. The size of chamber 480 and it proximity to the combustion chamber 493 will determine the extent to which the fuel is pre-heated prior to injection. A similar gallery or port may be provided at 483 for fuel return flow, shown dashed at 492. The component has electrical circuits at 484 terminating in contact areas 486 cast or built into component 401. These communicate with connectors 485 on the injector 477 when it is installed, to power a solenoid located at 487. In a selected embodiment, a circumferential volume 494 is formed when the injector is mounted in the head, which can be supplied by cooling fluid, including air, via passages 495, shown dashed. The windings of the injector solenoid may be mounted so as to be wholly or partly exposed to this cooling fluid.

A combination of multiple engines whose outputs are in some way linked is known as a compound engine. Generally in compound engines, exhaust gas energy from an internal combustion engine is used to power one or more other engine(s), which may pool work with the first engine by means of mechanical linkage, or by the partial integration of the two engine cycles to produce work on common components, such as one or more pistons, or a crankshaft. Such other engine may operate on any cycle, steam, Stirling or turbine cycles. Alternatively, heat from the exhaust gases can be used to directly generate electricity, using thermoelectric conversion technologies. An exhaust gas handling volume, whether an emissions reactor assembly mounted to or within an internal combustion engine, or an internal or external exhaust passage or pipe, may have incorporated within the volume—whether associated with conventional or un-cooled engines—a heat exchanger, so that the heat of the exhaust gases can be used for some other function. In a vehicle, aircraft or marine craft, it could be used for occupant heating. Alternatively or additionally, the heat energy of the exhaust gases that is passed through the heat exchanger may be used to derive further work, for example by powering a steam or Stirling engine, or it might be transferred to an accumulator or energy storage system. Fluids useable in the heat exchanger to transfer heat energy include air, other gases, water in liquid form or as steam or superheated steam, or other liquids. FIG. 10 shows diagrammatically one possible configuration, where an engine block 418 having exhaust ports 419 discharges hot exhaust gases 420 past finned members 421, having hollow passages shown dotted at 422 communicating with lower linking passage 423 and upper linking passage 424 formed in an exhaust emission control reactor housing 425 and having access to, respectively, fluid entry means 426 and fluid exit means 427. Such heat exchangers could be made of any suitable material having high conductivity, including ceramics such as silicon nitride or metals such as the nickel alloys, which may be such as to have catalytic effect. The heat exchanger may effectively constitute filamentary material, as described subsequently. Alternatively, the heat exchangers may be placed elsewhere in the exhaust system of an IC engine, including downstream of a reactor assembly. If the heat exchanger were part of a separate mechanical power unit, such as a steam, Sterling or turbine engine, then the latter could be directly or indirectly coupled to the first unit—the IC engine—by direct drive. If the IC engine is used in an automotive application, the power requirements of the stop/start nature of operation may not always conform with the more constant outputs the regular supply of exhaust heat and possible working fluid pressure will provide from the second power unit. Therefore the second unit may be connected to the first unit and/or be connected to and put work into an energy storage device, such as a flywheel, or a reservoir containing gas under variable pressure. The connections can be by any convenient means, including drive shafts, differentials, etc. An example of such an embodiment is shown schematically in FIG. 11, where 428 is an IC engine, 429 the reactor/heat exchanger assembly, 430 the second engine, 431 the differential and 432 the accumulator. Drive shafts are provided at 433, so that by control of the differential or by other means the flow of work from the second engine can be distributed between the first engine and the accumulator, as needed. Optionally, one or more variable ratio transmissions are included, in any convenient location including at the ends of drive shafts 433 and 432, as shown schematically dashed at 433*a*. The accumulator may optionally be linked by passage 434 to first engine 428. The accumulator may comprise a fan or other device compressing gas, such as air, to be stored in an associated reservoir shown dashed at 432*a*, in which case the bleed off of fluid to first engine 428 under certain operating modes, such as acceleration, may result in improved performance or fuel economy. If the accumulator is a device used to compress charge air in a reservoir, with the pressurized air used to boost IC engine performance during selected operating conditions, then the fuel system can be designed to deliver fuel in proportion to the pressure, and therefore mass, of air being supplied, and so maintain an approximately constant air/fuel mixture, if desired.

Fluids from an accumulator or second engine may be used to operate the exhaust and/or compression strokes of the first engine, thereby embodying a composite engine, or it may be employed to operate some pistons of a composite engine having other pistons operating on the internal combustion cycle. If the fluid is required to act on the piston common to an IC engine system, such a piston is preferably of T-shaped configuration, as shown diagrammatically in section FIG. 12, where a piston having hollow head 450 reinforced by flanges 451 is attached to hollow stem 452, and is slidably mounted in a cylinder 453 by means of piston rings 453*a* and bearing 454 notched to accommodate piston flanges. The piston separates IC operative combustion volume 455 and alternate working volume 456. Piston stem communicates to crankshaft 457 via big end bearing 458, connecting rod 459 and gudgeon pin 460 according to known practice. Valves and ports may be provided in any convenient manner, including as disclosed herein. The fluid, such as steam, of the alternate system may be further cooled (heat will have been given up if expansion has taken place) by passing through another heat exchanger, say converting such heat into electrical energy or mechanical energy. By way of example, a layout suitable for combining a reciprocating IC engine and a Stirling engine in a compound engine is shown schematically in FIG. 13, where the Stirling portion is indicated above “A”, and the reciprocating IC portion above “B”. Charge air 521 enters IC engine head 401 through port 404 and is admitted to combustion chamber 411 via cam 402 and valve 403 mechanism, to power piston 410 reciprocating in cylinder 400, to drive crankshaft 408 via connecting rod 409. Exhaust gas is expelled via port shown dashed at 404*a* to enter an exhaust gas reaction volume 522, and proceeds from there in direction 523 in preferably insulated passage 524 to volume 525 in the Stirling engine. In a stand-alone Stirling engine, 525 would be a combustion chamber were fuel is burnt to create hot air 526 to pass across heating tubes 527, but in this embodiment the hot exhaust gas 526 from the IC engine is passed over heating tubes 527. After it has heated the Stirling working gas in the tubes, it may optionally be passed through an exhaust gas regenerator 528, before being discharged to the atmosphere. Heat reclaimed via the regenerator may be transferred to IC engine air intake regenerator 540 via flow path 529, optionally to heat the charge air. Pre-heating the IC engine charge will tend to increase over-all compound efficiency, while slightly decreasing the amount of work the IC engine generates, since the incoming hotter charge will have less mass. The decrease in IC engine work can be compensated for by providing an electrically or exhaust gas driven super-charger, or a turbo charger, or by increasing the charge boost of a system already in place. The working gas of the Stirling cycle is indicated by double-headed arrow 531 and is cyclically shuttled between cooled chamber 532 and hot chamber 532*a*, via the heating tubes 527, Stirling regenerator 533, and cooler 534. Stirling coolant flow through volume 534*a* is indicated in at 541 and out at 542. A rhomboid drive 535, as is typically used in some Stirling engines, links the displacer piston 536 to the power piston 537, in which it is slidably mounted. Work generated by the Stirling cycle is transferred by the rhomboid drive to two contra-rotating gears or disks 538. Optionally, these gears or disks may be linked to the IC engine crankshaft 408 by some mechanical means, in this embodiment by at least one intermediate gear 539. The structural assembly housing the hot chamber, the cold chamber, the displacer piston, the power piston and the Stirling cooling system has been shown as one integral body, shown hatched at 543. In practice it is likely to consist of a series of components held in assembled condition by fasteners. Optionally, at least one these components may be of ceramic material. Such material may have low thermal conductivity where in contact with the Stirling working gas in the hot or cold chambers, and/or it may have high thermal conductivity where in contact with the Stirling working gas in the heat transfer zones, such as the cooler 534 and/or the heat transfer tubes 527.

A heat exchanger located in the exhaust gas flow of an IC engine may comprise part of a turbine engine cycle, as shown diagrammatically by way of example in FIG. 14. A reciprocating IC engine 467 has exhaust gas 468 passing through reactor 469 across heat exchanger 470 to drive fan 471, which is linked by shaft 472 to drive turbine compressor 473, to pass compressed turbine working fluid 474 via passages 475 through reactor heat exchangers 470, allowing heating of turbine working fluid to occur. A fan associated with the reactor may drive a compressor used for any suitable purpose, including the provision of a compressed fluid to an accumulator and the provision of boost to engine inlet charge. FIG. 15 shows a schematic arrangement for a gas turbine engine mounted in association with a reciprocating IC engine 900, in such a manner that the exhaust gas from engine 900 provides a means of partially or wholly heating the gases of turbine engine 901, wherein turbine working gas passes in direction of arrow 902 through intake 903, low compression stage 904, high compression stage 905, heating stage 906, turbine stage 907 and exhaust stage 908. Reciprocating IC engine exhaust gas passes through one or more heat exchangers 909*a*, optionally located in stage 906, to be discharged at 909. In an alternative embodiment, the hot reciprocating IC exhaust is discharged directly into the turbine stream, as shown dashed at 910*a*. If the IC exhaust is at lower pressure than that in high pressure stage 906, then it may be optionally compressed beforehand by separate compressor 910. In another alternative embodiment, the reciprocating IC exhaust is directly fed into the turbine in a lower pressure stage, as shown schematically dashed at 911*a*. A combination of both systems may be used, as may supplementary fuel combustion system in stage 906, as shown at 911. A schematic arrangement similar to that shown in FIG. 15 may be used to provide a combined steam turbine and internal combustion engine. In a selected compound engine embodiment, the turbine combuster is eliminated and hot IC exhaust is fed directly into the turbine compressor. The turbine portion of the compound engine may be single stage, or multiple stage. By way of example, FIG. 16 shows schematically a compound engine having a single stage turbine shown above “A” supplied by exhaust from an single- or multi-cylinder reciprocating IC engine shown above “B”. The IC engine may be constructed in any manner, including as disclosed herein, and may be conventionally cooled, partially cooled or entirely un-cooled. Ambient air 553 enters IC engine 550, having crankshaft rotating about axis 551, through air intake at 552. Fuel is supplied at 557, mixed with air and burnt in the combustion chamber(s) to produce work on crankshaft 551, IC engine exhaust gas 554 passes through an exhaust processing volume or reactor or other passage 555, then through an optional filter 556 to turbine entry plenum at 558. It is then compressed by turbine compressor 560 mounted on turbine shaft 561 to pass through housing or passage 562 to be directed by stator blades 563 onto turbine blades 564 mounted on turbine wheel 565, in turn mounted on turbine shaft is 561. The IC engine exhaust gas then again passes through housing or passage 562 to be expelled into the atmosphere at 559. Reduction gears 566 transfer work to turbine output shaft 567 which, in this embodiment, is directly linked to crankshaft 551, which therefore transmits work from both parts of the compound engine. Alternatively, turbine output shaft may be indirectly linked to the crankshaft by any means, including reduction gearing, or it may not be linked at all. Work from turbine output shaft may be used to power an electrical generator or any other system or engine, shown schematically at 568, whether or not it also transmits work from the IC engine crankshaft. In an alternative embodiment, variable ratio gearing is provided between turbine shaft and engine shaft, and optionally any shafts driving ancillary systems, as shown schematically by bracket 566*a*. If the shaft 561 is not linked to IC engine crankshaft 551, work from that shaft may be used to drive a separate electrical generator or any other system or engine, shown schematically at 569. Either generator 568 and/or generator 569 may additionally function as starter motor(s). Optionally, before gas leaves the turbine enclosure it may be passed across exhaust regenerator 570, with heat energy transferred via routing 572 to IC engine air intake regenerator 571, optionally to heat incoming IC engine charge air. In the selected embodiment, the only fuel supplied to the compound engine is that delivered to the reciprocating IC engine at 557. In another embodiment, if the gas in the plenum 558 is not hot enough, combustion chambers, shown dashed at 573, may be incorporated within the turbine housing, with some additional fuel supplied at 574 to provide additional heating to the turbine working gas. The separate fuel required for the turbine will be far less than if it were ingesting ambient air, instead of the hot reciprocating IC engine exhaust. It may be that, after leaving compressor 560, the exhaust from an un-cooled IC engine may be so hot due to the additional work of compression, that it may damage the stator or turbine blades. Optionally in that case, ambient air can be supplied via intake 574, fan or impeller 575, duct 576 through filter 556 to the turbine intake plenum 558. In a further embodiment, the turbine compressor 560 may be eliminated, by tuning the reciprocating IC engine to provide exhaust gas at sufficient pressure to power the turbine via stator blades 563 and turbine fan blades 564. In the case of four stroke engines, this is relatively easy to accomplish, by adjusting the exhaust port to open somewhat earlier than is normal, when the gas in the combustion chamber is at higher pressure. This will be easier still in entirely un-cooled engines, where gas pressures and temperatures can be double or more than those in today’s conventionally cooled engines. In two stroke engines, a two stage exhaust system can be provided, as will be disclosed subsequently, to provide both high pressure exhaust for a turbine and low pressure exhaust to facilitate scavenging.

In another embodiment, the reciprocating engine of the invention forms one stage of a compound engine having three or more stages, including any other stages, such as a turbine stage, a steam engine stage, and/or a Stirling engine stage. In further embodiments, any of the stages of a compound engine having the reciprocating engine stage of the invention are separated by any appropriate equipment or mechanism, whether or not any of the shafts of the stages are co-axial, mechanically linked or are the same. For example, the stages can be separated by a thermally insulated passage for exhaust gas, a starter motor, by a transmission as indicated schematically at bracket 566*a* in FIG. 16, and/or by one or more exhaust processing systems of any kind, including those for the removal of particulate matter, hydrocarbons, carbon monoxide, nitric oxides and/or carbon dioxide. In further embodiments, any of the stages of a compound engine having the reciprocating engine stage of the invention are separated by any variable ratio transmission, including any of the transmissions disclosed herein. The rotating shafts of different stages of a compound engine are likely to have different optimum rotational speed ranges, so if power is to be transmitted between stages, transmissions can be used to transfer power between shafts rotating at different speeds. In an important embodiment, disclosed more fully elsewhere herein, a turbine engine stage is substantially removed from a reciprocating IC engine stage and linked to it by an optionally thermally insulated passage for hot high pressure exhaust gas.

In another important embodiment, disclosed more fully elsewhere herein, a single reciprocating engine stage of a compound engine supplies hot high pressure exhaust gas to two or more turbine engine stages, optionally located relatively remotely from the reciprocating stage. To give an idea of some possible layouts and configurations, three examples are illustrated very schematically in FIGS. 17 through 19, in which flow of air is indicated by un-numbered solid arrows and flow of exhaust gas by un-numbered dashed arrows. In the compound engine of FIG. 17, a reciprocating stage 574 with main power shaft 576 is coupled to turbine stage 575 with power shaft 577, via transmission 578 linking the shafts. Air for the reciprocating stage enters via the transmission, optionally to cool it. Hot high pressure exhaust gas leaves the reciprocating stage to enter an exhaust gas treatment system 579, including as disclosed herein, and from there goes via plenum 580, optionally including another exhaust treatment system, to power the turbine stage. Optionally a third, bottoming-type stage is added at 584. Since the shafts are linked via the transmission, power from the whole compound engine can be taken off at one location, here at 581. The compound engine of FIG. 18 is broadly similar to that of FIG. 17, with a reciprocating stage 574 with main power shaft 576 coupled to turbine stage 575 with power shaft 577, via transmission 578 linking the shafts. Air for the reciprocating stage enters via the transmission, optionally to cool it. Hot high pressure exhaust gas leaves the reciprocating stage to enter an exhaust gas treatment system 579, including as disclosed herein, and from there goes via plenum 580, optionally including another exhaust treatment system, to power the turbine stage. Hot exhaust leaves the turbine stage and then passes, via another exhaust treatment system 583, to a steam engine stage 584 having main power shaft 586. Shaft 586 optimally rotates more slowly than shaft 577, so a secondary transmission 585 is located between turbine stage and steam stage. The main transmission has a third shaft 582, connected to the other two shafts, which serves as the main output shaft for the compound engine, and power can be taken off at either end, indicated at 581. FIG. 19 shows a layout for a compound aircraft engine, with direction of normal aircraft movement indicated at 595. A reciprocating stage 574 with main power shaft 576 is coupled to turbine stage 575 with power shaft 577, via transmission 578 linking the shafts. Hot high pressure exhaust gas leaves the reciprocating stage to enter an exhaust gas treatment system 579, including as disclosed herein, and from there goes via plenum 580, optionally including another exhaust treatment system, to power the turbine stage, which creates thrust at 590. The reciprocating stage drives a propeller, only partly shown at 587, which creates thrust at 589. A starter motor 597 is located between propeller and reciprocating stage. Air scoops are provided to cool the starter motor at 591, to provide air to the reciprocating stage at 592, to cool the transmission at 593, and to provide extra and/or by-pass air for the turbine at 594. Shafts 576 and 577 are approximately co-axial, but are not directly linked. Instead, they are linked via lay shaft 581, each to it by means of a basic version of the continuously variable transmission of the invention, as disclosed subsequently herein. Each linkage comprises two variable diameter rollers, one on each shaft, linked by an endless belt 595, and each has a similar ratio variation range. Connected in this way, the variation ranges are multiplied to give a wide speed range between power shafts 576 and 577. This can be useful in many situations. For instance, when starting, the rpm of the turbine is set to a low range relative to reciprocating engine, so the slowly-turning turbine does not impose significant inertial loads on the starter. In any case, the reciprocating engine is cold, and the initial exhaust gas will be relatively cool and contain little energy to power the turbine. As the engine warms up, turbine shaft speed is increased relative to that of shaft 576. In another situation, if power is suddenly applied, there is a time lag before the extra hot gas gets to the turbine, and during this time lag only the rotational speed of the reciprocating stage is increased while the turbine shaft speeds remains unchanged. The variation of relative speed between the shafts is also useful during certain operating modes, especially in aircraft with variable pitch propellers, including climbing, acceleration, deceleration, etc. The features of the preceding and following sections illustrate by way of example the many ways an un-cooled engine may be constructed. Any type of piston or valve may be used in an un-cooled engine and the engine portions may be assembled in any manner. The features of the un-cooled engine have been described mainly in relation to internal combustion engines. Where appropriate, they may be applied to any type of engine, including for example steam and Stirling engines. The features relating to heat exchangers may be embodied in any type of engine, including conventionally cooled engines. Where appropriate, features described herein may be applied to pumps. By "un-cooled" is meant engines having restricted or no cooling, compared to general current production engine practice and includes engines with partial cooling. It is to be emphasized that the various features and embodiments of the invention may be used in any appropriate combination or arrangement.

Figure 25:
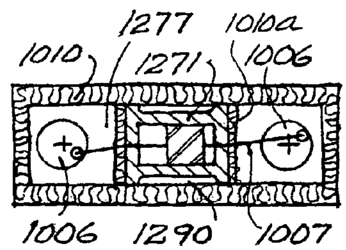
Figure 26:
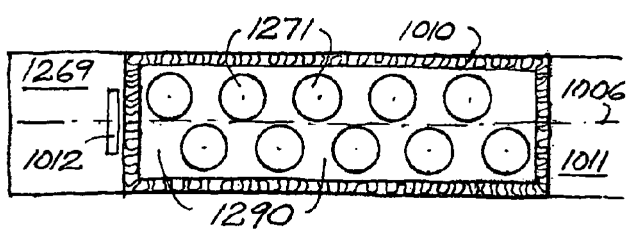
Figure 27:
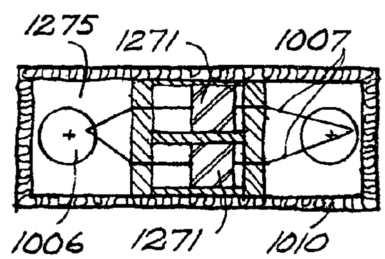
Figure 28:
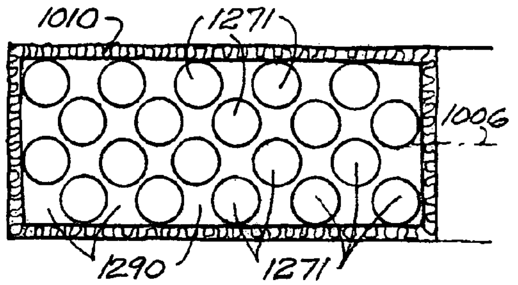
Figure 29:
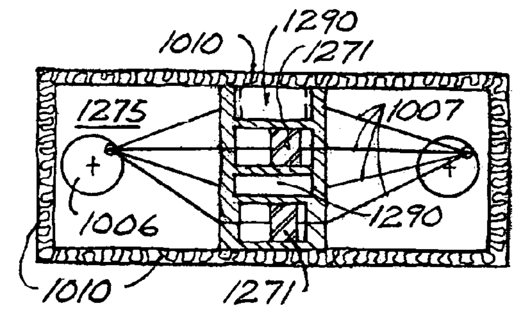
Figure 30:
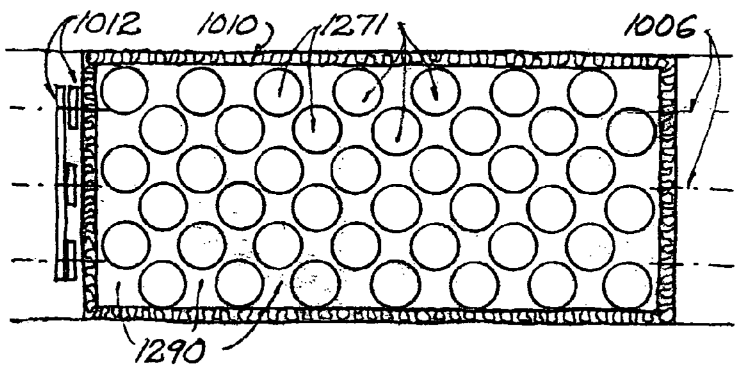

A selected embodiment of an un-cooled engine is illustrated schematically in FIG. 20. It consists of a piston 1001 reciprocating between two combustion chambers 1002 at each end of a cylinder 1003 closed by two heads 1004, with a crankshaft 1006 in a crank volume 1275 outboard of each head, the piston being connected by tensile members 1007 to both crankshafts. In a further embodiment, the crankshaft also functions as a camshaft for any purpose, including to actuate valves and/or to actuate fuel delivery. Fuels and other fluids for the charge may be delivered to the combustion chambers under pressures and temperatures higher than normal in conventional engines. The cylinder is at least partially surrounded by an exhaust gas processing volume 1008, with exhaust gas being conducted to the volume by alternative paths shown dashed at 1005 and 1009. Charge intake, indicated schematically chain-dashed at 1276*a* to the combustion chamber is via the crankcase. Surrounding the engine is a thermally insulated casing 1010, here functioning as structure enclosing volume 1008. This configuration is suitable for four and two stroke embodiments, consuming fuel ranging from gasoline and similar lightweight fuels through diesel and heavier oil fuels to coal and other slurries or powders, as well as gaseous fuels such as natural gas, liquid petroleum gas and hydrogen. In an alternative embodiment, suited to two stroke engines, gases are exhausted via ports about the center of the cylinder. For example, in the two cycle form illustrated schematically in FIG. 21, which has a similar cylinder 1003 and head 1004, pressurized charge air is ducted via crankcase 1275 and valve 1276, actuated optionally by combined crankshaft/camshaft 1277, to combustion chambers 1288 serviced by fuel injectors 1278, displacing exhaust gas which exits the chamber via ports 1289 to circumferential exhaust gas processing volume 1290. Insulation 1010 is shown around the crankcases and engine of FIG. 21, and may optionally be provided between head 1004 and crankcase 1275 as shown at 1010*a*. In another embodiment of either a two- or four-stroke engine, FIG. 22 shows schematically by way of example a piston/cylinder module 1271 linked to a single crankshaft 1272 by tensile elements 1273 routed about guides/bearings/rollers and/or wheels 1274. Any engine lubrication and/or bearing system may be employed, but optionally either gas or roller needle bearings are used, perhaps with water or other liquids, in the case of water preferably when the components are of ceramic material, as described later. In a selected embodiment, the crank assembly is preferably so designed that any air bearings may at least partially operate, during some portion of a cycle, at a pressure equivalent to the charge pressure of forced induction, in the case of turbo-charged, supercharged or force-aspirated engines. An important advantage of the layout of FIG. 21, wherein charge is provided via the crankcases 1275, is that there are no separate crank case emissions which need to be treated. Any blow-by and lubricant vapors are carried back into the combustion chamber and from there go into an already in-place exhaust gas treatment system, including a system as disclosed subsequently. In reference to the any of the Figures, insulation is generally shown and described as thermally insulating material. In any alternative embodiment, the thermal insulating material can be wholly or partly supplanted, replaced or enhanced by the provision of an enclosed partial or nearly whole vacuum to provide thermal insulation In further embodiments, the layouts described above are modified to be arranged in multiple cylinder form, including in a "flat" configuration. In FIGS. 23 through 32, like features are similarly numbered. FIGS. 22 through 40 are all schematic and do not show valve guides and springs, fuel delivery and exhaust systems, etc. By way of example, plan section FIG. 23, longitudinal section FIG. 24 and cross section FIG. 25 show schematically five piston/cylinder modules 1271 with ten combustion chambers arranged about two crankshafts 1006 in two crankcases 1275, connected at one end to a transmission 1011 of any kind including as disclosed subsequently, with the crankshafts optionally mechanically linked by the transmission, and at the other end driving ancillary systems 1269, such as a turbo-charger, with the crankshafts optionally or alternatively mechanically linked by system 1012. The space surrounding the cylinders can be used as an exhaust processing volume 1290, similar to that shown in FIG. 21. Thermal insulation 1010 surrounds engine and crankcases, with optional additional thermal insulation provided at 1010*a* between head portions of modules 1271 and crankcases 1275. Other embodiments are shown by way of example in FIGS. 26 through 32, As previously, there are indicated schematically twin combustion chamber piston/cylinder modules at 1271, optionally thermally insulated engine casings at 1010, crankshafts or their axes at 1006, mechanical linkages 1012 for multiple crankshafts 1007, spaces for ancillary systems 1269 or transmissions at 1011. Locations of systems 1269 and transmissions 1011 are interchangeable in FIGS. 23 through 31, and may alternatively be in any other convenient location. Linkages 1007 are principally loaded in tension. In alternative embodiments they may be principally loaded both in tension and in compression, or be principally loaded in compression. In an alternative configuration, shown in schematic longitudinal section FIG. 26 and cross-section 27, a double row ten cylinder engine is shown. Any number of rows and cylinders can be combined between two crankshafts. Optionally, the tensile elements 1007 tare lengthened to accommodate more rows. In FIGS. 28 and 29, a schematic cross-section of a four row engine of eighteen cylinders and thirty-six combustion chambers is shown, where tensile and/or compressive members 1013 and 1014 are of unequal length. In the embodiment of FIG. 29, the outer pistons optionally have a different stroke than the inner pistons. In alternative embodiments, more than two crankshafts can be employed. By way of example, longitudinal section FIG. 30 and cross-section FIG. 31 show schematically a six row forty-two cylinder, eighty-four combustion chamber engine. It will be noted that these configurations are most practical if the engines are un-cooled or adiabatic, but they may alternatively be wholly or partly cooled. In a selected embodiment, the crank links are connecting rods loaded in both compression and tension and a single crankshaft is used. By way of example, schematic FIG. 32 shows a two row engine, having at least one pair of twin-combustion-chamber cylinder modules 1271, a single combined crank/camshaft 1015 and two camshafts 1016, various valve actuation rods 1276, and circumferential exhaust processing volumes 1290. Charge air delivery is via both crankcase 1271 and valve actuation volume 1016*a*. Thermal insulation 1010 surrounds engine, crankcase 1275 and valve actuation volume 1016*a*, with optional additional thermal insulation 1010*a* provided between head portion of modules 1271 and valve actuation volume 1016*a*. The engines of the invention may operate in the two stroke mode or the four stroke mode. FIGS. 33A and 33B show how the basic configuration of a piston 1102 having a combustion chamber at each end and reciprocating in a cylinder assembly 1103 can be used for four stroke and two stroke engines respectively. The intake phase is shown at 1111, compression at 1112, expansion at 1113, exhaust at 1114. Direction of piston travel is indicated by the arrow below each numbered portion of the Figure. In the case of the two stroke engine, only net loads are transferred to crank; in the case of the four cycle alternately net and gross loads are taken up, suggesting that for a given number of cylinders the two stroke will be smoother running. The basic cylinder modules may be combined to form a "ring" engine with the interior space optionally used for a turbine or ram jet or other engine to form a compound engine having a single revolving system. By way of example, schematic sections FIGS. 34 and 35 show three rings between outer casing 401 and inner casing 402, each of four piston/cylinder modules 403 linked by common crankshafts 404 and tensile members 405, with hot exhaust gases 406 providing at least partial energy for the ramjet or turbine 407, either directly or via heat exchangers as disclosed elsewhere herein. Ambient air flow is shown at 410. The work from the reciprocating portion of the engine—shown at zone 408—may be used to drive any engine or mechanism, or it may power the compressor of the turbine portion or may, as shown schematically at 409, drive a fan, propeller or Archimedes screw to provide thrust, either through air, or through water if the engine is used as a marine drive system.

The above piston/cylinder with twin working chambers and twin crankshafts concept, and the tensile links between the crank and piston concept, are interrelated. Singly and together, they provide significant advantages. Substitution of the heavy connecting rod and its bearing at the piston by the much lighter tensile member entails that the crank can be pulled, rather than pushed. With two combustion chambers acting on one piston, less loads are transferred through the crank, permitting lighter construction. This is especially true in the case of two-stroke engines, where virtually only net work and therefore loads are transferred to the crankshaft, since part of the work of expansion is transferred through the piston to provide most of the work of compression. If the tensile link is used, the desirable slack will generally cause the piston to "float" toward the end of the first chamber's expansion stroke, a transition ensuing after combustion expansion is substantially complete, causing the piston to pull one crankshaft and subsequently being pulled by the other crankshaft, to effect final compression of the second chamber. A significant portion of the loads of piston deceleration will be taken up by the compressing charge and will not be transferred to the crankshaft, permitting lighter construction. Because of the constant line of the tensile member between heads, the piston is much less subject to side loads and torque, simplifying piston bearing and seal design. The arrangement of the exhaust processing volume adjacent to the cylinder eliminates heat loss from the cylinder walls to outside the system. If the volume is properly insulated, exhaust temperatures will more closely approach mean combustion chamber gas temperatures, reducing thermal stress on the cylinder. Likewise, the piston has two opposing work faces, and consequently will have shallower temperature gradients than conventional pistons. In the two stroke embodiment, cold charge enters the hot maximum compression end of the combustion volume thereby cooling it, while hot exhaust gases exit the cold minimum compression end thereby heating it, tending to even out the temperature gradients of the combustion chamber surfaces. Because these arrangements substantially reduce thermal gradients, and consequently stresses, it will be easier to manufacture the components in a wider variety of ceramic materials, which generally have less tolerance to thermal shock than metals.

It is generally understood that engine efficiency increases in some proportion to the difference between charge temperature and combustion temperature, and to a further degree with increase in compression ratio, and that power to bulk and power to mass ratios increase roughly proportionally to engine speed. That is provided that these increases are not partially absorbed by higher friction and pumping losses, and that combustion efficiency is constant within the speed range considered. It is an objective of these inventions to provide an environment where combustion temperatures, compression ratios and engine speeds higher than in present units can be successfully and efficiently employed. The higher combustion temperatures will tend to produce hotter exhaust gases, leading to improved emissions control and usually a greater heat sink for waste heat recovery systems, which will therefore produce more work, and generally lead to greater system efficiencies. All the above would suggest that, in the case of high performance un-cooled engines, carburetor or manifold injected fuel delivery should be discarded in favor of direct injection into either cylinder or pre-combustion chamber, so providing more controllable combustion and reducing the risk of pre-detonation, due to a gaseous fuel-air mixture being ignited by the much hotter cylinder walls. As noted earlier, among important engine design objectives are simplicity and viable cost. In the engines so far disclosed, the mass, bulk and cost of the coolant system, as well as its pumping losses, have been entirely eliminated. In many applications, the mass, bulk cost and pumping losses of the oil lubricating system can be eliminated, as will be disclosed later. Because of the linear motion of the piston, piston/cylinder side thrusts and consequently friction losses have been virtually eliminated. The pumping and friction losses are substantial on modern engines, especially in high performance diesels, so this would suggest a proportionate increase in efficiency resulting from the elimination of these losses. There has also been virtually no heat loss whatsoever, assuming both crankcase and exhaust volume housing have close to maximum possible insulation. Heat dissipation through the head can be transferred back to the charge. Since the difference between ambient air and combustion charge temperature has been increased, there is a consequent increase in efficiency. If it is desirable to increase combustion temperatures still further (the only physical limit being the structural performance of the combustion chamber materials at a given temperature), the compression ratio can be increased, providing yet a further increase in efficiency. In a further embodiment, to offset high temperatures for any reason, water in some form is introduced to the combustion chamber, optionally using devices disclosed subsequently. This will have the effect of reducing temperature and increasing pressure, as described in more detail elsewhere herein. Due to the elimination of heat dissipation via the cooling system and via general radiation from the engine and the resultant either increased temperatures and/or pressures, efficiencies will be higher with the new un-cooled engines of the invention.

An important feature of the present engine designs is their potential to run at greater speed, further improving power-to-weight and power-to-bulk ratios. This increase in speed is partly due to significant reduction of reciprocating masses, firstly by the elimination of the usually heavy connecting rod and its piston bearing assembly, secondly by the substitution of ferrous metals by ceramic materials of between 30% and 40% of their weight, thirdly by the reduction of most of the rocker and push rod mechanisms of conventional engines. It is estimated that reciprocating masses could be reduced to end up weighing as little as 10% to 20% of conventional practice. Ignoring valve actuation, let it be assumed that a 75% reduction is achieved on the piston/crank system. If the stresses caused by the reciprocating masses increase roughly as the square of the increase in engine speed, then reducing the reciprocating masses by 75% will either permit double present engine speeds with the same stress limits, or a four-fold reduction in stress limits. A second way to increase engine speed to shorten combustion time. The current state of the art appears to indicate that, with force aspirated engines, efficient combustion can be maintained up to around 150 rps (9 000 rpm) for small gasoline engines and around 80 rps (4 800 rpm) for small direct injection or diesel engines. The limiting factors tend to be the time taken for combustion to be initiated and, once initiated, to be properly completed and, in the case of direct injection engines, by the time taken to distribute the fuel throughout the combustion chamber. Both of the first two processes can be hastened by increased temperature and, to a degree by increased pressure, so putting the constituents of combustion in closer proximity to each other. In selected embodiments of the un-cooled engine, the combustion delay time is also reduced or virtually eliminated by delivering the liquid parts of the charge into the combustion chamber at greatly elevated temperatures and pressures, so that they vaporize almost immediately on entering the chamber. In some embodiments, the tensile crank design can delay the piston at each end of the cylinder and hasten its passage between the ends, as described below. This delay at each end also implies that engine speed can be raised, relative to conventional engines, for given combustion parameters. Taking the above factors into account, engine speed limits for a given efficiency of combustion could more than double. With additional new injector designs and layouts, speed limits in direct injected engines might increase up to three or four fold, that is diesel speed limits might be in the 200 to 300 rps range. Today, most diesels run at far lower than the theoretical maximum speeds determined by combustion parameters, the limiting factor being the stresses caused by reciprocating mass. With the new engines this presents virtually no problem, so all diesels could run at similar speeds, closer to theoretical maxima. In large engines, such as for marine applications, the stresses caused by reciprocating masses is the major factor limiting speeds. In present designs for such applications, speeds might increase from around 18 rps to between 50 and 100 rps.

In an embodiment which is an alternative to the twin conventional crankshaft layout disclosed in FIGS. 20 and 21, twin scotch yokes are deployed, as shown schematically in FIG. 36, in which a piston 1001 reciprocates in cylinder assembly 1003 to define two combustion chambers 1002 at each end of the cylinder assembly. The elongate slots 980 of two yoke assemblies 981 are mounted on crank-pins 982 in turn mounted on crank shafts 983 having centers at 984. Travel paths of the pins 982 are shown dashed at 985. The piston is linked to each yoke by a single link 1007 passing through the head 1004 of the cylinder assembly, the single link then splitting into two links 986 connected to each end of the yoke. All the links are intended to transmit the major loads, caused by expansion in one combustion chamber, in tension. If the links can take the compressive loads caused by expansion in a working chamber, the cranks need not be mechanically linked. However, in selected embodiments the cranks will be mechanically linked by any convenient means, including belt or chain, rotating arm (as in railway locomotives), gearing, etc. In operation, the links will principally pull on the crank pins to cause the two mechanically linked cranks to rotate synchronously. The advantage of the scotch yoke layout is that there are little or no side thrusts by the tensile member on the head where it passes through it. Optionally, the piston/cylinder assembly and both cranks may be mounted in a rigid integral housing, shown chain dashed at 987, so as to permit a shaft type attachment to the yoke, shown dotted at 988, to be slidably mounted in recesses 989 in the ends of the housing, the centers of the recesses optionally aligning with the axis of reciprocation of the piston. FIG. 36 is entirely schematic; any convenient type of mounting of the yoke assembly to either a housing or a head assembly 1004 may be employed. Elsewhere herein, balanced scotch yoke assemblies are disclosed.

The issue of the tensile connecting link or rod between piston and conventional crankshaft is more complex than is immediately apparent. In the twin crankshaft layout described previously, it is not possible to maintain a constant length for the connecting link between piston and crank, if the cranks are to rotate synchronously. Diagrammatical FIG. 37 shows centers 1100 of equal mechanically linked and therefore synchronized crankshafts 1098 with throw of radius r describing path 1099 rotating in the same direction 1101, shows piston 1102 and head/cylinder module 1103 of constant dimension k, solid line 1104 representing tensile members when the piston is in the middle of the cylinder, and dashed line 1105 the tensile members when the piston is at the end of the cylinder. In the latter position it will be seen that, if crank centers are placed 3r length on piston axis outboard of module 1103, the total tensile length between crankshafts is 2r+4r+k=6r+k. When the piston is in the center, the tensile member dimension is the hypotenuse of right angle triangle base a-c height r, plus hypotenuse of right angle triangle base d-f height r, plus k. Since the triangle bases total 6r and since the hypotenuses must be longer than the bases, it follows that the distance between the cranks is longest when the piston is in the middle of the cylinder. Since the components need always to be linked, the length of the tensile member is that required to accommodate the piston in or around the middle of the cylinder, meaning that there will be slack in the tensile system when the piston is towards the ends of the cylinder, or the tensile system has to be elastomeric. This slack is an important feature of the design of tensile crank link engines and is described in more detail later. The tensile link 1106 may be wholly of some flexible material, or may partly comprise a rod 1096, as shown schematically by way of example in FIGS. 38 and 39. In both examples an equal portion of the tensile element is parallel to piston 1102 movement at any one time; in one case it is a fixed portion, relative to crank centers 1100; in the other case the portion reciprocates and is relative to the piston position. The tensile links are shown at 1006 in a first position relative to the piston 1102, and at 1007 when the piston is shown in dashed position 1094. Here the cranks are shown turning in the same direction and the free portions of the tensile element are angled at 180° or less to one another. Not shown, but equally possible, is to have the cranks turn in opposite directions to one another, thereby maintaining the free tensile portions at a more or less constant 180° to one another. In FIG. 40 an arrangement for differential pivots 1093 for each half of the cycle is shown, which will cause the piston 1102 to be off cylinder assembly 1103 center at 1092 in position 1091 when the crank(s) 1098 is/are 90° off BDC/TDC, so permitting differential piston speeds during cycle phases. For example, such an arrangement could be used to cause the piston to move faster during the main portion of the compression stroke compared with during the main portion of the expansion stroke or vice-versa.

Referring back to FIG. 37, it is assumed that when the cranks turn through the 90° relative to BDC/TDC, the piston is in the center of the cylinder and the tensile halves have equal slack. Considering one combustion chamber, by enlarging crank movement radius, the slack toward TDC will be decreased and the slack at BDC increased by a slightly greater amount. Reducing the crank radius to less than that of piston movement reverses the process—there is more slack at TDC and less at BDC. It is also obvious, from FIG. 37, that the greater the distance from head to crank center in proportion to crank radius, the less slack is required in the system. In some embodiments, it may be preferable to have little or no slack at TDC, since the piston as it approaches TDC may need to be pulled there by the crank to complete the compression and subsequently, as expansion takes place, the loads must be transferred as quickly as possible to the same crank. On the other hand, toward BDC all the useful work of expansion will have been completed, so a taut tensile member may not be required. In practice, to enable the tensile member to be taut at TDC, the crank movement diameter will have to be around 5/4 to 8/7 of piston movement, depending on design details. The presence of slack towards the ends of piston travel could cause it to spend more time there, allowing more time for combustion to develop and/or for fluid transfer to take place. The ratio can be reduced for equivalent crank centers, by employing the configuration of an offset crankshaft 1098, as shown schematically by way of example in FIG. 41. Such an embodiment may be suitable for low power applications where axial loads at the head do not present a particular problem. The piston rod 1096 is shown in part of the cylinder assembly 1103 when combustion chamber 1091 is at maximum expansion and the piston (not shown) is at BDC, with tensile link 1106 connected to the crank-pin at “a”. The link is shown dashed in alternative positions, with the crank-pin at “b” when the piston is approximately at the center of its travel range, and at “c” when it is at TDC. In those applications where the cranks may not rotate synchronously, differential rotation could be absorbed by using final drive devices such as illustrated in FIGS. 42 and 43.

It will be apparent that the engine configurations disclosed herein tend to reduce the effective masses of the reciprocating parts, and therefore the stresses that such parts can generate. Engines of a given capacity will tend to have larger and fewer pistons than at present. If only one piston is involved, the variable length piston-to-crank links of a twin crank layout can be changed to fixed length links, if differential crank speeds can be tolerated. During each revolution one crank has fractionally to slow down or speed up relative to the other to accommodate fixed length links. The greater the tensile link length in relation to crank throw, the closer to synchronous the cranks' motion will be. In certain applications crank speed variation could be tolerated, for example in an engine powering twin pumps or twin low speed marine screws, if the screws have relatively low mass. In other applications constant final drive cycle speeds for each portion of one cycle are required. Various mechanisms can be constructed to convert irregular cycle speed to constant cycle speed. By way of example, FIG. 42 shows two crankshafts 2026 connected to a single piston in a cylinder (not shown). They are linked to a final drive 2027 by endless belt, chain or pulley 2028. To compensate for speed variations in the cranks, a movable in direction 2029 carrier and/or variable length tensioner 2030 shortens or lengthens the power transfer distance to the constant cycle speed final drive 2027. The range of movement is indicated by the alternate position of the tensioning rollers 2032 and belt, shown dotted as at 2031. The movement of the carrier may be dampened, as shown at 2033, and need not be reciprocal. It could additionally or alternatively be elliptical, circular, etc. The carrier and/or tensioner may float, positioned by the forces generated in the endless pulley/chain/belt, or it may be controlled by a system of guides and linkages. In schematic partial elevation FIG. 43, the spring 2034 loaded tensioner assembly 2030 is mounted about a shaft 2035 (permitting roller 2032 movement in direction 2036), which in turn is slidably mounted in a slotted carrier strut 3035*a*, which is mounted at one end 2038 on the crankshaft 2026, and slidably mounted at the other end on a fulcrum 2039 fixedly mounted, so ensuring that the roller assembly can also move in direction 2029.

In an alternative embodiment, if it is acceptable to have the work of compression in one chamber effected by the expansion in the other chamber at least partially via twin linked crankshafts, the central reciprocating piston is split into two halves, with a variable dimension between the halves. By way of example, FIG. 44 illustrates schematically such an embodiment, with piston halves 990 reciprocating in a cylinder assembly 1003 to form two working volumes 1002. The halves 990 are linked to crank-pins 982 mounted on contra-rotating crankshafts 983 by fixed or non-elastomeric links 1007, optionally principally loaded in tension. The crankshafts are mechanically linked by any convenient means. Line of crank-pin center 982 travel is shown at 985. The piston halves 990 are shown halfway between bottom and top dead center drawn solid and hatched, with their positions at top/bottom dead center shown dashed in outline at 991. Mounted just outboard the heads 1004 are pairs of rollers 992 which absorb the lateral loads of the links 1007. Valves, ports, bearings, etc. are not shown. As can be deduced, the distance "b" between the piston halves at mid point of the crank rotation is greater than the distance "a" between the halves at top/bottom dead center. The geometry of the engine can be so set up as to make ratio a:b any desired. If the ratio is relatively large, the space between the pistons can be used as an effective compressor or pump either for the working fluids of the engine or for non-engine related fluids, in conjunction with suitable porting, valves, by-pass volumes, passages etc. Mid-piston and mid-cylinder fluid transfer are disclosed subsequently herein. In this embodiment, an energy storage device in the form of a spring 993 is deployed between the piston halves, to absorb energy during one portion of piston travel and give it up during another portion of piston travel. The spring may be loaded in tension or in compression, to some degree depending on the construction of the tensile links. In addition to any mechanical spring, the gas between the halves is also compressed, so that the gas effectively also acts as a compression spring, absorbing energy around top/bottom dead center and giving it up again toward mid-point of piston travel. As the pressure of gas between the haves rises, it corresponds to the pressure rise in one of the combustion chambers, this relative tandem rise in pressures helping to reduce blow-by from that chamber. A diaphragm (not shown) may be placed between the piston halves, to divide the volume between the piston half ends. Such multiple volumes can be used to pump or compress separate gases, or by variable relative movement of the diaphragm (and appropriate valving, porting, etc), to pump fluid from one inter-piston volume to another. In a further embodiment, there is no link between piston halves within the cylinder. For convenience, reference is made to piston halves; they may alternatively be considered two separate pistons. In a further embodiment, the inter-piston volume arrangements described above in relation to FIG. 44 can be used in a free piston pump or compressor. The basic layout of such an engine would be the same as that of FIG. 44, except that the piston rod penetration of the heads, the links 2041 and the cranks 2026 are all eliminated. Such engines will only function properly if the net work being done is regulated to always be less than the actual capability of the engine, for the amount of fuel being supplied. Without such regulation the free piston halves will not return to their designated top dead center position. Of course, with the free piston halves engine, the variation of the inter-piston volume has nothing to do with crank link geometry; it is instead a function of the pumping or compressing work being done in the volume. Any of the principles, features and constructional details of this disclosure may be applied, where appropriate, to free piston pumps, compressors or IC engines.

In a selected embodiment, the engine is so designed as to permit increased compression ratio with increase in speed. For start up and low to moderate speed, the arrangements described above are employed: the piston is pulled by a crank to a "designed" compression ratio position, and on expansion the piston in turn pulls that same crank. Before the piston has been pulled to complete compression, it has been slowed down because its kinetic energy and the work done on it in the other combustion chamber by the last stages of expansion is less than that required to complete compression. During this slowing down period, the slack may be transferred from one free—substantially unloaded—tensile half to the other; except for transition phases one tensile half is always taut and the other slack. However, as the engine speeds up the kinetic energy of the piston becomes greater, to the point when at the designed compression ratio the work effected in and by the piston has equaled the work required for compression. As the piston speeds up further, the work on it and by it exceeds that required for the "designed" compression ratio. Since the piston is not restrained other than by the compressed gas—the link to the crank towards which it is traveling has the slack, the link with which it is pulling the other crank is taut—it will compress the gas beyond the "designed" ratio. As piston speeds increase and compression ratio climbs, more kinetic energy is required, which is derived from the extra work obtained by burning a fixed mass of fluid at higher pressure and temperature. One of the prime benefits of increased compression ratio with increased engine speed would be the shorter required combustion time, due both to increased pressure and the increased temperature resulting from higher pressures. Temperature and compression ratio do not increase proportionately, since the temperature is the result of pressure and combustion combined. In some embodiments, the deceleration of the piston should be controlled relative to variation of engine speed, to ensure that all slack is taken up in the relevant substantially unloaded-free tensile half close to TDC, and that the excess of crank rotational speed over speed of tensile half movement is small as tautness is attained, to as far as possible eliminate shock loads on the tensile member. In the case of variable compression ratio designs, it is also desirable that tautness is attained at an angle of crank rotation before the loads of expansion can begin to be efficiently transferred to the crank. This control can be provided in the first place by designing the mass of the reciprocating parts to suit the desired engine speed range, and by varying the timing and quantity of fuel delivered around TDC. Optionally water, water-methanol mixtures or similar substances can be introduced, to provide sudden increases in pressure at critical periods and/or to control too-rapid temperature rise. It is assumed that in some engines it will be desirable to have the greatest possible engine speed because power to weight ratio is important (eg aircraft applications), so the objective of the variable compression concept is not so much to increase efficiency (in some embodiments it might decrease), as to facilitate proper combustion in short time intervals. An interesting feature of the variable compression engine is that, once the "design" compression ratio has been exceeded, the masses of the reciprocating parts, other than any valve and fuel systems, exert virtually no loads on the crank. Therefore the traditional limitation to engine speeds in medium and large engines is substantially removed.

Figure 46:
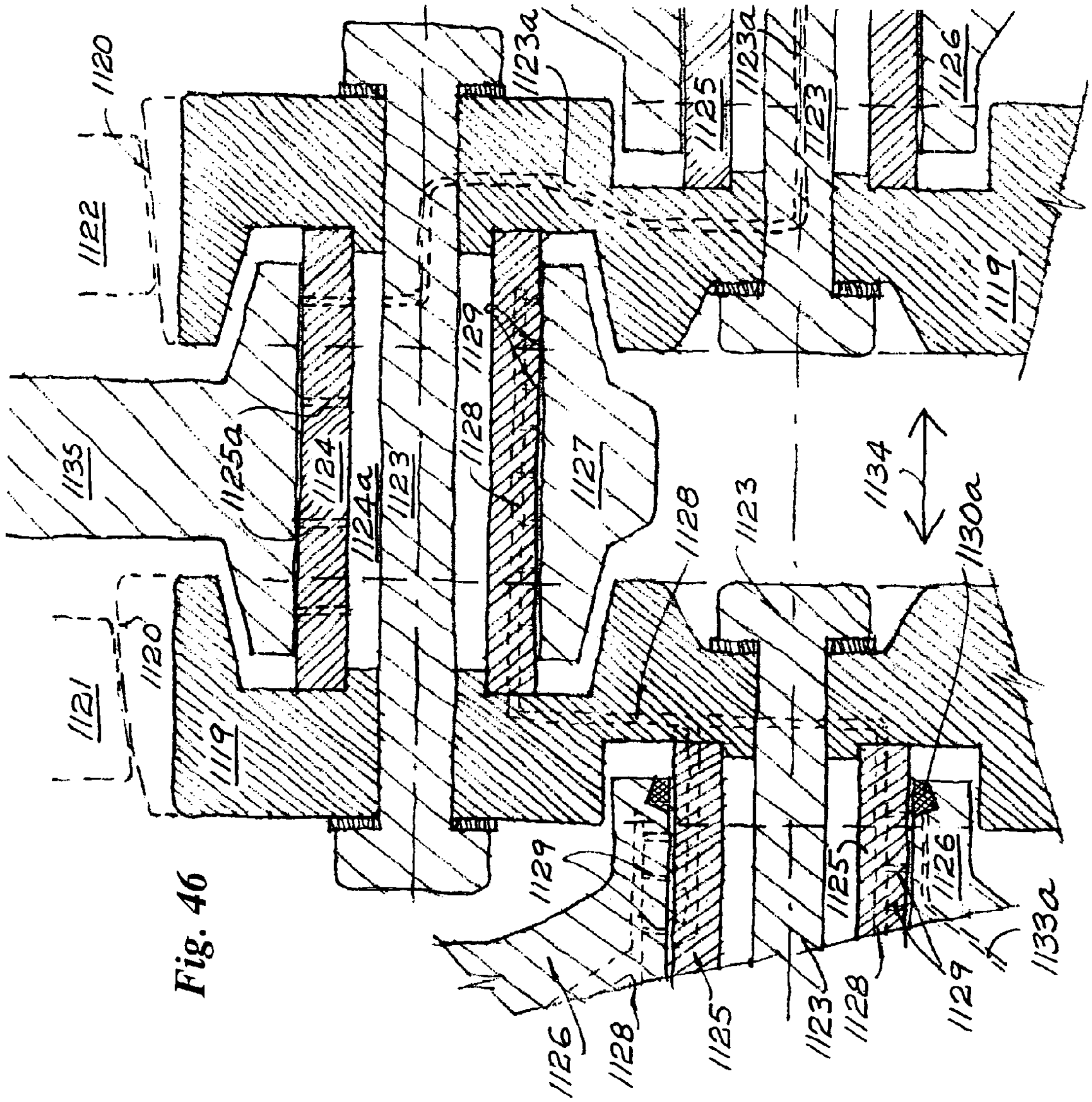
Figure 47:
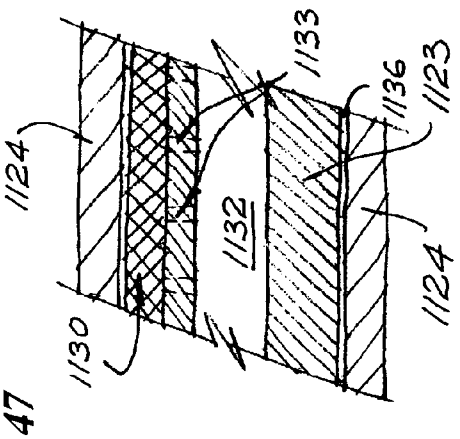
Figure 48:
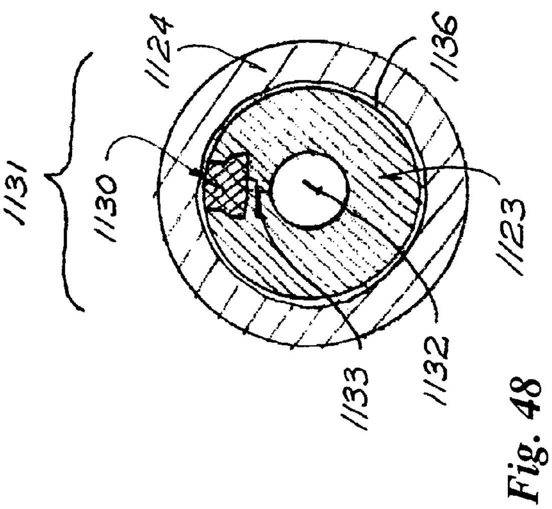

The crankshaft itself may be manufactured along conventional lines and may be of any material, including ceramic. Non-conventional configurations may also be used, including the built-up configurations shown schematically by way of example in FIG. 45, wherein hollow center bearing tubes 1115 and hollow big end bearing tubes 1116 are mounted in compression by axial tensile fasteners such as bolts shown dashed on the left of the diagram at 1117, between crank discs 1118 and 1118*a*, which act as crank throws. Bolt heads are optionally countersunk, as shown dashed at 641. The tubes themselves may be countersunk into the disks, as shown dashed on the right side of the diagram at 642. The crank disks may be balanced in any way, including by inserts of heavier material, as shown dotted at 643, and/or by the provision of cut-out or depressions 644. Depressions may be crescent-shaped, to curve around the seating of a tube, as shown schematically dashed at 645. In selected embodiments, the crankshaft bearings are lubricated by fluids passing through the interior of the crankshaft. In other embodiments, the crankshaft bearings are gas bearings, wherein a substance in liquid form is caused to change to gaseous form at or near the bearing surfaces. In further embodiments, the crank discs may be so formed as to both permit maximum bearing size and to allow the circumferential area to act as a cam. By way of example, some of the embodiments are schematically illustrated in cross-section in FIG. 46, showing two shaped discs 1119 having precisely machined surface cam profiles 1120 for valve cam follower 1121 actuation and/or fuel delivery cam follower 1122 actuation. The cam may directly or indirectly open a valve or actuate fuel delivery or serve any other purpose, and it may serve to actuate a linkage including a member principally loaded in tension, as described earlier in connection with FIGS. 17 through 19. The discs are interconnected by tensile fastener 1123 and inner crank bearing cylinder shell 1124 having precisely machined ends, each disc being similarly fastened to an inner main bearing cylinder shell 1125. Inner main bearing cylinder shells 1125 are rotatably mounted in engine structure 1126. Secondary crank bearing (often designated big end bearing) cylinder shells 1127 are mounted in crank connecting rod or tensile member 1135. Alternatively, element 1135 could be part of a scotch yoke mechanism. The present embodiment is shown having gas bearings where the largest bearing areas are desirable, but alternatively roller or needle or any other bearings may also be employed. Optionally, fluid passages 1128 communicating with a central gas reservoir may duct gases to apertures 1129 at the bearing surfaces. They may be used to provide gas for bearings, or alternatively to provide liquid lubrication for other bearings, and may be of any desired form or size. A passage system may be within the crankshaft assembly, or in the structure 1126 supporting the crankshaft, or in both. In an alternative arrangement suited to ceramic materials and high crankcase temperatures, the passages may contain water under pressure, which on leaving the apertures will instantly turn to steam, so providing gas under pressure in the relatively close tolerance of the gas bearing. Optionally, the centers 1124*a* of the inner bearing shell cylinders 1124 may be filled with water or other fluid to provide, together with likely counterbalances as shown for example in FIG. 45, some kind of flywheel effect. Alternatively, the fluid might be driven through small weep holes 1125*a* in bearing shells 1124 by centripetal forces to have a tribological effect, and be replenished by a system of passages 1123*a* in crank components such as 1119, 1123, 1126, etc. In crankshafts having few throws, the gas or liquid may be pulsed, to provide maximum pressures at moments of greatest loading. Alternatively, instead of apertures such as at 1129, including those associated with passage 1128, a combination of apertures and wicks may be provided, as shown diagrammatically in longitudinal and cross-section in FIGS. 47 and 48, where 1123 and 1124 are respectively the inner and outer bearing shells, and 1136 the space between them for bearing fluid. A wick or porous or permeable element capable of holding or transmitting fluid 1130 is disposed at maximum loading area 1131, to more evenly distribute the liquid delivered under pressure via passages 1132 and apertures 1133. In arrangements described elsewhere, the slack in the tensile element may optionally be taken up by a fluid spring, so that tautening of the tensile element causes fluid to be delivered to the bearings. The crank of FIG. 46 is shown having lateral or axial motion, permitting the cam followers to be actuated to varying degree by the progressively shaped cam profile, as the crankshaft is moved in direction 1134. Here it is assumed that the link between piston and crank 1135 is not laterally movable, entailing larger inner bearing cylinders or shells than outer ones. In an alternative embodiment, both the crankshaft assembly and crank-link are fixed with respect to direction of movement 1134, and cam followers 1121 and/or 1122 are moveable in direction 1134, as shown in the embodiments described below. Water lubrication is here cited as an example; in fact any suitable liquid under pressure may be used, whether or not it changes to a gaseous phase in the bearing gap. Combustion loads, and consequently bearing loads, can be high. If gas bearings are used and gas blow-by is to be minimized, then the bearing ends may be partially sealed by an oil film. Since gas bearings are sometimes not as effective at low speeds, this oil film may then serve to lubricate the bearing shells to some degree. Of course, gas pressure will cause oil loss, but in the basic configuration of FIG. 21, this will be burned as fuel. By way of example, a porous or permeable ring or wick is shown at 1130*a* in FIG. 46, optionally supplied with liquid lubricant via passage system 1133*a*, which is independent of any passage such as at 1128 supplying gas to any gas bearing, such as may be between components 1125 and 1126. Ring 1130 is shown on one end of the bearing; a similar ring and lubricant supply passage is optionally provided on the other end.

As noted previously, a crankshaft may also function as a camshaft. In a further embodiment, lateral movement of a crankshaft or a camshaft is incorporated in any pump, compressor or IC engine, using either conventional or gas bearings. By way of example, FIG. 49 shows schematically how a crank and/or cam shaft 5086 and its inner main bearing shell 5087 moves laterally inside and relative to outer main bearing shell 5088 in direction of arrow 1134, with a first position shown solid and a second position shown dashed. Either shaft 5087 or shell 5088 may be fixed. In gas bearing designs, if the diameters of the bearing shells are uniform, then the clearance gap will also be constant, thus maintaining constant gas bearing performance, whatever the position of the crank and/or cam shaft. In another embodiment, if for some reason it is impractical to move camshaft or combined crankshaft/camshaft laterally, the same variable effects can be achieved by interposing a yoke to move the cam followers, as illustrated schematically by way of example in frontal elevation FIG. 50 and cross-section FIG. 51. In this embodiment, the crank and/or cam shaft 5089 is fixed, but nevertheless incorporates cams 5090 with variable profiles 5091. Ball ended and cup ended followers, 5092 and 5093 respectively, link the cam to appropriate reciprocating mechanisms 5094. Other types of cam followers may be used, including those described elsewhere in this disclosure. A yoke 5095 is attached to the follower stems 5096, preferably by some kind of olive shaped elastomeric washer 5097. When the yoke is moved laterally in direction 5098, the degree of reciprocating motion in 5094 will be varied. Similarly, if the yoke is moved in the other dimension 5099, the timing of reciprocation relative to cam and/or crank angle will be varied. In another embodiment, a camshaft which does not additionally function as a crankshaft is laterally movable relative to its cam followers and/or the followers are laterally movable relative to the camshaft. The variable timing and effective profile of the cam and follower devices described in this disclosure may be used to actuate any reciprocating device, which in turn may actuate exhaust or intake valves, or be used to deliver fuel, either by opening valves or by operating a plunger or pump. As has been disclosed elsewhere, cam and/or crank shafts may be supported in variable pressure gas bearings, with gas in the bearing either provided as a gas, or as a liquid conducted under pressure to or near to the clearance space, which then changes state in the lower pressure and/or higher temperature environment of the clearance space. These fluid pressures may be varied during rotation by what can best be described as moving profile cams, which provide pumping action within the revolving body. By way of example, in schematic cam/crank section FIG. 52, two different embodiments are shown in a crank disc 5100 rotating about axis 5100*a*, with a big end bearing at 5021, having interior passages 5101 supplying bearing fluid being interrupted by reservoirs 5102, closed by movable plungers 5103. The plungers are linked to the free ends of movable pedals 5104, pivoted at disc surface 5105 and at disc perimeter plane 5106. Fixed cam followers 5107 are positioned, so that when the shaft turns in direction 5108, the pedals and therefore plungers are depressed when passing under the followers, causing a pressure wave in the bearing fluid. Such pedal and plunger arrangement can also be adapted to provide engine fuel delivery, where a revolving cam actuates a pivoted or hinged pedal. In a further embodiment, fluid pressure varies not only with crank rotational angle but also with crank rotational speed. An example is schematically shown in sectional view FIG. 53 and in the cross-section at "A" shown in FIG. 54. Here a pedal 5109 pivoted at 5111 is mounted on the circumferential face 5110*a* of a crank web disc 5110, which also has a reservoir 5102 housing a movable plunger 5103 and connected to fluid supply 5114 and delivery 5115 passages. On the external surface of the pedal a weighted shoe 5116 is slidably mounted. During rotational movement 5117 the shoe will pass under fixed cam follower 5118, causing the pedal to be depressed and creating a pressure wave in the bearing fluid. The radial motion 5119 of the shaped shoe on the surface of the pedal is restrained by spring 5120. A stop retraining the movement of the plunger is shown schematically at 5121. As rotational speed increases centrifugal force on the shoe will cause the spring to be extended and shoe to move radially outward on the inclined pedal plane, causing the head of the shoe to project further from the disc surface, and increasing plunger motion during each pass under the follower. By such radial movement varied proportionally to centrifugal force, fluid pressure may be varied proportionately to crank revolution speed.

Figures 55, 56, 57, 58:
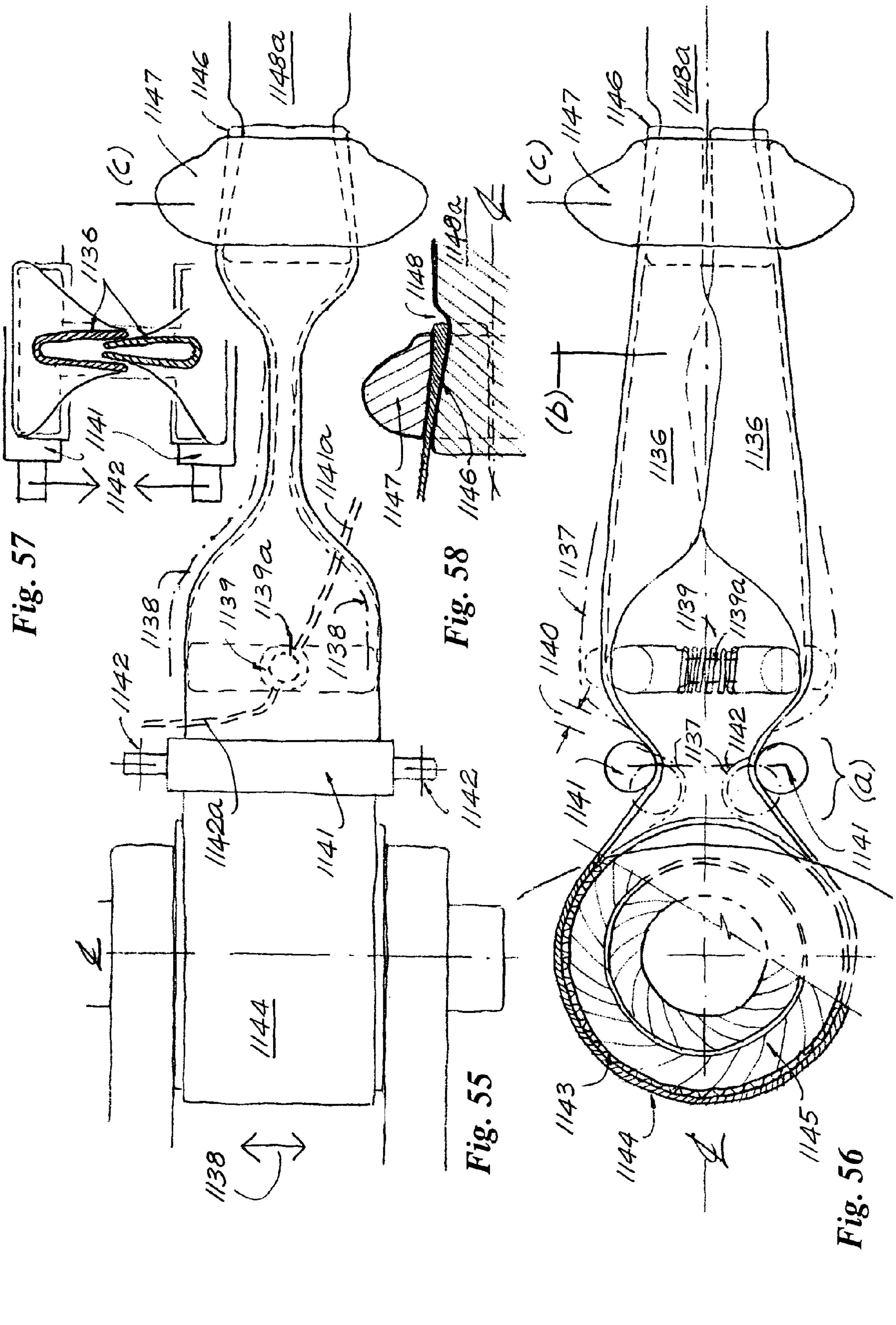
Figure 59:
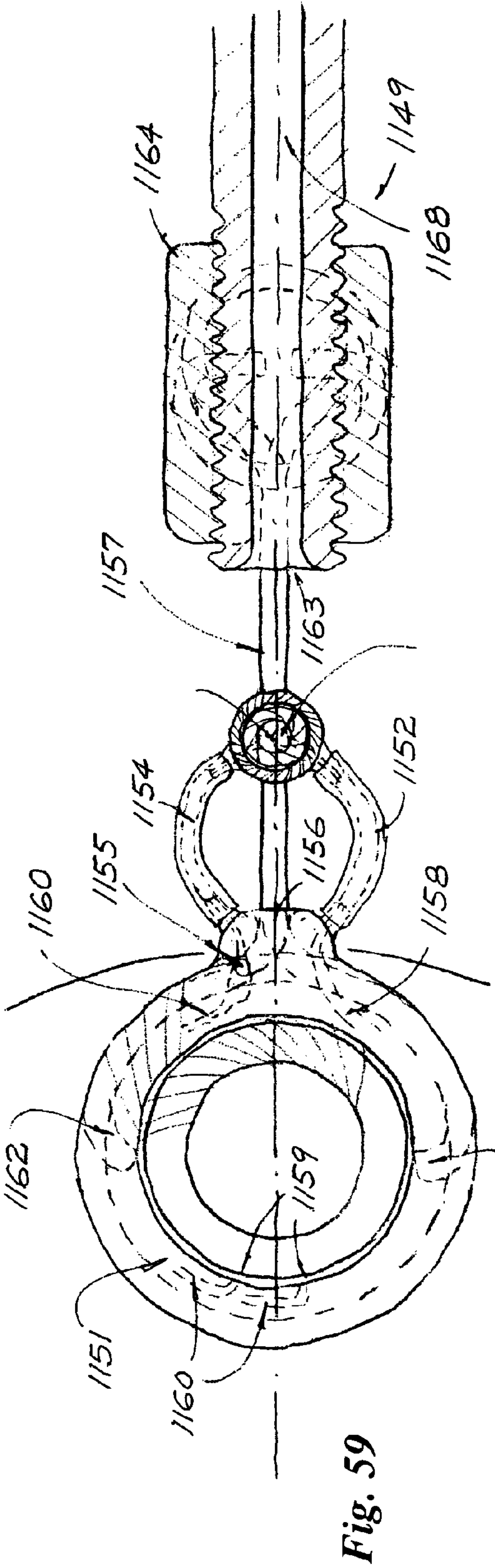
Figure 60:
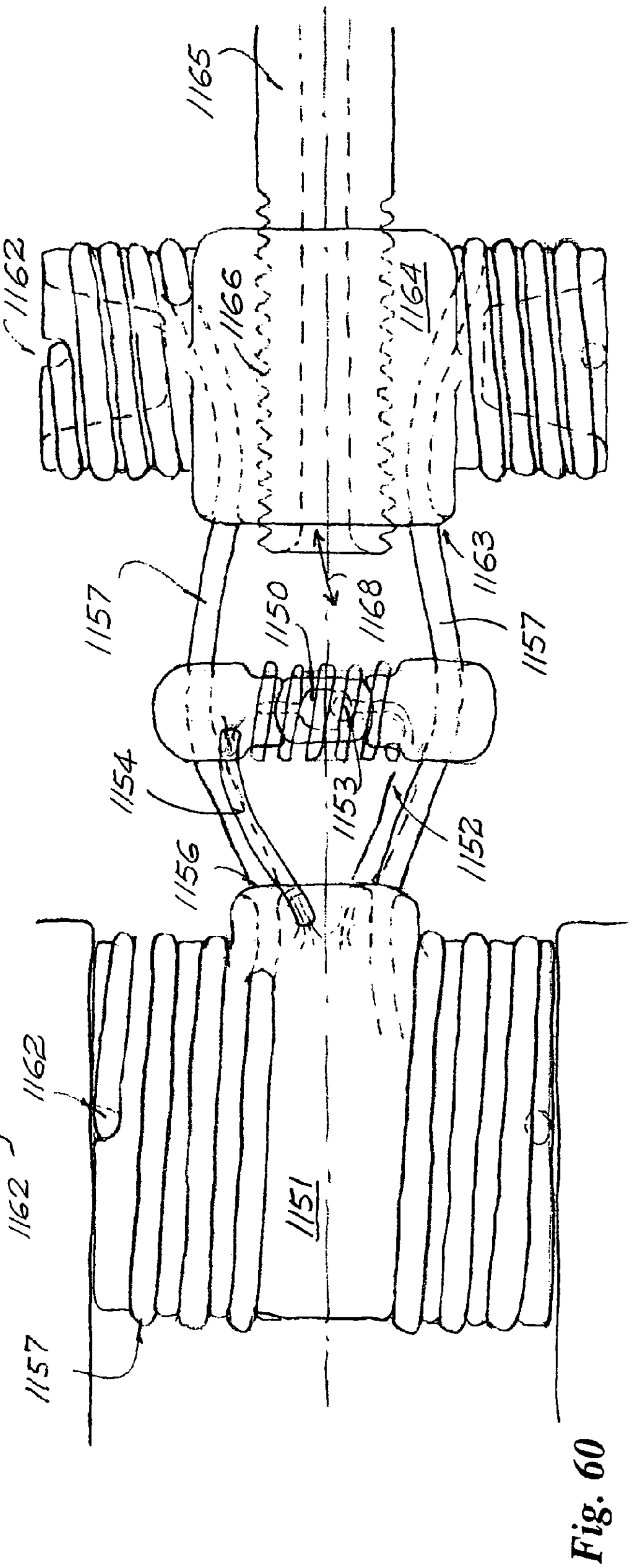

As noted, a piston linked to two synchronously rotating crankshafts needs slack in the link. Alternatively, the link may incorporate elastomeric or compressible/stretchable elements or devices. They can be designed to absorb energy at one time during an operating cycle and give it up at another time during the same cycle. Such energy storage may be used to distribute loads during either an expansion or compression phase of the cycle, or distribute loads from one phase to another. In the discussion of tensile piston-to-crank links above and which follow, features are generally described in the context of the configurations of FIGS. 37 through 41. Any of the features described may also, where appropriate, be used in connection with scotch yoke type links between a piston and crankshaft, including those disclosed herein. In a selected embodiment, a crank is connected to a piston or a piston/rod assembly is by a link principally loaded in tension, configured to always absorb slack in the system, optionally using a cyclical energy adsorption device. By way of example, FIGS. 55 to 58 show a spring steel link 1136 in tension under load, biased to open to position shown at 1137 when all load is removed. FIG. 55 is a sectional elevation, FIG. 56 a plan view, FIG. 57 a detail section taken at (b), FIG. 58 a detail section of the components at (c). Tapering U-shaped cross-sections of the tensile link, shown in FIG. 57, permit bending and therefore lateral movement in direction 1138*a* of the crankshaft as shown schematically at 1138. The flatter cross-section at the spring 1139 or fluid reservoir at 1139*a* permits bending to position 1137 to take up slack, as shown schematically at 1140. Five spring actions are indicated here: the biased spring steel of component 1136, the spring 1139, the reservoir 1139*a*, the device at (a), the mat at 1143, although only one is needed to effect the invention. The device shown at (a) is effectively a shock absorber as well as energy absorber consisting of two rollers 1141 linked by springs indicated by line 1142. A compressible mat is shown at 1143, between spring steel loop 1144 and outer bearing shell 1145. FIG. 58 shows an enlarged section of the joint between the tensile member and the end 1148*a* of the rod of a piston/rod assembly, where the wedge-shaped split ends 1146 of one tensile half are seated in a shallow conical depression 1148 in the rod end, and located by collar 1147. The fluid reservoir 1139*a* is indicated schematically only, its volume not necessarily being to scale. Fluid is supplied to it via flexible tube 1141*a* and leaves by flexible tube 1142*a*. Variation in stiffness of springing will affect the acceleration and deceleration of the piston during transfer of slack from one tensile half to the other.

Figure 61:
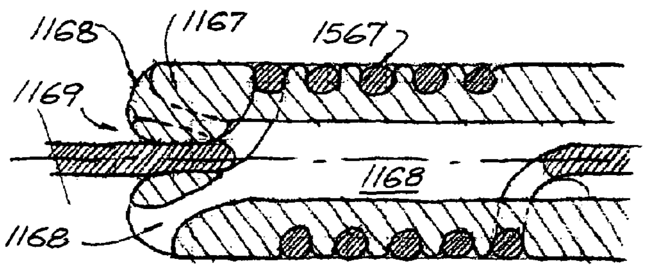
Figure 62:
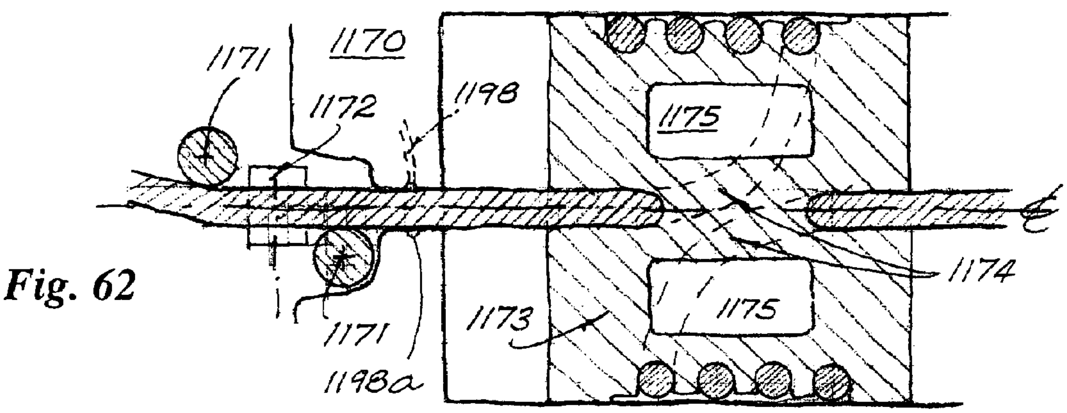
Figure 63:
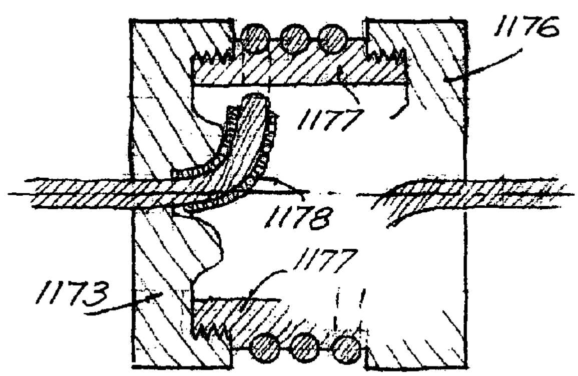
Figure 65:
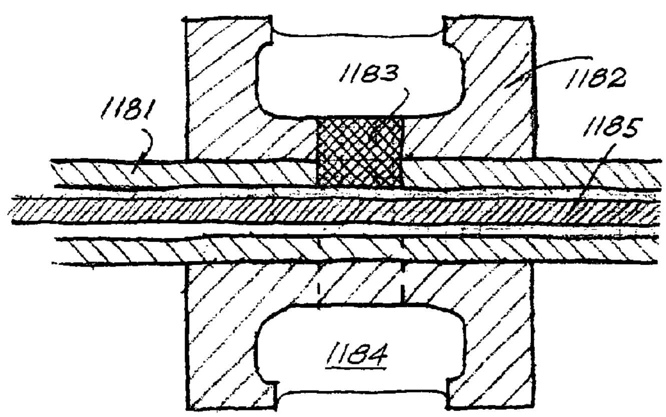
Figure 64:
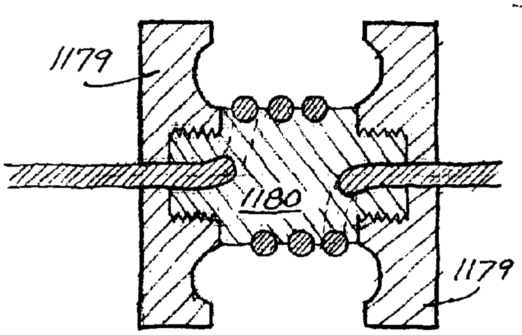

In a further embodiment, the crank is linked to the piston or piston/rod assembly by a flexible tensile element, such as cable, wire, rope, yarn, etc. An example is shown schematically in FIGS. 59 and 60, here with a hammerhead piston/rod assembly 1149. A compressible fluid reservoir 1150 is linked to outer bearing shell 1151 from fluid supply reservoir 1158 by fluid supply line 1152 and non-return valve 1153 and by fluid return line 1154 with non-return valve 1155, to deliver fluid to bearing at 1159 via passages 1160. Twin tensile cables 1157 pass through a bell mouth 1156 to be wrapped round the shell, with ends 1162 press or adhesive mounted. Similarly, the cables are attached through bell mouths 1163 about the detachable hammerhead 1164. They may pass through the piston/rod assembly, as shown in subsequent embodiments. The hollow rod 1165 has openings permitting the passage of charge at 1168. The head 1164 is attached to the rod portion 1165 of a piston/rod assembly by screw threads 1166. In a further embodiment, the compressible fluid reservoir supplies fuel to an IC engine combustion chamber. For example, the initiation of expansion in one chamber and associated tensioning of the link causes the reservoir to compress and start fuel delivery to a second chamber. 1150 Further examples are illustrated schematically: FIG. 61 shows a single cable mounted to a constant diameter rod tip 1167 of a piston/rod assembly, where the cable enters through a split bell mouth 1169, passes through the rod to be wound about it then re-enters the rod to pass through to the other end. The rod tip has an internal passage for fluid 1168. FIG. 62 shows a single cable passing through the cylinder head 1170, guided by optionally asymmetrical or staggered crank revolution roller guides 1171 and crank lateral movement roller guides 1172. The cable is passed through cast-in passages 1174 provided in the integral piston 1173, wrapped about the circumference and then passed through the piston again. Optional voids 1175 have been provided in this piston. A passage 1198 may be provided for lubricating fluid to reach the area 1198*a* of the tensile member where it leaves the piston. If liquid, a continuous or discontinuous circumferential gallery may be provided at 1198*a*. FIG. 63 shows a similar arrangement in a tri-component piston, where the piston crowns 1176 are screw threaded to each other by means of a central cylinder or drum 1177 round which the cable is wrapped. A compressible sleeve 1178 is provided to project the cable against abrasion and to act as a shock absorber. FIG. 64 shows an open skirted three-component piston, where the crowns 1179 are screw threaded to each other by means of a smaller central cylinder 1180. FIG. 65 shows an open skirted piston/rod assembly, where the rod 1181 is hollow and continuous, the piston 1182 having reinforcing flanges 1184. The piston is press fitted to the rod and attached either by the tightness of the fit (achievable by inserting the cooled rod in the heated piston) and/or by plugging a volume bisected by the component joint line as at 1183, or by a combination of both. The hollow rod may house a continuous tensile member 1185. FIG. 66 shows a tri-component closed-skirted piston assembly 1186 assembled about two independent rods 1187. Compressible material is provided at 1188 to provide small movement of the piston on the rod for shock absorbing purposes and at 1189 to provide a thread lock. Hollow passages 1190 may communicate with the interior of the piston, to carry fluid, including gas, through the piston in direction 1191 for cooling or other purposes. FIG. 67 shows the end of a piston/rod assembly where twin cables are provided. Optionally, the piston/rod assembly may be provided with a passage for gas, as shown in FIG. 61. FIG. 68 show an arrangement similar to that of FIG. 63, except that twin cables are provided.

The cylinder head may be designed in any manner, including to house conventional poppet valve(s). Where there is a central tensile member, it reduces the possible diameter of the valves, unless four valves are used about a central rod or cable. In many applications, a more effective arrangement is the provision of valves of arc-like or ring-like form. By "ring valve" is meant a movable ring-shaped element normally approximately flush with a surrounding or core surface. When the valve is actuated, it projects from any plane of the surrounding core surface, causing fluid or other material to flow past both the outer and the inner circumferences of the ring. A "ring" valve of median diameter "x" will provide around double the clearance of a conventional poppet valve of the same diameter "x" at a given lift. An example is illustrated schematically in FIGS. 69 through 71, where FIG. 69 is a section through a cylinder 1003 looking towards the head 1004, FIG. 70 a cross section through cylinder 1003 and head 1004, and FIG. 71 an elevational view, taken at right angle to the section, showing the valve actuation mechanism. All Figures are schematic. They show a single central ring valve 1201 with twin stems 1202 in guides 1203 provided in bridges 1204 supporting the central portion of the head 1205, in turn supporting the hollow rod portion 1206 of a piston/rod assembly. The twin stems are attached to ring-shaped collar 1207 whose underside functions to depresses a spring 1209 and whose upper side has one or more surface projections 1207*a* to receive a lever 1208 hinged at 994 on a mounting 995 on the head. The lever, which is forked to clear the rod 1206 and has concavities 1208 engaging with projections 1207*a*, is depressed by a cam 996, which in turn depresses the collar against spring resistance to open ring valve 1201, permitting fluid to flow as indicated by arrows 997 past both internal and external circumference of the valve into working chamber 998. In this embodiment, the fluid is supplied from the valve enclosure volume 999 above the head 1004. The ring valve may be constructed in any suitable manner, and it may be actuated by any convenient means. It may be located in any suitable position. For example, FIG. 72 shows a similar view of a head 1004 from inside the cylinder, but with the axis 1208*a* of the ring valve 1201 offset from cylinder/tensile member 1206 center by dimensions "y" and "z", to more easily permit direct crank/cam valve actuation. The offset may be in one dimension only. A single fuel delivery device is positioned at 1205*a*; alternatively multiple devices may positioned in any convenient location, for example as indicated at 1205*b*. In another embodiment, there is more than one ring valve opening into a single working chamber. Such an arrangement is suited to reciprocating IC engines operating in the four-stroke mode. An example is indicated schematically to no particular scale in FIG. 73 which shows inner 1210 and outer 1211 ring valves in a head and cylinder assembly 1004, pierced by a single tensile member or piston/rod assembly 1206. The outer valve, activated via valve stems 1211*a*, links the toroidal combustion chamber 1002 to an exhaust processing volume 1212, which optionally is the circumferential exhaust processing volume surrounding of the cylinder portion 1003 of the cylinder assembly, as disclosed earlier in FIGS. 20 and 21. The ring valves may have different heights of maximum clearance or lift, as shown dashed. Inner ring 1210 links the chamber to a charge holding volume at 1213 outboard of the head at 1004, which could be the valve mechanism enclosure. Another embodiment, variant of the ring valve, is the crescent- or arc- or banana-shaped valve. For example, it could most simply comprise around half a ring valve. Two such halves could together be just short of a circle, so that the head bridges could extend to the combustion chamber head surface. Each such half could be mounted on a single stem, preferably of oval-like or other non-circular cross-section to assure proper alignment, and be actuated in the manner of current poppet valves. Because the seats are not a regular circle, they would be significantly more difficult to machine, either during manufacturing or reconditioning, than either the conventional poppet valve or the ring valve, which is why embodiments of the latter are described here.

The tensile member may pass through the head in a number of ways. In piston/rod assemblies, bearing surface must be provided near where the rod passes through the head, to take up any angled loads caused by crank rotation. In the case of flexible tensile crank links, these can be taken up by rollers, as shown for example in FIG. 62. In an alternative embodiment, a sleeve is provided between the reciprocating piston or piston/rod assembly and the head. By way of example, FIGS. 74 and 75 show, in schematic sections taken at right angle to one another, a rod portion 1192 of a piston/rod assembly passing through a cylinder head 1004. The rod portion 1192 is reinforced by a sleeve 1194, which in further embodiments is be movable in direction 1195, and/or optionally provides fuel delivery. The tips of the sleeve when it is extended are shown dashed at 1192*a*. Rod tip when working chamber 1002 is most expanded and piston/rod is at BDC is shown dotted at 1196. The sleeve has a cutout 1197, shown in elevational view in FIG. 75, to accommodate crank link 1193 movement range at an extreme angle 1193*a*. Link 193 is shown schematically. A cross section through a central portion of the rod is shown at the bottom of FIG. 75 at "A", and it shows how the rod may be wider in one dimension to strengthen for side thrusts. Where the tensile member has to take lateral crank rotational loads, bearing may be by high pressure gases. This will naturally tend to be caused by blow-by and, if bearing tolerances are small, this blow-by loss may be very moderate and worth the bearing work it provides. Additionally or alternatively, bearing may be by water or other liquids or gases as described earlier, by direct supply 1198 as in FIG. 62, or via the wicks or permeable or porous material 1199 as shown in various alternative arrangements in FIG. 74, supplied by passages 1200. The passages 1200 may provide fuel and communicate with galleries 1200*b* in the sleeve, and sleeve passages 1200*a* may be extended to terminate in the sleeve face exposed to the combustion volume only when the sleeve is extended. If the sleeve is extensible and retractable, the piston—shown dashed at 1001 when at top dead center—may have a corresponding depression 1001*a*, which could form part of a precombustion chamber or bowl. The fluid in the passages and galleries, when subjected to a pressure wave, would spray into the combustion volume as shown at 1199*a*. Fluid galleries or passages such as at 1200*a* and 1200*b* are optionally only exposed to the working volume when the sleeve is extended. When it is retracted, the passages such 1200*b* are masked, reducing the likelihood of fuel dribbling or boiling away into the combustion volume. The connection between tensile member 1193 and piston rod 1192 is indicated diagrammatically; any suitable connection or fastening method may be used, including those disclosed herein. In further embodiments, the "lubrication" of such components as valve stems, the tensile members, and the support members such as 1194 of FIG. 74, entails the use of substances which, when carried to the combustion chamber, affect the combustion process. Such substances includes fuels such diesel, which can additionally be used to lubricate further components. Other fluids which may be used include water, fuel, water-methanol mixtures, hydrogen, in either liquid or gaseous state. By "lubrication" is meant the provision of low-friction bearing means, including liquid films, gas bearings, etc. Fluid may be delivered to the chamber at the appropriate time by the imparting of pressure to a fluid reservoir, the pressure optionally releasing a valve, causing fluid to leave the reservoir via an orifice communicating with the working chamber. This is essentially the direct fuel injection system in use today, and may also be employed in the new engines. Such a system may be adapted to current engines and/or the engines of the invention by making the head or similar component a part of an injector.

Figure 76:
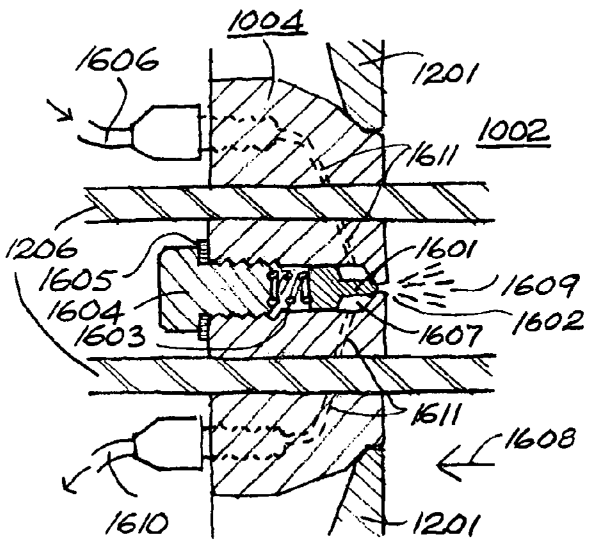

FIG. 76 shows schematically, by way of example, a cylinder head 1004 having a ring valve 1201 and two tensile crank links 1206. A plunger 1601 is retained on its seat to close a nozzle opening 1602 communicating directly to working chamber 1002 by means of a spring 1603 retained by a bolt 1604 and washer 1605. Fuel supply line 1606 keeps passage 1611 and fuel gallery 1607 filled. A sharp pressure wave in supply line 1606 causes plunger 1601 to move against resistance of spring 1603 in direction indicated by arrow 1608, to release a spray of fuel 1609 into the combustion chamber. When the supply line pressure wave subsides, the spring pushes the plunger back onto its seat, to cut off fuel supply to chamber 1002. An optional fuel return line is shown at 1610, supplied by passage 1611. Either one or both of fuel lines 1606 or 1610 may have a non-return valve at any convenient location.

Figure 78:
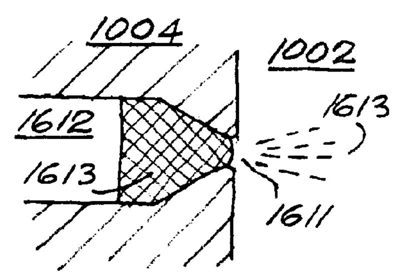
Figure 77:
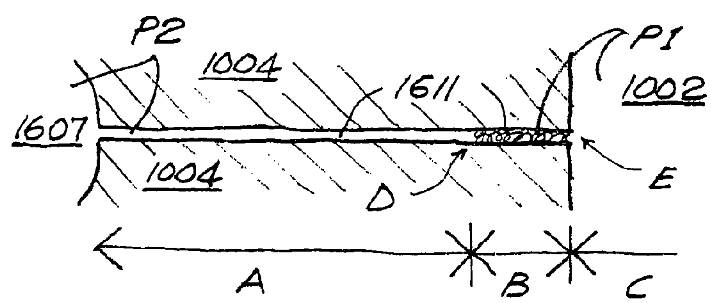
Figure 79:
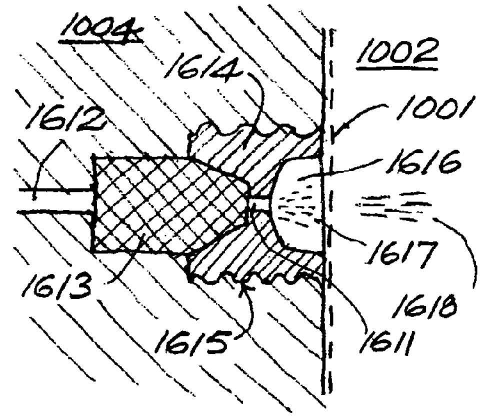
Figure 80:
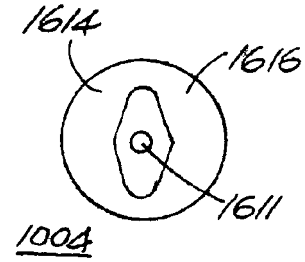

In selected embodiments, injector-less fuel delivery systems are used. Such systems include a fuel passage communicating directly with an engine combustion chamber, at least during part of the operating cycle. In one embodiment of an injector-less system, the fuel delivery passage has a very small opening to the combustion chamber, which is always "open". In normal operation, the passage will house a body of fuel. At the time of desired fuel delivery, a pressure wave is initiated in the fuel from the supply source, causing part of the fuel residing in the passage to be ejected through the very small opening into the combustion chamber. The quantity of fuel ejected will depend on the intensity and duration of the pressure wave. After fuel delivery, during the remaining portion of the operating cycle, another body of fuel will sitting in the passage, at a pressure corresponding to the pressure in the combustion chamber, provided no pressure is being induced from the fuel supply. This back pressure from the combustion chamber will largely limit fuel "dribbling" into the chamber. In many embodiments, the combustion gas temperature during part of the cycle will be greater than a liquid fuel's boiling temperature at the current pressure. Some boiling will occur at the diameter of the small opening, but this boiling will be stalled by two factors. Firstly, as the initial molecules boil, they will form a gas with a relatively poor rate of heat transfer compared to a liquid, so delaying the boiling of the molecules of liquid immediately behind the newly formed gas. Secondly, the initial molecules of liquid fuel will have absorbed significant heat energy from the immediately adjacent combustion chamber gases in order to make the phase change to gaseous fuel, so cooling those gases in many cases to below the temperature needed for further boiling. The engines of the disclosure are designed to run much faster than current units; at those speeds there will only be time for the smallest amount of boiling to take place and, in most cases, the quantity of gaseous fuel building up in the combustion chamber during the remaining portion of the cycle will be insignificant, and in no way enough to set up any pre-detonation or "knocking". FIG. 77 illustrates the principle, showing—greatly enlarged—a long, thin fuel delivery passage 1611 in a cylinder head or similar component 1004 linking fuel reservoir 1607 to combustion chamber 1002. In zone "A" is heated liquid fuel, in zone "B" gaseous fuel, in zone "C" compressed hot charge or exhaust gas in the combustion chamber. While no fuel is being delivered, pressure in all three zones is likely to be equal that of the gases in the combustion chamber, so that P1=P2. Earlier, the contact at "E" between liquid fuel and the hot combustion chamber gas has caused localized boiling in tip of the passage, indicated at zone "B". The energy required for the change of phase of the material in zone "B" has caused the temperature of the fuel immediately behind, at "D" to drop sharply. For it to boil, it requires substantial further energy, which is most likely to come from the gases in the combustion chamber. But gas is a slow transmitter of heat energy, so it will take some time for the fuel at "D" to boil. Effectively, the initial boiling in zone '"B" stalls the weeping of fuel into the combustion chamber. In engines running at high speed, very little fuel will enter the combustion chamber except during fuel delivery, when a pressure wave is induced in reservoir 1607. The passage need not be exposed to the combustion chamber during the whole cycle; in other versions of the "open passage" fuel delivery system, the passage opening will be partly masked during portion of the combustion cycle, or it will not directly communicate with the combustion chamber but instead with some kind of reservoir, this reservoir being exposed to the combustion chamber for only a short part of the cycle. In some embodiments, a barrier of some kind of porous or permeable material that permits passage fluid can be placed at the opening to the combustion chamber, to restrict weeping and slow any possible boiling. In a selected embodiment, the fuel delivery device is part of the head. FIG. 78 shows schematically, by way of example, portion of a cylinder or head or piston/rod component 1004 having an opening for fluid delivery 1611 communicating with a fuel supply passage 1612 containing a wick or porous or permeable material at 1613. During the non-fuel delivery portion of the cycle, the wick or other material 1613 will permit a very small amount of fluid to enter the combustion volume, either as liquid or gas. During the main fluid delivery period, a sharp pressure wave is induced in the fuel supply passage, forcing fuel through the wick or other material to enter the combustion volume 1002 as a spray 1613. Optionally, earlier and smaller pressure waves may be used to supply part of the total fuel requirement, insufficient to cause predetonation. In another embodiment, part of the fluid delivery device is part of a separate unit, which can be removed and serviced or replaced at regular intervals. Although ceramics are very hard, long use and ablation by fuel could cause very small openings to enlarge over time. By way of example, section FIG. 79 shows schematically a removable unit 1614 containing a fuel delivery passage 1611 mounted in a head or other component 1004. Unit 1614 is attached by screw threads of a sinusoidal section 1615 to capture a wick or filter or porous or permeable material at 1613. Piston crown top at top/bottom dead center is indicated dashed at 1001. The unit 1614 and component 1004 could be of any suitable material, including ceramic. Such screw threads of sinusoidal cross-section may be used in any appropriate device or mechanism of this disclosure, and are not limited to use with ceramic components. The unit 1614 may have a depression 1616, shown also in plan view FIG. 80, which could optionally function as a tiny pre-combustion zone and/or as a key to receive a special driver for insertion the of unit. Fluid could be delivered by at least two pressure waves, a first one to supply portion of the delivery 1617 to the depression 1616, and a later fuel delivery 1618 after expansion has commenced. The removable unit 1618 is shown attached by screw threads, but alternatively may be attached by any suitable means, including by snap-ins using springs, adhesives, cover plates with screws or bolts, etc. It may be attached from the combustion chamber side of the head or component 1004, or from the other side. In the embodiments illustrated, wicks are shown. Instead of wicks, any kind of device may be used to restrict fluid flow to some degree, and/or to act as a heat sink, if desired. The single fluid passage 1611 may be replaced by a series of smaller passages delivering fluid synchronously. The wicks may be omitted, especially if the passages have a relatively small bore in relation to length, as shown schematically in FIG. 77. As noted, the gas generated by any boiling that occurs in any fuel delivery passage will tend to stall liquid flow and slow seepage. In a further embodiment, the features of FIGS. 79 and 80 are modified by incorporating some or all of the constructional features of the insert 1614 into the sleeve 1194 or the head 1004, as illustrated in FIGS. 74 and 75, and making fluid supply passage 1612 wide enough to load any wick or porous or permeable material from outside the working chamber 1002.

Figure 81:
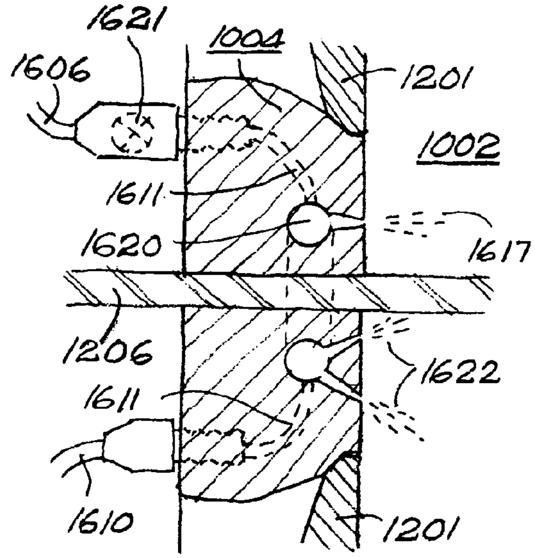
Figure 82:
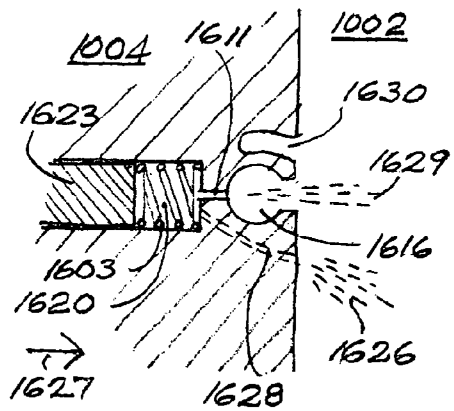

In an alternative fluid delivery embodiment, shown schematically by way of example in FIG. 81, a low pressure circular toroidal gallery or reservoir 1620 is formed in the cylinder head or similar component 1004. The head 1004 is pierced by one tensile crank link 1206, and there is a ring valve 1201. The reservoir 1620 is linked by passages 1611 and by optional non-return valve 1621 to a fluid supply line 1606, and to fluid return line 1610, which may also have a non-return valve (not shown). The valve 1621 protects the pump from any return pressure waves and from reverse pressure build up during combustion chamber compression. During fluid delivery a pressure wave is supplied by a plunger in a fluid delivery pump (not shown) and transmitted down the supply line to open the non-return valve, into the reservoir, causing a fluid jet 1617 or jets 1622 to enter the working chamber. Depending on the volume of the reservoir and its distance from the working chamber, it will act as a fluid heater. Once injected, any heated liquid fuel will combust and become gaseous more quickly, enabling an IC engine to run faster. Reservoir 1620 need not be of toroidal configuration, but can be of any convenient shape. In another embodiment shown in FIG. 82, a plunger 1623 retained by spring 1603 is mounted in a fluid reservoir 1620 in the cylinder head 1004. When the plunger is activated in direction 1627, it either injects fluid directly into the working chamber 1002 as at 1626 via passage 1628, and/or indirectly via passage 1611 and small optional pre-combustion zone 1616 as at 1629. Optional fluid return passages are not shown. The plunger may be cam actuated via a crankshaft or camshaft, or it may be electrically actuated. If the fluid is combustible and is delivered at above ignition temperature and under high pressure into a combustion chamber, when it comes into contact with the lower pressure compressed charge air it will immediately ignite, provided the charge is at sufficiently high-temperature. The resultant expansion will cause a jet of burning gas to exit the mouth of any pre-combustion chamber. When either the air in the small chamber is exhausted, or the temperature therein has dropped below ignition due to heat absorption of any latent heat of vaporization of the fluid, combustion in the small chamber will cease and the jet of fluid will be delivered through the mouth of the smaller chamber into the main combustion chamber 1002. An optional depression is shown at 1630, giving increased surface area and therefore heat transfer to the material surrounding the pre-combustion chamber.

Figure 83:
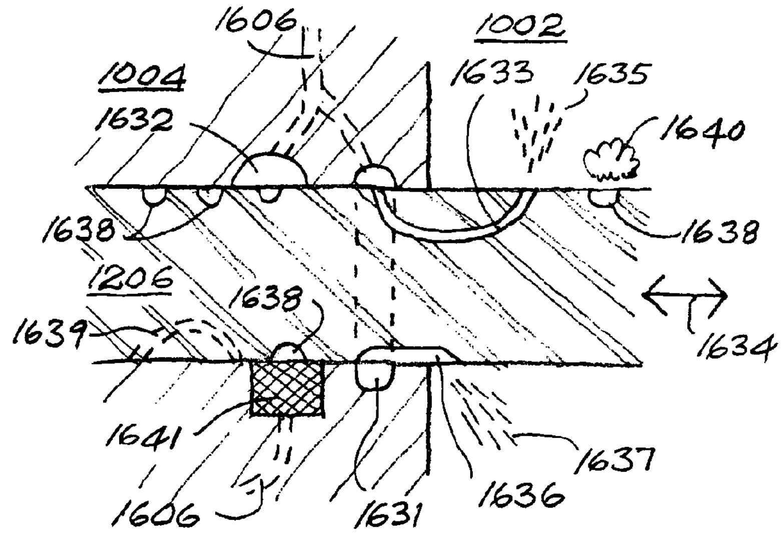

In an alternative embodiment, the crank link or piston/rod assembly form part of the fluid delivery device and, in a further embodiment, the crank's or piston/rod assembly's reciprocal motion wholly or partly actuates delivery of the fluid. FIG. 83 shows schematically by way of example several optionally alternative methods of fluid delivery, wherein the crank link 1206 is partly used to deliver fuel, and depicts the area where the link passes through the head 1004, at the top of the combustion chamber 1002. The link 1206 may be the rod portion of a piston/rod assembly. An annular groove 1631 and/or at least one depression 1632 is located in the head 1004 where the link 1606 passes through it. Alternatively, the groove may of any convenient form or shape, including discontinuous or non-annular. Depression 1632 and/or groove

Figure 85:
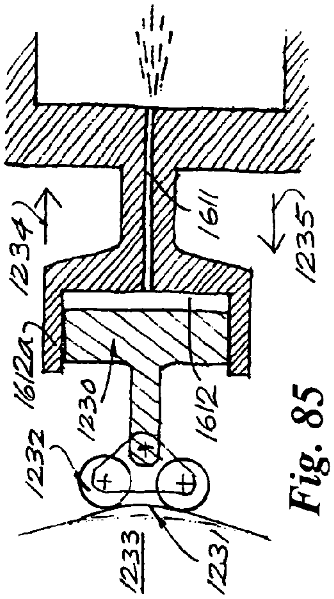
Figure 84:
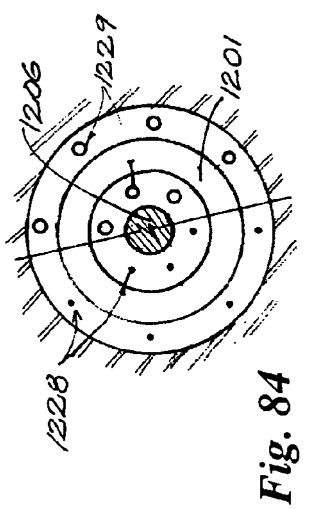

1631 are filled with fluid from supply passages 1606 under continuous or varying pressure. At a predetermined position at least one passage 1633 in the link 1606 reciprocating in direction 1634 will align itself with a depression or groove in the head, causing fluid to flow into the working chamber at 1635. The passage may be in the form of a groove as shown at 1636, causing fuel to be delivered at 1637, near junction of link and head. As the link moves, fluid supply to the first link passage or groove is cut off, but soon other depressions 1638 and/or passages 1639 may be aligned with the head fluid supply, providing a controlled supply of fluid to the working chamber 1002. Depressions such as at 1638 transport pockets of fluid into the combustion chamber where, if it is a combustion chamber, they will start combusting adjacent to the link, as at 1640. The same procedure can be used to supply other fluids, including water or water/methanol mixtures, to a working chamber. It will be obvious that the pressure of the residual fluid in each depression is more or less proportional to the pressure in the working chamber at each communication. Depending on fluid supply pressure, the depressions in the tensile member may be wholly or partially filled with fluid, which may lubricate the bearing surfaces between tensile member and head. Alternatively, instead of a groove or depression in the head, a wick or other porous or permeable material 1641 is provided. As will be disclosed later, the piston/rod assembly may rotate as well as reciprocate, and in such case the precise location and alignment of fluid reservoirs with passages will ensure delivery of fluid to the working chamber at the exact times desired, either by the fuel being "carried" into the combustion volume, or by a combination of alignment of volumes and pressurization of the fuel supply. Optional fluid return passages are not shown. The embodiments disclosed in FIG. 83 generally do not require a powerful pressure wave to deliver fluid. In today's smaller diesel engines, the fuel pump and injectors may consume up to 10% of the total engine power output. Eliminating such pumps and injectors could lead to greater engine efficiencies. The carrying of fluid into working chambers is further disclosed subsequently. Multiple fluid delivery locations can be arranged in any manner. FIG. 84 shows schematically, by way of example, an interior plan view of the cylinder head having a ring valve 1201 co-axial with piston rod 1206, and illustrates one way in which fuel jet orifices 1228 and/or pre-combustion chambers 1229 may be arranged. This distributed fuel delivery is likely to increase the speed limit at which efficient combustion can be achieved. In selected embodiments, fuel delivery is actuated by a cam-driven plunger. By way of example, FIGS. 85 and 86 show schematically, in section and plan section, a plunger mechanism 1230 for activating fuel delivery, the plunger in turn activated by cam 1231 located on a crank disc or camshaft 1233. Here, the plunger is seated over a fluid reservoir 1612 contained in a structure **1612*a* mounted on the head 1004, and is enlarged and of kidney shape, to clear a tensile member or piston rod 1206. The cam follower 1232 is of a design to permit continuous and variable loading including under high loads. As pressure in the combustion chamber increases, it is transferred to the fluid via the orifice 1602 and passage 1611, and from the fluid to a combined camshaft/crankshaft 1233. The loads on the crank during high working chamber pressures are in the direction 1234 if the crank link is principally loaded in tension, which can be partially offset by the loads transferred to the crank/cam in the direction 1235 by the fluid, thus reducing maximum crank bearing loads. In operation, the cam depresses the plunger to effect fluid delivery at 1617**. The cam and follower combination may be of variable timing and reciprocal action types disclosed elsewhere herein, to provide variable quantity and timing of fuel delivery. Similar cam-activated plunger systems may be used to provide lubricating fluid to either engine components, or to systems linked to the engine, such as transmissions, fluid pumps, etc.

In another embodiment, portions of the cylinder assembly comprise substantially identical components arranged in mirror image about each other, and optionally arranged about a port located between them. Optionally the cylinder assembly is built about a piston or piston/rod assembly already in final position. By way of example, FIGS. 87 and 88 show schematically, in longitudinal- and cross-section respectively, a piston 1243 reciprocating in a "twin cup" 1244 cylinder assembly, each "cup" having an integral half-cylinder and head configuration. A clearance space 1245 when located at area "A" is shown enlarged in FIG. 89, when the piston has returned to TDC. The piston has stiffening flanges 1252. The clearance space 1245 is discontinuous, ie not annular, although optionally it may be so. Here a pressure wave during fluid supply causes fuel supplied via passage **1246*a* to be forced through wick or porous or permeable material 1246, via tensile member depression or passage 1247, into an optional pre-combustion chamber 1248 and thence to clearance space. Several such clearance spaces with optional associated pre-combustion spaces, depressions or passages may deployed around the circumference of the head. Fluid can be delivered to these discontinuous clearance spaces by any means. The fluid delivered via wick or other materials 1246 can be used to provide some degree of lubrication between the rod portion of piston 1243 and "cup" 1244. The two "cup" halves 1244 of the cylinder assembly have their joint about the exhaust ports 1249, where working chamber pressures are low, and are in this embodiment interlocked as shown at 1244*a* to provide accurate location. In a selected embodiment, suited to two-stroke IC engine applications, where the piston reciprocates horizontally—in other embodiments it reciprocates at any angle to the horizontal plane—charge purification can be provided by residual exhaust gas bleed off. In operation, after the piston has masked the exhaust port, these remaining exhaust gases in the compressing charge being hottest, will rise to the top of the volume and fill the specially provided depressions 1251. As the piston moves up the cylinder, the depressions communicate with the piston void 1253, in turn communicating with the exhaust port. In another embodiment, the reciprocating motion of the piston within the cylinder, or of the cylinder about the piston, is used to regulate the delivery of fluid to the working chamber. A volume or reservoir containing fluid only, or fluid partly contained by a movable weight, is incorporated in the moving component, in such a way that centripetal force and/or the deceleration of the fluid causes a pressure wave to build up in the volume, which communicates with passages and/or weep holes or orifices opening onto the working chamber. By way of example, FIG. 90 shows schematically a portion of a working chamber 1002 with the piston/rod assembly 1206 reciprocating in direction 1634 in cylinder head 1004, just before top dead center, which position is shown dashed at 1645. A fluid volume 1646 in the piston/rod assembly is supplied via passage 1647, communicating with wick or porous or permeable material holding a quantity of fluid 1648 supplied via passage 1606, in a manner similar to embodiments disclosed previously. Optional fuel return passages are not shown. In the volume 1646 is a weight 1649 restrained by a spring 1603, there being an air pocket 1650 behind the weight, optionally communicating with working chamber by narrow passage 1651. Optionally, a shallow pre-combustion space is provided by the depression at 1652. When the piston decelerates toward top dead center, the mass of both weight and fluid causes a pressure wave to build up in the fluid, such pressure being sufficient to overcome the surface tension at weep hole or orifice at 1653 and the pressure in the combustion space. If the piston both reciprocates and rotates, as will be disclosed later, then a separate pressure wave can be induced by centripetal forces acting on the mass of the fluid and any optional weight. In such combined motion piston/rod assemblies, fluid supply per cycle can be increased as engine speed rises, by angling chamber 1646, as shown schematically chain dashed at 1646***a*.

In a further embodiment, special "component-less" fuel delivery by pressure drop is used. In other embodiments, the fuel is superheated and/or is in the system under a given pressure, which can be variable and a function of combustion chamber pressure. At the moment fuel delivery is intended to commence, a local pressure drop in the combustion chamber is induced adjacent to a fuel delivery orifice, causing the fuel to issue forth. Such a technique may be used to provide all the fuel requirement or only a partial requirement, for example that to initiate combustion in a pre-combustion zone. Regulation of quantity of fuel supplied can be by variable restriction of fuel supply passages. By way of example, FIG. 91 shows schematically part of a piston/rod assembly 1606 reciprocating in direction 1634 in portion of cylinder head 1004, when it is at top/bottom dead center. The rod portion of component 1206 has a depression of any configuration and volume at 1655, which is masked from the combustion volume early in the compression stroke. The outline of component 1206 at the beginning of the compression stroke is shown dashed at 1656. Near top dead center the depression aligns with a fine passage 1657 communicating with a relatively small pre-combustion area 1652 where, because pressure in 1655 is much less than in 1652, a sharp pressure drop is caused, so that fuel issues from fuel chamber 1658, supplied by passages 1606 and optional non-return valve 1621. Optional fuel return passages are not shown. The pressure in the chamber 1658 will previously have been equal to that in the combustion chamber due to the small open fuel delivery weep hole(s) 1653. In weep hole type systems there will usually be a volume—it could be a volume containing enough fuel for one combustion cycle under certain operating conditions—just behind the hole, which in turn communicates with the fuel supply. During cold start a small electrical heater 1659 linked to electrical circuits at 1660 can be deployed in chamber 1658 to heat to the desired temperature the fuel delivered for each combustion cycle, with optional variable heat input to compensate for different engine speeds during start. This system can be augmented by one or more induced conventional pressure waves in supply passage 1606, which will open the non-return valve 1621, to either refill the fuel chamber 1658, and/or to supply additional fuel during the fuel delivery period. In other embodiments, replaceable or removable combined fuel delivery/pre-combustion zone units cam be mounted in either the piston/rod component or in the cylinder assembly, including the head. By way of example, FIG. 92 shows a combined unit 1665 screwed into a piston/rod or cylinder or head 1004, by means of drivers or keys in slots 1664. Threads 1663 are of roughly sinusoidal cross-section. Fuel delivery reservoir or volume 1658 is supplied via fuel supply passages 1606, and heater 1659 is linked to terminals 1666 in the female opening 1667 in the head, connecting to electrical circuits 1668 in the head 1004. An optional non-return valve is shown at 1621, and unit 1665 is seated one or more washer(s) 1671, say of soft metal, to form a seal. Optional fuel return passages are shown dashed at 1610. The fuel can be delivered via one or more pressure waves in supply passage 1606, and can be sufficient for delivery to the optional pre-combustion zone 1652 in unit 1665, indicated by spray 1669, and/or sufficient for part or whole or remaining portion of the cycle, indicated by spray 1670. Quantity of fuel delivered is governed by the strength and duration of the fuel delivery pressure wave(s). Here the removable unit has been mounted from the combustion chamber 1002 side of the head, but it could equally well be mounted from the other side of the head, along the lines shown schematically in FIG. 9. All the fuel delivery devices disclosed earlier herein can be adapted to use removable type units as 1665 of FIG. 92. The unit has been shown to be attached by means of screw threads, but any alternative fastening or attachment means may be used for devices similar to and including unit 1665, including snap-ins using springs, adhesives, cover plates with screws or bolts, etc.

In a further embodiment, one or more labyrinth seals, typically comprising small depressions or grooves, can be provided in the piston/rod assembly and/or the cylinder assembly, to reduce gas blow-by in any location. By way of example, schematic FIG. 93 shows portion of a piston 1243 is traveling in direction of arrow during compression in part of a cylinder assembly 1244, wherein depressions 1254 are located in the piston/rod 1243. In selected embodiments, corresponding spaced depressions or grooves 1255 are provided in the cylinder assembly 1244 wall. If disposed uppermost in IC engines, they will tend to be filled with inert exhaust gas rather than usable charge. It can be seen that, as the piston moves up the cylinder to compress the charge, that the pressure in the grooves will always be close to, but a little less than, the charge pressure at that time. Various pressure levels are shown by P1, P2, etc. It is known that the smaller the pressure differential between two gas reservoirs, the slower the rate of gas travel per unit mass between them. Therefore the rate of possible gas travel in piston/cylinder clearance space 1255 (the blow-by) will be reduced. For the sake of clarity, depressions 1254 and 1255 are shown larger than they would generally be in practice. Although the latter is shown larger than the former, they may be of any size relative to one another. The depressions may be singular or plural; continuous or discontinuous; be of any form, depth or extent; be linear or curvilinear; and run in any direction relative to axis of reciprocation. In a selected embodiment they are continuous and annular. Although here the depressions or grooves are shown in both the piston and the cylinder wall, they may be in only one component.

In a further embodiment, as an alternative to making a tensile crank link elastomeric or flexible and so accommodate slack, the slack is taken up in the bearing(s), permitting the tensile member to be rigid. If movement in the bearing can be restricted to one dimension, and if the slack-accommodating bearing is such as to always permit transfer of load, then the tensile member may be designed to also function in compression. In twin crank engines, if the link can transfer both tensile and compressible loads, then two links may share the work of each expansion, reducing the total load carried by a single link, as well by each bearing and by a crank throw at any one time, so permitting lighter construction throughout. In addition, a much smoother running engine should result, since the crankshafts are subjected to much more evenly distributed loads. In the examples here, the bearing between crank and tensile link is considered. However, any or all of the features described may be equally applied to a bearing between tensile link and the rod of a piston/rod assembly, or any appropriate bearing in any engine or mechanical system. By way of example, FIGS. 94 and 95 show in schematic cross-section two versions of a "stretched circle" bearing which permits take up of slack, where a link 1282 capable of being loaded in both tension and compression is integrally attached to non-circular outer bearing shell 1283. A part outline of a crank disc is indicated schematically at 1295. Between outer shell and inner bearing 1284 shell is a compressible substance 1285, with FIG. 94 showing an intermediate shell 1286 to contain the compressible substance. The intermediate shell may be free to revolve or may be located relative to outer shell by guides, shown schematically at 1287. Any kind of compressible material may be enclosed at 1285, including elastic ceramic fiber assemblies, polymers, springs, etc. In selected embodiments, fluids are used, preferably gases. When the link is loaded in direction 1289, the gap between shells at "a" will tend to reduce. If an aperture is provided at 1290 and clearance space at 1291 is minimized, then fluid under pressure will be forced through the gap into main bearing clearance space 1292, providing bearing support. In the case of gas bearings, pressure can be made proportional to load by such means. If in FIG. 95 the compressible material is a fluid and the clearance spaces are kept to a minimum at 1293, then fluid pressure on working bearing faces is more or less continuously proportional to load. Compressible component 1285 can be of any material, and can be a solid, a liquid, a gas, or a combination of any of these. The range of possible movement of shell 1294 is shown dashed. In a further embodiment, if it is desired to shift bearing shells rapidly in relationship to each other, then a phased pressure relief is provided to assist rapid shell movement. In FIG. 95 for example, the crank web disc 1295 is provided with apertures 1296 linked by passage 1297 so that as the disc turns in direction 1298, the relative angle to link 1282 changes to permit both the apertures to simultaneously communicate with volume 1288, permitting rapid fluid transfer from one side of the volume to the other. As the crank continues to turn, the relative angle of 1282 changes to mask one of the apertures, and so shut off transfer of gas via the passageway. FIG. 96 shows the layout of the variable radii of the interior surface of an outer gas bearing shell, provided with fluid, optionally under pressure, via apertures 1299, so as to permit progressively larger clearance gaps at the perimeter of contact area, as the inner bearing shell 1300 approaches the midpoint of its relative movement range. It is clear that differing interior profiles of the mid section of shell 1283 will cause varying travel speeds of inner shell 1284 between end positions, and so rates of acceleration and deceleration of the piston will be governed by varying shell profiles. The pressure in the gas bearings may be made directly proportional to the pressure in the combustion chamber (and therefore also partly proportional to the loads on the link) by means of small passages 1301 communicating with the chamber, providing gas access to the highly loaded bearing areas via apertures and/or optional non-return valves 1302, either on both sides of the volume, as in FIG. 94, or on one side only, as in FIG. 95. The passage from the combustion chamber may be interrupted by a filter or one-way valve mechanism shown schematically at 1303. A one-way pressure relief valve as part of the mechanism of 1303 would permit only high pressure gases to pass in direction 1304, permitting gas bearing pressure to be higher than the combustion chamber pressure during portion of the cycle.

Figure 99:
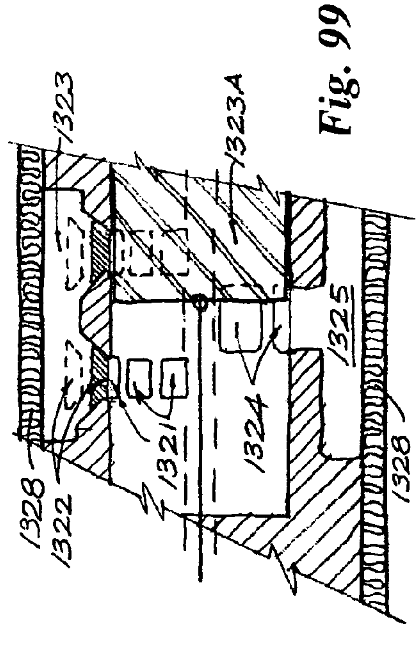
Figure 100:
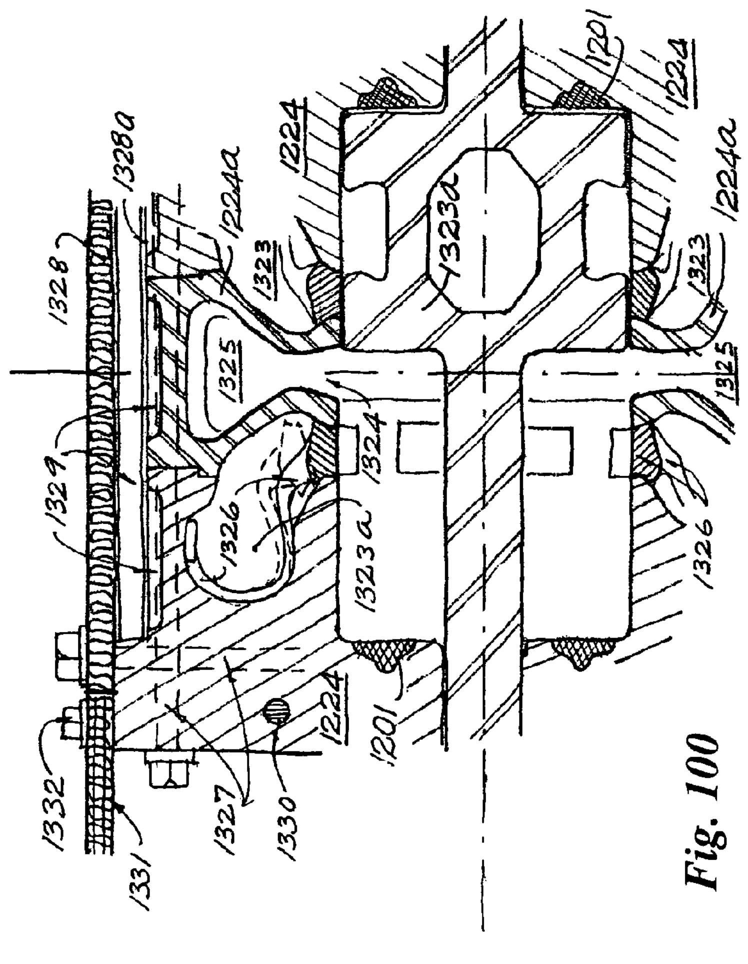
Figure 101:
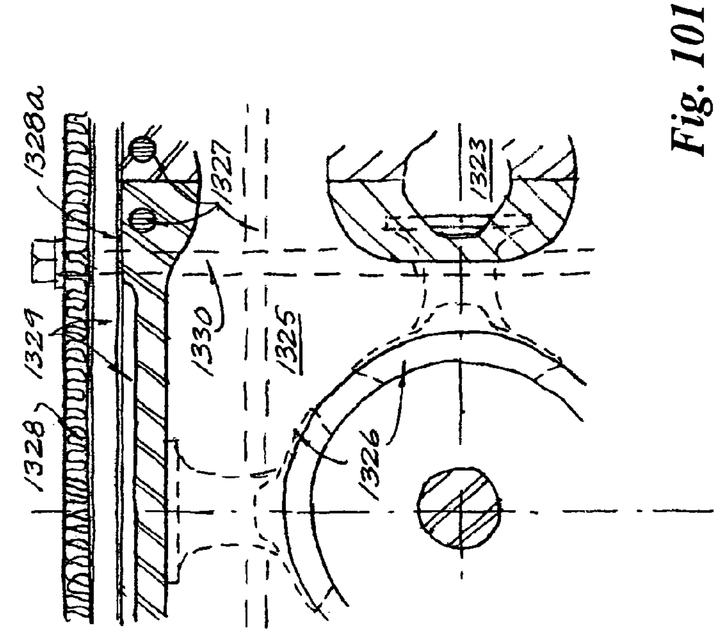
Figure 102:
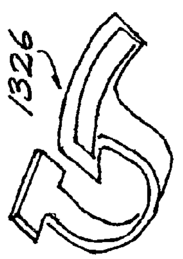

In, for instance, the case of compound engines, it may be desirable to use exhaust gas at high temperature and pressure to power a turbine, and to have a requirement for exhaust pressures to be low to facilitate two stroke combustion chamber scavenging, which is made easier because there is only a fraction of total exhaust gas for the incoming charge to displace. In a selected embodiment, at least two separate exhaust processing volumes are incorporated in an engine, each having exhaust at different temperatures and pressures. In a further embodiment suited to two stroke engines, a substantial quantity of exhaust leaves a combustion chamber at high temperature and pressure substantially before the intake valve opens, with the remaining lesser quantity of exhaust gas at lower temperature and pressure then displaced by the incoming charge air. After scavenging has been thus facilitated, the gases are optionally re-mixed to be processed, treated and/or to supply a turbine intake at an average of the earlier two temperatures and pressures. As disclosed subsequently, in alternative embodiments the reciprocating stage of a compound reciprocating/turbine IC engine may deliver exhaust gas to two or more turbine stages. Optionally, exhaust gases from the different exhaust gas volumes of a reciprocating engine stage may go to multiple turbine stages at differing temperatures and pressures. By way of example of an engine having two-stage exhaust, FIG. 97 shows schematically a cross-section of a five cylinder engine with a high pressure, high temperature exhaust volume at 1308 with exit at 1309, surrounded by a low pressure, low temperature volume at 1310 with twin exits at 1311. Any convenient arrangement for segregated exhaust volumes may be employed, including for single cylinder and other multiple-cylinder engines. In a further example, FIG. 98 shows a schematic layout of a compound system with a reciprocating engine 1312 having ambient air intake 1313, high pressure exhaust 1314 and low pressure exhaust 1315. High pressure exhaust is conducted to a high performance turbine 1316 to exit at 1317, at a pressure approximately matching that of low pressure exhaust 1315 with which it is mixed, and be conducted through low temperature turbine or other energy recovery device 1318, such as a steam or Stirling engine, to emerge at 1319 as close to ambient pressure as possible. Optionally the first turbine 1316 might be linked by shaft 1320 to the second turbine or other device 1318, which may be a turbo-charger supplying compressed charge via optional duct 1313*a* for engine 1312. Additionally or alternatively, the turbine might be mechanically linked at 1320*a* to engine 1312, and/or second engine 1318 may include a regenerator system to transfer heat energy at 1313*a* to engine 1312 air intake. By way of example, FIG. 99 shows a cross-section of a portion of the schematic engine of FIG. 97, where high pressure exhaust ports 1321, closed by pressure activated non-return valves 1322, communicate with high temperature and pressure exhaust reservoir 1323. The piston 1323A when close to BDC/TDC unmasks ports 1324, communicating with low temperature and pressure exhaust reservoir 1325. Thermally insulating structure 1328 encloses both volumes 1323 and 1325. Another example is shown in FIG. 100, which is a long section, FIG. 101, which is a cross section through the cylinder, and FIG. 102 which shows one valve 1326. Two substantially identical "cup" like components 1224 are arranged in mirror image relative to each other, separated by a third component 1224*a*, with a reciprocating piston/rod assembly 1323*a*, ring valves 1201, and incorporating two separate and substantially circumferential exhaust processing volumes 1323 and 1325. The high pressure volume 1323 has four shaped snap-in non-return spring loaded valves 1326. On the expansion stroke, the gases are at sufficiently high pressure to open the non-return valves 1326. As the piston exposes the low pressure exhaust volume 1325 via the central port 1324, the pressure in the chamber drops sufficiently to cause the spring loaded valves 1326 to close. On the compression stroke pressures will be much lower and insufficient to re-open the valves. The modules are assembled via tensile fasteners 1327, which also attach a partly evacuated thermally insulating cover 1328, separated from structural elements by trapped air space 1329. An intermediate thermally insulating partition is shown at 1328*a*. Multiple cylinder modules are attached to each other via tensile fasteners 1330, with crank cover 1331 attached last at 1332. A similar construction, including tensile fasteners 1327, is shown also in FIGS. 87 and 88.

Figure 103:
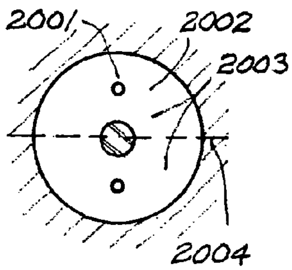
Figure 104:
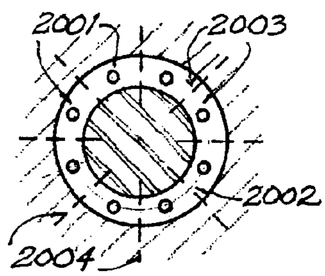
Figure 105D:
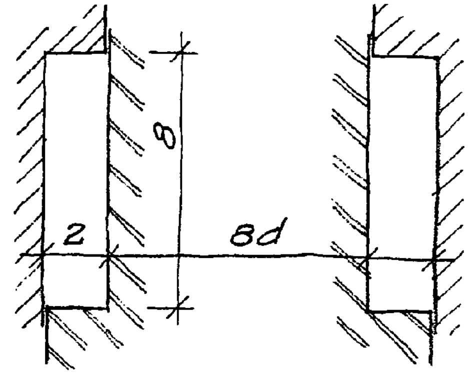
Figure 105A:
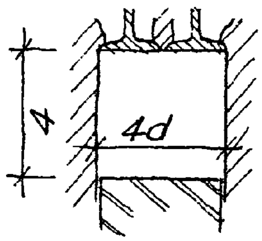
Figure 105B:
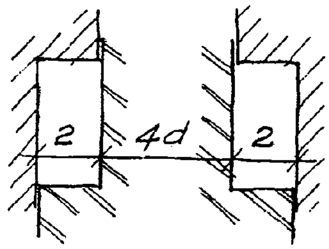
Figure 105C:
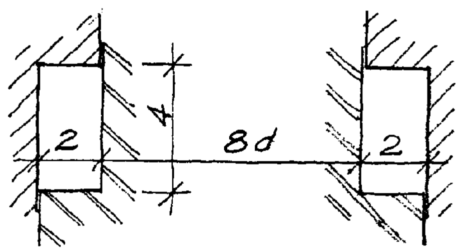

Rather than consider the working chamber a hollow-cored stub cylinder, it may be perceived as toroidal or doughnut shaped. FIGS. 103 and 104 show, by way of example, cross-sections through such combustion chambers, looking toward the cylinder head. If multiple fluid delivery points 2001 are provided in each toroid 2002, then the toroid may be considered a series of abutting and synchronously operative working chambers 2003, with notional boundaries say at 2004. It can be seen that, taking this approach, the total working chamber can be made as large as desired in a single cylinder application, especially as a feature of the engines of the invention is the drastic reduction of reciprocating masses as a design constraint. The components can be virtually of any size. It is intended that even very large IC engines, such as for marine and railway applications, could be made in one, two, three or four cylinder configurations. Advantages of the toroidal shape are the relative reduction of both surface area and seal length per unit volume, and a potential reduction of stroke—and therefore piston speed—per unit volume. Table 1 shows how these and other parameters vary with combustion chamber geometry, taking the chambers of FIGS. 105A, 105B, 105C and 105D as examples. In the diagrams, the numbers represent any unit of length, the symbol “d” stands for diameter, and the chamber of FIG. 105A depicts a conventional combustion chamber with inlet and exhaust poppet valves. It is assumed that the chambers of FIGS. 105B, 105C and 105D are the valveless configurations disclosed elsewhere herein. All the chambers are assumed to have 16:1 geometric compression ratio. In this document, compression ratio is sometimes abbreviated as CR.

TABLE 1

VARIATION of PARAMETERS with COMBUSTION CHAMBER GEOMETRY

| | Engine Type (See FIG. 105) | | | |
|---|---|---|---|---|
| | A | B | C | D |
| Volume: Units cubed | 50.3 | 150.8 | 251.3 | 502.6 |
| Piston Speed (Ave) at 100 rps: Units ps | 800 | 800 | 800 | 800 |
| Piston Speed per Unit Volume: Ratio | 15.9 | 5.3 | 3.2 | 3.2 |
| Stroke per Unit Volume: Ratio | 0.079 | 0.027 | 0.016 | 0.016 |
| Chamber Surface Area (excl. Piston): Units sq | 62.9 | 138.2 | 213.6 | 364.4 |
| Surface Area per Unit cubed (volume): Units sq | 1.26 | 0.92 | 0.85 | 0.73 |
| Seal Lineage: Units | 23.9 | 37.7 | 62.8 | 62.8 |
| Seal Lineage per Volume: Unit | 0.475 | 0.25 | 0.25 | 0.125 |

The piston surface area has been excluded, because in conventional engines heat loss, and therefore reduction of efficiency, is primarily through cooled surfaces, the engine block and the cylinder head. It can be seen that, in comparison with conventional combustion chambers of equivalent swept volume, in combustion chambers of toroidal configuration three important design constraints are reduced, in relation to unit volume: stroke and therefore piston speed, surface area and therefore heat loss through traditional cooled surfaces, and seal lineage and therefore blow-by loss.

Figure 107:
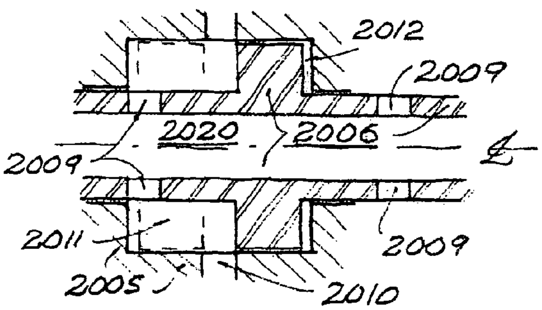
Figure 106:
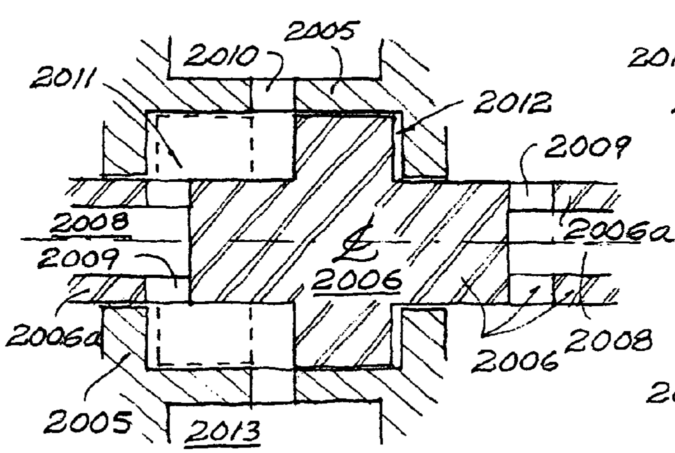
Figure 108:
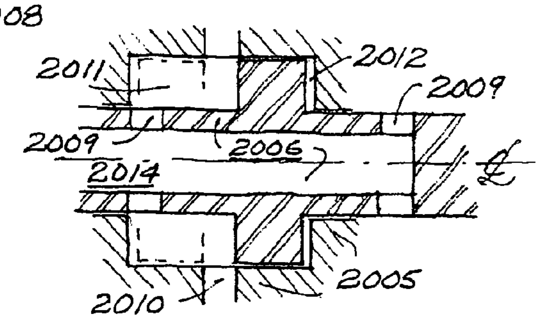
Figure 109:
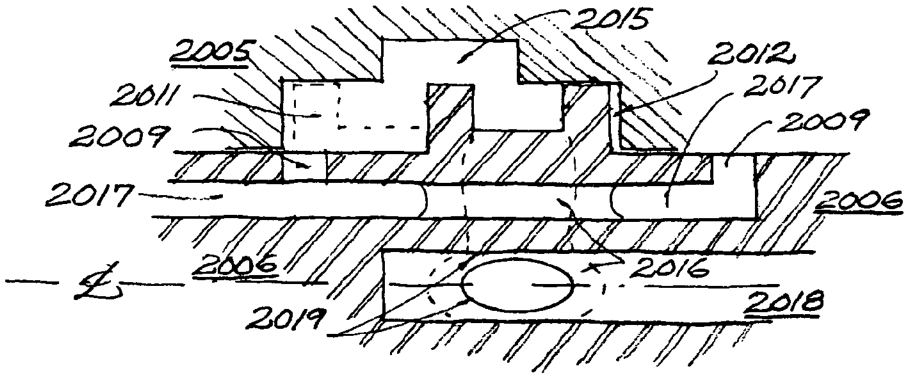
Figure 110:
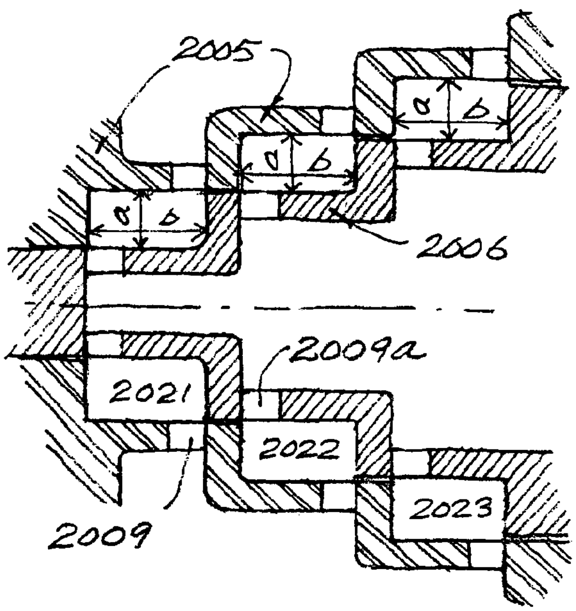
Figure 111:
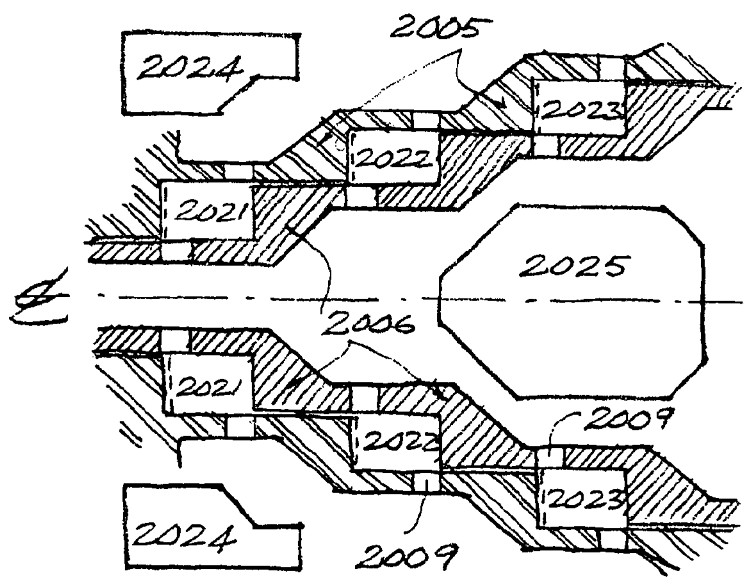

In another embodiment, further simplification is achieved by eliminating actuated valves and all the mechanisms they require. The interior of the piston/rod assembly can be used for many possible functions, including as a conduit for engine gases, either charge or exhaust or both. Because the piston/rod assembly reciprocates, it is possible to arrange for cross-flow porting. By way of example, FIG. 106 shows schematically such an arrangement, wherein the integral reciprocating piston/rod assembly 2006 moves inside cylindrical housing 2005, shown here with toroidal working chamber 2011 at maximum expansion and toroidal working chamber 2012 at maximum compression, with the piston at top/bottom dead center. The piston rods 2006*a* are hollow, containing inlet or exhaust conduits 2008, one of which is shown communicating via exposed ports 2009 with the combustion chamber 2011 and, via exposed ports 2010, with circumferential gas handling volume 2013. It is clear that, in this example of a two-stroke device, a fluid flow is induced diagonally across the section of the toroidal chamber. The flow might be in either direction. In the schematic examples of other valveless devices shown by way of example in FIGS. 107, 108 and 109, the exhaust and inlet “ends” of the working chamber are also interchangeable. FIG. 107 shows how inner ports 2009 all communicate with one end 2014 of the reciprocating assembly 2006. FIG. 108 shows how the inner ports 2009 for both toroidal working chambers 2011, 2012 are served from both ends of, and are linked by, a central passage 2020. FIG. 109 shows how the reciprocating piston/rod assembly 2006 can act as a conduit for both inlet and exhaust fluids by, for example, the use of a transfer port at 2015. The ports 2009 communicate with a tubular shaped processing volume 2017, which is separated from the other cylindrically shaped fluid processing volume 2018, which in turn communicates with the transfer ports 2015 by means of openings 2019 and enclosed passages 2016, here shown shaped or tapered for noise reduction purposes. In another embodiment, multiple varied diameter toroidal working chambers are simultaneously in compression and subsequently expansion. Examples are shown schematically in FIGS. 110 and 111, wherein only half of complete piston and cylinder assemblies are shown. Each of the toroidal combustion chambers 2021, 2022, 2023 has the same cross section, but have different diameters. Dimension “b” represents stroke plus clearance space, while dimension “a” represents half the toroidal chamber external radius minus the internal radius. The stepped configurations of the two components also make it easier to design bearing surfaces of the required rigidity. The arrangement shown in FIG. 110 permits the two ports 2009 and 2009*a* to be matched up to each other about midpoint of piston travel, for a relatively brief period (since the piston is traveling at maximum speed) relative to porting time at bottom dead center. This might be for the purpose of providing extra air to an IC engine exhaust, or to cool it. FIG. 111 shows an arrangement where there is no such overlap or port to port alignment. Both FIGS. 110 and 111 are schematic and show only those working chambers on one “side” of a piston powered by or powering working chambers at each end, that is those chambers that are synchronously all at top or bottom dead center. It is obvious from previous disclosures that additional working chamber(s) may be incorporated on the other “side” of the piston. Such varying diameter coaxial toroidal working chambers permit the incorporation of IC engine charge processing and other systems within overall engine dimensions, as shown diagrammatically in FIG. 111, where 2024 and 2025 are coaxial ancillary systems. Such systems might comprise a supercharger, blower, or impeller, turbocharger, starter, generator, turbine or other linked engine system. Alternatively the volumes shown at 2024, 2025 might be occupied by systems not directly part of the engine, such as a liquid or gas pump, rocket motor, exhaust processing volume, electric generator and/or starter motor. Obviously, the fixed and moving components can be transposed. For example, in FIGS. 110 and 111 (which show the synchronous combustion at maximum expansion), component 2006 could be fixed and component 2005 moving. Such an application might be for a liquid pumping device mounted coaxially with or on the pipe carrying the liquid. All the diagrams of this section have been simplified, with any fuel delivery, lubrication systems, etc, not shown.

Figure 114:
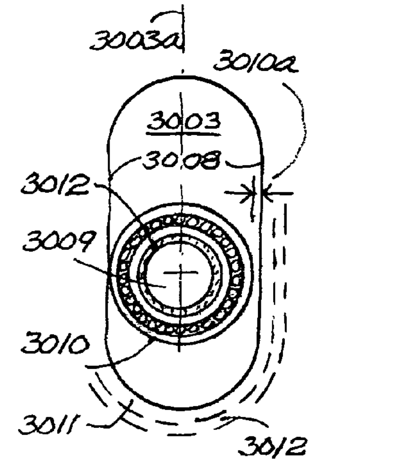
Figure 115:
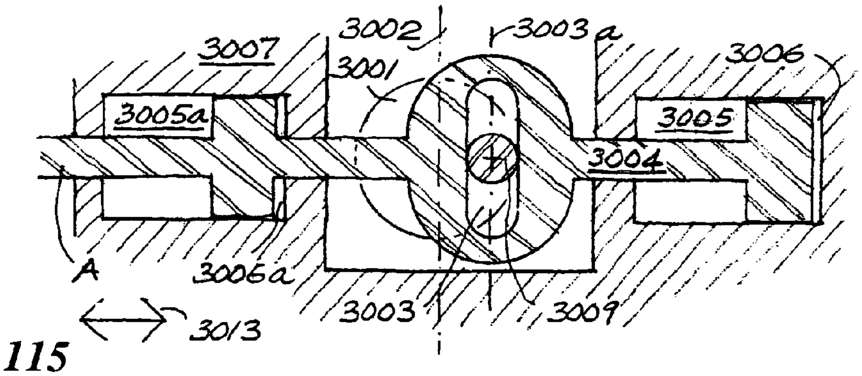
Figure 117:
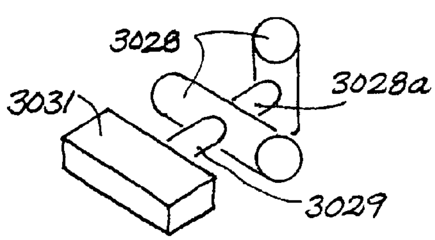
Figure 118:
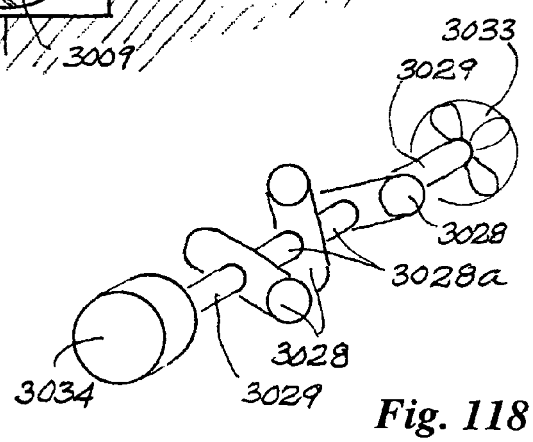
Figure 119:
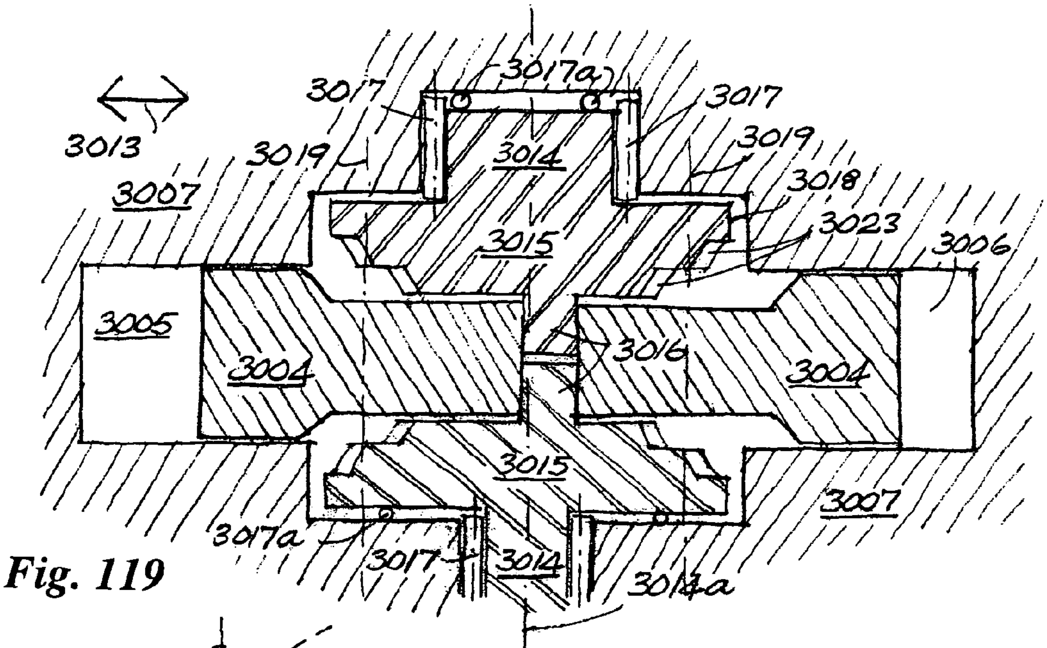
Figure 120:
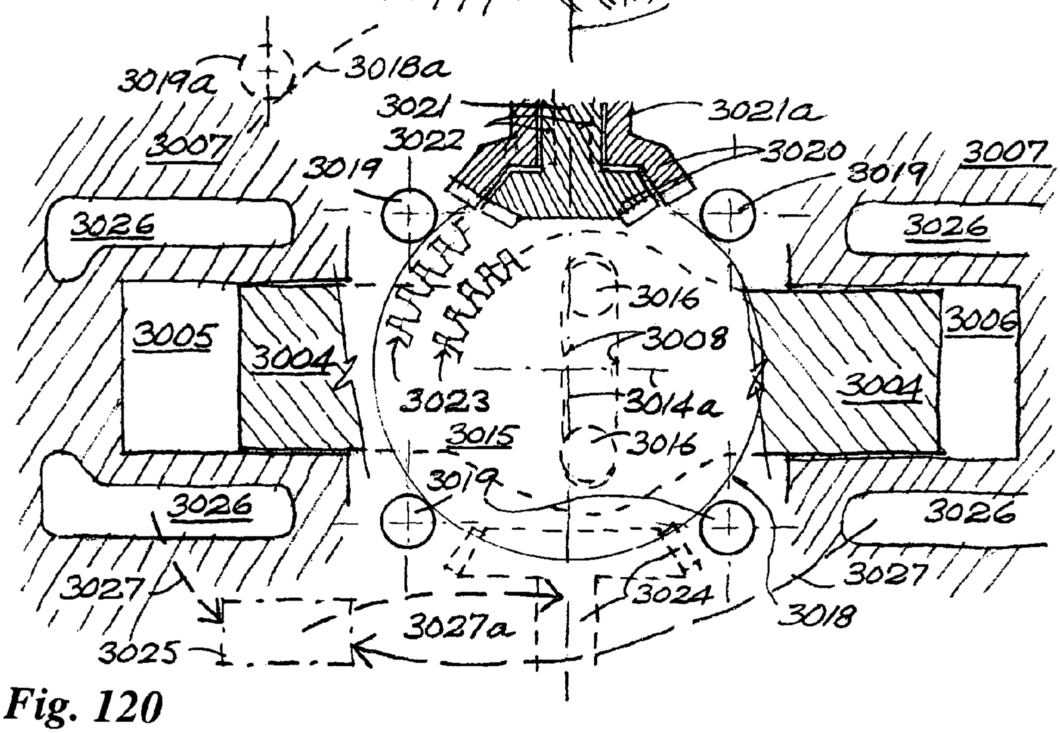
Figure 121:
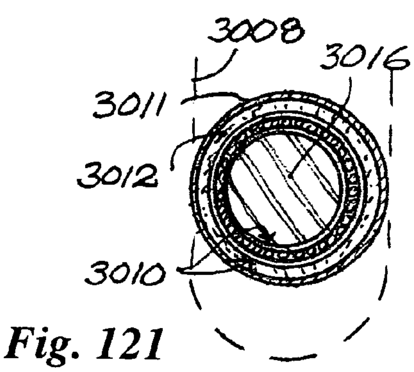

In a further embodiment of the engine of the invention, a reciprocating element can be mounted about a crankshaft using a device known as a scotch yoke. An example is shown schematically in plan section FIG. 112 and elevational section FIG. 113, wherein conventional crankshaft 3001 revolving about axis 3002 passes through an elongate slot 3003 in a piston/rod/yoke element or assembly 3004, reciprocating in direction 3013 and enclosed in a rigidly interconnected housing system or assembly 3007, to define opposed working chambers 3005 and 3006. In operation, the inside surfaces 3008 of slot 3003 push on crank-pin 3009 having axis 3003*a*, to rotate the crankshaft 3001. For simplicity crankshaft bearings and bearing housings are not shown. In a selected embodiment, FIG. 114 shows schematically a detail of a bearing 3010 mounted on the crank-pin 3009, alternately bearing on surfaces 3008. Any convenient type of bearing may be used; here a roller bearing is shown. Preferably the internal width of slot 3003 should be slightly wider than crank-pin or bearing 3010 diameter, providing a clearance gap 3010*a* on one side of the pin or bearing at any one time. Should energy storage and retrieval systems, such as described elsewhere herein, be desirable, or for other reasons including to absorb shock, then elastomeric or compressible elements can be introduced between the reciprocating element and the crank-pin, as shown schematically at 3012, where it is mounted between bearing 3010 and crank-pin 3009. As shown dashed in the lower part of the diagram, an elongate bearing sleeve 3011 may be mounted within the reciprocating assembly 3004 to define slot 3003, and separated from it slot by elastomeric material 3012. As an alternative or addition to the elastomeric material between bearing 3010 and crank-pin 3009, a contact shell may be mounted over a roller or other bearing and separated from it by elastomeric material, which is sandwiched between the outer surface of the bearing and the circular shell making contact with slot 3003. A similar arrangement is shown in FIG. 121. In some applications, it would be practical to have only one set of sleeve or shell and elastomeric material. A scotch yoke/crankshaft assembly may be driven by one or more pairs of working chambers mounted either on one side of or on each side of it, as shown by way of example in schematic FIG. 115. The central scotch yoke mechanism is as described for FIGS. 112 through 114. On the right side of FIG. 115 are working chamber 3005 of toroidal form, and working chamber 3006 of cylindrical form. On the left side, both working chambers 3005*a* and 3006*a* are of toroidal form, since the piston/rod/yoke assembly 3004 has been extended through the housing or cylinder assembly 3007 at "A", to drive some other mechanism or engine. If this other mechanism rotates, a device for converting reciprocating motion to rotational motion, including those described elsewhere herein, can be mounted at or outboard of "A". If the reciprocating yoke assembly is substantially as strong in compression as in tension, then working chambers can be mounted only one side of it, in similar fashion to the embodiment of FIG. 122. The single reciprocating element/multiple working chamber modules of FIGS. 112 through 115 can be multiplied and/or combined with other elements in any way. Selected embodiments are illustrated schematically by way of example in FIGS. 116, 117 and 118. Multiple working chamber(s) having a piston/rod/scotch yoke assembly, collectively modules 3028, optionally each as shown in the preceding Figures, may be linked by shafts 3028*a*, with the modules either oriented in the same plane as in schematic FIG. 116, or in two planes at right angles to one another as in schematic FIG. 117, or in multiple planes in no regular angular relationship to one another as in schematic FIG. 118, wherein 3029 is an external shaft assembly to drive a component or mechanism of any kind. The external drive shafts 3029 may communicate with transmissions 3031, wheels 3032, propellers 3033, or other systems not shown, such as electrical generators and/or motors, pumps, etc., or with second engines 3034. Where single or multiple units 3028 are mounted about a multiple drive shaft system, each of the shafts may operate at different speeds relative to one another and to the scotch yokes/crankshafts, by means including conventional gearing and/or by means of the devices disclosed in FIGS. 119, 120, or by any other means.

Figure 112:
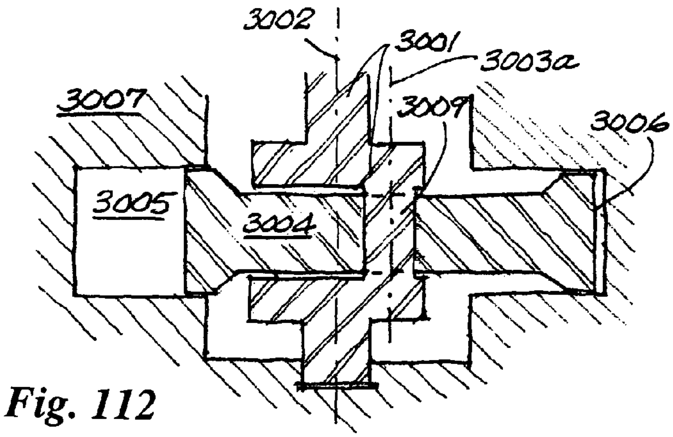
Figure 113:
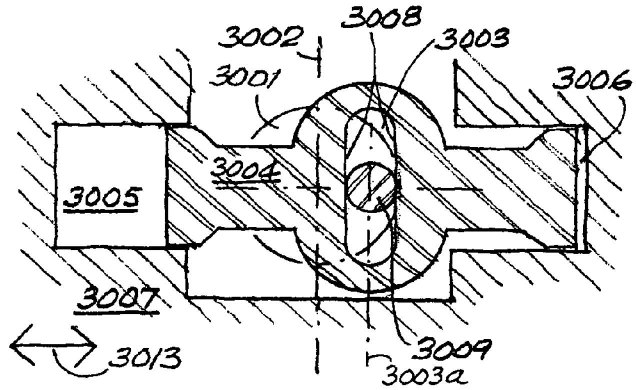
Figure 116:
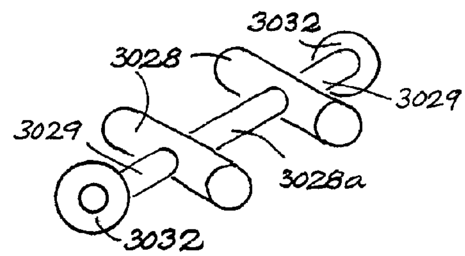
Figure 122:
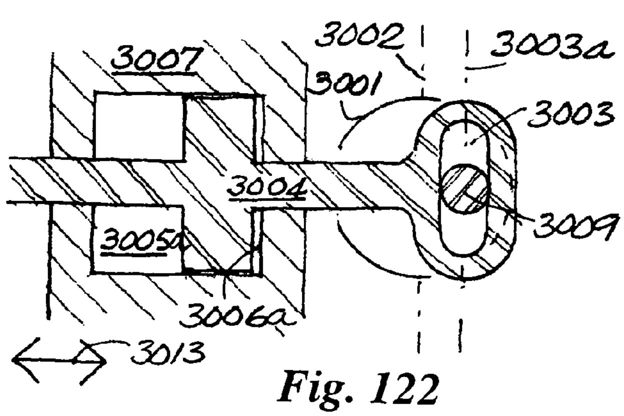

In selected embodiments, a reciprocating element pushes at least two coaxial but discrete crankshafts turning in directions opposite to one another. A major objective is to better balance loads. Sectional plan FIG. 119 and sectional elevation FIG. 120 show schematically an embodiment having two separate crankshafts 3014 contra-rotating on common axis 3014*a*, each with a crank disc or wheel shaped crank-throw 3015 having a projecting crank-pin 3016. The crank-pins are positioned in a single elongate slot 3003 in piston/rod/yoke assembly 3004 reciprocating in direction 3013 in an integral housing or cylinder assembly 3007, to define two working chambers 3005 and 3006. Each shaft is mounted in a bearing 3017 in turn mounted in the integral housing system or assembly 3007, and is further restrained by optional thrust bearing 3017*a*. As an addition or an alternative to bearings 3017, the crank-throw wheels' circumferences 3018 are restrained by the common idler bearings 3019. Optional variable two-speed drive is by separately engagable bevel gears 3020, each gear when engaged meshing with concentric toothed rings 3023 integral with crank-throw wheels, so that each crank-throw wheel drives an opposite side of a single bevel at one time. One bevel is mounted on shaft 3021, the second on shaft 3021*a*, the two shafts being slidably mounted on one another. They may be rotationally linked by splines 3022. Alternatively, the work of the chambers may be transmitted by one or both of the crankshafts, with at least one gear serving only to link the shafts. Here a simple two-speed system is illustrated, but it would be obvious to design more elaborate systems having three or more drive shaft speeds. The Figures are schematic and not to scale; any convenient sizes may be selected for both the crank-throws and the bevels, and they may have any desired number of teeth to give any convenient variation in drive ratios. Alternatively, the construction of FIGS. 119 and 120 may used to provide a fixed ratio final drive, wherein the crank-throw has one set of teeth to mesh with only one bevel. Whether having fixed or variable dive, the bevel may optionally be dis-engagable to provide some form of clutch, which may include synchromesh type gearing. To a significant degree, the difference in radii of the teeth rings 3023 will determine the mechanism's gearing step. To increase the step, the radius of the outer teeth ring can be increased by making the crank disc larger, as shown dashed at 3018*a* in the upper left portion of FIG. 120, and any bearing rollers moved further apart, as indicated at 3019*a*. Crankshafts and crank discs may be of unequal size to absorb unequal loadings. Instead of bevel gearing, any kind of gearing or other mechanical drive may link the crankshafts. Alternatively, the crankshafts need not be mechanically linked, especially if each shaft is connected to systems of approximately equal loading. The crank-pin may be constructed in any convenient manner. By way of example, detail FIG. 121 shows a pin assembly comprising the crank-pin itself 3016 (which is attached to the crank wheel), on which is mounted a roller or other bearing 3010, over which is a compressible cylinder 3012 of any convenient material, which is encased in a bearing shell 3011. A part outline of the face of the elongate slot is shown dashed at 3008. The compressible material 3012 here and in FIG. 114 will tend to absorb the shock of rapid change of direction of reciprocation. Also shown in FIG. 120 is an optional second system of shafts and bevels 3024 which may be driven by an exhaust gas powered engine or turbine system 3025, putting work into the crank-throw wheels which is in turn taken out by the drive shafts 3021, or by one or both of crankshafts 3014. In the embodiment of FIG. 120, the working chambers are combustion chambers and are surrounded by substantially toroidal exhaust gas volumes 3026 which communicate with engine system 3025, such as a Stirling, turbine or steam engine, via passages indicated schematically at 3027, with work from systems being transferred to main cranks via path 3027*a* to bevel gearing 3024. Obviously drive can be taken out of or put into the main engine via the system linking the twin crankshafts, here at least one bevel gear 3020. Bearing systems 3017, 3019 are shown by way of example—in individual applications both may not be necessary. The contra-rotating cranks may be linked by several fixed or optionally engagable devices to separate machines, such as generator, pump, etc. For example, bevel gear system 3024 may also be part of a drive chain to a gas compressor or electric generator or from a starter motor. Such a starter motor unit may also function as an electrical generator capable of converting all the work of the engine to electrical energy. In another embodiment, if the piston/rod/yoke assembly is substantially as strong in compression as in tension, then single crank wheels or contra-rotating crank wheels may be used to transmit power to or from working chambers mounted on only one side of the crank wheel(s). In the example of FIG. 122, the yoke related features of FIGS. 112 and 113 are combined with the working chambers 3005*a* and 3006*a* of FIG. 115, mounted in a rigid enclosure 3007. Any suitable features of this disclosure may be embodied in any engines, compressors or pumps having scotch yokes, including the internal volumes in the piston/rod assembly, one or more ring valves in the heads of the working chambers, the cross-flow porting of FIGS. 106, 153 and 169, the constructions of FIGS. 170 through 184, etc.

In a further embodiment, additional simplification is achieved by eliminating the crankshaft and the fixed or variable length link altogether, instead imparting “spin” or rotation to the reciprocating piston/rod assembly, which then becomes the “crankshaft”, actually the drive shaft. The spin is achieved by the incorporation of guides, ramps, cams, etc. in such a manner that the reciprocation actuated by combustion is converted into a twisting motion, so that the piston/rod assembly reciprocates and rotates simultaneously. As can be seen from the examples described below, it is generally easier to arrange matters so that several reciprocal cycles are required to complete one piston/rod revolution. In the case of engines operating more effectively at high speed, the lowering of drive shaft rpm relative to frequency of reciprocation—the difference could be up to an order of magnitude, ie tenfold—will enable such engines to be used in a wider range of applications. The new engines will reciprocate much faster than the units they could replace, but installed transmissions, propellers, etc, are suited to today’s relatively low engine speeds. The conversion of fast reciprocation to slower rotation implies the new engines could easily be fitted in existing applications. In the embodiments and examples described below, it is mostly the piston assembly that reciprocates and rotates. Alternatively, the “piston” is fixed, with the cylinder assembly reciprocating and rotating round it. Where appropriate, all the disclosure herein can be applied to fixed piston/moving cylinder applications and embodiments. The guide systems disclosed by way of example here are either part of the working chambers, or mounted between two piston and cylinder modules relatively close to the working chambers, or outboard a piston and cylinder module, at any convenient distance. They may be located anywhere, between any components mechanically linked to the piston and cylinder assemble. For example, an engine may drive another mechanism such as a pump, and the guide system could be located on the pump at the side away from the engine. In a further embodiment, one of multiple guide or cam systems is operable at any one time, and or the guide systems are interchangeable. By varying the reduction ratio, different applications for the same base engine are possible. It is intended that the guide or cam systems can be removable and be interchangeable in some applications, and that in other applications there should be two or more guide or cam systems incorporated with one engine, each one of which can be exclusively and selectively engaged, so that such an engine, together with its guide or cam system, will also function as a variable speed transmission. The cam system may be incorporated in the combustion chamber(s). For example a toroidal chamber may have part of a surface of sine wave type section. In such case the cam system can comprise a series of separate but communicating combustion chambers together forming a roughly sinusoidal toroid. The cam system which, in many applications must at least partly comprise two surfaces which directly or indirectly bear on each other at some time (direct contact bearing is not necessary if an air bearing system is used), can also be used to fulfill some other function such as pump or compressor, either to process inlet and/or exhaust gases of the engine, or some other fluid such as oil, water, air, etc. It will have been noted that the engine of the invention comprises two principal components, the piston/rod and the cylinder assembly. In the embodiments described earlier, either one is fixed and the other moves. In the case of an engine or device with the cam system, one component will simultaneously rotate and reciprocate in relation to the other. If the cylinder assembly is mounted to revolve in a housing, then two independently rotating shafts may deliver power from a single engine. Such an engine could simultaneously function as a differential and be used to power a vehicle, or contra-rotating aircraft or marine drives such as propellers, screws, impellers, etc.

Figure 123:
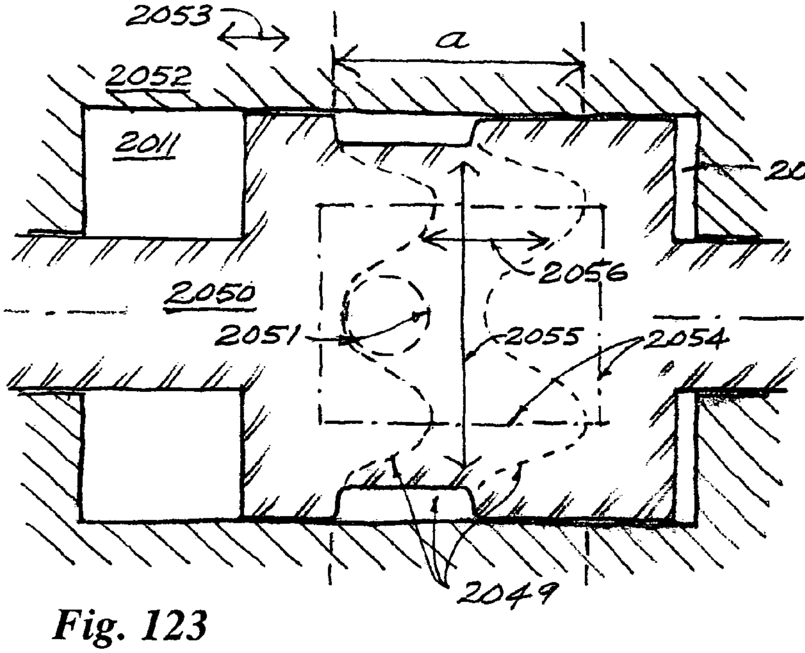
Figure 124:
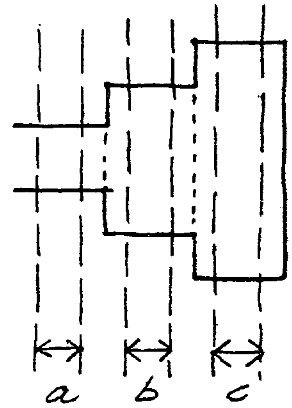
Figure 126:
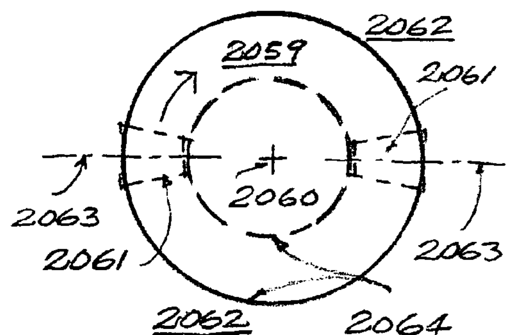
Figure 127:
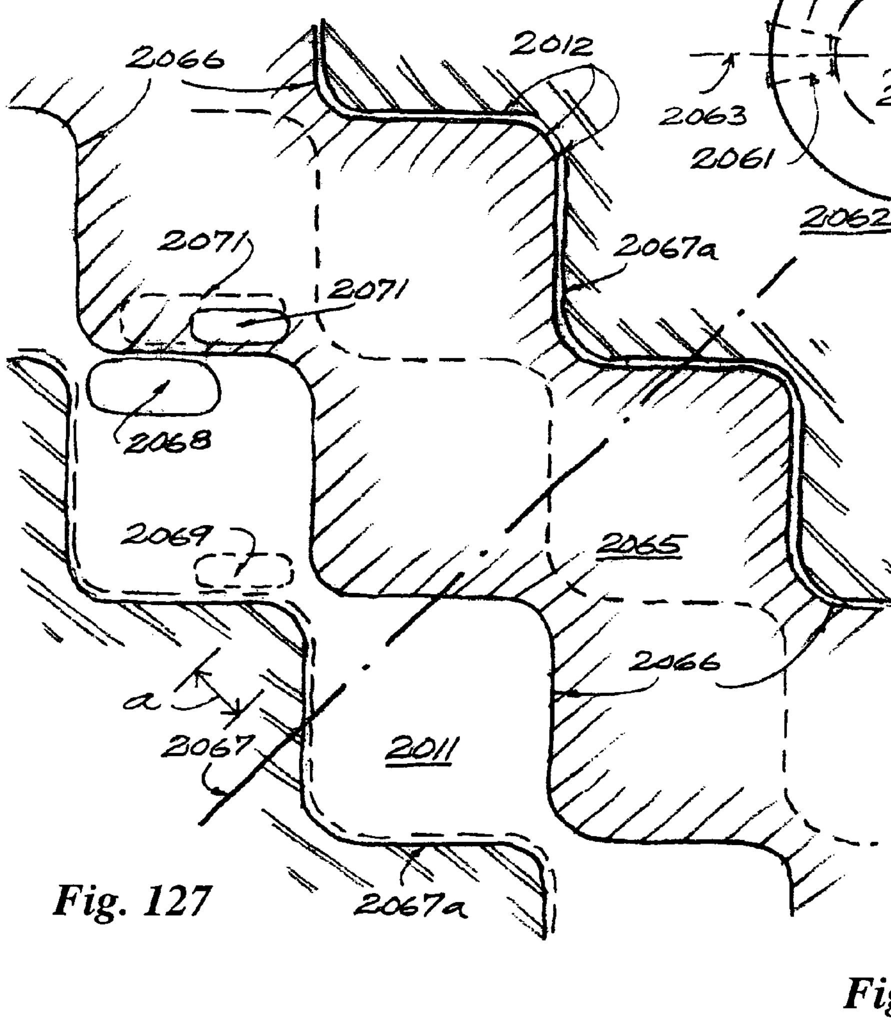
Figure 125:
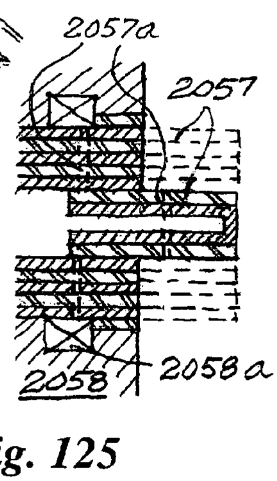

By way of example, FIG. 123 illustrates the fundamental principles of one such cam system. A circumferential sine shaped trench 2049 surrounds the midpoint of a piston/rod assembly 2050, mounted in a cylinder assembly 2052 to define two working chambers 2011 and 2012. In the trench is a guide 2051 fixed to the cylinder assembly 2052, in such a way that all reciprocating motion is partially converted to rotational motion. Dimension “a” indicates the broad location of the circumferential band in which the cam system operates. Essentially the cam and trench system is a face system, in which the faces are aligned toward directions 2053. When the cam system is referred to as sine shaped it is for convenience; in fact the shape may be of any zig-zag or repeating type of configuration. There are certain optimum profiles for each application, shown here within square 2054 which schematically describes one reciprocating cycle and repetitive unit. FIG. 124 shows the profile of a device such as IC engine, compressor or pump, optionally of the type disclosed in FIGS. 110 and 111, which has three cam systems, each with its dedicated guide, operating within bands “a”, “b”, and “c”. The cam profile for one reciprocal cycle may be identical for each band, but a different number of profiles or cycles are deployed in series within each circumferential band. Alternatively, the bands my have varying cam profiles and also varying guide configurations. The systems described each have a female and a male element, corresponding to trench 2049 and guide 2051 in FIG. 123. In the three cam systems of FIG. 124, the male elements are wholly or partly retractable, and only those of one band are engaged at any one time. Because loads are alternately transferred from one face to the other, the trench profile need not correspond exactly to the travel path of the piston relative to the housing. As one cam system is disengaged and another engaged, the ratio of rotation relative to reciprocation changes, effectively making the device schematically shown in FIG. 124 a three-speed variable transmission. The trench may have a clear path 2055, as shown in FIG. 123, where a small guide will permit piston rotation without reciprocation, and/or a path 2056 which will permit piston reciprocation without rotation. Please note that FIG. 123 is schematic only and not drawn to scale (the pitch of reciprocal motion permitted by the trench and guide does not correspond to the stroke of combustion chamber 2011); it serves merely to illustrate the principles described. FIG. 125 shows schematically by way of example a guide of varying size, which may be wholly or partly retractable. It consists of a series of sliding tubes 2057 biased to a retracted position in a housing 2058, and where some hydraulic or other action projects each tube sequentially, those of smallest diameter before those of larger, with retraction effected in reverse sequence. A wick or porous material or other lubrication device may be installed at 2058*a*, with small capillary holes 2057*a* permitting lubricant creep to the individual tubes. If the smallest form of such a guide is able to describe a clear path in the trench, the arrangement of FIG. 124 can be accomplished by having the smallest form of each of the guides of all three cam systems extended, with selective and/or progressive enlargement of the guides of only one cam system to effect rotation. It is intended that cam systems that have an adjustable portion, such as a retractable guide, can also be used to function as clutches. Without engagement, the engine would only reciprocate; with cam system engagement rotation commences. In the case of guides which are rollers, it may be preferable to have them tapered, with correspondingly inclined cam faces. By way of example, FIG. 126 shows a schematic cross-section through a piston 2059 in a cylinder 2062, having axis of rotation at 2060. Two rollers 2061 are fixedly mounted to cylinder 2062 and rotate about axes 2063 when engaged in trench or channel 2064. FIG. 127 shows schematically a portion of a cam system comprising corresponding circumferential sinusoidal faces as part of a band-like trench (corresponding to the boxed portion 2054 in FIG. 123 when repeated approximately twice, but showing a different cam system). The male element or guide 2065 is continuous and has sine wave shaped faces 2066. Axis of rotation is shown at 2067. Trench working faces are shown at 2067*a*, with system shown solid line in one top/bottom dead center position and dashed line in the other top/bottom dead center position. Kinetic energy will drive the system across bridge at “a”. Such cam systems can be part of a pair of toroidal working chambers, and be used in pumps, compressors and IC engines. For example, there could be an inlet port at 2068 and outlet port at 2069 and a transfer port 2070 and transfer chamber at 2071, in the case of a compressor. One side of the guide could compress engine charge, the other side could pump exhaust gas, in the case of two-stroke engines, or any other combination of work could be done by the cam system. It is obvious that the cam system could also define at least one toroidal combustion chamber. In the case of FIG. 127, two toroidal combustion chambers could be incorporated, with volume 2012 in compression, 2011 in expansion. Such combustion chambers are described more fully later. If the interior of a piston/rod assembly which both rotates and reciprocates is used to deliver charge, the design of the interior of the piston/rod and the layout of the ports can be used to spin, slew or swirl the charge into the chamber, if charge movement during ignition and/or combustion is desired.

Figure 128:
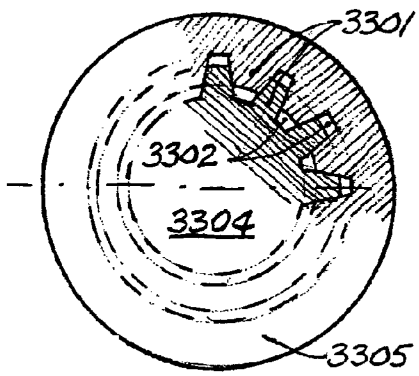
Figure 129:
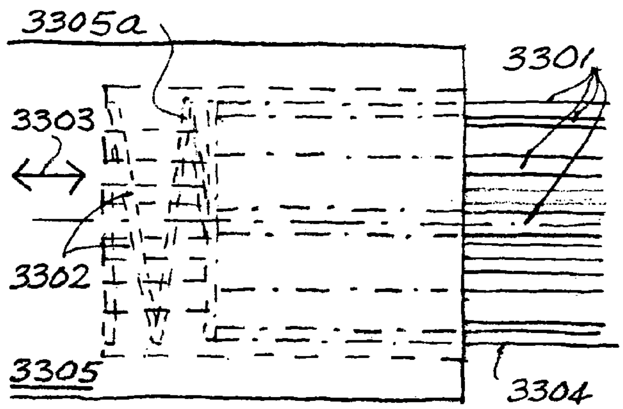
Figure 130:
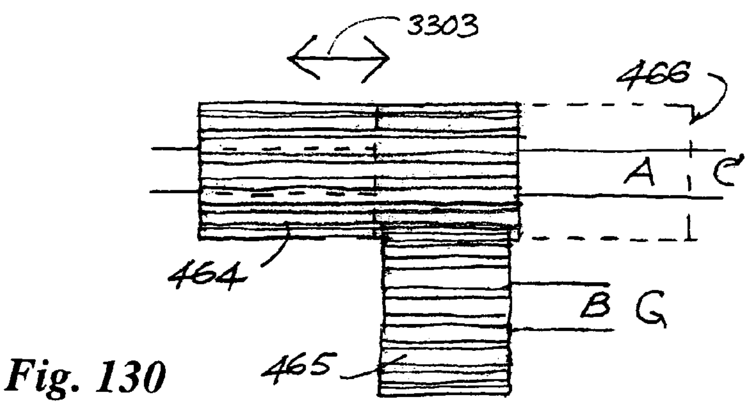
Figure 131:
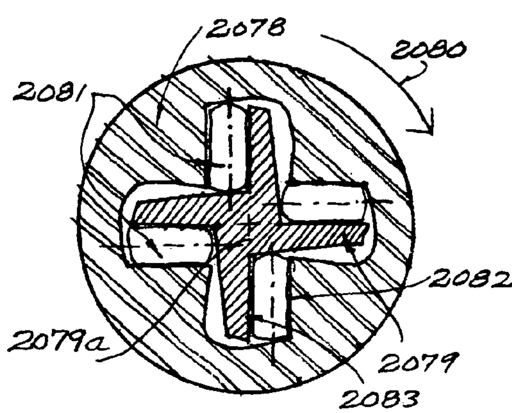
Figure 132:
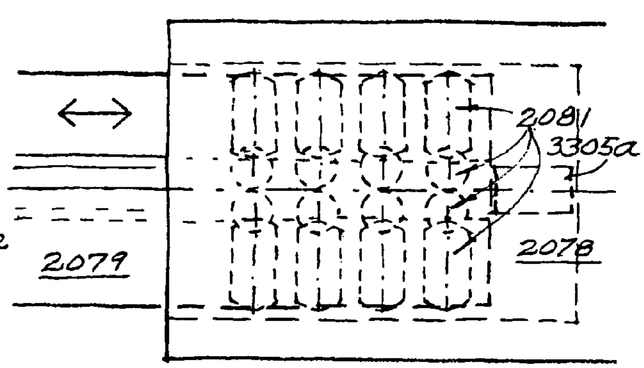
Figure 133:
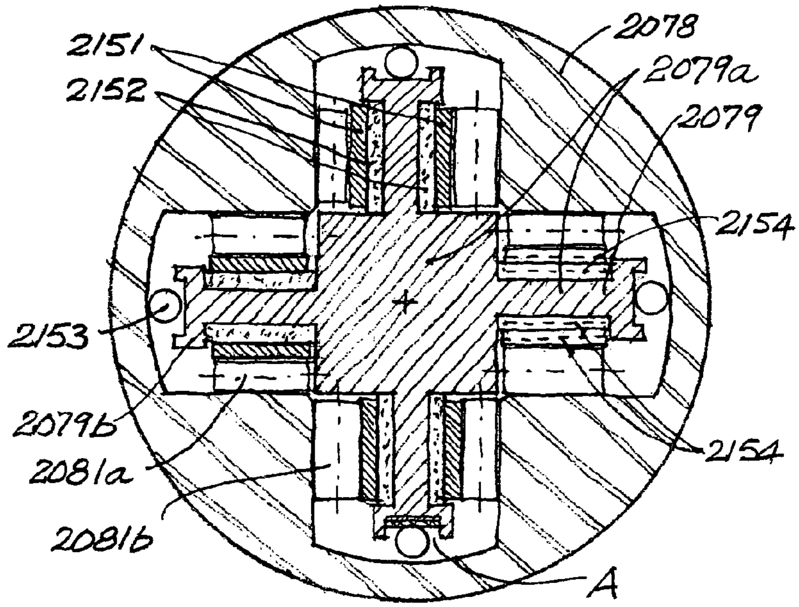

For certain applications, including many pumps and/or compressors, rotary motion is not required. It is both simple and obvious to connect the end of the reciprocating piston/rod assembly to a pumping or compressing device. The engine may alternatively be coupled to an electrical generator. Such a generator may also function as a motor, to start the engine. If the electric generator/motor is linear, ie reciprocating, then the engine’s piston need not rotate. In other embodiments, the electrical generator/motor is rotary, optionally powered by a piston that both reciprocates and rotates. The rotary generator/motor may be so coupled and geared to the piston, that it rotates at a much faster speed that the piston. Described below, by way of example, are some of the devices that may be used to convert combined reciprocating and rotating motion to a rotation-only drive. Such devices may be part of an engine assembly so that the engine has a rotation-only output shaft, or alternative an engine with a combined-motion output shaft may be linked to another system, such as a generator, by interposing a motion-conversion device between engine and system. By way of example, FIG. 128 shows in cross-section and FIG. 129 in elevation a schematic of vehicle-type co-axial nested male 3304 and female 3305 drive shafts capable of reciprocating relative to each other, wherein rotational motion is transmitted via splines 3301 slidably mounted in corresponding grooves 3302. Direction of reciprocal motion is indicated at 3303. Either of components 3304 and 3305 could be mechanically linked to, or be part of a piston/rod assembly. In a variant of the principles of FIGS. 128 and 129, gears may be employed, as shown schematically by way of example in plan view FIG. 130. A first elongate gear 464, mounted on a reciprocating—in direction of arrow 3303—and rotating shaft “A” engages with a second gear 465 mounted on a shaft “B” that only rotates. The relationship between the gears is shown at one extreme of reciprocation; the relationship at the other extreme is shown dashed at 466. The teeth on the first gear are sufficiently long to always engage with those of the second gear. The first gear 464 may drive any number of other gears. In a selected embodiment, combined motion is converted to rotary motion by means of flanges or surfaces linked by roller bearings. In one example, where loads are principally transmitted in on rotation direction, FIG. 131 shows in cross-section and FIG. 132 in elevation a schematic of a coupling between an end portion of a piston/rod assembly 2078 and flanges 2079 mounted on a final drive shaft 2079*a*. Components 2078 and 2079*a* reciprocate relative to each other, and both rotate clockwise. Roller bearing races 2081 link planes 2082 inside the piston rod and on the shaft 2083. The connection between the two systems could be anywhere, including inside the piston segment of a piston/rod assembly. Component 2078 need not be part of piston/rod; instead it could be mechanically linked to it. In another example, suited for applications where load must be transferred in both rotational directions, a modified arrangement is shown in section in FIG. 133, corresponding to FIG. 131 where driving component 2078 reciprocates relative to driven component 2079*a* and both rotate. Each flange 2079 has two opposed effective working surfaces, each in contact with two separate series of rollers 2081*a* and 2081*b*. In this embodiment they are of unequal size because primary rotation is anti-clockwise, with only occasional rotation clockwise, and flange surfaces only indirectly support the rollers, which run on hard plates 2151 bonded or otherwise fastened to inter-layers of compressible material 2152, in turn bonded or otherwise fastened to flange surfaces. To properly locate axis of component 2078 to correspond to axis of 2079*a*, optional thrust bearing may be used, as shown schematically at 2153, which locate in a "Y" or "U" shaped tip 2079*b* to each flange. If there is to be some play in the axes relative to one another, a similar bearing plate may optionally be mounted on compressible material at flange tips as shown at "A". There could be play in the assembly, the play switching from one side to the other as direction of rotation is reversed, or there could be no play and all the compressible inter-layers are compressed to some degree at all time. In that case, the ends of the metal plates could toe down towards the flange as shown schematically at 2154, to make it easier to insert one component into the other during assembly. Additionally or alternatively, the metal plates and compressible materials could be mounted on component 2078. All the components of the assembly can be of any convenient form, dimension or material. In FIGS. 131 to 133, four flanges are shown. In a further embodiment, suited to vehicle propeller shafts in selected applications, he hard plates 2151 and compressible material 5152 of FIG. 133 are omitted, and the rollers 2081*a* and 1081*b* run directly on the flanges 2079. Alternatively, the principles of the invention can be embodied with any number of flanges, equally spaced or otherwise, including just one flange, especially if the axes of rotation of components 2078 and 2079*a* are properly aligned.

Figure 134:
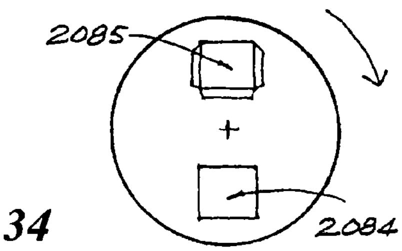
Figure 135:
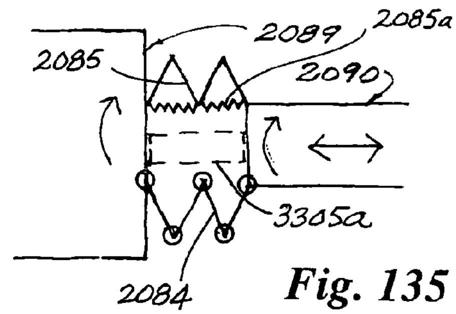
Figure 138:
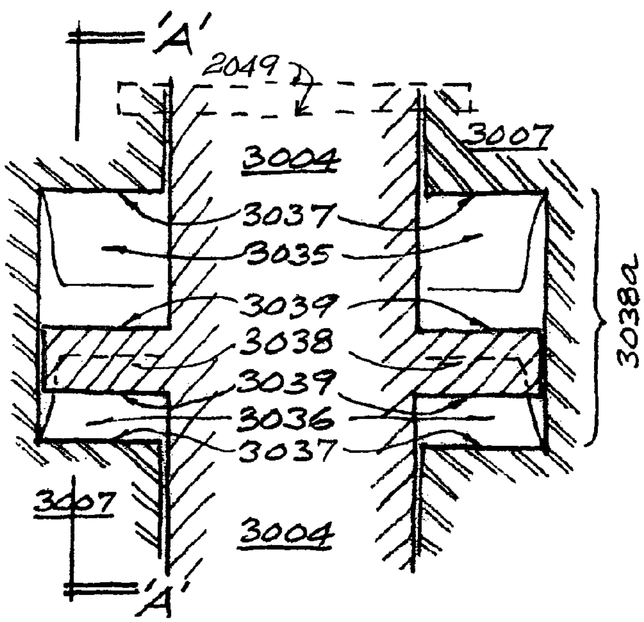
Figure 136:
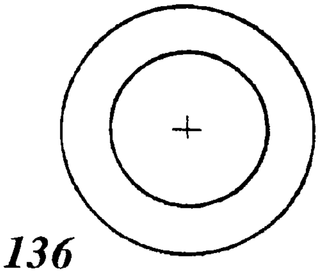
Figure 137:
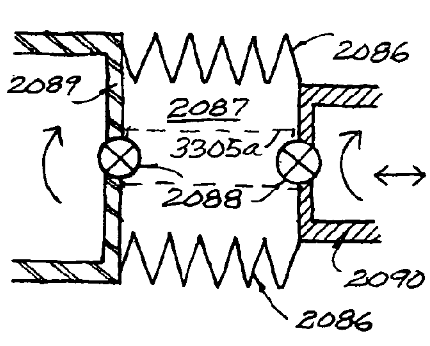

In an alternative embodiment, combined motion is converted to rotary motion by means of a bellows type of device, which has rotational stiffness and axial flexibility. Such a bellows device could be of any suitable material, including a spring steel, plastic, ceramic, etc. The bellows device could be one of two broad groups, the closed or sealed type which has an internal variable volume and which might fulfill the additional function of pump or compressor, or the open type, which could be considered a series of hinge pairs linked end to end. In many cases energy will be required to deform the bellows. In single piston/twin opposite working chamber configurations, it will be preferable if the bellows systems are so deployed that they are in their natural or unloaded position when the piston is in the mid-point of its travel, that bellows deformation and energy absorption occurs as the piston travel to top/bottom dead center, with stored energy again given up to the piston/rod assembly as it moves toward its mid-point. It is obvious that the energy absorption capability and progression designed into a bellows unit can be used to effect or regulate numerous engine parameters, including variable compression ratio, engine speed, piston acceleration and deceleration, piston breakaway to geometric compression ratios beyond a minimum base, etc. By way of example, FIG. 134 shows schematically in axial cross-section and FIG. 135 in longitudinal cross-section a discontinuous bellows system. To illustrate different embodiments, two different types of bellows are shown. Normally only one type would be employed in one system. At 2084 the bellows is effectively a series of rigid hinges, while at 2085 a similar structure defines sealed volumes 2089*a* enclosed by side subsidiary bellows 2085*a*, these varying volumes optionally being usable in an associated pump or compressor mechanism. In a similar schematic example, FIGS. 136 and 137 show a continuous bellows 2086 is shown, defining pumping volume 2087, having non-return valves 2088 permitting fluid movement between volume defined by final drive 2089 and volume defined by reciprocating and rotating piston rod 2090. In a further embodiment, the mechanism converting combined motion to rotary motion includes an energy absorbing device of any type, including a fluid pump or compressor, a gas or mechanical spring, etc. By way of example, a coil spring is located between components 3304 and 3305 concentric with their axes of reciprocation, and is optionally fastened to both by any convenient means, as shown dashed at 3305*a* in FIG. 129. In the case of twin combustion chamber/single piston assembly designs, and synchronous multi-piston designs, the energy absorbing system could be deployed so that it is neutral when the piston(s) locate at mid-point of travel and has absorbed most energy when the piston is at BDC/TDC, so that the release of stored energy will help accelerate the piston to mid-point of travel again. The drive mechanism could simultaneously function as the main energy absorption device regulating movement of the piston. Other than springs, any type of energy absorption device can be used, including the pumps as disclosed above, which may be used to compress engine charge, or to compress exhaust gas for use in a downstream turbine. Energy storage devices may be incorporated in other embodiments, as indicated by dashed box 3305*a* in FIGS. 132, 135 and 137. The energy storage devices, including bellows and hinged elements, disclosed herein can be used with any type of reciprocating component which is part of or linked to a piston, including a piston which is not rotating.

Figures 139, 140:
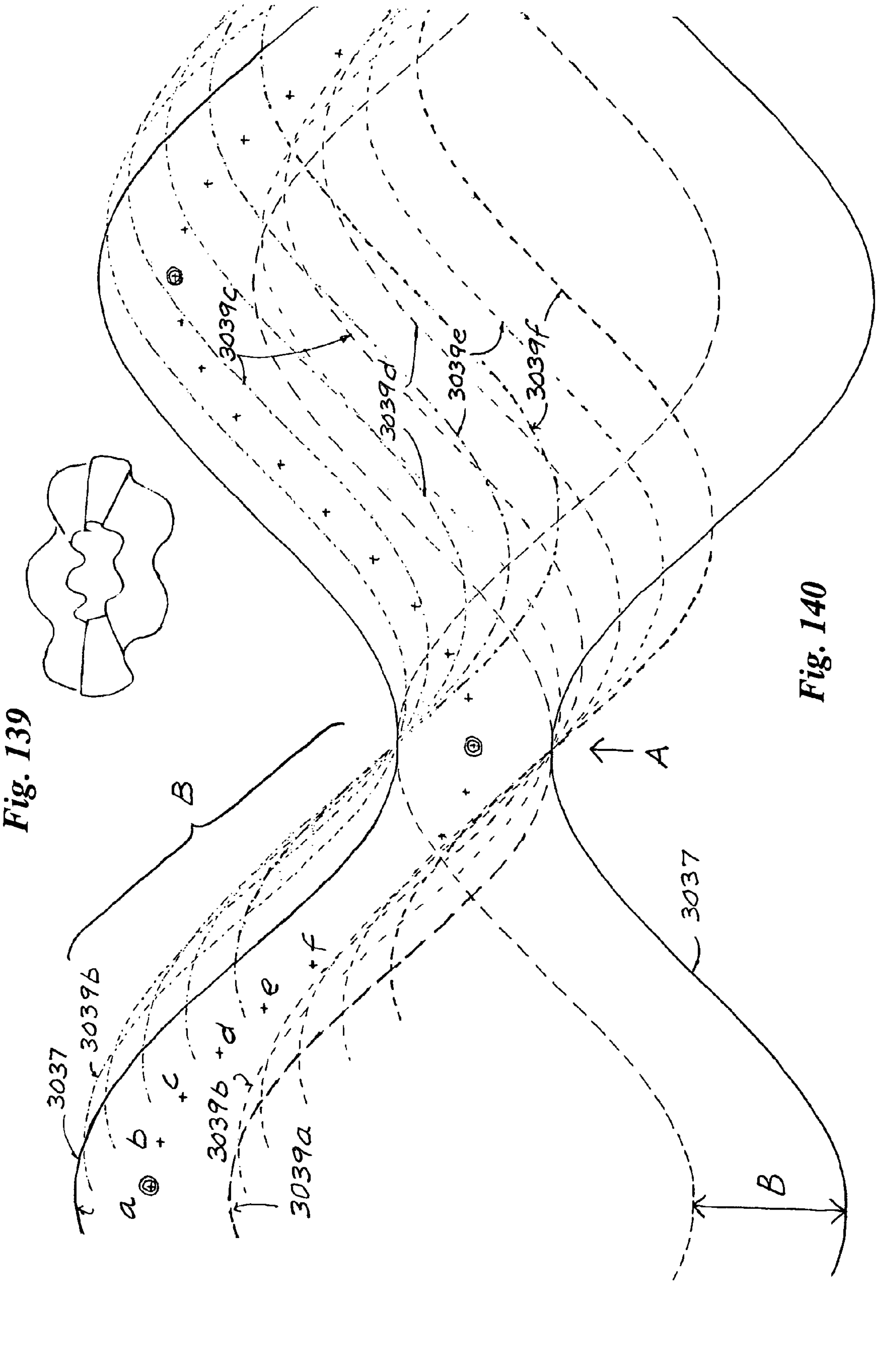
Figure 141:
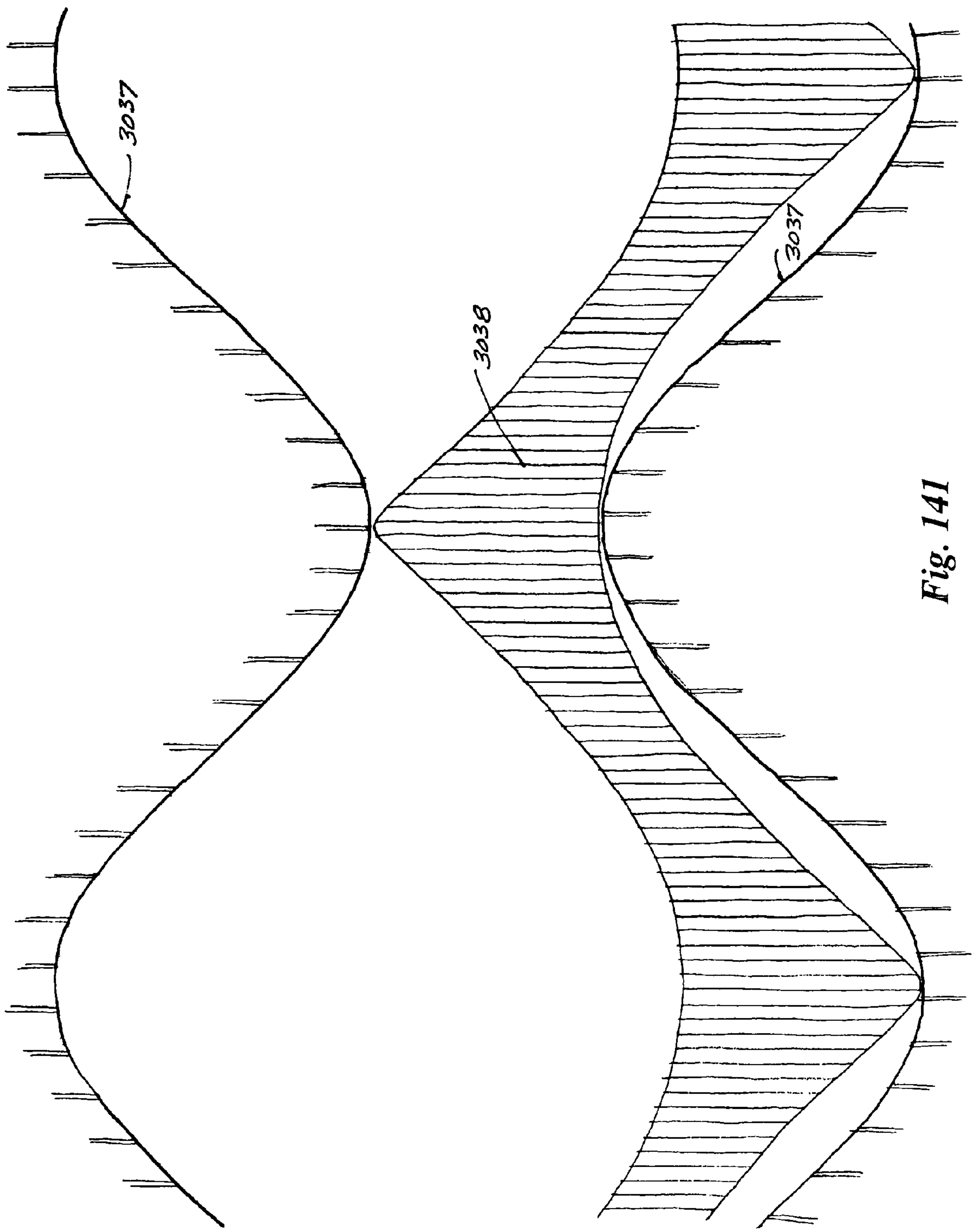
Figure 142:
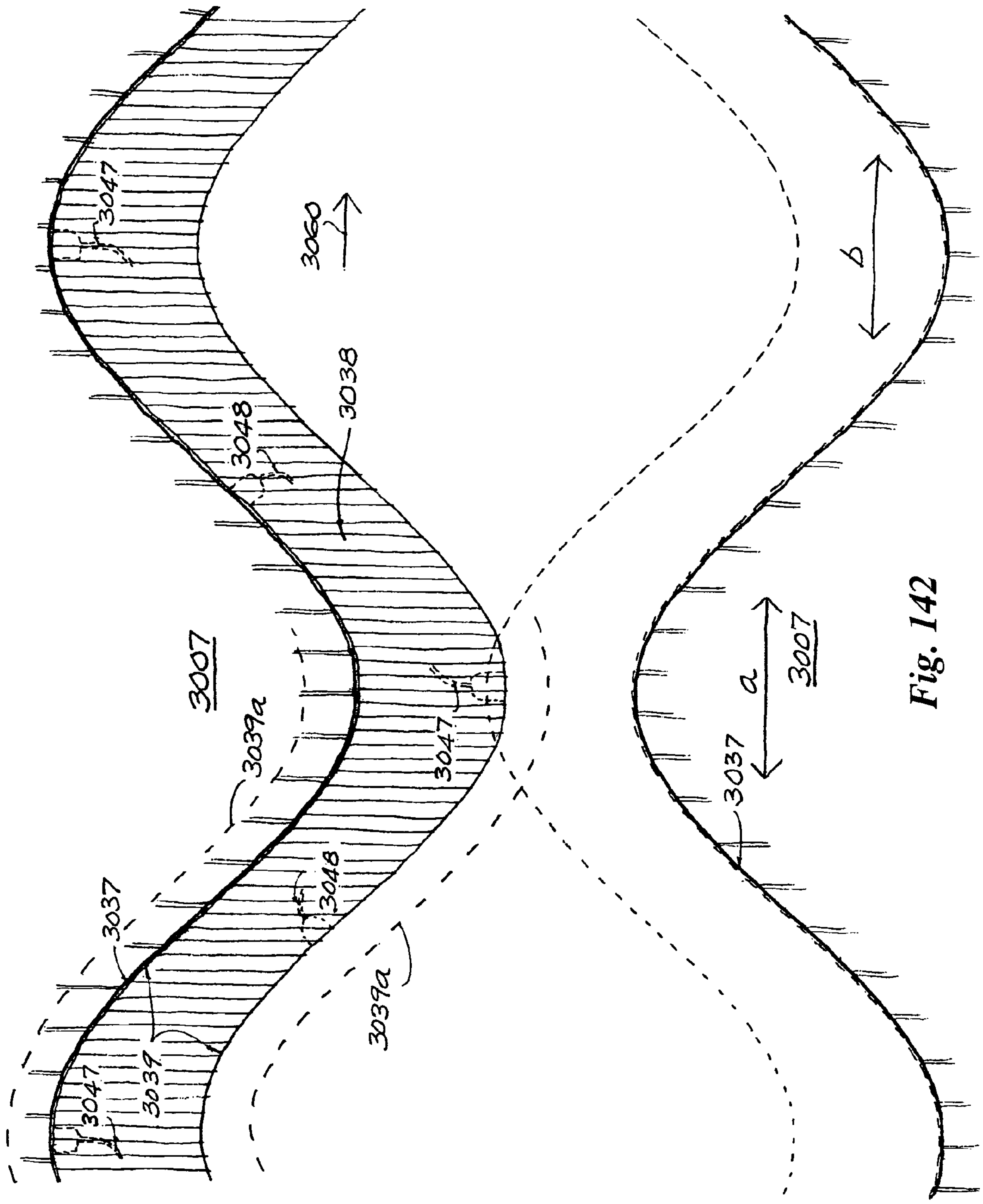

In a selected embodiment, a piston/rod assembly reciprocates and rotates between two substantially identical toroidal working chambers of approximately sinusoidal wave-like form. Earlier, in FIG. 127, a toroidal and roughly sinusoidal combustion chamber was schematically referred to. There were two such chambers, separated by what was effectively a flange of approximately sinusoidal configuration, mounted on a reciprocating element. The height of the flange (the dimension parallel to the axis of reciprocation) was shown constant. The shape of the flange, and of the heads of the combustion chambers, was not properly sinusoidal; rather the profile approximated a series of straight lines at 90° to each other, linked by radius curves. In the case of a reciprocating body turning at constant speed—a desirable objective in the case of engines—a single point on that body could more closely follow a series of sine waves, retreating its path every 360°. Considering one of the inventions in one of its most simplified forms as in FIG. 138, we have an upper 3035 and a lower 3036 toroidal combustion chamber in an integral housing or cylinder system 3007, in which a reciprocating element 3004 also rotates. The extreme surface 3037 of each chamber has a similar folded sinusoidal configuration, as sketched in FIG. 139, so arranged that the variation of vertical distance between the two surfaces is the maximum possible. The reciprocating element has a projecting flange 3038 reciprocating in a depression 3038*a* in the cylinder, the side walls of this depression being the two surfaces 3037. The flange is the reciprocating element's working part: it effects compression and transmits expansion forces. The upper and lower surfaces 3039 of the flange are also shaped as in FIG. 139, but arranged so that the thickness of the flange is approximately constant. Because the reciprocating motion is of constant dimension, so the height (distance from peak to valley) of the sine (or similarly shaped) wave will be constant, but the pitch (distance from peak to peak) of the wave will vary, from a maximum at the outer radius of the toroidal combustion chamber, to a minimum at the inner radius. Taking a partial curved cross-section through the two combustion chambers at "A", the path of the reciprocating and rotating flange is sketched in FIG. 140, with sine wave height to pitch ratio 1:3 and wherein it is assumed that all four sinusoidal surfaces are identical. The path of a fixed point in/on the flange is indicated at several successive positions marked, "a", "b", etc. The positions of the flange surfaces at corresponding times are indicated 3039*a*, 3039*b*, etc. The intervals correspond to constant units of rotation. The minimum separation of surfaces at "A" correspond to the constant vertical height of the flange at "B". As can be seen, if all four surfaces have identical form the engine would not work, as indicated by the clearance problem in area B. Usually, in any one combustion chamber, the upper surface of that chamber will have to have a different surface from the lower surface of that chamber. Almost any different combination is possible, but often it will involve an upper limit on the theoretically possible compression ratio, since the upper and lower surfaces do not match. At the height/pitch ratio of the sine wave of FIG. 141 (1:3), a compression ratio of around 7.5:1 is practicable. If the outermost surface of each chamber retained its sinusoidal form, then a workable form of Section "A" would be as shown schematically in FIG. 141. In this case, essentially the flange's valleys would stay more or less sinusoidal, but the peaks would have a sharp apex. If the design compression ratio were less than the theoretical maximum, then it would be possible under constant speed operation for the flange apexes to make no contact with surfaces 3037. A point on the flange of FIG. 141 will describe an approximately sine wave shaped path, this being possible by the creation of clearance space, thereby keeping surfaces 3037 sine wave shaped and making surfaces of the flange irregular. It is obvious that the same effect could have been achieved by doing the opposite—keeping the flange surfaces sine wave shaped and making surfaces 3037 irregular. Alternatively, a point on the flange could describe a sine wave shaped path, with both the flange surfaces and surfaces 3037 irregular. In this context, irregular means not sine wave shaped. An alternative approach to the "clearance" problem indicated schematically at area B in FIG. 140, would be to separate surfaces 3037 from each other, while not increasing flange thickness and therefore separation of surfaces 3039. Such an arrangement is shown schematically in FIG. 142. Effectively, this would mean that a point on the flange would no longer describe a sine wave, even though all the surfaces had sine wave shaped cross-sections. The combined rotational and reciprocal motion of the flange 3038 would cause a point on the flange to describe an almost linear, shallowly-curved, "S" shaped path between the apexes of reciprocal motion, with relatively sharp changes of direction at these apexes. Compared with a conventional engine, there would be either relatively shorter periods at extremes of pressure, or variable rotational speed within one revolution of the flange. To compensate for this effect, and to increase piston dwell time at the regions of BDC/TDC, the profile of the sine wave can be made irregular, but stretching the curvature in the regions indicated around "a" and "b". If the two combustion chambers on each side of a flange are to have a common port system (exhaust or inlet) then the flange will have to be thicker relative to the stroke than is shown in FIGS. 141 and 142. A thickened flange is shown schematically in FIG. 143 wherein the combustion chambers 3035, 3036 have similar surface shapes to those shown in FIG. 141. FIG. 144 is a schematic section taken at "A" in FIG. 143, at a smaller scale. Here a common port system 3045 is located at the outer circumference of the toroidal combustion chambers, with another port system 3046 particular to one chamber located at the inner circumference of the toroid. Obviously, chamber 3035 can have an identical port system to 3046 (not shown). If desired, ports 3045 can be on the inside, opening into the piston assembly, and ports 3046 on the outside, opening into the cylinder assembly. If the flange moves, then port(s) 3045 can be in the fixed components, and port(s) 3046 in the moving flange/piston component(s). The curves of FIGS. 140, 141 and 142 are notional and could be said to represent a cross-section taken on a curved plane at constant radius, midway between the outer and inner radius of the toroid, so ports shown in FIG. 143 could be considered projection on this plane, with the outer ports actually larger, the inner smaller. In practice, working chamber shapes are likely to be a combination of the principles of FIGS. 141 and 142.

Combined, ie both reciprocal and rotational, motion of the "moving" component 3038/3004 relative to the "fixed" component housing 3007 is assumed to be initiated by a starter motor. The shape of surfaces 3037 and 3039 are effective guides to force combined motion, the broadly reciprocal motion caused by combustion being partly translated into rotational motion. Component 3038/3004, having mass, will have both angular momentum and linear momentum. At each cycle, the linear momentum is substantially absorbed by the work of charge compression, but the angular momentum is retained by component 3038/3004. Even if the direction of the work of expansion is considered to be parallel to the axis of rotation, angular momentum will cause a point on 3038 to describe a wave shaped path, similar to the shapes of surfaces 3037 and 3039 in the figures. This means that, by adjusting the quantity and distribution of mass in component 3038/3004, and by adjusting the quantity, distribution and/or timing of the combustion, it will be possible under certain operating conditions to so arrange matters, that the surfaces need never touch. The natural frequency of motion of component 3038/3004 under those conditions will be such that, during a complete combustion cycle, the surfaces 3037 always just clear surfaces 3039. It is desirable for them not to touch for mechanical reasons. Because a sinusoidal/toroidal combustion chamber is divided into zones, each zone can correspond to one cycle of the sine or other wave of the surface shapes. The zones of one chamber could be regarded as a series of abutting synchronous combustion chambers, so elimination of surface contact during part of the cycle would permit equalization of gas pressures within the zones and greater mixing of gases. If such non-contact of surfaces is desired or for other reasons, the combustion process may be tuned by selective placement of the fuel delivery point(s) to guide the piston assembly on the desired path. For example, a selected embodiment is shown in FIG. 142, wherein 3060 shows direction of rotation of component 3038/3004. Illustrated are conventional-type deployment of fuel delivery points 3047, here located on the reciprocating component, wherein the direction of fuel movement into the main chambers will be roughly parallel to the axis of rotation. Alternative fuel delivery points are also shown in FIG. 142 at 3048, where the direction of fuel movement is at a substantial angle, in at least one plane, to the axis of rotation. All the fuel delivery points in this and the following Figure each comprise a pre-combustion zone communicating with a fuel delivery capillary tube, but any appropriate fuel delivery arrangement may be used, including those disclosed elsewhere herein. Theoretically, gas expansion in the main chamber is omni-directional, but in practice the arrangement of 3048 will impart somewhat more rotational movement to component 3038/3004 than the arrangement of 3047, for otherwise equal combustion parameters. Both FIGS. 142 and 143 shows component 3038/3004 with fuel delivery at two locations per combustion zone. Sequential or differential delivery of fuel in the two locations can be used to regulate the natural movement of 3038. Any number of fuel delivery points and/or pre-combustion zones per zone may be used, and they can be deployed in any convenient location. By way of example, FIG. 143 shows a pre-combustion chamber 3049 having a single opening to the main chamber near the mid-point of the sine or other wave, while 3050 shows a similarly located pre-combustion chamber with two openings into the chamber, one larger than the other, and so shaped to give fuel delivery both parallel and angled to the axis of rotation. 3051 shows a similar double-opening pre-combustion zone with only angled fuel delivery, located at or near the apex of the wave. 3052 and 3053 show single opening chambers at or near the wave apex, with fuel delivery respectively angled to and parallel to the axis of rotation. Any type and combination of fuel delivery locations and directions can be provided in one combustion zone, not necessarily in every zone of one combustion chamber. In these schematic illustrations, the actual fuel delivery mechanism is not shown. Any system of fuel delivery can be used, including conventional injectors. The fuel delivery points are shown located in reciprocating component 3038/3004, but fuel delivery points can additionally or alternatively be in the cylinder assembly 3007. The fuel delivery points and/or pre-combustion zones may be in the piston/rod assembly, or in the cylinder assembly. They may in the component that moves, or the component that is fixed, relative to the reciprocation of the other.

The cylinder assembly 3007 has been described as fixed. As mentioned earlier, in other embodiments the cylinder assembly is mounted on bearings inside another housing or enclosure, and is free to rotate without reciprocating. By way of example, FIG. 145 illustrates in outline such an arrangement, the indicated rectangles bisected by diagonals representing bearings. A twin toroidal combustion chamber system is represented schematically at 3059, optionally similar to that of FIG. 138. Either because the chambers are sinusoidal and/or because there is a guide system as shown schematically at 3058*a*, the combustion process causes piston-type component 3004 to both reciprocate and rotate clockwise at a given speed, relative to cylinder-type component 3056. Component 3004 is linked by splines 3053 or other appropriate mechanisms to components 3054 and 3055, which are so mounted that they are free to rotate but not reciprocate. They will turn in the same direction—here clockwise—and speed as component 3004. The cylinder component 3056 is mounted in a fixed housing 3057 so that it is free to rotate but not reciprocate. In practice, if the resistances are balanced, as components 3004 plus 3054 and 3055 turn at, say, 2 000 rpm relative to component 3056, they will also be turning at around 1 000 rpm clockwise relative to housing 3057, while component 3056 will be turning at around the same speed counter-clockwise relative to the housing 3057. Therefore 3054 and 3056 are effectively counter-rotating shafts and A and B can be used as power take-off points or areas, using gears, friction materials, or any other appropriate means. Such an assembly is suitable, for example, in applications such as marine- or air-craft having contra-rotating screws or propellers. The speeds of the shafts can be varied relative to housing 3057, but not necessarily relative to each other, by imposition of a resistance indicated schematically by brake pad 3058. In this arrangement, component 3055 could be used as a link to another engine system, such as a turbo-charger, starter motor or electrical generator. An advantage of the kind of layout illustrated by FIG. 145 is that no torque is imposed on enclosure 3057, an important advantage in certain high-power applications, or in applications where vibration is an issue, such as in ships or aircraft.

In further embodiments, systems of concentric co-rotating components are constructed. By way of example, FIG. 146 indicates one such schematically, where the apparatus is shown only on one side of a center line. Sets of pairs of toroidal combustion chambers of equal cross-section are shown at 3061 through 3064, each set of chambers having progressively smaller radii. Due to combustion chamber design and/or guide systems (not shown), the combustion process causes each of components 3065 through 3069 to both reciprocate and rotate relative to its neighbor. Housing 3065 is fixed, the other components all rotate in the same direction relative to housing 3065, and the reciprocating motions are controlled and synchronized through a system of guides, so that components 3066 and 3068 reach one apex of reciprocation at the same time as components 3067 and 3069 reach the other apex of reciprocation. The ratio of reciprocation to revolution need not be the same for each combustion system. Let that of 3061 be 14:1, of 3062 be 11:1, of 3063 be 8:1 and of 3064 be 5:1. If the reciprocations are synchronous, say at 10,000 reciprocations per minute, then component 3066 will revolve at 714•3 revolutions per minute (rpm), component 3067 at 1 623•4 rpm, component 3068 at 2 873•4 rpm, and component 3069 at 4 873•4 rpm, all relative to the housing 3065. Here, component 3069 drives a coaxial turbine system, shown schematically at 3070. The combustion chambers here have equal cross-section but unequal swept volume, so more work is effected between components 3065 and 3066 than between 3068 and 3069. If it is desired that a more equal work load between the components is effective, the cross-section of the combustion chambers could increase from the outer to the inner, to make the volume of the combustion chambers more equal. A different system of co-rotating components is shown schematically by way of example in FIG. 147, in a manner similar to that of FIG. 146. There are four identical systems of toroidal combustion chambers 3079, all sets having the same reciprocation to revolution ratio. Within a fixed housing 3071 are mounted two components 3073 and 3075, only free to rotate. Concentrically mounted within 3073 and 3075 are another two components 3072 and 3074, able to both rotate and reciprocate, so controlled and synchronized by guides that they simultaneously reach the apexes of reciprocation furthest from each other and simultaneously reach the apexes of reciprocation nearest each other. If component 3072 rotates at 5 000 rpm relative to fixed housing 3071, and all the moving components rotate in the same direction, then components 3073, 3074 and 3075 will turn relative to housing 3071 at speeds of 10 000 rpm, 15 000 rpm and 20 000 rpm respectively. Component 3075 could drive an element 3078, such as a turbine of a coaxial engine system, with components 3072, 3074 driving, say via splines, other elements 3080, 3081 of any component or engine at differing speeds. The schematics and arrangements of FIGS. 146 and 147 are suited to large high performance and/or high efficiency engines, such as might be used for aircraft propulsion, large marine craft, large scale electric power generation, etc. They are also suited to compound engines including a turbine stage, where reciprocating IC engine rotational speeds can be scaled up to match turbine shaft speeds, permitting a single shaft driven by both engines.

It has been indicated above that, by careful component design and regulation of the combustion process, the natural frequency of motion of the reciprocating/revolving component can be such as to enable the wave-like working surfaces of sinusoidal combustion chambers to clear each other. Such design and regulation will be easier to achieve in steady-state engines, for example as used in marine propulsion and generator sets, than in variable-state engines, for example as used in automobiles and motorcycles. In either case, provision should be made for the natural frequency of motion of the moving component to be varied or disturbed, since collision of combustion chamber surfaces should preferably be avoided, even if such variation only occurs infrequently. In engines with regular (ie non-sinusoidal) toroidal combustion chambers, it has been disclosed how reciprocating motion can be translated into combined motion by guide systems. As noted, the same kind of guide systems can be used to limit movement to just prevent surface contact of sinusoidal toroidal combustion chambers. To prevent surfaces not touching, a roller/cam guide system of shape corresponding to the travel path of a point on the flange can be used. It could be the primary means of controlling the movement of the piston assembly, or it could be used as back-up to a system tuned to work without the curved surfaces touching, to only engage and make contact after the sine-waves type surfaces approach too close together, due to some event like an accidental excess of fuel or exceptional G forces, and then prevents the curved surfaces from touching. If used as ancillary systems for sinusoidal type working chambers, the guide systems can be lighter or fewer than for regular toroidal chambers, where rotational motion is effected by the guides only. By way of example, an ancillary guide system is shown dashed at 2049 in FIG. 138. A further embodiment includes a reciprocal/rotational mechanical guide system comprising one or more rollers or a series of opposed rollers running on or in at least one endless approximately sinusoidal track or groove. By way of example, FIGS. 148 and 149 show a selected embodiment, with 148 being a schematic plan view and 149 the corresponding part elevation, part section, of a six roller system located in an endless groove having six waves of roughly sinusoidal configuration. The rollers 3084 are shown at one apex of reciprocation, with the opposite apex indicated at 3082. The groove housing 3083 is fixedly mounted, while the rollers 3084 are mounted on the reciprocating/rotating component 3004. It will be obvious, for the roller passage not to generate friction caused by differential movement, that the height of the outer perimeter of the groove will have to be greater than the height of the inner perimeter of the groove. The roller should be cone-shaped, the lines 3085 extending the profile of the cone to intersect the intercept of the axis of rotation of component 3004 and the axes of rotation 3086 of the rollers. (One portion of the roller—all of the roller rotating at one speed—has to travel further along the outer perimeter of the groove than another portion of the roller traveling along the inner perimeter; therefore the roller has to have a progressively varying diameter.) The groove housing 3083 is shown in one piece, but may be of multiple pieces assembled about the rollers. By way of example, FIG. 150 shows a detail of a roller in a groove, with the roller mounted by roller bearings 3087 on a shaft 3088 which is attached to the cylinder type component 3007, while the groove is located in or mounted on a moving piston type component 3004. The groove consists here of three operating parts: an upper track 3089, a lower track 3090 and an optional end track 3091. For better transfer of loads and stresses, the links between these three parts are rounded, and may have optional ventilation holes as at 3092. Obviously, only one side of the roller should be in contact with the groove at any one time, so there has to be some kind of clearance gap 3093. There may be play in the other bearings in the engine system, so the roller has at its end a bearing comprising a ball 3094 rolling on surface 3091 of a section 3004*a* of the piston/rod assembly, to prevent the roller from drifting into the groove and so closing the clearance gap. The roller and axle assembly is here retractable from and insertable into the groove under some conditions, perhaps during relative motion between the two, so the roller has a rounded frontal aspect. In a selected embodiment, the working portion of the roller comprises a hard and strong engineering material forming the outer casing 3095 (in contact with the groove) mounted on a thin elastomeric intermediate layer 3096, in turn mounted on an inner shell 3097 of engineering material, in turn mounted on the roller bearings 3087. In operation, a load, indicated schematically at 3098, on the roller will cause the shaft 3088 to deflect somewhat, causing the axis of the shaft to become misaligned relative to the track 3089. This misalignment is taken up and absorbed by deformation of the elastomeric material 3096. Alternatively, the shaft and roller may be mounted on the piston assembly, and the groove in the cylinder assembly.

The principles described above can also be embodied by wide separation of the tracks and/or provision of a second set of rollers. For example, FIG. 151 shows schematically component 3004 moving within housing 3007, both defining twin toroidal combustion chambers 3035 and 3036. Two sets of rollers are shown at 3099 and 3100, with tracks which correspond functionally with those of FIG. 150 shown at 3089 and 3090 in solid and dashed line. The relationship of the upper track 3089 to the lower track is assumed to be constant, that is, that the roller during its path along and up and down the groove always maintains the same clearance gap. This condition need not apply. In a further embodiment, the relationship of the upper to the lower track is such that there is a varying clearance gap during one complete working cycle, or wave of the groove, irrespective of whether the tracks are deployed as in FIG. 150 or FIG. 151. By way of example, FIG. 152 shows schematically an elevation taken along the curve of part of a perimeter of a groove, with the line of axis of rotation of the roller shown chain-dotted at 3101. The positions of the upper and lower tracks set out for a constant clearance gap are shown in solid line at 3089 and 3090. Possible positions of the tracks consistent with a variable clearance gap are shown dashed. The most useful applications for tracks permitting varying clearance gaps are for engines with variable compression ratios, as disclosed elsewhere herein. In FIG. 152, one track ensures that about the apex of reciprocation a minimum designed compression ratio is reached, while in that region the second track grows more distant from the first, to enable a moving component, such as piston/rod assembly, under certain conditions to travel beyond its designed compression ratio. A symmetrical track separation is shown at 3102, and an asymmetrical track separation at 3103. Variable clearance gaps may be desirable for reasons other than variable compression ratio, and 3104 shows track separation permitting greater range of component movement around the mid-point of reciprocation. Of course, once there is track separation, the path of the axis of roller rotation can no longer be predicted to always follow line 3101. In a further embodiment, a "groove" or guide channel is wholly or partly backless, that is having no end track, permitting fluid to pass across the space between upper and lower tracks. For example, in FIG. 150, items 3094 and 3004*a* could be eliminated. As optionally in FIG. 150, the guide system could be located about or within a fluid flow to or from the working chambers. In certain engines it could be in the exhaust flow but generally (because the exhaust gas would tend to pollute the working surfaces and mechanical parts of the guide system), it would be in the charge gas flow. By way of example, FIG. 153 shows schematically a half cross-section of an engine with twin toroidal combustion chambers 3035 and 3036, also indicated dashed at 3005 and 3006 respectively, with the components defining the chambers separated from each other and spaced by the guide components, with both the moving components and the cylinder components assembled by means of, and pre-stressed by, tensile members 3105 such as bolts. Here the components enclosing the combustion volumes are of ceramic material, while the guide components are of metal, optionally castings. A single toroidal metal component 3106 containing an endless sinusoidal groove to receive guide 3113 optionally including a roller bearing rotating about axis 3086, separates two substantially identical but relatively inverted toroidal components 3110. Charge flow is indicated at 3108, exhaust flow at 3109. Identical toroidal cylinder components 3111, inverted relative to each other, are separated by a series of metal components 3112 arranged circumferentially, each having a shaft and roller assembly 3113. Components 3112 have a series of holes 3114 through which charge air passes. Only the curvature of lower track 3090 is indicated, for simplification that of upper track 3089 is omitted. Compressible insulating material is shown at 3110*a* and 3111*a*, ceramic insulation at 3106*a*.

The guide system may be associated with working chambers in any manner. By way of example, example, FIG. 154 shows schematically a device having four identical working chambers 3115 and two identical complete guide assemblies 3116, each having upper and lower tracks. The piston assembly 3004 and the cylinder assembly 3007 are both made up of multiple components held together by fasteners, 3004*a* and 3007*a* respectively. If the components are toroidal, the device is assembled all together, with first a cylinder component and then a piston component and then another cylinder component and so on threaded through the fasteners, with on completion the fasteners progressively tightened together. The guides have the same number of reciprocations per revolution, and the engine has to be very carefully assembled, so that the guides are perfectly synchronous with each other and/or the roller assemblies have to be of the type having elastomeric inter-layers. Alternatively, the guide systems could have different ratios of reciprocations to revolutions, and be separately engaged. In another embodiment, FIG. 155 and detail FIG. 156 show schematically a twin combustion chamber 3115 engine, wherein component 3004 turns clockwise relative to cylinder assembly 3007, which is mounted on bearings 3120*a* and itself turns counterclockwise relative to housing 3120. The rotations can be reversed. Three separate complete roller-track toroidal guide systems are located at 3117, 3118, 3119. The sine or other waves in each guide system have the same amplitude and overall diameter, but differing pitch, so that each system has a different ratio of reciprocation to rotation. Only one system is engagable at any one time, by means of extensible/retractable roller assemblies. Selection of which guide system is engaged is made by movement of ring 3121, turning at same speed as cylinder assembly 3007, by means of actuator(s) 3021*a*. The ring is connected to a series of slidable shafts or elements 3122, which actuate the extension or retraction of the roller assemblies. Preferably the roller assemblies are spring-loaded to the retracted position. Such retractment/engagement devices are known, but the principle is illustrated schematically for a two-speed system in FIG. 156, where shaft 3122 has a plate-like section 3122*a* for engagement with a portion of a roller/guide assembly 3119*a*, biased to a retracted position by spring 3118*a*. Sinusoidal tracks may be engagable with non-rotating or solid guides as shown here, retractable or fixed. Optionally, the guides have rollers, as illustrated in FIGS. 148 through 151. The system of FIG. 155 is effectively a machine which could combine the functions of internal combustion engine, variable stepped transmission and differential. A clutch function could be located at the interface of the two rotating elements and any power take-off points. See also FIG. 145. FIG. 157 illustrates schematically a machine which can combine the functions of internal combustion engine and stepped variable transmission only. Two sets of twin combustion chambers 3115 (four chambers in all) are separated by a power take-off point, in the form of a toothed wheel and shaft 3122*a*, and the stepped transmission system, which comprises three separate guide systems 3123, 3124, 3125, each having upper and lower tracks. The sinusoidal or similar wave systems in each guide system have the same amplitude, pitch and curve—they are identical. Because the guide systems are of progressively increasing size, they will have progressively increasing number of cycles, or reciprocations per rotation. As with the system of FIG. 155, only one guide system is engagable at any one time. In this arrangement, guide system 3125 represents low gear, 3124 intermediate gear, and 3123 high gear. In another version of this engine/transmission system, the pitches and curves of the guide systems are similar but not identical, each being tuned to combustion and operating characteristics at a particular gear ratio. In variable compression ratio engines, the amplitudes of the guides may also be varied. It is possible, in the case of multiple cam systems, to link the actuation of the guides to completion of all or part of the one reciprocating cycle, actuation simultaneously projecting one and withdrawing one guide. For example, guide changes could always take place when the reciprocating element was at TDC/BDC.

Single and multiple concentric toroidal working chambers are mentioned earlier in this disclosure where it was chiefly envisaged that they would be combustion chambers. There need be no crank or guide or any drive system. A single cylinder with one piston having two fluid working chambers may function as an integral engine/pump. FIG. 158 shows an arrangement wherein a toroidal combustion chamber 3146 drives a piston 3145 which works a pumping volume 3147. In operation, combustion chamber expansion causes pumped fluid to exit volume 3147 in direction 3148 via non-return valve 3149, and combustion chamber compression is effected by pressure from fluid entering volume 3147 from direction 3150 via non-return valve 3151. (Such a machine could be used to give pressure boost in pipe flows.) Alternatively and/or additionally, one or more of the working chambers could be used to compress any gas including engine charge air, or function as a pump for any gas. By way of example, one half of such a device is shown schematically in section in FIG. 159, wherein a piston rod assembly 1701 is reciprocating in direction 1702 in a cylinder assembly 1703 to form two working chambers, 1704 at maximum expansion and 1705 at maximum compression. Part of the piston/rod is shown dashed at 1706, when chamber 1704 is at maximum compression. Gas 1707, such as ambient air, enters through a port 1707*a*, is compressed by the piston/rod assembly, then is expelled via transfer port or depression 1708 and via transfer passages 1709 and second port 1710 into an interior volume 1711 of the piston/rod assembly. Transfer ports or depressions 1708 may be endless and annular, or they may be separate and discontinuous, arranged along a circumferential path. An alternative arrangement is shown for upper working chamber 1704, where the compressed or pumped gas is transferred from depression 1708 to passages 1712 communicating with a volume not part of the piston/rod assembly. In an alternative embodiment, one of the working chambers can be a combustion chamber as disclosed elsewhere herein, and the other chamber used for charge compression. So far, most embodiments have involved one piston reciprocating between two working chambers. In a further embodiment, by using an energy absorbing device, such as a spring, the need for twin crankshaft and/or twin combustion chamber arrangements is avoided. To achieve balanced operation of an engine having a combustion chamber on only one side of the piston, the energy absorbing device in most applications should have at least the capacity to store and release enough energy to properly compress the combustion chamber, in the case of two stroke engines. By way of example, FIG. 160 shows schematically an engine or pump or compressor having one piston/rod assembly 1606 with an internal volume 1676, reciprocating in direction 1634 in a cylinder 1003 having a head 1004, one toroidal working chamber 1002 and, on the opposite side of the piston, a cylindrically shaped working chamber 1674. A working chamber could be used as a pump, a gas compressor, including of charge for the combustion chamber, or any other purpose. In this embodiment the cyclically energy absorbing and generating device is a metal spring 1675, but any suitable energy absorbing device may be used. In the embodiment illustrated, chamber 1002 is a combustion chamber, but the principles of the invention would work equally well if 1674 became a combustion chamber and 1002 became a working chamber containing the energy absorbing and generating device. For simplification, all ports, valves, and any fuel delivery devices have been omitted, but any of those disclosed herein may be used. The above principles can be embodied in the engines of FIGS. 110 and 111.

In further embodiments, a reciprocating piston/rod assembly in one or more working chambers pumps charge into one or more other combustion chambers. It is preferable in many applications that the function of the cam system be combined with some kind of pumping or compressing work. Because the cam faces directly or indirectly transfer most of the work that is produced by combustion, it is better (for wear reasons) that no direct contact takes place. The pumped fluid would function as a bearing and heat transfer mechanism. By way of example, FIG. 161 illustrates in schematic half section one embodiment, whose principals are adaptable to both rotating and non-rotating reciprocating elements. Piston/rod assembly 3039 reciprocates in direction 1702 in cylinder assembly 3007. A toroidal combustion chamber is shown at 3040 fully expanded, with compressed charge "A" passing through port 3039*a* into the combustion chamber moving to displace exhaust through port 3007*a* at "B." The charge is compressed in chamber 3041, which may be of toroidal or cylindrical form, into which it is conducted via poppet valve 3042, optionally actuated by some combination of pressure and multiple counterbalancing springs 3044. At the end of the compression stroke in chamber 3041, which corresponds to the compression stroke in combustion chamber 3040, the piston/rod assembly 3039 is in position shown dashed at 3039*b* and the poppet valve is on its seat as shown dashed at 3042*a*. Compressed gas enters gas reservoir 3043 via clearance space at "C" and port 3039*a* at "A.". Because the stroke is fixed, the degree of compression effected in chamber 3041 will largely depend on the relationship between radii R1 and R2. An IC engine could have a charge compressor similar to that of FIG. 161 mounted with it, in selected embodiments such that both engine and compressor together have one fixed assembly, preferably a cylinder assembly, and one single assembly, preferably a piston/rod assembly, reciprocating relative to it. Using the two-stroke cross flow valveless porting disclosed elsewhere, the entire engine would only have one significant moving part, since the other part would be fixed, if not rotationally mounted in a housing or shaft. In the embodiment of schematic FIG. 162, wherein only one half of the engine is shown, "A" indicates the combustion chamber section and "B" the charge compressor section. The latter is essentially as disclosed in FIG. 159, except that the compressor projection 1715 of the piston/rod assembly 1701 is of greater radius and has a hollow portion 1712 linked to the main internal volume 1711 by passages 1713. After ambient air 1705 is compressed and moved to volume 1711, the high pressure charge enters the combustion chambers 1718 and 1719 via ports 1714, with exhaust exiting at common port 1716. Combustion chamber 1718 is shown solid at maximum expansion and is separated from combustion chamber 1719 by projecting portion 1717 of the piston/rod assembly. Projections 1715 and 1717 are shown dashed at 1706 and 1720 when chambers 1704 and 1718 are at maximum compression. Because stroke is constant, ratio of compression will depend on the relationship between radii R1 minus R2 and R3 minus R4. Toroidal combustion chambers 1718 and 1719 may be of regular form, or they may have the broadly sinusoidal shapes indicated in FIGS. 127, 138 through 144. Equally, toroidal compression chambers 1704 and 1705 may be of regular form, or they may have the broadly sinusoidal shapes indicated in FIGS. 127, 138 through 144. Transfer ports or depressions 1708 may be endless and annular, or they may be separate and discontinuous, optionally arranged along a circumferential and/or broadly sinusoidal path. The line of such depression(s) is indicated schematically dashed at 3039*a* in the left side of FIG. 142. If both pairs of chambers are of broadly sinusoidal form, each pair may be of different design. For example, the combustion chambers may have a design similar to that indicated in FIG. 143, while the compressor chambers may have a design similar to that of FIG. 142. In such case, the compressor chamber could be designed to function as system guides, to prevent combustion chamber surfaces making physical contact during normal operation.

Figure 163:
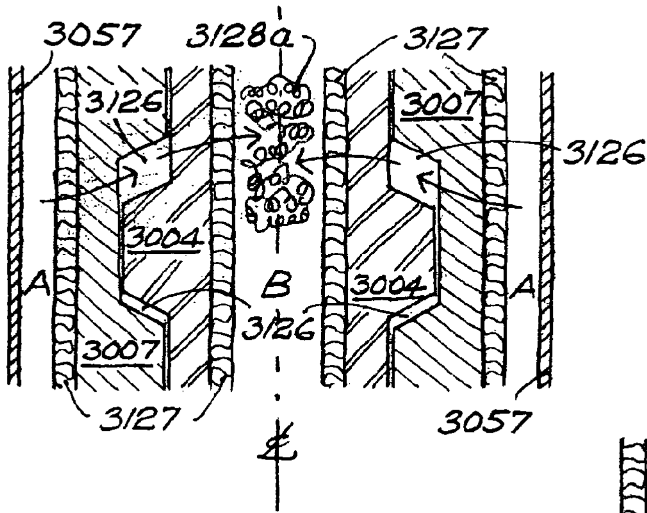
Figure 164:
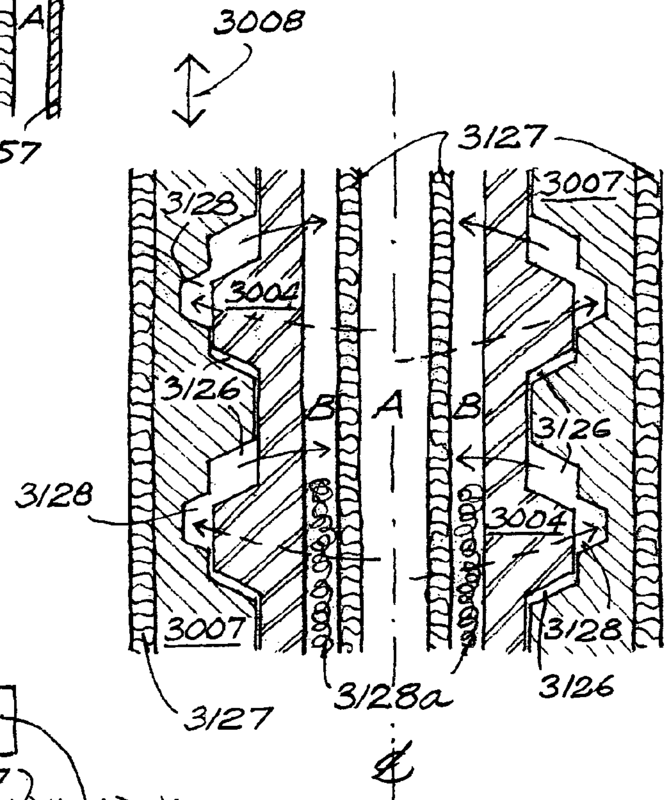

In a further embodiment, multiple pairs of working chambers are arranged about an axis, with co-axial and at least partly cylindrical or toroidal volumes for passage of fluids to from the working chambers, the volumes positioned approximately abreast of the working chambers. Multiple concentric combustion chambers of non-uniform size were disclosed earlier herein. They present no theoretical problems of assembly because, as in FIGS. 110 and 111, an integral component 2006 can move and fit within component 2005. It would be useful to have more than two combustion chambers of identical size and configuration, but there would be problems of assembly (especially of the moving component), as can be seen by studying FIG. 154. Advantages of being able to combine more than two identical chambers in one engine include the ability to manufacture a range of engines using one set or module of combustion chamber parts. If one is going to use one combustion chamber module to make engines of varying power and swept volume, then the gas passage(s) within the module (if any) should be so sized as to accommodate the gas flows of the largest engines likely to use that module. By way of example, FIGS. 163 to 166 illustrate schematically various possible gas flow layouts, wherein 3126 indicates a multiplicity of equal sized toroidal combustion chambers, 3004 the moving component reciprocating in direction 3008, with 3007 the "fixed" cylinder assembly which, in all the embodiments, could also rotate, and 3057 a housing or casing. "A" represents charge air volume, "B" high temperature and pressure exhaust, "C" lower temperature/pressure exhaust gas. Filamentary material, as described subsequently, is shown schematically at 3128*a*. Valves and ports are not shown, but can be embodied as described elsewhere in this disclosure, and/or by any convenient means. Solid arrows describe gas flows through ports, dotted arrows show gas flow to and/or from transfer ports, or flows via passage or plenums as described elsewhere herein. Thermal insulation is indicated schematically, like all other components, at 3127. In FIG. 163, showing one pair of toroidal working chambers 3126, thermal insulation 3127 separates charge flow from hot components, charge flows into the combustion chamber, exhaust flows from it into a central exhaust gas reservoir. The flows can be reversed, volumes A and B transposed, with insulation 3127 provided as shown at the interface of component 3004 and the central (now charge) gas reservoir or plenum. FIG. 164, with two pairs of toroidal working chambers 3126, shows a system having transfer ports, indicated schematically at 3128. Here again, the flows could be reversed, volumes transposed, insulation repositioned. FIG. 165, with two pairs of toroidal working chambers 3126, shows a layout where exhaust gas flows adjacent to the structural components of 3004 and 3007 are used to reduce heat flows, ie thermal gradients, across these components, with the center of the engine partly occupied by a mechanical system 3130, including a turbine, steam generator for a stam engine, etc. If 3130 were a fuel delivery system, this could serve to maintain liquid fuel under pressure at temperatures greater than boiling. An alternative location for a compressor and/or turbine system is indicated schematically at 3129/3134. In FIGS. 163, 165 and 166, casing or housing 3057 comprises part of the structure defining volume A, while in FIG. 131 thermal insulation 3127 is part of the structure defining volume C. Another example is shown in FIG. 166, with two pairs of toroidal working chambers 3126. Here, ambient air 3136 enters a compressor 3129, high pressure charge is delivered via plenum or annulus 3131 to tubular volume A, in which heat exchangers 3132 are located for purposes of after-cooling. Optionally water under pressure circulates in the heat exchangers, to be used for compounding, as described elsewhere, and/or to provide bearing pressure as disclosed earlier. Hot exhaust from tubular volume B goes via plenum or annulus 3133 to turbine 3134, which is mechanically linked to the compressor 3129. On leaving the turbine, the lower temperature and pressure exhaust flows through tubular volume C to exit at 3135. If the number of pairs of equal concentric toroidal chambers 3126 is relatively large, then the engine will or might have a torpedo-like or tubular shape. This, together with the uni-directional gas flows indicated at 3136 and 3135, will make such engines suited for particular applications, as in aircraft or certain marine craft, including torpedos. Obviously, additional compounding can extract further work from the lower temperature exhaust gas, at or after 3135. In certain embodiments, the separate insulation 3127 need not be employed, especially if the gas flows are large per unit volume and/or the structural components used in 3004 and 3007 have moderate to good insulating properties.

In a further embodiment, the piston directly or indirectly powers or is powered by a linear, ie reciprocating, electric motor or generator. Combustion chambers may be separated (singly or in groups) by mechanical systems other than those described above—conventional crankshafts, slot-drive crankshafts and guide systems. For example, combustion chambers can be separated by an electric motor or electric generator. If component 3004 has compound motion, at least one of the windings of the electrical assembly need not have the conventional band-form but could have a sinusoidal toroidal form, the shape of the sine-like wave of the electrical winding corresponding to the motion of a point on 3004. As an alternative to placing electrical motors and/or generators between combustion chambers, such electrical systems could be placed on the side of multiple concentric toroidal combustion chambers. As electrical machines can be deployed in this way, so can other machines or mechanical devices, including the following: counting devices, speedometer drives, power take-off points, transmissions, clutches, fuel delivery machines or pumps, lubrication machines or pumps, machines or pumps associated with inter-cooling, engines employed to extract additional work out of the exhaust gas (that is, for compounding), pumps, compressors (both of either toroidal or other configuration), etc. By way of example, in FIG. 145 there was shown schematically an engine or pump or compressor having a pair of toroidal working chambers 3125 defined by piston/rod assembly 3004 reciprocating and rotating in cylinder assembly 3056, which in turn rotates in housing 3057. Assuming a guide system is provided elsewhere, an electrical generator or motor could be positioned at 3058*a*, with one set of windings mounted on component 3004 and the other on 3056, electric performance being related to the combined motion of 3004 relative to 3056. In another example, FIG. 167 shows schematically alternative methods of linking electric motor/generators, indicated in zones "B" and "C", with a pump, compressor or IC engine, indicated at zone "A". In this embodiment, a combined piston/rod/major electrical component assembly 1102 reciprocates along axis 1006 inside a cylinder 1003 and head 1004 assembly to define two toroidal working volumes 1002. Assembly 1102 is shown at one extreme of reciprocation in solid, with its position at the other extreme shown dashed. Spaces 1275 house any convenient mechanism, such as a charge boost device, valve actuation mechanisms, guide system for converting reciprocating motion to combined motion, etc, with the whole arrangement optionally surrounded by thermal insulating material at 1010. It is obvious to directly or indirectly link a reciprocating piston/rod assembly to a crankshaft or scotch yoke, which in turn drives a rotating electrical motor/generator, and that option is not illustrated here. An alternative option is to directly or indirectly link reciprocating component 1102 to a linear or reciprocating electrical motor/generator, as indicated schematically at "B", where one of the two sets of major windings are mounted each on 1102*c* and 1102*d*. An alternative option, if component 1102 also rotates, is to directly or indirectly link component 1102 to a combined motion electrical motor/generator, as indicated schematically at "C", where one of the two sets of major windings are mounted on 1102*a* and 1102*b*, and where electrical force is generated or used by the combined reciprocation and rotation of component 1102*a* relative to component 1102*b*. FIG. 167 is entirely schematic; the components call linked in any orientation or position by any convenient means, including by bevel and/or reduction gearing. Component 1102 may be fixed, and the other major components, including 1003, 1004, 1102*b* and 1102*c*, could reciprocate and optionally rotate. In another example, FIG. 168 shows schematically an IC engine or compressor or pump having two pairs of toroidal working chambers 3126 defined by cylinder assembly 3007 and piston/rod assembly 3004 reciprocating and rotating within, motion governed by guide system 3153. Optionally, component 3007 may rotate in a housing, shown dashed at 3057. Fluid flows from "A", through working chambers 3126, and exits via "B". An electrical motor and/or generator has at least one of its major component's electrical windings of endless roughly sinusoidal form, as indicated at 3152, the other major component's windings being of any convenient form Winding(s) 3152 could be integral with component 3007 and/or component 3004.

In another embodiment, the cross-section through the working chamber has the approximate form of a parallelogram. A schematic profile of a half cross-section of the toroidal form of a selected working chamber is shown in FIG. 169. It is drawn with the ratio of height H to outer radius R2 minus inner radius R1 equal to 6:5. Here the maximum inlet port opening is shown at 3137, the maximum exhaust port opening at 3138, with dimensions I and E being 0•183×H and 0•267×H respectively. If the motion of 3004 relative to 3007 is represented by the sine curve, then the port/valve openings, measured in crank angle from top dead center, are: exhaust opens 114•7°, inlet opens 126•9°, inlet closes 233•1°, exhaust closes 245•3°. If the ratio of (R2−R1) to R1 is 1:2•5, the ratio of maximum inlet port area to maximum exhaust port area is 1:1•04. Dimension S represents the stroke. The working surfaces A and B are angled relative to piston and or cylinder walls C and D as shown, and the intercepts of the surfaces are rounded as shown, so that the gas flows across the combustion volume are as smooth as possible, and so that stresses are reduced and more evenly distributed in monolithic components 3004 and 3007. An object of the smooth gas flows, in the case of two stroke IC engines, is to optimize two-stroke scavenging and minimize residual exhaust gas left in the charge after the ports close. The chamber is shown at maximum volume; component 3004 will move in direction 3139 to effect maximum compression, when it will be in position shown dashed at 3004*a.*

Figure 170:
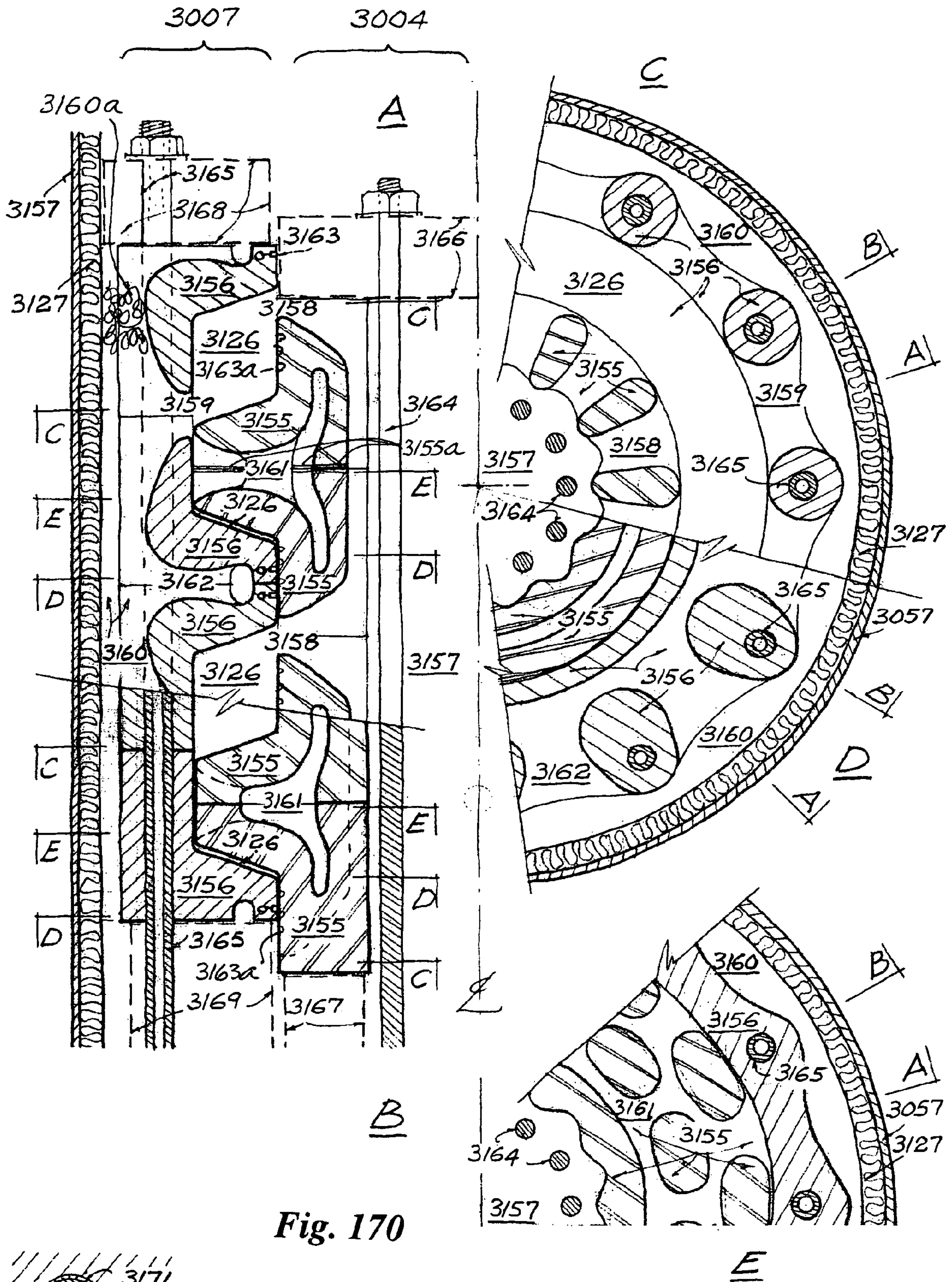
Figure 171:
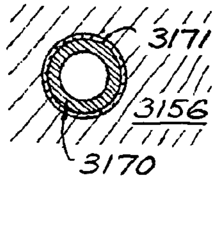
Figure 173A:
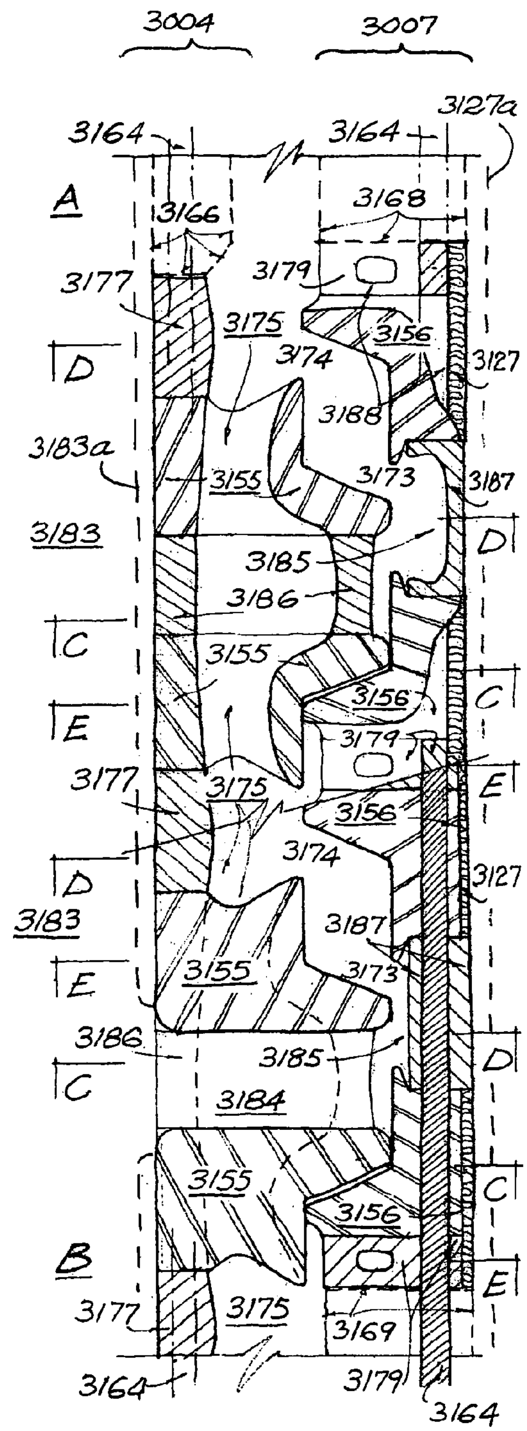
Figure 174:
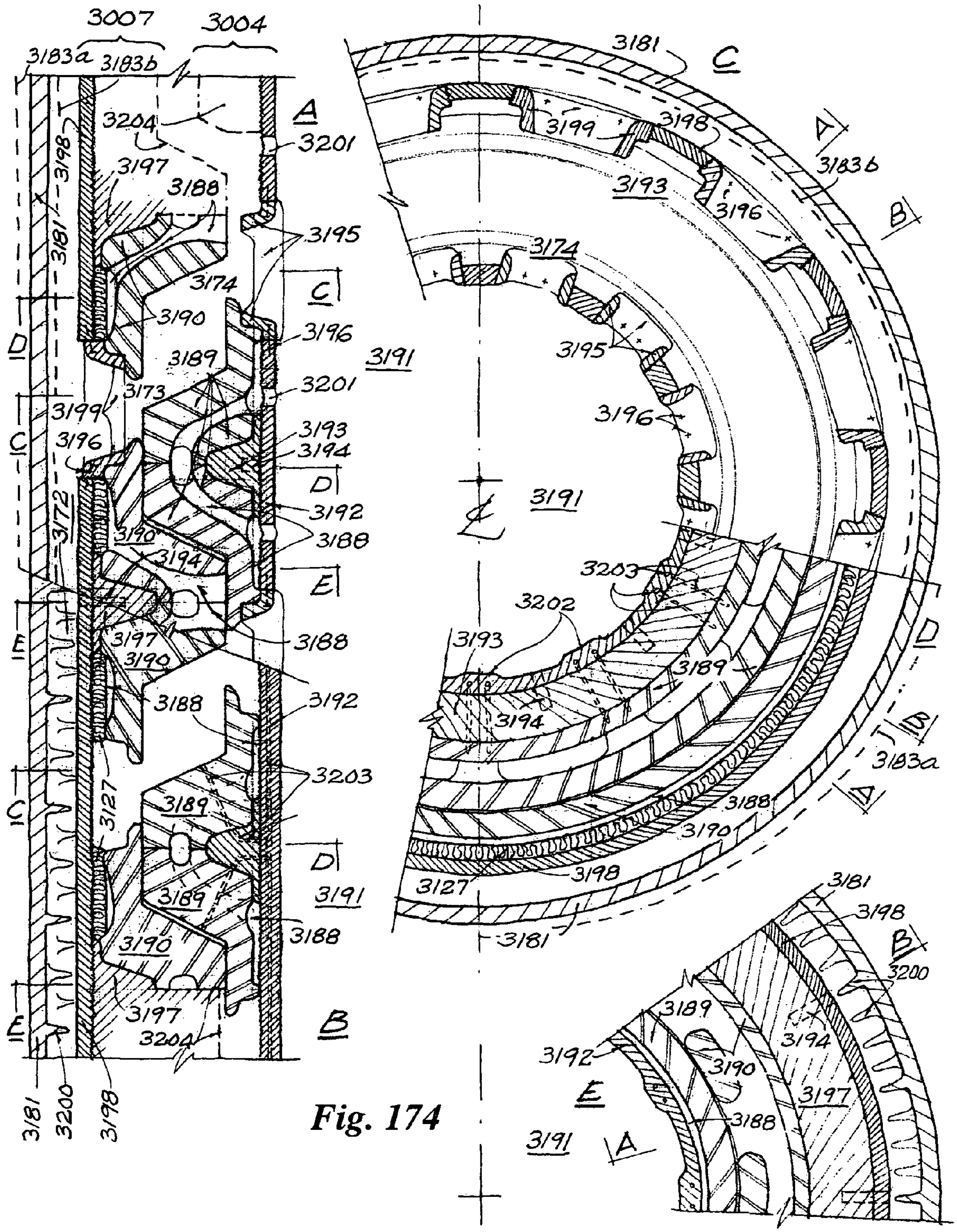

In a further embodiment, components are of modular construction, such that substantially identical components can be used repeatedly to manufacture one device of a single design, and/or be used in devices of substantially differing designs, as will be shown in FIGS. 170 through 174, illustrating devices all having four toroidal working chambers. Such devices include IC engines, compressors or pumps. The piston assemblies and the cylinder assemblies are both made up of multiple components held together by fasteners. If the components are integral toroids as illustrated, the device is assembled all together, with first a cylinder component and then a piston component and then another cylinder component and so on threaded through or onto the fasteners, with on completion the bolt type fasteners progressively tightened together. In the case of FIG. 174, after each component had been threaded into position, it would be located in position by pins or keys. FIG. 170 shows by way of example an engine assembly whose combustion chambers are of modular construction, wherein details A and B are half vertical sections along the different radii indicated in details C, D and E, which are cross-sections through the planes indicated in the vertical sections. Assembly 3004 reciprocates relative to assembly 3007 and is shown at bottom dead center. Details C, D and E are shown with components 3004 and 3007 in different positions relative to each other, when the appropriate detail lines shown on the vertical sections A and B are in approximate alignment with each other. Identical ceramic reciprocating components are shown at 3155, with identical ceramic "cylinder" components shown at 3156. Charge circulates through volume 3157 and enters combustion chambers 3126 via inlet ports 3158, exits via exhaust ports 3159. Exhaust gas circulates through tubular volume 3160 and is spaced from outer enclosure 3057 by thermal insulation 3127, which functions as structure enclosing volume 3160. Exhaust gas circulates to some degree within spaces 3161, 3162. Since these communicate directly or indirectly with the main exhaust gas circulation volume 3160, they serve to reduce thermal gradients in selected portions of the combustion chamber components 3155 and 3156. A gas bearing supplied by super-heated liquid is shown, schematically, at 3163. Additional or alternative depressions for labyrinth sealing are indicated at 3163*a*. The respective components are assembled and fastened, preferably pre-loaded in compression, by means of tensile fasteners 3164 and 3165. Fasteners 3164 are located within the relatively cool charge flow volume and so are of conventional design, while fasteners 3165 are adjacent hot components 3156 and hot exhaust volumes, and so are of tubular design. The interior of the tube communicates with cooler volumes, say those containing charge air, this circulation of cooler gases through the interior of the fasteners serving to maintain their temperatures below the temperatures of components 3156. Loads are distributed along the rims or extremities of components 3155 and 3156 by means of load distributor elements 3166, 3167, 3168, 3169 shown dashed. In selected embodiments, components 166 through 3169 have additional other function(s) including possibly guide system, bearing and/or sealing components. They may also function as fuel delivery system or tribology system components, and may additionally or alternatively be of thermal insulating material. The matter of tribology and bearings as well as sealing is described elsewhere in the disclosure. Here component 3168 closes off tubular exhaust gas volume 3160. FIG. 171 shows a cross-sectional detail of an optional alternative to fastener 3165, wherein hollow tensile member 3170 does not fit tightly within component(s) 3156 but is separated from them by an insulating and/or elastomeric interlayer 3171, which could be of any suitable material, including ceramic wool. The engine illustrated in FIG. 170 has four identical combustion chambers. It is obvious that other engines using components 3155 and 3156 can be constructed, including ones having two combustion chambers and, if volumes 3157 and 3160 are sufficiently large, engines with six or even more combustion chambers. Alternatively, components 3155 and 3156 can be used in other engines with single or multiple pairs of combustion chambers, for example, wherein heat exchanges are located within volume 3160 and the enclosure 3057 is therefore of larger diameter. When constructing different engines using standard components 3155 and 3156, it is probable that other components such as the fasteners, enclosures, etc will differ and be particular to each engine design. The combustion chambers illustrated in FIG. 170 and elsewhere generally show an angle between wall and head/crown (angle Θ in FIG. 169) of around 110° to 120°. In fact, the chambers could be designed with Θ any suitable angle, including 90°. Filamentary material to assist in the cleaning of exhaust gases, as disclosed subsequently herein, may be mounted in any convenient location, and is shown by way of example at 3160*a.*

Figure 172A:
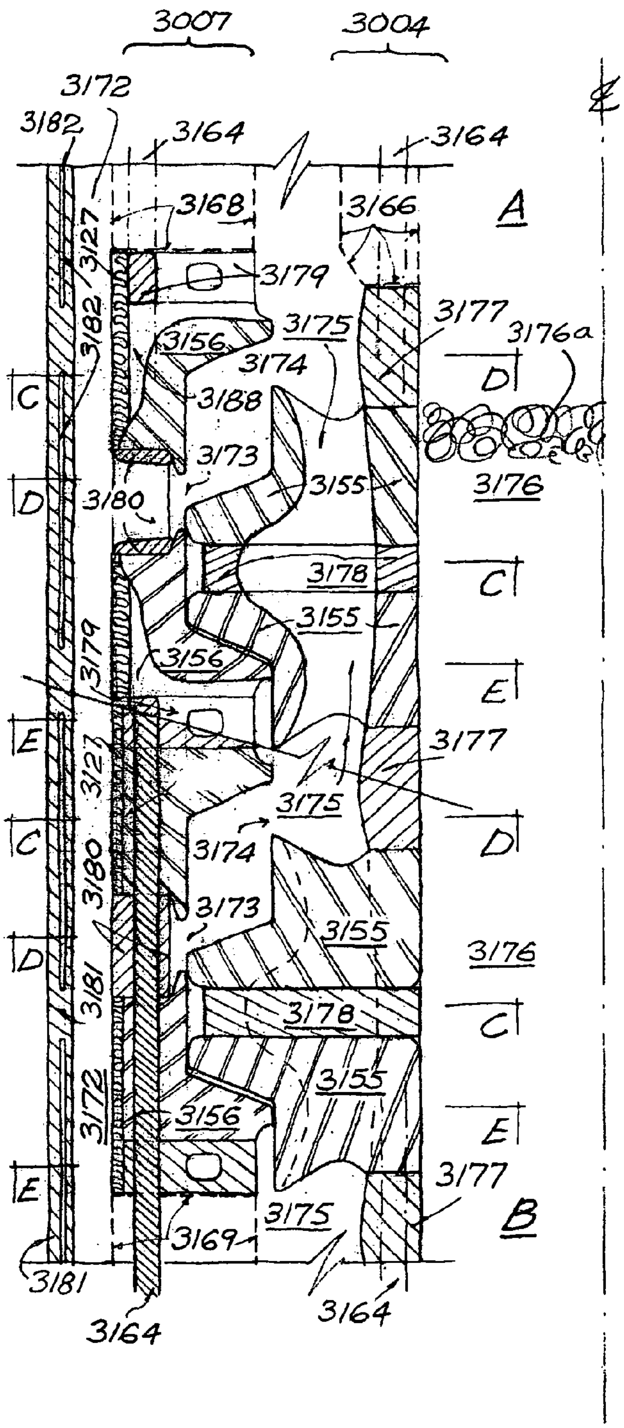
Figures 172B, 173B:
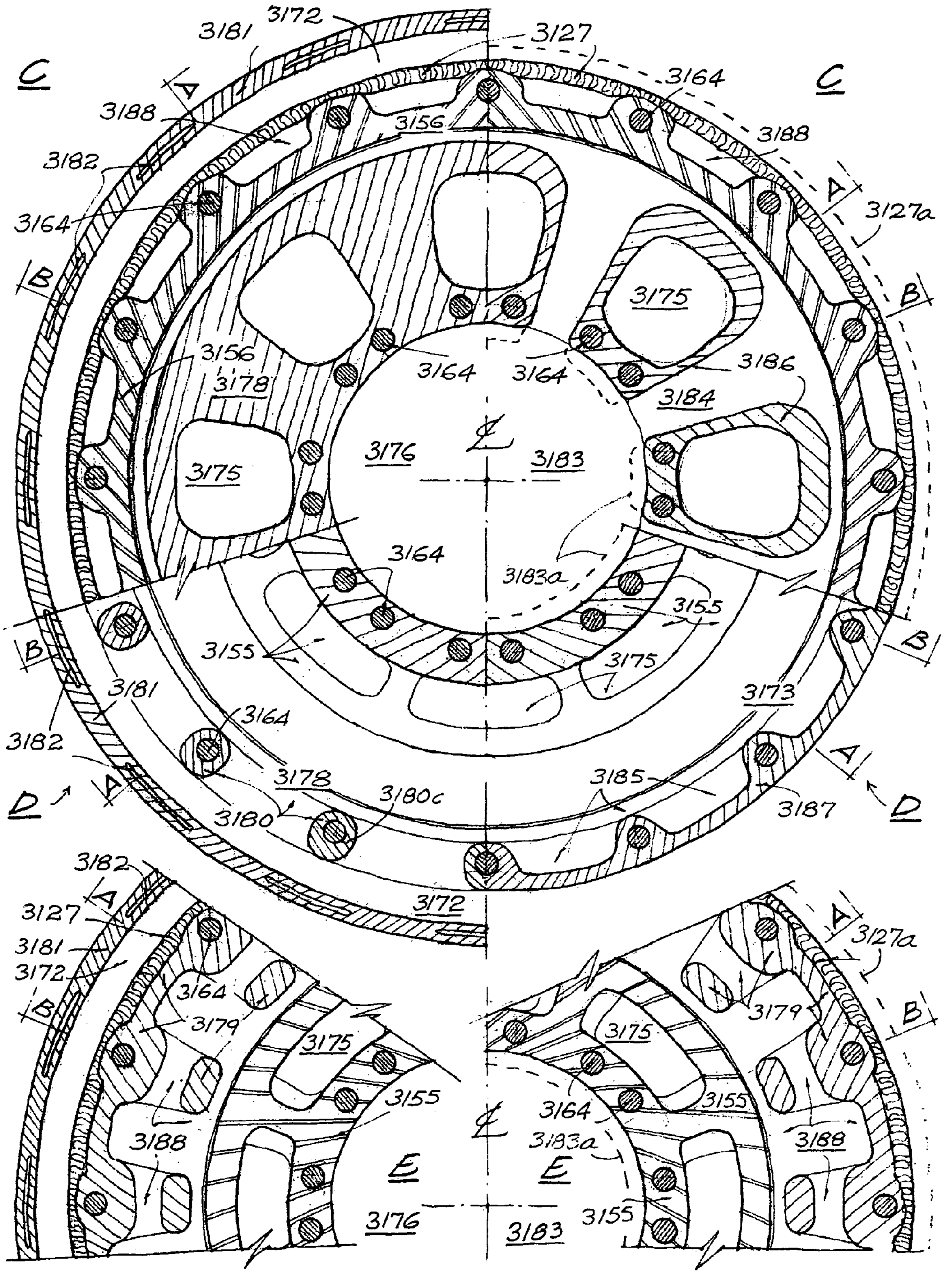

FIGS. 172, 173 and 174 show further examples of engines having combustion chambers of modular construction. The method of illustration is similar to that of FIG. 170 and, although FIGS. 172, 173 and 174 each show a different engine, both the size and configuration of the combustion chambers and the basic configuration of toroidal components 3155 and 3156 are similar in all four engines. Variations occur mainly in the gas flows and the methods by which loads to and from components 3155 and 3156 are transmitted. Because FIGS. 172 and 173 illustrate how two substantially different engines can be assembled using the same combustion chamber components, the details A, B. C, D and E of each figure are presented side by side, for purposes of comparison. The vertical sections are together on one sheet, and the cross-sections together on the next sheet, and therefor each Figure is subdivided into A and B portions, FIGS. 172A and 173A, followed by 172B and 173B. Combustion chamber components 3155 and 3156, as well as the cross section of fasteners 3164, but not necessarily their length, are identical in both engines. Thermal insulation 3127 is deployed as indicated in both engines, as are load distributor elements 3166, 3167, 3168, 3169. In the engine of FIG. 172, charge air circulates in tubular volume 3172, enters the combustion chambers via inlet port 3173, exits via exhaust port 3174 into high temperature/pressure exhaust gas circulation volume 3175. The exhaust gas passes to a turbo-charger, in one embodiment as illustrated in FIG. 166, and from there low temperature/pressure exhaust gas passes down the central volume 3176. Optionally, filamentary material, as described subsequently herein, can be disposed in one or both of exhaust volumes 3175 and 3176, and is shown schematically by way of example at 3176*a*. Components 3155 are separated from each other and the load distributor elements by spacer rings 3177 and spacer plates 3178 having holes to accommodate volume 3175. Components 3156 are separated from each other and the load distributor elements by spacer rings 3179, each having a series of internal projections optionally with holes to permit circulation and equalization of gases, and by inlet port rings 3180, each ring having one or more holes permitting the passage of charge air. The tubular charge volume 3172 is enclosed by a casing 3181, here having within it passages 3182 containing circulating liquid, for the purpose of cooling the casing and therefore indirectly the charge. Casing 3181 forms part of the structure enclosing volume 3172. The engine of FIG. 173 has the same combustion chamber components 3155 and 3156 as that of FIG. 172, and is therefore presumed to have the same stroke and similar inlet and exhaust port openings, ports shown at 3173 and 3174, respectively. However, the gas flows are different, charge flowing in central volume 3183 to the inlet port via passages 3184 and transfer port 3185, thereafter leaving the combustion chambers via exhaust port 3174 into essentially tubular exhaust processing volume 3175. The difference from the engine of FIG. 172 has been achieved only by substituting spacer plate(s) 3178 with a series of eight taller ring-shaped spacer plate(s) 3186, each also able to accommodate volume 3175, and by substituting the inlet port ring(s) 3180 with taller transfer port ring(s) 3187. Note that spacer elements 3177 and 3179 remain unchanged. Since the gas flows are different, outer casing 3181 can be eliminated. In both engines there are located within or adjacent to components 3156 special volumes 3188 which communicate with volume 3175 and will therefore also contain exhaust gas. As previously, the objective of volumes 3188 is to reduce combustion chamber heat loss through components 3156. Portions of components 3155 and 3186 are part of the structure enclosing volume 3155. Optionally, insulation shown dashed at 3183*a* may be provided at the perimeter of volume 3183, in the manner of the insulation shown in FIG. 163 when volume B is used for charge air. Additional exterior structure, optionally having thermal insulation properties, can be provided, as shown dashed at 3127*a*.

Figure 175:
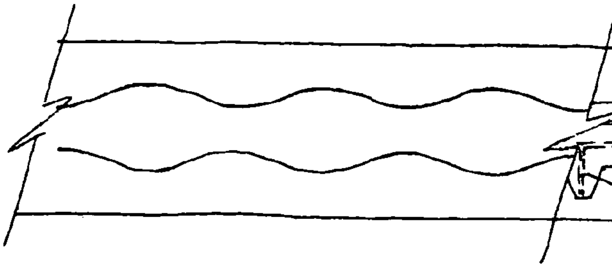
Figure 176:
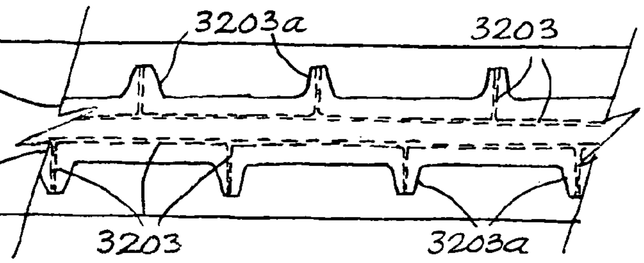

In a further embodiment, the piston assembly and/or the cylinder assembly can be held together bu tubes principally loaded in tension. Optionally, the tubes may be wholly or partly threaded. By way of example, the engine of FIG. 174 illustrates alternate ways of assembling/fastening/mounting modular combustion chamber components, using tubes. Components 3189 and 3190 are similar to those illustrated previously, as are volumes 3188 housing or permitting the passage of exhaust gas. Here charge travels within tubular volume 3172 via inlet port 3173 to the combustion chamber; exhaust exits via exhaust port 3174 to central tubular exhaust gas volume 3191. Outer casing 3181 comprises part of the structure enclosing volume 3172. Instead of using conventional tensile fasteners (such as 3164 in FIGS. 172 and 173), this engine is assembled by means of pierced tubes. Inner tube 3192 is continuously threaded on its outer surface. Load distribution rings(s) 3193 are threaded onto the inner tube 3192, and once in final position secured by means of locator pins or keys 3194. The rings support components 3189, which are further restrained by sleeves 3195 of rectangular form with rounded corners, inserted into pre-formed holes in tube 3192, and restrained by means of pins 3196. Exhaust gas passes from port 3174 through this sleeve 3195 to volume 3191. In a similar manner, components 3190 are supported by means of load distribution ring(s) 3197 threaded within outer tube 3198, and when in final position secured by means of locator pins or keys 3194. Components 3190 are further restrained by circular sleeves 3199 threaded into pre-formed holes in outer tube 3198 and restrained by means of pins 3196. Inlet charge passes from volume 3172 through this sleeve 3199 to inlet port 3173. Insulation 3127 within and against outer tube 3198 prevents heat loss from exhaust gas in volumes 3188. An outer casing 3181 defines volume 3172. In an alternative embodiment, illustrated only in details B and E, the casing has a multiplicity of projections 3200 located in the charge air flow, and is made of material having good thermal conductivity, for the purpose of transferring heat from the charge to beyond the casing 3181, optionally as a form of after-cooling. This device is particularly useful in situations where the fluid surrounding the casings is at low temperature, say under water in marine applications or at high altitude in aircraft applications. The projections 3200 are shown schematically only; they can be of any configuration and integral with the casing or attached to it in any way. Alternatively, if it is desired that the heat produced by any charge compression be retained, then casing 3181 may be constructed to include exterior thermal insulating material, shown schematically dashed at 3183*a*, and/or it may be on the inside of component 3183, as shown schematically dashed at 3183*b*. Exhaust gas reaches volumes 3188 associated with components 3189 from volume 3191 via holes 3201 in inner tube 3192, which is of varying thickness in cross section, stiffening ribs 3202 running vertically or longitudinally on the inside of the tube between the exhaust sleeves 3195. Within each rib are two capillary tubes 3203 which are part of fluid delivery systems, one to supply all the chambers moving 3004 in one direction, the other for the chambers moving 3004 in the other direction, which communicate with the combustion chamber via load distribution ring(s) 3193. Here, two tubes 3203 are shown in each longitudinal rib, however any twin system of tubes and/or galleries may be used, supplying the chambers either via ring(s) 3193 and/or directly. The fuel supply need not be within the tube, but could be in fuel lines within volume 3191 to pierce 3192 via connectors, couplings, etc. Fuel delivery is here shown associated with the inner tube; it could be equally associated with the outer tube 3198. A similar system of tubes/passages/fuel lines could be used to provide fluid used for lubrication or other purposes to any desired location within the engine. In FIGS. 172 and 173, the fasteners were attached to load distributor elements 3166 to 3169. Here, the outermost rings 3197 could be identical to an inner ring 3197, or they could be integral with a component 3204 having another function, such as bearing, gas-seal, guide system element, as indicated in the diagram. To prevent differential rotation between components 3189/3190 and their respective support rings 3193/3197, the support surfaces of the rings may have projections and/or undulations matching indentations or undulations on the corresponding support surfaces of the combustion chamber components. In schematic illustration, FIG. 175 shows elevationally part of a ring having support surface undulations, while FIG. 176 similarly shows part of a ring having projections or nipples 3203*a* which also have fuel delivery tubes 3203. As noted, the piston assembly and the cylinder assembly are both made up of multiple components held together by fasteners. If the components are integral toroids as illustrated, the device is assembled all together, with first a cylinder component and then a piston component and then another cylinder component and so on threaded through or onto the fasteners, with each component after being threaded into position located by pins or keys. In the case of large devices, such as for marine engines, the components may not easily be made in one piece if of ceramic material. In such case, toroidal components made be made up of multiple pieces. For example, considering a toroidal component in plan view, it may be composed of six equal pieces or segments, each arcing through 60 degrees, with optionally a vertical or perpendicular thin compressible gasket and/or some kind of powder between each piece. In the case of the devices of FIGS. 170 through 173, the piston assembly and the cylinder assembly could each have twelve bolts, twenty-four in all, with two bolts running through each piece. In the case of FIG. 174, the beginning and end of a 360 degree turn of each thread of the tubular fasteners would be separated by five other threads, for a total of six parallel threads. In that way, each of the six segments of a toroidal components would be machined in identical manner.

Figure 177:
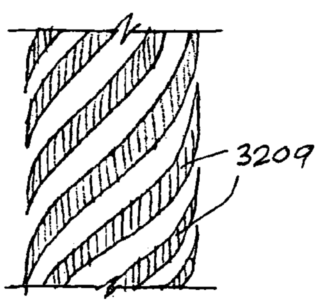
Figure 178:
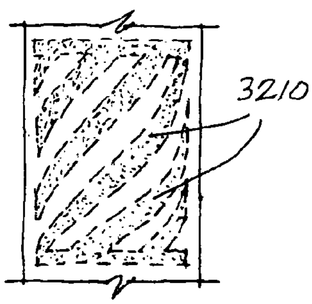
Figure 179:
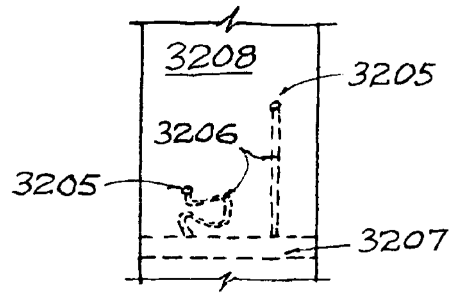

The engines of FIGS. 172, 173 and 174 all show tensile fasteners of circular cross-section arranged parallel to the axis of reciprocation. The fasteners could have any appropriate cross-section, including that of straps or thin strips of sheet, arranged at any angle to the axis of reciprocation. FIG. 177 shows very schematically a system of strap-like fasteners 3209 arranged at angle to and constant radius from the axis of reciprocation. In most applications there would have to be a second and corresponding system of fasteners angled either in the opposite direction or parallel to the axis of rotation (not shown). In the case of a housing or casing of cylindrical shape having internal passages 3210, say for cooling fluid, these passages could also run mainly diagonally, as shown very schematically in FIG. 178, and implied by the details and sections of 3182 in 3181 in FIG. 172. Similarly, where tubes are used structurally, as in 3192, 3198 in FIG. 140, any apertures in such tubes could be of any shape and/or direction, including diagonally. In the case of straps running on a curve, as illustrated in FIG. 177, or in the case of either thin-wall tubes, or tubes with cut-outs whose primary dimension is not parallel to the axis of reciprocation, then such straps and/or tubes will probably have to be restrained. Usually the most practical form of restraint will be the toroidal combustion chamber components likely to be within them. In acting as such restraint, the combustion chamber components would be loaded in compression radially inwardly toward and more or less perpendicularly to the axis of reciprocation. Therefore, the provision of the straps or the thin-wall or other tubes mentioned immediately above could be used as a design tool to distribute or create desired loadings in the combustion chamber components. Fuel delivery passages have been generally shown equal to each other and travailing in a series of straight lines. They need not be equal nor be linear. In the case of several fuel delivery points being supplied from a common fuel delivery reservoir or gallery, it may be desirable to have equal delivery path lengths although the delivery points are unequally spaced from the reservoir or gallery. In such case the arrangement of FIG. 179 can be considered, wherein 3205 are fuel delivery points, 3206 equal length passages, 3207 a gallery all arranged within a tube 3208. The modular working or combustion chamber layouts of FIGS. 163 through 174 have been designed to be used for engines wherein component assembly 3004 only reciprocates, or it both reciprocates and rotates. According to which, the function of the components such as 3166 to 3169, 3204 attached to the structural elements (such as fasteners, tubes) may vary, either being linked to guide systems or some kind of crankshaft. The combustion chambers are assumed to be of regular toroidal configuration, but the concepts and sections could be applied equally to sinusoidal toroidal combustion chambers, should compound motion of 3004 be desired. Equally, the roles of components 3004 and 3007 could be reversed, in that 3004 is fixed and 3007 reciprocates or reciprocates and rotates relative to 3004. In all appropriate circumstances, component 3007 may be mounted to rotate in any housing or casing. All the components shown in FIGS. 170 through 174 can be constructed of any suitable material. Generally it will be preferred that the combustion chamber components 3155, 3156, 3189, 3190 be of ceramic material, while the fastening or structural components 3164, 3165, 3192, 3198 be of metallic material. Components 3180 (inlet port ring) and 3187 (transfer port ring) could be suitably constructed of ceramic or metal (as well as other material). Other spacer components to be of any suitable material. For the sake of simplification, the components have been shown abutting each other. In fact, any kind of suitable inter-layers or materials could be used, including gaskets, ceramic wool, etc. Because the scale would be too small, inter-layers are generally not illustrated in FIGS. 170 to 174, but a double gasket **3155*a* is shown by way of example between the upper pair of components 3155 in FIG. 170**. In a selected embodiment, components are coated with a powder, say by electrostatic deposition, prior to assembly, which remains as a very thin spacer between components after final assembly. The composition of the powder may be such as to cause it to slowly bond to one or another of the components with increased engine use, and exposure to heat and cooling. Alternatively, after assembly and prior to use, the entire IC engine, compressor or pump can be heat soaked for a period to allow the powder to bind to adjacent surfaces.

So far in this disclosure, exhaust gas processing volumes of various forms have been shown inside an engine or engine casing. Included are the cylindrical volumes B in FIG. 163 and volume C in FIG. 166—basic form summarized in FIG. 180, the tubular volumes B in FIGS. 164 and 166 as well as volumes 1008 in FIG. 20 and 1290 in FIG. 21—basic form summarized in FIG. 181, and the semi-rectangular volumes similar to 1310 in FIG. 97—basic form summarized in FIG. 182. These semi-rectangular forms are usually associated with an engine with a rectangular casing or housing, which defines part of the exhaust processing volume. In some applications, the exhaust gas processing volumes, also known as reactors, can be outside the engine or engine casing, in much the same manner as exhaust manifolds are presently attached to engine blocks or cylinder heads. In the disclosure of exhaust gas treatments that follows, many examples illustrated will show externally applied reactors, but the features and principles disclosed may also be applied to reactors or volumes within an engine.

It is well known that the art of cleaning exhaust gases (as opposed to the art of minimizing the formation of pollutants at the point of combustion) is centered around the technique of speeding up chemical reactions normally tending to continue in the exhaust gases at a slow rate, and that this speeding of chemical reaction is achieved by some combination of two basic means, namely the provision of catalytic agents and the encouragement of reactions under conditions of heat and/or pressure. An internal combustion engine generates great heat which is substantially contained in the exhaust gases leaving the combustion chamber. The best way to use this heat to clean the exhaust gases is to either place the exhaust gas treatment volumes or reactors in the engine or as close to it as possible. Generally, the hotter the operating temperature of engine exhaust gas processing and cleansing volumes, the quicker the desired chemical reaction will take place. In the case of such volumes being outside the engine itself, the closer to the exhaust port they are, the hotter they will be. The larger the volume, the longer the gases will reside in it, the more completely the desired chemical reactions will take place. In many engine designs, the volume closest to the port is the exhaust manifold, which in the invention is adapted to work as an exhaust emissions reactor. Such adaption may include enlarging its volume and/or incorporating special materials, products or devices within the manifold expressly to hasten chemical reactions. The manifold may be adapted by enlarging the volume and perhaps changing the cross-sectional form of the typical common tube, and retaining the stub manifolds attached to it and which bolt onto the typical engine block. To ensure compliance with today's strict exhaust emission control laws, the exit to the reactor is optionally wholly or partly closed during at least a portion of the cold start period. In the disclosure of exhaust gas treatments that follows, many of the examples and features illustrated will be relevant to externally applied reactors, but the features and principles disclosed may also be applied to reactors or exhaust handling volumes within an engine. The exhaust processing volumes or reactors of the invention are shown in this disclosure by way of example in a variety of configurations, assembled and mounted in different manners. These volumes or reactors may have any appropriate configuration, method of assembly and method of mounting, including those not shown or described in this disclosure.

Today, much space around an IC engine exhaust manifold and between it and the engine block remains unused. To obtain the maximum reaction volume within a given space for an engine assembly, and to make the reaction volume as hot as possible, an exhaust emissions reactor may be mounted hard up against the engine, with the exhaust ports discharging directly into the reaction volume. An embodiment is shown by way of example in FIGS. 183 to 185, where the reactor assembly comprises an outer casing 10 made of any convenient material including metal, an inner chamber 11 of solid ceramic material optionally having significant thermal insulation properties which substantially conforms in shape to the inner surface of the outer casing 10, and a layer of to a degree compressible material 12 interposed between the inner chamber 11 and outer casing 10. The compressible and/or fibrous material optionally has thermal insulation properties. In an alternative embodiment, optionally where the material for the inner ceramic chamber has been selected for structural strength and is not an especially good insulator, the compressible or fibrous material has substantial thermally insulating effect. The periphery of both the outer casing 10 and layer of fibrous material 12 are provided, respectively, with flanges 13 and 14, having a plurality of aligned apertures through which bolts 15 pass to mount the reactor assembly on an engine 16 so that all the exhaust openings 17 of the engine communicate with the interior of the inner ceramic chamber 11. Filamentary material such as nickel chrome alloy is accommodated in the inner chamber 11 in two forms, first randomly disposed wire 18, and second a spiral coil 19 of thicker wire mounted adjacent each exhaust opening 17, in order to reduce the velocity of the exhaust gases beyond the opening. The interlayer 12 is compressible partly to compensate for differing coefficients of thermal expansion of the casing 10 and the chamber 11. The compressible material 12 may be of any form including foamed of fibrous, and be of any type, including ceramics or plastics and, in a selected embodiment, comprises ceramic mat or fibre. In operation, due to the positioning of the reactor in relation to the engine and the insulation of the reactor's inner surface, the contents of the chamber, ie gases and filamentary material, are maintained at a high temperature, so that the exhaust gases discharged from the engine cylinders continue to react as quickly as possible after entering the ceramic chamber. In addition, the filamentary material 18 acts as a filter to trap any solid particles in the exhaust gas, where they can slowly decompose over time, and induces localized turbulence which pushes the maximum quantity of gas into contact with the hot surfaces of the filamentary material in the shortest possible time. In another embodiment, if the ceramic material selected for the chamber 11 has only modest thermal insulating properties, then the compressible interlayer has significant thermal insulating properties. It can made thicker than shown in the schematic FIGS. 184 and 185. In a further embodiment, there is no material interlayer 12; instead the ceramic chamber 11 is placed in the casing, either in direct contact with it, or separated from it by a volume of air and optionally by spacers. The spacers may comprise separate components, or they may comprise projections on either casing or chamber. FIG. 187 shows by way of example a volume of air 12*a* between casing 10 and chamber 11, which has spacer projections 12*b* at intervals. In a selected embodiment, in order to ensure rapid warm-up of the filamentary material 18 and 19 during cold starting, a valve member 20 is pivotally mounted on a spindle 21 adjacent the discharge end of the reactor assembly. The metal casing 10 and layer of compressible material 12 are provided, respectively, with flanges 22 and 23 which, as shown in FIG. 185, are connected by bolts 24 and retaining nuts 25 to the flange 26 of an exhaust pipe 27 forming part of the exhaust system, say of a vehicle. Under cold starting conditions, the valve 20 is closed either manually or automatically, generally a few cycles after firing commences, by linkage 28, so that the newly fired exhaust gases are retained in the chamber 11 to ensure a rapid temperature rise therein, until a predetermined pressure is reached, whereupon the valve member 20 is opened, at least partially. Conveniently, this may be effected by having the valve 20 biased to a closed position by a torsion spring (not shown), operative only during the cold start procedure, and mounted on a spindle 21 which is placed so that the increased pressure in the reactor assembly applies a turning moment to the valve member 20, which commences to open when the moment exceeds the closing force exerted by the spring. A pressure relief valve 40 and passage 41, shown diagrammatically in FIG. 183, may be provided in the chamber anterior to the valve member 20. The valve at the discharge end of the reactor retains the hot exhaust gases in the chamber with a consequent rapid rise in the temperature of the filamentary material, which in turn assists in the continued reaction of the trapped gases. A similar, although less intensive, effect is achieved by the partial closure of the valve member, which by the build up of pressure delays the normal passage of the exhaust gases, which thereby remain longer in contact with the filamentary material and heated surfaces and react more completely. Alternatively, any convenient means may be used to restrict cold start during initial engine and reactor warm up. In alternative embodiments, the reactor housing is of monolithic ceramic material, and/or part of the filamentary material is mounted in the exhaust port, as shown by way example in FIG. 186. Here, one end of the spiral coil 29 which has a thickened externally threaded base is screwed directly into the exhaust processing volume opening(s) at the exhaust port 17. The reactor housing shown partly in section at 42 is held in position by "L" clamps 43 and bolts 15. In the modified arrangement shown in FIG. 187, if it is necessary to reduce heat transfer from the outgoing exhaust gases to the surrounding engine 16, each opening 17 is provided with a sleeve 30 of ceramic material which has a layer of compressible and/or fibrous material 31 interposed between its outer surface and engine 16. A skin 32 of metal or other material, optionally having catalytic effect, is shown placed within the insulation of the reactor in order to assist in the reaction process. In FIG. 187 it is shown diagrammatically, but in a selected embodiment, this skin of metal or other material is of no significant thickness and constitutes a film which has been applied by a deposition process, or a leaf (say of similar configuration to gold leaf) applied by pressure and/or adhesive. The film may further be applied to a say ceramic structure by means of depositing the material in powder form on the surface of a mold during the process of manufacturing such ceramic structure. Where this process entails forming under heat and/or pressure, the foreign material will be bonded to the ceramic to substantially form a film. Skin 32 may be continuous, or may be discontinuous and applied only in selected portions of the reactor. The reactor may be constructed as already described, ie either from solid ceramic or a multiple layered construction comprising an internal skin of ceramic, an interlayer of compressible material such as fibrous ceramic wool, and an external structural casing of metal or of any other appropriate material. Alternatively, any other suitable may be used for any portion of the reactor assembly. The housing may be of composite construction, eg with one layer manufactured inside or outside of another already manufactured layer. In this way, a layer of high temperature resin, having very good insulation qualities but not very resistant to abrasion or corrosion, may be formed outside of a ceramic shell which, because of its hardness and greater temperature tolerance, will be less resistant to attack by the exhaust gases, as more fully described subsequently.

In operation, the device described above will act as a thermal/catalytic exhaust gas reactor, that is to say, it is capable of achieving its objective of hastening the process of reaction by the provision of both a high temperature environment and a catalytic action in the same reactor assembly. For reasons which will be more fully explained later, it is the temperature aspect which is in general more important, ie more effective, and the catalytic action can be said to be, in some applications, an assistance to the temperature-oriented process. It is possible, with basically very clean engines, to envisage depolluting the exhaust gases to the highest standards with negligible or coincident catalytic action. By coincidental is meant that materials having some catalytic effect may be present in contact with the gases for reasons unconnected with catalytic action, that is, they may be the most suitable materials to meet certain design parameters, such as high temperature resistance, etc. In a selected embodiment, catalysts are positioned within the reactor assembly to assist in the removal or transformation of the undesirable constituents in the exhaust gases. The embodiment of FIG. 187 relating to metal or other films described above shows how a catalyst may be associated with the internal surface of the reactor, but to be properly effective the catalyst should be present throughout the chamber, so that all the gases may be exposed to catalytic action. Catalysts may be incorporated in or with the filamentary material disposed within the chamber. By catalyst is often meant materials with very strong catalytic action such as noble metals like platinum, palladium, etc. However, in this disclosure catalyst is meant to be any material having a significant, measurable catalytic effect and thereby is certainly included materials having only moderate catalytic effect, such as nickel, chrome, nickel/chrome alloys, certain ceramics such as alumina, etc. Nickel/chrome alloy is an especially suitable material, since it is not too expensive and is relatively resistant to corrosion, abrasion and high temperatures, having a moderate to good catalytic rating. However, at high ambient temperature, nickel/chrome tends to form surface films of nickel chrome oxide, which has a catalytic rating considerably better than that of its base. The conventional approach to the provision of catalytic action within exhaust reactor systems involves the placing of strong catalysts such as noble metals in small quantities on a supportive material, such as a ceramic substrate. In a similar manner, the filamentary material may have deposited on it small quantities of another material having catalytic properties. Alternatively, the filamentary material may be constructed of a material which itself has a moderate to good catalytic effect, such as nickel/chrome alloy, or alumina. The filamentary material may consist of high temperature metal alloy, such as stainless steel, Iconel, or ceramic material, or polymers, hydrocarbons, resins, silicons, etc. By the term “filamentary material” is meant portions of interconnected material which allow the passage of the gases therethrough and induce turbulence and mixing by changing the directions of travel of portions of the gas relative to each other. Such material conveniently takes the form of random or regularly disposed fibers, strands or wires, but may also take the form of multi-apertured sheet or slab, cast, pressed or stamped three dimensional members having extended surfaces.

The invention will constitute a very effective thermal reactor. High working temperatures will be attained because of the reactor’s close proximity to the exhaust openings, which discharge directly into the reaction volume, and its shape which entails a small external surface in relation to volume, so keeping heat loss to a minimum. The shape of the housing, which in the embodiment of FIGS. 183 to 185, can broadly be described as a form of inverted megaphone, and the presence of filamentary material (perhaps of a wool-like configuration) internally, it will act to a significant degree as a muffler. It is known that a muffling effect involves dissipation of sound waves, whose energy is converted to heat, which remains residual in the muffling agent. In this manner, a significant additional build up of heat will occur in the filamentary material and on the walls of the chamber, due to the dissipation of sound waves and also of physical vibration. The main chemical processes involve oxidation in part of the reactions, and these overall exothermic reactions generally produce further considerable heat. It is estimated that because of a combination of all or some of the above factors, ambient temperatures in the reactor of the invention can be higher than at the exhaust port. In today’s engines, temperatures drop during idle or low-load conditions, and here the invention will be at an advantage over some other systems, in that a relatively thick ceramic shell can act as a heat sink (as do ceramic linings in many industrial processes) and cause some heat to be radiated inward if the exhaust temperature drops below that of the inside of the housing. This radiation will be directed to maximum advantage in housings having rounded or radial cross-sectional form. The insulation, the close proximity to exhaust ports, gives the present reactors much higher operating temperatures that are general in today’s emissions systems. Because catalytic effect tends to increase markedly with rise in temperature, the present reactors will either require less catalysts for a given degree of exhaust cleansing, reducing system cost, or the same amount of catalysts will provide greater cleansing. Most of the benefits described herein, especially those relating to temperature, will be greater if the reactor is all or part of an exhaust processing volume contained within an engine. The beneficial effects of the high ambient temperature are most efficiently exploited in the present invention principally through the provision of filamentary material, which exposes the exhaust gas to a multiplicity of hot surfaces. It is known that for some reason, apparently still not fully understood by thermodynamicists, chemical action more readily takes place in the presence of a heated surface. This phenomenon is distinct from catalytic action, which relates to the nature of materials. Therefore the provision of multiple, closely spaced heated surfaces in the form of filamentary material ensures that every portion of the continuously reacting exhaust gases is in close proximity to a heated surface. Further, the exhaust gases are immediately exposed to such surfaces on leaving the port, when they are at their hottest and most ready to react. The filamentary material has the additional advantage of inducing minor turbulence, causing the various portions of the gases to mix properly with each other, thus helping the reaction process and also causing some heat to be generated by the kinetic energy of gas movement. This turbulence is important for another reason, in that it allows the composition of the gases more readily to "average out." During the process of combustion, different products are formed in the various portions of the cylinder, due to differences in temperature, the variable nature of flame spread, locality of fuel entry and of any spark plug, presence of fuel or carbon on the cylinder walls, etc. Usually these differing products of combustion are mixed to some degree in their passage through the port, but nevertheless pockets of a particular "non-average" gas may persist, and these will not have the proper composition to interact in the desired way. This can occasionally present difficulties, for instance in the long unconnected capillary passages of the honeycomb structures often currently used in catalytic converters, especially if these are mounted too far from the exhaust ports. The nature of the filamentary material of the invention ensures that this proper "averaging out" or intermixing of gas composition takes place. The filamentary material, together with the high ambient temperatures, will ensure that the invention will be exceptionally tolerant of particulate matter and impurities or trace materials. The filamentary material, especially if at least partly of fibrous or wool-like configuration, will to a great extent act as a trap for particulate matter, without the lodging of such matter in the reactor significantly affecting the latter's performance. Certain other systems, such as catalytic honeycomb structures are sensitive to particulate clogging, damage by impurities originating in the fuel or by operator misuse. The vast majority of any particulate matter lodged in the present reactor system, with its exceptionally high ambient temperatures, would decompose, oxidize or otherwise react, especially if deposited on surfaces having catalytic characteristics. Both in its thermal and catalytic operating modes—which in practice merge to form a homogenous encouragement for matter to combine—the reactor is intended to function in the tri-component or three constituent mode, that is the principal pollutants are all reduced during their passage through the single device. A broad description of the chemical processes can be found in my U.S. Pat. No. 5,031,401.

The first attempts to solve the emission problems used a thermal approach, because of its many inherent advantages. Work was gradually abandoned because of the great difficulties of the cold-start situation. To be effective the reactors had to be hot; warm up took a considerable time, during which an unacceptable level of pollutants were emitted. It was to overcome this traditional problem that the cold-start procedure of this disclosure was evolved. A reactor inevitably has a considerable mass, so efforts were made by the applicant to devise a system whereby at least the effective working parts of the reactor attained the desired temperature, rather than the whole assembly, including parts not affected in the reaction process. The surfaces of the present invention are its effective working parts, and almost wholly comprise the internal lining of the reactor assembly, which includes thermal insulating material, and the internally disposed filamentary matter. The insulating material, such as ceramic, may have a low conductivity and therefore will not significantly transmit heat from the interior of the chamber, nor will it need much heat input to heat the surface molecules to the internal ambient temperature. It is for this important reason that the invention has its reaction volume directly enclosed by insulating material. The interior filamentary material essentially has low mass and extended surface area, unlike the heavier baffles or internal chambers of some other reactors. It is in order to use heat already available from the process of combustion, rather than purposely provided from another source for initial cold start, that the gas exit from the chamber is at least in part closed after firing commences. Calculations have shown that, provided all the newly fired gases can be retained by the chamber, its working surfaces will attain temperatures of roughly 700 C within between about five and fifty cycles after firing commences, depending on engine type, degree of conductivity of the filamentary material, whether exhaust port insulation is fitted, etc. It has been assumed that the total reaction volume is approximately double the engine capacity and that roughly 500 grams of filamentary material are employed for every two liters engine capacity. At idling speeds of 1 200 rpm, a four-stroke engine would have, according to the above, a warm up period between half a second and five seconds. A contributing factor to the temperature rise is the fact that the gases are maintained under pressure, this pressure soon contributing some load to the pistons, and thereby enabling the engine and especially the combustion volumes to warm up more rapidly. In a selected embodiment, the reactor gas exit is closed in cold start by mechanical or automatic means after firing has commenced and just prior to the newly fired exhaust gases reaching the closure means, which in the case of four-stroke engines will be somewhere between two and five cycles after firing commences, depending on reactor volume, etc. This allows the residual gases to be expelled, and ensures that all the thermal energy produced by the combustion process and contained in the exhaust gases at the ports is entirely used to heat the working surfaces of the invention, and accounts for its rapid warm up. The newly fired trapped gases are reacting in the desired fashion, but more slowly than they would at normal working temperatures. The fact that they remain much longer in contact with reactor surfaces than they do under normal running high temperature situations compensates for their slow reaction rate and ensures that the first gases are largely pollutant free when they leave the reactor, an important advantage when having to comply with cold-start emissions regulations. The present invention has the unique advantage of producing zero emissions, in fact no exhaust gas whatever, during cold start. The minimum number of cycles (ie firings) needed to reach reactor operating temperature, and the maximum number of cycles which may elapse before the exit need be closed, are sufficiently near overlap to ensure that the newly fired exhaust gases can be totally contained (ie the closure member be totally closed) for at least a substantial, very possibly the whole part of the cold start procedure, depending on such parameters as engine and reactor construction, volume relationships, etc. In a selected embodiment, the closure member remains wholly closed until a pressure is reached inside the reactor, which is just below that which would cause the engine, which is pumping against reactor pressure, to stall on idling. In use, it is preferred that an engine be not usable during the few seconds of the cold start procedure, since pressure below optimum for warm-up procedure must be adopted if allowance is to be made for possible engine engagement. The reactor pressure limit may be increased by the provision of either manual or automatic special engine setting, such as altered ignition or valve timing, special fuel mixtures, alteration of compression ratio, etc., during the cold start procedure. Once the maximum allowable pressure in the reactor has been reached, the gas exit closure member may either (a) wholly open to release pressure and bring the system to normal running, (b) part open to maintain the pressure, allowing gases to leave the reactor at approximately the same rate as on entry, (c) remain closed while a second closure member wholly or partly opens to relieve or maintain pressure and conduct exhaust gases through a passage other than the normal exhaust system. This alternative is discussed more fully later. Alternative (b) allows the cold start procedure effectively to continue, since the maintenance of reactor volume pressure ensures that the gases spend longer in their passage through the chamber than under normal running conditions, this lengthening of passage time enabling the gases better to transfer heat to the colder reactor surfaces, and to remain in a reacting environment for a more extended period to compensate for colder temperatures, so enabling the anti-pollution reactions substantially to take place. In a similar manner, alternative (c) also allows the cold start procedure to be maintained. In the selected embodiment, the first closure member is fully opened when the desired operational temperature is reached. The resultant pressure drop as normal gas flow rates commence will normally cause an initial surge in engine idling revolutions, giving the operator an audible indication that the engine is ready for work. In vehicles, a temperature-activated switch may be incorporated making the vehicle only driveable after the reaction volume has warmed up and the reactor valve has opened.

Figure 188:
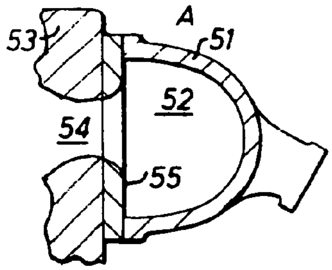
Figure 189:
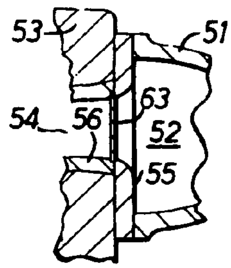
Figure 190:
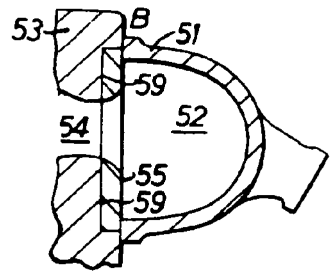
Figure 191:
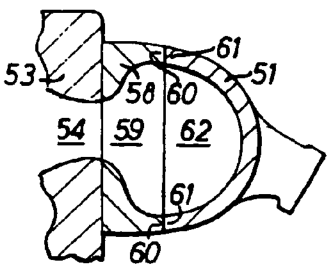

The arrangement of the reactor assembly in the manner described affects an art not strictly the subject of the present invention, namely that of exhaust gas flow. This art has for long been associated almost exclusively with the movement of columns or pistons of gas, and in particular with the kinetic energy and pulsing effects which are built up in the regular dimensioned columns of gas. Most of the embodiments disclosed here dispense entirely with regular tubular configurations in the exhaust system's initial and most important section, with the result that the exhaust gases will flow in a manner previously little explored. Initial research has indicated that the gas flows of the invention present possible benefits. Firstly, the relatively great increase in cross-sectional area of the reaction volume over the total cross-sectional area of the exhaust openings ensures a considerable decrease in the velocity of the gases. The reduced velocity will greatly lengthen the durability of at least parts of the reactor assembly, since much wear is caused by the abrasive effect of the fast moving gases and their particulate content. Secondly, the gases from each cylinder or opening meet and merge in the reactor volume, eliminating exhaust pipe branching. Branching is one of the problem areas of conventional exhaust flow art, since it is here that considerable power losses often occur. It is possible by careful design of branches to eliminate much power loss, but usually only within an optimum flow range. When engine speed varies above or below this, power losses increase. Thirdly, the reaction volume will, to a valuable degree, absorb vibration and, as has been mentioned earlier, also sound. Conventional exhaust pipes, with their regular, tubular configuration and metallic construction, may transmit and be the cause of, usually thorough magnification, of much vibration and noise in their own right. The vibrations originating with engine combustion and carried by the exhaust gases will tend to become dissipated by the large volume of gas and filamentary material in the reactor. Although it is useful to place the reactor over a conventional exhaust port opening having a cylindrical shape, it is felt that the sudden transformation of the gas from a columnar configuration to the amorphous flows of the reactor volume, plus the sharp edge of the junction between opening and engine face, will together contribute to an unnecessarily inefficient gas flow and consequent power loss. For this reason, in a selected embodiment the neck of the exhaust opening bells out, that is progressively increases its diameter or cross-section in some manner, and has been so shown in the sections of FIGS. 185 and 187. This has the beneficial effect of decelerating the rate of gas flow progressively. A basic embodiment involves the placing of an open-sided chamber against the engine block or casing, so eliminating the conventional exhaust manifold. The block therewith forms part of the reactor housing, and as such may play as important a role in the reduction of pollutants as the portions of the reactor assembly so far described, namely the applied housing and the filamentary material. It has been shown how the housing fits directly onto the engine, whether or not this has other features, such as port liners or filamentary spirals. In alternative embodiments, an inter-member may be applied between engine and reactor housing proper, this inter-member either wholly or partly completing the definition of reactor volume. Where a section ceases to be an inter-member and becomes an appendage to the engine is not strictly definable, but in general an inter-member is considered making contact with the periphery of the housing. The various features described, whether in relation to inter-members or attachments to the engine, are intended to be applicable to both, and also where suitable to the periphery of the housing. Examples are illustrated schematically in FIGS. 188 through 196. FIG. 188 shows an integral chamber or housing 51 enclosing a reaction volume 52, both having interposed between them and engine 53 with exhaust opening 54, an inter-member 55 of substantially flat configuration. FIG. 189 shows a similar arrangement, but with the inter-member 55 in association on one side with both engine 53 and an exhaust opening liner 56, which in the embodiment illustrated is restrained in position by the inter-member 55. FIG. 190 shows a similar arrangement to that of FIG. 188, but with the substantially flat inter-member 55 recessed into a corresponding depression 59 in the engine 53, being restrained against the block in the embodiment shown by the enclosed housing 51. In FIG. 191 is shown an arrangement similar to that of FIG. 188, but where the inter-member 58 is of enclosing configuration, that is when viewed in elevation from the reaction volume side it is seen to have a depression 59 defined by a peripheral lip 60, the outline of which corresponds with that of the lip 61 of the enclosed housing 51. A notional plane drawn across the lips will define two sections of the working volume of the reactor, one within the housing at 62, the other within the depression 59, of the inter-member. FIG. 192 shows a broadly similar arrangement, but where the mounting between housing and inter-member is used to support filamentary material 63, which is also shown at 63 in FIG. 189. FIG. 193 shows an arrangement similar to that of FIG. 191, but where the enclosing inter-member 64 has at least one integral projection 65 on its engine side to fit into a corresponding depression in the engine block, in this embodiment of approximately ring or hollow cone like configuration, to act as exhaust opening lining. FIG. 194 illustrates the fixing detail at (A) in FIG. 188, where an L clamp 66 and bolt 67 press the housing 51 to inter-member 55 and thence to engine 53. Optional compressible heat resistant material 68 is interposed between the joints to allow for proper sealing, possible differential expansion of the various components, and more even load distribution between possibly marginally mismatched surfaces. FIG. 195 is a detail at (B) of FIG. 156 showing a similar fixing technique, and an alternative embodiment where the inter-member 55 retains in position an exhaust opening liner 56. FIG. 196 shows a fixing detail suitable for use at (C) in FIG. 192, but retaining a different type of inter-member 69, one which does not substantially mask the engine, but which is part of an effective division of the enclosing housing, the advantages of which are explained below. Here the two portions are shown separately fixed to the block, although in some embodiments only the outer housing need be fixed, depending on detail design. For example, the housing 51 is retained against the inter-member 69, by means of strapping band 70 pivotally attached to winged extensions 71 of a collar 72 mounted on un-threaded portion 73 of a stepped diameter stud 74, by means of nut 75 and washer 76 shown dotted. The inter-member 69 is fixed to the engine 53 by means of the same stud 74, an L clamp 66 and a washer 77 and nut 78 of larger internal diameter than the set 75, 76. Optional compressible heat resistant sealing material 68 is disposed within the joints between mating surfaces. The provision of an inter-member may have at least three principal advantages. Most importantly, it offers an opportunity to prevent heat transfer between the reaction volume to the engine, since the inter-member can be made of insulating materials such as ceramic, similar to those of the main housing. Secondly, the additional and more conveniently disposed joints between various pieces may be used also to act as supports for additional matter, such as the filamentary material 63 between inter-member and housing in FIG. 192 and between inter-member 55 and liner 56 in FIG. 189. Thirdly, the inter-member offers the opportunity of splitting a reaction volume housing whose internal (or external) surface describes a curve of more than 180 degrees in cross-section, so that the portions may be manufactured on a male (or female) mold, a possibly cheap and structurally desirable way of producing the housings. It can be seen, for example that the reactor assembly of FIG. 192 might not be manufactured by molding if it were of integral construction in cross-section. Although in each case only one inter-member has been illustrated, a plurality of inter-members may be used in association with one enclosing housing, or multiple inter-members may be combined to form such a housing.

In a selected embodiment, depressions formed in the engine block become part of the exhaust reaction volume. FIGS. 197 and 198 show schematically by way of examples sectional plan views of reactor housings 79 mounted over the exhaust openings 54 of an engine 53, where depressions 80 have been formed in volume usually occupied by the engine assembly, the space gained by the depression becoming an integral part of the reaction volume 52. In FIG. 197 there is a continuous depression, and in FIG. 198 a series of depressions 80 have been formed about provisions for other features at 81, such features possibly including liquid cooling passages. Apart from the two above examples, space normally occupied by engine may be given over to the reaction volume in any configuration. It is generally desirable to have reaction volumes as large as possible for purposes of exhaust emission treatment, the limiting factors often being lack of under-hood space in vehicles and the cost of providing greater and stronger reactor housings. In the case of the present invention, reaction volumes may be increased without any sacrifice of under-hood space or increase of housing size and cost, by the procedure of "hollowing" into the engine. The degree to which this will be possible will depend on such factors as whether an engine is especially designed to accommodate the invention or not. Hollowing into the engine is also a means to allow more progressively shaped reaction volumes and more efficient and smooth gas flows to be achieved. In a further embodiment, the axes of any exhaust ports are not parallel and are individually angled to provide optimum direction of gas flow into the reaction volume. FIG. 199 shows by way of example a schematic sectional plan view of a reactor housing 79 mounted on an engine 53, having exhaust openings 54 whose axes 82 are not parallel to one another and/or not perpendicular to the engine face, while FIG. 200 shows a similar arrangement in vertical cross-section. It is important that the exhaust gases distribute themselves as evenly as possible within the chamber so that the factor of time, multiplied by the area of surface exposed is as equal as possible for the gases from differing openings, and that such wear and/or loading caused by abrasion, corrosion and gas velocity is as evenly distributed within the reactor as possible. This optimum equaling out effect may be achieved, among other means, by angling the flow from each opening in the most suitable directions, which will often involve exhaust opening or port axis layouts along the lines of the examples described by FIGS. 199 and 200. In a selected embodiment, the end opening axes are furthest angled from the perpendicular to engine axis in plan view and the central opening axes furthest from the perpendicular in vertical cross-sectional view, which will enable the gases to more readily travel the same distance to the reactor gas exit. Below is mentioned an alternative or complimentary means of better distributing gas flow.

Figure 201:
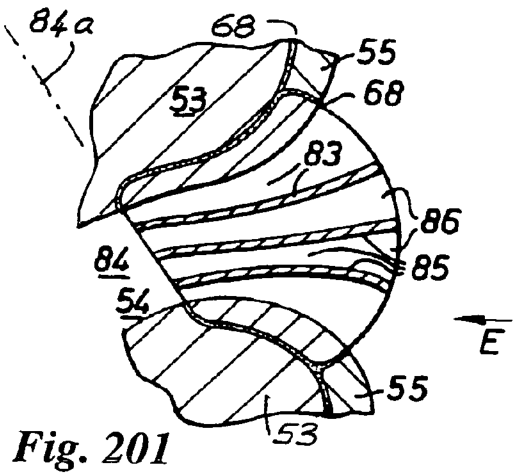
Figure 202:
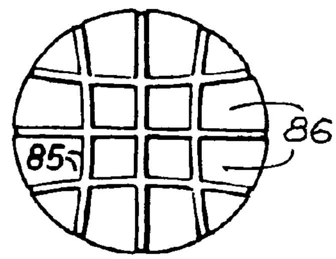
Figure 204:
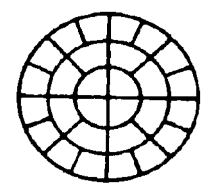
Figure 205:
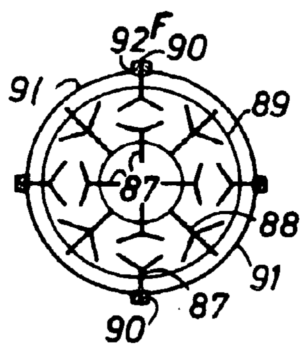
Figure 206:
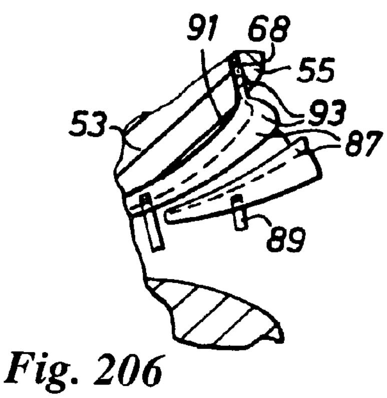
Figure 207:
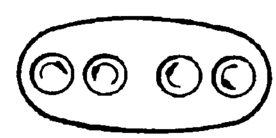
Figure 208:
Figure 209:
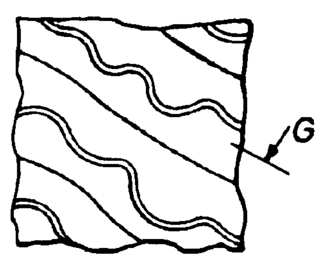
Figure 210:
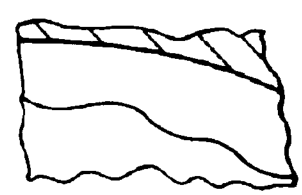

It has been seen in some of the embodiments described above, that filamentary material may be introduced in the exhaust opening area, both to assist in the process of reaction and/or to properly direct the flow of exhaust gases. The control of gas flow may be achieved by providing members of substantially vaned, honeycombed or flanged configuration within the opening, such members being manufactured of any suitable material such as metal or ceramic. In selected embodiment, any of the filamentary material or members in the reaction volume is made of material having catalytic effect, such as nickel/chrome alloy or alumina, if the gas flow directors are desired to significantly assist in the reaction process. The particular embodiments of filamentary material suitable for exhaust opening areas, with their relatively restricted cross-sectional areas and high gas flow rates (compared to those of the reaction chamber itself), are those where the material does not have significantly great cross-sectional area, which would cause obstruction to the gas flow past the material. However, any configuration of filamentary material may be employed in the opening area, including the various embodiments described subsequently, especially if it is intended to utilize the material to assist in the reaction process. By way of example, there is shown in FIG. 201 in cross-sectional view and in FIG. 202, which is a front elevational view as seen from E, an exhaust opening liner combined with honeycomb configuration gas flow director 83 held in position against engine 53 by inter-member 55. There is a heat resistant compressible material 68 between the joints. Inside the opening 54, the greater mass of gas will be concentrated toward the outside of the curve at 84, and therefore the honeycomb structure has at the end facing the gases a diagonal face 84*a* across the opening as shown, so that whatever frontal area the honeycomb vanes 85 have will cause the gases by deflection to pass through the structure more evenly distributed. With progression of gas flow the vanes become more mutually further spaced, so reducing gas velocity, and curve away from each other, so that the mouths 86 of the structure will direct the gases in a multiplicity of directions. The honeycomb structure may be of any suitable cross-sectional configuration, including by way of example, that of FIG. 203, where the passages have six faces, or that of FIG. 204, where the passages are formed by the intersection of radial and coaxial membranes. In an alternative embodiment, gas flow is directed by flanged members running part of the length of the exhaust opening, as shown by way of example in an embodiment illustrated in sectional plan view FIG. 205 and in partial cross-section in FIG. 206. The flanged members are alternatively "Y" shaped configuration at 87 and of roughly cruciform configuration at 88, and are spaced and held from each other by spacer rings 89 disposed at intervals along the length of the assembly. The flanged assembly of the illustrated embodiment is retained by fitment into grooves 90 in the opening surround 91, such grooves optionally containing a compressible bed 92 at F in FIG. 205 and are held against 53 by inter-member 55 sandwiching the bent extension of flanges as at 93 through compressible material 68. It may be desired to impart a rotating motion or swirl to the exhaust gases during their passage through the openings, so as to assist in the proper mixing of gases within the reactor volume. To this end, successive openings may have alternating directions of swirl, as indicated diagrammatically in FIG. 207. The swirl may be imparted by vaned members disposed diagonally across the axis of gas flow. The vanes may be placed anywhere within the opening area but in a selected embodiment illustrated diagrammatically in FIG. 208, the vanes 94 project from and are integral with the exhaust opening wall or lining 95. If it is desired to introduce some turbulence as well as swirl to the gases, the individual vanes may be of wave-like configuration, as shown by way of example elevationally in FIG. 209, and in FIG. 210 in a sectional plan view through G of FIG. 209. All the features described herein may be combined in any convenient or desired way. By way of example, FIG. 211 shows a selected embodiment in cross-section. The reaction volume is enclosed by an inter-member 55 of ceramic material having projections comprising exhaust opening liners 56 and spaced from engine by compressible heat resistant material 68 such as ceramic wool, together with an enclosing housing 51 of integral ceramic construction. The joint between the two principal enclosing members supports a filamentary space frame 96 that is a construction of short straight metal rods connected to each other at different angles, which substantially fills the foremost part of the reaction volume, the rearmost portion of which is occupied by filamentary material 18 of wool-like configuration, of say a ceramic based compound. Within the exhaust port area are two metal cone shaped spirals 97 mounted back to back with projecting bayonet fixings shown dotted at 98, which locate in grooves 99 running from initial entry away from the direction of the exhaust valve, so that the pressure of gas flow will cause the spring projections or bayonets to seat at the end of the grooves.

Filamentary material where disposed in a housing or container of some kind is defined as portions of interconnected or abutting or closely spaced material which allow the passage of fluid therethrough and induce turbulence and mixing by changing the directions of travel of portions of fluid relative to each other. By interconnected or abutting or closely spaced is meant not only integral or continuous, but also intermittent, intermeshing or inter-fitting, while not necessarily touching. The above definition is applied both to material within a housing or container as a whole, and also to the individual portions of that material in any fluid processing volume, or portions of such volume. In this disclosure filamentary material is mostly described positioned in an exhaust gas processing volume, such as a reactor, but the filamentary material of the invention may be disposed in any volume containing any fluid, and may serve to assist mixing of the components of any fluid, or to hasten chemical or other reactions in any fluid. It is envisaged that in its most effective form the filamentary material in one exhaust gas reactor will consist of sections of varying composition. The three main classes of filamentary material may be said to comprise slab or sheet material, wire, and wool, listed in order of progressively less resistance to abrasion and shock, provided of the same material. Therefore it is logical to place the more robust forms nearer the exhaust openings, with the more fragile embodiments toward the rear of the reactor. If catalytic effect is desired, then the most suitable materials may be best incorporated in a particular form, this form being such that it is most suited to be placed in a particular portion of the reactor. It is possible that more than one catalyst is desired and these may be incorporated in positions most suitable to their differing forms. The main chemical reactions tend to take place in a certain sequence and, if special catalytic assistance is desired for a particular reaction, that catalyst in combination with the most suited form of filamentary material may be placed in that area of the chamber where the reaction is most likely to occur. For example, if the reaction in question is expected to be the last to take place, then the appropriate catalyst/filamentary matter will be disposed in the rear half of the reactor, furthest from the exhaust openings. The definition of filamentary material is meant to apply to that within the reactor as a whole, and also to each of the possibly many varied components that may make up one reactor assembly. The various embodiments of filamentary material described may be combined in any convenient manner within a single reactor assembly. By way of example, an embodiment is shown cross-sectionally in FIG. 212 and in part sectional plan view in FIG. 213 wherein alternate slabs of honeycomb structure 101 and wool-like layers 102 make up at least the rear portion of a reactor 100. The path of a certain pocket of gas through the system is indicated in each view by the arrows 103. It will be noted that the honeycomb is not of conventional form, since it consists of passages with each stack or row of passages running in a different direction from the adjacent row. In the first honeycomb slab 104, the passages shown in section 106 run "downwards" while the passage immediately behind, shown dotted at 107, are running "upwards," with the separation of direction and therefore of gas flow taking place substantially in the vertical plane. The next honeycomb slab, 105 is of the same construction but placed turned through ninety degrees, so that the separation of gas flow is substantially in the horizontal plane. In this way the different portions of gas are properly intermixed, as can be shown by the path 103*a*, shown by dotted arrows, of a gas pocket starting adjacent to the first pocket and, in its path through the assembly, becoming widely separated from it. Although an individual honeycomb passage does not induce turbulence, the disposition of passages relative to each other can do so within one honeycomb structure, as may the provision of a succession of honeycomb configurations placed one behind the other. A form of filamentary material, not strictly wire or slab, which may be successfully employed in the invention is expanded metal or metal mesh. By way of example FIG. 214 shows in diagrammatic sectional view how sheets of metal mesh formed into wavelike configuration are placed one behind another inside a reactor 100, while FIG. 215 is a detail enlargement at H showing construction of the mesh. Mesh is usually formed by a combination of pressing and tearing sheet, processes which tend to leave sharp edges. Because materials are less resistant to heat, abrasion and corrosion when they are not smooth and rounded, the mesh used should preferably be subjected to sandblasting or other smoothing process after forming. Metal mesh is a known product and could readily be manufactured of catalytically active metals. The particular forms described may also, because of their inherent suitability to the invention, be manufactured of non-metallic materials such as ceramic, possibly by alternative forming means. Filamentary material in wool-like or fibrous configuration is especially advantageous, because of its ratio of high surface area to mass and because it will more readily act as a particulate trap. It should in the interest of durability be as smooth and rounded as possible, the wool preferably consisting of multiple fine regulation wire, woven, knitted, layered or randomly disposed. If the wool is composed of say fibers or strands of such materials as ceramic glass, this will be more temperature, abrasion and corrosion resistant than metals, but could be more susceptible to "flaking," that is particles or whiskers becoming detached from the general mass by the force of the gas flow, to perhaps lodge in a sensitive area downstream, such as a valve. For this reason it is preferred that wools are placed in the sections of the reactor most suitable to them, in the case of metals rearward away from the full heat and force of the gases, and in the case of ceramic fibers distanced from the exhaust port. Alternatively and preferably, wools should be sandwiched or contained by other forms of filamentary material, for example as in FIG. 212.

Figure 224:
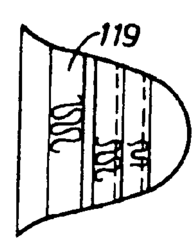
Figure 248:
Figure 249:

Another appropriate form of filamentary material is wire, especially since in the case of metals it is almost always readily available in that form and need only be bent or otherwise formed to any desired shape. For reasons of durability, the wire deployed generally needs to be thicker nearer the exhaust gas source than elsewhere in the reactor. The wire may be woven 108 or knitted 109 into a mesh as illustrated diagrammatically in elevational section in FIG. 216. It is preferable to devise a deployment of wire which avoids normal contact between strands, because the vibration of some internal combustion engines will tend to cause attrition at the point of connection, perhaps resulting in premature failure. Therefore the wire should preferably be arranged in forms to enable a relatively great length (ie surface area which is assisting reaction) to be incorporated in the overall restricted area of the housing, with the various portions of wire having minimum contact. It is expected that some contact will take place between wires spaced close together but not touching, but this contact should preferably not be regular, although its occurrence during freak vibration period or operating modes should not materially affect durability. An obviously suitable way of deploying the wire is in the form of spirals or coils, shown diagrammatically in elevation with axis disposed perpendicular to the flow of gas in FIG. 217, and disposed coaxially with the flow of gas in FIG. 218. By way of example, spirals having regular coils of equal diameter are shown at 110, while those having regular coils of progressively varying diameter are shown at 111, and spirals having irregular coils, that is of non-circular configuration and/or random diameter at 112. The three configurations comprise spirals having axes of substantially straight line configuration. FIG. 219 shows in diagrammatic cross-section spirals 113 having curved axes, here arched to better withstand force of gas flow from direction 114. Any of the spiral types mentioned previously may have curved axes. The wire may also be disposed in two or three dimensional snake-like configuration. Such a two dimensional form is shown by way of example diagrammatically in elevation in FIG. 220, while a three dimensional form is similarly shown in elevation in FIG. 221 and plan view in FIG. 222. Such forms may be disposed within a reactor in any number of ways, as for example shown in diagrammatic sectional plan view in FIG. 223, where flat "snakes" 115 and curved "snakes" 116 (each snake comprising wire looped in the plane indicated) are stacked next to each other and behind each other, either spaced as at 117 or intermeshing as at 118. These stacks of loops or curves may also be randomly placed (not illustrated). FIG. 224 shows diagrammatically how the plane of curves 119 may be straight, or as in FIG. 225, curved as at 120, to withstand gas flow from 114, or as in FIG. 226 curved as at 121 to provide a more ready and natural path for the gas flow. FIG. 227 shows in similar view how the planes of snake-like loops or curves, whether curved as shown or straight, may themselves intermesh past each other in any one or more dimensions, where the planes in solid line 122 are in the foreground and planes shown in dotted line 123 in the background. FIG. 228 shows in diagrammatic sectional elevation how the planes of curves, as viewed head on, may intermesh in other ways, where 124 are planes shown solid in end elevation (here curved in a third dimension, although they may be straight) slanting across the path of planes behind shown dotted 125 running in other directions. Alternatively, their curvature in the third dimension may be non-coincidental, as shown at 126, while at 127 is shown how the curves in the third dimension allow for the close stacking of these planes. Conveniently, the planes span the shorter dimensions as shown, but they may also span the longer dimension. In an alternative embodiment, wire is disposed in strands across the reactor, as shown by way of example in schematic elevation in FIG. 229, where wires in the foreground are shown solid 128 and those behind dotted at 129. To assist in the elimination of sympathetic vibration, the various strands may be not quite parallel, that is they could be at a slight angle to one another (not illustrated). Generally, because the strands of the latter configurations may be arranged to be in tension, they need be of thinner configuration than the largely self-supporting structures such as spirals or snake-like loops. Wherever wire is herein described it is meant to comprise either a single strand, or multiple strands, as for example in diagrammatic section FIG. 230. Because the material preferably exposes the maximum surface to the flowing gases, it may be desired to separate the individual strands of the wires to allow gas to flow through and past each strand, but to simultaneously still allow the separate strands to a degree support each other. Conventional separators may be employed, eg of ceramic, but in another embodiment the individual wire is crimped, that is minutely and closely bent in all directions, as shown elevationally in FIG. 231. As can be seen in cross-section FIG. 232, the wire effectively occupies a greater diameter, shown dotted, than its real thickness, resulting in the composite wire of FIG. 233. Fixing of wire and other filamentary material to reactor housing will be described later.

Figure 250:
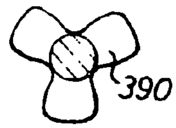
Figure 251:
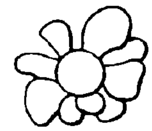
Figure 255:
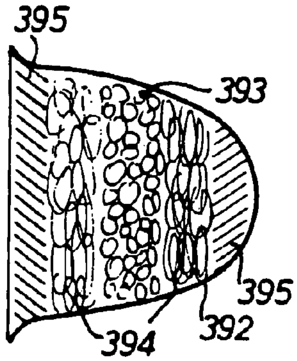
Figure 252:
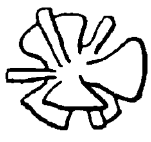
Figure 253:
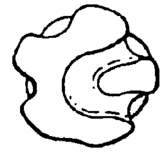
Figure 254:
Figure 256:
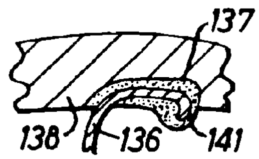
Figure 257:
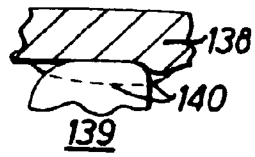
Figure 258:
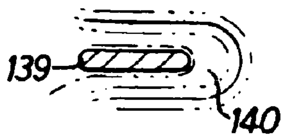
Figure 259:
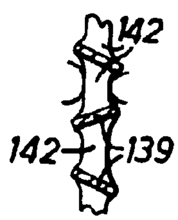

In a further embodiment, the filamentary material comprises sheet or slab. In a simple form sheet or slab can be described as a plane having some thickness, in the same way as did the series of snaked wire loops. These planes may be disposed within the reactor in much the same way as were those of the wire loops as described above. For example, the planes may comprise long sheets, straight or curved and be disposed as illustrated schematically in FIGS. 223 through 228. Other examples are illustrated schematically in FIGS. 234 through 247. Slabs or sheets may further have a form of simple alternate waves as shown in diagrammatic cross-section in FIG. 234, or a more complex waved or dimpled form as in FIG. 235. Alternatively, the sheet may have a sharply curved or crooked cross-section, as in FIG. 236, to present a greater frontal area to gas flow from direction 114. The sheet may further be in the form of holed fins or vanes as in cross-sectional FIG. 237, preferably having a thicker, more rounded section toward the side facing the gas flow 114. The holes in the sheet may have pressed or otherwise formed projecting lip or lips, as shown in FIGS. 238 and 239, or the holes may comprise apertures formed by punching, pressing and/or tearing, without significant removal of material, as shown for instance in cross-sectional view in FIGS. 240 and 241. FIG. 242, showing a part elevation of such a sheet, illustrates diagrammatically examples of forms of holes or pressed/torn apertures. Again, preferably sharp edges are removed after forming by blasting or other means. The sheet or slab may be formed into three dimensional interlocking or intermeshing forms, as shown by way of example in sectional elevation FIG. 243, where 130 describes a series of interlocking rings and 131 a series of interlocking hexagons. FIG. 244 is a diagrammatic cross-section showing by way of example a pattern of interlocking here using conical rings 132. FIG. 245 similarly shows interlocking means, but here the overall form is curved rather than linear. FIG. 246 shows in diagrammatic cross-section how individual sheets 133 interlock to make up a three dimensional form, while FIG. 247 similarly shows individual sheets, optionally curved as at 134, can be assembled into complex three-dimensional forms. In a further embodiment, the filamentary material includes pellets, of any convenient size or form, including approximately spherical. When not spherical, they may optionally occupy and approximately spherical space. Pellets are known in the art, comprising small regularly surfaced globes. In alternative embodiments the pellets may be of irregular and/or semi-oval like form as in FIG. 248, or of roughly kidney or bean-like configuration as in FIG. 249. However, it is preferred, so that most advantageous ratio of surface area to mass may be obtained, that the pellet comprises a form consisting of a series of projections and depressions, this form most conveniently having an overall spherical aspect, and configured so that preferably the projection of one pellet may not too easily fit into the depression of another pellet. If such inter-fitment is kept to minimum, it will ensure that the pellets are not tightly against one another, and so ensure a proper easy gas flow about and between the pellets. FIG. 250 shows in sectional elevation by way of example such a form, having four equally spaced projections 390, radiating from a central core, of roughly mushroom or bulb-like configuration. (Forms similar to this are used in concrete blocks for breakwater construction.) The same principles might be applied to a pellet having a greater number of projections as shown diagrammatically in FIG. 251, or having a multiplicity of projecting vanes, preferably disposed at angles to one another to better space adjacent pellets from one another, as shown in FIG. 252. In FIG. 253, the pellet may consist in a sphere having substantial snake-like depressions of rounded cross-section disposed in its surface. An embodiment similar to that of FIG. 250 is shown in FIG. 254, where the projections 391 are of more pronounced mushroom-like shape. Such pellet-like material will assume its most possibly compacted form under vibration, rather than when being fitted. To ensure that the pellets remain, after initial settlement, in a basically constant physical relationship to each other (rather than excessively move about and so wear more rapidly) the pellets are best subjected to some continuous pressure. This can, for example, be achieved by mounting pellets between filamentary material of wool and/or wire configuration. For example in cross-section FIG. 255, a housing 392 encloses pellets 393 adjacent to wool 394, in turn adjacent to wire 395. In a selected embodiment, the filamentary material in an exhaust emissions reactor further has an ablative effect, that is its decomposition may be desired and controlled, in this case to contribute therewith to the desired reaction processes. A material may be used which progressively decomposes, resulting in the filamentary matter having a deliberately limited life span and optionally providing within the reactor a compound which will react with the pollutants and/or gases under certain conditions.

Figure 260:
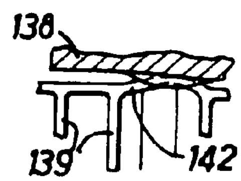
Figure 261:
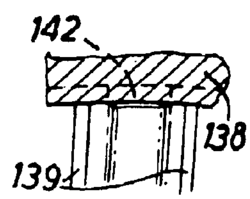
Figure 264:
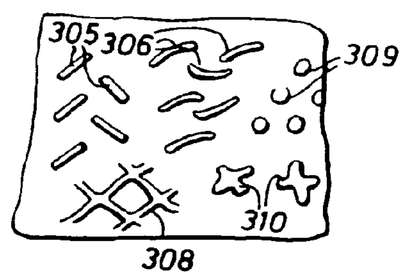
Figure 265:
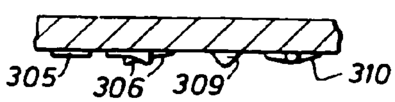
Figure 266:
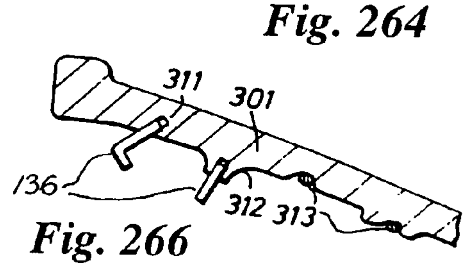
Figure 267:
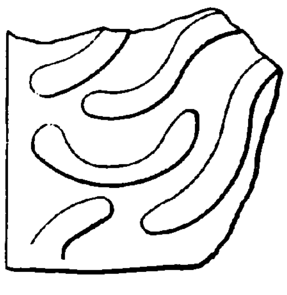

The filamentary material may be fitted to the housing in any convenient manner. For example, both sheet or slab 139 and wire 136, whether part of looped or spiral forms, or as in FIG. 218 wires 135 acting as structure supports, may lodge in recesses 137 in the housing 138 as in detail section FIG. 256, or may be gripped by protrusions 140 as shown in detail section FIG. 257 and plan FIG. 258. Compressible material 141 may be interposed between filamentary matter and housing to prevent attrition through vibration. Alternatively, sectional plan FIG. 259 and elevation FIG. 260 shows how sheet 139 may be connected by linking members 142 which in turn affix to housing 138 along the lines illustrated in FIGS. 256 and 257. However, if the sheet is of suitable material such as ceramic, it may be incorporated into the housing during the manufacturing process of the latter. By way of example, sectional plan FIG. 261 and elevation FIG. 262 show how slab 139 having appropriate, preferably holed, linking members 142 is integrated with housing 138, by means of the shrinking during formation of the housing in still malleable form upon the pre-formed prior-positioned interlinked slab assembly. Such a technique is considered viable where both filamentary material and housing are of ceramic material. Generally in the previous embodiments, internal face of the reactor housing exposed to the exhaust gases has been regular. This may have the disadvantage, according to the nature of filamentary material deployed within the reactor, of tending to define a path of lesser resistance to the gas flow 300, as shown diagrammatically in FIG. 263, where 301 is the housing, 302 the engine, 303 say filamentary wool and 304 the less obstructive section between wool and housing. This will result in too great a proportion of the gases traveling this path of lesser resistance, rather than passing as intended properly through the filamentary material, with a result that some of the gases will not as fully inter-react as the system allows for. In order to mitigate this usually undesirable effect, the interior face of the housing may incorporate a series of depressions and/or projections, designed to break up gas flow adjacent to housing face and to direct as much of the gas inward towards the core of filamentary material proper. FIG. 264 shows in diagrammatic elevation part of the inside face of a reactor housing, having a series of possibly alternative projections, with FIG. 265 a corresponding section. By way of example, at 305 are shown a series of spaced straight ridges, while at 306 are curved intermeshing ridges and at 308 interconnecting ridges. At 309 are shown dimples or nipples, while at 310 are irregular projections of star-like or cruciform configurations. FIG. 266 shows examples of how filamentary material fastening means may break up gas flow, with 311 a trench-like depression, 312 a projecting collar and 313 the ridges and troughs of earlier description, with 136 the portions of filamentary material being supported. The internal face of the housing may further be waved, as shown in diagrammatic part elevation in FIG. 267 and in part section in FIG. 268, showing a similar configuration where the waves are not continuous but form a succession of dune-like shapes. Both waves and dunes may be of regular cross-sectional configuration as at 314, or may have a shallow slope facing the oncoming exhaust gases 300, and a sharp slope on the leeward side of the gas as at 315, or vice versa. In FIG. 269 is shown how a ridge 316, optionally acting as filamentary retaining means, directs the flow of gas away from the junction between housing 301 and filamentary core 317, say of honeycomb configuration. Since the housing at least partly comprises insulating material, there will be a large temperature drop between the inside face of the housing assembly and its outside face. Because of the high internal temperature of the reactor, perhaps in the 1100 to 1200 C. range, the temperature drop may not be sufficient to result in a surface temperature sufficiently low to prevent accidental burning by operating or service personnel. Largely to obviate this danger, the surface of the housing may be provided with protective ridges as at 318 in FIG. 268 or nipples as at 319 in FIG. 269. There will be further temperature drop between surface proper and extremity of projection, but a much smaller hot surface is presented to accidental contact, thereby limiting heat absorption and degree of possibly burning.

It has been seen earlier that, for the cold start operation to be effective, the gas exit valve must be closed for as long a period as practical, the so far limiting factor being the amount of pressure attainable in the reactor without stalling the engine. In some cases, when the reactor has exceptionally rapid warm up characteristics, it will not be difficult to keep the valve closed until the threshold of operating temperature is reached. With other systems it will be more difficult, if not impossible. In such cases, it may not be advantageous to partly open the gas exit thereby maintaining the pressure, since the gases emerging will only be partly de-polluted. As an optional alternative, it is proposed that there be fitted to the reactor a passage communicating with an exhaust gas reservoir, and that there, optionally, be a second independent closure means between reactor and reservoir, preferably near the junction of passage and reactor. In operation, when the acceptable level of pressure in the reactor is reached, including a pressure no greater than atmospheric, the gases pass through the passage, either because there is no obstruction or because the obstruction to the reservoir has been removed. Once reactor warm up temperature is attained the flow of exhaust gas to reservoir would substantially cease. The gases are then expelled from the reservoir by any means, but preferably during the operation of the engine while warm either to the engine intake system and be re-circulated through the combustion process, or to the reactor which, being warm, would satisfactorily process them. Because the gases are always continually reacting, however slowly, it is likely that they would become significantly more pollutant-free during their sojourn in passages and reservoir. The period of this sojourn is likely to be many times greater, perhaps more than a hundredfold, than the duration of gas passage through the reactor during normal operation. By way of example, FIG. 270 shows in diagrammatic sectional elevation, the engine compartment 152 of the front section of a motor vehicle 153 fitted with the reactor 151 of the invention, to which is coupled an expansible exhaust gas reservoir 150. FIG. 271 comprises a frontal sectional elevation, wherein the left half shows the reservoir expanded and filled with exhaust gas, and the right half the reservoir reduced and relatively empty. Above the reactor 151 is an inlet manifold 154, optionally integral with the upper portion of the reactor housing. The reservoir 150 comprises a folding bellows member 158 mounted on a base 159, the bellows having at the end opposite the base (here the lower end) an integral T-shaped stiffening member 160, which communicates at each end rigidly by means of triangulation members 161 to a slidable guide 162 mounted on a vertical rail 163. The bottom of each guide communicates with a compression spring 164, in turn communicating with the lower part of the vehicle structure 165. From a junction 167 upstream of the main reactor gas exit valve 166, a passage 168 communicates with the reservoir base 159, and optionally from base 159 a second passage 169 communicates with the inlet manifold 154. The reservoir is in the position shown so that in normal use, that is when retracted and empty, it occupies a relatively protected position, as shown in the right half of FIG. 271. The reservoir may be mounted turned through 180 degrees, so that member 161 rises as the reservoir is filled.

In operation, after the main valve 166 has closed and junction valve 167 has opened, exhaust gas will travel down the passage 168 to fill the reservoir 150. A build up of pressure will be caused because the reservoir can only expand against the force of springs 164. The communication between the reservoir and inlet manifold being unobstructed, the gas will escape into the manifold at a rate in proportion to the size of opening and pressure in the reservoir. When the reservoir reaches a point near the limit of its downward expansion (allowance being made for safety margins) the main valve 166 opens, either partly, to maintain pressure if full operating temperature has not been reached, or fully. In the embodiment the aperture between passage 169 and inlet manifold is made small so that, even under the maximum designed pressure of the exhaust reservoir system the rate of gas flow into the manifold is very low in proportion to flow produced through the exhaust ports, thereby giving a very reduced rate of exhaust gas re-circulation. After the reservoir has been filled and gases diverted down the normal exhaust system, the loading of the springs 164 will ensure the slow collapse of the bellows 158 and the continuing bleeding of gas into the inlet system until the reservoir has been emptied. The provision of a second valve at 167 communicating with passage 168 may in some configurations be omitted by the provision of a relatively small opening between reactor and passage at junction 167, the opening being of many times smaller cross-sectional area than the main exhaust pipe 170. The smallness of opening will restrict gas flow from reactor during the initial stages of warm-up and main valve 166 closure, until the higher pressure in the reactor accelerates the rate of gas flow along passage 168 to more rapidly fill up the reservoir. The non-closure of the small opening at 167 will ensure that the exhaust gases will effectively be re-circulated to some degree to the reactor once normal warm operation commences, provided the reservoir has a minimum volume when collapsed. Depending on the strength of reservoir springs 164, the gas flow rates back through the opening will be lower than those into the reservoir, since the pumping action of the engine will usually have considerably greater force than spring action. If it is considered that the gases diverted to the reservoir system have not sufficiently reacted by the time they re-enter the reactor, then catalytic material may be associated with the reservoir, or its internally faced components and/or those of passages 168, 169, or they may be fabricated of a material having catalytic action, such as copper or nickel. Alternatively or additionally, junction 167 may be placed as closely as possible to the exhaust openings, so that the returning gases travel through a substantial portion of the now warm and fully operative reactor. In an alternative embodiment, there are at least two passages between reactor and reservoir. The reservoir assembly may be made of any suitable materials, which to a degree will need to be heat tolerant. If the chosen materials have low heat tolerance, then optional heat dispersal means may be affixed to passage or pipe 168, as shown diagrammatically at 171. If materials are heat resistant, as for example would be a bellows assembly made in metal or silicone rubber, then thermal insulating means may be incorporated on the passages, as shown diagrammatically at 172, with the advantage that the gases may be maintained in the reservoir at warmer temperatures, thereby speeding up reaction processes. The warmth of the gases may be used to advantage where the gases are re-circulated to the intake system. The provisions of this flow of warm gas during cold start—as has been shown above, the reactor may be operative to a degree already from a few cycles after firing commences—will assist in vaporization of fuel during engine warm up. In normal usage, the gases will not at inlet entry point be hot enough to present risk of premature fuel combustion. Optionally, a valve 155 may be provided between reservoir and inlet system to regulate re-circulation. In an alternative embodiment, the reservoir may consist of a series of slidably-mounted housings capable of collapsing into one another, for example as shown in diagrammatic perspective in FIG. 272, wherein 600 is the base housing having sides and bottom, 601 an intermediate housing having sides only, 602 top housing having sides and top, with 603 pressed projections acting as guides. The spring loading arrangements and guides disclosed previously may be associated with this reservoir. The embodiments of reservoir are shown by way of example; any appropriate reservoir may be used, constructed and operative in any manner. The base may be in any convenient location, and the expansion and contraction of the reservoir may be guided by any means and be in any direction.

Figure 275:
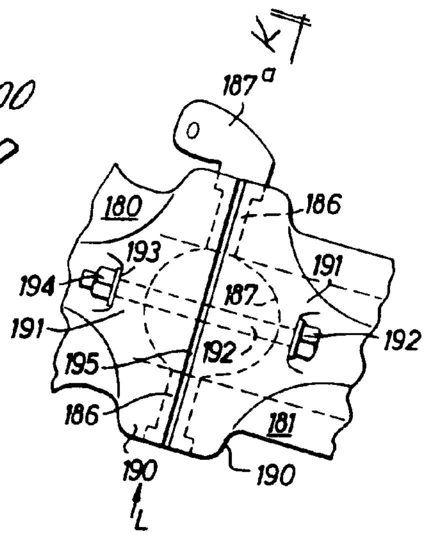

The valve construction presents possible problems, since it needs to be tolerant of the very high temperatures and abrasive qualities of exhaust gas, preferably for the full life of the engine. A range of suitable high temperature materials, including ceramics or nickel alloys, are described in more detail subsequently. Described here, by way of example, are certain methods of valve construction which entail easy service in the event of need for replacement or maintenance, and which are capable of providing proper sealing, optional diversion of gases to storage or re-circulation, and some tolerance of particles or whiskers from any filamentary material. A feature of the major embodiments described, is that the joint or flange between two principal components coincides with the valve axis, enabling valve and spindle to be manufactured as an integral unit and fitted when the two components are mated up, this configuration being particularly suited to butterfly valves. FIG. 273 shows by way of example in schematic plan view a reactor 180 having at its junction with exhaust pipe 181 the main gas exit valve 182, while FIG. 274 similarly shows a reactor 180 having between it and exhaust pipe 181 an intermediate section 183 including a junction with passage 184 communicating with re-circulation system, and an optional secondary valve 185 in passage 184. FIGS. 275 to 279 show details of the valve 182 of FIG. 273, where FIG. 275 is a sectional view along “K” in FIG. 276 which is an enlarged plan view, FIG. 277 an elevation at “L” shown in both FIGS. 273 and 276, with FIGS. 278 and 279 details at the joint between sections. Manufactured integrally with spindle 186 and actuating lever 187*a* is a butterfly diaphragm 187 of biased circular or oval configuration, having one section 188 of greater surface area than the other 189, so that the valve will tend to fail-safe in the open position. The cross section of the exhaust pipe 181 and reactor component near the joint is substantially of similar circular or oval configuration to the valve. Both major sections have their jointing at integral flanges 190, which are linked with coincident hollow load distributor ridges 191, through which pass the bolts 192, washers 193 and nuts 194 holding the two components together under compression, separated by compressible material 195 preferably in two separate layers passing each side of the spindle 186. This is shown in detail cross-section FIG. 279 through spindle at its passage between the two major components 180 and 181. Preferably the components and spindle should have mating curves of non-coincident centers when assembled, so as to provide a stronger pinching effect in the area of joint 196 where the seal can be expected to be weakest. The slight internal projection of the twin layered compressible material 195, as shown in part section FIG. 278, will assist in the proper location and sealing effect of the diaphragm 187 when in the closed position. FIG. 280 shows by way of example a schematic sectional plan of the embodiment of FIG. 274, where the optional secondary valve is in the form of a pressure sensitive plug 197 and compression spring 198 assembly, and where a honeycomb structure 199 is located by the junction of intermediate section 183 to reactor 180, in order to act substantially as a fiber or strand trap. FIG. 281 shows a similar detail elevational plan view, wherein the passage 184 is joined to intermediate member 183 by at least two assemblies comprising two coincident hollow load-distributor ridges 191 and bolts 192, washers 193 and nuts 194, while the exhaust pipe 181 is connected to reactor 180 through the intermediate section 183 by means of assemblies 200 comprising multiple coincident load distributor ridges 191 and associated fasteners 192. FIG. 282 shows diagrammatically in longitudinal cross-section a hollow ball valve in the open position fitted in the joint between two components, where 201 comprises the “ball” with its integral spindle 202 and actuating lever 203, with 204 the main exhaust passage, 205 the seals, 206 an optional secondary passage allowing exhaust re-circulation means during cold start, 180 the reactor housing and 181 the exhaust pipe, with the joint between the two shown dotted at 207. FIG. 283 shows, in a similar sectional view rotated 90 degrees about passage 204 axis, the valve in the closed position, allowing the secondary passage 206 to communicate into the main passage 204, which in turn communicates with an aperture 208 leading to exhaust gas re-circulation means. It is desirable to make the valve actuating means as simple and as fail-safe as possible. To this end, the valve should be spring loaded (not locked by mechanical action) in the closed position in such a way that reactor pressure over the designed limit will overcome the force of the spring sufficiently to allow some gas to escape, thereby again lowering pressure to below that required to actuate the spring and maintaining a balance of loading to keep the valve slightly open, to sustain constant pressure in the reactor. The spring loading is such to also bias the valve to the fully open position. Such an arrangement is illustrated by example schematically in FIG. 284, where 210 shows a valve actuating lever in heavy line, butterfly valve 211 and internal face of passage 212 in light line, spring 213, spring axis 214 and spring anchorage 215 on housing and anchorage 216 on lever, with pivotal valve axis at 217. The valve assembly is shown in slightly open position in dotted line and fully open in chain dotted line, with dashed line 211 a indicating the arc of valve edgetravel. The same system of loadings may be employed and the valve actuated by making the previously fixed spring anchorage point 215 movable as in the path indicated by dashed line 218 between extremities 219 and 220, dashed line 214 indicating spring axes at each extremity. This movement of spring anchorage may be actuated in any way, and in a selected embodiment is moved by a member driven by the expansion of heat sensitive material, such as a trapped pocket of gas or as is shown in FIG. 285, where a piston 221 communicates with a container of high conductivity 222 exposed to the passage of hot exhaust gas 223 through a volume 224 of trapped readily expansible material such as gas or wax. The piston 221 is connected to rod 225 and linkage 226. FIG. 286 shows schematically how the piston rod 225 actuates the operation of the valve by means of its actuating lever 210, spring 213, and an intermediate arm-shaped lever 227, mounted on pivot 228. The actuation of the valve indirectly, by means of a spring, ensures that fail-safe characteristics are embodied. If this is not considered necessary, then the heat actuated piston 221 may by direct linkage open and close the valve, as for instance if the end 229 of the intermediate lever 227 were connected directly to the valve actuating arm (embodiment not illustrated). In both cases, but especially in the latter, it will be possible to closely relate valve opening to exhaust temperature, and therefore reactor pressure in relation to temperature.

Figure 290:
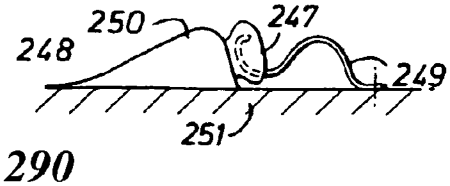
Figure 291:
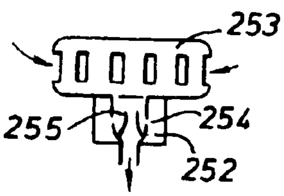
Figure 292:
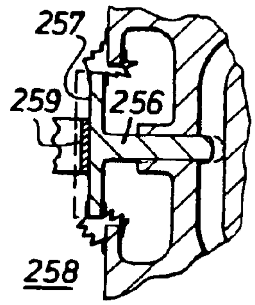

The above features may be used in any suitable combination with each other and also, where appropriate to fulfill functions not related to cold start. Gas circulation to inlet system may be associated with a gas reservoir, or alternatively it may be direct, that is eliminating the reservoir. Further, the exhaust gas re-circulation (ERG) system described previously could for example be used after warm up had been achieved to provide EGR to the engine under normal running conditions, either continuously or under certain operating modes. To facilitate the use of EGR, and so thereby possibly to eliminate the use of pumps, a scoop may be placed in the reactor about the junction with re-circulation passage, as illustrated diagrammatically in FIG. 287, where the scoop 230 projects into the exhaust gas flow 231, so creating a higher pressure area at 232, which assists the flow of gas along the EGR system 233. Preferably, the scoop is placed in a "weak" area of the reactor, that is where the reactions are taking place at below average rates, so that the least pollutant free gases are re-circulated, permitting the reactions partly to continue during their second passage through the reactor. The scoop arrangement would entail that EGR employed continuously is in roughly constant proportion, after a build up of proportion between very low and medium speeds, since gas circulated depends on speed and therefore volume of gas issuing from the engine. An optional valve at junction of EGR system to intake manifold could, as shown by way of example in diagrammatic section FIG. 288, be intake vacuum dependent, where 234 is the exhaust supply passage, 233 the EGR system, 235 the manifold, 236 a plug shown in open position against pressure provided by curved leaf spring 237, but which when closed seals passage 238 provided with progressively sized vent 239, operative when plug is wholly or partly in open position. The plug cap when closed seals against seats 240, where internal volume at 241 is pressure balanced with EGR system by weep passage shown dashed at 242. The degree of EGR in proportion to inlet vacuum will be regulated by the sizing of vent 239, which may be of linear, logarithmic or other progressively increasing dimension. The adoption of an operating mode may involve the need for a sudden supply of re-circulated gas. With a direct system, once the initial demand has been met, a partial vacuum will be created in the EGR system, thereby slowing down rate of gas supply to below that ideally required. This may largely be obviated by incorporating an exhaust gas reservoir into the system, which may or may not be expansible. If an expansible reservoir, such as may be used in the cold start procedure is incorporated, then its expansible action may be progressively spring loaded. During normal running, re-circulation pressures, say assisted by damming, are in the low range causing the first soft section of the springing to allow the reservoir to expand and contract within a range of say one quarter of its full expansion, this reservoir movement ensuring more consistent EGR rates at the sudden introduction of certain operating modes. During cold start the greater pressures will overcome the resistance of the second stronger section of the springing (as well as the first stage) allowing the reservoir to expand to its maximum capacity. In situations where EGR may desirable at moderate to higher engine speed, an inlet gas velocity actuated valve, as shown in section plan FIG. 289 and elevation FIG. 290, may be incorporated at the junction of EGR system to inlet manifold. The valve, shown open in FIG. 289, comprises a shaft 243 slidable in a passage 244 communicating with EGR system, exposing a progressively sized vent 245, said shaft terminating in a head 246 having attached to it scoops or vanes 247 projecting into the gas stream 248 against the action of looped leaf spring 249. FIG. 290 shows the same arrangements with the valve, which is accommodated in a housing 250 projecting clear of inlet manifold wall 251, in the closed position. Preferably a properly balanced EGR system will comprise a series of valves, say actuated by vacuum and/or velocity or other means, disposed in different parts of the inlet system and all communicating with the EGR system, preferably having a gas reservoir. By careful positioning of these valves, regulation of their spring bias and selection of passage diameter, the right amount of EGR could be provided for the various driving modes. It has been shown that the warm up of the assembly has been hastened by the whole or partial closing of the exhaust gas exit by valves, in effect damming the gases inside the reactor. Such damming may be achieved by any suitable means including, in a preferred embodiment, the provision of a fan or turbine in the exhaust system adjacent to the reactor gas exit. Because the fan is inert on cold start and constitutes a barrier or dam in the system, pressure would build up behind it during the early cycles of engine operation. The fan preferably would not constitute a total barrier, some air passing either between the blades or their junction with housing, enabling the engine to be turned over on the starter motor with relative ease. Once firing commences, the rapid increase in engine speed and gas flow would ensure a considerable damming effect, which would only be relieved when the reactor pressure against fan blades overcomes the fan's inertia. Optionally the fan spindle and its bearing may have differential coefficients of expansion, so that when cold a tighter bearing fit would ensure greater resistance to rotation than when warm. By way of example, a fan is indicated schematically at 471 in FIG. 14, which could alternative be a turbine wheel. The above system of valving and supply, described in connection with the supply of EGR, may also be employed to provide extra air to the inlet system, so as to assist in the provision of a precisely controlled air/fuel mixture ratio. The air may be supplied from a reservoir and then be fed through an air cleaner assembly, either before or after the filter, as shown diagrammatically in FIG. 291, where a coaxial chamber 252 surrounds the main inlet pipe and is adjacent the air cleaner 253, the chamber 252 being supplied with air through opening 254, with optional dams or scoops 255 provided to maintain air in the reservoir under low pressure. The same system of valves actuated by engine modes (and therefore charge air pressure) could be used to supply re-circulated exhaust gas or air to the reactor, by means of a passage leading from source to reactor via valve positioned say in air inlet system. The operation of such a valve is shown schematically in FIG. 292, where a shaft 256 and head 257 in the inlet system 258 open against spring 259 loading to free passage 260. It is preferred that there is incorporated in any EGR system a filter to trap particulate matter in the exhaust, this matter having been known to lead to increased engine wear and likelihood of mechanical failure in many previous improperly filtered systems. It is felt that with the invention, substantial air supply to the reactor will not be necessary. However, it may be desirable to supply small quantities of air, preferably by means described above, only under certain running conditions to assist in the accurate balancing out of any exhaust gas component reaction process. An air reservoir may be expansible, say by the provision of elastomeric sides, to provide air under more constant pressure with sudden change of operating mode. Alternatively, the reservoir may consist of a series of slidably-mounted housings capable of collapsing into one another, for example as shown in diagrammatic perspective in FIG. 272.

The forms, contents and constructions of housing and filamentary material described in relation to exhaust gas flow may all be employed in any combination and embodiment to provide a means to treat, control or process in any manner incoming engine charge. Previously, most internal combustion engines have had charge supplied in the form of tubular columns passing through tubular manifold pipes. By passing charge through the housings of the invention, much of the pulsing effect and critical tuning associated with conventional manifolds will be eliminated, providing a smoother charge flow, especially during changes of operating mode. The provision of filamentary material inside a charge housing can assist in improving turbulence, heat exchange, elimination of condensations, etc. The charge housing may be formed similarly to the reactor housing disclosed earlier, with portion of charge treatment volume intruding into area normally taken up by engine. Inlet ports may be formed of progressively varying cross-section to ensure smooth fluid flow between volume and main portion of port. Filamentary material may be provided anywhere in the charge treatment volume, but in selected embodiments is in or adjacent to inlet opening. The inlet opening area, including adjacent to and projecting into charge treatment volume, may have fluid distribution or flow controlling members such as or similar to those described in FIGS. 201 to 210. The fluid may proceed from charge treatment volume by non-parallel paths, for example similarly to the disclosure of FIGS. 199 and 200. Inter-members may be provided between charge treatment housing and engine body, along lines disclosed in FIGS. 188 and 196, these being optionally of insulating material to maintain charge at ambient temperature. In the case of combustion engines, the housings, constructions, port arrangements, and contents of the invention may be applied only to process charge, or to process exhaust, or to both. In the latter case, charge housing may be opposite exhaust housing (as for example in "cross-flow" engines), or both housings may be mounted adjacently on the same engine side, either separately or in combination, or the housings may be integral. In selected embodiments, the housing will communicate with a plurality of inlet openings. A further advantage of the invention is that it will provide improved inlet silencing. The valves and fluid control systems described earlier in association with exhaust gas flows may be employed to regulate engine charge fluid flow.

In a further embodiment, two separate fluids are delivered to one working chamber. Optionally, they are delivered by a single device, independently of one another. In the case of IC engines, the first substance is the fuel, while the second substance may be a second fuel, a non-combustible agent or the latter mixed with fuel, such as an alcohol/water mixture. The introduction of a second substance, continuously or otherwise, could measurably contribute toward engine power and/or improved exhaust emission and/or fuel economy. The second substance may be introduced under, and assist in the effectiveness of, certain running conditions such as sharp acceleration, high load or maximum power output. At such operating modes fuel consumption is greatly increased, but if the main fuel could be maintained at normal flow and the increased needs met by a second substance, preferably obtainable from non-fossil fuel sources, then a considerable saving of the main fuel is likely. The second substance employed may be another fuel, such as alcohol or methanol which may be manufactured from such substances as waste paper, biological products, etc. It may alternatively be water in the form of liquid, vapor or gas, known since the beginning of the 20$^{th}$ century to give improved performance under certain conditions and tending to have an anti-knock effect. In a selected embodiment it consists of a mixture of water and a fuel, such as methanol. In a further embodiment, water introduced as a liquid into the cylinder, which subsequently is converted to steam by the heat of combustion, and/or steam is introduced under pressure, to improve the volumetric efficiency of an engine. Water introduced as a liquid may have a cooling effect in a combustion volume, due to the energy absorbed in converting water to steam. In addition to methanol, any other suitable hydrocarbon, for example ethanol, may be mixed with water. The introduction of water may be related to atmospheric humidity and regulated by a sensor. Described below are devices for introducing substances to an intake charge which do not involve the vaporization of fuel by gas velocity to deliver the fuel. Any of these devices may be employed for the introduction of both the secondary substance and/or the main fuel to the charge. In the case of compression ignition engines or other engines having cylinder primary fuel injection, the other substances may be supplied by means of additional injectors, or they may be introduced by compound injectors, that is by different passage systems in the same injector. The injection may be linked, that is injection of one substance will automatically cause the introduction of another, or the systems may operate independently of one another. The disclosures herein relating to delivery of fluids to working chambers apply where ever suited to compressors, pumps and IC engines, with most of the examples cited applying to the latter. Fuel delivery devices are generally shown mounted in the head and communication with a working chamber which is a combustion chamber, but in the case of IC engines the devices can be mounted in any suitable location at any angle, including in or near the intake port. FIG. 293 shows by way of example a schematic section of the lower portion of a compound injector where fuel in gallery 272 is supplied via passage **272*a* and is injected in the normal way at 273 by a pressure wave lifting nozzle 274 in direction of arrow, with the nozzle reciprocally mounted in injector body 274*a*. The nozzle has a hollow central passage 275 linking with a secondary fluid gallery at 276 only when nozzle lift and consequently fuel injection is taking place. The secondary fluid is under continuous pressure and will therefore inject at 277 only when nozzle lift occurs. The proportion of fuel to secondary fluid is determined by their respective pressures and the duration of degree of overlap between gallery and hollow passage. FIG. 294 shows schematically a compound injector having an inner nozzle 278 coaxial and within an outer nozzle 279, the latter mounted in injector body 274*a*, both operating in the conventional mode with independent lift and injection capacity, to inject two different fluids at 273 and 277**. In the descriptions herein of fluid delivery devices capable of transmitting at least two different fluids, reference is generally made for use with combustion chambers, and one of the fluids is a fuel. The devices may be used in any IC engine, compressor or pump, and may deliver any combination of any different fluids. The principles of the invention can be adapted to having a single fluid delivery device capable of delivering three or more different fluids.

In a further embodiment, a portion of a fluid delivery device communicating with the working chamber moves during fluid delivery. By way of example, a device delivering two separate fluids is shown schematically in cross-section in FIG. 295 and in plan in FIG. 296, where the nozzle assembly is viewed from the working volume. The central nozzle 280 operates in the conventional manner and is lifted off its seat in direction of arrow by a pressure wave to inject fluid as shown schematically at 277, while the outer nozzle 281 moves coaxially on the first and in its seating in a rotational mode during the release of fluid, shown at 284. Such rotation may be controlled by bearings, or against the resistance of friction seals, indicated schematically at 282. The rotational movement is imparted by means of fluid delivery tubes 283 terminating tangentially to diameter of nozzle, so imparting to it a twisting motion according to the force of, and for the duration of, fluid injection. Alternatively, the rotational movement may be electrically actuated, say by a solenoid. This movement will result in a slinging of fluid across the combustion volume in the manner indicated at 284, in a similar manner to the action of some garden hoses. The injection of the outer nozzle may be effected by means of a pressure wave in the coaxial and surrounding fluid gallery 285, supplied via passage 285*a*, to effect injection via passage 285*b* to tube 283, as shown on the right side of the diagram. In an alternative embodiment, shown on the left side, the pressure wave may optionally depress one or more plungers 286 against spring 287 loading, and so by inward movement of the plunger mate up the fluid gallery with the passage 285*b* to tube, to effect injection at 284. This slinging action imparted by rotational nozzle movement, the latter in turn imparted either by kinematic reaction to the approximately tangential delivery of fluid spray or by mechanical or electro-magnetic actuation, has considerable benefits over conventional injection systems. The latter operate in straight line distribution of fuel, while the snakelike shape formed by the spray of invention is of greater length, thereby lessening the chance of liquid deposition or combustion in chamber walls before atomization has taken place. The slinging action also tends to distribute the droplets of fuel through a greater volume of charge than the conventional uni-directional injection. The rotary injector portion has been described mainly in a composite embodiment, wherein two substance are deliverable by one assembly. In alternative embodiments, the rotary principle may be embodied in an injector handling a single substance. The rotatable member projecting into the working or combustion volume may be of any configuration, and head configurations suited to rotatable injectors may also be embodied in fixed or non-rotatable head injectors. Rotation may be achieved by fuel injection velocity only, or by electrical actuation by such as solenoid or electric motor or magnet, or by flexible or fixed mechanical drive to injector. Rotation may be intermittent, continuous, or returnable, for example as when the head rotates during injection and is wholly or partly returned to its former position by spring or other action. Rotation may be achieved by any combination of the above means, as for example in an injector where a small electrical motor imparts rotational impetus insufficient normally to rotate head against bearing/seal friction loading, rotation only being achievable during substantially tangential injection, which provides additional rotational movement to overcome bearing friction. Mechanical or electrical rotation may be transmitted by means of a solid or hollow needle or tube or injector nozzle seal, which may be integral with rotating head or communicating with and/or driving it by means of splines, teeth, friction surfaces, etc. The needle/shaft/tube may simultaneously function as rotational drive and fuel release means by lift-off seat. In such case vertical movement may be actuated by conventional fluid pressure valve or by solenoid. If rotary motion is solenoid actuated, one solenoid assembly may be employed to effect both vertical and rotational motions simultaneously by means of suitable angling of solenoid action, as shown schematically in FIG. 297. Activation of electrical circuit causes shaft 800 to be pulled through one compound motion having components of both rotation and reciprocation, extent and direction indicated by arrow 801, against a spring or other resistance. Here, cessation of electrical circuit causes shaft to travel extent and direction shown by dashed arrow 802, returning shaft to its original position. The resistance may be in one dimension only, say reciprocation, to provide return travel indicated at 802, so that with each actuation the shaft rotates through an arc. Reciprocal-type motion and rotational-type motion may be imparted to injector head by any means, including by mechanical drive, and the movements may be independent or linked. Movement during electro-magnetic actuation may be in any direction or line. For example, as illustrated schematically in FIG. 298, member 803 communicating with injector head may be rotatably mounted on fixed sleeve or cam 804 of "hill and valley" profile, to impart the combined motion referred to. Reciprocating and/or projecting/retracting motions may be imparted to injector head by injection pressure effecting an extension or projection of head portion against say spring loading. Other embodiments illustrated schematically in FIGS. 299 through 303. FIG. 299 shows in elevational plan view an injector head capable of rotation, having three cranked hollow tubes 811 permitting fluid issue 810 through end hole. FIG. 300 shows a similar arrangement, wherein multiple straight hollow tubes 812 each have multiple holes to permit fluid 810 issue. FIG. 301 shows in elevational plan view a hollow disc 813 capable of rotation, having one internal volume communicating with circumferential holes 814 permitting fluid 810 issue, the arrangement of holes being shown in detail in part end elevation FIG. 302. The disc has, coaxial with rotational axis, another internal volume 815 capable of admitting passage of second fluid to inject at 277 through aperture 816, and which is closable after lift and return of central nozzle 816, along the lines disclosed in FIG. 295. FIG. 303 shows in elevational plan a view of an injector head having a looped hollow tube 826 of semi-spiral configuration, optionally with a closed end, suitable for rotational and non-rotational application, with fluid issue 810 shown opposite a series of injection holes in the side wall of the tube. Although reciprocating, rotatable or otherwise movable members have been described in association with injector head assembly, the entire body portion of the injector including head may be so movable. The axis of rotation of injector head may be aligned in any relationship with the volume to which injection is provided. In a further embodiment, in nearly all varieties of construction, the fluid to be injected can be partly used as lubricant. By way of example, there is shown in schematic cross-section FIG. 304 a rotatable head 827, screw fixed to rotatable drive member 828, both being located by fixed injector body 829, with bearing surfaces 830 being lubricated by seepage from injection fluid gallery 831 supplied from passage 831 a, via a ring 832 of wick-like or porous or permeable material. Injection by fluid pressure wave through ring and passages 832*a* is shown at 810.

The invention further comprises reciprocating, retractable and projectable and/or telescopic action injection heads. The reciprocating injection heads may move to and fro in fixed relationships to engine cycle or portion of it, such as compression and/or expansion stroke. These entail the slidable mounting of a hollow member inside or outside of a hollow guide member of similar configuration, or of a multiplicity of such slidable members mounted about one another in nesting fashion, and may be fixed or movable (eg rotatable) in other planes. The slidable members may be straight or curved in elevational profile, and be of any convenient cross-section including circular, blade-like, cruciform, star-shaped, etc. The extendable/retractable action may be incorporated in an injector for one or both of two significant reasons; to provide controlled fluid supply to working area far removed from injector base when cyclical motion of engine body portion permits (eg when piston is before say nine-tenths of way up compression stroke), or to provide better fluid mixing or atomization generally. This would especially useful in large combustion chambers served by a single injector, as for example in marine engines. Fluid may be delivered through holes in end and/or other portion of slidable members communicating with interior hollow portion, and/or delivery may be effected by disposing holes of differing cross-sectional area, location, quantity, and/or alignment in adjacent members slidable about each other, so that in operation a controlled sequence of multiple fluid delivery is effected by progressive alignment of holes in different components moving relative to each other. In selected embodiments, a pre-injection pressure build-up will cause injector head portion to extend with some issue of fluid through injection apertures, with major injection taking place at considerably higher pressures once extension had been initiated, then reduction of pressure causing cessation of injection and retraction of head portion. Alternatively, extension of head portion, say against spring loading, may be achieved by the combustion process itself, for example where portion of injector head defines a pre-combustion area or chamber of combustion engine. In such configurations the pressure of gases expanding in the pre-combustion zone when firing commences causes the injector head portion to be "blown" or forced to a different portion, say against spring action, and to return at any later period, including when pressures in main and pre-combustion zones equalize. The art of mounting rotatable, reciprocal or slidable members is well known, these known techniques being readily employable in the construction and embodiments of the invention. By way of example, FIG. 305 shows elevationally and FIG. 306 shows in sectional plan view, a telescopic reciprocal or "lizard-tongue" type action, comprising a three-part injector head assembly, of blade-like cross-section. In FIG. 305 it is shown solid in non-injecting position and dotted in fully extended position. The majority of holes 810*a* for fluid issue 810 are in the long ends or sides of the blade-like sections 835, the latter extending against the tension of wish-bone configuration leaf springs 833, biased to return injector portions to a recessed position. Further holes 836 are provided to align with each other at certain stages during extension of the assembly. The projecting elements are shown curved in FIG. 305, but they may be straight. The injector heads of any of the embodiments of the disclosure, including those of FIGS. 293 through 313, are generally shown by way of example to be aligned perpendicular to the upper plane of the working volume 1002. Alternatively, they may be aligned at any angle relative to the cylinder head or working volume, whether portions of the injector rotate or not.

In further embodiments, for use in combustion engines, the fluid delivery device includes either ignition means and/or includes or defines a pre-combustion zone, and/or the fluid delivery device is rotationally or reciprocally movable for any reason, including to vary the compression ratio in the working chamber. The pre-combustion zone may only be properly defined by fitment of the device to the combustion chamber head or other part, portions of the device and head together forming part of pre-combustion zone wall or boundary. As shown schematically in FIG. 307, a wall or shrouding assembly or a depression may be positioned on the cylinder head next to or at the fluid delivery device, both together partly enclosing the pre-combustion zone. Additionally or alternatively, spark or arc ignition may be instigated by an electrical bridge across terminals on the device, or between one terminal mounted on the device and another terminal mounted on or formed by any other engine component, including chamber or pre-combustion zone wall, or valve, piston or rotor head, etc. The terminal(s) on a combined device unit may be of any configuration, including dome, L-shaped member, ring, including ring coaxial with unit axis, and be of any convenient electrically conductive material, including metal and carbon.

Ignition may be along current "cold" spark principles or along principles recently under development which involve using a "hot" arc, including those systems referred to as plasma ignition, wherein the arc causes a jet of super-heated gas to be expelled rapidly through an aperture or restriction to ignite a combustible mixture. In the case of the latter ignition system being incorporated in a combined ignition and fuel delivery unit, the ignition means, whether in singular or plural form may be mounted adjacent to fuel orifices, or the ignition means could be mounted coaxially with at least portion of the device, such as nozzle. In a selected embodiment, the small area in which the arcing and super-heating of gas occurs to provide plasma ignition is additionally provided with fuel supply means, so that the same area acts as source of plasma ignition and pre-combustion zone. In another selected embodiment, portion of injection system such as a nozzle acts as one terminal of an ignition system, including arc of plasma ignition system. By way of example, FIG. 307 shows lower portion of injector fitted to engine head or block 840 formed in such a way that a pre-combustion zone 841 is created to give access to main combustion chamber 842. Injector 843*a* with injector head 843 is optionally movable rotationally and/or reciprocally, say by means of the device of FIG. 298, from the position shown solid at 860 to that shown dotted at 844 and/or any position in between, optionally to vary compression ratio. Optional sealing rings are provided at 861. Injector 843*a* is made of non-conductive material such as ceramic. Conventional type spark terminals are shown at 845, with an alternative single terminal shown at 846 for providing spark to engine wall portion 847 made of conductive material, or locally containing conductive material that is part of or linked to and electrical circuit. Alternatively, the spark can be to a metallic injector head 843. In another example, FIG. 308 shows schematically a combined injector/ignitor mounted in a head 1004 and having ceramic body portion 843*a* forming a shroud or wall 848 defining pre-combustion zone 850, containing extensible needle 849 reciprocatable in direction 1802, having central end hole 849*b* and multiple angled side holes 849*a*. Plasma or spark ignition 852 is provided between terminals 852*a*, connected to electrical circuits 851. When the needle is in its most retracted position as shown, the side holes are masked, and may optionally provide slow weeping to lubricate bearing between needle and body 843*a*. The end hole is unmasked, and during the operating cycle a small amount of fuel will leak out, shown at 1818, sufficient to create a combustible mixture in zone 850. Around the time the mixture in zone 850 is ignited, a pressure wave in the fuel supply is actuated to cause needle 849 to extend and fuel to spray from all the holes as at 810, into the main portion of the combustion chamber 842. When the pressure wave recedes, the needle returns to its retracted position. In an alternative embodiment, an initial small pressure, insufficient to move the needle, delivers a small amount of fuel 1818 to chamber 850, and a subsequent increase in pressure or separate larger pressure wave extends the needle and supplied fuel to the main chamber 842. It is a further aspect of the invention that the an injector portion be capable of reciprocal movement, to effectively provide a variable compression ratio combustion chamber or a variable capacity pre-combustion zone volume. An example was illustrated schematically in FIG. 307, where 860 and show two of many alternative positions of injector assembly 843*a*. Because the pre-combustion zone volume is integral with the combustion chamber volume as whole, varying the former volume will change the effective compression ratio. Optionally, the movement of injector head and therefore variation of pre-combustion zone size may be variable while the engine is in operation, either manually or automatically, and be dependent on such factors as temperature, starting condition, engine speed and/or load, intake charge pressure, atmospheric pressure, charge composition, fuel employed, etc. Such variable position piston or head assembly constructions are known in association with other devices and may be embodied in any appropriate manner. One way of carrying the invention into effect would be to bias, by spring loading, the injector portion toward its most retracted position against a rotatable cam operative against injector assembly base. Injector movement may be directed by any system of guides, channels, grooves, projections, depressions, ledges, cams, etc. Injector components may be of any suitable material, including ceramics, ceramic glasses, etc. Any injector head assembly of the invention may have reciprocal and/or rotational motion during each injection (to effect a slewing of injected fluid), and the degree of this reciprocation and/or rotation be made variable according to engine operation mode, say by means of cams capable of rotational and/or axial movement. By way of example FIG. 309 shows schematically a similar arrangement to that of FIG. 308, where like features have the same numbers. The difference from the previous Figure is that needle 853 has only an end orifice 849*b* and is fixed in relation to injector body 843*a*, but has mounted between it and the body a cylinder 854 reciprocatable in direction 1802. It is shown in a retracted position, but can be moved to any number of extended positions, as indicated by its lower end shown dashed at "A" and "B". Weep holes 849*a* and linking passages 845*a* optionally provide lubrication to inner and outer bearing faces of movable cylinder 854. During part of the cycle fuel 1818 has wept out of the end hole. After the mixture in zone 850 has ignited, a pressure wave injects the major portion of fuel at 810 into the combustion chamber 842. The effect of varying the extension of cylinder 854 is two-fold. It will vary the overall compression-ratio in the combustion chamber, a desirable feature, and it will vary the mixture in the zone 850, assuming no adjustment is made to fuel pressure during non-injecting portions of the cycle. As noted, the varying of the position of cylinder 854 may be during operation of the engine. It may alternatively be between operations of the engine to adjust for particular conditions, eg altitude or fuel quality, or during assembly of the engine, to provide engines of different specifications for different applications.

In an alternative embodiment, the lower portion of the injector is the form of a disc, of any form but optionally approximately circular, the disk having peripheral fluid delivery apertures. In a further embodiment, the disc rotates within the working chamber and/or reciprocates into the working chamber at least partly during fluid delivery. By way of example, FIG. 310 shows schematically two embodiments of a disc configuration injector mounted to reciprocate in direction 1802 in head 1004, in the retracted position shown partly masking pre-combustion zone 850 from main combustion chamber 842. Like features are numbered as in FIGS. 308 and 309. On the left side, an arrangement similar to that of FIG. 308 is shown, except that here the needle 855 is mounted directly in the cylinder head 1004, and has an integral disc-shaped head 856. In this embodiment, the head is of metal and is part of electrical circuit 851 for creating spark 852, via an electrical connection outboard of the head (not shown). Weep holes for lubrication of the bearing interface between needle and head are provided at 849*a*. In the embodiment of the left side, the pressure in zone 850 always matches that of the main combustion chamber. Small fluid passages in the discs are indicated by dashed lines at 856*a*, which are optionally shorter and wider than passages 858. During portion of the cycle, fuel will have leaked out of the end of the bearing interface at 859*b* and from passages 856*a*, and optionally a lesser amount from passage 858. The mixture in volume 850 is ignited by spark 852 and the resultant expansion blows needle/head assembly 855/856 into the combustion chamber 842 to position shown dashed at 856*b*, optionally against return spring loading (not shown), and a pressure wave delivers fuel in the normal way at 810 via fine passage 858. In the embodiment of the right side, the heads seats tightly in the head to mask large fuel delivery orifices 859. If the seating or seal is continuous around the circumference of the head, the pressure in zone 850 will be that of the combustion chamber when the head returned to its seat and will always be less than that at maximum compression ratio when combustion is ideally initiated. It is often desirable to initiate combustion at a pressure less than that possible during continuing combustion. If the head returns to its seat too early and the pressure in zone 850 is to low, a fine passage can be provided at 857 in the disc head 856, to slowly increase pressure in zone 850. Optionally, passage 857 is too small to permit the pressure in zone 850 to ever equalize the maximum pressure in chamber 842, within the designed cycle time. Combustion is initiated as described for the left side of the diagram. A sufficiently large orifice at 859 will reduce or eliminate the requirement for a pressure wave during full delivery, saving the power drain, cost, mass and bulk of a high-pressure fuel pump. The normal low pressure maintained in the fuel system, including to provide lubrication via passages 849*a*, can be sufficient for a sufficiently large amount of fuel to be pushed out of orifice 859 while head is clear of its seat. It is unlikely to form much of a spray and will tend to remain close to the orifice. If the temperature in the combustion chamber is sufficiently high, portion of the fuel will start combusting immediately, and the kinetics of expansion will quick distribute the remaining fuel through the chamber. This low pressure and low velocity delivery is in some ways similar to the methods of carrying fluids into a working chamber that are disclosed subsequently. In another example, FIG. 311 shows the bottom part of an injector capable of delivering two separate fluids independently, wherein a first fluid travels from "A" and a second fluid from "B". Injector body 1801 is mounted to reciprocate in direction of arrow 1802 in cylinder head 1004, and is shown in a fully extended position, with its outline when retracted and seated at 1803. Main fluid "A" moves down passage 1804 to an optionally annular fluid gallery 1805 and, optionally after a pressure wave is induced, is injected in a spray 1807 via passages 1806 when component 1801 is towards the apex of its extension. Optionally, the piston head is then in the region indicated by dashed line 1001 and the decent of component 1801 has caused charge gas to be compressed in the narrow gap between piston head and bottom of component 1801, causing an accelerated gas flow in direction 1806 across and past spray 1807, increasing the speed an efficiency of fluid/charge mixing. When the injector body returns to its normal seated position at 1803, the fuel delivery passages are masked by the head, and therefore only marginally affected by the pressures in the working/combustion chamber. Second fluid "B" enters a fluid supply chamber 1809, and when a pressure wave is induced in fluid "B", plunger 1810 lifts off its seat causing fluid to be expelled at 1811. It is intended that fluid "B" is deliverable at any time, including when component 1801 is retracted or seated. In another embodiment of the disc-shaped injector, which may either be fixed or extendable and retractable like that of FIG. 311, a fluid gallery has a spring-loaded flexible wall which bulges out when a pressure wave is induced in the fluid, and when the pressure wave recedes, the energy given up by the wall returning to its original position induces a smaller secondary pressure wave in reverse direction to the first. This second wave may serve either to balance the fluid delivery system, or to cause addition fluid to enter the working volume, or both. By way of example, FIG. 312 shows the lower portion of such an injector body 1801, here reciprocating and shown at the lower limit of travel, with fluid entering from "A" to flow down passage 1804 into gallery 1805. When a pressure wave in the fluid is induced, spring loaded gallery wall 1812 bulges out to position shown dashed at 1813 and fluid is injected at 1807 into the working chamber 1002. When the main pressure wave stops, the return of wall 1812 causes the extra fluid in gallery 1805 to also be injected, thus extending the injection period somewhat, and simultaneously causes a secondary smaller reverse pressure wave in passage 1804. Again, when the injector body returns to its normal seated position at 1803, the fuel delivery passages are masked by the head. In an alternative embodiment, component 1801 is already partly retracting as the main pressure wave recedes, and the spring action of wall 1812 serves mainly to create a reverse pressure wave in passage 1804.

Figure 314:
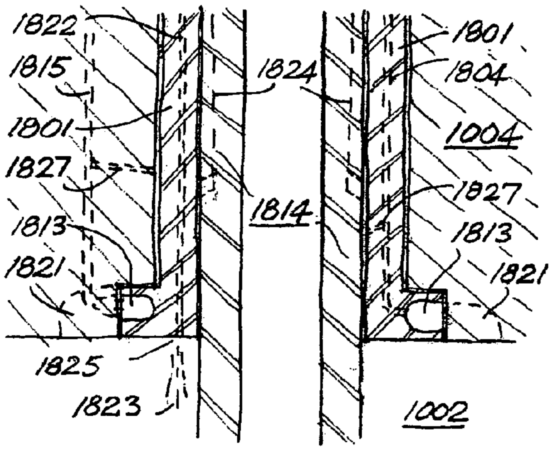
Figure 315:
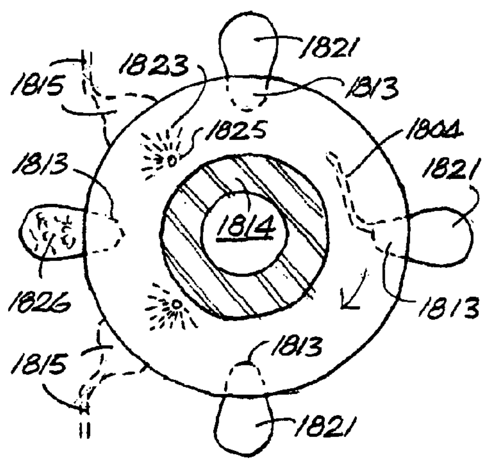
Figure 313:
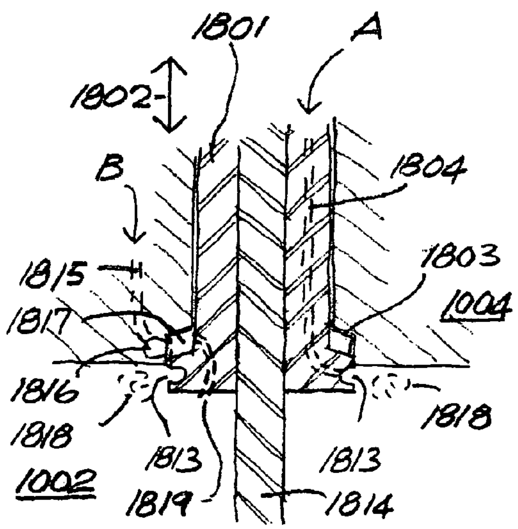
Figure 316:
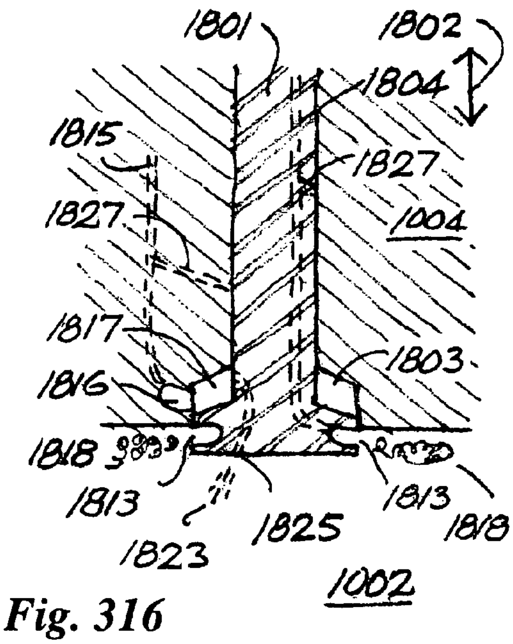
Figure 317:
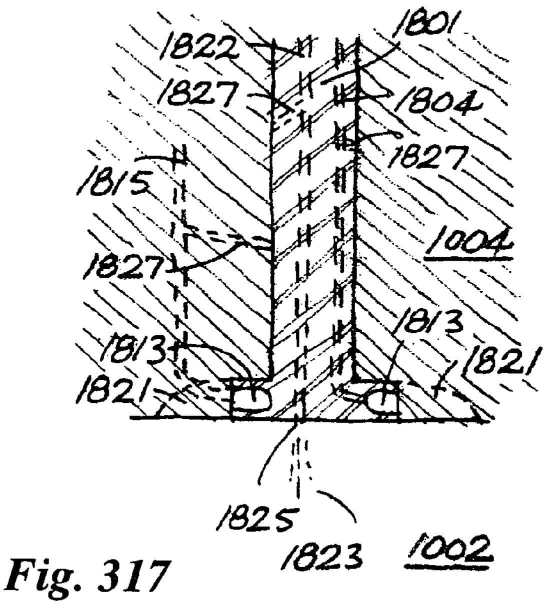
Figure 318:
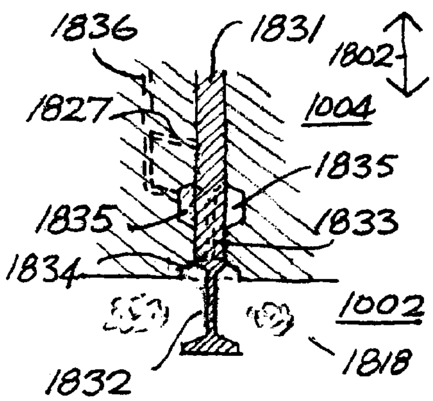
Figure 319:
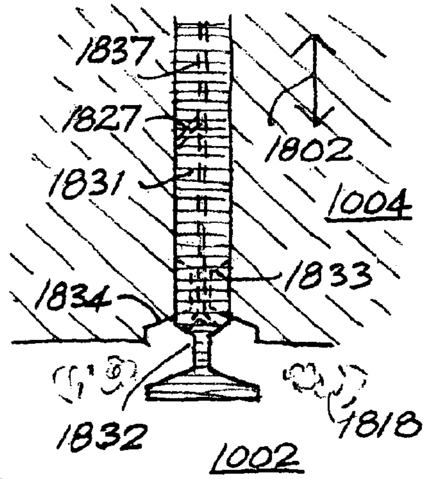
Figure 320:
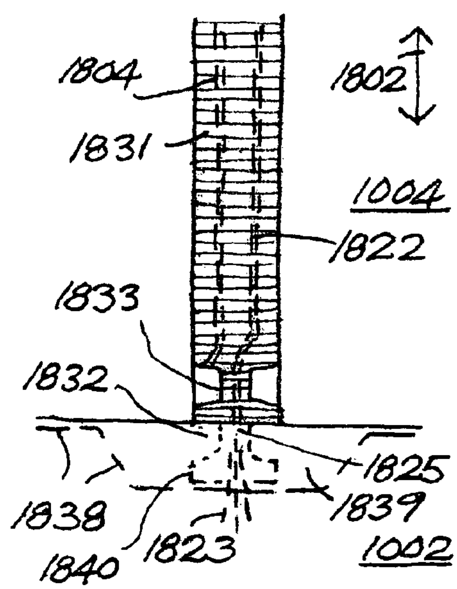

In a further embodiment, the fluid delivery device has little or no injection action, and instead carries fluid into the working chamber at an appropriate time in chamber operating cycle. In some IC engines operating at very high temperature, it may not be necessary to expend energy to inject or force fuel into the combustion chamber at high pressure to ensure wide distribution of the fuel. A pocket of fuel when carried into or exposed to the combustion chamber in some manner will start to combust virtually instantaneously, especially if the fuel is to some degree pre-heated. The combustion of the first of the fuel at the point of delivery is likely to cause a sufficiently rapid expansion of the first products of combustion, so that the kinetic energy of expansion will ensure the effectively immediate distribution of the remaining fuel through the combustion volume. Another version of the disc injector disclosed earlier can serve to carry fluid into the working volume, as opposed to injecting it. By way of example, FIG. 313 shows two embodiments in parallel, wherein part of a reciprocating fuel delivery device 1801 is mounted in head 1004, and is shown in its extreme extended position, when fluid delivery is taking place. When it is not, the device returns to its seat and its lower face is approximately flush with head working chamber surface. Circumferential depression(s), which may be discrete or continuous and/or annular 1813, are mounted in the perimeter of the disc, which is here shown centered on tensile member 1814, with both injector body 1801 and tensile member 1814 capable of independent reciprocation in direction 1802. Two alternative methods of low-pressure or "no-pressure" fluid delivery are shown. On the right side, fluid "A" flows down passage 1804 to pool in depression(s) 1813 when component 1801 is retracted or seated as shown dashed at 1803. On the left the procedure is similar, except that fluid "B" has also pooled in some kind of depression 1816 formed in the head. In both cases, when component 1801 extends, the fluids sitting in the depressions 1813 will inter act with the fluid in the working volume 1002. In the case of "A" or "B" being a fuel, local vaporization or boiling is likely to take place in the region of 1818. On the left side, while 1801 is extended volume 1817 has wholly or partly filled with fluid. As 1801 returns to its seated position it can force fluid back up passage 1815, creating a significant reverse pressure wave. Additionally or alternatively, the fluid in volume 1817 can wholly or partly be forced or injected into the working chamber 1002 via passage(s) 1819, angled in any convenient direction. In an alternative of the embodiment shown in the left side of FIG. 313, only a small quantity of fluid is delivered via depression 1813, which initiates combustion in chamber 1002, which is then fed a major portion of fuel via passages 1819 when component 1801 returns to its seat. In other embodiments, the fuel delivery device may rotate instead of reciprocate. By way of example, FIG. 314 shows in partial section and FIG. 315 in plan view from the combustion chamber two alternative embodiments in parallel. A rotating fuel delivery device 1801 is mounted on a tensile crank link or rod portion of a piston/rod assembly 1814, which both reciprocates and rotates once in every four reciprocations, and is hollow to permit gas flow to or from the combustion chamber(s). Device 1801 is keyed at 1824 to hollow rod 1804 so that it only rotates with the rod but does not reciprocate, being restrained from doing so by any convenient means (not shown) within or above the head 1004. On the right side, fuel passage 1804 within the device fills volume 1813; on the left side, fuel passage 1815 in the head fills volume 1813. There are four volumes 1813, spaced 90 degrees apart. In the head are four depressions also mounted 90 degrees apart, each effectively a type of pre-combustion zone. FIG. 315 shows volumes 1813 aligned with and exposed to depressions 1821, permitting the fuel carried in the volumes to combust, as indicated schematically at 1826. In the embodiment shown on the left side, as the device rotates through approximately 45 degrees, the volumes are aligned with fuel delivery passage 1815, allowing the volumes to be refilled with fuel. On the right side, the volumes are refilled from passage 1804 during their approximately 90 degree travel to the next depression 1821. In the case of either embodiment, the device 1801 may also deliver at least one other fluid, indicated schematically on the left side by passage 1822, small aperture 1825 and spray 1823 into combustion chamber 1002. Here fluid delivery is by pressure wave down passage 1822, but any convenient method of delivering a fluid may be used, including the methods disclosed herein. In another embodiment, rod 1814 does not rotate and there are no keys 1824. Instead, the rotation of device 1801 is effected by any convenient means, including mechanical or electric drives mounted in or above the head. If either the fuel and/or the secondary fluid have lubricating properties, secondary passages as indicated on each side at 1827 can be provided to the bearing surfaces. In other embodiments, the fluid delivery devices do not surround a tensile crank link or piston/rod assembly, but are stand alone devices mounted at any convenient location in the cylinder head or other portions of the structure enclosing the working chamber. By way of example, FIGS. 316 and 317 show stand-alone equivalents of the twin embodiments of FIG. 313 and the twin embodiments of FIGS. 314 and 315, respectively. A plan view from inside the working chamber of the embodiments of FIG. 317 would be as FIG. 315, but with central member 1814 removed. Like features are similarly numbered. Secondary passages 1827 provide fluid for lubrication to bearing surfaces. In further embodiments, stand-alone devices are small and light and have an almost needle-like configuration, especially if reciprocating. One embodiment is shown by way of example in FIG. 318, wherein needle-like fluid delivery device 1831 mounted in head 1004 and reciprocating in direction 1802 is shown in fully extended position, with combustion in chamber 1002 taking place at 1818. What was previously volume 1813 is now an annular circumferential depression 1832, which is shown dashed at 1833 when the device is in retracted position and sitting on its seat 1834. In that position, depression 1832 is filled with fluid from one or more depressions in the head 1835, which may be annular, supplied with fluid via passage 1836. Optional secondary passage at 1827 supplies fluid to bearing surface. In another embodiment, the needle-like fluid delivery device has an internal passage supplying fluid, as shown schematically in FIG. 319, wherein like features are numbered as in FIG. 318. Fluid from central passage 1837 fills annular depression 1832, shown dashed at 1833 when device 1831 is on its seat 1834. The device 1831 may be constructed along the lines of a poppet valve, with a spring above the head returning it to its seat, and be actuated by any convenient means, including electric solenoid or rocker arm. In a further embodiment, the fluid delivery device is inserted from above the head, which incorporates by any convenient means a stop to insure that, in the retracted position, the tip of the device is more or less flush with the head surface to the working chamber. Such an inserted-from-above device may carry a plurality of separate fluids to the working chamber, and the devices of FIGS. 318 and 319 can be adapted to do so. By way of example, portion of an inserted-from-above device is shown schematically in FIG. 320, in which similar features are as numbered in preceding Figures. Device 1831, reciprocating in direction 1802 and shown in retracted position, has a passage 1804 for lower pressure fluid flow to annular or otherwise shaped depression(s) 1833, and a separate passage 1822 supplying the same or another fluid to working chamber 1002. Fluid deliver via passage 1822 and aperture 1825 may be by any convenient means, including by pressure wave to cause spray at 1823. When device 1831 is extended to position shown dotted at 1840, any fuel carried in volumes 1833 will be exposed to the working chamber and combust, as indicated at 1818. The piston, shown dashed in TDC position at 1838, may optionally have a depression 1839 to accommodate the device when extended and, in the case of IC engines, depression 1839 may effectively comprise a pre-combustion zone.

In a selected embodiment, fluid delivery actuation and/or valve actuation is directly effected by reciprocal motion of the piston/rod assembly, by any convenient means. Such means include a rocker device, one end of which actuates a fluid delivery device or activates a valve, the other end of which communicates with a projection or depression in or other part of a portion of the piston rod assembly, optionally that portion which penetrates the head and which is located in a volume above the head. The number of ways mechanical linkages can be employed to effect actuation is virtually limitless; here two examples are illustrated schematically. Vertical section FIG. 321 and plan section FIG. 322 show a fluid delivery device 861 having a crescent-shaped head 862, while vertical section FIG. 323 and plan section FIG. 324 show a poppet type valve 863 having a crescent-shaped head 864, with views arranged about a common center-line. In each example, the hollow piston/rod assemblies 1206 reciprocating in direction 1802 are virtually identical, and the Figures show the fluid delivery device and the valve at maximum projection from the head 1004 into the working chamber 1002, whose cylindrical face is indicated at 865. Both fuel delivery device and valve have a collar 866 and coil spring 867 to return them to a retracted position on a seat in the head. Considering FIGS. 321 and 322, the fluid delivery device is somewhat similar to that of FIG. 316, having a central passage 1831 to full multiple depressions 1813 located in the vertical face of the crescent shaped head, with fluid supplied to the top of the device via flexible and optionally coiled fluid line 868 and olive 869 and collar 870. The piston is shown at or close to top dead center as fluid is delivered. A split or “Y” shaped rocker 884 is pivoted about axis 871 on two widely spaced brackets 872 mounted on the head by means of fasteners 883, with the two arms 873 rising and converging to hold a roller 874, with the two forks of the “Y” converging at lower level in a bowl shaped surface 875, with a hole for the device 861 to pass through, which depresses the spring collar 866 during actuation. Actuation is effected by the roller passing over a cam 876 in the form of a ring screwed to the top of the rod portion of the piston rod assembly, optionally using a thread of sinusoidal cross-section 877, and located by keys 878. Screwing the cam up and down on the rod will permit variation of timing and degree of extension of device 861. Considering FIGS. 323 and 324, the arrangement shown is suited to piston rod assemblies which only reciprocate, or simultaneously reciprocate and rotate. The piston is towards bottom dead center as the valve is open, optionally to admit charge air from above-the-head volume 879 via port 880. A different “Y” shaped rocker is pivotally mounted about axis 881 on two brackets 882 attached to the head by fasteners 883 and separated from it by variably installable and removable shims 884. The two arms of the rocker 885 converge in a plate 886 having a depression to receive the top of the valve stem and which terminates in an axle 887 on which a wheel 888 is rotatably mounted. The wheel engages with a different cam 876 screwed to the top of the piston rod, optionally using threads of sinusoidal cross-section 877, and located by means of key 878. In embodiments where the piston also rotates, the cam face will optionally have segments of approximately sinusoidal configuration, as indicated schematically at 889. The embodiments of FIGS. 321 through 324 are by way of example; any mechanical system can be used to cause the reciprocal and/or rotational movement of the piston and/or piston rod assembly to directly actuate the delivery of fluid to the working chamber and/or to open and close a valve communicating with a working chamber. The principles of fluid delivery disclosed herein can be embodied in any kind of reciprocating or rotating device. Any of the features relating to fluid delivery in this disclosure may be combined in any way with each other and with other features and devices, to form embodiments not specifically described herein. For example, the injectors of FIGS. 308 through 310 may be rotatably mounted in the heads. In the description and illustration of fluid delivery devices, including those shown in FIGS. 293 through 324, they generally show embodiments more suited to liquids, whether fuel or other substances. Where applicable, the principles disclosed may also be employed to deliver gases, or mixtures of gases and liquids, whether fuels or other substances.

Because the new engines will have a significantly better power density than conventional reciprocating engines, and perhaps also better than conventional turbines, they are suited to aircraft in general and those with propellers or rotors in particular. In the case of helicopters, the lightness of the un-cooled engines enables then to be placed, for example, just under the rotors without seriously affecting overall craft balance. Two engines to provide maximum desired performance can be employed to directly or indirectly dive a rotor shaft to which blades are attached, with each engine separately engagable and dis-engagable. If one engine fails, it can be disengaged, to permit the other engine to power the craft to safety at lower speed. In a selected embodiment, a helicopter is powered by a hybrid electric/IC engine system, using the engine(s) of the invention and or any other IC engine. In a further embodiment of a hybrid powered helicopter, half of an electric motor is part of the rotor shaft, and the other half is mounted on or part of a fixed rotor post, with the motor driven by a generator powered by one or more engines of the invention, mounted in any convenient location. The motor is driven either directly or via a controller, which is optionally linked to an energy storage system of any kind, including a battery pack or capacitor or flywheel. The energy storage system can additionally and optionally be replenished by photo-voltaic cells mounted on the craft, and it can also be used to drive a second rotor, including a tail rotor. In a further embodiment, a safety emergency parachute is housed within the fixed central post on which the rotor shaft is mounted. The central post optionally incorporates or is attached to the stator of an electric motor. In the event of engine or rotor failure, the parachute would be automatically or manually deployed to both slow the craft descent and to ensure that it was properly aligned to land on its wheels or skids. In another embodiment, the landing wheels or skids are attached to the craft by energy absorbing devices, which progressively decelerate the craft on landing, and/or energy absorbing devices are incorporated in the seating of crew and passengers. By way of example, schematic FIG. 325 shows a sectional plan through a fixed hollow rotor mounting post 4601 on which rotor shaft 4602 is rotatably mounted. Part of craft sides are indicated at 4603, and overhead rotor blades are shown dashed at 4604. Two alternative drive arrangements are shown. In the lower part of the Figure, engine 4605 has a drive shaft terminating in a toothed gear 4606, optionally small, which is engagable and disengagable with toothed gear 4607, optionally large, mounted on the rotor shaft 4602. In the upper portion of the Figure, engine 4605 drives the rotor shaft via transmission 4644 having an output shaft terminating in a toothed gear 4606. In another embodiment, the transmission has variable drive ratios. Such variable ratios are useful for varying the relative thrust generated by the propulsion device or blades in relation to the power generated by the IC engine, to adapt to different forward speeds, different operating conditions and different weather. If main rotor direction is clockwise as indicated at 4608, then each engine drive shaft is turning anti-clockwise. Whether two engines or two engines driving two transmission are used, each system is separately disengagable in should it fail, leaving the craft with power from one system to make an ordered landing. Alternatively, any convenient mechanical drive between one or more engines and the rotor shaft may be employed. In an example of another embodiment, FIG. 326 shows schematically in longitudinal vertical central section a hybrid craft, with direction of normal motion indicated at 4700. One or more engines 4605 and linked electrical generators 4609 are mounted under a front seat, with a battery pack 4611 and electrical controller 4612 mounted behind under a passenger seat, and two photovoltaic panel assemblies 4613 shown dashed mounted on the craft roof. Skids 4614 are attached by struts 4615 designed to crumple and absorb energy on impacts much greater than those caused by normal landing. Electrical supply shown dashed from generator 4616 and from photovoltaic panels 4617 goes to battery via controller; power output shown dashed from generator or battery via controller goes to main rotor blades 4620 at 4618 and to tail rotor 4621 at 4619. The stator portion 4625 of an electric motor is attached to mounting post 4601 which is integral or attached to base 4623, which is securely fastened to craft structure by anchors 4624. The rotor portion 4622 of the electric motor is attached to the inside of blade rotor shaft 4602, which pivots on roller or other bearing 4626 on base 4623. A packed parachute 4627 is fitted into fixed mounting shaft 4601 above an explosive-type device at 4628. The mounting post may be fitted with a shroud 4629 to protect the electric motor from the elements, and to reduce the risk of lines tangling with the main rotor blades 4620 when the parachute is deployed, shown dashed at 4630. Optionally, the parachute enclosure has a lid 4631, which in a selected embodiment remains attached to the top of the parachute as it deploys. In an emergency, the explosive device is triggered to project the folded parachute upwards in direction 4632 in such a manner that it unfolds to the proper form shown dashed at 4630. The art of projecting packed parachutes from housings is well known, for example in automotive drag racing. The art of projecting large objects of substantial mass upwards is well known, as for example in the ejection of pilot plus seat plus parachute in military aircraft. The mounting post will need a substantial floor or base 4623 to withstand thrust loads when the parachute is deployed. The parachute contained in a fixed mounting post 4601 can equally be provided in the embodiment of FIG. 325.

In a further embodiment, the engines of the invention may be used in any fixed wing aircraft, either to in part propel the craft through the air, or to power one ore more ancillary systems aboard the aircraft. Noise is an important restriction on the movement of aircraft in general, and small airports in particular. Many airports the world over have a decibel limit on the noise permitted during the day, and a lower limit or a ban on flying at night time. Because the engines of the invention are generally inside thermally and acoustically insulated housings, the engines themselves will produce virtually no noise, and aircraft with such engines will be able to use airports when normally-engined aircraft cannot. The new engines have better power-to-weight ratios, so the aircraft either can be made lighter and more economical and therefore use shorter runways, or the craft can carry a greater load. They will also have better power-to-bulk ratios, so wing mounted engines will be less bulky and present less air resistance. They are un-cooled, so airflow does not have to be directed to engine cooling, with consequent loss of aerodynamic efficiency, as is the case with conventional engines. This lowered air resistance and improved drag will lead to further fuel efficiencies and economies. Perhaps most importantly, the new engines will be much more efficient, so less fuel is needed for a given travel distance, so again the aircraft either can be made lighter and more economical, or can carry a greater load. FIG. 327 shows schematically by way of example a single-engined light aircraft 4641 with a propulsion device 4642, optionally a propeller but alternatively a wholly or partly shrouded impeller or propeller or fan, with direction of normal motion indicated at 4700. Inside the fuselage is a starter motor 4643 coupled to a transmission 4644 in turn linked to the engine of the invention in an insulated housing 4645, all shown dashed. In another embodiment, the transmission has variable drive ratios. Such variable ratios are useful for varying the relative thrust generated by the propulsion device in relation to the power generated by the IC engine, to adapt to different forward speeds, different operating conditions and different weather. The location of the starter motor may be in any convenient alternative position, including between engine and any transmission or on the opposite side of the engine to the propeller. In the configuration of FIG. 327, all the mechanical systems except the propeller are accessible from within the craft. In a further embodiment, the engine and/or any transmission is packaged in the form of a "snap-in" module, as disclosed elsewhere herein. In another embodiment, an aircraft may be powered by a hybrid electric/IC engine drive system, using the engine of the invention or any other IC engine. By way of example, FIG. 328 shows schematically a twin propeller light aircraft 1651 in section through a propulsion/power assembly, with direction of normal motion indicated at 4700. This comprises a propulsion device 4642 mounted on a rotatable shaft 4654, the shaft in turn mounted in bearings 4653 affixed to portion of aircraft structure within motor cowling 4652. The propulsion device is optionally a propeller, but alternatively is a wholly or partly shrouded impeller or propeller or fan. A rotor portion 4622 of an electric motor is attached to or forms part of shaft 4654, while a stator portion 4625 of the motor is affixed to air craft structure within the cowling. This craft has an energy storage system such as a flywheel or a battery pack at 4611, linked to a controller at 4612, with energy provided by twin sets of generators 4609 powered by IC engines 4505. Electrical power supply to wing motors is shown at 4618. One or more optional photovoltaic array assemblies 4613 are mounted on fuselage, with supply to controller shown at 4617. Additionally or alternatively, photovoltaic array assemblies 4655 may be mounted on the aircraft wings. In this arrangement, every part of the aircraft drive system, except the propellers and electric motors on the wings, is accessible from within the aircraft during flight.

Figure 432:
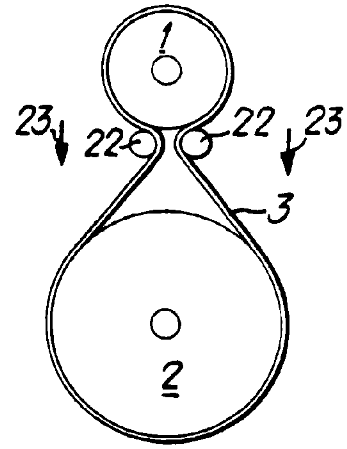

Optionally, the engines in the helicopters or aircraft disclosed are the engines of the invention, which can be thermally, acoustically and vibrationally insulated to any degree, whether mounted inboard a helicopter or winged aircraft, or mounted outboard in any convenient location, including on the wing. In a selected embodiment, the compound engines of the invention are adapted for aircraft use by having a reciprocating IC engine first stage driving one or more wholly or partly shrouded impellers or propellers or fans, with hot high pressure exhaust from the reciprocating engine used to wholly or partly drive a turbine or jet. The principles of using a reciprocating engine to power a turbine in a compound IC engine have been disclosed previously herein, and are illustrated schematically and described in relation to and schematically illustrated by FIGS. 14 through 19. The adaption of the compound engine of the invention to aircraft of any kind, including helicopters, may be made in any convenient way. By way of example, FIG. 329 shows a schematic layout of a reciprocating/turbine compound IC engine located in a nacelle or housing 4730 and driving a conventional propeller 4661 generating thrust at 4666. The propeller is driven by the reciprocating engine stage 4662 which takes in air at 4664, with direction of normal motion indicated at 4700. Hot high-pressure engine exhaust wholly or partly drives the turbine stage 4663, which has optional provision for by-pass air at 4665, to generate thrust at 4667. Optionally, the propeller is directly or indirectly mechanically linked to the turbine stage by a rotating shaft 4668. If the optimal rotational speed of reciprocating stage output shaft differs from that of the turbine stage shaft, an optional transmission is placed between them, as indicated schematically at 4644. In another embodiment, the transmission has variable drive ratios. Such variable ratios are useful for varying the relative thrust generated by the propulsion device in relation to the power generated by the turbine stage, to adapt to different forward speeds, different operating conditions and different weather. Optionally, any pollutant and/or CO2 removal system, including as disclosed herein, can be placed in the hot high pressure exhaust gas flow between the reciprocating stage and the turbine stage, as indicated at 4722. In another example, FIG. 330 shows a schematic layout of a compound engine driving wholly or partly shrouded contra-rotating impellers or propellers or fans 4671, with direction of normal motion indicated at 4700. A shroud or cowling 4672 is attached to the compound engine by means of struts or fins 4673, with the reciprocating engine stage taking in air at 4664 to power the contr-rotating propulsion devices 4671, which create thrust at 4666. Hot high-pressure engine exhaust wholly or partly drives the turbine stage 4663, which has optional provision for by-pass air at 4665, to generate thrust at 4667. Optionally, the propeller is directly or indirectly mechanically linked to the turbine stage by a rotating shaft 4668. Optionally the front of the shroud has a protective grille 4674, to prevent the ingestion of birds and other objects. The blades of the grille are optionally so aligned as to properly proportion the flow of air within the shroud, or to direct more air to one zone than another. Optionally, any pollutant and/or CO2 removal system, including as disclosed herein, can be placed in the hot high pressure exhaust gas flow between the reciprocating stage and the turbine stage, as indicated at 4722. In a further embodiment of a compound reciprocating/turbine IC engine, a reciprocating engine stage does not drive any propulsion device directly, but is used solely to generate hot high pressure gas for the turbine stage, to which it may be mechanically linked. By way of example, schematic FIG. 331 shows such a compound engine in a nacelle or housing 4730, with direction of normal motion indicated at 4700. The enclosure to the reciprocating engine stage 4662 extends forward at 4674 to support a protective grille 4674 through which air 4664 for engine 4662 passes, the grille serving as a shield to prevent ingestion of foreign matter, including birds. The hot high pressure reciprocating engine exhaust at least partly powers the turbine 4663 stage, which generates thrust at 4667. Optionally, by-pass air for the turbine is provided at 4665. The IC engine is optionally directly or indirectly linked to the turbine by shaft 4668. If the optimal rotational speed of reciprocating stage output shaft differs from that of the turbine stage shaft, an optional transmission is placed between them, as indicated schematically at 4644. In another embodiment, the transmission has variable drive ratios. Optionally, any pollutant and/or CO2 removal system, including as disclosed herein, can be placed in the hot high pressure exhaust gas flow between the reciprocating stage and the turbine stage, as indicated at 4722. The engines of FIGS. 329 through 331 can be attached to or mounted on aircraft in any way, including on wings or tailplane and/or on or in the fuselage. In practice, if the engines are mounted outboard, the schematic single line the housing 4730 of FIGS. 329 and 331 would represent a double-skinned nacelle, as shown more realistically in FIG. 330. By way of example of an inboard mounted engine, FIG. 432 shows schematically a compound reciprocating/turbine IC engine mounted in the rear portion of an aircraft 4734 having tailplane 4732 and high-mounted rear wing 4733, with direction of normal movement indicated at 4700. The engine is that of FIG. 330, with propellers or fans 4671, reciprocating stage 4662 and turbine stage shown dashed in outline. The housing 4730 for the engine and fans is within the fuselage, with air supplied via optional ram effect at 4723 to enter the fuselage 4734 and housing 4730 via externally mounted scoop 4731. In practice, the housing is likely to create a bulge in the exterior skin around it, which may flare out to tubular form at the rear to accommodate the turbine stage. Optionally, the air is partly accelerated and/or compressed by the fans for the reciprocating engine stage, especially if it is a two-stroke, and to a degree also for any extra or by-pass air for the turbine, which creates thrust at 4667.

In a further embodiment suited to hybrid powered aircraft including helicopters, a compound reciprocating/turbine is used to power a generator, with the turbine stage of the compound engine used to crate thrust to assist in driving and/or steering the aircraft. In another embodiment, the different components of a compound can be relatively widely separated, to distribute weight, to reduce resonance and/or vibration, or for any other reason. The different components of a hybrid system can be positioned in any convenient location and in any convenient orientation. By way of example, a schematic elevation of a rear portion of an aircraft—either fixed wing or helicopter—is shown in FIG. 333, where 4701 is the rear portion of a fuselage, 4702 the base of a tail assembly—which in the case of helicopters optionally includes a rotor—and where direction of normal motion indicated at 4700. Items within the interior of the fuselage are shown dashed, including one or more generators 4703, electrical power supply 4704 to controller or motor (not shown), drive shafts 4705 and universal joints 4706, reciprocating engine stage 4707 and turbine stage 4708. The two stages are separated by a passage 4709 surrounded by thermal insulating material 4710 which transfers hot high pressure exhaust gas from the reciprocating engine stage to the turbine stage, which creates thrust at 4667. Air intake cowlings are provided in the surface of the fuselage, at 4711 for the reciprocating engine and optionally at 4712 for turbine stage bypass air. Optionally, any CO2 removal system, including as disclosed herein, can be placed in the hot high pressure exhaust gas flow between the reciprocating stage and the turbine stage, as indicated at 4722. In a further embodiment, suited but not limited to helicopters, the direction of turbine thrust is controlledly varied. By way example, FIG. 334 shows a schematic plan view of a helicopter, wherein the rear rotor is optionally replaced with a turbine stage having directionally variable thrust. The movement of the main rotor, outline shown dashed at 4713 will tend to rotate the fuselage 4714 in clockwise direction 4715. Turbine exit gas passes through an adjustable deflector tube 4716 to create thrust in direction 4667, which will tend to rotate fuselage anti-clockwise sufficiently to cancel out main rotor rotational loads and permit regular forward travel in direction 4700. When change in direction is desired, the thrust deflector tube 4716 is angled to new positions shown dashed at 4717. In addition to the thrust tube axis being variable in a horizontal plane, it may also be variable in a vertical plane (not illustrated). In an alternative embodiment (not illustrated), thrust is defected by means of an adjustable pitch airfoil, fin, flap or rudder. Eliminating the mass and cost of the rear rotor and its drives and substituting a turbine which serves both to provide substantial additional thrust and to balance the craft is an important advantage, leading to greater fuel economy. It is estimated that a reciprocating/turbine compound engine can be so configured as to have between 15% and 40% of total net power directed as thrust, with balance used to power an electrical generator.

In another embodiment, a compound reciprocating/turbine IC engine may have widely separated portions. A reciprocating stage may drive a propulsion device at the front of the aircraft, with hot high pressure exhaust gas transferred from the reciprocating stage via optionally thermally insulated passage to a turbine stage mounted elsewhere, including on a wing, in a projecting nacelle or at the rear of the aircraft. By way of example, FIG. 335 shows schematically a light fixed-wing aircraft 5721, with a front end similar to that of FIG. 327. Items within the aircraft fuselage are shown dashed. The reciprocating stage 4545 of the compound engine drives the propulsion device, here a propeller 4642, via a transmission to generate thrust at 4666, with a starter motor 4643 placed between propeller and transmission. In another embodiment, the transmission has variable drive ratios. Hot high pressure exhaust gas from the reciprocating engine travels via optionally thermally insulated passage 4709 to wholly or partly power the turbine stage 4708, which generates thrust at 4667. An air scoop for the reciprocating stage is provided at 4711, with an optional second scoop for turbine bypass air at 4712. Optionally, any CO2 removal system, including as disclosed herein, can be placed in the exhaust gas flow to the turbine stage, as indicated at 4722. In a further embodiment, an electric motor mounted in a nacelle or housing drives a propulsion device and has a turbine stage mounted behind it in the same nacelle or housing. The turbine stage is part of a compound reciprocating/turbine IC engine, with the reciprocating stage mounted elsewhere, optionally inside the aircraft fuselage. An optionally insulated passage conducts hot high pressure exhaust from the reciprocating stage to the turbine stage via a hollow strut or fin supporting the nacelle. By way of example, FIG. 336 shows schematically a nacelle 4672 attached to the fuselage 4701 of a helicopter, fixed-wing or lighter-than-air aircraft, by means of a hollow strut or fin 4553. In the nacelle is an electric motor 4699 driving the propulsion device 4671 to generate thrust at 4666, with an optional air scoop provided at 4720 to provide cooling for the motor. Behind it is the turbine stage 4663 of a reciprocating/turbine IC compound engine. Another part of the aircraft houses the reciprocating stage, from which hot high pressure exhaust gas is ducted through the strut 4553 via optionally thermally insulated passage 4562. Optionally, any CO2 removal system, including as disclosed herein, can be placed in any convenient location in the hot high pressure exhaust gas flow between the reciprocating stage and the turbine stage, here in the fuselage as indicated at 4722. It enters at 4697 to wholly or partly power the turbine stage 4663 and create thrust at 4667. The reciprocating stage elsewhere in the aircraft powers a generator, also elsewhere in the aircraft. The generator supplies electrical power for the motor 4699 either directly or via a controller, located elsewhere in the aircraft. Optional scoops are provided at 4665 to provide any turbine bypass air. The central rotating shaft systems 4668 of the motor and the turbine are optionally co-axial, and may be mechanically linked either directly or by a transmission 4644. In another embodiment, the transmission has variable drive ratios. In addition to the exhaust gas passage 4562, the strut 4553 houses electric power circuits 4557 and electronic motor, turbine and sensor controls 4558. The power unit of FIG. 336 can be mounted on or in an aircraft in any convenient way, and can drive propellers or fans which are open or shrouded. For example, it may drive shrouded fans in a nacelle in a layout similar to that of FIG. 330, where an electric motor would replace the reciprocating stage 4662, and hot high pressure exhaust gas would be ducted to the turbine stage 4663 through the nacelle, which could be mounted on a hollow strut or fin, in the manner of FIG. 336. In another embodiment, twin power units are mounted on a hybrid electric drive aircraft, as shown in schematic plan view FIG. 337 of a twin engined light aircraft 4725, with direction of normal movement indicated at 4700. The upper surface 4726 of the main wings are entirely covered by photovoltaic arrays, shown broadly hatched, except for the leading edges 4736 and the flaps 4727. Power units are mounted in nacelles 4730, attached to the aircraft by hollow struts or airfoils 4553, which here function as tail wings and have flaps 4737, and there is a tailplane 4738 with rudder 4739. Each nacelle contains the basic power unit of FIG. 436, except that electric motor 4699 is driving shrouded blades 4671 and is supported by internal hollow struts 4729 to create a partially circumferential volume 4728 for air to the turbine stage 4663 of a compound reciprocating/turbine IC engine, with the fan and turbine stage in variable proportion creating thrust at 4667. Optionally, the air is partly accelerated and/or compressed by the fans for the turbine stage. In the fuselage of the aircraft, each compound engine reciprocating stage 4662 drives an electrical generator 4609 which supplies an energy storage device 4611, which in turn supplies power to electric motors 4699 in the nacelles, via optional controller 4612. Hot high pressure exhaust from both reciprocating stages is discharged into a common exhaust gas treatment system 4722, which may remove any substance from the gas including CO2, and from there flows via common optionally thermally insulated passage(s) 4740 via passage split to the turbine stages in the nacelles. At the split, there is a flap or gate 4741, pivoted at the rear at 4742, which is controlledly pivotable in direction 4743, which apportions the flow of hot gas according to each power units requirements. For example when banking or turning, one turbine stage is likely to generate mote thrust than the other, and will require proportionately more hot gas. In a further embodiment, a compound reciprocating/turbine IC engine has one reciprocating stage provide hot high pressure gas to multiple turbine stages. Two reciprocating stages and two generators are shown in FIG. 337 for reasons of safety, but they could be replaced by a single larger engine and a larger generator, with gas from one reciprocating stage powering two turbine stages. The nacelles with their power units are shown supported on hollow struts attached to the fuselage, but the struts and nacelles could alternatively be mounted on the main wings and a separate tail wing provided. Alternatively the power units and associated housings could be mounted integrally with the main wing and/or integrally with the fuselage, along the line of the arrangement of FIG. 332. All and any features described in relation to electric hybrid drive systems in aircraft using compound engines can equally, where appropriate, be used in marine craft, with turbine stages discharging either above or below water.

In a selected embodiment, a winged aircraft has selectively extendable/retractable wing or airfoil extremities, either at the main wings, at secondary wings, or at any optional vertical tail wing or airfoil. Such a wing extension would provide greater lift at slower speeds, while also providing greater drag. The drag is proportionately much less at lower speeds that at higher speeds. An aircraft with variable wing extremities extended can take-off at lower speeds from shorter runways. It will be traveling more slowly close to take-off, making it easier and more safe to abort take-offs. If an emergency occurs while traveling at normal speed, previously retracted wing extremities can be extended to provide greater gliding capability and lower stall speeds, the reduction is speed making any emergency landing more manageable. Presently, safety regulations require aircraft crossing large expanses of ocean to have four engines. An aircraft having two engines with the added safety of variable wing extremities may qualify to meet the overall safety standards the international community expects during large ocean crossings. Any convenient means may be employed to effect variable wing extremities, including any of the embodiments, constructions and features disclosed herein in relation to hydrofoils for marine craft. The fundamental principles involved in the art of hydrofoils and the art of airfoils are the same, since they concern fluid flow, and water and air are both fluids. In a selected embodiment, the skin of a wing extension is of a fabric or other material folded in a bellows-like manner when the wing extension is retracted. By way of example, FIGS. 338 through 340 show schematically a bellows-style wing extension, with FIG. 338 a plan view, FIG. 339 a longitudinal section at "A" and FIG. 340 a cross-section at "B", with direction of forward travel indicated at 4680. The wing extension terminates in a fin or vertical airfoil 4681 which is extended/retracted by means of tubes 4683 mounted in cylinders 4684 in turn mounted in main wing portion, optionally actuated hydraulically. The fabric or skin 4685 of the wing extension is attached to the fin 4681 at one end and to the vertical face 4686 of a recess 4687 of the fixed portion 4682 of the wing at the end. Within the fabric or skin vertical sheets or ribs or formers 4688, shown in dashed line in FIG. 338 and solid line in FIG. 339, are attached to the skin at regular intervals, the sheets or ribs or formers having holes to accommodate actuating tubes 4683. The sheets or formers are optionally separated by a series of energy absorbent devices, optionally coil springs 4689*a* of varying radius so that they can be folded flat, arranged on axes 4689. The springs are biased to load the extension into an extended or retracted position. Symbolic fold lines 4690 in the fabric are shown in FIG. 438 to illustrate the principle of bellow-like construction, but the fold lines could be of any configuration in any number in any location. Similarly, the clearance space 4691 between the tubes and the skin is shown symbolically only; its actual dimension will depend on the folding design for the fabric or skin 4685. To retract the extension, the tubes are withdrawn into the cylinders, pulling fin 4681 toward fixed wing portion 4682, causing the fabric to fold itself between the sheets or ribs or formers 4688, until the entire extension including the ribs or formers shown dotted is fitted in recess 4687 and the fin 4681 is hard up against fixed portion as shown dotted at 4692. In a preferred embodiment, any coil springs or other energy absorbing devices bias the extension to an extended position, so that if some or all systems fail the wing is automatically extended and in position for slower travel, better gliding and a shorter landing requirement. Any convenient type of rib or former 4688 of any convenient material and/configuration may be used, including sheet as previously described, wire and/or tubular frame of metal or other material. The skin may be of any material suited to repeated folding.

All the features disclosed in FIGS. 325 through 340 can be applied to lighter-than-air craft such as blimps or dirigibles. For example, the hybrid power systems of FIGS. 325 and 327 can be adapted for any lighter-than-air craft, and the engines of FIGS. 329 through 331 can be mounted in nacelles attached to blimp and dirigible aircraft. Although the fixed-wing aircraft in the Figures are shown as light aircraft, the can be of any size. The embodiments of FIGS. 325 through 337 are by way of example; any convenient method of using the engines of the invention to power aircraft can be employed, as can any convenient method of deploying a parachute stored coaxially with helicopter rotors. The helicopters and fixed-wing aircraft of the invention can use any combustion engine, the exhaust of which can be treated in any manner, including to remove CO2, and as disclosed herein in relation to the treatment of any pollutant(s) and/or undesirable substances, including CO2. Any of the features disclosed herein as applying to aircraft may, where appropriate, be also applied to marine craft. For example, the engines of FIGS. 329 through 431 and FIG. 336 may be mounted above water in or on any kind of hull or superstructure of a marine craft, including fast hydrofoil or other marine craft and/or the marine craft of the invention. The extendable/retractable airfoils of FIGS. 338 through 340 may equally be attached to marine craft above water, and also below water to function as hydrofoils. The illustration are diagrammatic. None of the features are shown at any particular scale in relation to either aircraft or each other.

Figure 341:
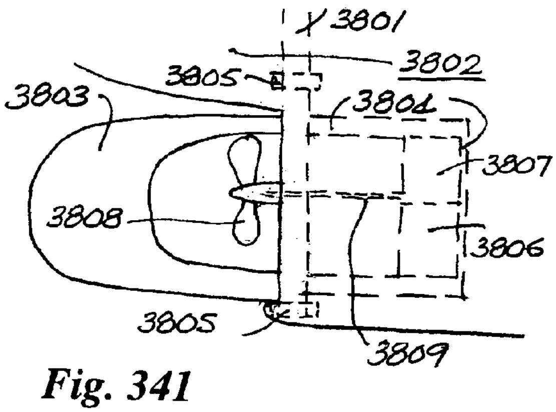
Figure 342:
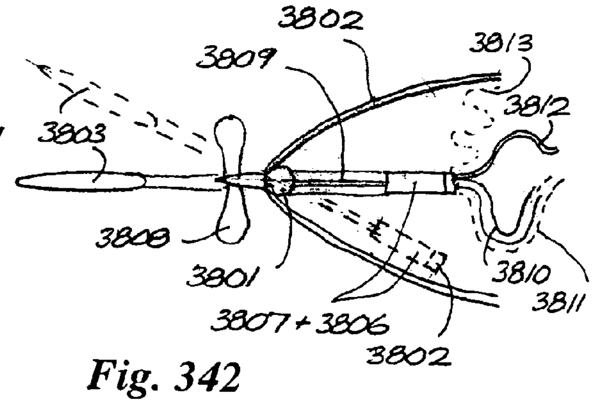
Figure 343:
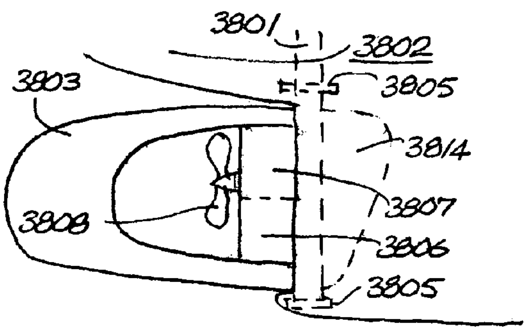
Figure 344:
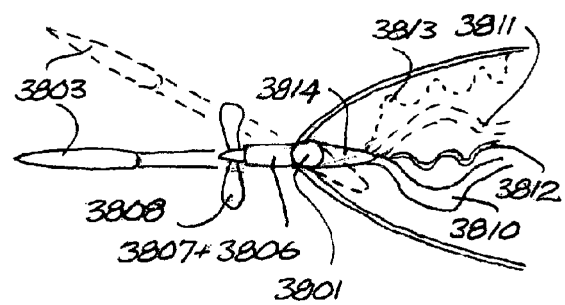

The engines of the invention have potentially valuable applications in marine craft, where they will create significant fuel savings. Initial calculations have shown that the new engines can have power-to-weight and power-to-bulk ratios many times greater that today's commercial products, and require up to half the amount fuel needed by current engines, per unit of work. The combination of reduced engine weight, and reduced fuel requirement and fuel weight for a given journey, is especially advantageous in marine craft, where the reductions in engine and fuel weight and bulk permit reducing hull size and structure, leading to further weight, bulk and cost savings. The engines of the invention are suited for every kind of marine craft, used for commerce or pleasure, whether partly powered by sail or not. Because the engines can be small and compact, they can be mounted next to a propulsion device, such as a propeller, screw or jet. In a selected embodiment, the engine is mounted on one side of a rudder post and drives the propulsion device, which is on the other side of the post with the rudder. The engine pivots within the hull, with the rudder and propulsion device pivoting outside the hull. By way of example, elevational view FIG. 341 and plan view FIG. 342 show schematically the rear portion of a marine craft, wherein 3801 is a rudder post mounted in the stern portion of a hull 3802, the post supporting both the exterior rudder 3803 and an interior cradle 3804, both pivoting with post in bearings 3805. The engine of the invention 3806, or any other engine, together with an optional transmission 3807, are mounted in the cradle, and to a degree counterbalance the mass of the rudder and propulsion device 3808, in this embodiment a propeller, with the transmission being linked to the device 3808 by shaft 3809. In another embodiment, the transmission has variable drive ratios. Such variable ratios are useful for varying the relative thrust generated by the propulsion device in relation to the power generated by the IC engine, to adapt to different forward speeds, different operating conditions and different weather. Flexible passages for charge air 3810 and for exhaust 3811, together with flexible fuel line 3812 and flexible electric/electronic leads 3813 link the cradle with engine to fixtures in the hull. Rudder, cradle and engine are shown dashed when angled to effect a craft turn. Any appropriate glands and seals may be provided around the joints between rudder post and hull and between shaft and hull, to prevent water entering the hull. In an alternative embodiment, the engine can be mounted in the rudder cradle outboard the hull, as shown schematically by way of example in similar FIGS. 343 and 344, where like features are similarly numbered and illustrated. Here an optional counterweight 3814 can be attached to rotating rudder post inside the hull, together with appropriate bearings and seals to and around the rudder post. In the elevations, items within the hull are shown dashed. None of the features as shown are meant to be at any particular scale to one another. In a further embodiment, in the configurations and layouts of FIGS. 341 through 344, the engines 3806 and optional transmissions 3807 are replaced by electric motors.

In a selected embodiment, the engines of the invention are part of a marine hybrid electric propulsion system, wherein an electric motor powers the propulsion device, and the engine powers a generator. Electrical power either goes from the generator directly to the motor, or goes there via an electric storage system, such as a battery pack or a flywheel, and some form of controller. In another embodiment, the hybrid marine propulsion system includes one or more photovoltaic arrays supplying energy to an energy storage system, such as a flywheel and/or one or more electrical batteries. Absolutely any kind of marine craft can driven by a hybrid propulsion system. By way of example, FIG. 345 shows the hull portion of a sailboat 3820 with a hybrid drive system, wherein an electric motor 3821 drives a shaft 3809 which drives propulsion device 3808, here again a propeller. Inside the hull is an engine 3806 driving an electrical generator 3821, which directly or indirectly drives the electric motor 3821. An optional energy accumulator 3822 is provided, here a battery pack, which is loaded and unloaded via a controller 3823. Optionally, there are one or more photovoltaic arrays 3824, here on the roof of the cabin and on a portion of the deck, and an optional wind-powered electrical generator 3825, here in the stern, to additionally load up the energy accumulator via the controller. Any type of energy accumulator may be used, including a flywheel driven by a variable speed electric motor/generator. Electric power conduits from the photovoltaic arrays and the wind machine to the controller are shown schematically at 3826, and the electrical supply to the propulsion motor at 3827. The waterline is shown at 3828, the main exterior deck surface at 3829. In an alternative embodiment, a marine craft has no combustion engine and instead has an electric drive system with a propulsion device being driven by an electric motor, optionally through a rotatable shaft, with power to the electric motor being supplied with power from an energy storage system, such as electric batteries. The energy system is optionally being re-charged by photovoltaic arrays and/or wind-driven electrical generators mounted on the craft. It could additionally and optionally be driven by one or more sails. By way of example, such a craft could be schematically illustrated by modifying FIG. 345 to omit engine 3806 and generator, with all other features left unchanged. Both the hybrid drive system and the electric drive system, with or without one or more photovoltaic arrays and/or wind-powered generators, may be scaled and applied to any type and size of craft, including very large cargo carriers, military craft, etc, whether or not such craft also have masts and sails. For example, large oil tankers typically have a large more-or-less horizontal deck surface, much of which is ideally suited to accommodate photovoltaic arrays.

In a further embodiment, IC engines including the engines of the invention are mounted in hydrofoil marine craft, having fixed or extendable/retractable hydrofoil posts. The engines of the invention, because less bulky and heavy than conventional engines, are exceptionally suited to hydrofoil craft. The entire engine with a propulsion device such as a propeller can be placed in a substantially continuously submerged keel element at the foot of a hydrofoil post or leg, with fuel and air supply, exhaust return and electric/electronic control all mounted within a hollow strut or leg. A propulsion device, eg a propeller, can be housed in the foot of a hydrofoil post, below the normal waterline. Previously, a limiting factor in the design of hydrofoil craft was the need to place long drive shafts down the post, and then attach these to universal joints and stub drive shafts in the below-water pod to reach the propellers. Alternatively, compact and light IC engines, optionally those of the invention which are virtually vibration-free, can be housed in the hull, to power an electric motor in a keel element at the foot of the hydrofoil post. Today's heavy and vibrating traditional marine engines are more difficult to accommodate in an airborne hull. Optionally, the electric motor may be part of a hybrid marine drive system as disclosed in FIG. 345, with or without a photovoltaic array. Examples of such new marine craft are disclosed below.

Figure 346:
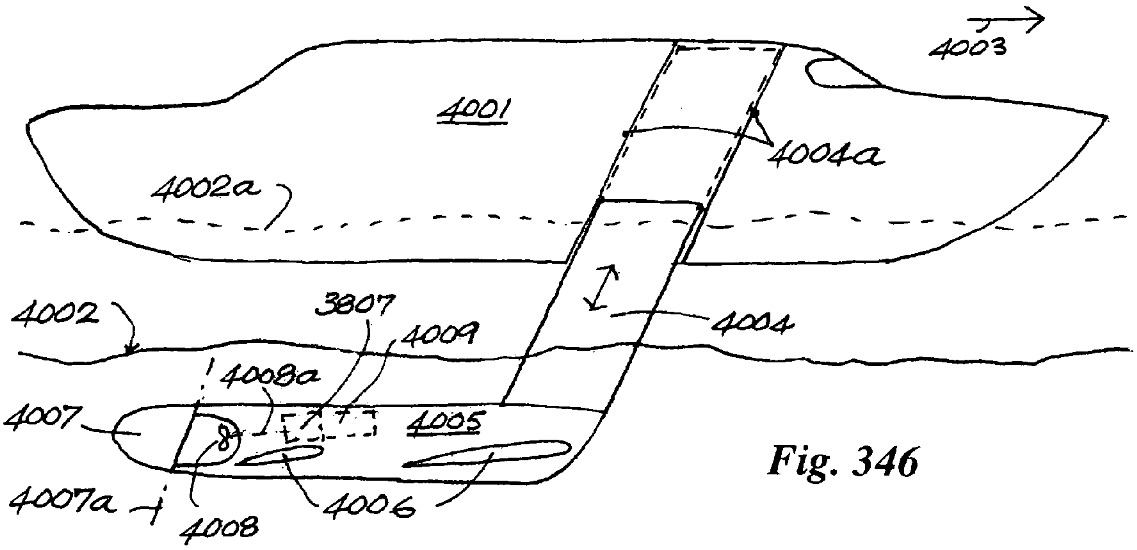
Figure 347:
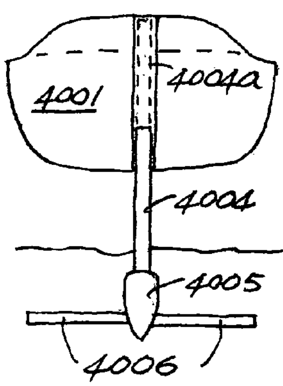
Figure 348:
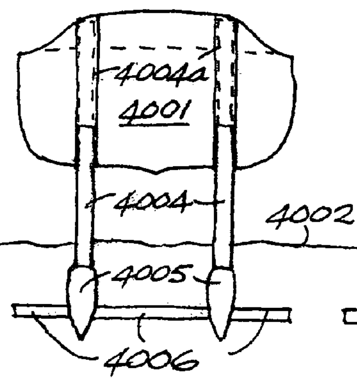
Figure 349:
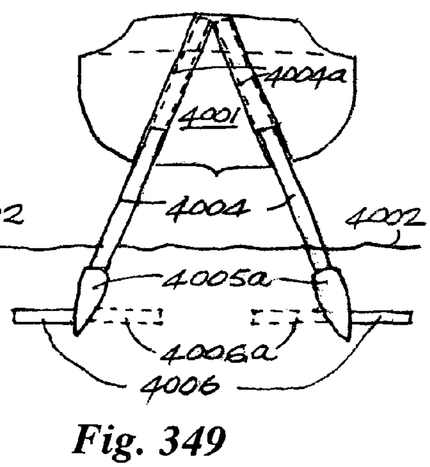

Hydrofoil marine craft should be efficiently and safely operable when, for certain reasons such as severe weather, the hull cannot be lifted above the water. If operable at moderate or greater speeds with the hull above the water, then those parts of the craft which remain below the water surface preferably have a streamlined aspect with swept-back projections, to reduce risk of snagging lines and better deflect encountered objects, as well as to present the least possible drag. When the craft is operated in the normal mode with hull out of the water, the distance between the bottom of the main portion of the hull and the surface of the water should be sufficient to permit the hull to fully clear waves or chop of a designated amplitude, while still maintaining the in-the-water elements at a minimum depth below the variable elevation of the water surface at all times. This distance, together with the height/depth of the in-the-water elements, is likely to be such as to give the craft a relatively deep draft when it is operated with the hull in the water or when it is at anchor. In selected embodiments, for such a craft is to have a reasonable shallow-water capability, the in-the-water elements are retractable/extendable relative to the hull. Such retraction/extension can be effected in any convenient way, including by making the hydrofoil post telescopic, and/or by hinging the top of the post at the hull and by variably rotating the post up towards the hull. The ability to mount an IC engine or electric motor in a below-water housing or nacelle makes extensible/retractable posts more viable, compared to the traditional layout with the engine in the hull, since it is more difficult to employ hinged or telescopic drive shafts than fixed-length shafts. Not having drive shafts in the posts also eliminates much of the noise and vibration associated with traditional hydrofoils. In alternative embodiments, the hydrofoil configurations of the invention have the engine or electric motor in the hull and at least one drive shaft in a hydrofoil post. The variation of craft balance during post retraction or extension while in motion is probably easier to manage with telescopic posts. By way of example, FIG. 346 shows in schematic profile or elevation a craft having the basic elements to support the optional movement of the hull 4001 above the waterline 4002, principally in direction 4003. They comprise a post 4004 which is telescopically extendable/retractable from a sheath, housing or guide system 4004*a* of any convenient type and which is fixed to the structure of the hull in any convenient manner, with the lower end of the post attached to a keel or keel-like element 4005 always at least partly in the water. Hydrofoils 4006 are attached to keel element and/or post, as is at least one adjustable vertical hydrofoil or rudder 4007, here pivoted about axis 4007*a*. A propulsion device such as a propeller is shown at 4008, with IC engine or electric motor power module 4009 coupled to optional transmission 3807 and connecting shaft 4008*a* shown dashed. A reversing mechanism is optionally incorporated into the transmission. In another embodiment, the transmission has variable drive ratios. Such variable ratios are useful for varying the relative thrust generated by the propulsion device in relation to the power generated by the IC engine, to adapt to different forward speeds, different operating conditions and different weather. The position of the post when retracted is shown dashed within sheath 4004*a*, and the waterline with hull in water is indicated at 4002*a*. The craft may be a mono-post design as indicated in the profile, or the craft may be two posts and hydrofoil assemblies, arranged in parallel. FIG. 347 shows in schematic sectional elevation the craft of FIG. 346, having a mono-post 4004 terminating in a keel element 4005 having hydrofoils 4006 each side. FIGS. 348 and 349 show sectional elevations of different craft, which have a longitudinal elevation similar to the craft of FIG. 346. In FIGS. 347 through 349, similar features have been numbered as in FIG. 346. In FIG. 348 that craft has twin parallel vertically aligned extensible/retractable posts 4004 mounted within sheaths 4004*a* and attached to keel elements 4005, which are in turn attached to each to each other by at least one hydrofoil 4006, and is suitable for hull-out-of-water navigation in narrower waterways such as rivers. In FIG. 349, that craft has twin parallel angled non-attached extensible/retractable posts 4004 mounted within sheaths 4004*a* and attached to keel elements 4005, each with an outboard hydrofoil 4006 shown in solid line. If the embodiment of FIG. 349 is intended for narrow waterway use, the hydrofoils can be mounted inboard as shown in dashed line at 4006*a*. Any number and layout of posts ray employed to support the craft out of the water. The mono-post or twin-parallel-post layout is practical for smaller, lighter craft, where the forward momentum provides stability, as with a motorcycle. For larger craft, including container ships and large crude oil carriers, multiple posts are desirable, preferably in a longitudinally staggered array, so that the turbulence of one keel/hydrofoil assembly does not excessively impact another. Configurations for larger craft are disclosed subsequently.

Figure 350:
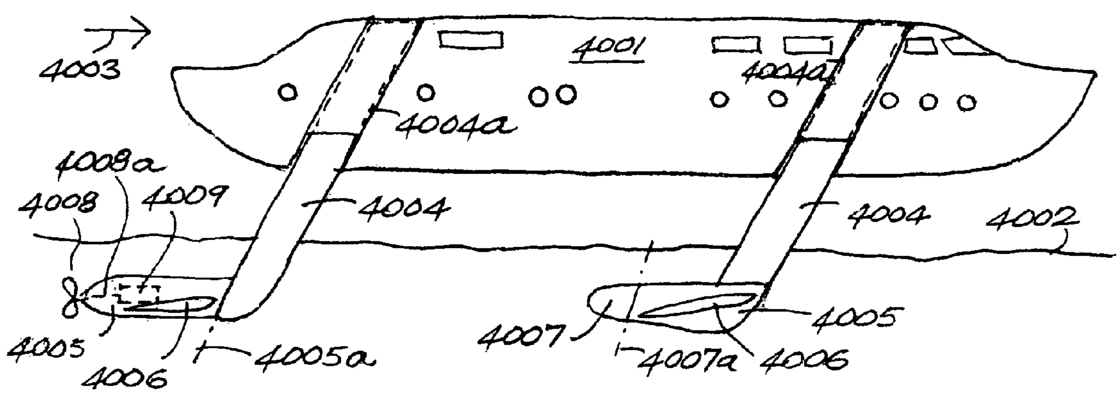

In the examples of craft with varying keel or other elements which follow, generally extensible/retractable posts will be shown. In alternative embodiments, for example in the case of craft not requiring shallow water capability, the posts are fixed, i.e., not retractable/extensible. The principles of the invention apply to both types of post. A single base vessel design may have a particular post-system, but have varying keel element(s) for particular embodiments of the base design. The hydrofoils or hydrofoil elements may be fixedly mounted to the keel portion, so that they will support hull out of the water at a given elevation at a particular speed/weather combination, or they may be pivotally or otherwise variably mounted to present variable frontal aspect and therefore give variable lift at a particular speed/weather combination. Additionally or alternatively, the hydrofoils have variable pitch flaps to provide variable lift. Generally, variable deflection/lift hydrofoil elements will be shown by way of example herein, but the principles of the invention also apply to fixedly mounted hydrofoil elements. In any craft having the engines of the invention, additional or alternative power may be provided by sails mounted on masts, and any of the embodiments of craft illustrated herein may have masts and sails even if they are not specifically shown. In mechanically powered craft at least one drive means such as a propeller or water jet is preferably incorporated in the keel element, although it could alternatively be mounted in or on the post or the hydrofoil element. In the case of craft which are mono-posts or have multiple post abreast and do not have posts mounted behind each other, each keel element/post combination has at least two sets of hydrofoil elements mounted one aft of the other, and optionally also some kind of rudder to facilitate lower speed directional control. At high speed, some measure of directional control can be achieved by varying the angle of attack of the hydrofoil(s) on one side of the craft from that of the hydrofoils on the other, effectively banking the craft, and/or by increasing or decreasing propulsion power on one side relative to the other. The single keel element of FIG. 347 and the twin keel elements of FIG. 348 are shown having vertical center-line planes, whether or not these planes align with the axes of their respective posts. In an alternative embodiment, they have angled or splayed planes which are on an angle other than 90° to the mean water surface—that is non-perpendicular—as shown for example schematically at 4005*a* in FIG. 349. In a further embodiment, posts and keel elements are mounted one behind the other. By way of example, FIG. 350 shows schematically a passenger river ferry 4001, of low height to permit passing under bridges with hull out of the water, illustrating how post and keel elements can be mounted behind each other, either to give a total of two assemblies, or if at least one pair of posts is provided as in FIGS. 348 and 349, a total of three or four assemblies. Similar features are numbered as in FIG. 346. In a selected embodiment, the keel element is hingeably or pivotally mounted on the post. In the embodiment of FIG. 350, the rear keel element is pivotally mounted on the post about axis 4005*a*. The positions of rudder 4007, propulsion device 4008, and optional axis 4007*b* are all interchangeable. The engine(s) which power the propulsion device may be mounted in the keel element(s), on or in the post(s) or hydrofoils, or in the hull. The features of FIGS. 346 through 350 are drawn to no particular scale relative to one another, and axes 4007*a* and 4007*b*, as well as all the hydrofoils 4006, can be at any convenient angle.

Figure 351:
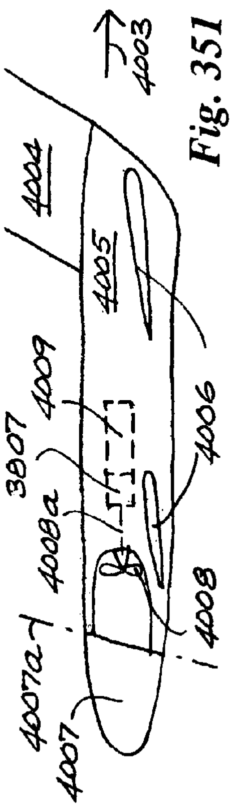
Figure 352:
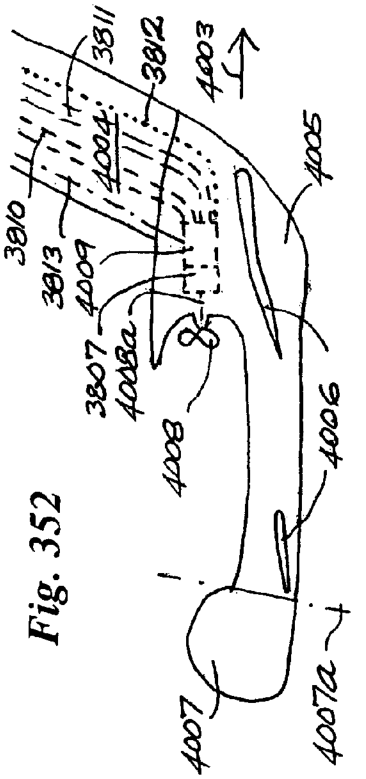
Figure 353:
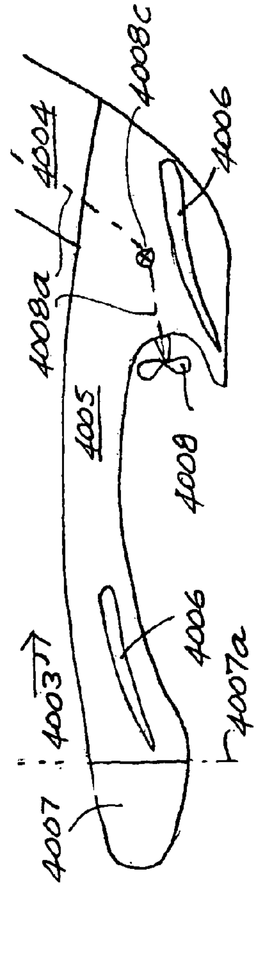
Figure 354:
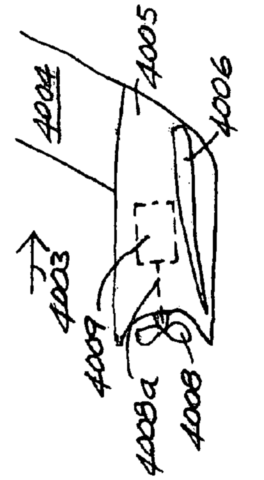
Figure 355:
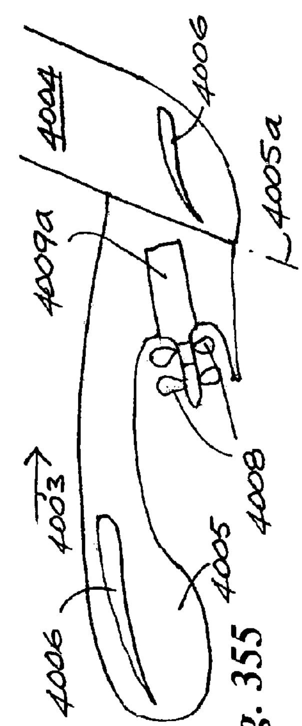
Figure 356:
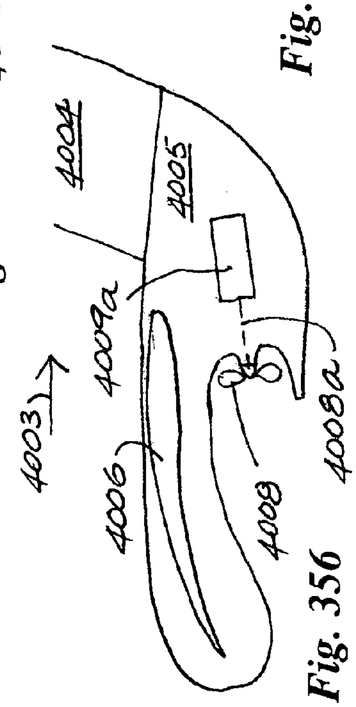
Figure 357:
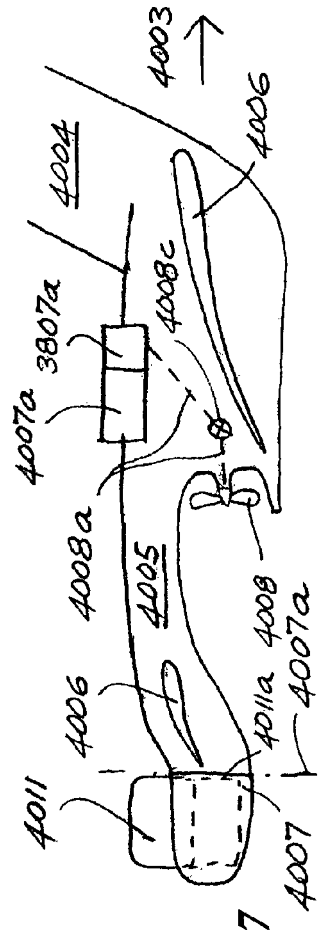

In the arrangement of FIG. 350 with keel/post assemblies mounted fore and aft of each other, the keel elements may be truncated longitudinally, have only one set of hydrofoil assemblies each, and the rear keel element is pivotally mounted along axis line 4005*a* on the post, to also comprise a rudder or steering means. In the case of keel elements having drive means 4008 mounted forward of a rear-mounted rudder element 4007, the drive means can be mounted between, above or below those keel element portion(s) supporting the rudder. Some of the aforementioned embodiments are shown by way of the examples in schematic FIGS. 351 through 357, wherein like features have the same numbers, including posts 4004, keel elements 4005, keel element pivot axes 4005*a*, hydrofoils 4006, rudders 4007 and rudder axes 4007*a*, marine propulsion devices 4008, drive shafts 4008*a*, IC engine or electric motor power moue 4009, transmissions 3807, etc, with principal direction of travel indicated at 4003. FIG. 351 shows a typical longer keel element 4005 attached to post 4004, together especially suited to mono-post or parallel-post craft, since it includes all controls necessary for directing a craft: fore and aft hydrofoils, power module with shaft link to propulsion device, and rudder. If the power moue is an electric motor, electrical circuits 3813 will be provided in the post and keel element; if it is an IC engine, additionally charge air supply passage 3810, optional exhaust gas passage 3811, and fuel line 3812 will be provided in the post and keel element, as shown schematically by way of example in FIG. 352. The configurations are also suited to fore and aft post layouts, and in sore multi-post craft, motors or engines may be omitted on some keel elements. For example, a front post keel element is fixedly mounted and has no drive means, while a rear post keel element is both pivotally mounted on axis 4005*a* and has a propulsion device. Alternatively, the drive means could be incorporated in a fixedly-mounted rear keel element while the drive-less front keel element is pivotally mounted on the post on a post, as shown at the rear post in FIG. 350. FIG. 353 shows a propulsion device driven by and engine or electric motor in the hull, via drive shafts 8008*a* and universal joints 4008*c* in the post and/or keel element. Where power requirements are great, both front and rear keel elements could have drive means. FIG. 354 shows a smaller keel element 4005 mounted on a smaller post 4004, suitable as a fore post for multi-post craft such as that of FIG. 350, in which the rear keel element pivotally mounted on the rear post and effectively comprises a rudder. The keel elements may house a "snap-in" engine or electric motor modules 4009*a*, connected to propulsion device 4008 by one or more shafts shown dashed at 4008*a* and universal joints 4008*b*, as shown in alternate positions in FIGS. 355 through 357, wherein line 4007*a* shows an axis for an optional rudder, and 4003 indicates the principle direction of travel. In the embodiment of FIG. 355, the entire power module 4009*a* complete with contra-rotating propellers is easily removable and replaceable, able to be pulled out in direction parallel to shaft axis. In the embodiment of FIG. 356, after the shaft and propulsion device are withdrawn a limited distance along axis of rotation, the power module 4009*a* pushes out sideways. In the embodiment of FIG. 357, the power unit 4009*a* is mated to a transmission 3807*a* and the integral package is a "snap-in" module mounted at the top of the keel element, to drive the propulsion device 4008 via shafts 4008*a* and universal joint(s) 4008*c*. In another embodiment, the transmission has variable drive ratios. It will be disclosed subsequently how, when the keel element is optionally retracted to its position closest to the hull, the power module and the interior of the keel element can be accessed from within the hull. Also shown is a rudder 4007 having a vertical extensible and retractable portion 4011, the bottom of which is shown dashed at 4011*a* when it is in retracted position. In other embodiments the reciprocal motion of the rudder extension is in any convenient direction, including horizontal.

Figure 358A:
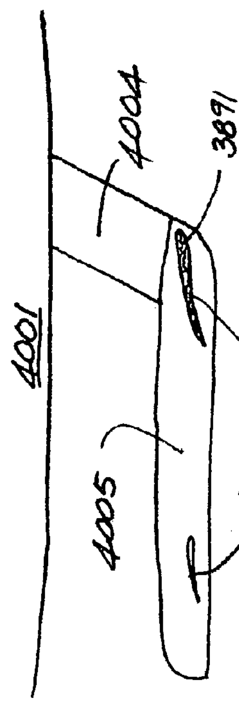
Figure 358B:
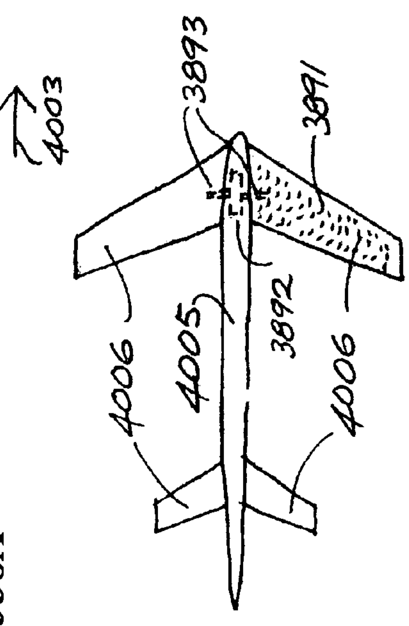
Figure 358C:
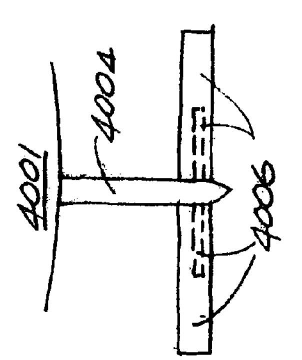
Figure 359B:
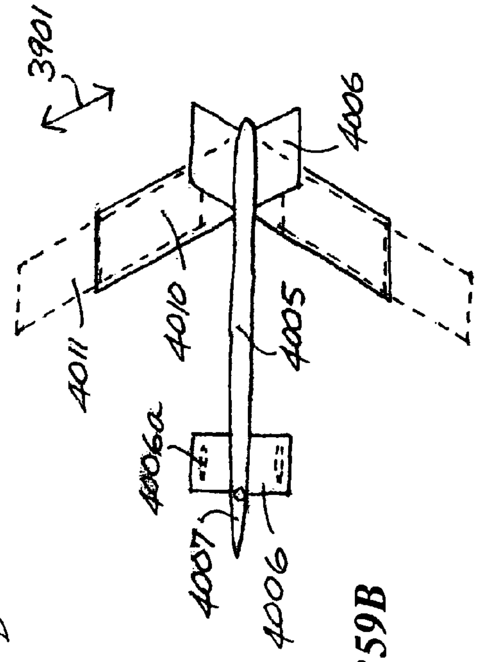
Figure 359A:
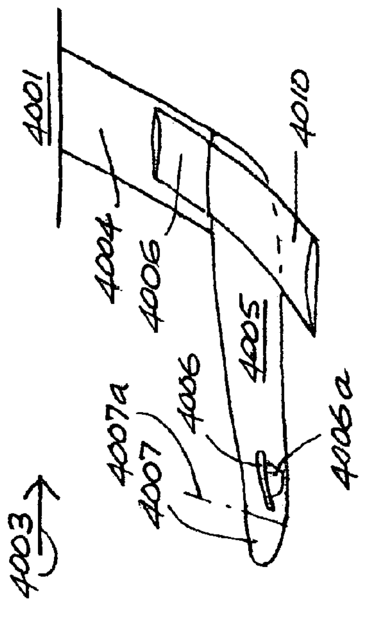
Figure 359C:
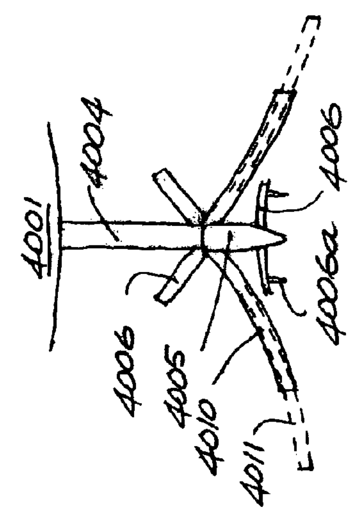
Figure 360A:
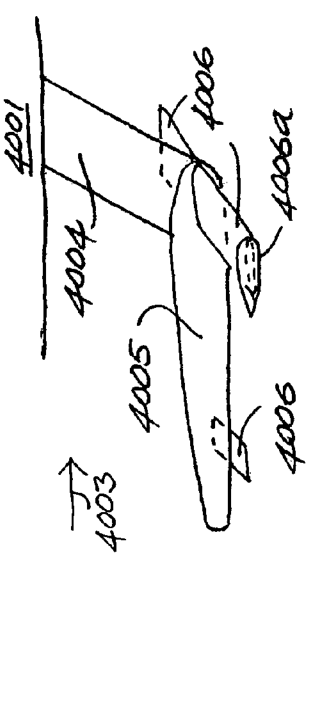
Figure 360B:
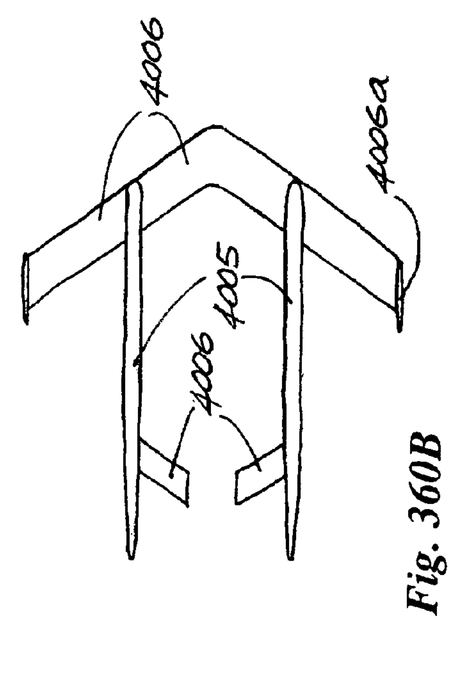
Figure 360C:
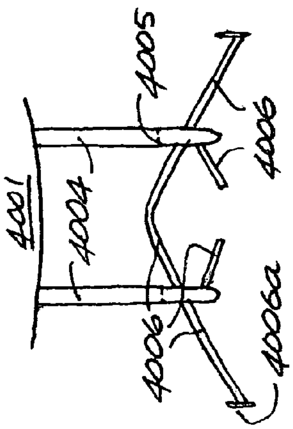
Figure 361B:
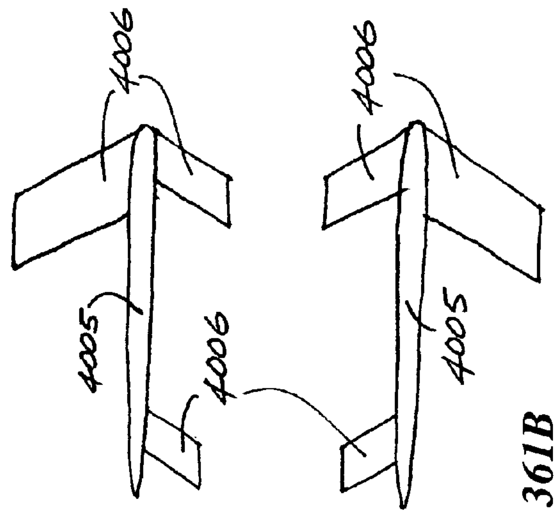
Figure 361A:
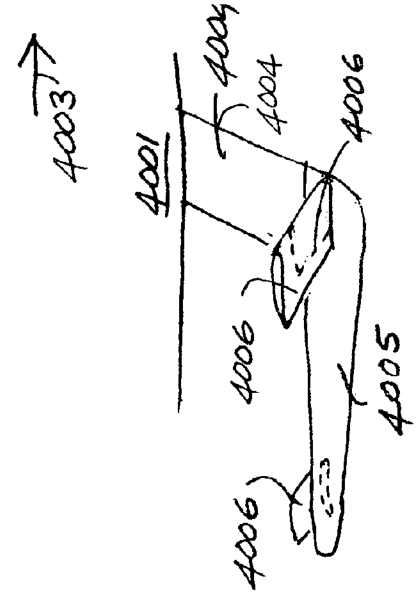
Figure 361C:
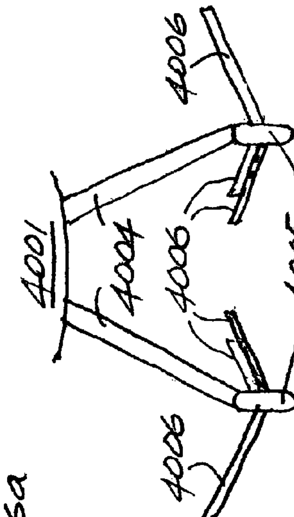
Figure 362A:
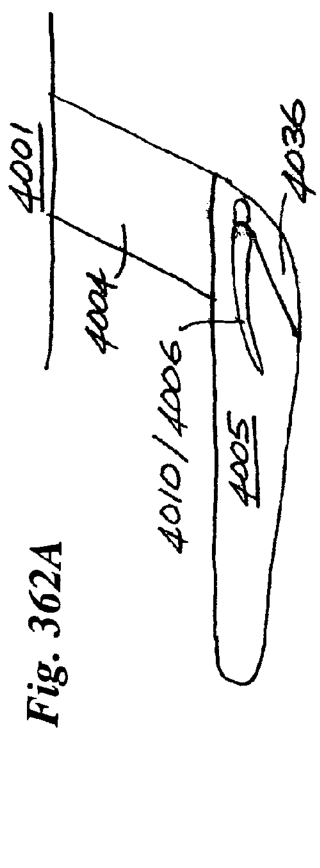
Figure 362B:
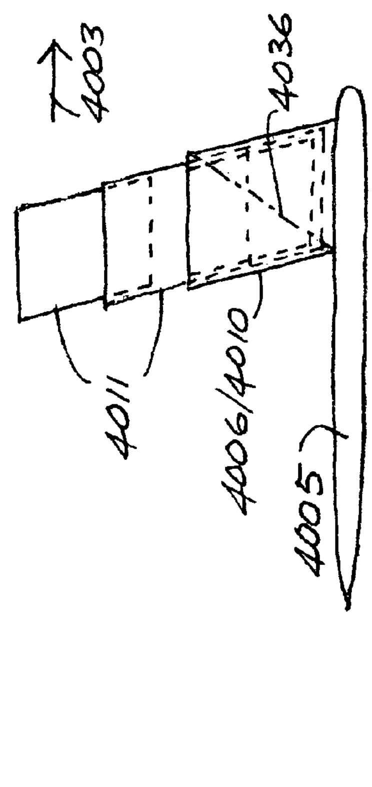
Figure 362C:
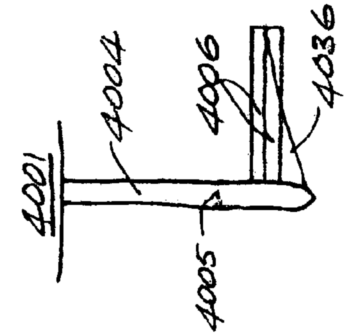
Figure 363B:
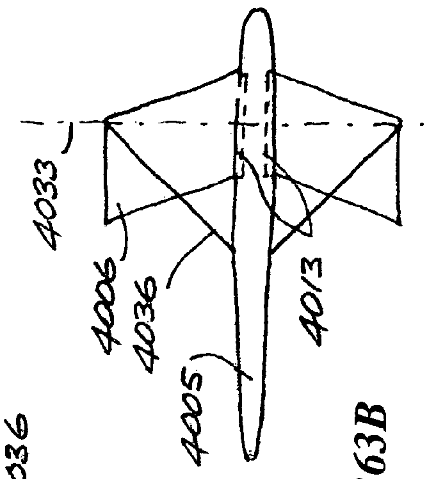
Figure 363A:
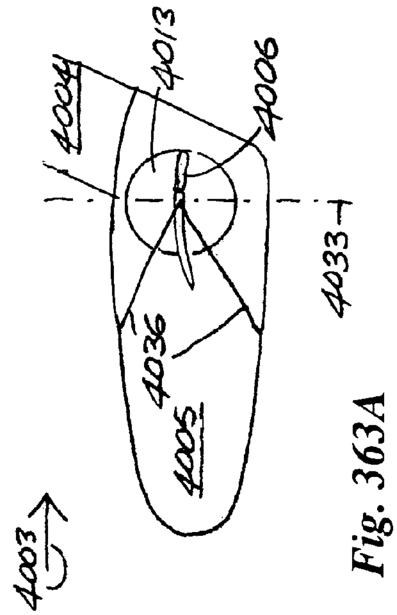
Figure 363C:
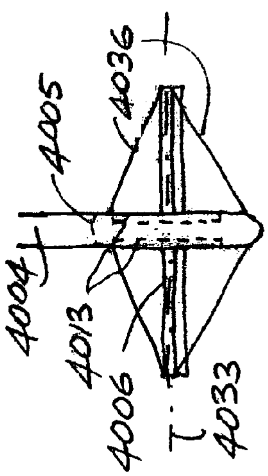
Figure 364A:
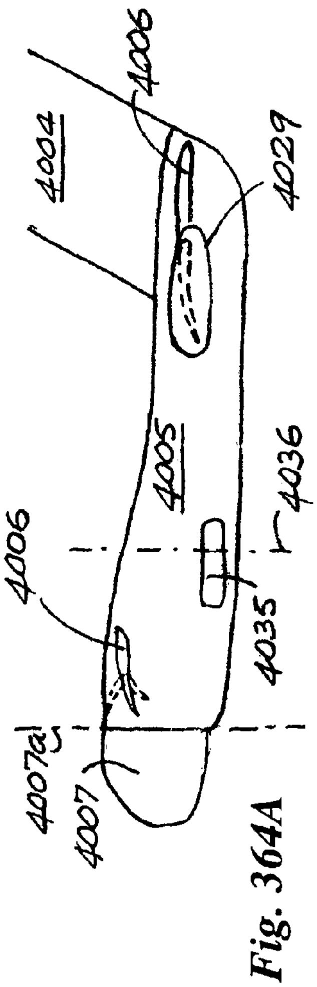
Figure 364B:
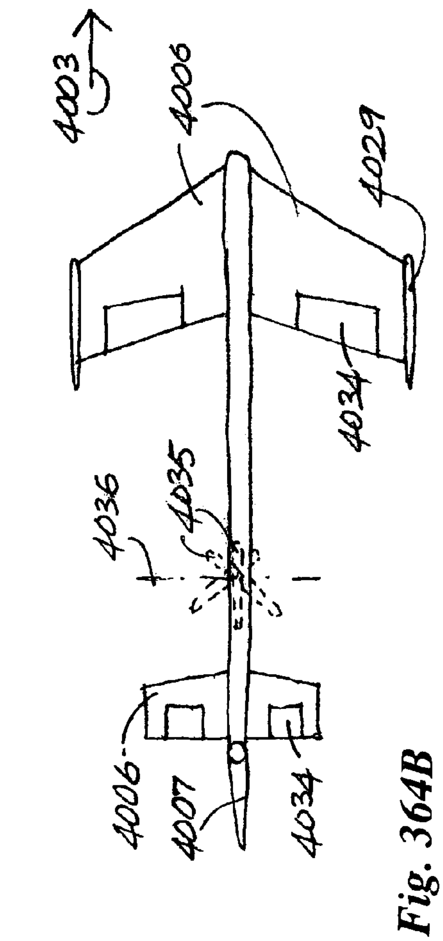
Figure 364C:
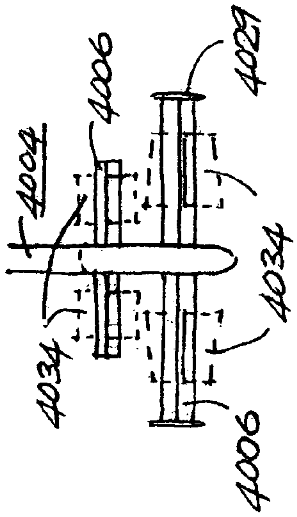

The hydrofoils may be deployed on the keel element(s) in any way. In the examples that follow, hydrofoils of constant size are generally shown, but where appropriate extensible/retractable hydrofoils can be used, and embodiments of these are disclosed subsequently. Hydrofoils herein are generally shown by way of example as having close to symmetrical or aircraft wing type cross-section, and linear longitudinal section. They may have any cross-section, including wing-shaped, and any longitudinal section, including curved, in any longitudinal plane. If the longitudinal section is of constant radius curvature, or if the cross-section is of any type, then the hydrofoil may have extensible/retractable elements. Likewise, the posts may have any appropriate cross-section and longitudinal section, whether extensible/retractable or not. Herein the extensible/retractable hydrofoil(s) and post(s) are usually described as having telescopic action, but in fact any suitable system of extension/retraction may be employed. Pivoted posts are disclosed subsequently. The posts may be at any appropriate angle to the waterline, as may be the hydrofoils. In some embodiments the hydrofoils may be so angled that they are partially above the waterline during periods of operation, at such moments giving reduced lift, in the manner of some protected-water hydrofoil craft, for example, as currently used in Sydney harbor, Australia. Mostly a given hydrofoil loses some lift efficiency when operating very close to water surface, so generally it is intended that hydrofoils operate continuously submerged, preferably below the depth within which lift performance becomes significantly impaired. In this disclosure, hydrofoil cross-sections, angles of attack and curvature from base to tip are as shown schematically and/or for sake of clarity. In practice, hydrofoils may be mounted at any location, at any angle of attack have any cross-section, and have any degree of curvature, in any plane. In the Figures, main hydrofoils are generally shown fore of secondary hydrofoils. In alternative embodiments, main hydrofoils are positioned aft of secondary hydrofoils. As will be inferred from the above, the range of hydrofoil/keel element/post combinations is virtually limitless, both for fixed-length posts and extendable/retractable posts. By way of example, seven layouts are shown in FIGS. 358 through 364, in which each in Figure the suffix "A" indicates a schematic side elevation, "B" a schematic front elevation, and "C" a schematic plan of the keel element/hydrofoil configuration. In these Figures, main direction of travel is indicated at 4003 and is from left to right, 4001 is the bottom of the hull, 4004 a post, 4005 a keel element, 4006 a fixed dimension hydrofoil, 4007 a rudder, 4007*a* a rudder axis, 4010 a fixed hydrofoil portion and 4011 an extendable/retractable hydrofoil portion. Propulsion devices, drive shafts and power modules are not shown, but may be included in any convenient location, including those described in FIGS. 341 through 357. In all the Figures, the hydrofoils may optionally be pivoted or have other means for varying angle of attack and, where shown of fixed dimension, may optionally or alternatively be of varying dimension by comprising both fixed and extensible/retractable portions. FIG. 358 shows a conventional symmetrical layout, with fore main lift hydrofoils and aft secondary lift and/or stabilizing or control hydrofoils. FIG. 359 shows hydrofoil components 1010 having portions 1011 extendable/retractable in direction 3901, both of curved configuration, as seen from a front view, with angled secondary upper fore hydrofoils having attachment locations to keel element approximately common with main hydrofoils. The rear hydrofoils have vertical fins 4006*a* to provide additional directional stability. Any hydrofoil, including those described herein, may have any kind of fin, mounted in any position at any angle. FIG. 360 shows a twin-post/twin keel element layout wherein the main and fore hydrofoil has fins 4006*a* at each end and is in three parts, a central part linking the two keel elements and a part outboard each keel, with the central part of shallow inverted "V" shape. In an alternative embodiment the angles of the main hydrofoil are reversed, with the central part being of shallow "V" shape, and the outer parts angling upwards from the keel elements. Each keel element has an angled inboard aft secondary hydrofoil. FIG. 361 shows a twin keel element/twin angled post layout, with each keel element having two fore hydrofoils of varying size, and only one aft hydrofoil. In alternative embodiments, the inner fore hydrofoil is larger than the outer, and/or the aft hydrofoils are mounted outboard of the keel elements. Each individual hydrofoil can be free-standing, or be supported one or more by tensile members or struts. By way of example, FIG. 362 shows a hydrofoil supported by a single strut or tensile member 4036, and FIG. 363 shows upper and lower tensile members 4036 supporting each of two adjustable pitch hydrofoils 4006, pivoted about axis 4033 and attached to disks 4013 rotatably mounted in keel element 4005, optionally according to a construction disclosed later. Considering side elevational view FIG. 363A, the angle from the horizontal of the tensile elements 4036 in this embodiment is significantly greater than the permitted angle of rotation of the hydrofoils about axis 4033. The tensile members or struts may have any appropriate cross- and longitudinal sections including those which may optionally provide positive or negative lift. The tensile elements or struts themselves may have adjustable pitch to provide variable lift, and may themselves be considered as a form of hydrofoil. Another embodiment is shown schematically in FIG. 362B, wherein hydrofoil 4006 comprises a fixed portion 4010 and two extendable retractable portions 4011, one telescopically mounted in the other. In a further embodiment, the hydrofoils have flaps to provide variable positive or negative lift or rapid braking, in a manner similar to flaps on aircraft wings. By way of example, in FIG. 364 hinged flaps are shown schematically at 4034 and dashed in fully extended positions in FIG. 364C. Optionally and additionally, a flap 4035 aligned in an approximately vertical plane, pivotable about axis 4036, is provided, here in this embodiment towards the rear of keel element 4005 to provide variable side thrust and optionally function as a partial rudder. In a further embodiment a pivotable flap, such as 4035 in FIG. 364, is provided in any hydrofoil and has a pivot axis inclined in any direction, including horizontal to variable generate upthrust or downthrust. In an additional embodiment, such a pivotable flap is provided in any aircraft wing or airfoil. A fin 4029 is shown mounted to the ends of the main hydrofoils to control fluid flow, as in the embodiment of FIG. 360. In a selected embodiment, any of the hydrofoils, keel elements and/or posts of a mine hydrofoil craft do wholly or partly function as ballast tanks and/or contain ballast tanks. In a selected embodiment, any of the hydrofoils, keel elements and/or posts of a marine hydrofoil craft do wholly or partly function as ballast tanks and/or contain fuel tans. The whole or partial filling of hydrofoils, keel elements and/or posts, optionally using the water or other liquid through which the craft is traveling, will tend to equalize the interior pressure on craft skin with the exterior pressure of the water, and so permit lighter construction. The mass of the ballast and/or fuel will also give the hydrofoils, keel elements and/or posts greater inertia, and so make them less liable to rapidly pitch, roll, yaw, etc. In craft at least partly powered by sail, the moving of ballast or fuel from one side of the craft to another to counterbalance side wind loads is established practice and, in another embodiment, this practice is incorporated in the hydrofoil craft of the invention. By way of example, FIG. 358B shows schematically how the ballast volume(s) of the starboard main hydrofoil are filled with ballast, here the liquid 3891 through which the craft is traveling. A pump 3892 with passages 3893 communicating with separate ballast volumes in each fore main hydrofoil 4006 is provided in the keel element 4005. In normal default operation, the ballast volumes on each side of the keel element are equally filled. If the craft is operating wholly or partly under sail, in the case of strong wind from the starboard side, the ballast volumes on the starboard side are filled. When the crafts tacks, or when there is a strong wind from the port side, the pump transfers the ballast from starboard to port ballast volumes. Alternatively, fuel tanks are located in the hydrofoils, and the fuel is pumped from one side to the other.

Figure 365:
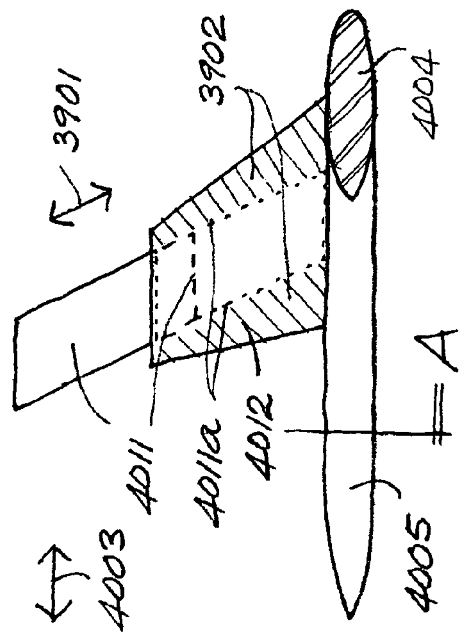
Figure 366:
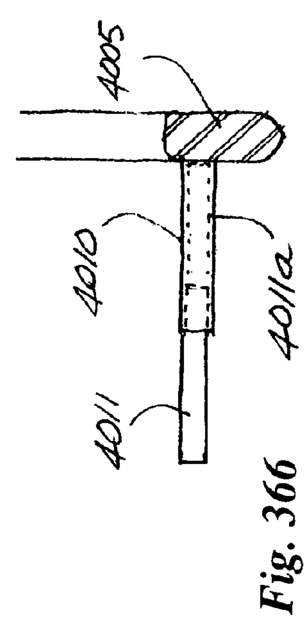
Figure 368:
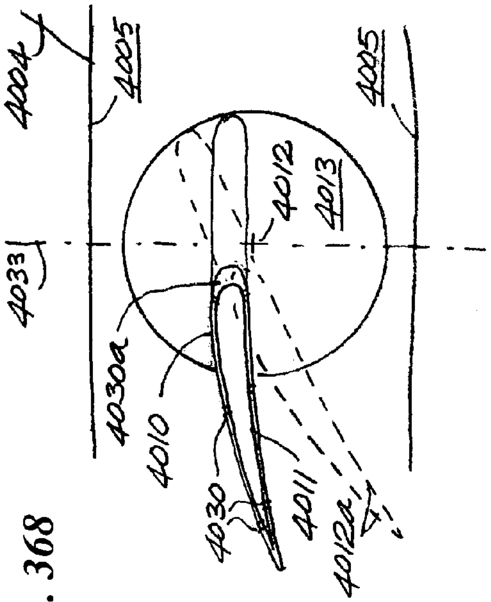
Figure 371:
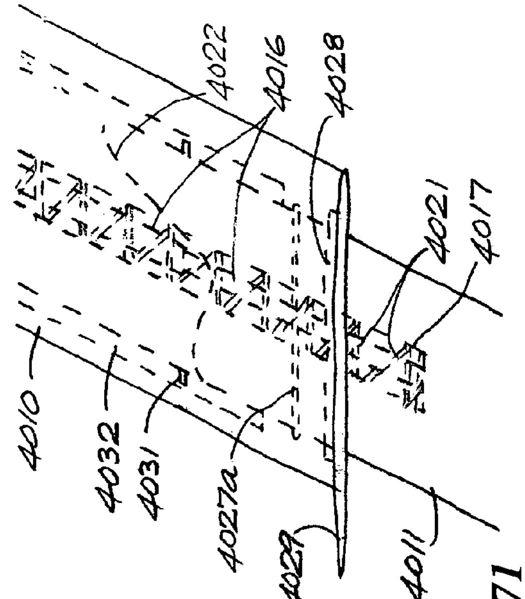
Figure 369:
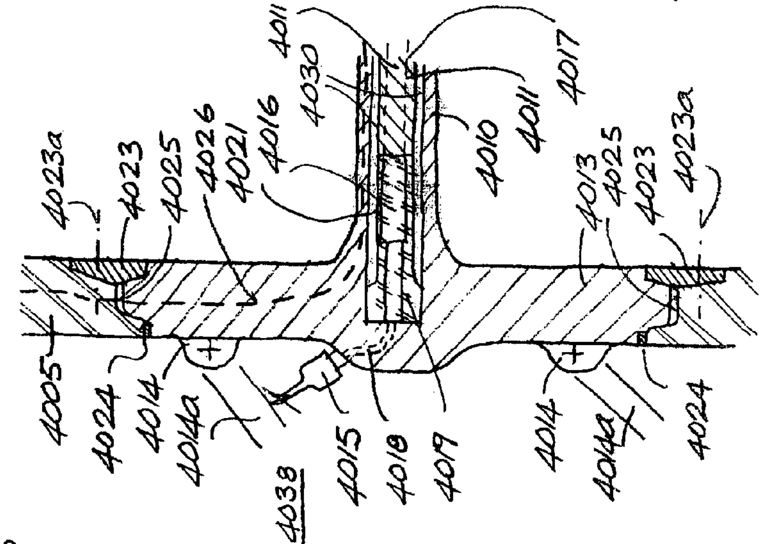
Figure 367:
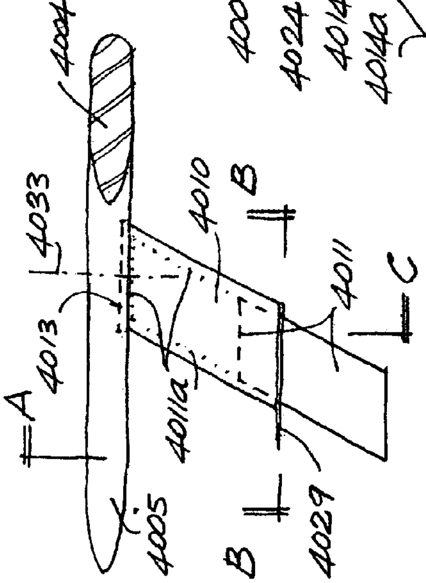
Figure 370:
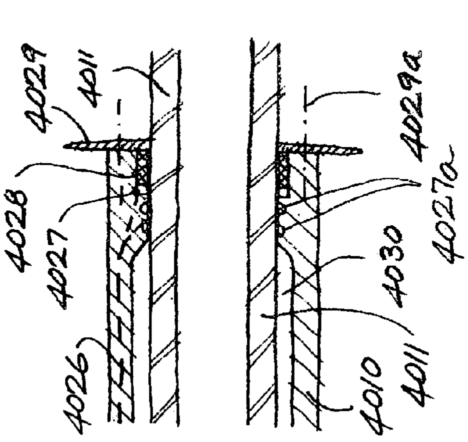

As note, portions of the hydrofoil(s) and/or the rudder(s)—effectively a vertical hydrofoil—may be wholly or partly extendable/retractable. By way of example, FIG. 365, a plan section through a post 4004, and FIG. 366, a section at "A" through a keel element 4005, show schematically a hydrofoil comprising a fixed portion 4010 attached to keel element 4005, with the fixed portion housing an extendable/retractable portion 4011 movable within a sheath or guide. Principal direction of motion is indicated at 4003, with the position of portion 4011 fully retracted shown dashed at 4011*a*. The Figures are similar to previous schematic illustrations, except that the plan shape of 4011 does not conform to that of 4010. In a further embodiment, a fixed hydrofoil portion is larger than needed to accommodate an extendable/retractable hydrofoil portion, so as to provide space within the fixed portion for any purpose, including housing of the following: structural reinforcement, fuel tanks, ballast tanks, sonar, depth finders, video cameras and lights. FIG. 365 shows the fixed portion widens towards the keel element, to provide spaces 3902 not housing portion 1011, to be used for any convenient purpose. In another embodiment, a fixed or extendable/retractable hydrofoil is rotatably mounted on a keel element or post. By way of example, an extendable/retractable hydrofoil is shown rotatably mounted on a keel element 4005 in schematic FIGS. 367 through 371, wherein the general arrangement is shown in plan view FIG. 367, sectional elevation "B-B" in FIG. 368, section on axis 4033 in FIG. 369, detail section "C" enlargement in FIG. 370, and detail plan view enlargement of junction between hydrofoil portions in FIG. 371. A section through "A" in FIG. 367 is as FIG. 366, except mirrored. Hydrofoil portion 4011 is shown extended from main hydrofoil body 4010 mounted on a keel element 4005, in turn attached to post 4004, with portion 4011 shown retracted in dotted line at 4011*a*. Hydrofoil portion 4010 has and end fin 4029 to improve directional stability, which is omitted in FIG. 368 for sake of clarity. In these embodiments, the main hydrofoil body 4010 and its extension 4011 are of approximately aircraft wing type cross-section and are adjustably pivotable about center 4012, on axis 4033. In other embodiments, hydrofoils of any cross-section may be used, and may be pivotable on any convenient axis. The angle of attack or degree of pivot, in most operating modes, is unlikely to be much more than around 5 to 10 degrees each side of the neutral or "straight ahead" position, but is shown at exaggerated angle at 4012*a* in FIG. 368 for illustrative purpose. The main hydrofoil body 4010 is integrally mounted on a bearing disc 4013, its inner face attached to actuation points 4014 at which actuation levers or tensile elements 4014*a* terminate. The inner face of disc 4013 also has a connection point 4015 for the system activating the motion of hydrofoil extension 4011. Any suitable actuation system for the hydrofoil may be employed, including the one illustrated schematically here, wherein hydraulic fluid coupled via connector 4015 activates movement of an hydraulic piston and cylinder actuation assembly 4016, housed within hydrofoil 4010 and slidably mounted within a cylindrical recess 4017 within both portions 4010 and 4011. A hollow passage 4018 conducts hydraulic fluid to an anchorage area 4019 in cylindrical recess 4017. In FIG. 370, fluid sealing devices are indicated schematically at 4028 and 4027*a*. A coil spring 4021 is optionally mounted about the piston to facilitate the retraction of 4011 within 4010 in the event of loss of hydraulic power or under other circumstances. The anchored end of 4011 may optionally have an irregular or non-parallel end profile, here shown scalloped at 4022, to distribute bending stresses induced in 4010 by up-thrust or down-thrust of 4011. The bearing disc 4013 has a stepped cross-sectional profile at its perimeter, seating in a corresponding profile in the keel section, and is retained by a removable ring 4023 fastened at 4023*a*. The junction between the bearing disc, the keel section and the ring includes bearing surfaces, optional bearing seals 4024 and an optional circumferential oil reservoir 4025 fed by oil passage shown schematically dashed at 4026. The oil reservoir may be in the form of an oil saturated compressible porous or permeable material or wick. The tribological fluid may be any substance of any composition, including conventional oils, heavy oil, grease, and may be gravity or pressure fed. In this embodiment the oil passage 4026 continues within hydrofoil 4010 to its extremity to terminate in another circumferential reservoir 4027 and/or alternatively 4027*a* and seal 4028, both having the approximate form of the cross-section of 4010. The seal is retained by a removable flange or fin 4029 and fastener 4029*a*. The reservoir 4027 may comprise a lubricant soaked porous or permeable material or wick, with its constituent parts such as fibers so arranged as to absorb oil or other lubricant from the surface of foil extension 4011 during extensible motion, and to give up oil onto the surface of 4011 during its retraction. Any suitable tribological material, including oil, etc. may be used. Either the inner surface of 4010, or the outer surface of 4011, or both, may house a series of inserts 4030 which act as bearing surfaces and/or guides, especially useful if the hydrofoil elements are made of relatively soft material(s). For example, the inserts may be of ceramic material(s). As shown in FIG. 368, the leading edges of the two hydrofoil portions are widely separated at 4030*a*, so that any minor damage to the leading edge of 4010 does affect the extendable/retractable motion of 4010. Elements 4010 and 4011 may have locating pins 4031 and/or locating grooves 4032, as shown in FIG. 371, to define the limit of extension of 4011 relative to 4010. Although not shown, a broadly similar system of inserts can be used to reinforce the bearing surfaces of disc 4013 and keel element 4005. Space 4038 is interior volume of keel element 4005. In another embodiment, any of the features of FIGS. 367 through 371 are embodied in extendable/retractable hydrofoil posts. In a further embodiment, all the inventions, constructions, configurations and details disclosed herein that relate to hydrofoils are adapted for use as aerofoils or airfoils, which are attached to aircraft. Such airfoils include front and rear wings, rudders, flaps, etc, of any cross-section, linear section, curvature, plan profile, range of pivotable motion, and attack angle that are suited to a particular aircraft. In particular, the constructions, configurations and details disclosed herein relating to extendable/retractable hydrofoils are used in aircraft airfoils, wings and/or rudders. For example, the embodiment of FIGS. 367 through 371 is also that of an extendable/retractable aircraft wing. In operation, such a wing would be in an extended position for take-off and landing, or other travel at slow speeds where greater lift is desired, and would be retracted for faster travel.

Figure 372:
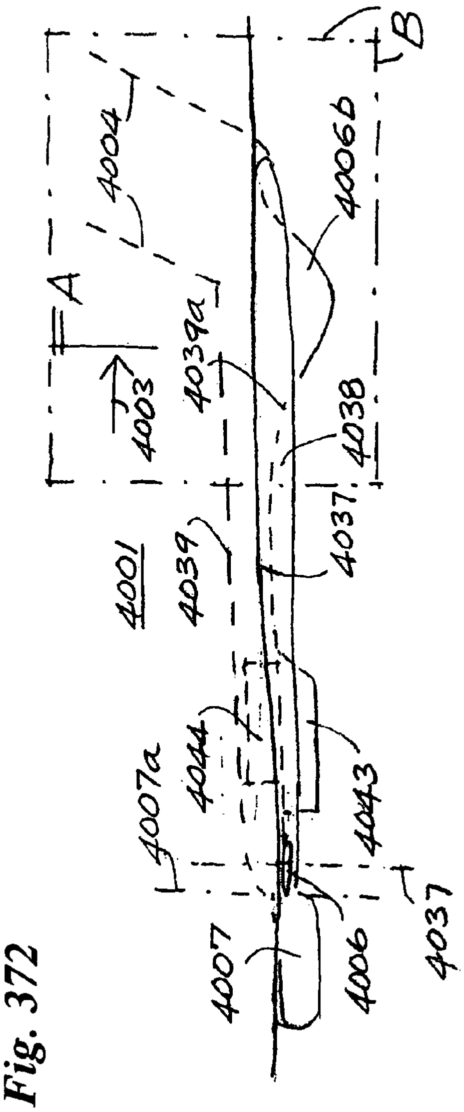
Figure 373:
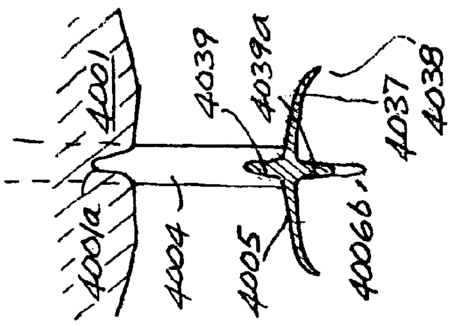
Figure 374:
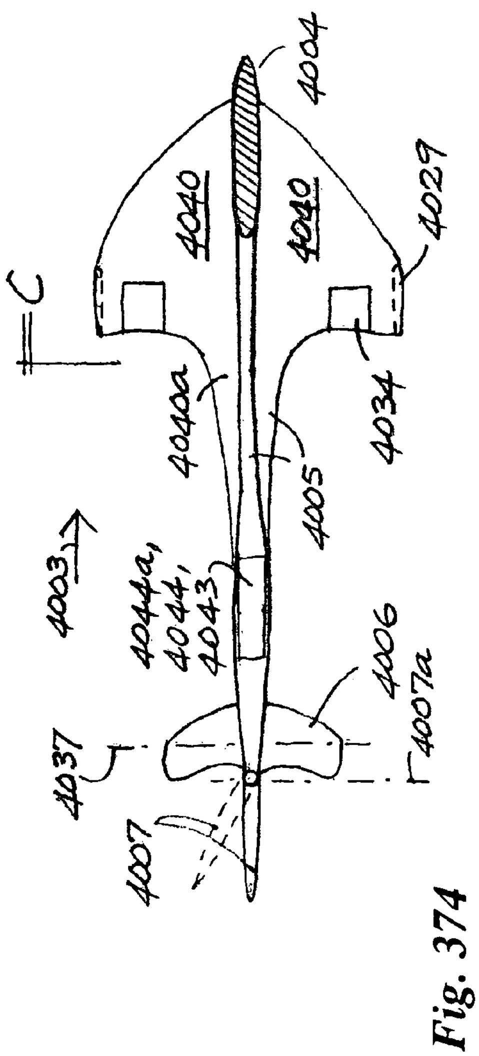
Figure 375:
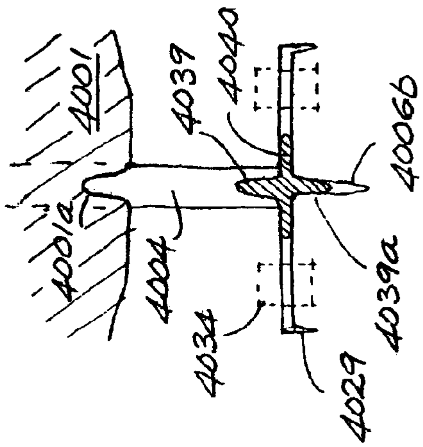

An extensible/retractable post and keel element can be retracted toward the hull to any final retracted position. In various embodiments, when the keel element is fully retracted it can either be clear of the hull, or wholly or partly up against the hull, or be partly or wholly located within a recess in the underside of the hull. In a further embodiment, the keel element itself can be so configured as to at least partly function as hydrofoil, to provide lift. By way of example, FIGS. 372 and 373 show schematically such a keel element, wherein FIG. 372 is an elevational view showing the keel element 4005 in its uppermost, partially recessed position, while FIG. 373 is a section through "A" taken when the keel element is in a lowered position. A rudder 4007 is shown hinged on axis 4007*a*, with electric motor or IC engine 4044 driving water jet propulsion device 4043. A small fin or stub keel is provided at 4006*b* to provide additional directional stability, and to also protect the rest of the keel element and its fixtures in case of accidental grounding. Moving aft, fin 4006*b* progressively changes into lower stiffening ridge 4039*a*, directly under upper stiffening ridge 4039 which, when the keel element 4005 is fully recessed, nests into a corresponding depression 4001*a* in hull 4001. No conventional hydrofoil is indicated because, in selected embodiments, the keel element may itself have sufficient hydrofoil or lift effect, especially if the angle of attack is somewhat greater than indicated here. The longitudinal section of the more or less horizontal parts 4037 of the keel element are of wing-like cross-section, so provide lift, while the turned down parts 4038 of the keel element restrict the sideways flow of water from underneath the keel element and so contribute to additional support. Aft of rudder axis 4007*a* the depression 4001*a* has widened out, so a turning rudder does not foul the hull. An optional stabilizing hydrofoil 4006 pivotable on axis 4037 is provided aft. In an alternative embodiment, main or any kind of hydrofoil is attached to post and or keel element. In FIGS. 372 and 373, section "A" is taken at a wider part of the keel element, which mostly narrows fore and aft of section line "A". FIGS. 374 and 375 show schematically by way of example an embodiment of a different type of keel element, seen in FIG. 374 in plan view from a cross-section through a post, and in cross-section at "C" in FIG. 375. An electric rotor or an IC engine 4044 drives a water jet or impeller 4043, both of which are located in the keel element 4005 much as in FIG. 372, here below a removable access hatch 4044*a*. The keel element is partly integral with main hydrofoils to produce a new type of composite lifting surface 4040, fitted with flaps 4034. At the rear of the keel element are optional conventional rear hydrofoils 4006 pivotable about axis 4037 and rudder 4007 hinged about axis 4007*a*. FIG. 375 is a section at "C" when the post is extended and shows the upper or back fin 4039 acting as a directional stabilizer and stiffening flange, also acting as a locator to recess in depression 1001*a* when keel element is hard up against hull. The lower ridge 4039*a*, which at the section line is a truncated form of fin 4006*b*, also acts as stiffening flange and as a direction stabilizer, as do the stub horizontal portions 4040*a* of lifting surface 4040. Down-turned fins 4029 are shown at the end of surfaces 4040.

Figure 379:
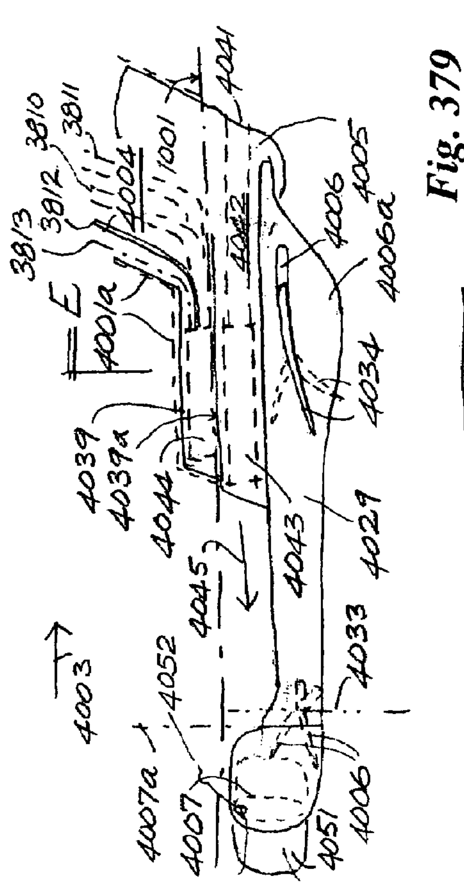
Figure 380:
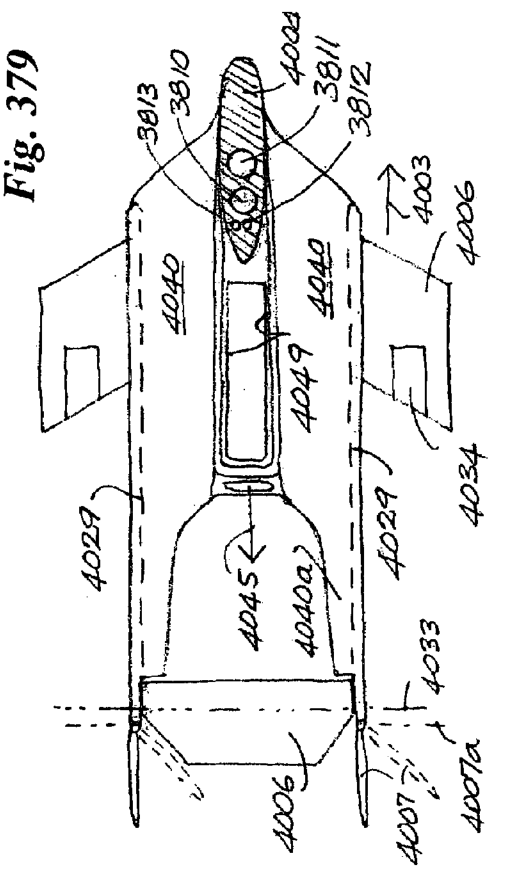
Figure 376:
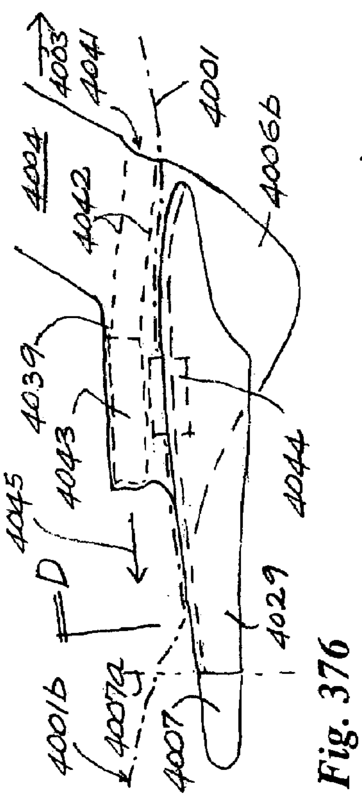
Figure 377:
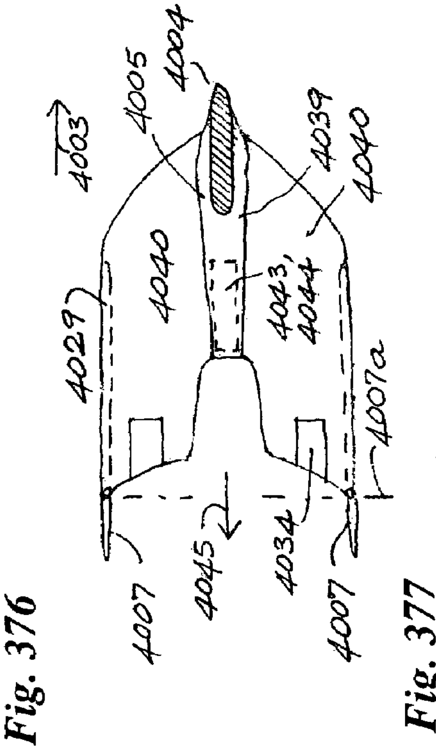
Figure 381:
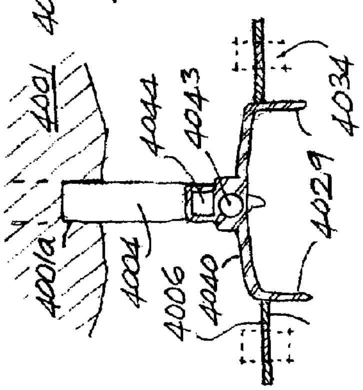
Figure 378:
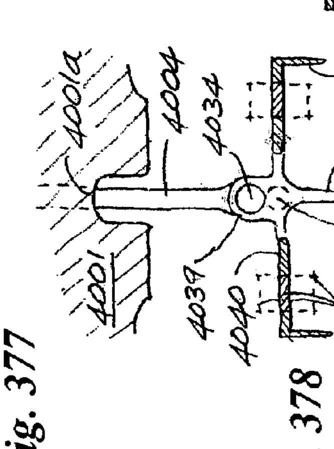
Figure 382:
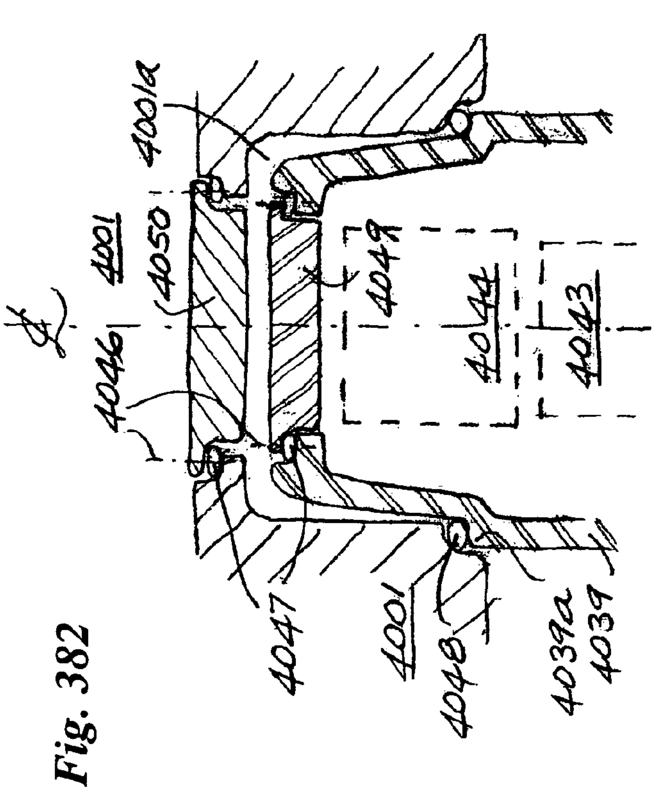
Figure 384:
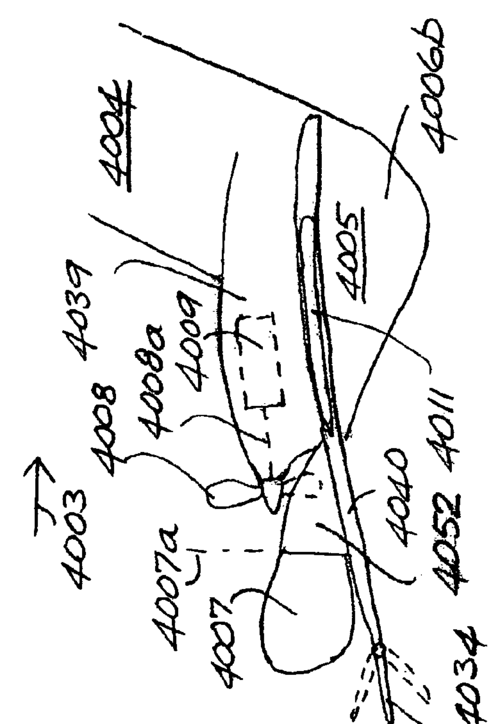
Figure 383:
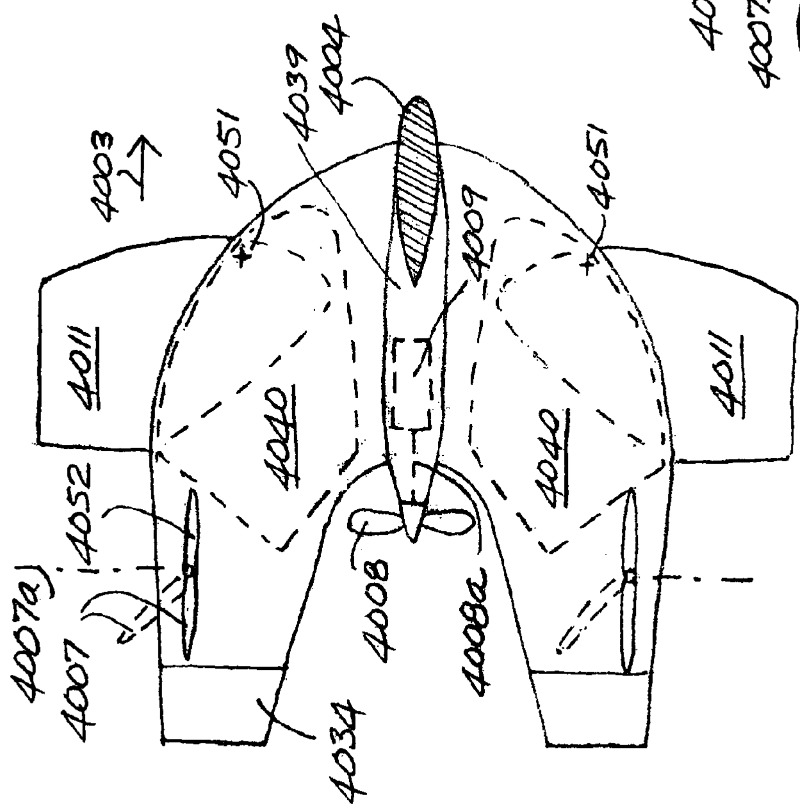

In other embodiments, the keel element may be integral with the post and, additionally or alternatively, it may effectively comprise a hydrofoil. By way of example, FIG. 376 shows in elevational view an embodiment of such a layout, effectively the region within the chain-dashed rectangle "B" indicated in FIG. 372, with FIG. 377 being a plan view seen from a cross-section through the post, and FIG. 378 being a sectional elevation at "D", with the three Figures all drawn at different scales. In this embodiment, post 4004 is not separate from but integral with keel element 4005 which is in turn integral with hydrofoil surfaces 4040 and also an upper housing or nacelle 4039. This same integral post/keel element construction can be used in any application or embodiment, including those described elsewhere in this disclosure. An IC engine or electric motor 4044 is located below the propulsion device 4043, which in this embodiment a water-jet drive supplied by water via passage 4042 from entry at 4041. Direction of normal forward motion is shown at 4003, with thrust generated by water-jet 4043 indicated at 4045. Flaps 4034 are provided at the rear of surfaces 4040, and side fins 4029 terminate in rudders 4007 pivoting on axis 4007*a*. A combined stub keel and stiffening flange 4006*b* is provided more or less directly under the post to take loads, and transfer them to post, in the event of grounding. The line of hull with post and keel element fully retracted is shown chain dashed at 4001 in FIG. 376, and in that position the water-jet can still operate by jetting water along hull depression 4001*a*, until the depression ends with upturn of hull bottom at 4001*b*. If the water-jet drive need not be located so high, then the positions of propulsion device and engine or motor could be transposed, thus avoiding the need to cross air supply for any engine with any propulsion water flow. In a further embodiment, a keel element is effectively a hydrofoil with additional hydrofoils mounted on it. In another embodiment, a nacelle above the keel element is in two parts, the upper slightly smaller than the lower, such that when the keel element is furthest against the hull, the upper part of the nacelle fits into a specially provided recess in the hull, with access hatches in both the top of the nacelle and in the roof of the depression in the hull, such that access to the interior of the nacelle and/or keel element is possible when the keel element/post is in fully retracted position. By way of example, both these embodiments are illustrated schematically in the side elevational view FIG. 379, the plan view FIG. 380 seen from the post cross-section, the section along "E" in FIG. 381, all to approximately the same scale, and the larger scale detail around the hull depression in FIG. 382. In theses embodiments, the engine or electric motor 4044 is higher than the propulsion device 4034, in this case a jet drive, and is located within pod or nacelle 4039 stepped at 4039*a*. Water enters at 4041, passes through passage 4042 to water-jet 4043, which in operation creates thrust in direction 4045, with direction of normal craft travel indicated at 4003. The rudder has an extendable and retractable portion 4051, which when retracted substantially nests within main rudder 4007, and which is pivotally mounted at 4052. If 4044 is an IC engine, then passage for charge air 3810, passage for exhaust gas 3811, fuel line 3812 and electronic controls 3813 are provided in the post 4004 and keel element 4005. The nacelle 4039 is integral with post 4004 and with main portion of keel element 4005 including the hydrofoil surfaces 4040, which are in turn integral with vertical side fins 4029, which each have a stub keel component at 4006*a*. Conventional fore hydrofoils 4006 are mounted on the vertical fins 4029, each with flaps 4034. Surfaces 4040 taper rearwards at 4040*a* to form stiffening flanges for side fins 4029, at the end of each of which a rudder 4007 is mounted on axis 4007*a*. The ends of the side fins are spanned by a rear hydrofoil 4006, pivotally mounted on axis 4033. In FIG. 379, when the keel element is most retracted, the lip or step 4039*a* on the nacelle 4039 rests against main hull surface shown chain-shed at 1001 and acts as a stop, with the upper part of the nacelle rest in hull depression 1001*a*. In this configuration, when the hull is in the water, all the systems of the keel element are still usable, and the craft can be powered by the propulsion device, steered by the rudders, and banked by the flaps on the fore hydrofoils. Viewing detail FIG. 382, when the keel element is uppermost, the nacelle lip or step 4039*a* rests against a seal 4048 mounted in a small recess at the edge of the depression 4001*a* in the hull 4001. Optionally, the seal is a hollow tube which can be inflated to create a pressure seal. To access the electric motor or IC engine 4004, the propulsion device 4042 or other equipment in the nacelle or keel element from within the hull, the water remaining in space 4001*a* is first pumped out, then hatch 4050 in the upper part of depression 1001*a* is removed, and thereafter hatch 4049 in the top of the nacelle is removed. Each hatch rests on a seal 4047 and is attached by fasteners 4046. Optionally, one or more of seals 4047 is a hollow tube which can be inflated to create a pressure seal. In the embodiments of FIGS. 379 through 382, the water-jet thrust 4045 is directed substantially above the rear hydrofoil. Alternatively, the propulsive thrust can be directed in any convenient position or location relative to hydrofoils, rudders, keel element components, main hull, etc. A need to provide a lip or step on the nacelle may be used to create another surface 4051 having modest hydrofoil lift effect. FIG. 357 shows a rudder 4007 having a vertically extendable telescopically mounted portion 4037, while FIG. 379 shows a rudder 4007 having a pivotally mounted horizontally extendable portion 4051. In another embodiment, hydrofoils, including vertical hydrofoils such as rudders, have one or more pivoted extendable/retractable portions. A schematically illustrated example is shown, in plan view from cross-section through post FIG. 383 and side elevation FIG. 384, wherein keel element 4005 principally comprises crescent-shaped hydrofoil surface 4040, at whose aft ends flaps 4034 are mounted, with principal forward motion shown at 4003. Extended hydrofoil portions 4011 pivoted about 4051 are shown dashed in retracted position Nacelle 4039 encloses electric motor or IC engine 4009 lied by shaft 4008*a* to propulsion device, here a propeller 4008, with stub keel located at 4006*b*. Rudders 4007 are pivotally mounted along axis 4007*a* on vertical stub fins 4052. The keel elements of FIGS. 372 through 384 nay alternatively be used in combination with any main or secondary and/or fore or aft hydrofoils, whether extensible/retractable or not, as for example in FIGS. 346, 358 through 364, especially if not required to be retractable into the hull recess to the degree shows. In other embodiments, the types of keel elements shown in FIGS. 372 through 384 are not located in a recess or depression in the hull when in their uppermost position. In an alternative embodiment, the keel element and the post are not retractable. The keel element(s) of FIGS. 346 through 384 may be used in conjunction with any combination of propulsion device(s), including impellers and propellers, and any power systems), including electric motors, IC engines of any kind, transmissions, and those indicated schematically in FIGS. 351 to 357.

In the embodiments of FIGS. 365 through 371, the action of hydrofoil components 4011 relative to 4010 is telescopic, as illustrated herein with a single extendable/retractable component telescopically mounted in a fixed component. More than one extensible/retractable/telescopic element may be used in association with any one hydrofoil, as shown schematically in FIG. 362B, and a keel element may have multiple compound hydrofoils, that is hydrofoils having at least two components movable relative to each other, to provide variable lift at a constant speed. The embodiment of FIG. 346 showed a telescopic-action hydrofoil post having one fixed portion, optionally a sheath or guide, and one extendable/retractable portion. In an alternative embodiment, a telescopic hydrofoil post comprises three or more portions, of which at least one is fixed. By way of example, FIGS. 385, 386 and 387 show schematically respectively in half plan view, elevation and sectional profile of numbered section lines an embodiment of a small, fast marine craft having two parallel hydrofoil post assemblies 4004, each comprising one fixed portion 3867 and two telescopically extendable/retractable portions 3867*a* and 3867*b*, retractable at an angle shown in FIG. 387, with the fixed portions 3867 comprising some from of sheath and/or guide system, recessed into and integral with the hull. Preferably, portion 3867 is an enclosing sheath to form a sealed barrier to prevent water entering the hull, whether the sheath is simultaneously a guide system or contains within it a separate guide system. The plan shows a profile of the hull at its widest at 3862 and its outline at waterline when in the water at 3863. In the section, half of each of the profiles numbered 1 to 8 are taken along section lines numbered 1 to 8 in the plan and elevation. Direction of principal travel is indicated at 4003. Each post and keel assembly has its own propulsion device 4043, here a water-jet, and electric motor or IC engine 4044, its own rudder 4007 pivoted at 4007*a*, and fore and aft hydrofoils 4006. The vessel has a third propulsion system for maneuvering in confined waters, comprising an IC engine 4009 coupled to optional transmission 4009*a*, which is linked by drive shaft 4008*a* to propeller 4008, aft of which is a third rudder 3864 pivoted at 3865. To provide additional low speed maneuverability when docking, a bow thruster 4053 is mounted in fore stub keel 4006*a*, which is provided to improve hull-in-the-water directional stability. At high speed, the hull lifts out of the water and is steered by rudders 4007, pivoted at 4007*a*. Line of an optional mast is shown at 4055. A feature of the hull is the extra depth and buoyancy 4058 on each side, over the keels when retracted, which will tend to reduce rolling. Another feature is the concave hull form between keel assembly contact positions, which will have a tendency to trap some of the bow wave under the main portion of the hull and so lift the vessel, enabling it to plane more easily, so reducing water resistance and improving fuel economy. The keel assemblies have projections 3866, which are part of the nacelles 4039, which house the electric motors or IC engines 4044 and which nest in corresponding depressions in the hull 4001*a*, along the lines shown previously in FIGS. 379 through 382. Optionally, the access hatches shown there are provided. Post portion 3867*b* is integral with the keel element 4005. When the craft is running with hull under mechanical power and driven by the propulsion devices, the force of the water against the submerged portions of the posts and the air resistance against the hall will tend to rotate the hull counter clockwise, and the fore and aft hydrofoils have to be positioned to rotate the craft anti-clockwise, this compensation causing increased drag. If and when the craft should sail with hull above water, the drag of the submerged portions will tend to rotate the craft clockwise, and the fore and aft hydrofoils have to be set in an opposite configuration, to rotate the craft anti-clockwise, again increasing drag. In an optimal situation, the craft travels under both wind and mechanical power, so that the rotational loads tend to balance one another, and the hydrofoils are set to a position causing the least drag, resulting in optimum fuel economy. In the craft of FIGS. 385 through 387, only the rear engine 4009, optional transmission 4009*a* and propeller 4008 together have reversing capability. In another embodiment, the transmission has variable drive ratios, optionally as disclosed herein. It is virtually inconceivable that a hydrofoil craft traveling with hull out of the water will in that mode want to go into reverse. If, in an emergency, reverse travel is required, the craft should first slow down, drop the hull into the water, come to a virtual stop, and then engage reverse. In many, if not most embodiments of hydrofoil craft, a reversing capability is not required in power and propulsion systems mounted in keel elements attached to posts, if the craft has another power and propulsion system with reversing capability for use when the hull is in the water. In large commercial vessels, it is likely to more cost effective to have a separate low-power propulsion system with reversing capability solely for use when the hull is in the water during docking and maneuvering, than to incorporate reversing capability on each of what may be several powered keel element/post assemblies. Another argument for having such separate systems, is that fast forward hull-out-of-water travel and slow hull-in-the-water maneuvering require very different power requirement and propulsion device (such as propeller, water jet) design. Energy use can be optimized if each propulsion and power system is designed for its function, rather than design one power system to do all things under all circumstances. These arguments apply less to small craft such a that of FIG. 346, with its single post, where it would be effective to incorporate a reversing function, optionally in transmission 4009*a*.

Figure 388:
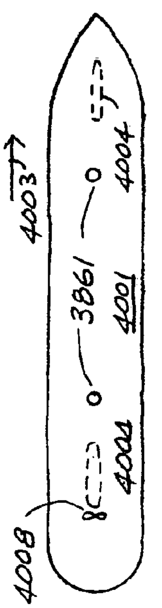
Figure 389:
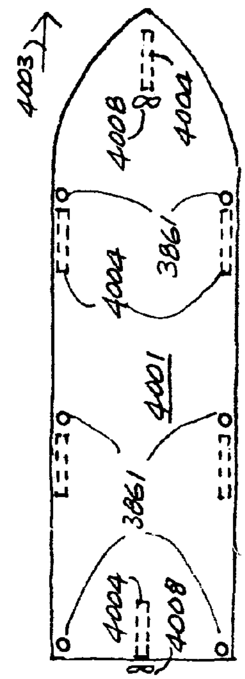
Figure 390:
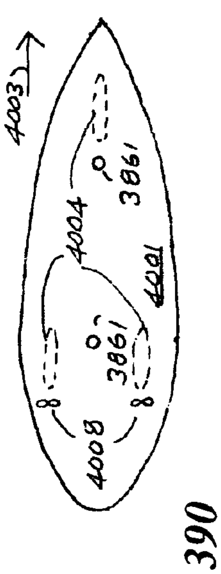
Figure 391:
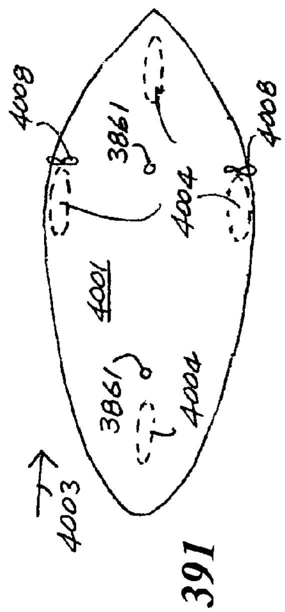
Figure 392:
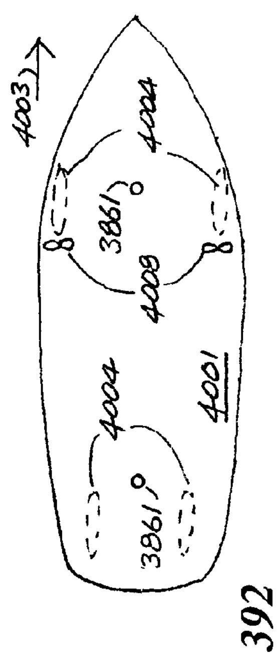
Figure 393:
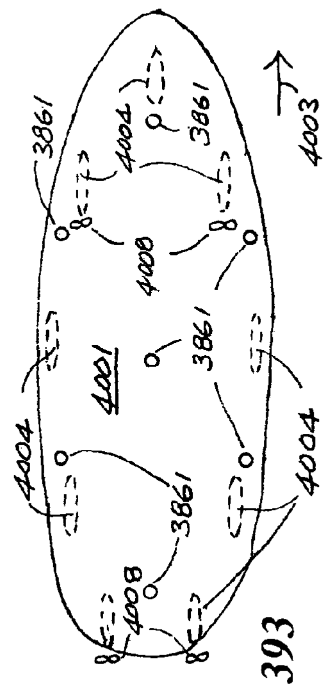

In a selected embodiments, hydrofoil marine craft have a hull plan shape approximating that of rugby or American football ball or of a teardrop form. Alternatively, they can have hulls of any shape. In further embodiments, hydrofoil marine craft have any number and layout of hydrofoil posts, whether these are fixed or extendable/retractable, and optionally any number and layout of sails and masts of any convenient height and configured to any appropriate rigging layout. The reduction and optimization of hydrofoil drag, as outlined above, and the additional motive power provided by any wind, is likely to make hydrofoil craft driven both by mechanical power and sail the most economical form of commercial marine transport. If masts are provided, it will be more economical to provide them at places on the hull already strengthened structurally, such as at or close to where the hydrofoil posts are located. Single post and twin parallel post layouts have been disclosed earlier. By way of example, FIGS. 388 through 395 show schematically in plan form examples of alternatively shaped hulls 4001, and alternative layouts of multiple posts 4004, shown dashed where they emerge from the underside of the hull, and optional sail masts 3861, where 4003 is principle direction of travel. The hull forms are suited to large commercial craft, with the possible exception that of FIG. 388. In each hull, different posts may have different dimensions and profiles, including in cross-section. Each post terminates in some form of keel element and/or hydrofoil assembly (not shown in these Figures), including optionally those disclosed previously herein. Where a propulsion device is associated with a particular post/keel element combination, a symbolic propeller 4008 is shown, although the device may be of any kind, including water-jet, etc. In the embodiments previously illustrated, the propulsion devices have been shown to the rear of the keel elements, in a “push” configuration. In alternative embodiments, the propulsion devices are near the front of the keel elements, in a “pull” configuration. Rudders can be mounted on any keel element associated with any post. The proportions of any hull form are to no particular scale, nor are the different Figures to a common scale. FIG. 388 shows a relatively long and narrow craft, where the spacing of widely separated posts in line is more practical. Generally, the passage of the fore post and keel element will create turbulence, and consequent possible loss of efficiency, for any post/keel element immediately aft. A propulsion device will create additional turbulence, and are generally shown towards the rear of smaller craft. The hull form of FIG. 389 is suitable for large commercial vessels, such as container ships. Optionally, the four side posts are rotatably mounted, and the central fore and aft posts are telescopically extendable/retractable. If such a vessel were to have masts, they are optionally located so as to interfere least with loading and unloading of any containers by quay-side cranes. The approximately teardrop hull shapes of FIGS. 390 through 394, for embodiment in all types of craft including large oil or commodity carriers and container ships, are less traditional, but have several advantages. Today, most large commercial craft have long, narrow hull shapes, because these generally present less resistance when pushed through water. In the case of the present large commercial hydrofoil craft of the invention, whose hulls are nearly always out of the water, these limitations no longer apply, making it possible to construct safer large craft. Large tankers have mysteriously disappeared, especially off the coast of South Africa, and it is surmised that they snapped in two and sank instantly—300 000 tons of oil aboard would cause that. The sometime swells of 20 to 35 meters height in that ocean can have centers close to length of the ship. The swell passing the ship repeatedly first lifts the middle section, leaving the heavily laden ends more or less suspended in mid-air, and then lifts the stem and bow, to leave the heavily laden rid-section unsupported, the continual flexing stresses eventually causing the stricken ship to snap in half. The teardrop shape lessens that risk, because there is more structure in the mid-section, and the bow and stem sections are less laden. The extra beam also reduces rolling. It may be noted that the tremendously seaworthy Viking ships had a shape close to teardrop. An argument against such shapes is that ship have to tie up to the presently used quays, which mostly does apply to container and passenger ships. However, large tankers are typically tethered to buoys or similar anchorages while loading or discharging, and could easily be of teardrop shape. If the tear drop shape became widely adopted in general commercial cargo and passenger craft, present quays could be adapted to link with the mid-portion of the ship. Large oil tankers are now obliged to have costly double hulls, and the teardrop shape, with its lower surface to volume ratio, will tend to be more economical. The reason for installation of double hulls was the frequent oil spills caused by tankers running aground, risks which double hulls are intended to reduce. A substantial advantage of the hydrofoil tankers disclosed herein, whether of teardrop or regular shape, is that in normal operation the entire hull is out of the water and, in that mode, any grounding will tend to damage the posts and keel elements and not the hull, thereby further reducing the risk of oil spills. FIG. 390 shows a hull form suited to craft where most of the load is carried aft, with two rear powered post and a front stabilizing post which optionally also has steering means. FIG. 391 shows a hull form with posts arranged in a cruciform layout and having a wide beam, with the central parallel posts sufficiently widely spaced for wind powered travel under a wide range of weather conditions. FIG. 392 shows another hull form with wide beam, permitting two pairs of parallel posts of varying separation, so that the wakes of the fore posts interfere only marginally with the water flows associated with the rear posts. The configuration of FIG. 393 is suitable for large crude and/or bulk carriers. The deck of such a vessel would be of such large area, that masts could be placed in virtually any convenient location. In vessels of a certain size, the increased beam of the teardrop shape would preclude passage through the Suez or Panama canals, so the teardrop hull form would be especially advantageous for ships that do not use these canals. The teardrop hull shape is also suited to craft operated by wind power for substantial periods. The hull form of FIG. 394 is suited for larger vessels, but also for smaller sail craft. The two fore posts are widely spaced and, especially if angled as shown in FIG. 447, would give suitable bracing against side thrust by wind loads, indicated at 4003*a*. In a selected embodiment, a computer program determines and measures strength and direction of wind loads, and makes continuous adjustment to the angle of attack of the hydrofoils attached to the keel elements associated with posts 4004, keeping the craft at a constant more or less upright angle. Optionally, a rear post is provided at 4004*a*, to assist balance and steering, with the main gravitational loads carried on the fore posts. In a further embodiment, posts and/or masts may be staggered laterally. Where sail power is important, and masts are lied structurally to or are close to posts, the optimum sail layout might not be to arrange masts abreast and parallel, but to stagger them, and with them the posts to which they may be structurally connected. By way of example, FIG. 395 shows a large commercial vessel, such as a container ship, with three posts on each side, with no parallel post pairs. Instead the posts 4004 and masts 3861 are at equal intervals, staggered on each side. Again, this type of vessel is often so large, that masts could be placed virtually anywhere. Mast heights on commercial vessels were and are typically limited to between 70 and 90 meters above waterline, depending on bridge clearances on designated routes. If the vessels's unladen deck height is 12 meters, then actual mast height may be up to around 75 meters. If vessel beam is 40 meters, spacing between masts is likely to be around 50 meters in the layout of FIG. 395, a height to separation ratio of about 7 to 4, enough to permit reasonably efficient capture of wind.

In a selected embodiment, extendable/retractable hydrofoil posts are provided on larger commercial marine craft of any size, including cruise and passenger vessels, container ships, bulk carriers and large oil carriers, with the extensible/retractable action effected by any convenient means, including by telescopic or pivotal action. In the figures herein, the hydrofoil posts have mostly been shown raked, slanting aft from the top, to tend to deflect downwards any object they may strike, and to reduce risk of snagging on lines, etc. In a further embodiment, the hydrofoil post may be deployed at any angle, measured in the vertical fore/aft plane. Generally, the largest stray floating objects in the oceans today are containers washed overboard and, for smaller craft at least, significant damage can be caused a post and possibly a keel element during a collision at speed with such objects, especially when running with hull out of the water. Collisions with whales are much rarer, because they sense an approaching craft and get out the way, but they sometimes do occur. For that reason, among others, hydrofoil operation is more suited to larger vessels, with their scaled up posts and keel elements. Almost all larger craft are designed for the draft and beam limits of their routes and likely ports, so if there are to be large commercial hydrofoil craft, the hydrofoil posts should be close to fully retractable. Even scaled for large vessels, hydrofoil posts could be damaged in collisions with sizable objects. In a further embodiment, a protective and optionally sacrificial shield can be mounted on the front of the post, and can optionally be designed to improve the fluid flow around and past the post to lessen resistance through water and air. The protective shield or device can be fixedly mounted, or be mounted on energy absorbing devices, including springs and fasteners that deform under load. The protective shield or device can be mounted on any type of marine craft to any kind of post, including fixed, hinged or telescopic, and to any kind of keel element and/or hydrofoil, including fixed, rotatable and those with extendable/retractable components. In another embodiment, the keel element and/or the post carries a forward mounted probe, which optionally has a sonar and/or under-water lights and a video camera. The probe can be fixedly mounted, or be mounted on energy absorbing devices, including springs and fasteners that deform under load. In a further embodiment, there is no separate probe; instead a sonar and/or under-water lights and video camera are mounted in or on a keel element, in or on a hydrofoil, in or on the lower front of a post, or in or on any protective shield. If mounted in or on a post, an aperture is provided in any protective shield. In a further embodiment, when the probe strikes or the sonar senses an object of sufficient mass to possibly damage post or keel element, it generates a signal to the post actuating mechanism, which quickly retracts the post, and optionally also any probe. In the case of craft having only one or two posts, it is preferable that the hull is so designed that the craft can safely "pancake" into the water at maximum travel speed, if any post is retracted. In the case of craft having more posts, the signal that causes a post to retract or that registers a sudden loss of post function can also be used to adjust the hydrofoils associated with the posts remaining in the water, so as to properly balance the craft, and/or provide for an orderly and progressive descent of the hull into the water. In an alternative embodiment, hydrofoil posts are pivoted at their junction with hull by any convenient means including by hinged elements, and optionally also at their junction with the keel element. In a selected embodiment, a parallel arm type arrangement is used for the post(s), similar to that used in drafting lamps, etc. The pivotable post may be mounted in any location on the hull, including on the sides, and any type of recess, depression or indentation may be provided in the hull to accommodate the pivoting mechanism, the post actuation mechanism, the post and/or the keel element, and or hydrofoils in the retracted position. In alternative embodiments, at least one such hinged or pivoted extendable portion can be incorporated in any kind of hydrofoil post, including those designated as 4004 in preceding Figures, and in substantially vertical hydrofoils, including rudders, such as those designated as 4007 in the diagram. To illustrate some of these embodiments, elevational view FIG. 396 and plan view FIG. 397, taken from a section at "A" through the post, illustrate very schematically by way of example a rotatable post assembly mounted to the lower side of the hull 4001 of a large commercial vessel, such as a container ship. This ship has several post assemblies with keel elements; the one shown is to provide lift and steering. Others (not shown) provide propulsive power and optionally lift also. In the post/keel assembly illustrated, the main post is indicated at 3841, the secondary post at 3842, an actuation piston optionally hydraulically powered at 3843, pivot points mounted on hull at 3844, and pivot points 3845 mounted on posts or keel element 4005. The keel element has a fore hydrofoil 4006, rudder 4007 pivotally mounted on axis 4007*a*, with principal direction of travel indicated at 4003. The hydrofoil comprises a fixed portion 4010 located under the main hull, and an extendable/retractable portion 4011 that extends through the base of the fixed portion, to project outboard of the keel element and of the main hull when extended. The purpose of this arrangement is to permit the entire hydrofoil system to retract to within or close to within the boundaries of the main hull, so that the vessel can navigate locks and dock without anything projecting past the main vertical face 3860 of the side of the hull. When posts and keel element are in fully retracted position, they are shown dashed at 3846, with pivot points moved to new positions at 3847, so that nothing or little projects below the main bottom 3865 of the hull, to facilitate movement in shallow waters. The keel element moves up and down in a plane which is roughly parallel with the main side of the hull and perpendicular to the water surface. A major recess or depression 3863 having a more or less vertical face 3871 is provided in lower side of the hull to accommodate the recessed post and keel element, and a minor recess 3864 having more or less vertical face 3862 is provided in the underside of the hull to accommodate the hydrofoil 3006. The actuating piston may include a shock absorber type of device, in this embodiment a coil spring 3848, to enable the keel element to move up and down relative to the hull, much in the way that wheels are mounted on a road vehicle via a suspension system. The main post 3841 is protected by an optionally energy absorbing and deformable shield 3849, somewhat more substantial towards the bottom, where the risk of striking objects when the hull is out of the water is greater. The shield is optionally attached to the posts by compressible means, here springs 3850. Mounted on the keel element is a "T" shaped probe, with the leg portion of the "T", which may be telescopic, indicated at 3851 and the top bar of the "T" 3852. Optionally, the bar 3852 has two portions 3866, pivoted at 3867, which can either swing back on collision as shown at 3868, or be folded back when the probe is retracted, as shown at 3869. Optionally also, the bar 3852 or head of the "T" is approximately as wide as the keel element including hydrofoils when and if fully extended, and is aligned with it. The leg 3851 is mounted in a hollow tube 3853 in the keel assembly and is actuated and or restrained by any convenient means, indicated by schematic arrow 3854, including an hydraulic piston and cylinder assembly, optionally with a spring biasing the probe to a retracted position. In alternative embodiments, the leg 3851 in not retractable, or the leg is biased to an extended position. In another embodiment, bar 3852 has no pivoted or hinged portions. Optionally, the tube has about it an electronic sensor 3855 monitoring the position of the probe. An underwater video camera 3856 and at least one underwater light 3857 may optionally be mounted on the probe. For sake of clarity, camera and light are not shown in FIG. 397. In another embodiment, a recess 3858 is provided in the keel element or the post for housing equipment such as sonar, camera, lights etc, and a suitable aperture 3859 is provided in any protective element 3849. In this diagram, none of the items shown are drawn at any particular scale or size relative one another, such scale and size to be separately determined for each craft. In another embodiment, the principal of retracting the post, keel element and hydrofoil(s) to a position to where they are within or close to within the limiting planes of the hull can be applied to craft having telescopic posts. By way of example, FIG. 398 shows schematically an elevational view of part of the hull 4001 of a large commercial ship, that part having one extendable/retractable integral post 4004/keel element 4005 with rudder 4007 and hydrofoil 4006, with direction of principal travel shown at 4003 and waterline at 4002. The post assembly consists of portion 4004 which is retractable within fixed sheath or portion 4004*a*, which effectively acts as a guide system. The sheath or fixed portion 4004*a* is structurally attached to side of hull 3860 and is optionally integral with it, and optionally terminates in an enclosure 3872 projecting above deck 3874 and railings 3873, the enclosure partly forming a portion of and extending vertically the more or less vertical main side of the hull. A depression or recess 3863 having a more or less vertical face 3871 is provided in the side of the hull to house the retracted keel element 4005, and another depression or recess 3864 having more or less vertical face 3862 is provided in the underside of the hull to house the retracted hydrofoil. In the examples above, both the pivotal motion of the post in FIGS. 396 and 397 and the telescopic action of the post in FIG. 398 were in substantially in a plane approximately parallel to the side of the hull and perpendicular to the water level. In another embodiment, the pivotal or telescopic motion of an extendable/retractable post can be in any plane. By way of example, FIG. 399 shows schematically a cross-section through the hull 4001 of a large commercial container ship having at least two parallel post 4004 and keel element 4005 assemblies. The keel element with hydrofoils is substantially similar to those disclosed in FIGS. 396 through 398, with fixed hydrofoil portion 4010 having within it extendable/retractable hydrofoil portion 4011, which passes through the keel element. It is shown retracted on the right side, and extended on the left. Posts 4004 extend from and retract into fixed sheaths, housings and/or guise systems 4004*a*, which extend above main deck 3874 and railings 3873 into housings 3872 projecting above the main hull 4001. Optionally, the housings 3873 are so arranged and dimensioned as to permit the stacking of containers 3875 between and around them. When the post and keel elements are fully retracted, they hardly if at all project beyond the main bottom 3876 and side surfaces 3860 of the hull, with the keel elements nesting in depressions or recesses 3863 having vertical surfaces 3871, and the hydrofoils nesting in recesses or depressions 3864 having more or less vertical surfaces 3862. In another embodiment, the recesses or depressions housing a post, keel element or hydrofoil has any convenient form.

Figure 400:
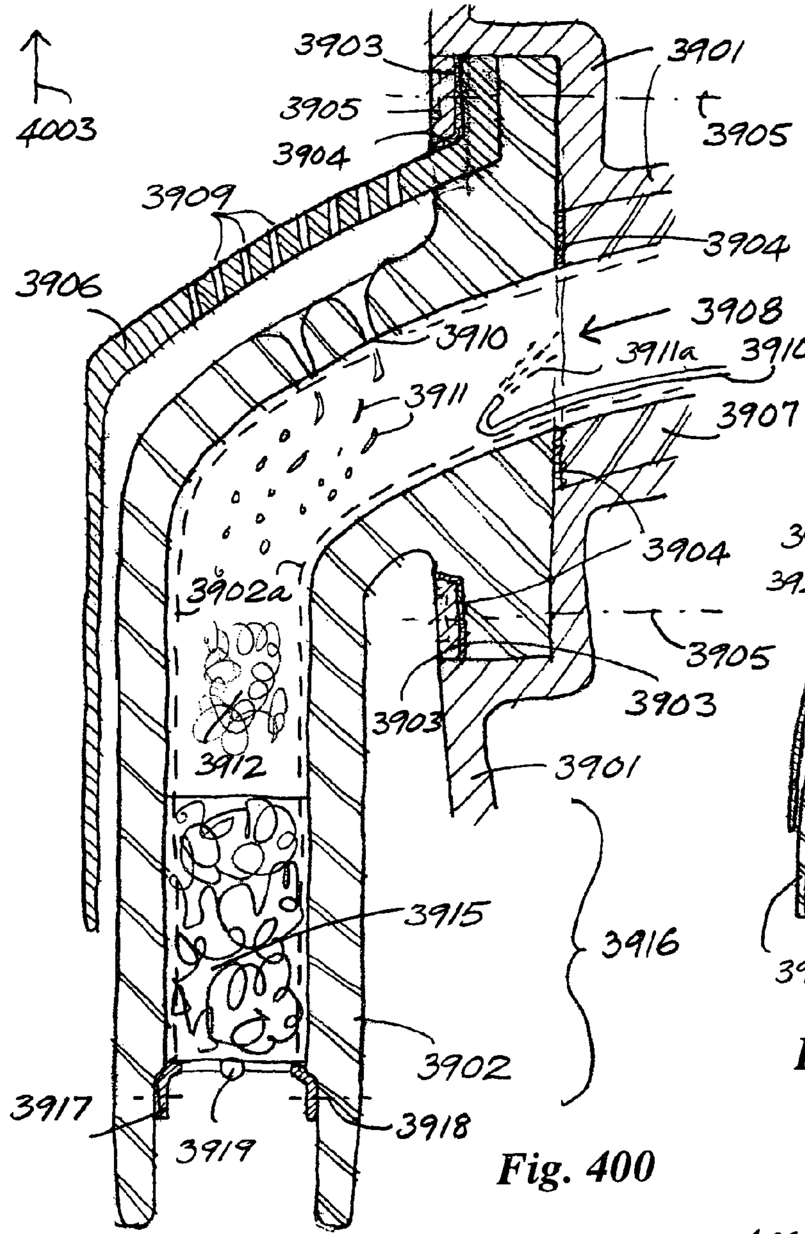
Figure 401:
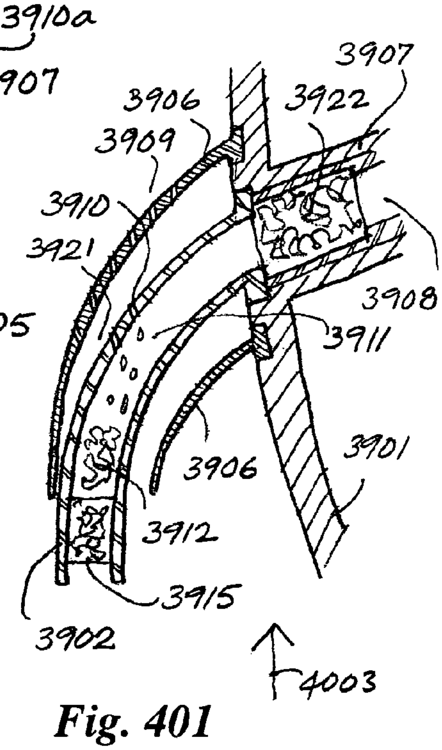

Exhaust gas can be used to vaporize water, i.e., produce steam especially with the un-cooled engines of the invention, and particularly in marine applications where water is readily available. Systems are disclosed herein, wherein the steam is put to work in a second engine, the reciprocating engine portion and the steam engine portion together comprising a compound engine. In the disclosures which follow, exhaust gas is referred to. In alternative embodiments, the gas could be a mixture of exhaust gas and air, or any other gas or combination of gases. In a selected embodiment suited to marine IC engines, exhaust gas is mixed with water within an exhaust gas processing system attached to and part of a marine craft, then discharged with water into the water the craft is traveling in. In a further embodiment, hot exhaust gas is used to convert water from liquid to steam in an exhaust gas processing system attached to and part of a marine craft, then discharged with water in mostly gaseous form into the water the craft is traveling in, so as to provide a degree of additional thrust to propel the craft forward. In another embodiment, exhaust gas is mixed with water in an exhaust gas processing system to assist in the removal of regulated pollutants, including hydrocarbons, particulate matter, carbon monoxide and nitric oxides. In an alternative and/or additional embodiment, exhaust gas is mixed with one or more other substances including water and/or a substance in solution in water, in an exhaust gas processing system in part to remove the presently substantially unregulated carbon dioxide ($CO_2$) from the exhaust by causing it to react or otherwise combine with other substances and/or water to form any other product. Optionally, a system for removal of $CO_2$ incorporates the formation of carbonic acid, which is optionally passed across a metal or base filamentary or other system which combines with the acid to form salts in the processing system. In an alternative water-based system for removing $CO_2$, lime or calcium oxide is introduced to water to form calcium hydroxide, which reacts with $CO_2$ to form calcium carbonate, a precipitate which is later removed. To illustrate some of these embodiment schematically by way of example, FIG. 400 shows a section through a below-the-waterline marine exhaust gas processing system attached to and projecting from a hull structure 3901, with direction of principal craft motion shown at 4003. An enlarged specially formed exhaust pipe 3902 of any suitable material, including optionally ceramic, is attached to the hull by any convenient means, here a ring 3903, compressible sealant type material 3904 and fasteners 3905. The ring also attaches protective guard 3906 of any convenient material, including metal, which partly surrounds the pipe 3902, and has a series of multiple fine apertures 3909 which admit the passage of water but virtually no debris or organic matter. The apertures are shown of tubular configuration, but they may ave any convenient form, including of progressively varying cross-section and be of any size or number. The exhaust passage within the hull where it meets up with pipe 3902 optionally has a ceramic lining 3907, with compressible sealant type material 3904 optionally at the junction of pipe and lining. The passage defined by lining 3907 is here optionally wide to slow gas velocity at 3908. Alternative, the passage may be relatively narrow to provide a more rapid gas flow. If it is desired that the treatment system have a degree of thermal insulation, then the material of which the pipe 3902 is made has thermal insulation properties, and/or a lining of thermal insulating material is applied to the interior of the pipe, as indicated schematically at 3902*a*. The thickness of the pipe relative to the insulation are drawn to no particular scale; both pipe and insulation can be of any convenient thick ness. In operation, when the craft is traveling forward, water passes through the guard apertures 3909 and enters the exhaust pipe via a series of selectively sized and configured holes at 3910 in the form of droplets, a jet, a spray, a stream, or a combination of some or all of these as shown at 3911. In an alternative or additional embodiment, water is supplied via pipe or passage 3910*a* and fed, dribbled, sprayed or injected into the flow of exhaust and/or other gas as at 3911*a*. In a further embodiment, any solid, liquid or gaseous substance designed to react or mix with at least portion of the exhaust gas is introduced to the gas via any delivery means, including that of 3910*a*, at any location in the pipe 3902. Once in the exhaust gas flow, the jets, droplets, sprays or streams are broken up into smaller units by the kinetic energy and turbulence of the exhaust gas, which has sufficient time to both vaporize and/or boil some or all of the water. Some or all of the pollutants including $CO_2$ in the hot gas reacts will react with the water and any other substances introduced to the water to form new substances. The resultant mixture of exhaust gas, introduced substances, newly formed substances, and water in liquid and gaseous form is shown at 3912. The conversion of water to steam will create a high-pressure zone at 3913 to create thrust in direction of arrow and to create a column of gas in the surrounding water 3914, with the gas/water boundary indicated schematically at 3920. Further reactions can be induced, optionally in the pipe in the area indicated by bracket 3916, by any convenient means, including for purpose of removing pollutants in the exhaust gas, for removing introduced substances and/or newly formed substances. By way of example, a cartridge of filamentary and/or other material 3915, including as disclosed elsewhere herein, is placed in the pipe and held in place by raining ring 3917 and fasteners 3918. The filamentary and/or other material is optionally of any composition that will react with components of the exhaust gas and/or other substances to form a new substance. Optionally, the filamentary and/or other material includes a catalyst, to facilitate and/or hasten the speed of reactions. After a period of operation, much or all of the filamentary will have ablated or been consumed by reaction with carbonic acid, and the cartridge of filamentary material will need to be replaced. Optionally a sensor may be placed at any suitable location, including that shown at 3919, to measure the quantity of any pollutant or substance exiting the exhaust pipe 3902. In a further embodiment, a light of distinctive configuration is placed on the craft in a position easily visible to law enforcement personnel, and this light is illuminated when an excess of any substance, and/or any other pollutant is being discharged into the water. In operation, as the exhaust gas enters at 3908 and meets the water at 3911, the gas will heat the water and convert at least some of it to steam, and portions of the water or of the constituent hydrogen and/or oxygen will react with some of the pollutants to form relatively ham-less substances. Any solid or particulate matter in the exhaust gas will have been wetted and made heavier, slowing it down and making it easier to be trapped in the filamentary or other material at 3915. In another embodiment, the exhaust pipe 3902 is divided into two or more zones arranged one behind another, each with its own treatment systems optionally including one or more catalysts and/or filamentary material. Each zone optionally has its own water delivery means. In one or more zones, regulated pollutants would be removed, while optionally in one or more other zones, the generally unregulated CO2 would be removed. By way of example, FIG. 401 shows an exhaust system with multiple treatment zones, with principal craft movement shown at 4003. Features and constructional details are similar to those in FIG. 460, and are similarly numbered. An emissions treatment module 3922 not requiring water is positioned in passage 3908 by attachment of pipe 3912. After designated pollutants are removed, the gas passes down exhaust pipe 3902 for the removal of any other pollutant or substance(s), as described above in relation to FIG. 400. Here a more substantial guard 3906 is provided to protect the pipe, optionally so positioned in relation to the pipe to create a higher pressure zone in the water around 3921. In a further embodiment, the exhaust gas is not mixed directly with water, instead the water is passed over heat exchanges which have derived their energy from the exhaust gas by any convenient means, including those disclosed elsewhere herein. In such case, the exhaust gas may be discharged separately from the water products, either into the water or into the air. In a further embodiment, air or a mixture of air and exhaust gas at any desired temperature and pressure is admitted into the pipe at 3908, to interact with the water to form steam to provide thrust at 3913. The principles and innovations described in FIGS. 400 and 401 can be en-bodied in any convenient location, including in pipes or passages located within a marine craft hull, and the exhaust gas discharged into either below the waterline or above it to ambient air in any manner from any convenient location in the hull or other portion of the craft.

Figure 402:
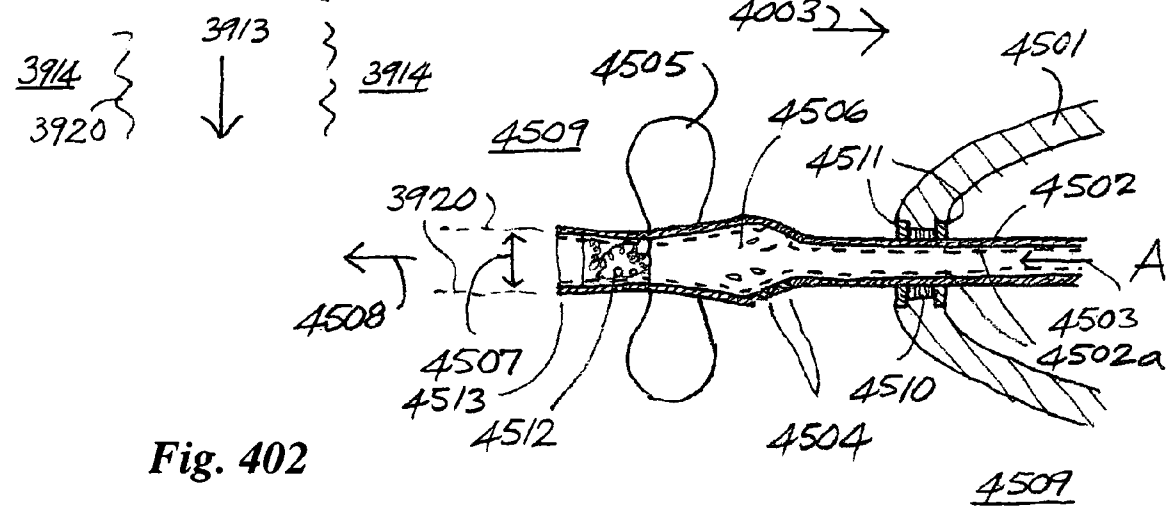

In a selected embodiment, rather than have a separate gas discharge pipe as 3902 in FIGS. 400 and 401, the exhaust or other gas(es) are discharged along the center of rotation of a marine propulsion system directly or indirectly driven by any means, including by IC engines and/or electric motors, with the gas(es) optionally passing through a hollow drive shaft to which propulsion devices such as impellers or propellers are attached. Any of the embodiments illustrated in FIGS. 341 through 399 may alternatively have gases ducted through the interior of one or more hollow rotating shafts on which propulsion devices such as impellers or propellers are mounted. By way of example, FIG. 402 schematically illustrates this principle in its simplest form, showing the stern 4501 of a propeller-driven marine craft mounted in suitable bearing 4510 and glands or seals 4511, with direction of normal mine craft travel indicated at 4003. The interior of the hollow propeller shaft 4502 carries hot exhaust gas flow 4503. The in-board end of the shaft at or to the right of region "A" is mounted on bearings, is delivered a supply of gas via connectors and seals, and is imparted rotary motion by an IC engine, electric motor or transmission, all not shown. Optional insulation, indicated schematically in dashed line at 4502*a* is provided to the interior of shaft 4502. An aperture system 4504 is located where the shaft bells out to support the propeller blades 4505. The conversion of water to a mixture of water, water vapor and/or steam at 4506 creates a higher pressure and accelerated, initially more-or-less horizontal, column of gas of diameter 4507 into the surrounding water 4509. The boundary between water and gas is shown schematically at 3920, discharging from the propeller hub in direction 4508, to create a degree of thrust. In addition to providing some thrust, this "column" of gas improves propeller performance in two ways: it prevents the water collapsing in on itself immediately behind the core of the propeller, and it permits a larger ratio of hub to overall propeller diameters, thereby enabling the inefficient restricted passages between blade roots to be reduced, as a percentage of total propeller water clearance space. Alternatively, propellers having a greater number of blades for a given swept area may be constructed. Optionally, the hollow propeller shaft is effectively an exhaust treatment system along the lines disclosed above, and may be of any convenient length, including length aft of the propeller blades, and may contain any device to assist in or promote chemical reaction including filamentary material with or without catalysts, in any convenient location, including as indicated at 4512. The exhaust gas treatment may be to reduce regulated emissions, and/or to reduce CO2, and the system may include sensors and lights located in a highly visible location, to indicate some form of malfunction of the system FIG. 402 shows an un-shrouded propeller. In an alternative embodiment, the above principles are applied to shrouded propellers, impellers or other propulsion means, as shown by way of example shown in subsequent Figures. The principle of gas flow through the center of drive rotation may apply to any gas, including unadulterated exhaust gas and/or exhaust gas mixed with air, from any source, in all the preceding and subsequent disclosures herein. The hollow propeller shaft may optionally either be of thermal insulating material and/or have a lining of thermal insulating material applied to the exterior or interior of the tubular shaft, which may be of constant or progressively variable cross-sectional diameter. Water at any temperature may be delivered by any means to the water/exhaust gas mixing point or, if superheated and/or under pressure, to a combined pressure release and discharge point, including by capillary tubes or passages within propeller shaft wall thickness. According to the exit gas velocity desired, propeller core diameter at 4507 can be adjusted relative to the diameter of the hollow shaft at 4502. If diameter 4507 is smaller, some back pressure in the exhaust system may occur, which may be partially offset by a pressure drop caused by the venturi effect of liquid streaming past the rim of the propeller hub 4513. In a selected embodiment, gas may alternatively or additionally be used to reduce friction between water and propeller or impeller blade surfaces. By way of example, schematic FIG. 403 shows a propeller shaft 4502 outside a hull. Gas of any kind, optionally exhaust gas, flows 4503 along a hollow propeller shaft 4502, then flows through hollow blades 4520, with the flow shown dashed at 4514 only in the upper blade, and is discharged to the water alternatively by a series of closely spaced apertures 4515, or a narrow permeable strip 4516, located at or near the leading edge of each blade. The forward motion of the craft in normal motion in direction 4003 will cause a laminar flow of gas 4517 between water and blade surface, as shown only in relation to the lower blade. A similar flow can be created over propeller hub nacelle 4518 by means of a series of closely spaced apertures, or a narrow permeable strip, located at 4519 ahead of blade roots. Optional thermal insulation is shown at 4502*a*. The features of FIGS. 402 and 403 can be combined, optionally by having two differing gases or gas systems.

Especially but not exclusively in shrouded drive system, the presence of a coaxial gas system will permit a propeller or impeller hub of progressively varying diameter, to match the acceleration of the water across the blades. FIG. 404 illustrates this principle very schematically and shows a hollow propeller shaft 4502 emerging from an aft extension of a marine hull in the form of a drive shaft housing 4501, with gas traveling inside the shaft at 4503. The shaft optionally has internal thermal insulation 4502*a*. Propeller blades 4505 are mounted on the shaft and enclosed by shroud 4521 supported by struts optionally also functioning as fins 4526, anchored to a drive shaft housing 4501. Optionally, a grille-like debris deflector 4523 is mounted on the leading edge of the struts or fins 4522. Impeller or propeller blades 4505 rooted to a belled shaft end 4524 in operation accelerate water in the opposite direction to principal forward motion 4003. A series of small apertures allow just sufficient water into the shaft at 4506 for the heat energy of the gas to turn nearly all water to steam, which together with the exhaust gas passes through an pollutant removal cartridge or device at 4512, to exit at 4507 and create a degree of thrust at 4508. Outside the hollow shaft, water enters the system through cross-sectional area represented at “A” at a speed roughly equivalent to forward motion; if it is accelerated the water flow will occupy less cross-sectional area represented at “B”. Any gas system can be used to create gas flow through the hollow shaft and belled end 4529 to both provide some thrust and provide a core gas cylinder at 4507 to support accelerated water tube 4509 passing through the zone defined by “B”, with boundary between gas and water indicated schematically at 3920. In the arrangement of FIG. 404, the features of FIG. 403 may also be incorporated, for example gas may be directed through the leading edges of shroud 4521 and/or fins 4522, impellers or propellers 4505 and the trailing edge of housing 4501. In an alternative embodiment, the method of reducing the friction of water flows across impeller/propeller blades, shrouds, etc. by means of very thin film of gas between water and component surfaces is effected by using heat, preferably at the leading edges of such components. For example, in FIG. 403, where there are now a series of closely spaced apertures at 4515, there would alternatively be created a heated area at a similar location. The heat would cause just a few of the molecules of water passing over the area to vaporize or boil, sufficient to produce a thin gas film, which would adhere to the surfaces under optimum conditions due to laminar flow. The local heat can be provided by any means, including directly by electric heaters and/or by the exhaust gas or indirectly by liquid circulating through a heat exchanger placed in the exhaust gas flow. If gas is used to reduce friction, then it can be directed along the appropriate surface by exiting from a continuous slit. By way of example, FIG. 405 shows this schematically, being a cross-section through a propeller or impeller blade 4505 which is hollow and comprises a main portion 4525 and a leading edge portion 4526, the portions structurally linked by any convenient means, including bridges, clips etc at 4527. Gas leaves the interior of the blade 4529 via continuous slit-like aperture 4530 to flow past the exterior surfaces of portion 4525, with the laminar flow of gas past the man body of the surface indicated at 4528. A heater 4505*a* is indicated schematically for purpose of heating a local exterior surface. If the gas is heated, various insulating material can be disposed inside the blade to give varying surface temperatures, as indicated schematically at 4525*a*. The feature described in relation to FIGS. 403 and 407 have concerned rotatable propulsion devices. In other embodiments, they can be incorporated in any under-water portion of a marine craft In a selected embodiment of a marine craft, exhaust or other gas is introduced to the water flow past and/or through a marine propulsion device including a propeller or impeller mounted within a shroud or other housing wholly or partly enclosing the device, with the gas leaving the device rewards in a direction substantially opposite to that of normal forward motion. In a further embodiment, the gas in introduced in such a way that, when the direction of rotation of the propulsion device is reversed, all or part of the gas flow is directed forward and the craft travels in a reverse motion. Currently available water-jet drives, such as manufactured by KaMeWa in Sweden, have fixed inlet and outlet openings, the latter being between about 50% to 65% of the cross-sectional area of the former, to accommodate the acceleration of water achieved by the impellers. To reverse the marine craft, the water flow through the drive remains unchanged but deflector plates are moved into position rearward of the outlet nozzle to deflect the thrust through 130° to 180° from normal direction. The cumbersome and weighty deflector plates and actuating mechanism when in the retracted position for normal forward motion causes substantial drag, especially where the drive is mounted substantially below the water surface. In a further embodiment, gas is used not only to provide some thrust but also as bulk within a drive to permit the elimination of reverse deflector mechanisms. Instead, the rotational direction of the impellers is reversed, water is sucked into the normal outlet aperture and driven out through the normal inlet aperture, water acceleration and effective reduction of cross-sectional exit area being achieved by reversal of the gas flow within the drive. By way of example, FIG. 406 shows schematically in longitudinal cross-section a shrouded propulsion device having a fore impeller or propeller 4531 normally rotating in one direction, with an aft propeller or impeller normally 4532 rotation in the opposite direction, with the impellers or propellers optionally of different configuration and/or size. Direction of normal forward motion is shown at 4003. Aft impeller or propeller is mounted on a hollow drive shaft 4533, which is mounted in the hollow drive shaft 4534 on which the fore impeller or propeller is mounted, with gas passing in direction 4535 through the interior volumes of both shafts. Gas exit holes 4546 are provided in both shafts. Outer shaft 4534 is rotatably mounted in stern portion 4536 of hull or post or keel element, with suitable bearings, seals and glands indicated schematically at 4541. The are optionally other in-hull bearings, together with seals and glands permitting the inflow of gas to the interior of the shafts, at or near region “A: (not shown). The shroud 4537 is supported on fore struts or fins 4538 which have at their leading edge a circumferential grille 4542 to keep out debris, plant matter and marine creatures. At the rear, the shroud is attached to struts or fins 4539 supporting an optional cone-shaped rear bearing housing 4540. In operation, forward motion is described in the upper half of the diagram, wherein water enters the shrouded space at 4543, is accelerated by fore impeller or propeller 4531 before being mixed with gas 4547 exiting from holes 4546, thereafter being further accelerated by aft impeller or propeller 4532 and again being mixed with gas and exiting the shroud at the rear to provide thrust at 4508. It will be noted that in normal operation impeller 4531 drives non-aerated water, while impeller 4528 drives a mixture of non-aerated water, aerated water and gas. In an alternative embodiment, gas is discharged from shaft 4534 forward of the first impeller or propeller 4531. Rearward motion by the craft is described in the lower half of the diagram, wherein the direction of rotation of both shafts is reversed and water enters the shrouded zone at 4544, is pushed forward by impeller or propeller 4532, mixed with gas at 4548, then again pushed forward by impeller or propeller 4531 and again mixed with gas at exit at 4545, to provide thrust at 4545. If the design of the impellers or propellers is optimized for fast forward travel, then the thrust produced during reversing at 4545 will be a small fraction of the thrust produced during normal forward motion at 4508, but in many applications this thrust will be sufficient for low-speed maneuvering or docking. Optionally a protective grille 4542*a* similar to that at 4542 can be provided at the aft end of struts or fins 4539, to protect against ingress of debris during reversing. In a further embodiment, the rate of gas flow per unit of speed is increased or decreased during reverse propulsion. Such increase in gas flow can be accomplished by any convenient means, including the release of additional gas from a reservoir, containing exhaust gas, optionally under pressure, which has been collected during selected non-reversing operating modes. Any kind of gas can be used, including mixtures containing all or some of the following: exhaust gas, air, water vapor, steam, CO2, etc. In an alternative embodiment, there is only one propeller or impeller in an arrangement similar to that of FIG. 406. The propulsion device is shown fixed in relation to rear hull portion 4536 and so cannot be used to steer a craft. In drives for large commercial craft having a multiplicity of posts and keel elements, steering at speed can be effected by to some degree by banking the craft and/or by increasing or decreasing power on one side of the craft relative to the other. In alternative embodiments, the propulsion devices are to some degree pivoted, and/or controlledly and variably angled deflector plates are mounted aft in the zone indicated at 4508, with the deflector plates optionally additionally functioning as a reversing mechanism.

In a selected embodiment, a shrouded marine propulsion system includes an impeller or propeller driven by a substantially concentrically mounted electric motor or IC engine located in the water flow to or from the impeller or propeller. In a further embodiment, a shrouded marine propulsion system receives water from a direction substantially parallel to for ward motion and the direction of rearward thrust created by the propulsion system, and the water supply is by a ram effect. By way of example, FIG. 407 shows in schematic cross-section a post/keel element assembly 4550 having a water-jet type drive mounted in a passage 4551 of approximately regular or irregular tubular configuration, with direction of normal motion shown at 4003. Water enters or is rammed into the passage at 4543 via optional protective grille 4542, passes over and around motor nacelle or housing 4552, is accelerated by impeller or propeller 4554 driven by shaft 4555 coupled to electric motor 4556, and exits at 4508 to generate thrust. The motor nacelle 4552 is supported by struts or fins 4553, located in shrouded water passage 4551 located in a post or keel assembly 4550. At least one of the struts is hollow to carry electric power circuits 4557 and electronic control circuits. An aft protective grille 4542*a* is provided to prevent ingress of debris during reversing. An IC engine can be substituted for the electric motor 4556. In another example, FIG. 408 shows schematically a broadly similar arrangement, wherein the motor nacelle is behind any impeller or propeller, its bulk partly accounting for the reduction of cross-sectional area after an impeller that is usual in water-jet propulsion systems. Impellers or propellers 4531 and 4532 are mounted on contra-rotating systems or shafts 4533 and 4534, coupled to IC engine indicated schematically at 4560 mounted in motor nacelle 4552, supported by hollow struts or fins 4553, located in shrouded water passage 4551 located in a post or keel assembly 4550. Charge air supply 4560, fuel line 4559 and electronic controls 4558 are routed through post/keel assembly 4550 and strut 4553 through motor nacelle 4552 to IC engine 4560. Engine exhaust exits at 4561 to mix with accelerated water to create thrust at 4508. In a further embodiment, an electric motor is mounted behind and drives one or more substantially co-axially or parallel mounted impellers or propellers in a nacelle located in and supported on struts in a shrouded water passage located in a post or keel element, with exhaust gas from an engine mounted elsewhere is discharged into the water behind the motor. By way of example, FIG. 409 shows schematically a water-jet type propulsion device located in a shrouded water passage 4551 in a post or keel element 4550, with water entering the passage at 4543 via protective grille 4542, to be accelerated by impeller or propeller 4531, and then exiting via aft grille 4542*a* to provide thrust at 4508. An electric motor is mounted in nacelle structure 4569 to drive integral shaft and impeller/propeller hub 4565, which is mounted in bearings 4566. Motor stator 4568 is attached to nacelle structure 4569, with motor rotor 4567 attached to shaft 4565. One of the struts or fins 4533 supporting the nacelle structure is hollow to house motor power supply 4557, electronic controls for motor and gas sensors 4558, an optional water feed pipe 4563 and exhaust gas supply 4562 from an IC engine mounted elsewhere on the craft. Optional insulation is provided at 4570. Optional fins 4564 to assist in cooling stator portion of the electric motor are provided circumferentially, aligned in direction of fluid flow. Optionally, a separate circulating fluid for a cooling system for the electric motor may be incorporated in the nacelle, or such fluid is circulated down the post and up again, through a heat exchanger mounted in or on the hull in any convenient location. In operation, exhaust gas enters a processing volume 3911 where optionally a designedly limited amount of water, optionally salt-free, is mixed with the exhaust gas, with the gas and/or any resultant mixture then optionally passed through a pollutant removal cartridge 3915, to exit and produce some thrust at 4561. In another embodiment not illustrated, shaft 4565 is hollow, optionally has a thermally insulating lining and/or contains pollutant removal devices, with gas introduced to the shaft ahead of the motor and behind any impellers or propellers. Optionally parts of a hollow impeller or propeller hub and/or shaft have thermal insulation, so that hot the gas will heat parts of the hub surface to cause local vaporization or boiling of water flowing past the hub. By way of example, FIG. 410 shows schematically a water-jet propulsion device in a nacelle mounted in a shrouded water passage 4551 located in a hydrofoil post or keel element, with main nacelle structure 4569 supported on struts or fins 4533, at least one of which is hollow. Direction of normal craft motion is shown at 4003. In operation, water travels through passage 4551 in direction 4584, is accelerated by impeller or propeller blades 4531 mounted on hub 4565*a*, which is integral with rotating shaft 4565, which is in turn mounted in a series of bearings and seal assemblies 4566. The accelerated water flows past struts 4533 to create thrust at 4508, and is also rammed at 4574 into fore cooling fluid gallery 4572 via apertures 4575 and depressions functioning as effective scoops and or venturi devices 4575*a*, to circulate through and cool via passages 4573 the electric motor stator 4568 fixed to nacelle structure 4569, then flows into aft fluid circulation gallery 4572, from which it is extracted via venturi effect 4575 via apertures 4577. The upper strut 4533 is hollow and houses electronic sensor and control circuits 4558, electric power circuits 4557, an exhaust gas treatment fluid supply line 4563, and a passage 4562, optionally encased in thermal insulating material 4570, for exhaust gas from an IC engine mounted elsewhere, which optionally drives a generator mounted elsewhere to provide power for the electric motor in the nacelle. For sake of clarity, only the two basic components of the electric motor are shown: the stator 4568 directly or indirectly fixed to nacelle structure 4569, and the rotor 4567 fixed to rotating shaft 4565. Hot exhaust gas passes at 3908 from passage 4562 into fore holding volume 4586 within nacelle structure 4569, from there passing via holes 4571 into the interior of rotating shaft 4565 which in integral with hub 4565*a* and supports and drives blades 4531. The interior of the shaft optionally has a thermally insulating material lining 4570, as optionally has portion of holding volume 4586. The fore portion of that volume is not thermally insulated, so the nacelle structure 4569 will become hot in zone 4583, permitting portion of the water passing externally to vaporize and/or turn to steam, setting up a laminar gas flow at 3587. Optionally, holes or apertures 4582 are provided in the hub to pert drops or streams of water to enter the interior of the rotating shaft at 4583. After leaving the rotating shaft, which optionally has mixing blades or paddles 4588, it enters a mixing or processing zone 4585, where optionally a fluid to assist in the removal of at least one selected pollutant is introduced, via passage 4563, internal circumferential gallery 4579 and one or more nozzles 4578, which direct the fluid in a jet or spray at 4580. After it leaves the mixing zone 4585, optionally lined with thermal insulating material 4570, it optionally passes through an emissions treatment device or cartridge 3915 reed by fastening ring 3917, to exit and impart a degree of thrust at 4561. Alternative or additionally, any emission reaction fluid such as at 4580 can be introduced to the exhaust gas in holding volume 4586, located ahead of the electric motor. Because the motor is arranged about a hollow shaft, it can have a relatively large diameter. Here it shown relatively long, and this combination of length and diameter permit a large traction area and thereby substantial power output. In an another embodiment, emissions treatments devices or cartridges are placed in the rotating shaft and/or in holding volume 4586. The coolant for the electric motor is here the water through which the craft travels. In alternative embodiments, it is any suitable any fluid, optionally supplied through the struts, including air. In further alternative embodiments, exhaust gas does not enter the water and, if an IC engine is mounted in a below-water location in or on a hydrofoil, keel element or post, the engine exhaust gas is routed up through the post or hull to be discharged from a location on the hull, as indicated schematically in FIGS. 343, 344, 352 and 379.

In a selected embodiment, a turbine stage of a reciprocating/turbine compound IC engine powering a marine craft is mounted to discharge turbine exhaust below the waterline and create thrust thereby. The turbine stage itself may be mounted below the waterline, with an optional cover to prevent water ingress when not in use, or the turbine stage may be mounted above the waterline, with turbine exhaust ducted to below the waterline. The reciprocating stage may be mounted near, beside or in front of the turbine, or alternatively in any other portion of the craft, with an optionally thermally insulated passage conducting hot high pressure exhaust from the reciprocating stage to the turbine stage. The reciprocating stage may optionally directly drive a propulsion device such as an impeller or propeller, and it may optionally be mechanically linked to the turbine stage by a means of a shaft and/or transmission and/or gearing. In another embodiment, the turbine stage is mounted near, beside or in front of an electric motor which drives a propulsion device, with the exhaust from the reciprocating stage optionally passing through the interior core of the motor—as shown in FIG. 410—before reaching the turbine stage. The reciprocating stage drives a generator which provides electrical power to the motor, either directly or via an optional controller. Optionally, water is introduced to the exhaust gas either before it enters the turbine or after, optionally in a wholly or partially enclosing shroud. The electric motor may optionally be mechanically linked to the turbine stage by a means of a shaft and/or transmission and/or gearing. In a selected embodiment, a turbine stage of a compound reciprocating/turbine IC engine discharges its exhaust below the waterline to generate some thrust. By way of example, FIG. 411 shows schematically the stem portion of the hull 4001 with railings 3873 of a large commercial ship, with direction of normal motion indicated at 4003, rudder at 4007, and a median waterline at 4002, with a nacelle type housing projecting from and merging into the sides of the hull at 4801. Items within the hull are shown dashed. Reciprocating engine 4009 drives propulsion device 4008 mounted on a projection of or half nacelle 4569 of the hull 4001, via shaft 4008*a* to produce thrust at 4508, with hot high pressure reciprocating engine exhaust ducted to turbine stage 4803, mounted above the waterline, by optionally thermally insulated passage 4802. Turbine exhaust travel via another optionally thermally insulated passage 4804 to exit at the rear-facing mouth 4805 of the nacelle or housing 4801 to create thrust at 4561. One or more exhaust treatment systems, including for removal of CO2, can be mounted in any location in the flow path of exhaust gas. For example, a CO2 removal system 4806 is mounted in passage 4802. Air supply to reciprocating stage and optionally turbine stage is from above-deck (not shown). In an alternative embodiment, a turbine stage of a compound reciprocating/turbine IC engine discharges its exhaust below the waterline to generate some thrust, as shown schematically by way of example in FIG. 412, wherein like features are numbered as for similar illustration FIG. 411. A propulsion device 4008 such as a propeller is mounted on a projection of or half nacelle 4569 of the hull 4001, and is driven by the reciprocating stage 4009 of a compound reciprocating/turbine IC engine via transmission 3807 and drive shaft 4008*a*, to create thrust at 4508. Hot high pressure exhaust gas travels via optionally thermally insulated passage 4802 to a series of exhaust treatment devices, and from there via optionally thermally insulated passage 4804, to turbine stage 4803 to create a degree of thrust at 4561. An optional air scoop is provided at 4807 for either turbine and/or reciprocating stages, with alternative air supply from above deck (not shown). The railing 3873 is shown pulled back, to minimize effects of any blow-back of hot gases. In a further embodiment, the features and disclosures of FIGS. 411 and 412 are adapted for hydrofoil craft, wherein all or part of the power and propulsion system is mounted in keel elements and/or in the lower part of one or more hydrofoil posts. In a selected embodiment, a complete reciprocating/turbine compound engine is mounted below the waterline in an enclosure or housing. In many applications, an optimum rotational speed for a reciprocating stage output is different from the optimum rotational speed of a turbine stage shaft. In a further embodiment, a transmission is placed between a reciprocating stage rotating output shaft and a turbine stage rotating shaft, if they are to be mechanically linked. In a further embodiment, the transmission has variable drive ratios. Such variable ratios are useful for varying the relative thrust generated by the turbine stage in relation to the thrust generated by the propulsion device, to adapt to different forward speeds, different operating conditions and different weather. FIG. 413 shows schematically by way of example a nacelle or enclosure 4569 supported on a hollow strut or fin 4553 attached to a portion of hull 4001, with principal forward motion indicated at 4003. The reciprocating stage of a compound reciprocating/turbine IC engine is mounted in the fore of the nacelle, to dive propulsion device 4008, here a propeller, via stub shaft 4821 to create thrust at 4508. The propulsion device may alternatively be an impeller or part of a water-jet and/or be shrouded, as shown elsewhere herein. Hot high pressure exhaust gas from the reciprocating stage passes at 4503 into a hollow passage

4817, optionally having internal thermal insulation 4818, and containing optional exhaust gas treatment modules 4806. Alternatively, the positions of passage 4817 and insulation 4818 are reversed. The gas then passes to and wholly and/or partly powers the turbine stage, to create a degree of thrust at 4561. Optionally, scoops are provided at 4813 to admit sufficient water at 3911 to create vapor and/or steam in expansion zone 4822. The hollow strut contains a fuel line 4823 for the reciprocating stage and optionally also for additional heating in the turbine stage, separate electronic control and sensor circuits 4558 for each stage, and a passage 4812 for air supply to an optionally circumferential plenum 4820. Passage 4817 is optionally a rotating shaft which is optionally mechanically linked to stub shaft 4821 and/or to turbine stage 4803. Optionally, the latter linkage is via a transmission, optionally having variable ratios, indicated schematically at 4816. Air from plenum 4820 is supplied to reciprocating stage at 4814 and optionally also to turbine stage at 4819 via passages 4815. Optionally, the plenum contains sub-systems which require cooling, for one or both stages, including such as starter motors, lubrication or fuel pumps, etc (not shown). In another embodiment, an electric motor and the turbine stage of a compound reciprocating/turbine IC engine are mounted below the waterline in an enclosure or housing, with exhaust gas from the reciprocating stage of the compound engine at least partly powering the turbine. In one example, the arrangement of FIG. 410 can be adapted by eliminating or reducing optional mixing zone 4585 and/or optional gas treatment device 3915, and mounting a turbine in that area, optionally after any exhaust gas treatment devices. In another example, FIG. 414 shows schematically an arrangement basically similar to that of FIG. 413, wherein an electric motor replaces the reciprocating stage, which is now located in any convenient place in the hull. Similar features are numbered as in FIG. 413. The rear of the nacelle or housing 4569 is as in FIG. 413, as are shafts 4821 and 4817, the optional transmission 4816 of fixed or variable ratio(s), and their optional relationships to each other. An electric motor 4826 drives propulsion device 4008, here a propeller, via stub shaft 4821 to create thrust at 4508. The propulsion device may alternatively be an impeller or part of a water-jet and/or be shrouded, as shown elsewhere herein. Hot high pressure exhaust gas from reciprocating stage located elsewhere travels through optional treatment module 4806 in the hull 4001 through optionally thermally insulated passage 4562 to enter optionally circumferential exhaust plenum 4825 as indicated by arrow 4824. From the plenum it passes through holes 4571 in shaft 4817 to travel via exhaust treatment modes 4816 to enter turbine stage 4803 at 4503. Optional thermal insulation 4818 is provided to part of the interior of shaft 4817 and the interior circumference of exhaust plenum 4825. The hollow strut or fin 4553 attaching the nacelle to the hull contains exhaust gas passage 4562, electric power circuits 4557 for the motor, separate electronic control and sensor circuits 4558 for motor and turbine stage, optional fuel line 4823 for additional heating to turbine, and optional air supply passage 4812 to enter optional circumferential air plenum 4820 at 4814, for provided turbine by-pass or other air and/or cooling selected components.

The power units of FIGS. 417 through 410, 413 and 414 can be incorporated in any kind of housing, be used in any number or combination, and be mounted in any location on any portion of a marine craft, including, hull, post, keel element and or hydrofoil. The Figures referred to indicate that the power units are mounted below the waterline, but in alternative embodiments they are mounted above the waterline. In further embodiments, a reciprocating stage of a compound reciprocating/turbine IC engine is used to supply hot high pressure exhaust gas to multiple turbine stages. In another embodiment, power units are mounted in one or more nacelles or housings attached to one or more hollow hydrofoils, which are in turn mounted on a keel element. In a further embodiment, the foot of a hydrofoil post functions as a keel element. Three alternative examples are illustrated schematically in plan view FIG. 415 and part elevational view FIG. 416, where 4003 is direction of normal movement and 4002 represents the waterline. Two nacelle-like rounded projections or housings 4831 extend from the rear of hull 4001 to house the power units, with optional air supply 4543, for such as turbine air and/or by-pass air and/or electric motor cooling, entering the housings 4831 via scoops 4832. In all three examples, the craft is powered by a compound IC engine having one reciprocating engine stage 4009, mounted in the hull, and two turbine stages 4803, one in each of the housings 4831. Hot high pressure exhaust gas goes from the reciprocating stage 4009 to an exhaust gas treatment system 4834, where any substance including carbon dioxide is removed, and from there via optionally thermally insulated passages 4833 to each turbine stage 4803. The reciprocating stage drives a n electrical generator 4835 which optionally supplies electrical power via a controller 4836, optionally coupled to an energy storage device 4838. The first example is illustrated at the top of FIG. 415, and shows an electric motor 4826 supplied with power via circuit 4837 which drives turbine stage shaft and/or optionally propulsion device 4008, which optionally accelerates air to provide additional thrust at 4561 and/or optionally compresses air for the turbine stage, which provides thrust at 4561. The second example is shown in the lower part of FIG. 415, where the turbine stage optionally is rotationally linked to and has mounted before it a propulsion device, to accelerate air to provide additional thrust at 4561 and/or to supply and/or compress air for the turbine stage 4803. Alternatively, the propulsion device in all three examples may be omitted, and the optionally rammed air taken in at scoop 4832 is sufficient to supply any air required by the turbine. The third example is shown in FIG. 416, wherein the above-water power unit in housing 4831 is as in the first example. Here, in some or all operating modes, additional electrical energy is taken, optionally via the controller, to power an additional electric motor 4840 which drives a below-water propulsion device 4839 via optional shaft 4008*a*, to provide thrust at 4508 past rudder 4007 and rudder post 4007*a*. In any embodiment in this disclosure, a compound engine can be set up in any way, including to prove any percentage of total energy at the reciprocating stage output shaft in relation to the energy contained in the hot high pressure exhaust gas for the turbine stage(s). The craft of FIGS. 415 and 416 is either a conventional craft or a hydrofoil craft (hydrofoil components—optionally towards the fore of the craft—are not shown), in which case the propulsion system and rudder shown are for hull-in-water maneuvering. In the embodiments where it is a hydrofoil craft, the post(s), keel element(s), hydrofoil(s) and power arrangement(s) are according to any of the disclosures herein. A further example, is illustrated schematically in elevational view FIG. 417 and plan view taken at section "A" FIG. 418, where a keel element and the bottom of a hydrofoil post 4004 are the same. The post has a protective stub keel 4006*b*, with direction of normal motion indicated at 4003. Two hollow struts or hydrofoils 4843 are attached to the bottom of the post, each with variable pitch flaps 4034. At the ends of the hydrofoils are mounted nacelles or housings 4831, which contain any kind of power unit 4842, including any combination of IC engine/electric motor/propulsion device disclosed herein and/or in the embodiments and their modifications of FIGS. 410 through 416 and 329 through 331 and 336. The hollow post 4004 and hollow struts or hydrofoils 4843 contain anything needed for the power units and hydrofoils, including one or more optionally thermally insulated exhaust gas passages 4562, passages for air 4812, power circuits for any electric motors 4557, electronic circuits for sensors and controls 4558, hydraulic lines to actuate the flaps and for other purpose, etc.

Figure 419:
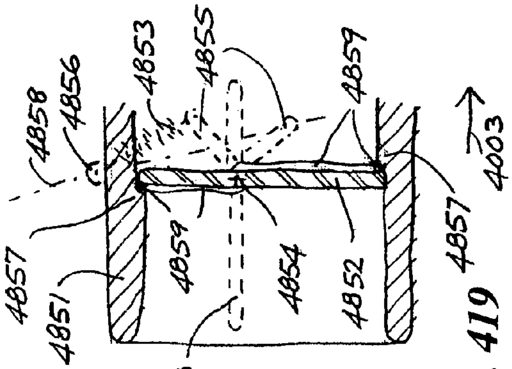
Figure 420:
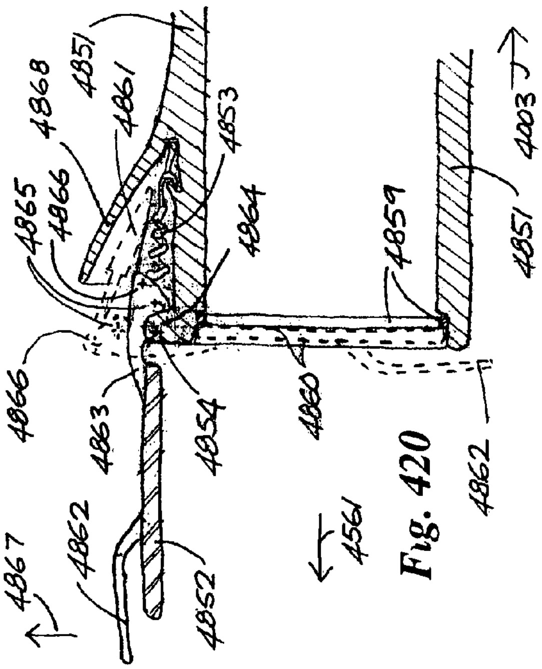
Figure 421:
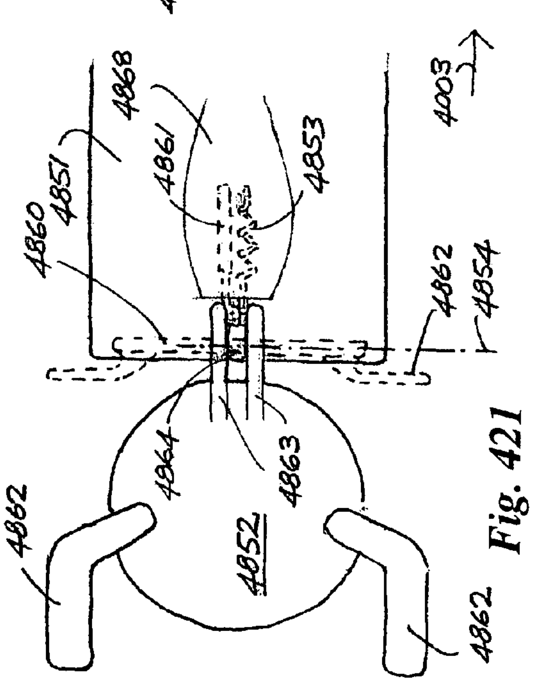

In a further embodiment, all drive components mounted under water are made of any appropriate material, including ceramic materials, plastic-type materials, carbon-fibre and related materials, and stainless metal alloys such as stainless steel and/or similar alloys. Such drive components include propulsion devices such as impellers or propellers, drive shafts, electric motor housings, exhaust pipes, and turbine engine components. In another embodiment, at outlets for fluids which generate thrust while in motion, including for gases and liquids, there is provided a flap or other valve which closes once a marine craft's speed has slowed to pre-determined level, to prevent significant entry of water or other substances to drive components. The flap or valve is mechanically actuated, either by operator action and/or automatically, optionally by means of a solenoid and/or similar device, and/or it is pressure actuated, closing when fluid flow through the outlet drops below a predetermined level. By way of example, FIG. 419 shows a fluid outlet structure 4851 for a craft with normal motion in direction 4003, with flap 4852 shown solid in closed position. In operation, fluid flow 4561 keeps flap 4852 open in position indicated in dashed line at 4860, against pressure of spring 4853 biased to close it. The flap is mounted in a fluid discharge passage structure 4851 of approximately circular or oval cross-section, and is pivoted off-center at 4854, so that fluid flow will bias it to the open position shown dashed at 4860. The pivot axle penetrates the structure and is outside attached to an arm 4855 linked on an anchorage 4856 on the structure 4851 by tensile spring 4853. When the flap is open, the spring is stretched and aligned along axis 4858. Seals are provided at 4859, lodged at ledge 4857. In another example, section FIG. 420 and plan view 421 show schematically another closure embodiment for a fluid outlet structure 4851, of approximately circular or oval cross-section, where direction of normal craft travel is indicated at 4003. Movement of the flap 4852 is controlled by a combination of a spring 4853 biased to close the flap to position 4860, an actuator 4861, optionally including a solenoid, and also by small foils 4862 mounted on the flap to both clear the end of the outlet when the flap is closed and to project into the fluid flow past the exterior of the outlet structure 4851. The flap is mounted on arms 4863 pivoted on axis 4854 on a mount 4864 integral with structure 4851, with arm extension having spring anchorage pivot at 4865 and actuator anchorage pivot at 4866. Solid line shows the flap assembly open, with dashed line showing it closed at 4860. When the flap is open, the flap pivot and the spring pivot are so aligned that the thrust force of the spring cannot move the flap. When the actuator initiates closure movement, the pivots realign and the spring forces the flap closed. In contrast, the actuator pivot is so aligned that the actuator can always move the flap. Both spring and actuator assemblies are optionally protected by a small cowling 4868 integral with structure 4851. The foils on the flap serve two purposes: they force the flap open when movement of the craft is sufficient to overcome the closing force of the spring, and during craft motion they provide upthrust at 4867, optionally greater than the gravitational force on the flap assembly, and so maintain the flap partially lightly forced to a fully open position. In a further embodiment, where a fluid discharge outlet is mounted below water and is closed by a flap, a blow-by passage for any excess gas and/or a depression or sump, and optionally also a pump, for removal of excess water are provided. By way of example, FIG. 422 shows very schematically the outline of the rear of marine hull 4871 having a fluid discharge structure 4851 with its flap 4852 closed, with normal motion indicated at 4003. In some applications, the flap night close when normal fluid flow 4561 had not entirely stopped, so passage 4872 directs the still slowly accumulating fluid 4873 to any convenient location inside or outside the craft. In some instances, before the flap has fully closed, some water has entered the structure 4851. Any kind of depression or sump 4874 is provided, together with drainage passage 4875 lied to pump 4876, which discharges excess water 4877 via passage 4878 to any convenient location inside or outside the craft.

In a further embodiment, when a marine craft is in motion a thin layer of gas flow is interposed between any below-water craft surface, optionally to reduce friction and increase speed and/or fuel economy. Such gas flow can be described as laminar flow. In another embodiment, any portion of any below-water marine craft surface is heated to produce some localized vaporization and/or boiling of water. The gas flow and/or heating can be on any kind of surface, including that of a hull, a hydrofoil post, a keel element, and/or any kind of hydrofoil including a rudder. By way of example, plan view FIG. 423, cross-section FIG. 424 taken at "A" and cross-section FIG. 425 taken at "B" show schematically a keel element 4005 having hydrofoils 4006 capable of generating a laminar gas flow between water and foil surfaces, either directly or by local vaporization and or boiling of water, with exhaust gas flow direction indicated by dashed unnumbered arrows, and direction of normal movement shown at 4003. Hydrofoil skin 4897 is indicated by a single line, its supporting structure is not shown, and ballast tanks 4895 and fuel tank 4896 are indicated schematically in the sections. In the upper hydrofoil, exhaust hot gas travels along thermally insulated supply passages 4890 to heat any convenient location, here the leading edge. Thereafter it travels via thermally insulated return passages 4892, optionally to provide thrust in direction 4561, including as described herein. Insulation to the skin is omitted at a small strip behind the leading edge, causing the skin there to be heated sufficiently to vaporize and/or boil enough water to cause a small film of gas to pass over at least a portion of the hydrofoil skin in a laminar flow indicated at 4517. In the lower hydrofoil, exhaust gas under pressure, optionally hot, travels along optionally thermally insulated central and lower supply passages 4890 to pass into the water via a series of closely spaced small apertures 4515 laid out at any convenient location, here along the leading edge, in such a manner that the emerging gas forms a small film passing over at least a portion of the hydrofoil skin in a laminar flow indicated at 4517. Optionally a non return valve is provided at 4898 to maintain pressure in lower passage 4890, to limit ingress of small particles of water through the apertures under certain operating conditions. If the gas is hot enough, such water will turn to steam and provide additional pressure in the leading edge passage. In both sections, gas is indicated schematically by little bubbles 4899. The principles outline above may be adapted to aircraft. In a further embodiment, hot exhaust gas is optionally and/or selectively passed through an optionally partly insulated passage behind an aircraft airfoil surface for any purpose, including for de-icing. In another embodiment, hot exhaust gas from a thermally insulated passage is passed fine apertures in the skin of an aircraft airfoil surface for any purpose, including for de-icing. In a further embodiment, hot exhaust gas is used for de-icing during engine warm-up, before take off. In a further embodiment, at least portion of hot exhaust gas from a reciprocating stage of a compound reciprocating/turbine IC engine is used for de-icing prior to take-off, and that portion is diverted to the turbine stage during take-off. The schematic arrangement for aircraft is essentially that illustrated in FIGS. 423 through 425.

Wherever appropriate or applicable, the inventions, features, arrangements and disclosures of FIGS. 325 through 340 which have related to aircraft may be adapted to marine craft. For example, the engines of FIGS. 329 through 331 and 336 may be mounted in or on the hull or superstructure of a marine vessel of any kind, including fast hydrofoil and other marine craft, and/or the marine craft of the invention. In the embodiments illustrated in FIGS. 400 through 422, where appropriate, any kind of gas can be used, including that containing or consisting of steam or water vapor. Where one or more combustion engines are shown in marine craft of FIGS. 341 through 425, exhaust gas from such engines may be treated as disclosed herein or in any other way to remove selected pollutants and/or substances, including hydrocarbons, particulate matter, carbon monoxide, nitric oxides and/or CO2. None of the components, features or designs in FIGS. 341 through 425 have been drawn in any particular proportion or at any particular scale to one another, and any cross sectional areas before or within any shroud or enclosure surrounding an impeller or propeller can be of any convenient size and/or form. Impellers and propellers in this complete disclosure are indicated schematically, and are not necessarily shown in the proportion, shape or size for any particular application. The marine propulsion devices mentioned through this disclosure may be of any kind, including propellers, impellers or water-jets, Archimedes screws, etc, unless the embodiment cited can only use a particular propulsion device. Any type of engine may be used to power the marine craft disclosed herein, including steam engines, Stirling engines, turbine engines, and the engines of the invention. The emissions treatment systems of the invention, including those for the removal of CO2, may be used with the exhaust gas of any engine or combustion process located in any part of the marine craft for any purpose. Any appropriate glands and seals may be provided around the joints between posts and hull, between post portions, between hydrofoil portions, between pivoting and fixed components including the hull, and between rotating shafts and hull, to prevent water entering the hull or any other components). In the disclosure, techniques to enable gases to create under-water thrust or perform other function are generally described as being associated with the reciprocating IC engines of the disclosure. Such techniques can be used in combination with any engine. Water may be heated and/or expanded by any appropriate means. The principles of the invention apply to the monohulls illustrated by way of example, as well as to multi-hulls such as catamarans or trimarans. The principles of the invention apply also to craft not mechanically driven, that is to wind driven or solar powered craft. By way of example, mechanically driven craft are shown, some of which may optionally also have sails. The craft which have sails can optionally operate under mechanical power with the hull out of the water and under sail with the hull in the water. All the hydrofoil related features disclosed herein may be embodied in craft powered solely by sail, or sail craft which have engines only for emergency use, as for example certain deep-ocean racing sail boats. In the case of some craft with sails, with or without engines, under certain specific conditions of water, wind force, real wind direction, apparent wind direction and through-the-water speed, the hydrofoil devices of the invention are used to propel the craft by wind with the hull wholly or partly out of the water, whether or not an engine has been used to attain that condition. Wherever appropriate or applicable, the inventions, features, arrangements and disclosures of FIGS. 325 through 340 which have related to aircraft may be adapted to marine craft. For example, the engines of FIGS. 329 through 331 and 336 may be mounted in or on the hull or superstructure of a marine vessel of any kind, including fast hydrofoil and other marine craft, and/or the marine craft of the invention. In another example, the multi-part extensible airfoil of FIGS. 338 through 340 may be mounted in or on the hull or superstructure of a marine vessel of any kind, including fast hydrofoil and other marine craft, and/or the marine craft of the invention, and be so mounted below or above water. Wherever appropriate or applicable, the inventions, features, arrangements and disclosures of FIGS. 341 through 425 which have related to movement through the fluid medium of water may be adapted to movement through the fluid medium of air, and may be used in any through-the-air application including in or on any kind of aircraft, such as helicopters, lighter-than-air aircraft and fixed-wing aircraft. For example, the disclosures of FIGS. 413 and 415 are suited to air as a fluid medium, as are those of FIGS. 400, 401, 402 and 404, if the apertures are eliminated and any water supplied via feed 3910*a* as in FIG. 400. If the reversing function is ignored, the features and disclosures of FIG. 416 are equally applicable to air as fluid medium. With slightly different supplies of air and provisions of any fluids for exhaust gas treatment, the features and disclosures of FIGS. 413 and 418 are suited to air as fluid medium. In FIGS. 341 through 425, neither the craft nor the features and components depicted are shown at any particular scale and/or size relative to one another. In a further embodiment, the marine craft of the invention are substantially fabricated of stainless steel type and/or non-rusting and/or substantially corrosion-resistant alloys, including those mentioned subsequently herein. Initial costs are higher, but are offset by greatly reduced painting and maintenance costs. Costs can be further lowered by reducing current safety margins, which allow for significant reduction of metal and weld strength through lifetime rusting and corrosion. Generally stainless steel type and selected other corrosion resistant alloys are stronger per unit weight than the conventional steels used today, so marine craft structure and skin mass can be reduced to substantially improve fuel efficiency and lower CO2 emissions.

The reciprocating engines, compressors and pumps disclosed herein are likely to operate at higher speeds than conventional units, and in several applications a transmission will be desired to reduce rotational speeds and/or for any other purpose. In most applications a step-less continuously variable transmission (CVT) of infinitely variable ratios will be preferred to a stepped transmission having between three and six fixed ratios, and which to be to a degree has to be disengaged between ratio changes. The CVT's in present commercial use are generally limited to power requirements less than around 100 kW (133 hp). The object of the present invention is to provide a CVT for use in any application, irrespective of power requirements, which provides a continuous flow of power at ratios infinitely variable between fixed parameters. Particular embodiments of the engines disclosed herein have two crankshafts, and CVT's suitable for use with a two-crankshaft power unit are here disclosed, as well as those with a single input shaft. It is an objective to provide a CVT which has a theoretically limitless and friction-free contact area when traveling at a constant speed, unlike any of today's commercial CVT's that are known to the applicant. In some embodiments, there could be a small amount of friction and power loss only during drive ratio transitions, which is also a feature of conventional CVT's. In other embodiments, there will be virtually no friction and power loss during ratio changes. To meet a further objective, in addition to providing a variable drive ratio function, the various elements of the transmissions disclosed herein may be combined to provide in one unit additional functions including a clutch, a reversing mechanism, a differential, a power take-off source, and a variable load distributor, for example for use for varying load between front and rear wheels in a four-wheel-drive vehicles. The transmissions of the invention are suited to transferring power to or from any kind of engine, motor, compressor, pump and/or rotating shaft, and are suited for installation with and/or in any type of aircraft, marine craft, wheeled vehicle, tracked vehicle, railed or railway vehicle, industrial equipment and/or actuating mechanism.

Figure 427:
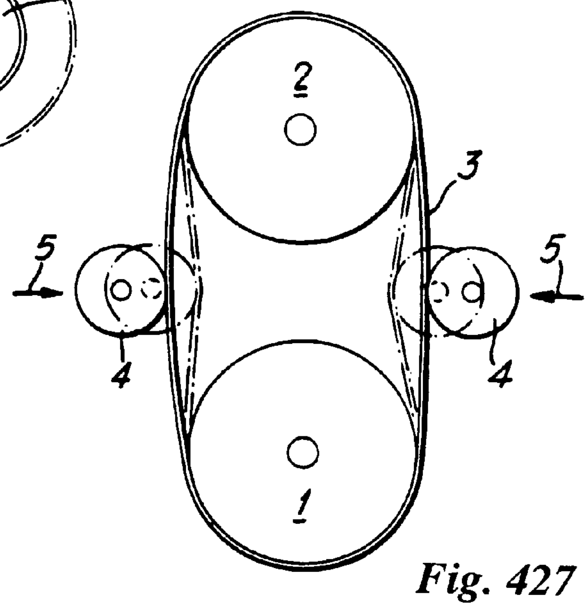
Figure 428:
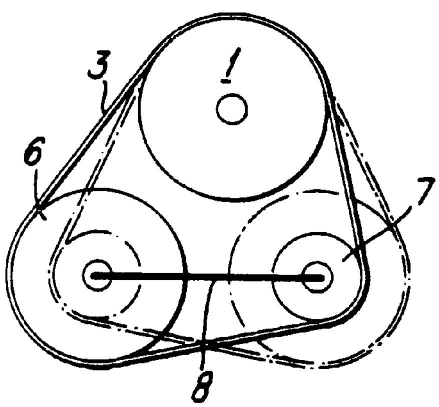
Figure 429:
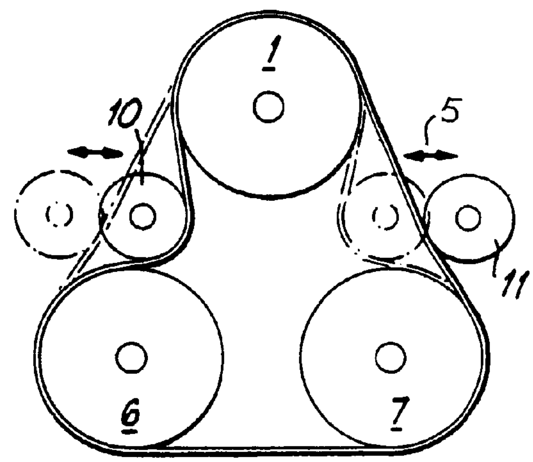
Figure 430:
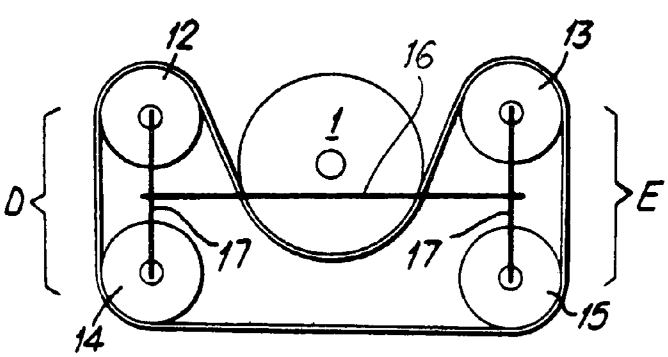
Figure 431:
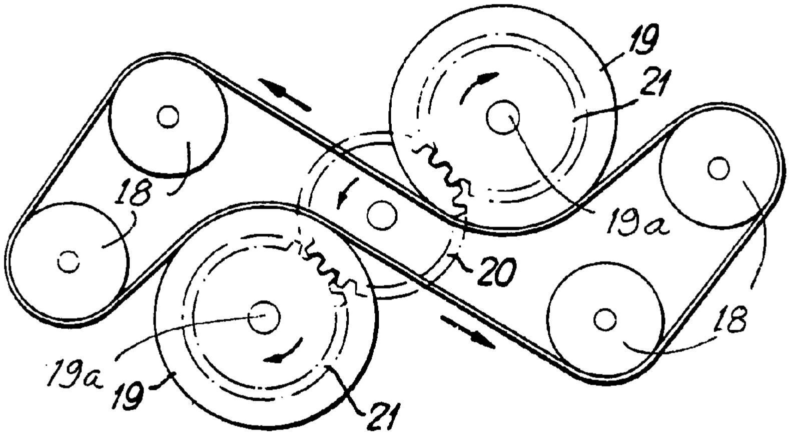
Figure 433:
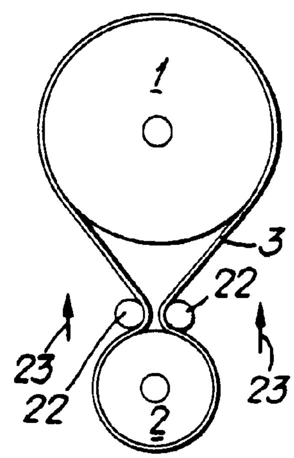

A basic embodiment of the present invention comprises a transmission system having at least two rollers connected by a flexible friction member, such as a belt or band, with each of the rollers communicating with input, intermediate and output shafts as desired, and where at least one of the rollers is of controlledly variable diameter. The variable diameter roller will have a constant diameter at any one time at any point of its length, but that this diameter will be variable at different times. It will be apparent that by such a system a variable mechanical transmission is achieved capable of transmitting high loads with low losses, since the contact area between belt and roller will not be such as to cause differential slippage at constant ratio, in contrast to present wheel and disc or belt and V-pulley drive systems. Potential applications range from small vehicles, through large vehicles including trucks and mining equipment, through railway equipment, helicopters and aircraft of any kind, pumping and compressor equipment, industrial machinery generally, small marine craft to the largest marine craft. The basic embodiment is illustrated schematically, by way of example, in FIG. 426, which shows in solid line a roller A of diameter unit 2 units driven by any power input shaft, the roller communicating by endless belt C (tensioning not shown) with roller B of diameter 4 units which drives any output shaft, resulting the latter operating at half the speed of the input shaft. If roller A is increased to diameter 4 units and roller B is simultaneously reduced to diameter 2 units, as in the arrangement shown dashed, then the output shaft will be turning at twice the speed of the input shaft, four tins as fast as in the earlier arrangement, provided input shaft speed has remained constant. In operation it is intended that such variation in gearing takes place during power transmission, and that the gearing ratios be infinitely variable between two extremes. Optionally, roller A's and roller B's capacity for expansion and contraction relative to each other is counterbalanced by any convenient means including those disclosed subsequently. Optionally, rollers A and B are spring-loaded to both either increase or decrease their diameter, and the expansion and contraction actuating mechanism of rollers A and B is lined, so that if roller A is caused to contract roller B will automatically be caused to expand. The rollers may be arranged in any way or combination of ways to form the transmission system of the invention. In a further embodiment, a CVT system additionally functions as a clutch. By way of example, FIG. 427 shows in schematic cross-section a transmission system which additionally functions as a clutch, having two expanding rollers 1 and 2 connected by an endless band 3 longer than needed to make the drive between rollers. Idler rollers 3 acting as belt tensioning members are provided to move in direction 5. It is apparent that if input roller 1 is being driven and idler rollers 4 are in the withdrawn position causing the belt 3 to be slack then output roller will not be driven. By gradual tensioning of the belt by means of moving the rollers 4 inward in direction 5, the drive will progressively be taken up, thereby causing the system to act both as clutch and variable drive. In a further embodiment, a CVT system has multiple output shafts. In a further embodiment, a CVT system additionally functions as a differential. By way of example, FIG. 428 shows in cross-section a transmission system which additionally functions as a differential, wherein input roller 1, turning at a given speed, is connected by means of endless belt 3 to two output rollers 6 and 7, here a mechanical linkage 8, so as to enable shafts 6 and 7 to rotate at variably differing speeds, while shaft 1 is rotating at constant speed. Optionally, rollers 6 and 7 are spring-loaded to both either increase or decrease their diameter, and the expansion and contraction actuating mechanism of rollers 6 and 7 is linked, so that if roller 6 is caused to contract roller 7 will automatically be caused to expand. If the assembly is filled to a vehicle and roller 6 is connected to the left wheels and roller 7 to the right wheels, then the system can be adapted to function as vehicle differential and variable trans-mission combined. As will be seen later, the rollers of the invention may in some embodiments be spring-loaded to expand against belt tension. An increase in belt tension and therefore loading will cause the rollers to contract. Such rollers where variation in load will cause variation in diameter may be used as the output rollers 6 and 7. Alternatively, variation in load may directly or indirectly actuate the roller to expand or contract. In FIG. 428, in an alternative embodiment, the drive may be reversed, with 6 and 7 the input rollers and 1 the output roller. In a further embodiment, a CVT system additionally functions to distribute variable quantity of power to a multiplicity of output shafts. By way of example, FIG. 429 shows in schematic cross-section an embodiment whereby power distribution is varied between two or more output shafts. A power input variable-diameter roller 1 is connected by mans of endless band 3 to two output rollers 6 and 7, say respectively driving the front wheels and rear wheels of a four-wheel drive vehicle. There are two tensioning rollers 10 and 11, capable of movement in direction 5. As shown in solid line, rollers 10 and 11 are so positioned as to cause a greater proportion of the total contact between band and both output rollers to be between band and roller 6, resulting in a greater quantity of total power to be transmitted to output roller 6 and a lesser quantity to output roller 7. By movement of tensioning rollers 10 and 11 to the position shown dashed, roller 7 may receive a greater proportion of total power than roller 6. By these or other means the degree of band "wrap round" of a roller can be varied, so varying the quantity of power transmitted. The assembly could be used to say provide more power to the rear wheels during acceleration and/or to take more power from the front wheels during braking. In a further embodiment, a CVT system with three or more output shafts additionally functions as a first differential between two subsets of out put shafts and as at least one second differential between at least two shafts of at least one subset of shafts. FIG. 430 shows by way of example in diagrammatic cross-section an assembly functioning as a variable ratio transmission and three separate differentials, suited say for a four-wheel drive cross country vehicle. Input roller 1 drives by endless belt 3 two pairs of rollers, shown at "D" and "E", wherein the upper rollers in each pair, 12 and 13, drive the left wheels and the lower rollers, 14, and 15, the right wheels. Pair "D" drives the rear wheels of the vehicle and "E" the front wheels, the pairs being linked by any means by which the increase of the diameters of one pair of rollers 12 and 14 is counterbalanced by the decrease of the diameters of the other pair of rollers 13 and 15, in the manner of FIG. 428, here indicated by mechanism 16, to form a differential between front and rear wheels of the vehicle. The ends of mechanism 16 communicate with secondary mechanisms 17, linking the rollers of each pair in the manner of FIG. 428 so that differentials between left and right wheels are formed. If the output system consists of a multiplicity of rollers, it may be desirable to have more than one input roller, either to adapt to the twin-crankshaft engines of the invention, and/or so that the contact areas of input and output systems become more equivalent, and/or for any other reason. In a further embodiment, a CVT system transmission has multiple input shafts. FIG. 431 shows by way of example in diagrammatic cross-section a multiple input shaft system having four output rollers 18 connected by endless belt 3 moving anti-clockwise as indicated by arrows, which is driven by two input rollers 19, rotating clockwise, as indicated by arrows. The input rollers are optionally connected mechanically, here by a central shaft and gear wheel shown dashed at 20 by means of gear teeth, schematically shown dashed at 21, meshing with gear wheels mounted fixedly and concentrically on input roller shafts 19*a*. In a further embodiment, a CVT system additionally functions to balance the contact areas between a belt and pair of rollers so that the contact areas of the two rollers during major operating modes are as close to equal as practical. FIGS. 432 and 433 show how it is possible to compensate for naturally reducing contact area due to a reduction of shaft diameter. FIG. 432 shows roller 1 reduced and roller 2 expanded, connected by endless belt 3 tensioned by movable idler rollers 22, positioned close to roller 1 so as to cause a "wrap around" effect and so increase contact area of roller 1. As gear ratios change and roller 1 diameter expands with a balanced reduction of roller 2 diameter, the idler rollers 22 move to the position indicated in FIG. 433, arrows 23 indicating range of movement of the idler rollers, and not any tensioning force. In selected embodiments, the CVT system additionally function to reverse direction of rotation of at least one output shaft. By way of example, two embodiments are illustrated schematically in FIGS. 434 and 435. In FIG. 434, input roller 1 turning clockwise drives output rollers 2 by means of intermediate movable rollers 24 turning counter-clockwise and endless belt 3 tensioned by idler roller 25, which is capable of movement in direction 26. In the arrangement shown in solid, the band and output rollers 2 will rotate in a clockwise direction, but when rollers 24 are moved in direction 27 to positions 28, the band will make a direct contact with the input roller 1, causing it and rollers 2 to be driven in a counter-clockwise direction. In an alternative embodiment, FIG. 435 shows schematically two input rollers 29 and 30 turning in counter directions, adjacently mounted on a pivotal carriage, indicated diagrammatically by line 31, mounted about pivot 31*a*. As shown solid, the carriage is so positioned as to cause roller 29 to make contact with an endless belt 3. When the carriage is pivoted through direction 32 to a new position shown dashed, roller 30 as shown chain dashed is caused to make contact with the belt, so causing it to move in the opposite direction. By the principles shown by way of example in FIGS. 427 through 435, a single continuously variable transmission assembly having the rollers of the invention may additionally function as a clutch, a means of reversing direction of rotation of output shaft(s), a means of providing multiple separate output shafts rotationally differentiated from one another, and also provide a means of variably distributing power between any combination of individual output shafts. In the above description and elsewhere in this disclosure, unless stated to the contrary, the input and output rollers are variable diameter rollers. However, the principles of the invention work equally if one of two rollers in any system or sub-system is of non-variable diameter.

Figure 440:
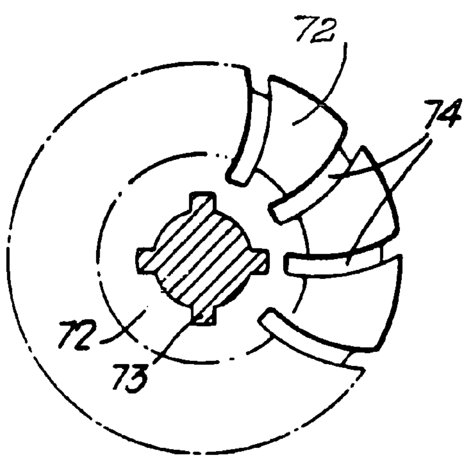
Figure 441:
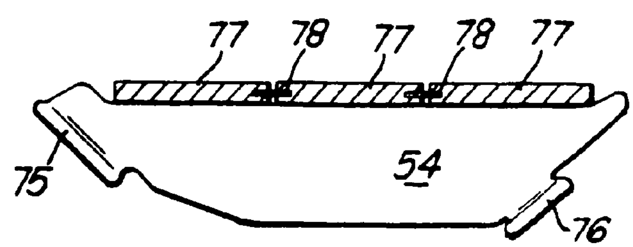

It is proposed to disclose below at least two alternative embodiments of a roller having substantially continuous surface and variable diameter. In the first embodiment, there are two cones slidably and engagably mounted on a common shaft through their axes, narrow ends facing one another. The cones have projections or depressions formed running between the narrow and wide ends, and a series of member having each of their two ends slidably mounted on the corresponding depressions/projections of each cone. In operation, the cones are actuated to move toward or away from one another, causing the members to move radially away from or towards the axis of the shaft. The members are of such configuration that they form the effective surface of the roller assembly, so by the above slidable movement of the cones, the diameter of the roller is increased or decreased. These principles are illustrated schematically in FIGS. 436 and 437, showing in the former case a roller assembly with diameter reduced and in the latter case with diameter enlarged. Cones 50 and 51 are only slidably mounted on shaft 52—they are not free to rotate relative to the shaft—and have on their surface depressions shown simplified at 53. Spanning between corresponding depressions on the cones are a series of members 54 which support the drive belt shown in outline at 55. In FIG. 437, the assembly is shown with cones moved toward one another, to expose key means 56 mounted on shaft 52 to ensure the cones rotate with the shaft, and to show how the inward movement of the cones has caused the members 54 to be moved radially outward from shaft axis 57. In both the basic embodiments of the roller of the invention, generally work must be expended to cause the roller to expand against the likely load of an endless band under tension. It is for this reason that rollers are best arranged in pairs so that one expands when the other contracts and vice versa. In a further embodiment, a CVT with at least one pair of rollers has the increase in diameter of one roller in the pair matched by an approximately equal decrease in diameter of the other roller. By way of example, FIG. 438 shows schematically how this can be regulated, especially in the case of differential type mechanisms. A rocker 60 is pivoted at 63, with its rounded thrust ends 61 bearing on collars 62 of one cone of each shaft, causing loads to be approximately balanced between rollers. The rocker is shown in a position wherein roller 1 is enlarged and roller 2 reduced. Each roller is co-rotationally mounted on shafts 52. When the sizes of the diameters of the rollers is reversed, the pivotal links and the rollers are shown in a new position, all shown chain-dashed. The pivotal points 63 are connected by a structural mechanical element indicated by arrow 64, which in simple embodiments will be a rigid member of fixed length. In other, more complex embodiments, as for example that of FIG. 430, this element 64 is of controlledly variable length, thereby causing the mean diameter of the twin rollers 1 and 2 in FIG. 438, and optionally also of roller pairs "D" and "E" in FIG. 430, to be variable. The members spanning between the cones may be of any convenient shape or form. In selected embodiments they are approximately of "T" or "I" or "L" shape in cross-section, and they optionally have extremities capable of overlapping one another, in a manner which can be described as a kind of iris-type action. This is illustrated by way of example in schematic cross-section FIG. 439, where members or segments 70 making up the roller are shown arranged in the reduced diameter configuration in solid line and in enlarged diameter configuration in dashed line 71. FIG. 440 illustrates by way of example in schematic cross-section an embodiment of a load bearing cone 72 supporting one end of each segment member (not shown), where the cone is keyed to input/output shaft 73. The cone has a series of grooves 74 formed radially/axially along its conical surface, which in operation receive rod- or nodule-like projections which form part of or support the segment member. The grooves may be of any appropriate form and cross-section. Optionally, the grooves 74 on the cone are curved, as shown in FIG. 440, so that the segment members change inclination relative to the axis of rotation of shaft 72, as roller diameter changes, enabling the belt contact areas of the "L" or otherwise shaped segment members to be optimally inclined to the belt at each of the rollers various diameters. Alternatively, the cones may have the male equivalent of the grooves, that is projection or ridges, to slide in grooves or depressions in the segment members. In a further embodiment, at least one pair of rollers is linked by a belt compress consisting of multiple belts, optionally linked. By way of example, FIG. 441 shows in schematic view alternate configurations of a segment member with belt, the left half representing a member having high mounted bearing projection 75, and the right half a low mounted bearing projection 76. The segment member is supporting an endless belt comprising separate abutting portions, wherein the different portions 77 of the belt may move relative to one another, being linked by floating bridging pieces 78. In a further embodiment, the cone in CVT roller assembly is not a true cone but includes a series of projections mounted approximately perpendicular to axis of rotation, each projection having a profile approximately corresponding to a half section of a cone. By way of example, FIG. 442 shows schematically a conical end piece, consisting of a collar 79, slidably and keyedly mounted to a shaft 80, on which are mounted a series of radial/axial fin-like projections 81 of roughly triangular shape, being joined to and supported by one another by means of stiffening webs 82. The extremity 83 of this fin forms a bearing for the grooved support end 85 of the segment member 84, with lateral motion of "cone" 81 causing segment member 84 to slide along the fin extremity 83 in direction 84*a*, to say the position shown dashed at 84*b*.

Figure 449:
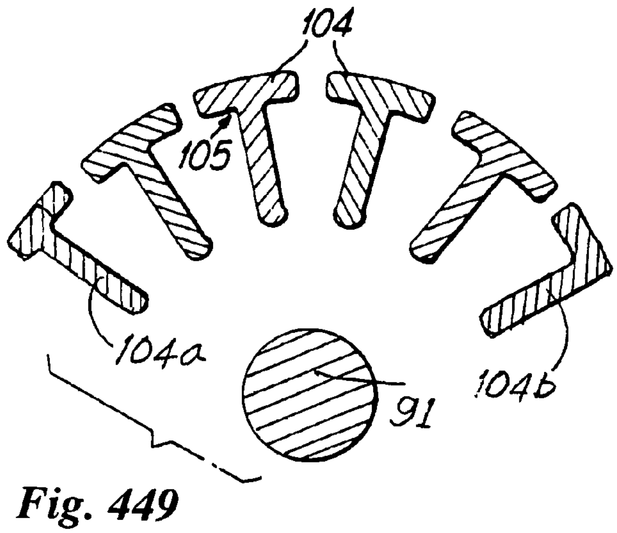
Figure 450:
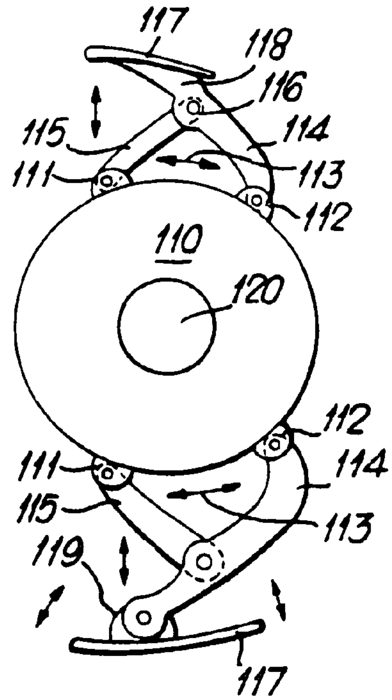
Figure 451:
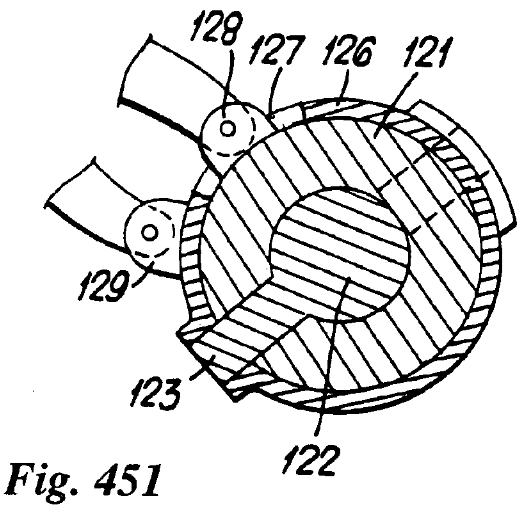
Figure 452:
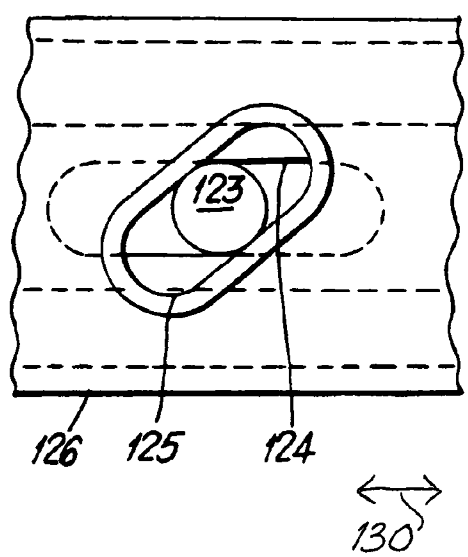
Figure 453:
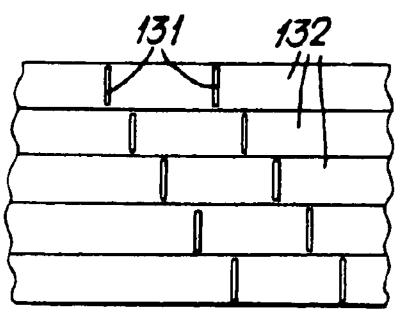

In a selected embodiment, a variable diameter roller for a CVT includes multiple segment members in contact with an endless belt, the segment members in operation overlapping and transferring loads to one another. In a further embodiment, the segment members are linked to each other by energy absorbing and/or any other devices. By way of example, FIG. 443 shows schematically a cross-section through two segment members 90 as they might be positioned in an expanding roller assembly, relative to its axis shaft 91 and each other. The members 90 are approximately "L" shaped, having a more or less radial or perpendicular portion 92 designed to transmit substantially compression loads, indicated at 93, and another more or less arcuate portion 94, designed to transmit substantially shear loads, indicated at 95. These loads are transmitted by or through the band, shown dashed at 99. A bearing nodule of the member 90 is shown elevationally at 96, optionally having a depression to slide on a projection on a cone. The members are optionally linked to each other by male/female guides as at 97, and/or by tension and/or compression members such as springs, shown at 98. Additionally or alternatively the members may be connected to the cones and/or shaft by any manner of springing or loading or fastening means. In a further embodiment, a variable diameter roller for a CVT includes multiple segment members in contact with an endless belt, the segment members being designedly flexible. FIGS. 444 through 446 show schematically how the relationship between arcuate portions 94 of the members varies between reduced roller diameter operation at FIG. 446, intermediate at FIG. 445 and enlarged dieter operation at FIG. 444, where each tip 100 of arcuate portion 94 is shown resting on a "catching" lip 101 adjacent to the elbow 102 of each member. It will be shown later how individual members may at any one time have different radii from shaft axis. In such embodiments, it is preferred that at least part of the member is flexible, so that it may bend to accommodate different radii, as shown by way of example dashed at 90*a* in FIG. 444. It is the arcuate and optionally flexible portion of the member which will form contact with the band, and this arcuate portion may be of any convenient form, material or composition. In a further embodiment, a variable diameter roller for a CVT includes segment members in contact with an endless belt, the segment members including friction material mounted on a structure, which is of any material including metal. By way of example, FIG. 447 shows a segment member having a composite construction comprising a friction material 94*a* having dimpled surface, mounted on and through holes 94*b* in the arcuate portion 94. In a selected embodiment, a variable dieter roller for a CVT includes multiple segment members in contact with an endless belt, the segment members in operation overlapping and transferring loads to one another, such transfer of loads by means including through rollers mounted on the segment members. As shown schematically by way of example in FIG. 448, it might be desirable in heavily-loaded applications to incorporate ball or roller elements 103 at member tip 100 and/or elbow 102 of arcuate portion 94, or at sore intermediate points. In a further embodiment, a roller assembly is so configured as to always have a substantially constant belt contact area, irrespective of roller diameter. The segment members have been shown overlapping, but in other embodiments of the invention they may be non-overlapping, to form a roller which has always or sometimes a substantially discontinuous or "slatted" surface. An advantage of the slatted roller is that the contact area between roller surface and band can be kept relatively constant despite variation of diameter. Another advantage is that there is no contact, and therefore no wear, between overlapping segment members. By way of example, FIG. 449 illustrates in schematic cross-section various alternative segment members suitable for a slatted roller application, shown in relation to rotating shaft 91. The cross-sectional forms of the segment members may be of elements combined to form approximate "T" or "I" or "L" shapes, as at 104*a*, 104 and 104*b* respectively. The junctions of these elements have been described as being rigid, but in alternative embodiments the junction or other points of the cross-sectional form may be hinged or designed to have greater or special flexing. For example, such hinge or greater flexing means may be incorporated at any convenient location, including for example at elbow 102 in FIG. 448 or at 105 in FIG. 449. In any and all embodiments, the location of male and female elements are interchangeable. For example, in FIGS. 440 and 441, member 54 is shown having male projections 75 and 76 for slidable mounting in slot or groove 74, whereas in FIG. 442 a female element is mounted on member 84 to slide over male projection 83.

The alternative embodiment of variable diameter roller also has segment members—which may be of overlapping or slatted form—but they are not supported at the ends by conical forms. Instead they are supported at optional points on their length by a corresponding series of linkage systems carried at least two points on a rotating shaft, the position of the segment member relative to shaft axis being determined by variation of the distances between two or more points of contact between shaft and each linkage system. The principle of operation is shown by way of example in schematic cross-section FIG. 450, only one of each of two alternate segment member types being shown for simplicity of illustration. A shaft assembly 110 having axis of rotation 120, further described subsequently, supports each segment member by two differing and alternative linkage systems, shown above and below the shaft respectively. Each system is supported on the shaft at two pivotal points 111 and 112, communicating with major lever 114 and minor lever 115 respectively. The shaft assembly has the special feature that the distance 113 between points 111 and 112 is variable. The minor and major levers intersect at pivot 116, the major lever extending to carry the segment member 117 either rigidly mounted as at 118, as shown in the upper portion of the diagram, or pivotally mounted about 119, as shown in the lower portion of the diagram. It can be seen that variation of distance 113 will cause the ends of major levers to move further from or close to shaft center 120, thereby causing the variation of the dieter of a roller composed of a multiplicity of preferably uniform segment members and associated linkage systems. Any design of shaft assembly having mounting points of circumferentially varying distance may be employed in the invention, but in a preferred embodiment a shaft comprising three concentric elements is used, as shown by way of example in schematic cross-section FIG. 451 and elevation FIG. 452. The drive shaft assembly consists of three concentric elements. A sleeve or cylinder 126 is mounted on main shaft 121, which is the principle portion of the shaft assembly caning the input/output loads, having disposed within it a slidably mounted shaft 122 prevented from rotating independently of main shaft 121 by means of key 123 projecting through elongated axial slot 124 in main shaft, the key projecting further beyond main shaft 121 through a diagonal cross-axial slot 125 in the outer shaft sleeve 126. Sleeve 126 is by some mechanical means restrained from axial movement relative to main shaft, its movement only rotational relative to main shaft 121. The sleeve 126 has other slots 127 through which main shaft pivotal lever mountings 128 located on main shaft 121 project, the sleeve having attached to it separate pivotal lever mountings 129. It can be seen that by axial movement in direction 130 of shaft 122 relative to main shaft 121, the circumferential distance between mountings 128 and 129 can be varied. Because a variable diameter roller is likely to have a multiplicity of segment members and corresponding linkage systems, it is preferable to arrange for the linkage systems 131 for each segment member 132 to be axially staggered, as shown in schematic elevation FIG. 453.

In alternative embodiments, on a shaft portion of a CVT roller assembly there is mounted only one cone which, as in the twin cone embodiments, slides laterally back and forth on a shaft to which it is keyed, both cone and shaft turning simultaneously, causing members slidably mounted on the cone to rise and fall relative to shaft axis, driving or being driven by some form of endless belt, which is in a fixed position relative to transmission mounting or casing. By way of example, FIG. 454 shows schematically an embodiment of the principles of a one-cone-per-shaft system. Only one shaft 141 of the multi-shaft transmission system is shown, on which shaft the cone shown in silhouette 142 is mounted to slide in direction 143. It is keyed to the shaft by a system of projections and depressions or keys 144, and is actuated by mechanism 146. The shaft rotates in bearings 147 mounted in the transmission structure or housing 148. Segment members 149 here have a female groove 150 that permits them to slide in direction 151 on male projections 152 on the cone 142, which is shown close to its leftmost extremity of travel, with its position near rightmost extremity of travel partly shown dotted at 153. Pressure or tension provided by the transmission belt 154 in direction 155 will cause segment members to slide rightwards relative to the cone, but they are restrained by a wheel 156 rotating on axis 157 or other bearing mounted on a radially outward projection 158 mounted on the segment member, the wheel or bearing engaging with a disc-like surface 159 which is directly or indirectly attached to the transmission structure or housing. As the cone slides back and forth on the shaft 141, it causes segment members to move in direction 160, effectively forming a roller of continuously variable diameter. When the cone is in extreme right position shown dotted at 153, the transmission belt will be in position shown dashed at 161. In another embodiment, a second set of wheels or bearings **156*a* mounted on radial projections 15*a* is provided on the other side of the segment member, together with another disc-like bearing surface 159*a* connected to the structure or casing, all shown dotted in the upper central left portion of the diagram. In further embodiments, where appropriate all the features and disclosures of FIGS. 426 through 449** are adapted for CVT's having one or more variable diameters roller assemblies each having a single cone.

The above embodiments are especially suited to transmissions where changes in ratio occur less frequently and relatively slowly. At a constant speed and at a particular instant in time, in the case of a belt wrapped through 180 degrees, the roller belt contact area is half roller circumference multiplied by roller length, this area exactly corresponding the area of the inside surface of the belt that is in contact with the roller. At the instant of ratio change, the effective circumference of the roller—and therefore the size and configuration roller's belt contact area—will change, causing differential slippage of the belt—its dimension is fixed—with resultant friction, power loss, and wear. FIG. 455 illustrates this feature schematically, showing a portion of a roller assembly having "T" shaped segment members 176 engaging with belt 177. The edges of the segment are designated "a 1" through "f 1". Let it be assumed that the corresponding points on the belt in immediate contact with those edges are designated "a 11" though "f 11". If the roller were to expand instantaneously, segment members would move further from roller axis 179 to the new position shown dashed at 178, and the points "aII" through "fII" on the belt—which is assumed to be of fixed dimension—would shift relative to segment members, as can be seen from the new position of "fII", now quite distant from its former position, indicated at "Z". Partly because the CVT is a friction drive, roller expansion cannot be instantaneous but, nevertheless, during ratio changes slippage and significant friction will occur, with attendant penalties of wear and power loss. In alternative embodiments suited to transmissions requiring relatively frequent and fast ratio changes, this friction, heat build-up and power loss can be substantially reduced. In selected embodiments, the cone consists of discreet portions, each of which supports one segment member, and which move sequentially when ratio change takes place, to effectively provide a roller of partially and sequentially changing diameter. During such ratio change, the roller will have one radius at a first arcate or radial angle, and another radius at a second arcate or radial angle. By way of example, elevation FIG. 456 and FIG. 457, which is a section taken at "A", schematically show a cone of eight equal portions 171, each keyed at 172 to slide on rotatable shaft 173. One portion 174 has been positioned independently of the others. Segment members, their guides and belt are not shown. It can be seen that, if segments members and belt or band are positioned similarly to the arrangement shown in FIG. 454, the leftward movement of portion 174 would have caused the segment member it was supporting to move closer to shaft axis, thereby reducing the effective diameter of the roller assembly at that point only. The cone portions may be linked to each other by springs 175 or other tensile or compressive devices, including those shown in FIG. 443 in relation to the linkage of segment members. In a selected embodiment, the individual roller portions are moved only while they are not in contact with the belt and, after they make contact with the belt, are not moved further until they again lose contact with it. FIG. 458 illustrates the principle schematically, wherein only belt 177 and the segment members 176 of a roller assembly rotating in direction 180 about axis 179 are shown. For sake of clarity, cone portions keyed onto and a rotating shaft and the shaft are omitted. The roller is divided into two zones, one at "X" is where the belt is always in contact with segment members, the other at "Y" where the belt is never in contact with segment members. The relative extent of the zones will vary with each embodiment and particular design of transmission. To effect ratio change, the segment member in location "H" is moved to a new position, shown schematically at 181, and will remain in that position at least until it gets to position "F". After the first segment member is moved, the second located at "G" is moved to a new position, and later when the one shown at "F" has roved to at least location "G", it too is roved to a new position. None of the segment members change position while traveling through zone "X". In a selected embodiment, the degree of movement between positions that a segment member can make within one rotation is limited to a relatively small amount, so that to effect a large ratio change, there is a series of incremental position changes, one per revolution. The incremental steps are not time dependant; they are revolution dependent. In multiple variable-diameter roller systems, incremental position changes may be at different frequencies in different rollers, because they rotate at differing speeds.

In the embodiments described above, each segment member is mounted on its own cone portion, and the segment movement along the lines described in FIG. 458 is effected by actuation of one cone portion relative to another, by any convenient mans. In a selected embodiment, the movement of the cone segments is controlled by a series of guides whose telescopic motion is actuated or controlled electronically and/or by solenoids or other electro-mechanical actuators. By way of example, schematic FIG. 459 shows a cone consisting of eight identical portions 171, similar to the cone of FIGS. 456 and 457, slidably mounted on rotating shaft 173 by mans of keys and slots 172. Cone portion 174 is shown moved to a new position. A ring-shaped actuating structure 185, which is fixed relative to shaft 173 and which does not rotate, is shown supported on arms 186 which control the ring structure's movement in direction 187. Mounted on the ring structure is a series of telescopic actuators 188, of number and spacing equal to the cone portions, the majority of which are shown in their neutral or default positions. The actuator comprises an inner telescopic barrel 189 slidably mounted to move in direction 187 in an outer telescopic barrel 190 fixedly mounted onto the ring structure 185. At the tip of each inner barrel is a wheel 191 or other bearing, to engage with the approximately vertical faces of the cone portions in operation moving past it. The inner barrel of each actuator is be powered by a solenoid 192 or other electrically driven device from its default position, shown for the majority of actuators, to either a retracted position, shown for actuator guiding cone portion 174, or an extended position. The position of the wheel on the actuator which is guiding cone portion 174 is shown dotted at 193 when the actuator is extended. In operation, referring also to FIG. 458, when it is desired that the dieter of the roller assembly be reduced, when cone portion 174 is not in contact with belt and is in zone "Y", it is moved by the actuator with which it is in contact retracting its inner telescopic barrel and wheel so that 174 is in the position shown. When portion 174 approaches the next actuator it also retracts, and the portion behind it moves to a new position corresponding to that of portion 174, and so on until portion 174 can complete its path through zone "X" and all the cone portions are in the new positions. At that time all the actuators are returned to their default positions, and simultaneously and synchronously structure 185 is moved dimension "a" in direction 188. To expand the roller, the process is reversed, and the actuators are all sequentially extended, before returning to their default position and structure 185 moved dimension "a" in the opposite direction. In this embodiment, there is only one dimension of retraction or extension from default position and both are "a", with no other dimension of retraction or extension possible. In alternative embodiments, the actuators can be moved in any dimension in relation to any default position. In further alternative embodiments, there is no default position. In another alternative embodiment, structure 185 does not move and the actuators have a much greater telescopic action, sufficient to accommodate the full range of movement of the cone segments. In another embodiment, the actuators may terminate in ring segments, against which wheels or bearings mounted on the cone portions make contact. In a further embodiment, the actuators are mounted on the cone portions, to be guided by a fixed or reciprocating structure. In a further embodiment, the actuators do not move in discreet steps or distances, but can move any convenient distance desired. In another embodiment, the actuators cause the cone portions to move while they are in zone "X" and their related segments are in contact with the belt. Previously, groups of rollers have been described as pairs, with one roller of a pair linked to another by a mechanical device. In the case of rollers with electronic actuation of variation of diameter, rollers can be arranged in any combination of groups. Optionally springs, indicated schematically dashed at 185*a*, can load each cone portion towards the ring structure. By way of example, FIG. 460 shows schematically a CVT with one input roller 1 driving three output rollers 2 via endless belt 3, in an arrangement wherein two output rollers turn in one direction while the third output roller turns in the other direction. None of the diameter-variation mechanism in each roller are mechanically linked; instead the diameter of each roller is separately controlled electronically and/or electrically, optionally along the lines of the embodiment of FIG. 634. In a further embodiment, one CVT of the invention may drive at least one other CVT of the invention, to form a compound CVT. The principle is illustrated very schematically in FIG. 461, wherein power input shaft 194 is linked to lay shaft 195 by any CVT of the invention 197, including the embodiment of FIG. 426, and lay shaft 195 is linked to power output by any other CVT of the invention 198. Optionally additional features are incorporated in each CVT. For example, CVT 197 could include a clutch function, including as disclosed herein, and CVT 198 a reversing function, including as disclosed herein. Another advantage is the ability to multiply ratio ranges. For example, if the CVT of FIG. 426 with its 4:1 ratio range were used for both 197 and 198, the compound transmission would provide a ratio range of 16:1 between input shaft 194 and output shaft 106.

The transmissions described may be mounted in any manner, including in any kind of casing or housing. In further embodiments, the CVT of the invention is part of any drive system, propulsion system, gas generator system, electrical generator system, compressor system and/or pump system mounted in any kind of marine craft, aircraft, wheeled vehicle and/or tracked vehicle. In various examples, the CVT of the invention is the transmission 433*a* of FIG. 11, the transmission indicated schematically by bracket 566*a* in FIG. 16, the transmission 4644 of FIGS. 325, 327, 329, 331 and 335, the transmission 3807 of FIGS. 341, 343, 346, 351, 352, and 412, the transmission 3807*a* of FIG. 357, the transmission 4009*a* of FIG. 386, and the transmission 4816 of FIGS. 413 and 414. By way of example, FIG. 462 shows very schematically a city parcels delivery truck 199, wherein the engine "A" drives the rear wheels via drive shafts "C", differential "D", and a compound CVT "B", optionally the CVT of FIG. 461. The variable ratio transmission features and characteristics described above and in relation to FIGS. 426 through 461 may be used in any combination to carry out the invention. The embodiments described generally relate to multiple variable-diameter roller systems, but the principles of the invention may alternatively be embodied in a transmission having only one variable diameter roller and one or more fixed-diameter rollers. The components of the transmission assembly may be of any convenient construction or material, including of metal, plastics or ceramic material. The latter material is considered particularly suitable for the components of some embodiments because of its low weight in relation to compressible strength. Lubrication as required may be by any convenient system and be powered by any appropriate means, including drives off crankshafts, by electrical motors or pumps, etc. The lubrication mechanism could be placed in any convenient location including, where the transmission is coupled to an engine of the invention, adjacent to multiple concentric toroidal combustion chambers.

Potentially important advantages of the new engines concern packaging. As pointed out previously, the engines should vibrate less than conventional units. They should be much more silent, due to the insulation that can be provided, and due to the fact that a principal sound generator—the exhaust system—can now be in the interior of the engine. As can be seen from FIGS. 23 to 25, the units can be rectangular and, because no air circulation is required, placed in locations previously not feasible. They can be easily removable and replaceable. For example, in automobiles and light trucks, they can be installed under seats, or within double skin floors. In small pleasure craft, the can be inserted and removed vertically or otherwise from above, from an open cockpit, or cabin, or lounge, or sail locker. In aircraft, especially smaller ones, they can be horizontally installed and removed from the side of the fuselage. Because they are typically housed in insulated casings or housing, the engines of the invention can be more conveniently mounted in the equipment they serve. In a further embodiment, the complete engine, including a compound engine, is in a package which "snaps in" to the equipment its serves, and is installable and removable in minutes. The "snap-in" action can be of any kind, including sliding in and out in a drawer-like motion, a substantially vertical lifting in and out, or a key-like insertion-and-rotation and reversal for installation and removal. The engines of the invention are much lighter than their conventional equivalents, so are in most cases easily replaceable by one individual. In a further embodiment, the afore-mentioned package includes within it the engine of the invention plus any other mechanism; such as for example an electrical generator, a compressor, a pump, and/or an exhaust treatment system. This "snap-in" characteristic is useful in any industrial or commercial application where down-time caused by engine malfunction would present a problem including oil pipeline pumps, hospital electrical generators and so on. It is as important in any kind of vehicle, aircraft or marine craft. In the case of the latter, a spare engine carried on board could be easily and quickly substituted for a defective engine while under way. In every case, repairs would be less inconvenient, since a "loaner" replacement engine can be installed to replace a defective unit, which could be repaired at leisure, while the "loaned" engine enabled the equipment to continue to function. Additionally, it would be easy to downgrade or upgrade equipment performance by quickly substituting engines. Certain equipment could have different interchangeable engines for different operating modes.

In vehicles, marine craft and aircraft, an exhaust pipe outlet is traditionally placed at the extreme rear of a vehicle or craft. The tradition dates from the days when exhaust gas was generally untreated and contained dangerous or noxious substances, and the risk of exhaust gas blow-back into the vehicle or craft needed to be limited. Today, in many regions of the world including California, the new exhaust emission regulations are so demanding that compliant vehicles or craft emit exhaust gas which is effectively overall as clean as ambient air, and the old restraint on placement of tail pipes is effectively no longer relevant for those vehicles and craft in those regions. In selected applications, the exhaust gas from the engines of the invention may be so hot, that the end of the tail pipe or its equivalent should not be placed where creatures are in close proximity to it. For example, such situations may arise when pedestrians cross a street between closely packed vehicles with their engines rung, or where an operative is using mechanized farm equipment close to livestock. In a further embodiment, exhaust gas outlets are placed in or on vehicles and craft in locations remote from those in close proximity to passing creatures. In the case of road vehicles, such locations are at the roof or under the vehicle and spaced from the vehicles' periphery. In a selected embodiment, a vehicle or craft exhaust gas outlet when in motion functions as a gas extractor, optionally having a venturi effect, this venturi effect reducing engine back pressure and improving fuel economy. In another embodiment, a major portion of an entire exhaust gas system is fixedly mounted in a vehicle or marine craft or aircraft, with an optional flexible connection to an IC engine relatively near the engine. In a further embodiment, hot exhaust gas is used to at least partly heat all or portion of an interior of a vehicle or marine craft or aircraft.

Many present emissions regulations are based on a manufacturer having to install a system which is guaranteed operative for a long period. For this reason, promising technologies having a shorter life-span, for example urea systems for NOx reduction, are generally not in use today. An alternative approach, feasible in the case of "snap-in" units, would be to mandate performance and compliance only, not system life-span. For example, a manufacturer, rather than installing a vehicle system guaranteed for 200 000 km costing 400 Euros, may wish to install one lasting 100 000 km and costing 125 Euros, and make "snap-in" replacement systems available for replacement by the customer. In a further embodiment, suited to any application, including for industrial plant and power generation equipment, an exhaust emission removal system for any regulated pollutant or other substance, whether fixedly mounted or of "snap-in" configuration, has within it or is exposed to one or more sensors that will monitor its condition and/or the condition and/or composition of the exhaust gas. Optionally, one or more sensors will trigger an electrical or electronic optionally tamper-resistant circuit if the condition of the treatment system and/or the composition of the exhaust gas falls outside a desired or mandated standard. Optionally, the electrical circuit is used to sound an audible alarm and/or illuminate a light and/or generate a signal in a visible or exposed location, including on a vehicle, marine craft or aircraft, that is normally easily observable to law enforcement officers. Optionally, an operator can be given some advance warning of when such a light will come on, giving the operator a chance to replace the system or any defective parts of the system. In another embodiment, in the case of any kind of equipment, including surface vehicles or marine craft or aircraft, the electronic circuit triggered by the exhaust treatment system causes the equipment or vehicle or craft to be inoperative a certain period after the light or signal has come on, or at such time make the equipment or vehicle or craft not restartable after the operation during which the light came on is completed. In another embodiment, an exhaust gas treatment system includes a removable and/or exchangeable module or cartridge with openings on opposing sides which is placed in an exhaust gas flow, such that the gas passes through the openings from one side of the module or cartridge to the other. Such a cartridge works on the same principle as a tea strainer, a device with two holed spoon-shaped openable and closable halves, one hinged on a spoon handle, which is filled with tea leaves and moved through hot water. Such a "tea-strainer" emissions cartridge is of any size and configuration. In a further embodiment, such an emissions cartridge may comprise several sub-cartridges, each having a different function and/or each for the removal of a different component of the exhaust gas, each of the sub-cartridges separately removable and exchangeable. In a further embodiment, such a module or cartridge or sub-cartridge contains substance that ablates over time, optionally because the substance reacts chemically with a component of the exhaust gas, and the substance needs to be replaced at intervals. The exhaust treatment systems referred to above can be for any purpose, including for removal of any substance, including particulate matter, hydrocarbons, carbon monoxide, nitric oxides, and carbon dioxide.

Figure 465:
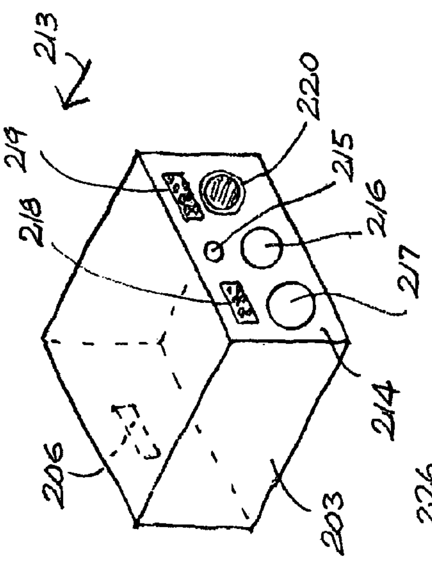
Figure 466:
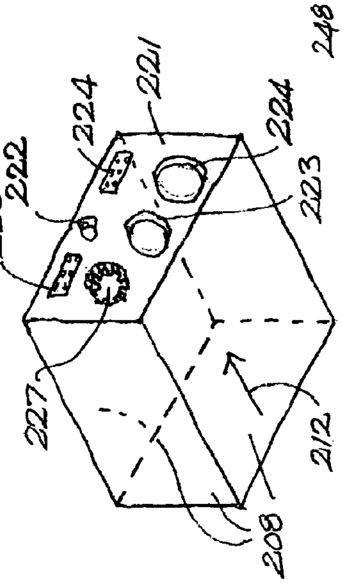
Figure 467:
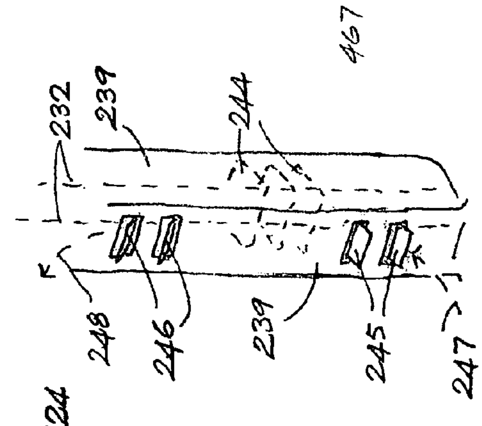
Figure 463:
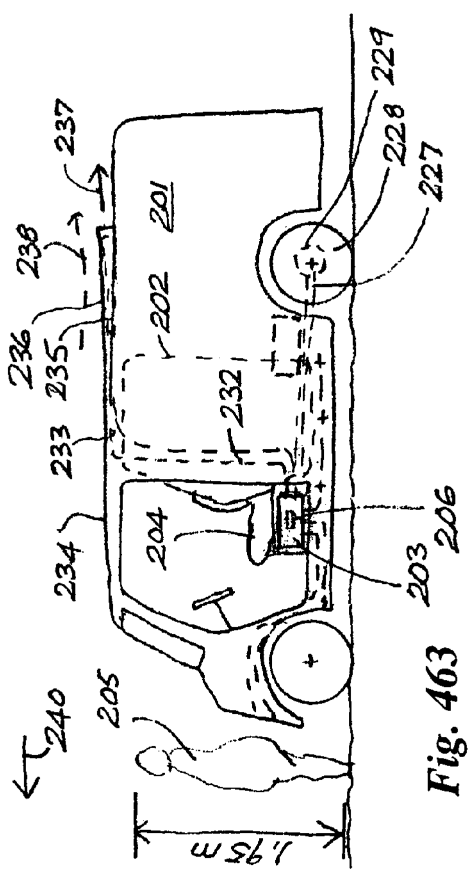
Figure 464:
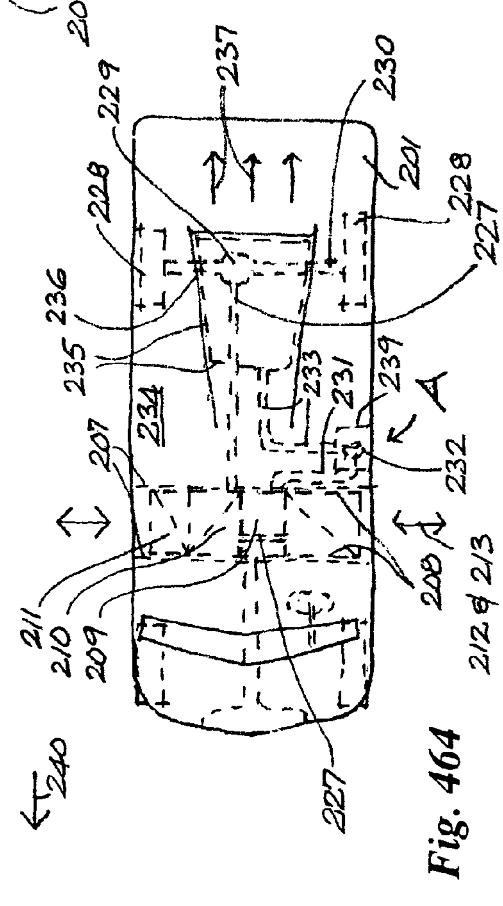
Figure 468:
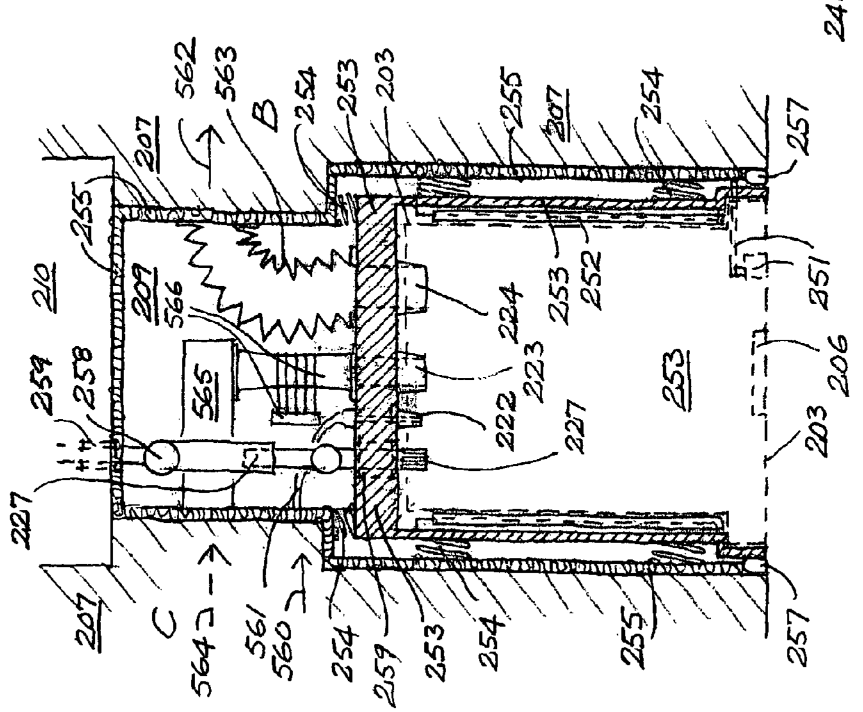
Figure 473:
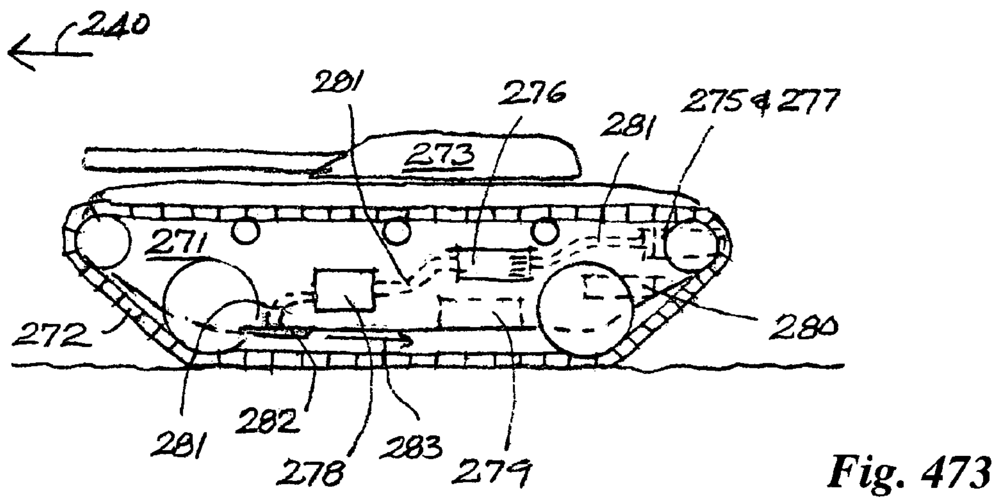

By way of example, FIGS. 463 through 468 show schematically an inner-city small parcels delivery truck having the packaged engine of the invention, where FIG. 463 is an elevational view, FIG. 464 is a plan view, FIGS. 465 and 465 are details of engine connections, FIG. 467 is a view of the vertical exhaust pipe riser enclosure, and FIG. 468 is a detail of an engine mounting option. Direction of normal vehicle movement is indicated at 240. The truck 201 is shown with driver's sliding door in the open position shown dashed at 202, exposing the engine casing 203 with recessed drawer-style pull handle 206 located under the driver's seat 204. The height of the vehicle is shown proportional to the height of a 1.95 meter tall person 205 standing nearby. A bulkhead 207 which has the female recess 208 into which the engine casing is fitted extends all the way across the vehicle, and accommodates a connection zone 209, a transmission 210, and a space for ancillary equipment 211, such as air conditioning system, etc., all indicated separately by dashed diagonal lines. FIG. 465 shows the exterior of the engine casing and FIG. 466 the recess 208 into which it installed in direction 212 and removed in direction 213. The back of the casing 214 has female openings for fuel 215, intake air 216 and exhaust gas 217, male electric 218 and electronic 219 connectors, and the end of a rotatable hollow output shaft 220 having female splines. The recess has a vertical backplate 221 having conically shaped stub tubes for fuel 222, for air 223 and exhaust gas 224, female electric 225 and electronic 226 connectors, and the end of a splined rotatable shaft 227 which passes through the connection zone 209 to drive the transmission 210, from where power is transferred to rear wheels 228 via drive shaft 227, differential 229 and rear axle 230. Exhaust gas travels via optionally thermally insulated passage 231, up riser pipe 232, across underside of roof 234 via another optionally thermally insulated passage 233 to a large flat muffler shown dashed at 235 located between roof and shallow roof-mounted housing or projection 236. Exhaust exits at roof, away from vehicle sides and distant from vehicle rear, in direction 237. Optionally, both muffler 235 and housing 236 are so designed that when the vehicle is in motion airflow at 238 creates a venturi effect to extract exhaust gas and reduce engine back-pressure, so improving fuel economy. The principles of discharging exhaust gas remote from vehicle periphery via a flat muffler in a housing, optionally having a venturi effect, can equally be applied to smaller vehicles such as sedan cars, as illustrated schematically in FIG. 469, with direction of normal movement indicated at 240. The housing for the muffler is mounted underneath the car 243 and is shown dashed at 241, with exhaust gas exiting the underside of the vehicle at 242. For each application, an appropriate dimension for "x" and "y" has to be determined. Going back to the truck of FIGS. 453 through 458, the exhaust riser 232 is contained in an enclosure 239 inside the vehicle in area indicated at "A", and is shown in schematic detail FIG. 467. Within the enclosure, the exhaust gas pipe is not thermally insulated, and is optionally fitted with heat transfer fins 244. When vehicle interior heating is desired, adjustable flaps communicating with the interior of the riser enclosure at the bottom 245 and top 246 are controlledly and variably opened, permitting cooler air to enter at bottom at 247, be heated by the exhaust riser, and exit warmer at top at 248. Unlike in today's vehicles where they are suspended in some way, after leaving the engine or connection zone, the exhaust system components for the truck are all rigidly mounted, including pipes 231, 232, 233 and muffler 235. In a further embodiment, the engine in its casing is mounted in a female recess that is an independent structure or frame, and this structure or frame in turn is suspended or flexibly mounted in the system which the engine serves. Such a system could be anything, including an electrical generator set, a pumping or compressor set, an aircraft, marine craft, or vehicle of any kind. By way of example, detail plan view FIG. 468 shows schematically how an engine is mounted in a suspended frame in a vehicle such as the parcel truck of FIGS. 463 and 464. The engine in its casing with recessed pull handle 206 and optional lock 251 is shown dashed when installed at 203. It sits on telescopic drawer-style roller slides 252 inside a box or frame 253 which is suspended in the truck's power bulkhead 207, above which is seating 204, by means of springs 254 and/or material 255 which serves as both acoustic and thermal insulation. If the springs are omitted, the material 255 is compressible. Similar springs and or material are installed above and below the box or flame 253 to separate it from the roof and floor of the recess in bullhead 207, and between the back of the box or frame 221 and projections 256 in the bulkhead. Optional inflatable seals are provided at 257. All the connections in zone 209 are flexible. The power drive shaft linking engine to transmission 210 is mounted in bearings 259, has a universal joint 258 at each end, and is splined at 227. Fuel flow at 560 is via flexible fuel line 561. Exhaust gas flow 562 is via flexible bellows duct 563, optionally thermally insulated and optionally of a high-temperature metal alloy. Air supply 564 is via plenum 565 and flexible duct 256, optionally of controlledly variable diameter, as disclosed subsequently herein. Spaces in the region of "B" and "C" can be used for exhaust emissions treatment systems, turbines using hot exhaust gas, charge air compressors, fuel delivery pumps, and the like. In an alternative embodiment, some connections in zone 209 are rigid and box or frame 252 is enlarged to include a fixedly mounted transmission 210 and/or ancillary equipment 211. In such case, flexible connections are provided elsewhere between box or flame 253 and bulkhead 207, including optionally in zones "B" and "C", optionally along the lines described above. In a further embodiment, the reciprocating stage optionally operates at a virtually constant fuel air mixture ratio, which in selected embodiments is at stoichiometric mixture ratio. In order to better match charge air supply to fuel delivery under varying operating conditions, the flow of charge air supply through a passage is variably restricted. In a selected embodiment, a pump or compressor or combustion engine may have a variable diameter or cross-section charge intake throat. This may be used in any type of engine, including somewhere in a charge air entry path to an intake port of the engine of the invention. Essentially the variable throat comprises a stretched elastomeric tube about which is wound one or more tension members, whose free ends once pulled effect a reduction in tube diameter. By way of example, section plan view FIG. 470, cross-sectional view FIG. 471 and detail FIG. 472 show diagrammatically a stretched elastomeric throat shown solid in open position at 739, fixed within charge housing 740 by means of expandable clamp rings 741. Wound externally about the elastic throat 739 and mounted in lubricant 743 in guide channels 742, shown in detail section FIG. 316, are multiple tension members 744, whose ends are taken via pulleys 745 and wound about variable diameter cylinder 746 mounted adjacent to throat. In operation, rotation of cylinder causes the tension members to effect a partial strangulation of throat, so reducing its diameter, as shown dashed in FIGS. 470 and 471. It is desirable that throat or membrane 739 when in the open position should be in significantly greater tension due to stretching in direction 747 than in direction 748, this differential ensuring throat remains open. The tube and tension members may be of any suitable material, including rubber, nylon, metal wire, etc. In a further embodiment, such a variable diameter fluid passage is used for any fluid, in any application.

Figure 474:
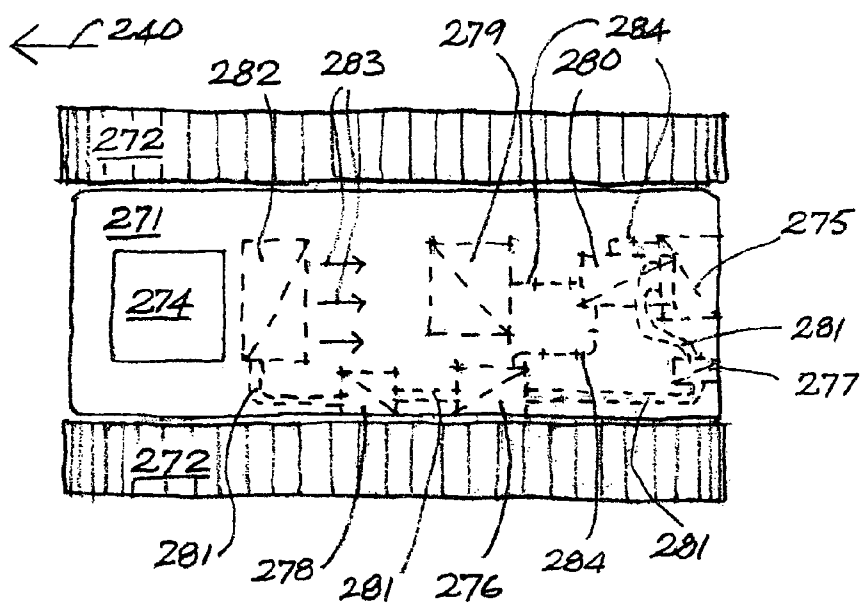
Figure 475:
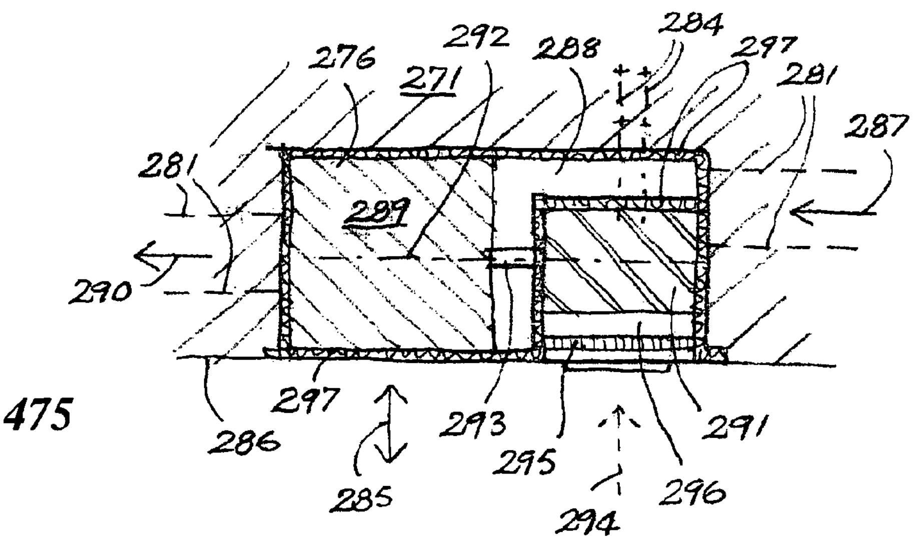
Figure 476:
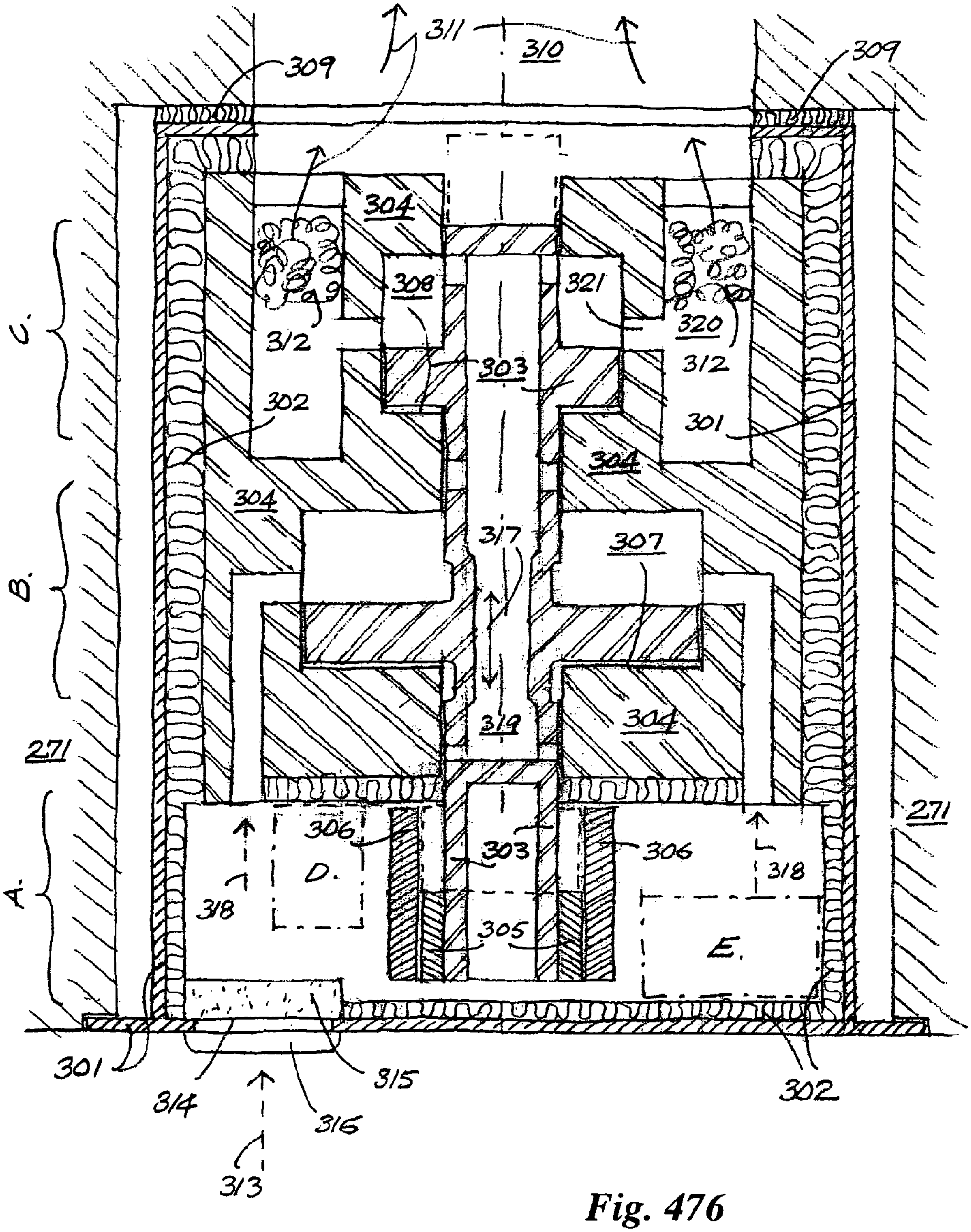

As noted, the installable and removable "snap-in' type casing can contain not just an engine, but any other system or systems, including charge compressors, electrical generators which optionally function as starter motors, turbine stages for compound engines, exhaust treatment systems for removing regulated emissions, and exhaust treatment systems for removing CO2. In alternative embodiments, sore or all of such systems can be mounted in separate "snap-in" type casings, so that only those systems requiring maintenance or repair can be removed. In a further embodiment, an exhaust gas treatment system has components which are removable and replaceable, optionally contained within "snap-in" type cartridges or modules. Removable and replaceable cartridges or modules can be used as part of more elaborate emissions systems, especially those for larger engines in large vehicles, marine craft and/or in stationary power generation plants. The contents of such removable and replaceable cartridges or modules may be of any substance, including catalysts, NOx reduction materials, particulate filters, water, aqueous solutions, all the former either new or defective, as well as replacements for substances which have ablated, or substances formed in the process of removing CO2 from the exhaust. By way of example, elevational view FIG. 473 and plan view FIG. 474 show schematically a hybrid electric drive military tank 271 having conventional tracks 272, with turret 273 omitted for sake of clarity in plan view. The latter shows schematically a photovoltaic array 274 for supply of energy to an energy storage device, here a battery pack 279, optionally via a controller 280. Direction of normal movement is indicated at 240. The drive and other systems are shown dashed with major items indicated by a diagonal line, except the face panels of the snap-in removable units, which are shown in solid line. Removable casing 275 contains the reciprocating stage of a compound reciprocating/turbine IC engine, together with its charge compressor and an electrical generator which doubles as a starter motor. Removable casing 276 contains the turbine stage of the compound engine, with its own electrical generator/starter motor. Removable casing 277 contains an exhaust treatment system for removing regulated emissions, and removable casing 278 an exhaust treatment system for removing CO2. Major power circuits, indicated by crossed-dashed lines 284, take power from the generators to the battery pack 279, accessible from underneath the tank via controller 280. Fixedly mounted thermally insulated passages 281 carry exhaust gas between the removable casings and on to a muffler 282 mounted underneath the fore part of the vehicle underside to exit underneath the vehicle at 283, to ensure the best mixing with ambient air before leaving the perimeter of the vehicle, and to ensure that the lowest heat signature is emitted. Not shown are the electric motors which drive the tracks 272. The vehicle optionally has non-metallic tracks and, because of its electric drive is virtually silent. The turbine stage as well as the reciprocating stage of the compound engine, both in thermally and optionally acoustically insulated casings, will generate negligible noise and vibration while operating. Exhaust-bourne noise is reduced by passing the exhaust, after it leaves the turbine, through several insulated passages and the exhaust treatment system 278, to enter the muffler and exit it below the vehicle, the adjacent underside of which optionally includes sound deadening materials. A schematic detail FIG. 475 shows the layout of casing 276, consisting of a metal structure with a lining of thermal and acoustic insulating material 297 enclosing the turbine stage 289 and electric generator/starter motor 291, removable from vehicle side 286 and installable both in direction 285. Hot exhaust gas travels in fixedly mounted thermally insulated passage 281 to enter a plenum 288 in the casing from direction 287. From the plenum, which surrounds electric generator/starter motor 291 on three sides, the exhaust enters the turbine stage 289. After powering the turbine stage it becomes cooler and travels on in direction 290 through fixedly mounted thermally insulated passage 281. Motor 291 and turbine stage have a common axis 292 and are linked by rotatable shaft 293. Air enters the casing at 294, passes through filter 295, to cool the generator, via its partially surrounding plenum 296, and to provide optional by-pass air for the turbine stage. Power supply 284 from the generator goes to the battery pack optionally via the controller. Detail FIG. 476 shows schematically in outline the layout of the principle elements in casing 275, containing the reciprocating engine stage and electric generator/starter motor, nested in a recess in the rear tank body 271. Although not shown, where appropriate any of the features and details of FIG. 468 can be used to accommodate casing 275. For the sake of simplification, fuel delivery mechanisms, fasteners, electric power wiring, electronic controls and wiring are all not shown. Again for the sake of simplification, the piston assembly and the cylinder assembly are both shown as of one piece, but in practice each would be made up of multiple pieces held in assembled condition by fasteners loaded in tension. The outer metal casing structure 301 is generally lined with thermal and acoustic insulating material 302. The casing is divided into three areas: area "A" is for the electric generator/starter motor, area "B" is for the charge air compressor and area "C" for the reciprocating stage of the compound reciprocating/turbine IC engine, in this application with the two stages remote from each other. Air 313 enters zone "A" via aperture 314 shielded by projecting eyebrow-like overhangs 316 and passes through removable and/or cleanable filter 315 to cool the generator and any ancillary equipment, such as fuel delivery systems, electronic controls, etc, optionally located in zones "D" and "E". From zone "A" the air 318 goes to zone "B", to be compressed in toroidal working chambers 307 in the manner of the embodiment of FIG. 162, and then the compressed air enters the central volume 319 of the piston assembly, which reciprocates in direction 317, and from there it goes to the zone "C" reciprocating IC engine stage. After combustion has powered the piston assembly, which in turn powers both compressor and generator, hot exhaust gas passes via ports 321 to circumferential exhaust gas processing volume 320, containing filamentary material 312, into plenum 310 in the rear part of the tank 271, as indicated by solid arrows 311. Compressible and optionally thermally insulating seals are provided at 309. Optionally, one pair of working chambers 308 and/or 307 could be so configured as to cause the piston assembly to both reciprocate and rotate. This single or combined motion powers the generator, consisting two principle parts or windings. One 305, the equivalent of a rotor, is mounted on the piston assembly, the other, the equivalent of a stator, is fixedly mounted in zone "C". Apart from ancillary equipment, the contents of casing 275/301 have only a single moving part, common to the reciprocating stage, the compressor, and the electric generator. In an alternative embodiment, either one or both of the working chamber pairs 307 and 308 can be so en-bodied as to cause piston assembly 303 to rotate while reciprocating, relative to the cylinder assembly 304, in the manner of the embodiments of FIG. 123, which uses a guide system, or of FIG. 138, which uses sinusoidal or wave-shaped surfaces to the working chambers.

Any kind of exhaust gas treatment system can be used with the engines of the invention, for any purpose. In selected embodiments, exhaust gas from any combustion source whatever, including industrial fluid bed combustion and IC engines, either traditional or the engines of the invention, is mixed with water in any way to remove selected constituents of the exhaust gas, including particulates, hydrocarbons, carbon monoxide, nitric oxides (NOx) and carbon dioxide (CO2). The water before coning in contact with the exhaust gas optionally is part of a fluid containing one or more other substances. The gas is passed through a tank or reservoir containing the water-based fluid or, alternatively and/or additionally, water or a water-based fluid in any form, including, liquid, gas, vapor or steam, is introduced into the exhaust gas flow, in a process that can be described as washing the gas. After the water has moistened, weighted down and/or reacted with at least one of the constituents of the exhaust gas, the water will contain at least one new component, or an additional quantity of a component already in the water, and the water or water-based fluid will have a modified composition. After contact with the exhaust gas, the modified water-based fluid can either be stored in a tank, to be removed and disposed of at intervals, or it can be processed to remove the new component, or the additional quantity of a component previously present, to the degree that the water or water-based fluid is substantially restored to its original condition and is once again exposed to the exhaust gas, for the cycle to be repeated. In the case of the water or water-based liquid trapping and containing particulate matter, the modified liquid can be passed through a particulate trap, which is cleaned or replaced at intervals, or the modified liquid can be passed through or over or otherwise mixed with a substance which will react with the particulate matter to produce a new compound. After a period, the substance will have ablated or become used up and will need to be replaced and, optionally after the same period, the deposits of the new compound will need to be removed. Optionally, either one or both of the ablatable substance and the substance to be removed will be in removable and replaceable cartridges or modules. The processes and procedures described above for the removal of particulate matter can be used and/or adapted to remove any component of the exhaust gas. In an alternative and/or additional embodiment, exhaust gas is mixed with one or more other substances including water and/or a substance in solution in water, in an exhaust gas processing system in part to remove the presently substantially unregulated carbon dioxide (CO2) from the exhaust by causing it to react or otherwise combine with other substances and/or water to form any other product. By way of example, a system for removal of CO2 optionally incorporates the formation of carbonic acid, which is optionally passed across a natal or base filamentary or other system which combines with the acid to form salts in the processing system. In an alternative water-based system for removing CO2, lime or calcium oxide is introduced to water to form calcium hydroxide, which reacts with CO2 to form calcium carbonate, a precipitate which is later removed. In the case of CO2, the inter-action with water alone will produce carbonic acid, an the interaction with another substance in solution in the water will produce another compound, typically in solution or suspension. The resultant mixture of water and carbonic acid and/or of water and other substance can be stored in a tank with the tank emptied into a disposal system of some kind at intervals. Alternatively, the mixture of water and carbonic acid and/or water and other substance can be passed through or over or otherwise mixed with a natal or base or other material, with which the carbonic acid and/or other substance will react to form a salt and/or other matter. After a period, the metal or base or other material will have ablated or become used up and will need to be replaced and, optionally after the same period, the deposits of salts and/or other matter will need to be removed. It should be noted that, if all CO2 is removed from exhaust to be combined in another substance, one kilogram of fuel will produce approximately somewhere between five and ten kilograms of other substance. If refueling and removing of the other substance are to be simultaneous, the tank holding the other substance will be significantly larger that the fuel tank, and the system the exhaust treatment system is part of, such as an aircraft or vehicle, will increase in weight as the fuel is used up.

Figure 477:
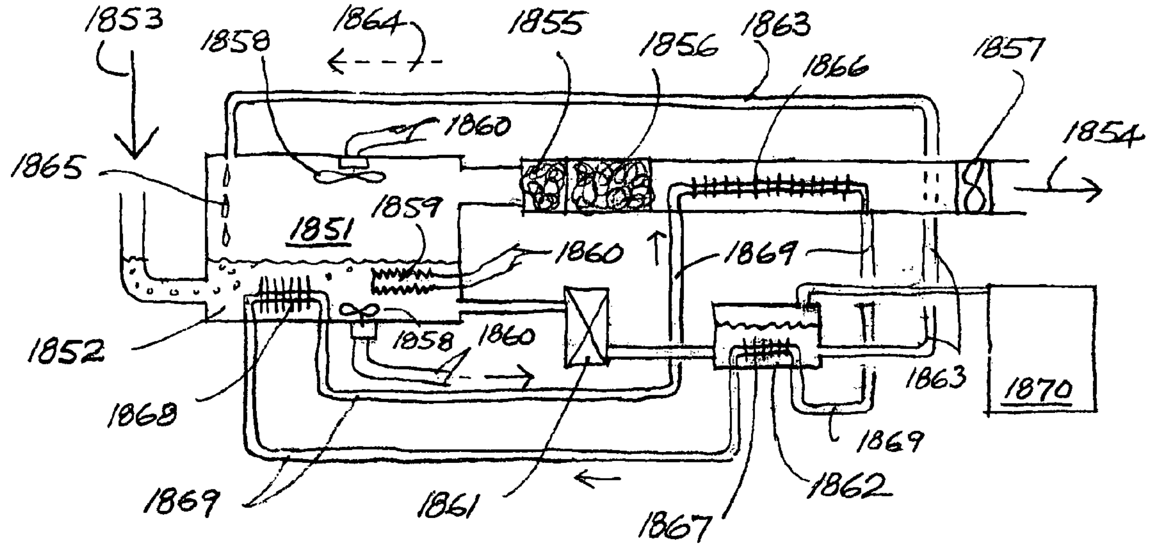
Figure 478:
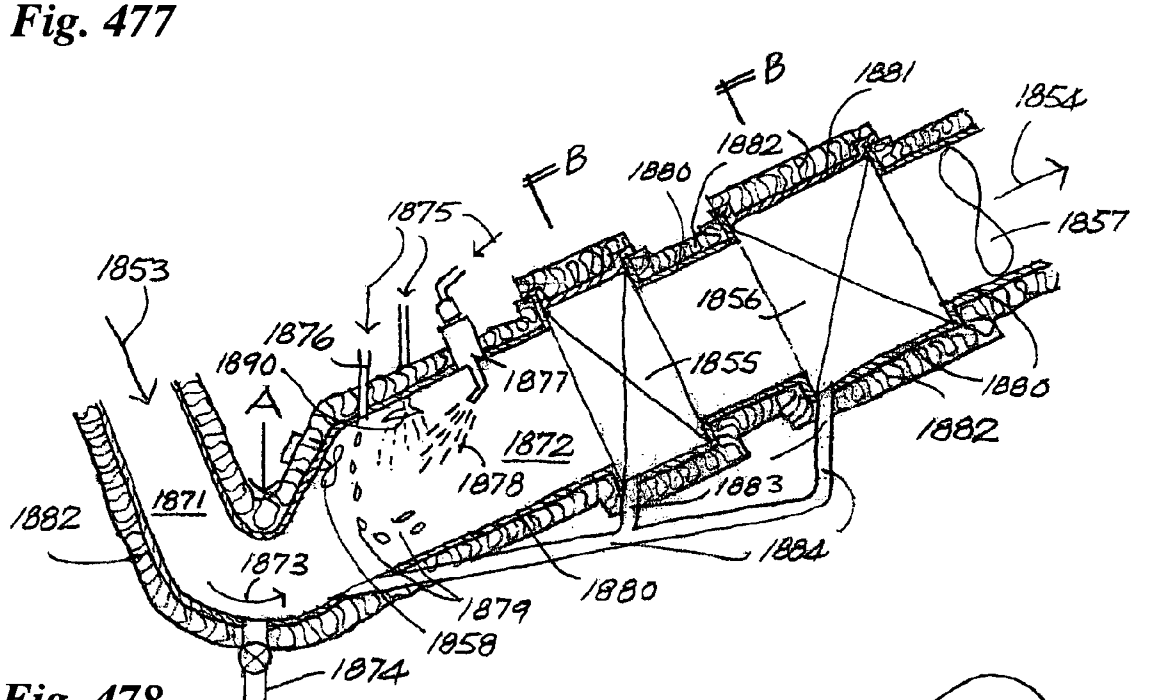
Figure 479:
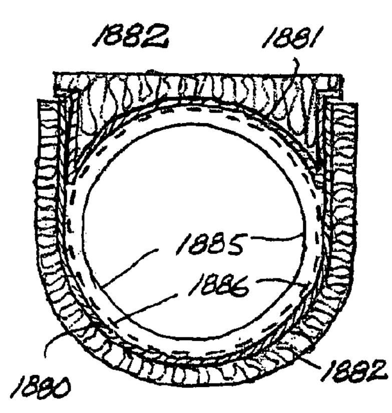

In any application, including for industrial plant and power generation equipment, a pollutant removal system of any kind may have at its end a pollutant measuring sensor, that will trigger an electrical or electronic circuit if the pollutant content of the exhaust gas is higher than it should be. In the case of replacement of defective components of and/or removal any substance from the exhaust of IC engines in vehicles, marine craft or aircraft, these may optionally be include an electronic or other default system whereby they cannot be refueled and/or cannot be operated before any defective component of the exhaust treatment system is replaced or any tank or reservoir holding a product of the treatment system is emptied. The electrical circuit can be used to sound an audible alarm and/or illuminate a light in a highly visible location, including on a vehicle, marine craft or aircraft. In the case of the IC engines of the invention, the exhaust gas leaving the combustion chamber is likely to have a temperature of somewhere between 900 and 1400 degrees C., depending on state of engine tune, application, and location of the treatment system. This is higher than in conventional engines, and will generally make the initial reactions between the water and/or other substance in solution and the exhaust gas component to be removed more effective and more rapid. In a further embodiment, the quantity of water exposed to the gas is metered or otherwise proportional to quantity of gas flow, so there is just enough or a little more water to complete the desired reaction(s). In some applications this quantity of water is so small that all or nearly all of it will be turned into steam by the hot exhaust gas and, in the case of CO2 reduction, some or all of the carbonic acid formed will be a gas, rather than a liquid. In some applications, all the constituents of the fluid after the desired reactions have taken place will be in gaseous form, including the remains of the original exhaust gas, and possibly traces of water. In such case, the hot gas can be passed over or through suitable metal or base filamentary material for removal of the products of the first reactions. If, after the conversion of water to steam, the mixture is not hot enough for any desired reaction to be completed in a limited time, then addition heating may be applied to the gas at any time during its treatment. In all the embodiments and applications mentioned above, desired reactions are optionally encouraged and/or hastened by the placing of catalysts in the reaction environment. In a further embodiment, if a reservoir or tank of water is part of the exhaust gas treatment process, the water is maintained at a desired temperature by suitably scaling the amount of water or other liquid in the tank or reservoir and/or by separately cooling or heating it. The cooling or heating can be by any convenient means. For example, cooling can be effected directly by passing incoming charge through the tank or reservoir, or directly by passing air through heat exchangers, passages or radiators located in the liquid. Heating can be my means, including by placing of an electric or other heater in the reservoir or tank. Depending largely on the amount of water that has been converted to steam, the temperature of the exhaust gas, after it has completed all processing described above, will be reduced but will still be high. In a further embodiment, the residual heat energy in the exhaust gas is used by any convenient means to maintain a desired temperature of water in any tank or reservoir and/or to wholly or partly boil off a liquid to leave a desired deposit, before discharge of the exhaust gas into the atmosphere. Such means include directly passing the gas through a liquid tank, or a reservoir containing liquid and/or gas, or passing the gas across a heat exchanger system which transfers the heat energy to a liquid tank or a reservoir containing liquid and/or gas. In any of the embodiments or applications of this disclosure, a fan or impeller or other device to promote mixing of fluids may be positioned in any part of an exhaust treatment system. Some of the embodiments mentioned above are illustrated by way of example in schematic FIGS. 477 through 480. FIG. 477 shows a system based on a liquid tank or reservoir, wherein 1851 is an optionally partially filled tank or reservoir containing water 1852. Exhaust gas enters at 1853, is passed through or is otherwise mixed with the water, after which it passes through an optional particulate filter 1855, optionally including filamentary material, and subsequently through an optional pollutant removal system 1856, optionally including filamentary material, with exhaust gas passage through the system aided by optional fan or impeller 1857 to exit to the atmosphere at 1854. Optionally, there is a fan 1858 powered via electric circuits 1860 anywhere in the tank to better mix water vapor or steam with the exhaust gas, as well as an electric heater 1859 powered by electric circuits 1860 to keep the water to a desired temperature. Optionally, the water is re-circulated by pump 1861, to be passed through a pollutant removal device 1862, to return via passage 1863 in direction 1864 to be fed back into the tank at 1865. Optionally, a heat exchanger 1866 over which the still hot gases pass transfers heat energy to one or more other heat exchangers 1867 and 1868, to heat the pollutant removal device 1862 and/or tank 1851 to maintain temperatures at desired levels. The heat exchangers are connected by passages or pipes 1869 through which fluid flows, optionally in direction indicated by adjacent un-numbered arrows, and may include any number or type of valves (not shown). The pollutant removal device 1862 and the pollutant removal systems 1855 and 1856 can be configured to remove any substance, including particulate matter, hydrocarbons, carbon dioxide, nitric oxides and carbon dioxide, and one or more of the removed substances can be stored in one or more tanks 1870. If a gas is stored, it is optionally compressed and stored under pressure. Although only one device 1862 and one system 1856 are shown in each location, any number of devices and systems can be placed in each location, linked either in series or in parallel. Any of the components shown in FIG. 477 may have thermal insulation applied about them. In an alternative embodiment, a metered supply of water is mixed with the exhaust gas, optionally enough or just more than enough for the constituents of water to complete one or more desired chemical reaction(s). By way of example, schematic longitudinal section FIG. 478 and cross-section FIG. 479 taken at "B" show an exhaust treatment system aligned at an angle, wherein the arrow at "A" points vertically downwards. Exhaust gas at 1853 passes through passage 1871 and is turned at an angle to enter the main treatment structure 1880, the first part of which is the mixing chamber 1872 of approximately circular cross-section. The greatest density and possibly velocity of the gas is at the elbow at 1873, where the gas velocity can to a degree be set by the cross-sectional area at "A", relative to the cross-section area of passage 1871 and mixing chamber 1872. Water is supplied at 1875, and enters the mixing chamber by one or more alternative means; at 1876 it is fed in as a drip or stream to be broken up into smaller droplets at 1879, at 1890 it is a gravity feed from a shower-head type of device, while at 1877 it is supplied by an injector in a spray 1878 directed substantially opposite to direction of gas travel. In either embodiment, the water may be heated, superheated or be in the form of steam and may be delivered at any convenient pressure and temperature. The gas then passes through removable and replaceable treatment modules or cartridges 1855 and 1856, before optionally exiting to the atmosphere at 1854. If desired, an extract fan is provided at 1857 to help draw the gas in direction 1854. Optionally, a fan 1857 is provided to draw out and/or accelerate the gas. The treatment modules sit in cross-sectionally enlarged portions of the treatment structure, as shown in cross-section FIG. 479, which is a view through the enlarged section with treatment module removed and shows the inside diameter of the regular treatment structure at 1885, with dashed line 1886 indicating where the module or cartridge would be if inserted. The inside of the lid is crescent shaped so that any moisture can run down off the lid into the main structure, which like the lid, is optionally entirely encased in thermal insulation. Drains 1883 to the enlarged section enable excess moisture to run down pipe 1884 to be discharged in to bottom of the mixing volume. The elbow at 1873 is provided with an emergency or service drain plug 1874. The fall in the system is shown against direction of gas flow, but in an alternative embodiment it is with the direction of gas flow. The treatment modules can be designed to wholly or partly remove any component of the exhaust gas, and may be of any form including fibrous, filamentary or porous, and be composed of any material, including ceramics, high temperature metal alloys, metals, bases, or of a combination of any materials. They may include material reacting with the constituent of the gas and which becomes ablated or reduced over time, and/or may comprise a catalyst which assists in the reaction process but which it self not part of it. To facilitate easy and clean removal/replacement of the treatment modules or cartridges, they may consist of a structure having apertures in the faces through which the gas flows, with the treatment substance, optionally including filamentary material, mounted within the treatment module structure. Axonometric sketch FIG. 480 illustrates very schematically an example of such an easily installable and removable treatment module structure, which is of the "tea-strainer" configuration. It has meshed or otherwise apertured faces 1887 perpendicular to gas flow, solid faces 1888 parallel to gas flow, and containing within any filamentary material 1889, including as disclosed herein. Removable "tea-strainer" type modules which are part of an exhaust emissions treatment system can be of any convenient cross-sectional form including circular as shown here, oval, rectangular, etc. They can contain any hardware, including filamentary material as disclosed herein, and/or any other substance including catalysts and/or material that ablates and is over types used up and replaceable. Alternatively and/or additionally, they may contain any kind of filter. The removable module of FIG. 480 is by implication part of a fixed system. In an alternative embodiment, a tea-strainer type removable module may be part of a system which is itself removable, such as the "snap-in" type reciprocating engine stage 275 and CO2 emission system 278 of the tank of FIGS. 473 and 474. FIGS. 463 through 480 are schematic and to no particular scale, nor do they show features and components in any particular proportion to one another, except for the heights in FIG. 463.

Today's metal engine hardware was commercialized dung the steam age, then adopted for use in reciprocating IC engines. There is a huge global installed base of such engines, as well as production facilities and skills to manufacture these engines and the many components used in their assembly. Entirely new and more efficient engines, using very different components and manufacturing and assembly methods, are highly desirable, but it is clear that their wide introduction will take considerable time. An important and equally attractive strategy would be to take today's conventional engines and, by effecting relatively simple modifications, make them capable of more efficient operation, thereby saving fuel and reducing CO2 emissions. Today, engine speed, and therefore power density, is limited by many factors, including the time available for the required fuel delivery and combustion processes to be properly completed. In the case of vehicles, aircraft and marine craft, improved power density leads to improved fuel economy, and therefore also reduced CO2 emissions, because less engine mass needs to be transported. In the case of larger engines, including for power generation and marine propulsion, the single most important factor limiting engine speed and therefore power density, are the stresses causes by the masses of the reciprocating components. In another part of this disclosure, in a description of less conventional engine layouts, there is shown how the link between crankshaft and piston can be primarily loaded in tension. Any mechanical linkage in an engine can be constructed to be principally loaded in tension. For example, in today's engines, a push rod can be replaced by a "pull wire". In a further embodiment, a camshaft located near a crankshaft actuates one or more valves by a component principally loaded in tension. By way of example, in schematic FIG. 481, camshaft 1256 actuates rocker arm 1257 fixed at pivot 1258 which, via tensile member 1259, activates rocker 1260 anchored at pivot 1261, which in turn opens valve 1262 in head 1004, the valve loaded by spring 1263 to return to its original closed position. It is clear that the use of tensile members permits greater freedom in location of cam and valve mechanism, since the line of force need no longer be a straight path. By way of example, tensile element 1259 is shown routed clear of another engine element 1264 by means of wheel, roller or beating 1265. The tensile element need not be a wire; it could be a slim rod. In another embodiment, a lever mounted on a pivot is used both to create an indirect path around an obstruction, and to function as a stroke magnifier. In the example of FIG. 482, "pull rods" 438 are used. In this embodiment, upper rocker 1260, pivot 1261, valve 1262, spring 1263, head 1004, cam 1256, lower rocker 1257 and pivot 1258 are all as shown in FIG. 481. The two rockers are linked by the two rods 438 so as to clear obstruction 1264 by a stroke magnifier 437 pivoted at 436. The rods have threaded ends with adjustable lock nuts 439 mounted through cylindrical pivots 440, in turn mounted on the rockers and the stroke magnifier 437. The drawing is to no particular scale. Since the pull rods are principally loaded in tension, they can be much thinner and lighter than conventional push rods, which usually have to be in direct line between a lower cam follower and upper follower, and require substantial mass to prevent bending or other deformation. In a further embodiment, the lower rockers of FIGS. 481 and 482 are eliminated by having the cam directly actuate the "pull" wire or rod by any convenient means. By way of example in schematic FIG. 483, the tensile member 1259 is attached to a movable cage 1266 surrounding the cam 1267, the cage having a cam follower 1268, shown by way of example as a roller bearing, and slot 1269 moveable on a fixed cylindrical guide 1269*a*, for defining follower movement relative to cam in the direction indicated by arrow 1270. Guide 1269*a* may also be the cam axle. The top extension of the cage 1266*a* is slidably mounted to part of the engine housing at 1269*b* Optionally, the cage may have a lower extension, shown dashed at 1266*b*, slidably mounted to a part of the engine housing shown dashed at 1269*c*. The actuating mechanisms principally loaded in tension that are described above can be adapted to function as any actuating mechanism for any purpose in any engine.

Virtually all IC engines operate under widely varying conditions of load and speed, at least to some degree. They are designed for operation through speeds ranging from low at idle through to their designed maximum, and under loading ranging from very small, as when idling, to the maximum they are designed for. An engine runs hottest at maximum load and speed and, to prevent overheating, most cooling systems are of fixed design to remove substantial amounts of heat energy under these conditions. Rates of heat dissipation are a function of time, so as the engine runs slower and/or is less loaded, a greater proportion of the fuel energy used is dissipated as heat by the cooling system, since the cooling system is generally of a capacity fixed for the maximum load and speed condition. Efficiency is a function of the difference in temperature between that at the beginning of the combustion cycle, which is that of the incoming air and therefore relatively constant, and that at actual combustion. Today's engines generally run at widely differing temperatures, and therefore at widely varying efficiencies, depending on load and speed. It is the object of the invention to have the engine always run at the maxim temperature it is designed for, whatever the load and speed conditions, and therefore always operate at its maximum possible efficiency, as determined by temperature. Other factors affect efficiency too, but they are not the major focus of the inventions relating to improvements to present engine technology. It is clear that most current engines are normally running at far below their optimum efficiency, as determined by temperature. A classic case is today's automobile, having an engine designed to provide, when the vehicle is fully laden, a maximum acceleration and speed up a substantial incline for a distance of around 25 kilometers. In every day use, these conditions are hardly ever net: often there is only one occupant, travel is mostly over more or less level ground, speed is set far below capability by local laws, or the vehicle is at idle or moving slowly in traffic. If, under the latter conditions, the engine can always be running at very close to its maximum design temperature, then overall efficiency would improve greatly and fuel use and CO2 emissions would decline substantially, and important advantage of the invention. Almost all IC engine have today to meet emissions regulations requiring often draconian reductions of pollutants such as particulates, hydrocarbons, carbon monoxide (CO) and nictric oxides (NOx), and fitted with exhaust emissions control systems. These include reactors and catalyst of varying types: almost all the devices involve hastening chemical reactions which would normally take place slowly in untreated exhaust gas. Generally, the speed of chemical reactions increases rapidly with increase in temperature. Separately, the effectiveness of a given catalyst increases with rise in temperature. In the case of the automobile cited above, exhaust gases are usually passing through the emissions system at temperatures far below the maximum the system is designed for. If the engine—and therefore its exhaust gas—can have substantially constant temperature under virtually all operating conditions, then the emissions system can either be made less elaborate and costly, or it can cleanse the exhaust to a greater degree, an important advantage of the invention. It proposed to provide exhaust treatment systems which operate at the highest temperature and, where appropriate, lengthen the dwell times of gases in the hotter treatment systems. It is further proposed to provide for a constant operating temperature, maximum efficiency engine of generally conventional construction by relatively minor modifications and adjustments in four principle areas: (1) Make changes to engine constructional details and materials; (2) During periods where the engine is normally lightly loaded, introduce additional loads; (3) Provide for a cooling system of widely varying performance and, in addition, to provide for insulation and to compensate for it for by increasing the capacity of the cooling system at selected times; (4) Heat the incoming charge air during periods of low speed and/or low load.

Figure 484:
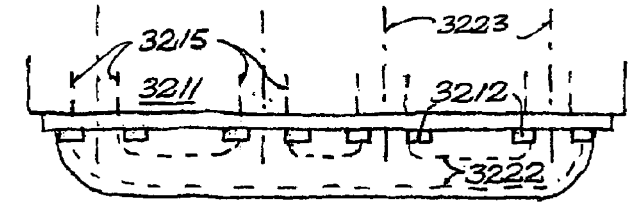
Figure 486:
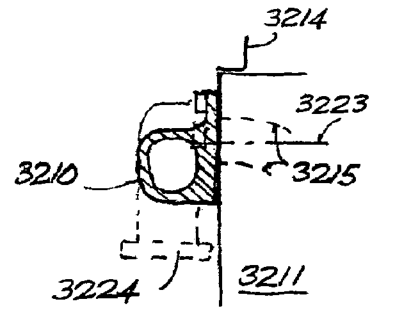
Figure 485:
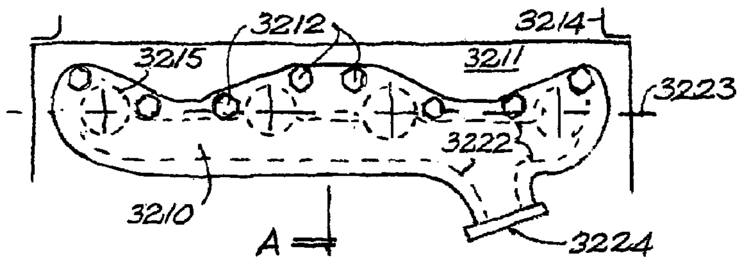
Figure 487:
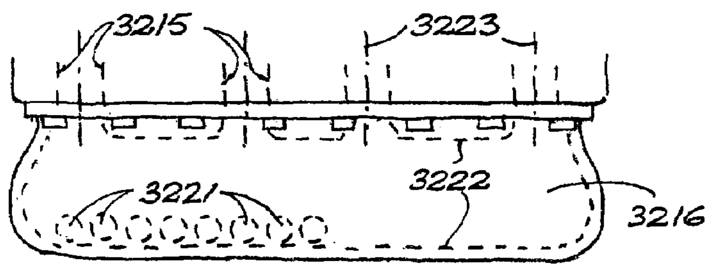
Figure 489:
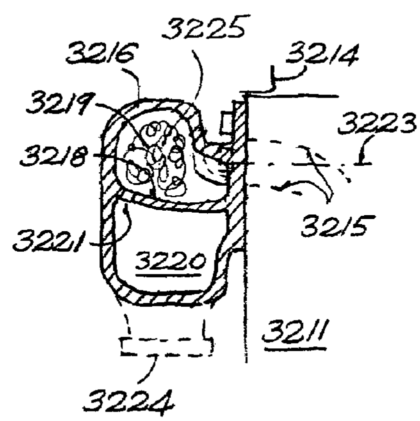
Figure 488:
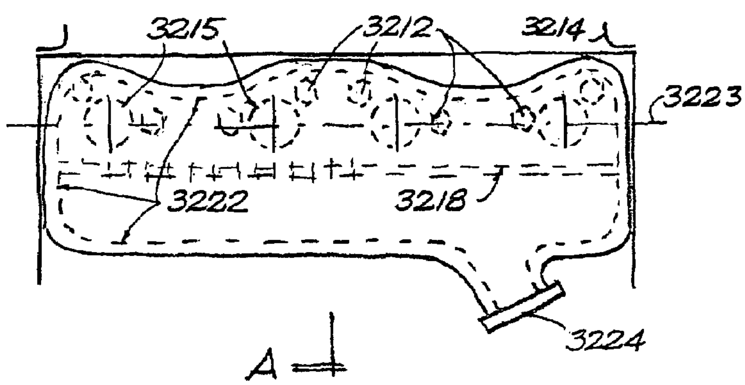
Figure 490:
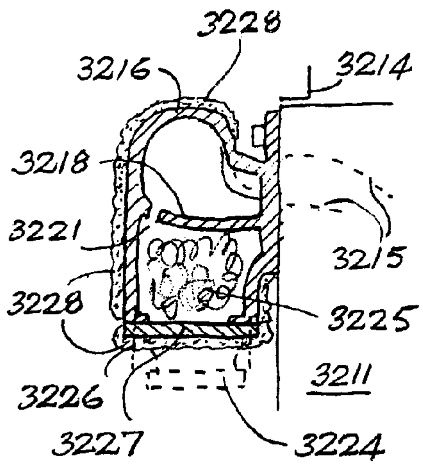
Figure 491:
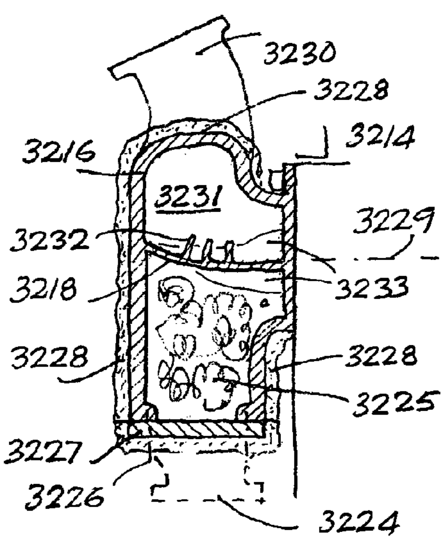

The disclosures r-elating to FIGS. 183 through 193 show how the standard manifold can be removed and replaced by an exhaust gas reactor adjacent to the exhaust ports, and is therefor in operation at the highest temperature, and how such reactor with their relatively large volumes provide longer gas dwell ties. In engines for some applications, especially for vehicles, there may not be enough rooms say in an engine compartment, for the reactor housings of FIGS. 183 through 193, or the existing block may be so configured as to make it difficult or impractical to fit such housings. In a further embodiment, existing manifolds are replaced by larger and modified manifolds capable of attachment to existing blocks, the replacement manifolds having most of the features of the reactors of FIGS. 183 through 193, including optionally containing the filamentary material and/or catalysts of the invention, and optionally having the variable closure device of the invention, typically operable during cold start. By way of example, FIGS. 484, 485 and 486 show schematically in top plan view, in elevation and in cross-section at "A" the shape of a typical present-day manifold 3210 fitted to an engine block 3211 by means of horizontally and vertically spaced nuts 3212 tightened on screwed studs of the engine block 3213, with a valve cover indicated notionally at 3214. Center lines 3223 of the exhaust port openings 3215 in the block are shown at 3216, with line of interior surface of the manifold volume shown dashed at 3222. A replacement manifold 3216 to be mounted on the same block 3211 is shown in similar schematic views in FIGS. 487, 488 and 489, where the exhaust reaction volume has been increased in all dimensions, including vertically to mask the mounting nuts 3212, shown dotted at 3217 in FIG. 488, leaving just enough space for tool and nut. Optionally, a partition is provided at 3218 to separate the reactor into upper volume 3219 and lower volume 3220, inked by a series of holes 3221 whose total area is at least equal to the area of one exhaust port. The holes and partition lengthen the shortest possible path from a port to the manifold exit 3224. To further lengthen the minimum path, the holes 3221 may be concentrated in one region of the reactor, as shown for example in FIG. 487. Optionally, filamentary material shown at 3225 is loaded into the manifold before its placement on the engine block 3211. In a further embodiment, the manifold is made up of multiple pieces fasten together, optionally to facilitate the placement and or replacement of filamentary material and/or other substances within the manifold, including the filamentary material and/or substances as disclosed herein. By way of example, schematic cross-section FIG. 490 shows an arrangement similar to that of FIG. 489, except that manifold 3216 has a bottom plate 3227 to which the outlet 3224 is attached or integrally formed, the plate secured to the main body of the manifold by fasteners on axes 3226, after placement of filamentary material and/or other substances 3225 in the lower section. Optionally spray-on type thermal insulation is provided at 3228. In another embodiment, suited to engines with intake and exhaust ports on the same side, intake and exhaust manifold are combined in such a way as to permit transfer of heat from exhaust gas to intake charge air. At low or idle engine speeds, when the engine is running coldest, charge air is slowest and will take up most heat, raising engine temperatures overall, while at high speed it will take up negligible heat. By way of example, FIG. 491 shows in schematic cross-section a confined manifold 3216 having an upper volume 3231 for charge air, with intake at 3230, and a lower volume for exhaust gas. Here the lower volume is constructed similarly to the lower portion of the manifold of FIG. 490, and contains filamentary material and/or other substances 3225. The partition 3218 is optionally thinner than the other walls, and may optionally have heat transfer fins 3232, here shown projecting into the charge air volume. Additionally and/or alternatively they may project into the lower exhaust gas volume. If the axes of intake and exhaust ports are substantially aligned, as indicated at 3229, the partition undulates around them, as indicated schematically at 3233. Optionally, spray-on type thermal insulation is applied to the entire manifold, including the upper charge air portion. If the manifold is made of cast iron, most or all of it will become hot, and the insulation to the upper portion will increase heat radiated or otherwise transferred to the charge gas.

Over time, the interior surfaces of the liquid coolant passages in an engine block, cylinder head and/or radiator react chemically with the coolant to form often randomly disposed oxide and other compound deposits and/or film patches. Impurities in the coolant, such as the calcium in some water, often lodge against these small projections to form encrustations, which both impede water flow and restrict heat transfer from the coolant. In recognition of this, many manufacturers design the cooling systems to cope, oxidized and encrusted, with the engine at maximum speed and load at the end of its design life, in the case of an automobile at somewhere around 150 000 kilometers. At all previous times in its life the cooling system has been greater than required, causing the engine to run cooler. It is proposed to construct the engine block cylinder head and/or at least the radiator core portion of the radiator of corrosion-resistant materials, with the interior of the coolant passages almost entirely smooth. Suitable materials include ceramics, as is disclosed elsewhere herein, but the most obvious are corrosion-resistant alloys, including those belonging to such as the stainless steel and nickel-chrome family of alloys. With these materials there will be virtually no build-up of oxides and encrustations over the life of the engine, and the cooling system will operate at substantially constant effectiveness over engine design life. Bolts connecting head to block, or other components to block or head, may also be of corrosion-resistant alloy. This presents two advantages: They will ave the same coefficients of thermal expansion as the components through which they pass, and they may penetrate the coolant passages, in contrast to prevailing practice. The latter will permit the creation of larger coolant volumes in the engine, and a greater coolant capacity. It will be shown later that enlargement of capacity can contribute to maintaining maximum engine temperature. Present engine blocks and cylinder heads are often castings. If it not considered practical to cast corrosion-resistant alloys, or if casting cannot create the smooth surface to cooling passages that is desired, the engine block or cylinder head may be made up of separate components, machined if desired to create smooth surfaces. In another embodiment, the path of incoming charge gas to the main engine has at least one alternative path, which is variably openable and closeable and passes across an electrical generator or gas pump, whose efficiency losses are converted to heat and which warms the charge gas. In another embodiment, the path of incoming charge gas to the main engine has at least one alternative path, which is variably openable and closeable and passes either directly or via a heat exchanger through the crankcase volume and/or oil reservoir, and when open the gas is ward by heat in the crankcase and/or oil. In another embodiment, the path of incoming charge gas to the main engine has at least one alternative path, which is variably openable and closeable and passes either directly or via a heat exchanger through an enclosed volume above the head optionally housing valve gear, to absorb heat and warm the charge gas. When the main engine is running at or close to full speed and/or full load, the charge gas is hardly or not at all directed to one or more of the alternative paths. When the engine operating at lower load or speed, the charge air travels to the engine at least partly via at least one of the alternative paths, to be heated. The heating of the charge will increase the temperature at the beginning of the cycle and also the combustion temperature, to help maintain the temperature of the block cylinder head and exhaust emissions system at close to maximum design temperature. Engines having multiple charge gas paths branching from a single charge intake may have a filter or cleansing device placed before such paths diverge. In another embodiment, thermal insulation is applied to the exterior of the engine and a large volume of cooling fluid is supplied, which is hardly circulated during low load and/or low speed and substantially circulated during high load and/or high speed. In today's engine, very roughly half of total heat dissipation is via general radiation from the engine and exhaust manifold, which has generally not been controllable, with the balance dissipated by the cooling system, which is controllable. To enable engine to be run close to their maximum design temperature, heat dissipation via general radiation is eliminated or restricted as far as possible, and heat dissipation by the cooling system is regulated to maintain high engine temperatures. Some of the above embodiments are illustrated by way of example in schematic cross-section FIG. 492 and part plan FIG. 493, showing a multi-cylinder engine with cylinder head 3241, cylinder 3242, bottom plate 3243, principal bolts 3244 and crankshaft bridge 3245 all made of stainless steel type alloys. Piston 3246, connecting rod 3247, and arc of big end pin center 3248 are shown dashed. Side plates 3249 define cooling fluid volume 3250. Charge air enters the engine at port 3256; exhaust leaves via port 3257. The valve enclosure and/or the crankcase each have two heat exchangers 3259 of folded metal, to give high surface area, each carrying charge air to ports 3256 under certain operating modes, with the crankcase heat exchangers partly submersed in lubricating fluid 3253. Bolts tie the cylinder head 3241 and bottom plate 3243 together, with the cylinder 3242 and side plates 3249 sandwiched between them, to form large water jacket 3250, through which the bolts pass. The head is cut out to permit the water jacket of large volume to surround most of the exhaust port 3257. Thermal insulating material 3260 covers the side plates 3249, the valve cover 3254 and the crankcase cover 3255. The figures are diagrammatic only; valves, cams and camshafts, fuel delivery devices, gaskets are all not shown. In an alternative embodiment, no heat exchangers are used. Instead, charge air passes directly through valve enclosure 3251 and/or crankcase 3252 before entering port 3256. In a further embodiment, some or all of the thermal insulation 3260 is omitted.

When an engine is running at low speed and/or low load, additional loading may be imposed to raise engine temperature. In a selected embodiment, an energy accumulator or other engine or motor engages with the main engine at low speed and or low load, or when braking to help slow the engine or vehicle, and disengages when more main engine work is required for non-accumulator or non-secondary engine operation, or for steady operation or for acceleration. The energy accumulator can be of any type, including a flywheel. In one embodiment, the accumulator is an electrical generator, optionally charging batteries, optionally via a controller. In another embodiment, the accumulator comprises a pump compressing air into a pressurized charge reservoir, similarly to the embodiments disclosed in relation to FIG. 11. This high pressure charge is fed back to the main engine under selected operating modes, such as acceleration or high load operation. When the accumulator systems are engaged with the main engine during idle, the new load imposed will cause main engine speed to drop, and when it is disengaged idle speed will rise again. In a further embodiment, the accumulator, such as an electrical generator, is only engaged during braking and at low speed and/or load, and is sized to meet all its requirements while substantially operating only under those circumstances. In another embodiment suited to vehicle and other applications, the accumulator is automatically disengaged when a throttle pedal is depressed during idle. In many engines, idle speeds are today set relatively high, to maintain exhaust temperature and flow at the minimum required to maintain proper operation of the exhaust emissions system, with consequent increase in fuel use. In the above examples, the extra loading and to a degree the extra heat generated, maintains proper emissions system operation, and whatever fuel is used is at least partly converted to useful work by the accumulator. Related technologies are employed in hybrid vehicles as part of a duel prime mover system (the IC engine and the electric drive motor); in the present invention the operation of the accumulator is not governed by hybrid drive considerations, but rather to a significant degree by the need to raise engine load to maintain temperature at or close to the maximum engine design temperature, and also during selected operating modes to assist in breaking the vehicle. An air compressor for filling a high-pressure charge gas reservoir may be electrically driven, either from a battery or from an electrical generator, or by a combination of both. The electrical generator is engaged during low load and/or low speed operation of the engine to impose additional load on the rain engine and so increase temperature, its work used directly or indirectly at least partly used to power the pump supplying the high-pressure charge gas reservoir. Optionally the generator charges a battery, from which energy can be drawn at any time to charge an accumulator, such as a pump filling high-pressure gas reservoir and/or a flywheel. In a selected embodiment, the accumulator has variable performance, that is it absorbs varying amounts of main energy to store varying amounts of energy. For example, the electric generator may be linked to the engine by a continuously variable transmission (CVT), whose gearing ratio is controllable. Initially on engagement with the main engine it might absorb a small amount of energy and, by varying the CVT ratio, it rapidly absorbs more energy. By way of example, FIG. 494 shows very schematically an engine 3261 linked to an electricity generator 3262 by a twin-cone-and-belt type CVT, comprising two pairs of cones connected by an endless belt. The cones 3264 on the engine are close together providing the belt with a large diameter wrap-around there, while the pair of cones on the generator are far apart providing the belt with a small diameter wrap-around there. In that arrangement, the generator shaft on axis 3267 will turn much faster than the engine shaft on axis 3266, so that the generator produces much electricity and imposes a significant load on the engine. When the separations of the cones of each pair are reversed, the generator shaft will turn much mere slowly than the engine shaft, producing little electricity and load on the engine. Optionally, the generator can be entirely disengaged from the engine by means of one or more clutches and/or belt tensioners.

It is today difficult to meet the new strictest mandatory emissions levels, especially for NOx. The problems are especially challenging for diesel engines. The latter have generally been run lean, with air/fuel mixture ratios by mass running at between 20:1 and 30:1. The excess of air and therefore causes oxygen to combine with nitrogen to form NOX. At stoichioment ratios, theoretically there is just sufficient oxygen to combine with all the carbon, with no oxygen left to combine with nitrogen, since the carbon/oxygen reaction happen more quickly and take precedence over the oxygen/nitrogen reactions. In the real world the theoretical conditions are rarely attained but far less NOx is produced than when running lean, at a given temperature. In a further embodiment, the engines of the invention operate at or very close to stoichiometric ratios for the particular fuel used, to limit creation of NOx in the combustion chanter and in any exhaust processing volume immediately downstream of the chamber. In a further embodiment, the engines of the invention operate at or very close to a constant air/fuel mixture ratio substantially under all operating conditions. This can be done by twin throttling: simultaneously increasing or decreasing both charge gas supply and fuel supply in tandem, so that always the right mass of fuel for a given mixture ratio is supplied to the charge gas actually in the combustion chamber. The cross-sectional area of the charge gas inlet can be controllably enlarged or reduced to match the increase or reduction of fuel supply, including as disclosed herein in relation to FIGS. 470 through 472.

In order to better regulate engine temperatures to be as close as possible to the maximum designed for, some form of insulation is applied to at least one of the cylinder head, engine block valve cover, oil pan cover and/or similar components, together with making the degree of coolant circulation substantially infinitely variable and controllable, governed by engine load and speed. In a selected embodiment, the exterior of an engine is as far as possible covered with thermal insulating material to restrict general radiation to a minimum and the maxim percentage of heat removed from the area about the combustion chamber is via optionally variable and controllable fluid heat transfer. The engine exterior insulation may take either one or both of two basic forms. Firstly, a layer of thermally insulating material is applied to the metal of the engine block or other component. This layer may be sprayed on during the manufacturing process, much as insulating material is sprayed onto structural steel in buildings to provide fire resistance. Alternatively, it may be some form of insulating mat which is screwed or bolted or clipped to a component such as a block, optionally in such a way that, by removing sections, insulation can be adjusted to suit seasons, regional markets, application and use, etc, and/or access is obtained to components mounted in or the engine, such as injectors, glow plugs, spark plugs, etc. Secondly, the engine component may have effectively infinitely variable insulation by mounting it within a housing from which it is spaced, with varying amounts of ambient air circulated through the space. The circulation can be varied by providing variably sized air entry and/or egress openings to the space. Circulation may be induced by convection, by a variable speed fan, or by both. The housing may be provided with removable covers to access components, apertures or ports. Electrical wires and/or fuel lines may pass through the removable covers in the housing, to connect to such as spark plugs, glow plugs or fuel injectors. To change an injector for example, a cover is removed to perhaps be slid along the fuel sufficiently for a tool to be inserted through the aperture or port to disconnect the fuel line and to loosen and remove the injector. By way of example, cross-section FIG. 495 and longitudinal section FIG. 496 show very schematically an engine 3271 linked to a transmission 3272, the engine having crankcase 3252 and valve enclosure 3251, surrounded by a spaced and removable enclosure 3273. At the lower front there is a openable and closable flap 3276, with a similar flap 3277 at the upper rear. At low speed and/or low load, the flaps are closed, and the air remains in volume 3275, effectively acting as thermal insulation and, while there, warming up. At high load and/or speed, the flaps are fully open and the air passes through the volume 3275 past the sides of the engine, as indicated by dashed arrows. The air movement is either by convection, or alternatively fixed speed or variable speed fans can be located at “A” and/or “B” to push air through volume 3275, cooling the sides of the engine. Optionally, all or part of this air can be directed to the charge air inlet. Optionally enclosures similar to 3273, shown dashed at 3274, can be provided for crankcase cover 3252 and/or valve cover 3251. In association with an insulated engine component, engine coolant fluid is variably circulated, preferably at least partly by at least one variable speed pump. Such a pump could be driven mechanically by the engine by a CVT, or by a variable speed electric motor. In a selected embodiment, coolant circulation is only by convection under low load/low speed conditions, with a variable speed pump cutting in as load and/or speed increases. In another embodiment, major engine components each have independent coolant circulation systems, each with its own pump, radiator, hosing etc. For example, a cylinder block would be separately cooled from the cylinder head, with coolant circulation separately regulated for each separate component, such as cylinder head and/or engine block to maintain each component at its optimum temperature. In addition to variable coolant circulation, the heat dispersal from the coolant can be regulated by means of a variable speed fan blowing air at variable flow rate across a radiator.

Variable valve actuation capability has many useful applications, apart from increasing volumetric efficiency throughout a wide speed range in naturally-aspirated engines. In two-stroke engines, which are often force-aspirated, variation of inlet valve actuation may be used to compensate for the reduced charge-to-exhaust pressure differential required at lower speeds. In all middle to high compression ratio engines, inlet valve variation may be used to lower effective compression ratios during cold start or idle. In engines where there would otherwise be too much energy remaining in the exhaust gases, the variation of inlet actuation may be used to cause some of the charge to be bled back to an intake gas reservoir, so reducing effective compression ratios, but maintaining expansion compression ratios. In a further embodiment, variation of valve actuation is achieved by laterally moving a shaft having a cam with variable profile against a fixed follower. In another embodiment, variation of valve actuation is achieved by laterally moving a cam follower relative to a shaft having a cam with a variable. Examples of these embodiments are given in the disclosures relating to FIGS. 46 through 51. In further embodiments, where appropriate any of the features and disclosures herein relating to advanced and/or un-cooled engines are adapted to more conventional cooled engines having metal blocks, including any of the features and disclosures relating to exhaust gas treatment, charge gas management and fuel delivery, including those relating to FIGS. 183 through 320. For example the gas reservoirs of FIGS. 270 through 272 may be used to store charge air and/or exhaust gas for later re-circulation, at any convenient pressure, and may be mounted in any convenient location in relation to any system, including such as fixedly mounted electricity generator or pumping sets.

It is proposed to briefly describe those materials which are in general suitable for the high temperature and/or mechanical requirements of the pumps, compressors and IC engines of the invention, and to also describe materials particularly suitable to the filamentary matter in particular. If the reciprocating device is a pump, any suitable material may be used, including those mentioned here in connection with other applications and those presently used for pumps. The invention in any of its embodiments may be made of any suitable material, including those not mentioned here and those which will be devised, discovered or developed in the future. Among the material suitable for use in engine are the high-temperature alloys known as "super alloys," usually alloys based on nickel, chrome and/or cobalt, with the addition of hardening elements including titanium, aluminum and refractory metals such as tantalum, tungsten, niobium and molybdenum. These super alloys tend to form stable oxide films at temperatures of over 700° C., giving good corrosion protection at ambient temperatures of around 1100° C. Examples include the Nimonic and Iconel range of alloys, with melting temperatures in the 1300° to 1500° C. range. At colder temperatures of up to 1000° C. and perhaps higher, certain special stainless steels may also be used. All may be reinforced with ceramic, carbon or meal fibers such as molybdenum, beryllium, tungsten or tungsten plated cobalt, optionally surface activated with palladium chloride or any other appropriate coating or film. In addition, and especially where reinforcement capable of oxidizing is not properly protected by the matrix, the metal may be face hardened. Non metal fibers or whiskers (often fibers grown as single crystals) such as sapphire-aluminum oxide, alumina, asbestos, graphite, boron or borides and other ceramics or glasses may also act as reinforcing materials, as can certain flexible ceramic fibers. Materials, including those used as filamentary matter, may be coated with ceramic by vapor deposition techniques. Ceramics materials are especially suited to the manufacture of pumps which process corrosive materials, and of engine piston and cylinder assemblies, as well as engine or reactor volume housings, intermembers and opening linings, because of their generally lower thermal conductivity and ability to withstand high temperatures. Suitable materials include ceramics such as alumina, alumina-silicate, magnetite, cordierite, olivine, fosterite, graphite, silicon nitride; glass ceramics including such as lithium aluminum silicate, cordierite glass ceramic, "shrunken" glasses such as borosilicate and composites such as sialones, refractory borides, boron carbide, boron silicide, boron intride, etc. If thermal conductivity is desired, beryllium oxide and silicon carbide may be used. These ceramics or glasses may be fiber or whisker reinforced with much the same material as metals, including carbon fiber, boron fiber, with alumina fibers constituting a practical reinforcement, especially in a high-alumina matrix (the expansion coefficients are the sane). It is the very high alumina content ceramics which today might be considered overall the most suited and most available to be used in the invention generally. The ceramic or glass used in the invention may be surface hardened or treated in certain applications, as can metals and often using the sane or similar materials, including the metal borides such as of titanium, zirconium and chromium, silicon, etc. Where silicon nitride or other non-oxide ceramics are used in high-performance or long-life engines, or pumps processing corrosive materials, the surfaces exposed to the worked fluid may be coated with an oxide such as silica, to prevent the base materials surface forming oxides over times and possibly degrading. The filamentary material in the reaction volumes may be made of metals, preferably smoothed and rounded to avoid undue corrosion, or of ceramics or glasses. Other materials which may be particularly suitable once they are in full commercial production are boron filaments, either of pure boron or compounds or composites such as boron-silica, boron carbide, boron-tungsten, titanium diboride tungsten, etc. The material, especially if ceramic, may easily and conveniently be in the form of wool or fibers, and many ceramic wool or blanket type materials are today manufactured commercially, usually of alumina-silicate, and could readily be adapted to the invention. Such ceramic wool could also be used as a jointing material either alone or as a matrix for a more elastomeric material such as a polymer resin. The material may either be such to have catalytic effect, as in the case of many metals and some ceramics such as alumina, or a surface having catalytic effect may be mounted or coated on a base material, such as ceramic. High temperature lubricants may be necessary for some moving parts, and may be applied either as a liquid or as material coated onto or doped into the surface of a component. They may comprise conventional oil products, or less usual materials such as boron nitride, graphite, silicone fluids and greases, molybdenumn compounds, etc. For perhaps the less direct mechanical applications, polymers may be employed. Silicones have already been mentioned as being suitable in rubber form for the expansible bellows of the gas reservoirs, and may also be used structurally in harder, resinous form. Resins suitable include those of the phenolic family (eg polytetrafluoroethelyne) and boron-containing epoxy resins. Other polymers suitable are for example the boranes, such as decaborane silicones containing un-carborane and other silicon-boron groups. These polymers may be reinforced with any whisker or fiber, including those mentioned above. Any appropriate materials can be used for the various structures and components of the aircraft, the marine craft and the transmissions of the invention, including any in use for such applications today. In selected embodiments, much or most of marine craft, including the underwater portions of hydrofoil craft, are constructed of stainless-type metal alloys, including nonrusting alloys and those referred to above. Under water marine drive components, such as propulsion devices including propellers and impellers, turbine stages, hydrofoil and flap actuating mechanisms, are in selected embodiments made of stainless-type metal alloys, including non-rusting alloys and those referred to above, and/or alloys including bronze and copper.

The components and features shown in the Figures are drawn in no particular proportion and at no particular scale relative to one another and serve merely to illustrate the principles and concepts described herein. The different concepts, features and innovations of this disclosure can be combined in any way. For example, any single combustion chamber can be deployed each side of a guide system or a conventional crankshaft. Any combination of combustion chambers can be arranged each side of the above mentioned drive or guide devices, the numbers of the chambers and their configuration not necessarily being the same on each side. In a further example, the combustion chamber grouping of FIGS. 110 and 111 can be arranged on one side or either side of a different drive system, or a power take-off (FIG. 157). Separate retractable guide systems can be associated with each of the differently sized chambers, either the largest or smallest chamber closest to the drive, to provide engines having three or six toroidal combustion chambers of three different sizes. In a further example, the combustion chamber and pumping chamber combination of FIG. 161 can be arranged on one or both sides of a crankshaft. Generally, it will be sensible to group combustion chambers in coaxial pairs, with each of a pair on opposite sides of a central flange forming part of a reciprocating system, and/or each side of a more or less centrally located guide systems) or crankshaft(s). However, multiple chambers need not be either equal or coaxial, and could be deployed in any fashion about a crankshaft or other drive or guide system. Where appropriate, "sinusoidal" toroidal chambers may be used, such as are shown in FIGS. 138 through 144, for example, instead of the "regular" toroidal chambers generally illustrated. The "regular" toroidal chambers may be defined as surrounding or containing within them a component which just reciprocates, or which both reciprocates and is caused to rotate by a guide system. "Sinusoidal" toroidal chambers may be defined as having opposing surfaces, each of which are not on a straight plane but have a three dimensional form of regular configuration. By regular, it is meant that an entire surface has a form consisting of a sub-form which repeats (but the sub-form may also comprise the whole form in special cases), this sub-form or whole form having a wave-like configuration, the wave being defined by the sine curve or any other mathematical formula, and it may be regular or irregular. Here, wave form is meant to include a series of apexes linked by substantially straight lines or planes. Crankshafts can be used singly in any location or they can be used in multiples, as shown schematically in FIGS. 20 to 32. Toroidal combustion chambers or pumping volumes can be used in combination with non-toroidal combustion or pumping chambers.

The discussions, disclosures and recital of features above referred to engines using air as a charge gas. Where appropriate, in further embodiments any feature of the inventions disclosed herein is employed in engines using other charge gases, including hydrogen peroxide. Any or all of the embodiments described in this disclosure may be used in any combination with each other, and the features of the invention incorporated in any practical and convenient manner, in any type of pump compressor or IC engine, in turn incorporated in any type of mechanism, system or vehicle. For example, in order to illustrate the principles, the cams and followers have generally been shown as solid, but these may be of any materials or construction, including hollow, built-up, of pressed sheet, formed tube, etc, appropriate to any scale of working chamber or mechanism, for example in the case of IC engines, from model airplane or lawn mower to giant marine applications. For simplicity's sake, many illustrations in this disclosure show cylinder assemblies, piston/rod assemblies and other components as of one piece, but in constructional practice the cylinder assembly can comprise multiple pieces, optionally assembled around a piston, which in turn may be an assembly of multiple pieces. Similarly, many of the injector and other components shown as of one piece may comprise assemblies of multiple pieces. Constructions are described in their basic embodiments, without consideration of possible refinements. As examples, single chamber multiple fuel delivery points may be activated sequentially to induce controlled turbulence, a "etched circle" bearing may be replaced by an elastomeric device in the tensile/compressive crank link or its bearing. The various constructional details described can be combined in any way, to produce pumps, compressors and IC engines for a wide variety of applications. For example, where the highest power to bulk or mass is not required, a four-stroke engine with a relatively low speed may be used. Where a lack of vibration is important (eg generating engines in research or science environments), a two-stroke engine having "elastic" tensile/compressive crank link may be employed, where work is continually done by each piston on both cranks, providing an exceptionally smooth supply of power. If crankcase size is limited, the "stretched circle" gas crank bearing with compressive/tensile link may be used. With these designs, dimensional variations can be accommodated in the bearing, so permitting crank throw diameter to equal or even be less than the stroke. Most engines will be direct injected (the high temperatures will tend to cause pre-detonation or knocking in carburetor or indirect injection engines), so will be able to use virtually any fuel. Where applicable, any or all of the features disclosed herein may also be applied to the exhaust gases from any other source of combustion, including an external combustion engine, such as the Stirling engine or the Rankine cycle engine, or to industrial combustion processes, including fluid bed combustion, continuous combustion processes including those using fossil fuels such as coal or gas. Hopefully the foregoing has shown by way of example that the various features described can be combined in any way to produce a complete new generation of more efficient pumps, compressors, internal combustion engines including compound engines, surface vehicles, aircraft, marine craft and transmissions.

INDUSTRIAL APPLICABILITY

The overall objectives of the inventions disclosed herein are broadly twofold. A first objective is to reduce the environmental cost of pumps, compressors and IC engines through simplification, by reduction of materials needed for production of each unit, and by making such machines longer-lasting and more reliable. A second and perhaps more important objective is to substantially reduce fossil and other fuel consumption and output of emissions, including $CO_2$. The inventor does believe that global warning is taking place, that it is substantially caused by human $CO_2$ production over the last two hundred years or so, and that today it is essential to reduce $CO_2$ emissions as far and as quickly as possible. Disclosed herein are improved engines which are much more efficient than today's engines, helicopters and fixed-wing aircraft using such engines, marine craft which require less energy to propel through water per unit of load and speed, and a continuously variable transmission for high load applications which will reduce combined engine, transmission fuel use. All of the innovations herein can be readily embodied in volume-manufactured products, and it is the inventor's intention to ensure that as many products as possible, which incorporate all or part of the features disclosed, are put into production as soon as possible, to reduce energy consumption, to reduce CO2 emissions, and to reduce the environmental cost of manufacturing such products.

I claim:

1. A seal and a marine craft which is a hydrofoil craft having a hull and at least partly powered by an engine, said craft having at least one through-the-water propulsion device, said hull in operation supported by a structure comprising at least one hydrofoil post to lift at least part of said hull out of the water, with the foot of said post being attached to or integral with at least one substantially submerged element, and at least one substantially submerged hydrofoil mounted on said element, said propulsion device being mounted to at least one of said element and hydrofoil, said engine at least indirectly driving said propulsion device by any means, wherein said post is mounted about said hull to be selectively extendable from and retractable towards said hull, including at least two openable hatches, one of said hatches mounted in an upper portion of said element and another of said hatches provided in the underside of said hull, such that when said post with said element is in a most retracted position said hatches are substantially aligned, and when said hatches are opened human access is obtained to the interior of said element from within said hull and said seal is so configured that water is substantially prevented from entering the interior volumes of said hull and / or said element.

2. A marine craft having a hull, said craft having at least one through-the-water propulsion device in operation at least partly driven by any method by at least one un-cooled reciprocating internal combustion engine, the exterior of said engine substantially defined by a casing having an exterior surface and thermal insulation, said casing at least partly enclosing and at least indirectly supporting at least one cylinder assembly including a cylinder and at least one cylinder head, said assembly containing a component reciprocatable therein to define at least one combustion chamber of cyclically varying capacity located between said component and said cylinder and said cylinder head, said engine having a charge gas supply system, a fuel delivery apparatus and an emission control system for hot exhaust gas emitted from said engine when operative, said engine having no purposely designed means for transferring heat from said assembly nor any circulating liquid lubrication between said component and said cylinder, such means including fluid circulating in a jacket adjacent to said assembly or cooling fins radiating from said assembly.

3. A marine craft which is a hydrofoil craft having a hull, said hull in normal hydrofoil operating mode being substantially above the water surface, said craft having at least one through-the-water propulsion device in operation at least partly driven by any method by at least one un-cooled reciprocating internal combustion engine, said hull in operation supported by a structure comprising at least one hydrofoil post to lift at least part of said hull out of the water, with the foot of said post being attached to or integral with at least one substantially submerged element, and at least one substantially submerged hydrofoil mounted on said element, said propulsion device being mounted to at least one of said element and hydrofoil, the exterior of said engine substantially defined by a casing having an exterior surface and thermal insulation, said casing at least partly enclosing at least one cylinder assembly including a cylinder and at least one cylinder head, said assembly containing a component reciprocatable therein to define at least one combustion chamber of cyclically varying capacity located between said component and said cylinder and said cylinder head, said engine having a charge gas supply system, a fuel delivery apparatus and an emission control system for hot exhaust gas emitted from said engine when operative, said engine having no purposely designed means for transferring heat from said chamber, such means including fluid circulating in a jacket adjacent to said assembly or cooling fins radiating from portion of said engine.

4. A marine craft which is a hydrofoil craft having a hull, said hull in a selected hydrofoil operating mode being entirely above the water surface, said craft having at least one first through-the-water propulsion device in operation powered by any method, said hull in operation supported by at least one structure comprising at least one hydrofoil post to lift at least part of said hull out of the water, with the foot of said post being attached to or integral with at least one substantially submerged element, and at least one substantially submerged hydrofoil mounted on said element, said first propulsion device being mounted to at least one of said element and hydrofoil, said craft having a second through-the-water propulsion device powered by any means, wherein said second propulsion device is mounted on or in said hull and is only able to drive said craft when said hull is at least partly in the water.

5. A marine craft having a hull and at least partly powered by a hybrid propulsion system, said system including an electrical motor an electrical generator and at least one un-cooled reciprocating internal combustion engine, said craft having at least one through-the-water propulsion device, in operation said motor at least indirectly driving said propulsion device by any method and said engine driving said generator to at least indirectly provide electrical energy for said motor, the exterior of said engine substantially defined by a casing having an exterior surface and thermal insulation, said casing at least partly enclosing and at least indirectly supporting at least one cylinder assembly including a cylinder and at least one cylinder head, said assembly containing a component reciprocatable therein to define at least one combustion chamber of cyclically varying capacity located between said component and said cylinder and said cylinder head, said engine having a charge gas supply system, a fuel delivery apparatus and an emission control system for hot exhaust gas emitted from said engine when operative, said engine having no purposely designed means for transferring heat from said assembly, such means including fluid circulating in a jacket adjacent to said assembly or cooling fins radiating from said assembly.

6. A large commercial or naval marine craft, such as for example a container ship or oil tanker or bulk carrier or passenger ferry or naval supply vessel, which is a hydrofoil craft having a hull and at least one through-the-water propulsion device at least partly powered by an engine, said hull in a selected hydrofoil operating mode being entirely above the water surface, said hull in operation supported by a multiplicity of structures, each structure comprising at least one hydrofoil post to lift at least part of said hull out of the water, with the foot of said post being attached to or integral with at least one substantially submerged element, and at least one substantially submerged hydrofoil mounted on said element, said propulsion device being mounted to at least one of said element or hydrofoil of at least one said structure, said engine at least indirectly driving said propulsion device by any method, wherein said post is mounted about said hull in a manner that allows at least portion of said post to be selectively extendable from and retractable towards said hull, wherein when said craft is anchored said hull's circumference at its waterline in plan view has a form broadly approximating that of an ellipse or an American football or plan view of a Viking ship and not the form of a stern segment portion and a bow segment portion joined by substantially straight line portions of length substantially equal to or greater that half of said craft's overall length, said hull being provided with at least one recess such that when one of said posts with element and hydrofoil are in a fully retracted position a portion of at least one of said structures is positioned within said recess.

7. A marine craft which is a hydrofoil craft having a hull and at least one through-the-water propulsion device at least partly powered by an engine, said hull in a selected hydrofoil operating mode being entirely above and clear of the water surface, said hull in operation supported by at least one structure comprising at least one hydrofoil post to lift at least part of said hull out of the water, with the foot of said post being attached to or integral with at least one substantially submerged element, and at least one substantially submerged hydrofoil mounted on said element, said propulsion device being mounted to at least one of said element and hydrofoil, said engine at least indirectly driving said propulsion device by any method, wherein said post is telescopically or pivotally mounted about said hull in a manner that allows at least portion of said post to be selectively extendable from and retractable towards said hull and said hull is provided with at least one recess such that when said post with element and hydrofoil are in a fully retracted position a substantial portion of said element is nested in said recess and said structure is positioned substantially within the cross-sectional profile of said hull at its largest part, in operation said telescopic or pivotal mounting causing said structure to move in a plane significantly inclined to the vertical such that, when said post is fully extended, portion of said post or submerged element or hydrofoil extends significantly outboard of said hull when viewed in plan.

8. The marine craft of claim 7, wherein said structure contains a ballast tank.

9. The marine craft of claim 7, wherein said element is pivotally mounted about the lower portion of said post, such that whatever the several positions of the post, the corresponding positions of the element are substantially parallel to one another.

10. The marine craft of claim 7, wherein said hydrofoil has an approximately disc-shaped base, said base being rotatably mounted about the exterior of any portion of said craft to controllably vary the pitch of said hydrofoil, in operation variation of said pitch serving to control movement of said craft.

11. The marine craft of claim 7, wherein said engine is an electric motor and said post contains at least an electrical circuit for said motor.

12. The marine craft of claim 7, wherein said engine is an internal combustion engine and said post contains at least one of a passage for air and a passage for exhaust gas for said engine.

13. The marine craft of claim 7, wherein said engine and said propulsion device are both pivotally mounted about a single axis.

14. The marine craft of claim 7, wherein said element is so formed as to in operation at least partly function as a hydrofoil.

15. The marine craft of claim 7, wherein said element is pivotally mounted about the foot of said post.

16. The marine craft of claim 7, wherein said engine is an electric motor and said craft is at least partly powered by an electric drive system, said system including said motor and at least one of an energy storage system and an electrical generator.

17. The marine craft of claim 7, including a hydrofoil aligned in any direction, said hydrofoil including a fixedly mounted portion and at least one other portion extendable from and retractable into said fixedly mounted portion.

18. The marine craft of claim 17, wherein in operation said other portion has surfaces which fold and unfold in a bellows-like manner.

19. The marine craft of claim 2, wherein at least one of said cylinder, said cylinder head and said component are substantially of ceramic material.

20. The marine craft of claim 2, wherein the form of said combustion chamber volume is toroidal during at least portion of an operating cycle of said engine.

21. The marine craft of claim 2, wherein said component includes a passage for transmission of gas to or from said combustion chamber.

22. The marine craft of claim 3, wherein at least one of said cylinder, said cylinder head and said component are substantially of ceramic material.

23. The marine craft of claim 3, wherein the form of said combustion chamber volume is toroidal during at least portion of an operating cycle of said engine.

24. The marine craft of claim 3, wherein said component includes a passage for transmission of gas to or from said combustion chamber.

25. The marine craft of claim 5, wherein at least one of said cylinder, said cylinder head and said component are substantially of ceramic material.

26. The marine craft of claim 5, wherein the form of said combustion chamber volume is toroidal during at least portion of an operating cycle of said engine.

27. The marine craft of claim 5, wherein said component includes a passage for transmission of gas to or from said combustion chamber.

28. The marine craft of claim 6, wherein said engine is an un-cooled internal combustion engine, the exterior of said engine substantially defined by a casing having an exterior surface and thermal insulation, said casing at least partly enclosing and directly or indirectly supporting at least one cylinder assembly including a cylinder and at least one cylinder head, said assembly containing a component reciprocatable therein to define at least one combustion chamber of cyclically varying capacity located between said component and said cylinder and said cylinder head, said engine having a charge gas supply system, a fuel delivery apparatus and an emission control system for hot exhaust gas emitted from said engine when operative, said engine having no purposely designed means for transferring heat from said chamber, such means including fluid circulating in a jacket adjacent or cooling fins radiating from portion of said engine.

29. The marine craft of claim 7, wherein said engine is an un-cooled internal combustion engine, the exterior of said engine substantially defined by a casing having an exterior surface and thermal insulation, said casing at least partly enclosing and directly or indirectly supporting at least one cylinder assembly including a cylinder and at least one cylinder head, said assembly containing a component reciprocatable therein to define at least one combustion chamber of cyclically varying capacity located between said component and said cylinder and said cylinder head, said engine having a charge gas supply system, a fuel delivery apparatus and an emission control system for hot exhaust gas emitted from said engine when operative, said engine having no purposely designed means for transferring heat from said chamber, such means including fluid circulating in a jacket adjacent or cooling fins radiating from portion of said engine.

30. The marine craft of claim 2 wherein, under selected operating conditions, propulsion is at least partly provided by wind, by means of one or more sails directly or indirectly attached to said hull.

31. The marine craft of claim 3 wherein, under selected operating conditions, propulsion is at least partly provided by wind, by means of one or more sails directly or indirectly attached to said hull.

32. The marine craft of claim 4 wherein, under selected operating conditions, propulsion is at least partly provided by wind, by means of one or more sails directly or indirectly attached to said hull.

33. The marine craft of claim 5 wherein, under selected operating conditions, propulsion is at least partly provided by wind, by means of one or more sails directly or indirectly attached to said hull.

34. The marine craft of claim 6 wherein, under selected operating conditions, propulsion is at least partly provided by wind, by means of one or more sails directly or indirectly attached to said hull.

35. The marine craft of claim 7 wherein, under selected operating conditions, propulsion is at least partly provided by wind, by means of one or more sails directly or indirectly attached to said hull.

36. The marine craft of claim 7, wherein a computer program receives information on wind velocity and direction, said program during some craft operating modes at least indirectly controlling the pitch or angle of attack of said hydrofoil.

37. A marine craft which is a hydrofoil craft having at least one locating member, a hull and at least one through-the-water propulsion device powered by an engine by any means, said hull in a selected hydrofoil operating mode being entirely above and clear of the water surface and supported by at least one structure including at least one hydrofoil post to lift said hull out of the water, the foot of said post being attached to or integral with at least one substantially submerged element having at least one substantially submerged hydrofoil mounted on said element, said propulsion device being mounted to at least one of said element and hydrofoil, wherein said post and said locating member are always aligned substantially parallel to one another and both are pivotally mounted about said hull and said submerged element in such manner that allows said element to be at all times similarly directionally aligned relative to said hull while being variably distant from it, said hull being provided with at least one recess such that when said post with element and hydrofoil are in a fully retracted position a substantial portion of said element is nested in said recess and said structure is positioned substantially within the cross-sectional profile of said hull at its largest part.

38. The marine craft of claim 4, wherein in operation at least one of said through-the-water propulsion devices is at least indirectly powered by an electric motor.

39. The marine craft of claim 37, said craft in operation having at least one device for sensing a submerged object that may be in the path of at least any portion of said craft before said object might make contact with said craft, said device sometimes when sensing a submerged object initiating the movement of at least part of said structure from one position to another.

40. The marine craft of claim 3, said craft in operation having at least one device for sensing a submerged object that may be in the path of at least any portion of said craft before said object might make contact with said craft, said device sometimes when sensing a submerged object initiating the movement of at least part of said structure from one position to another.

41. The marine craft of claim 4, said craft in operation having at least one device for sensing a submerged object that may be in the path of at least any portion of said craft before said object might make contact with said craft, said device sometimes when sensing a submerged object initiating the movement of at least part of said structure from one position to another.

42. The marine craft of claim 6, said craft in operation having at least one device for sensing a submerged object that may be in the path of at least any portion of said craft before said object might make contact with said craft, said device sometimes when sensing a submerged object initiating the movement of at least part of said structure from one position to another.

43. The marine craft of claim 7, said craft in operation having at least one device for sensing a submerged object that may be in the path of at least any portion of said craft before said object might make contact with said craft, said device sometimes when sensing a submerged object initiating the movement of at least part of said structure from one position to another.

44. The marine craft of claim 37, wherein said structure contains a ballast tank.

45. The marine craft of claim 4, wherein said structure contains a ballast tank.

46. The marine craft of claim 37, wherein said hydrofoil has an approximately disc-shaped base, said base being rotatably mounted about the exterior of any portion of said craft to controllably vary the pitch of said hydrofoil, in operation variation of said pitch serving to control movement of said craft.

47. The marine craft of claim 6, wherein at least one of said hydrofoils has an approximately disc-shaped base, said base being rotatably mounted about the exterior of any portion of said craft to controllably vary the pitch of said hydrofoil, in operation variation of said pitch serving to control movement of said craft.

48. The marine craft of claim 37, wherein said engine is an electric motor and at least one of said post and said locating member contains at least an electrical circuit for said motor.

49. The marine craft of claim 37, wherein said engine is an internal combustion engine and at least one of said post and said locating member contains at least one of a passage for air and a passage for exhaust gas for said engine.

50. The marine craft of claim 37, wherein said engine and said propulsion device are both pivotally mounted about a single axis.

51. The marine craft of claim 37, wherein said element is so formed as to in operation at least partly function as a hydrofoil.

52. The marine craft of claim 37, wherein said engine is an electric motor and said craft is at least partly powered by an electric drive system, said system including said motor and at least one of an energy storage system and an electrical generator.

53. The marine craft of claim 37, including a hydrofoil aligned in any direction, said hydrofoil including a fixedly mounted portion and at least one other portion extendable from and retractable into said fixedly mounted portion.

54. The marine craft of claim 53, wherein in operation said other portion has surfaces which fold and unfold in a bellows-like manner.

55. The marine craft of claim 37 wherein, under selected operating conditions, propulsion is at least partly provided by wind, by means of one or more sails directly or indirectly attached to said hull.

56. The marine craft of claim 4 and a protective shield mounted on the normally leading part of said post, wherein in operation at least portion of said shield is capable of movement relative to said post if said shield strikes an object.

57. The marine craft of claim 6 and a protective shield mounted on the normally leading part of at least one of said posts, wherein in operation at least portion of said shield is capable of movement relative to said post if said shield strikes an object.

58. The marine craft of claim 7 and a protective shield mounted on the normally leading part of said post, wherein in operation at least portion of said shield is capable of movement relative to said post if said shield strikes an object.

59. The marine craft of claim 37 and a protective shield mounted on the normally leading part of said post, wherein in operation at least portion of said shield is capable of movement relative to said post if said shield strikes an object.

60. The marine craft of claim 6 and a structural link of variable length, said length being controlled by variation of supply of a fluid, as for example in a hydraulically actuated piston in a cylinder, said link having one end attached to said hull and the other end attached to one of said structures, in operation said link determining the distance of at least part of said structure from said hull.

61. The marine craft of claim 7 and a structural link of variable length, said length being controlled by variation of supply of a fluid, as for example in a hydraulically actuated piston in a cylinder, said link having one end attached to said hull and the other end attached to said structure, in operation said link determining the distance of at least part of said structure from said hull.

62. The marine craft of claim 37 and a structural link of variable length, said length being controlled by variation of supply of a fluid, as for example in a hydraulically actuated piston in a cylinder, said link having one end attached to said hull and the other end attached to said structure, in operation said link determining the distance of at least part of said structure from said hull.

63. The marine craft of claim 1, wherein said engine is an electric motor and said post contains at least an electrical circuit for said motor.

64. The marine craft of claim 1, wherein said engine is an internal combustion engine and said post contains at least one of a passage for air and a passage for exhaust gas for said engine.

65. The marine craft of claim 6, wherein said engine is an electric motor and at least one of said posts contains at least an electrical circuit for said motor.

66. The marine craft of claim 6, wherein said engine is an internal combustion engine and at least one of said posts contains at least one of a passage for air and a passage for exhaust gas for said engine.

67. The marine craft of claim 6, wherein said engine is an electric motor and said craft is at least partly powered by an electric drive system, said system including said motor and at least one of an energy storage system and an electrical generator.

68. The marine craft of claim 37, wherein said engine is an un-cooled internal combustion engine, the exterior of said engine substantially defined by a casing having an exterior surface and thermal insulation, said casing at least partly enclosing and directly or indirectly supporting at least one cylinder assembly including a cylinder and at least one cylinder head, said assembly containing a component reciprocatable therein to define at least one combustion chamber of cyclically varying capacity located between said component and said cylinder and said cylinder head, said engine having a charge gas supply system, a fuel delivery apparatus and an emission control system for hot exhaust gas emitted from said engine when operative, said engine having no purposely designed means for transferring heat from said chamber, such means including fluid circulating in a jacket adjacent or cooling fins radiating from portion of said engine.

69. The marine craft of claim 4, wherein at least one of said through-the-water propulsion devices is at least indirectly powered by an un-cooled internal combustion engine, the exterior of said engine substantially defined by a casing having an exterior surface and thermal insulation, said casing at least partly enclosing and directly or indirectly supporting at least one cylinder assembly including a cylinder and at least one cylinder head, said assembly containing a component reciprocatable therein to define at least one combustion chamber of cyclically varying capacity located between said component and said cylinder and said cylinder head, said engine having a charge gas supply system, a fuel delivery apparatus and an emission control system for hot exhaust gas emitted from said engine when operative, said engine having no purposely designed means for transferring heat from said chamber, such means including fluid circulating in a jacket adjacent or cooling fins radiating from portion of said engine.

70. The marine craft of claim 6, wherein a computer program receives information on wind velocity and direction, said program during some craft operating modes at least indirectly controlling the pitch or angle of attack of at least one of said hydrofoils.

71. The marine craft of claim 37, wherein a computer program receives information on wind velocity and direction, said program during some craft operating modes at least indirectly controlling the pitch or angle of attack of said hydrofoil.

72. The marine craft of claim 6, wherein said engine and said propulsion device are both pivotally mounted about a single axis.

73. The marine craft of claim 6, wherein at least one of said posts is so mounted about said hull that at least portion of said post can be selectively extended from or retracted towards said hull.

74. The marine craft of claim 6, wherein when viewed in plan the ends of the craft have dissimilar forms, such that one end is more rounded and less pointed and the other end is more pointed and less rounded, relative to one another.

75. The marine craft of claim 4, including a hydrofoil aligned in any direction, said hydrofoil including a fixedly mounted portion and at least one other portion extendable from and retractable into or towards said fixedly mounted portion.

76. The marine craft of claim 3, wherein a computer program receives information on wind velocity and direction, said program during some craft operating modes at least indirectly controlling the pitch or angle of attack of said hydrofoil.

77. The marine craft of claim 4, wherein a computer program receives information on wind velocity and direction, said program during some craft operating modes at least indirectly controlling the pitch or angle of attack of said hydrofoil.

78. The marine craft of claim 3, wherein said post is so mounted about said hull that at least portion of said post can be selectively extended from or retracted towards said hull.

79. The marine craft of claim 4, wherein said post is so mounted about said hull that at least portion of said post can be selectively extended from or retracted towards said hull.

80. The marine craft of claim 2, wherin said method includes transmission of power through a mechanical continuaously variable transmission, said transmission comprising at least two rollers linked by an endless band, at least said first roller including a series of segment members for contact with said band, each of said segment members being slidably mounted on at least one element having inclined surfaces for supporting at least one segment member, said element keyed to and slidably mounted on a power transmission shaft, in operation said belt being maintained in tension by any means to form a drive between said rollers, in operation said element sliding back and forth under said segment member on said shaft to variably distance said menber from the axis of rotation of said shaft and thereby vary the approximate exterior diameter of said first roller and the rotational speeds of the rollers relative to one another.

81. The marine craft of claim 4, wherin said method or means includes transmission of power through a mechanical continuaously variable transmission, said transmission comprising at least two rollers linked by an endless band, at least said first roller including a series of segment members for contact with said band, each of said segment members being slidably mounted on at least one element having inclined surfaces for supporting at least one segment member, said element keyed to and slidably mounted on a power transmission shaft, in operation said belt being maintained in tension by any means to form a drive between said rollers, in operation said element sliding back and forth under said segment member on said shaft to variably distance said menber from the axis of rotation of said shaft and thereby vary the approximate exterior diameter of said first roller and the rotational speeds of the rollers relative to one another.

82. The marine craft of claim 7, wherin said method includes transmission of power through a mechanical continuaously variable transmission, said transmission comprising at least two rollers linked by an endless band, at least said first roller including a series of segment members for contact with said band, each of said segment members being slidably mounted on at least one element having inclined surfaces for supporting at least one segment member, said element keyed to and slidably mounted on a power transmission shaft, in operation said belt being maintained in tension by any means to form a drive between said rollers, in operation said element sliding back and forth under said segment member on said shaft to variably distance said menber from the axis of rotation of said shaft and thereby vary the approximate exterior diameter of said first roller and the rotational speeds of the rollers relative to one another.

83. The marine craft of claim 37, wherin said method includes transmission of power through a mechanical continuaously variable transmission, said transmission comprising at least two rollers linked by an endless band, at least said first roller including a series of segment members for contact with said band, each of said segment members being slidably mounted on at least one element having inclined surfaces for supporting at least one segment member, said element keyed to and slidably mounted on a power transmission shaft, in operation said belt being maintained in tension by any means to form a drive between said rollers, in operation said element sliding back and forth under said segment member on said shaft to variably distance said menber from the axis of rotation of said shaft and thereby vary the approximate exterior diameter of said first roller and the rotational speeds of the rollers relative to one another.

84. The marine craft of claim 2 and a turbine, wherein in operation hot exhaust from said engine is supplied to said turbine.

85. The marine craft of claim 4 and a turbine, wherein at least one of said through-the- water propulsion devices is at least indirectly driven by an internal combustion engine, in operation hot exhaust from said engine being supplied to said turbine.

86. The marine craft of claim 7 and a turbine, wherein said engine is a reciprocating internal combustion engine, in operation hot exhaust from said engine being supplied to said turbine.

87. The marine craft of claim 37 and a turbine, wherein said engine is a reciprocating internal combustion engine, in operation hot exhaust from said engine being supplied to said turbine.

88. The marine craft of claim 2, wherein in operation at least some of the hot exhaust gas from said engine is discharged under water through at least portion of said through-the-water propulsion device.

89. The marine craft of claim 4, wherein at least one of said through-the-water propulsion devices is at least indirectly driven by an internal combustion engine, in operation at least some of the hot exhaust gas from said engine being discharged under water through at least portion of at least one of said through-the-water propulsion devices.

90. The marine craft of claim 7, wherein said engine is an internal combustion engine, in operation at least some of the hot exhaust gas from said engine being dis-charged under water through at least portion of said through-the-water propulsion device.

91. The marine craft of claim 37, wherein said engine is an internal combustion engine, in operation at least some of the hot exhaust gas from said engine being dis-charged under water through at least portion of said through-the-water propulsion device.

92. The marine craft of claim 2, wherein said emission control system includes at least one substance and / or device for removing at least portion of any carbon dioxice from the exhaust gas of said engine.

93. The marine craft of claim 4, wherein at least one of said through-the-water propulsion devices is at least indirectly driven by an internal combustion engine, said engine having intake charge system and an emission control system for hot exhaust gas emitted from said engine when operative, said emission control system including at least one substance and / or device for removing at least portion of any carbon dioxice from the exhaust gas of said engine.

94. The marine craft of claim 7, wherein said engine is an internal combustion engine having intake charge system and an emission control system for hot exhaust gas emitted from said engine when operative, said emission control system including at least one substance and / or device for removing at least portion of any carbon dioxice from the exhaust gas of said engine.

95. The marine craft of claim 37, wherein said engine is an internal combustion engine having intake charge system and an emission control system for hot exhaust gas emitted from said engine when operative, said emission control system including at least one substance and / or device for removing at least portion of any carbon dioxice from the exhaust gas of said engine.

96. The marine craft of claim 2, said emission control system including an emission treatment module comprising a substance or a device such as a filter, said substance or device mounted in a structure or cartridge so configured so as to in operation permit the flow of exhaust gas through it, said strucure or cartridge being easily installable and replaceable in said emission control system.

97. The marine craft of claim 4, wherein at least one of said through-the-water propulsion devices is at least indirectly driven by an internal combustion engine, said engine having intake charge system and an emission control system for hot exhaust gas emitted from said engine when operative, said emission control system including an emission treatment module comprising a substance or a device such as a filter, said substance or device mounted in a structure or cartridge so configured so as to in operation permit the flow of exhaust gas through it, said strucure or cartridge being easily installable and replaceable in said emission control system.

98. The marine craft of claim 7, wherein said engine is an internal combustion engine having intake charge system and an emission control system for hot exhaust gas emitted from said engine when operative, said emission control system including an emission treatment module comprising a substance or a device such as a filter, said substance or device mounted in a structure or cartridge so configured so as to in operation permit the flow of exhaust gas through it, said strucure or cartridge being easily installable and replaceable in said emission control system.

99. The marine craft of claim 37, wherein said engine is an internal combustion engine having intake charge system and an emission control system for hot exhaust gas emitted from said engine when operative, said emission control system including an emission treatment module comprising a substance or a device such as a filter, said substance or device mounted in a structure or cartridge so configured so as to in operation permit the flow of exhaust gas through it, said structure or cartridge being easily installable and replaceable in said emission control system.

100. The marine craft of claim 2 and an audible and / or visible indicator mechanism, said emission control system including a gas composition or pollutant measuring device, such that said device activates said indicator mechanism to signal if and when the composition of said exhaust gas is not in compliance with any law, mandate or guideline.

101. The marine craft of claim 4 and an audible and / or visible indicator mechanism, wherein at least one of said through-the-water propulsion devices is at least indirectly driven by an internal combustion engine, said engine having intake charge system and an exhaust emission control system, said emission control system including a gas composition or pollutant measuring device, such that said device activates said indicator mechanism to signal if and when the composition of said exhaust gas is not in compliance with any law, mandate or guideline.

102. The marine craft of claim 7 and an audible and / or visible indicator mechanism, wherein said engine is an internal combustion engine having intake charge system and an exhaust emission control system, said emission control system including a gas composition or pollutant measuring device, such that said device activates said indicator mechanism to signal if and when the composition of said exhaust gas is not in compliance with any law, mandate or guideline.

103. The marine craft of claim 37 and an audible and / or visible indicator mechanism, wherein said engine is an internal combustion engine having intake charge system and an exhaust emission control system, said emission control system including a gas composition or pollutant measuring device, such that said device activates said indicator mechanism to signal if and when the composition of said exhaust gas is not in compliance with any law, mandate or guideline.

104. The marine craft of claim 2, wherein said engine normally operates at or close to stoichiometric air / fuel mixture ratios.

105. The marine craft of claim 4, wherein at least one of said through-the-water propulsion devices is at least indirectly driven by an internal combustion engine, said engine normally operating at or close to stoichiometric air / fuel mixture ratios.

106. The marine craft of claim 7, wherein said engine is an internal combustion engine, said engine normally operating at or close to stoichiometric air / fuel mixture ratios.

107. The marine craft of claim 37, wherein said engine is an internal combustion engine, said engine normally operating at or close to stoichiometric air / fuel mixture ratios.

* * * * *